US010949935B2

(12) United States Patent
Nitzschke

(10) Patent No.: US 10,949,935 B2
(45) Date of Patent: Mar. 16, 2021

(54) SYSTEM AND METHOD FOR IMPLEMENTING A CENTRALIZED CUSTOMIZABLE OPERATING SOLUTION

(71) Applicant: ARECO INTERNATIONAL PTE. LTD., Singapore (SG)

(72) Inventor: Juergen Horst Gustav Adolf Nitzschke, Singapore (SG)

(73) Assignee: ARECO INTERNATIONAL PTE. LTD., Singapore (SG)

( * ) Notice: Subject to any disclaimer, the term of this patent is extended or adjusted under 35 U.S.C. 154(b) by 0 days.

(21) Appl. No.: 16/607,982

(22) PCT Filed: May 17, 2018

(86) PCT No.: PCT/SG2018/050242
§ 371 (c)(1),
(2) Date: Oct. 24, 2019

(87) PCT Pub. No.: WO2018/217165
PCT Pub. Date: Nov. 29, 2018

(65) Prior Publication Data

US 2020/0184579 A1 Jun. 11, 2020

(30) Foreign Application Priority Data

May 25, 2017 (SG) .......................... 10201704297Y

(51) Int. Cl.
*G06Q 50/12* (2012.01)
*G06Q 30/06* (2012.01)

(52) U.S. Cl.
CPC ......... *G06Q 50/12* (2013.01); *G06Q 30/0621* (2013.01)

(58) Field of Classification Search
None
See application file for complete search history.

(56) References Cited

U.S. PATENT DOCUMENTS

| | | | | |
|---|---|---|---|---|
| 2004/0158494 | A1 | 8/2004 | Suthar | |
| 2010/0213187 | A1 | 8/2010 | Bandholz et al. | |
| 2012/0233002 | A1 * | 9/2012 | Abujbara | G06Q 10/06 705/15 |
| 2015/0032814 | A1 | 1/2015 | Broustas et al. | |
| 2015/0309491 | A1 | 10/2015 | Patel et al. | |

(Continued)

OTHER PUBLICATIONS

International Search Report and Written Opinion issued on International Application No. PCT/SG2018/050242, dated Jan. 15, 2019, 8 pages.

(Continued)

*Primary Examiner* — Paul Danneman
(74) *Attorney, Agent, or Firm* — Leber IP Law; David C. Robertson

(57) ABSTRACT

Systems and methods for implementing a centralized customizable operating solution. The system comprises: a central server module that is in communication with a plurality of input modules and a plurality of execution modules, wherein each input module is configured to accept inputs from a user relating to customized operations associated with the user; wherein the central server module is configured to: generate corresponding outputs based on the accepted inputs; and transmit each output to a relevant execution module for execution of the output.

16 Claims, 218 Drawing Sheets

(56) References Cited

U.S. PATENT DOCUMENTS

| | | | | |
|---|---|---|---|---|
| 2015/0363499 A1 | 12/2015 | Cheng | | |
| 2016/0081515 A1* | 3/2016 | Aboujassoum | ......... | F24C 7/083 426/231 |

OTHER PUBLICATIONS

International Preliminary Report on Patentability (Chapter II) issued on International Application No. PCT/SG2018/050242, dated Sep. 6, 2019, 5 pages.
European Patent Application No. 18805234.4, Extended Search Report dated Oct. 15, 2020, 8 pages.

* cited by examiner

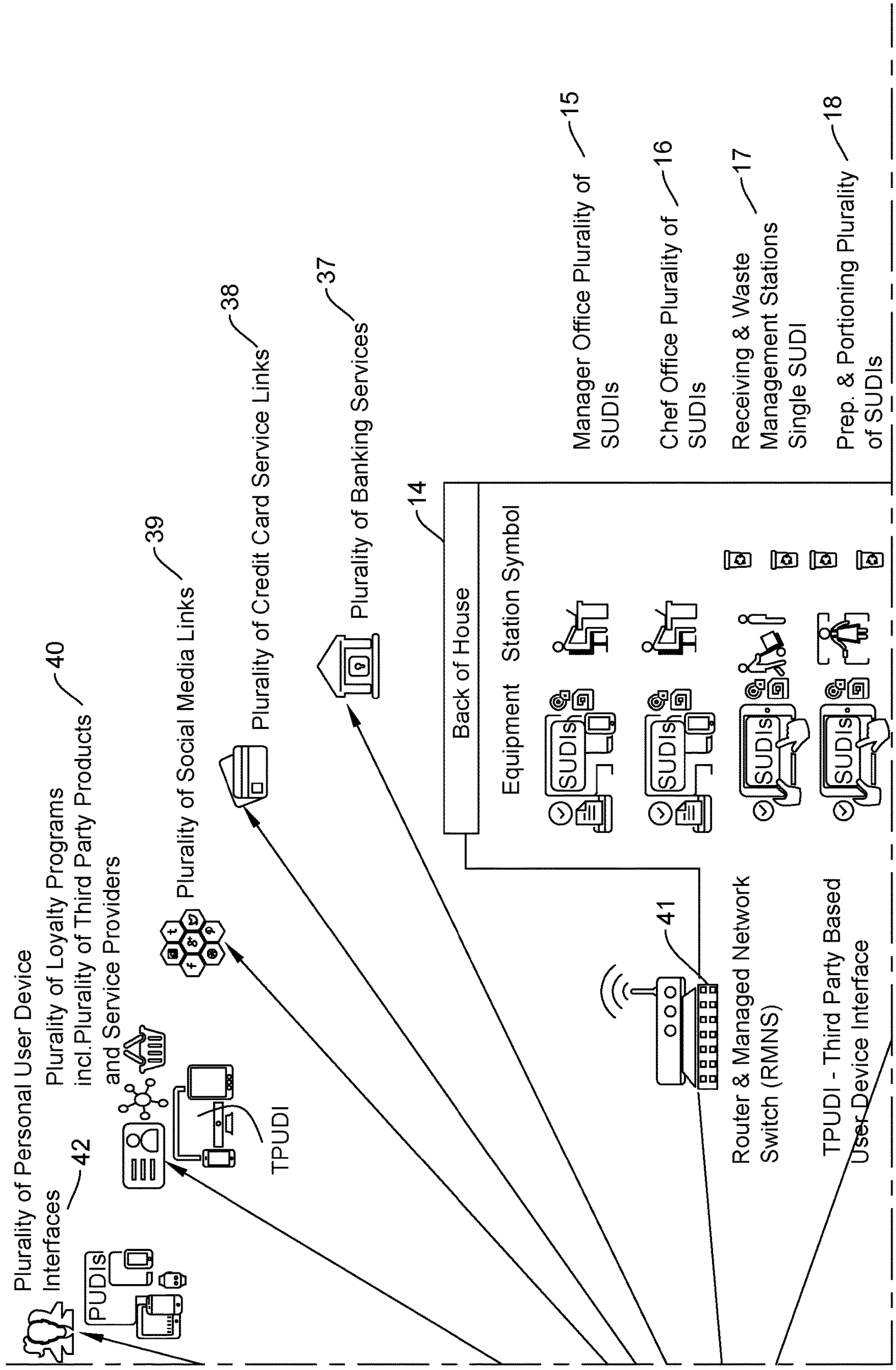
FIG. 1(continuation-part I)

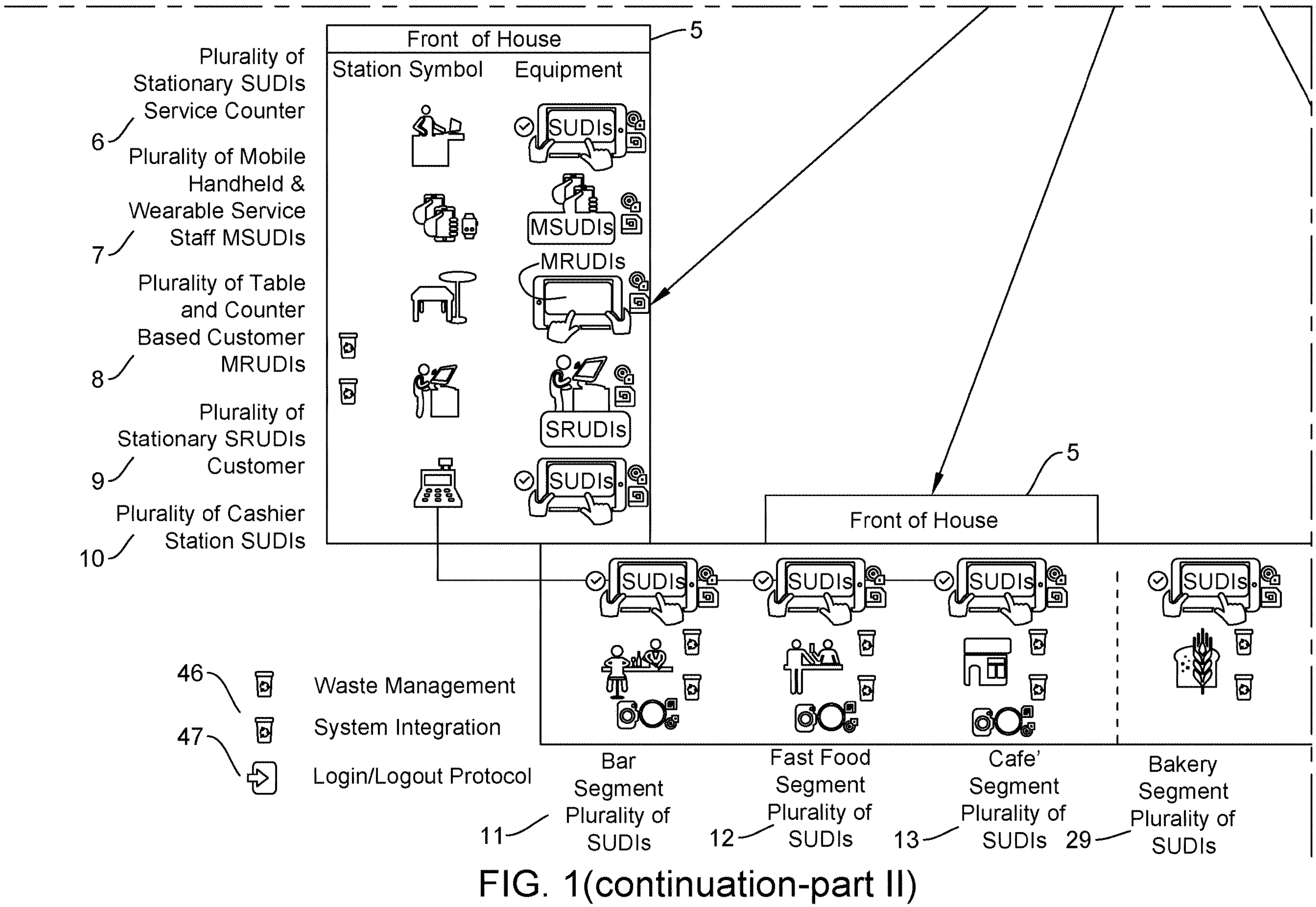
FIG. 1(continuation-part II)

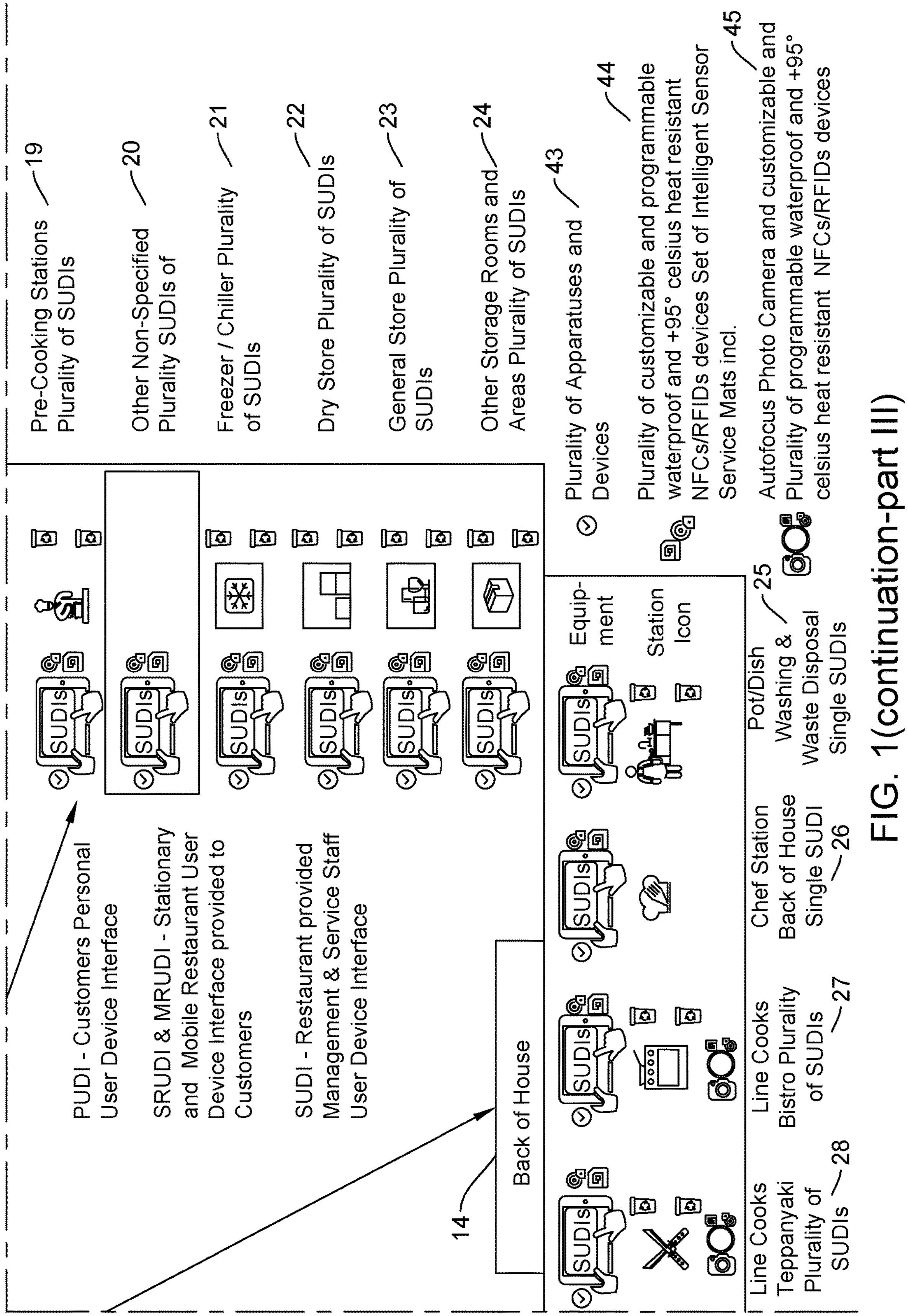
FIG. 1(continuation-part III)

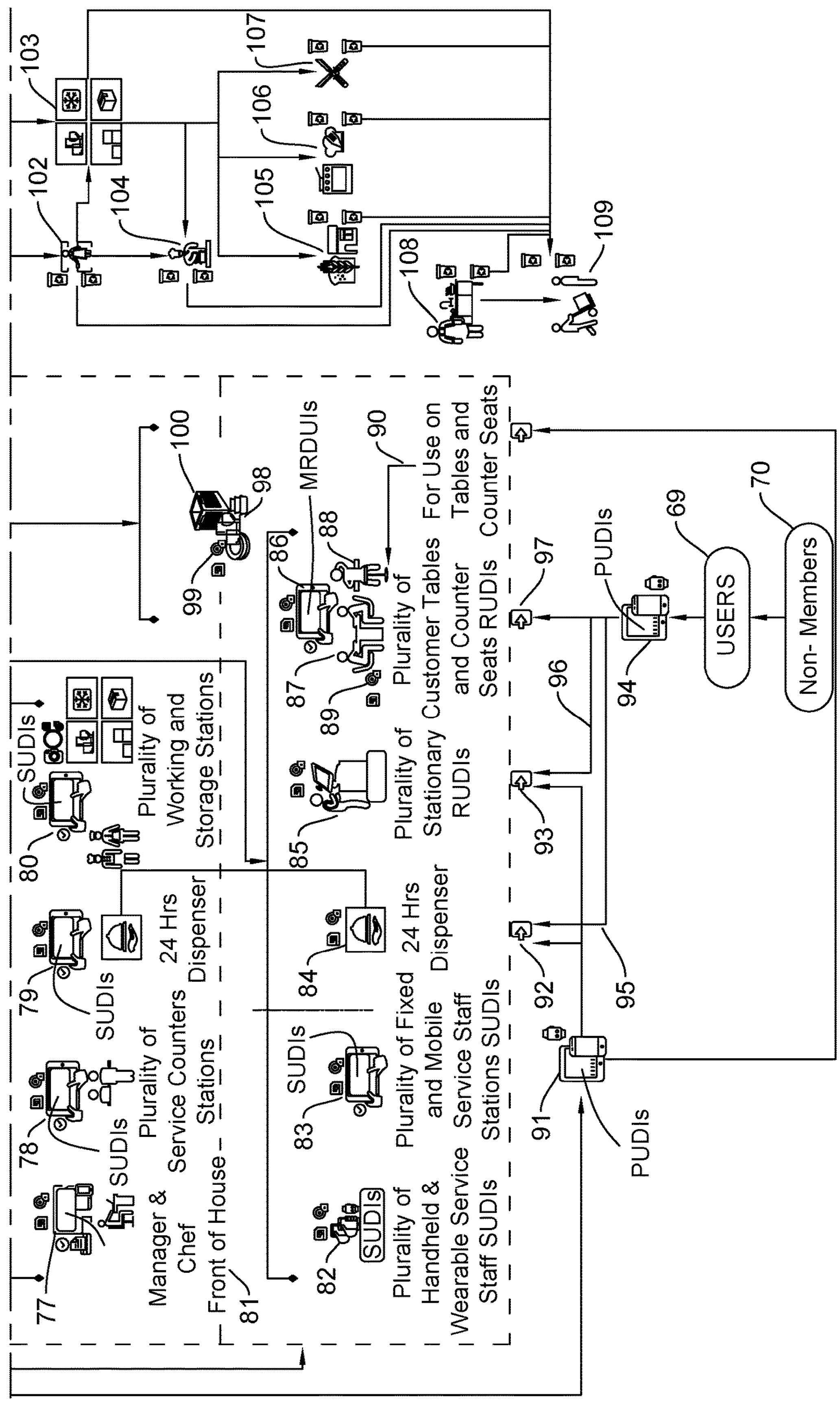
FIG. 2(continuation-part I)

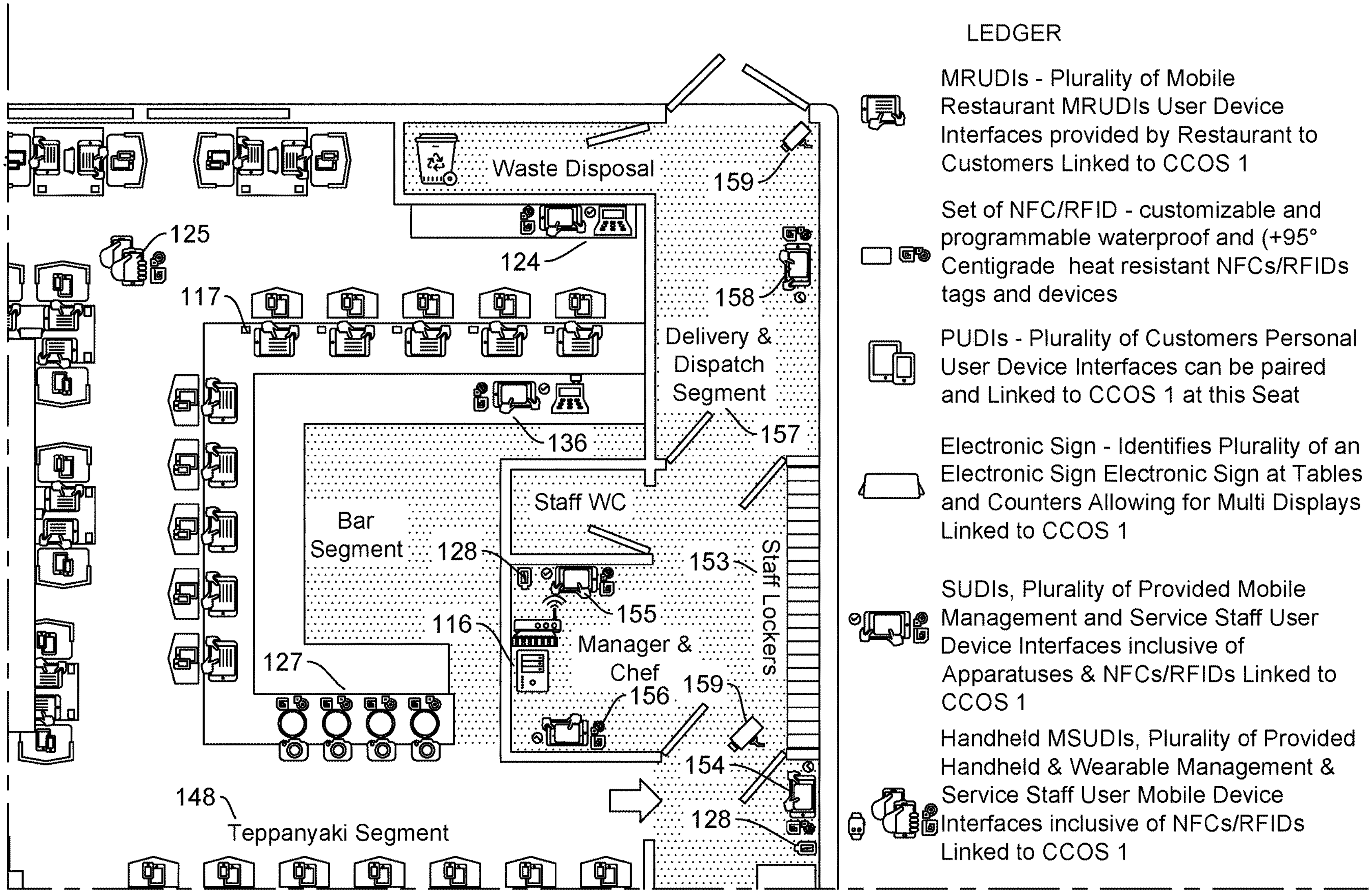
FIG. 3(continuation-part I)

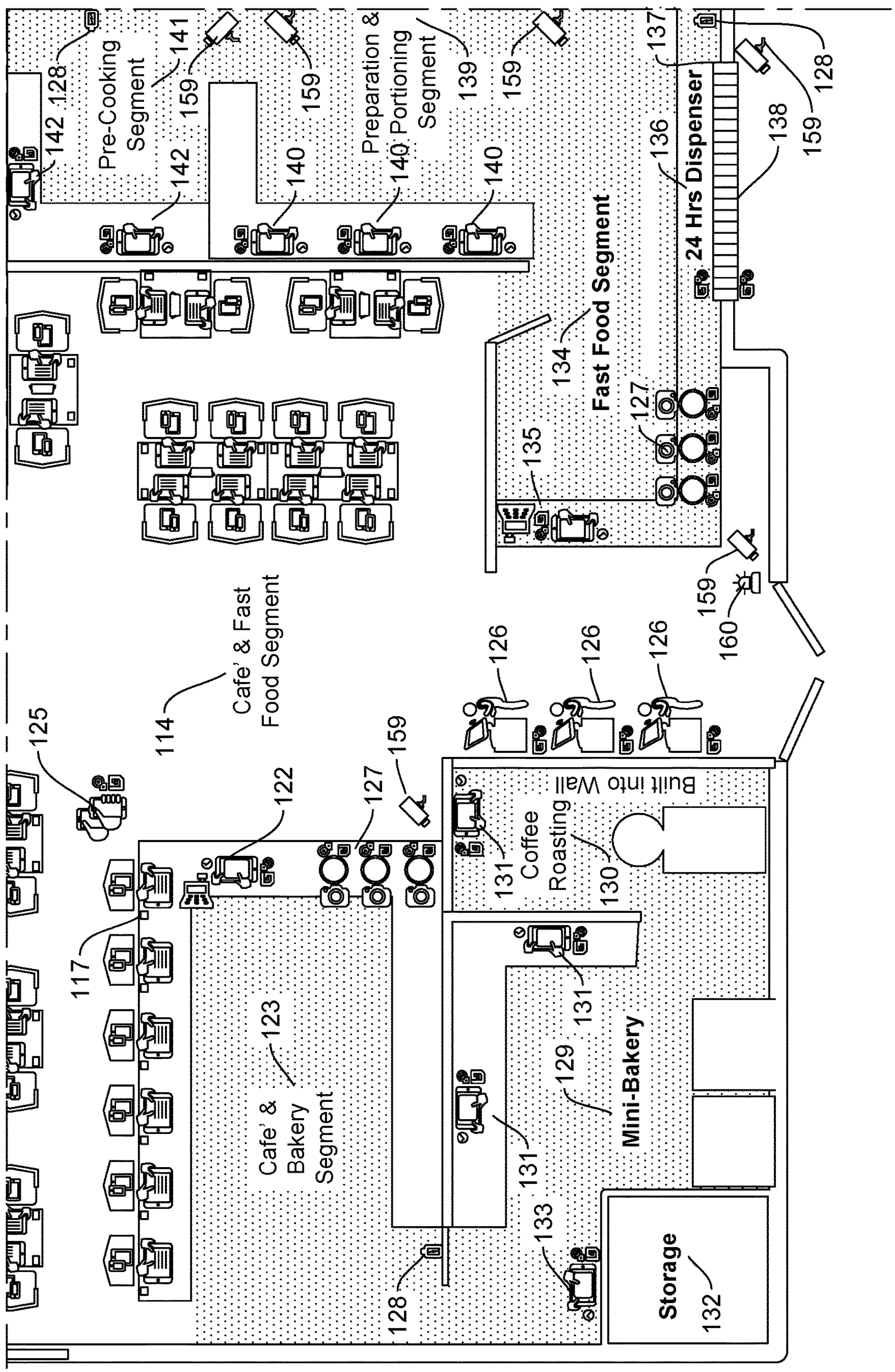
FIG. 3(continuation-part II)

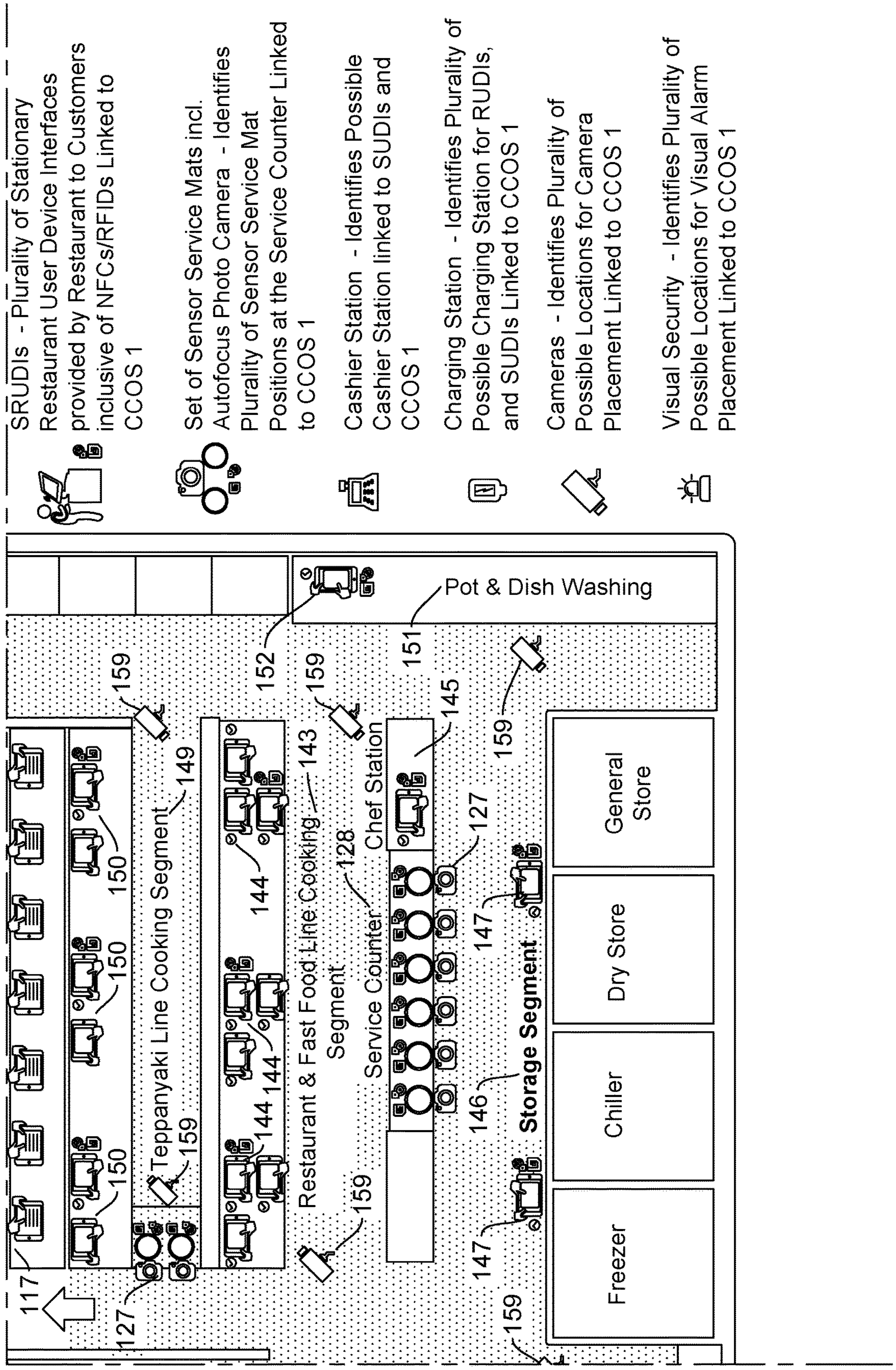
FIG. 3(continuation-part II)

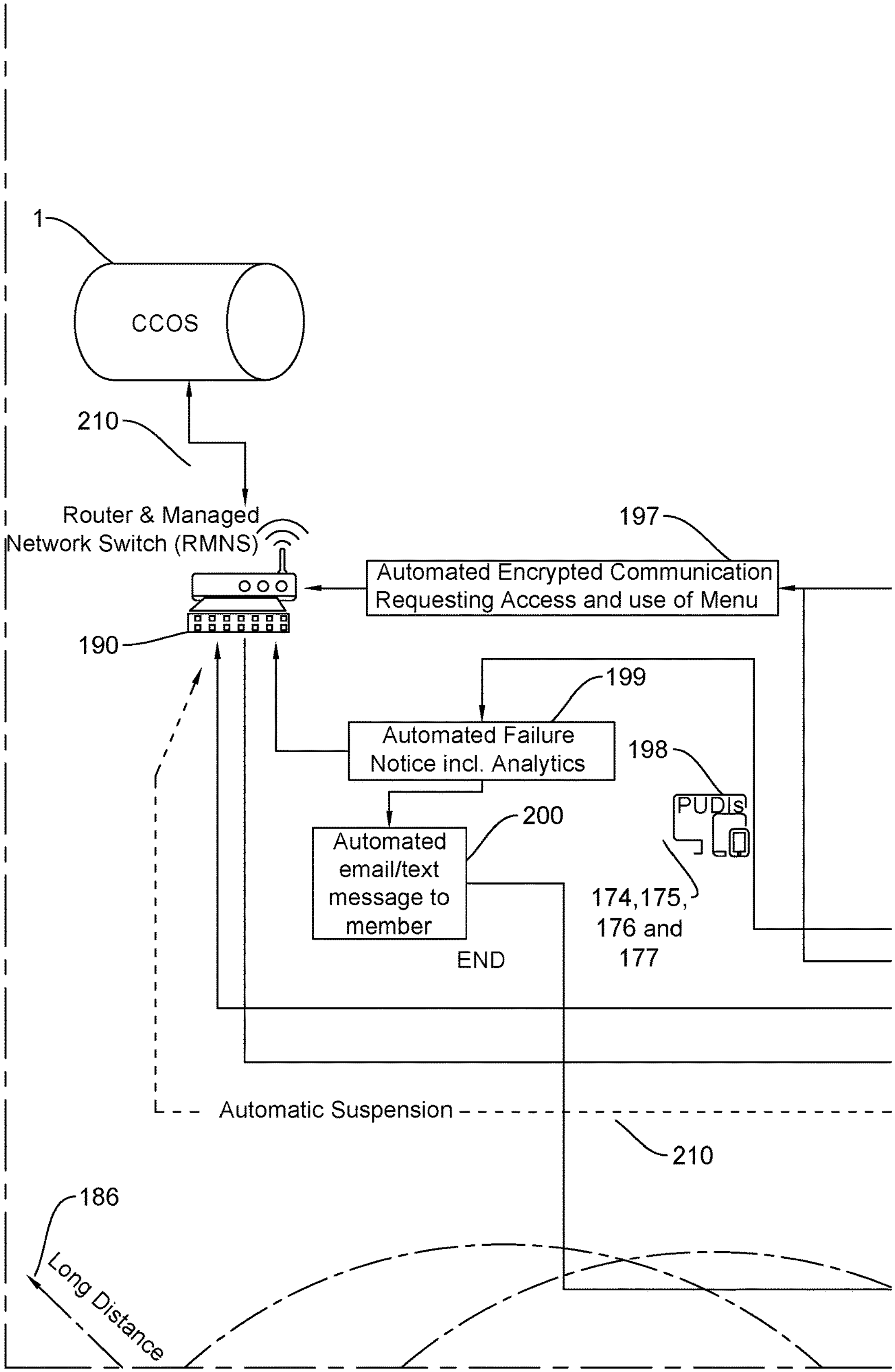
FIG. 4(continuation-part I)

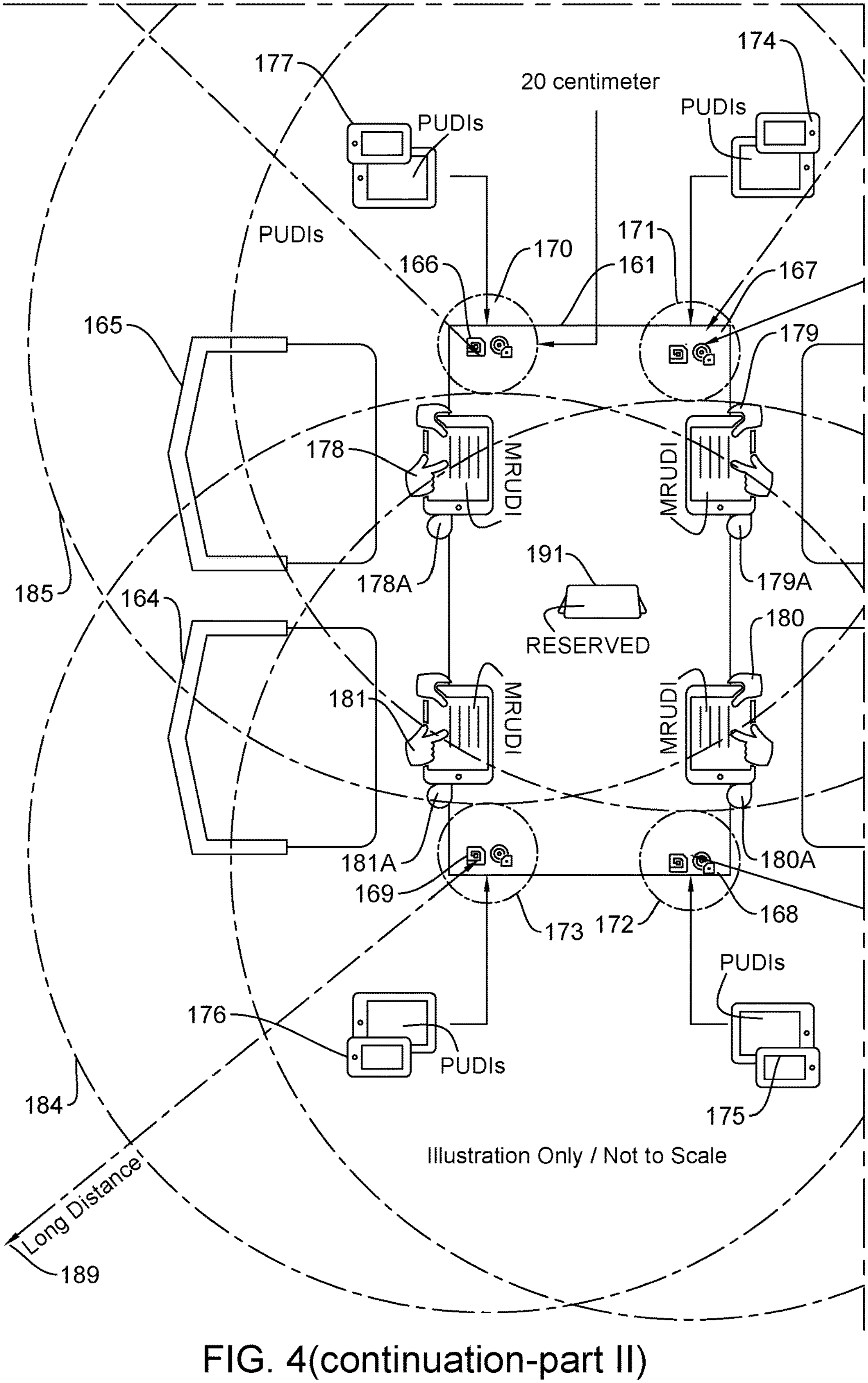
FIG. 4(continuation-part II)

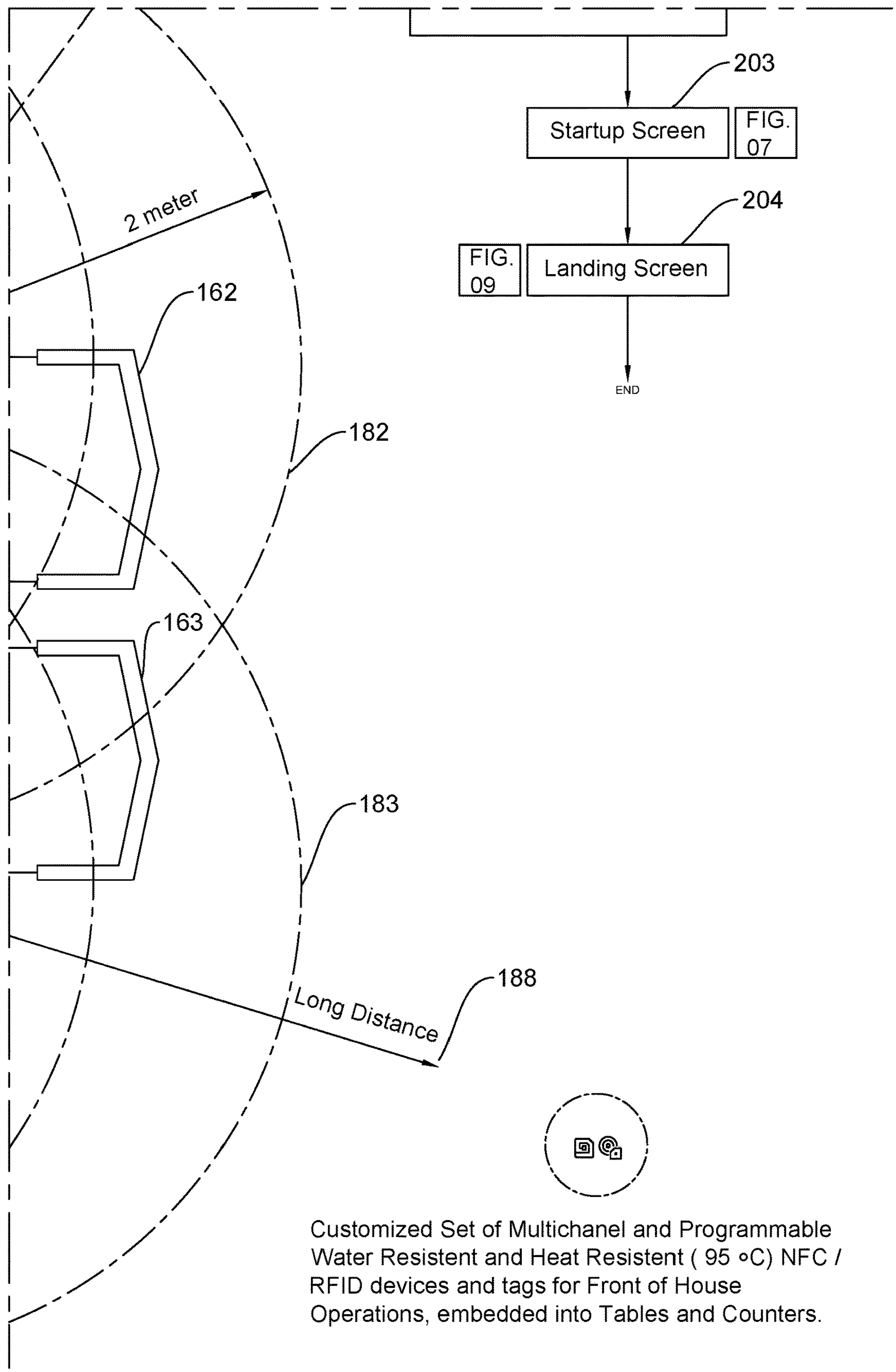
FIG. 4(continuation-part III)

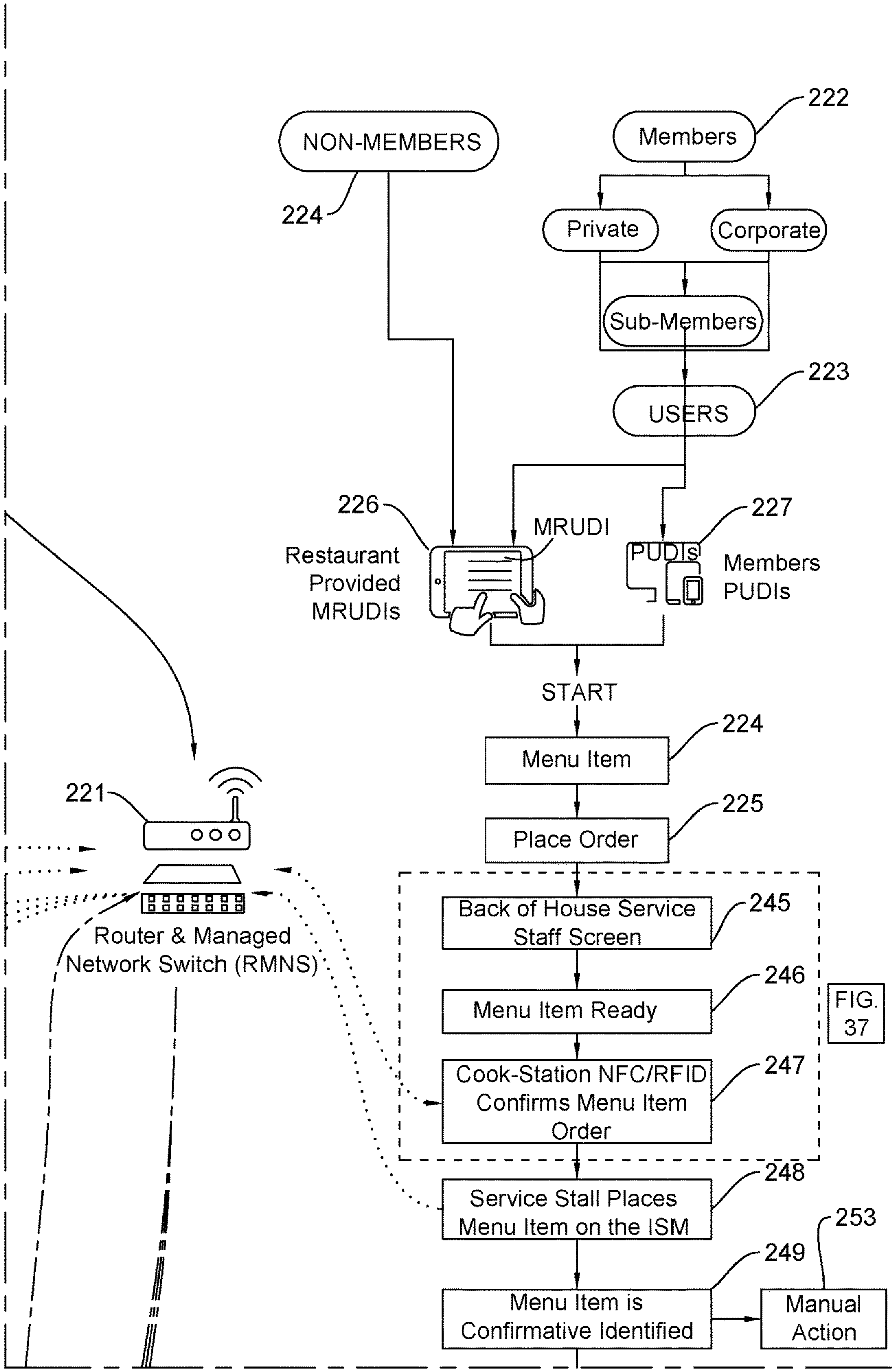
FIG. 5(continuation-part I)

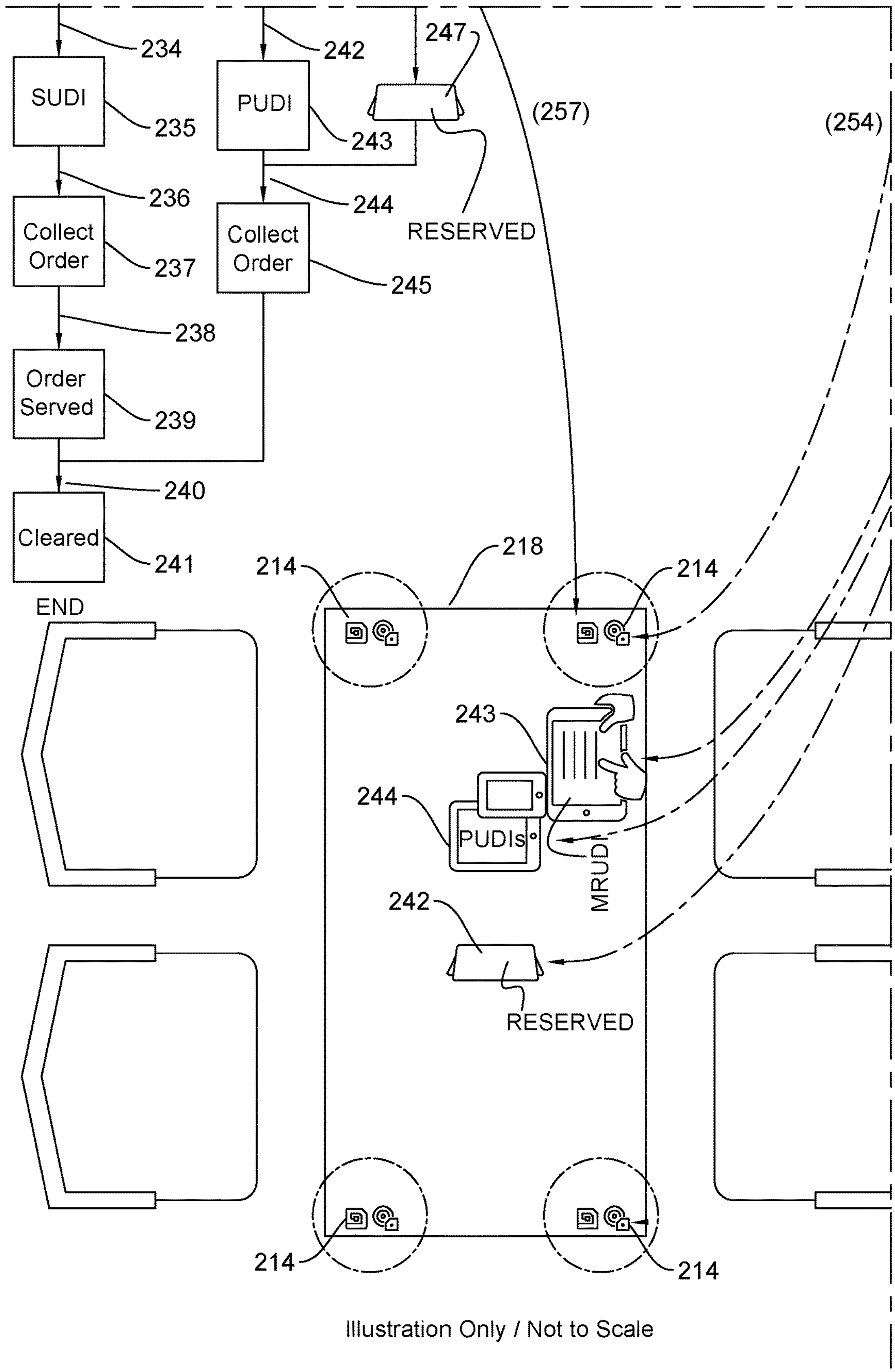
Illustration Only / Not to Scale
FIG. 5(continuation-part II)

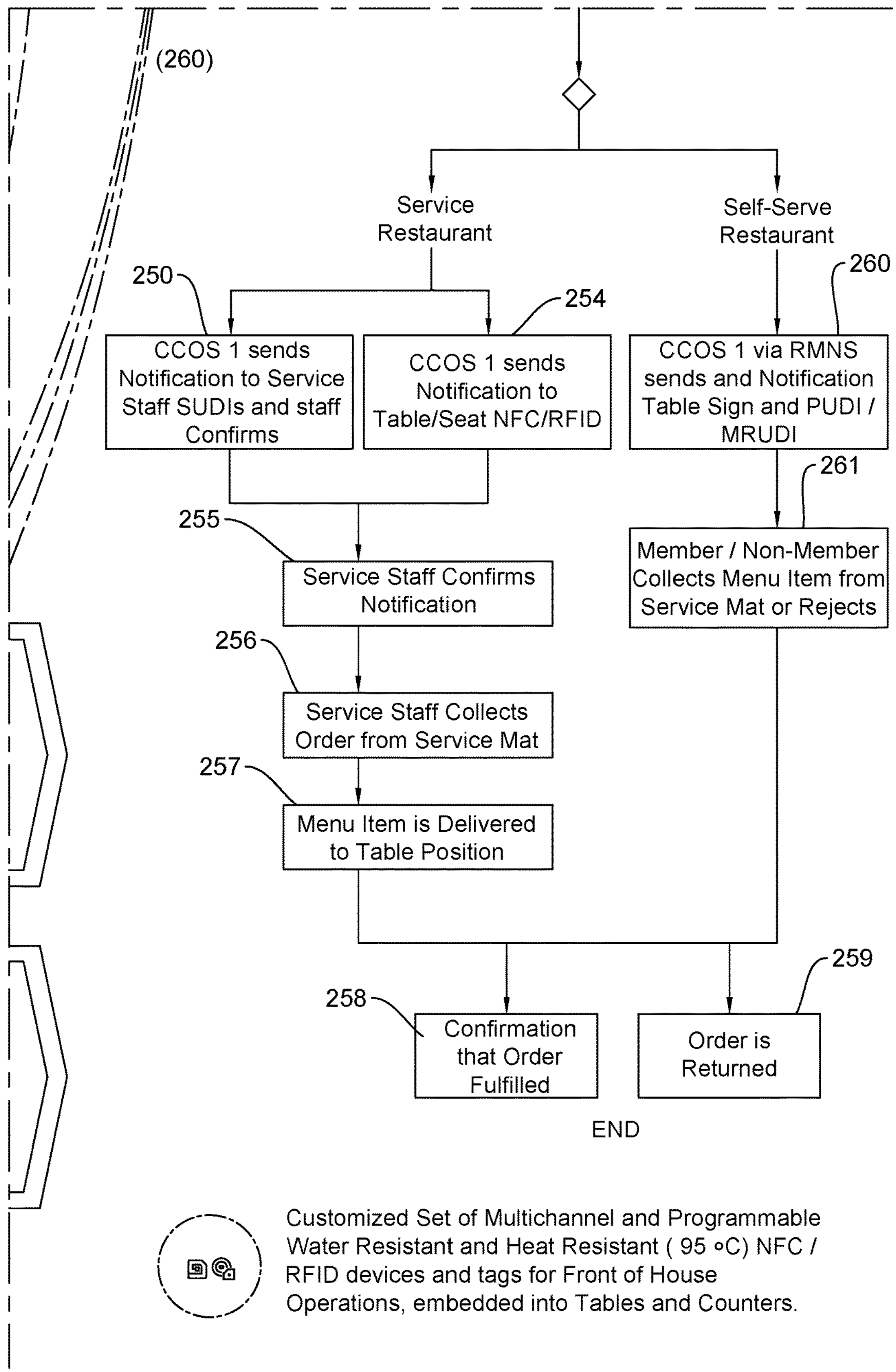
FIG. 5(continuation-part III)

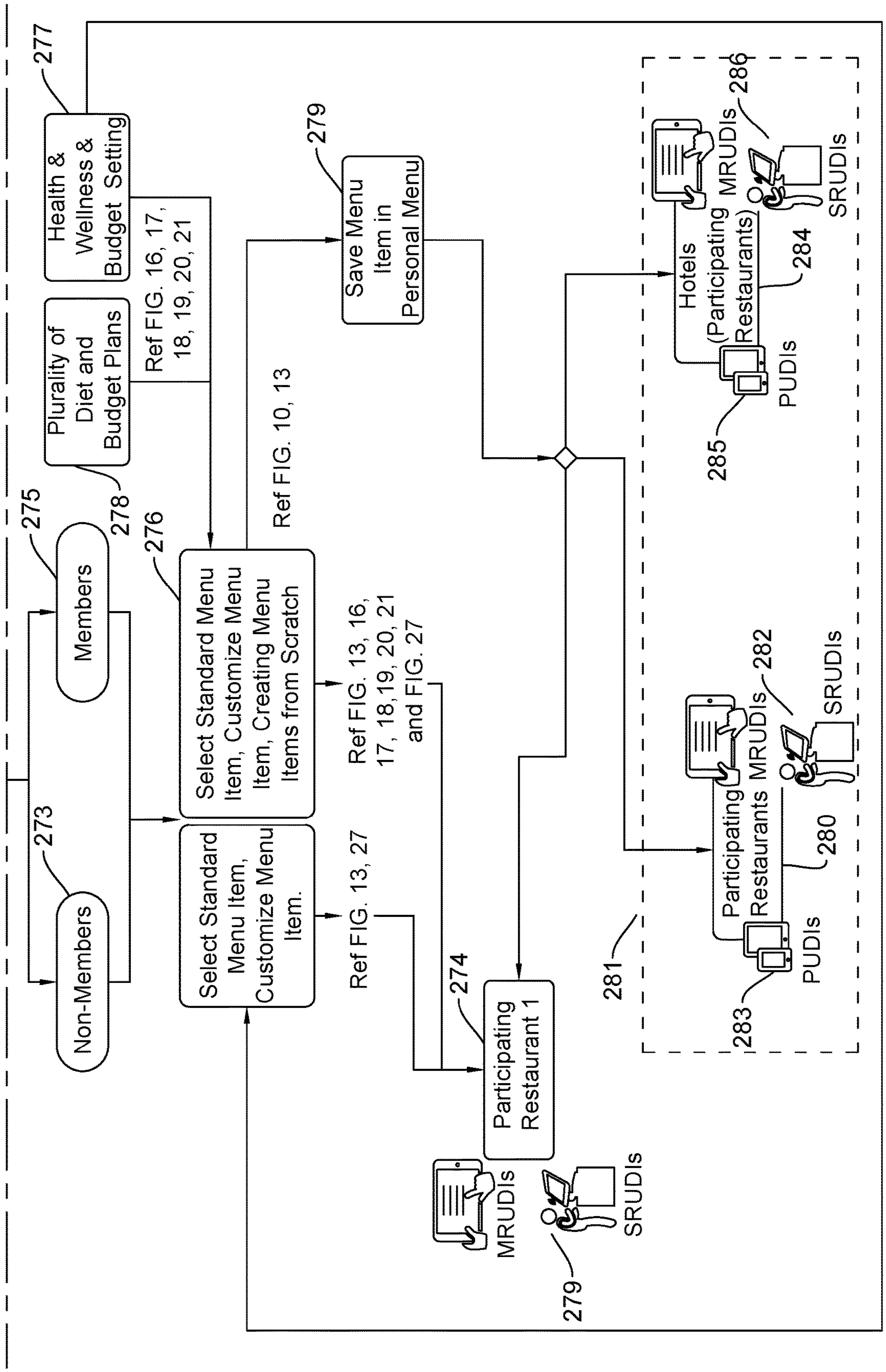
FIG. 6(continuation-part I)

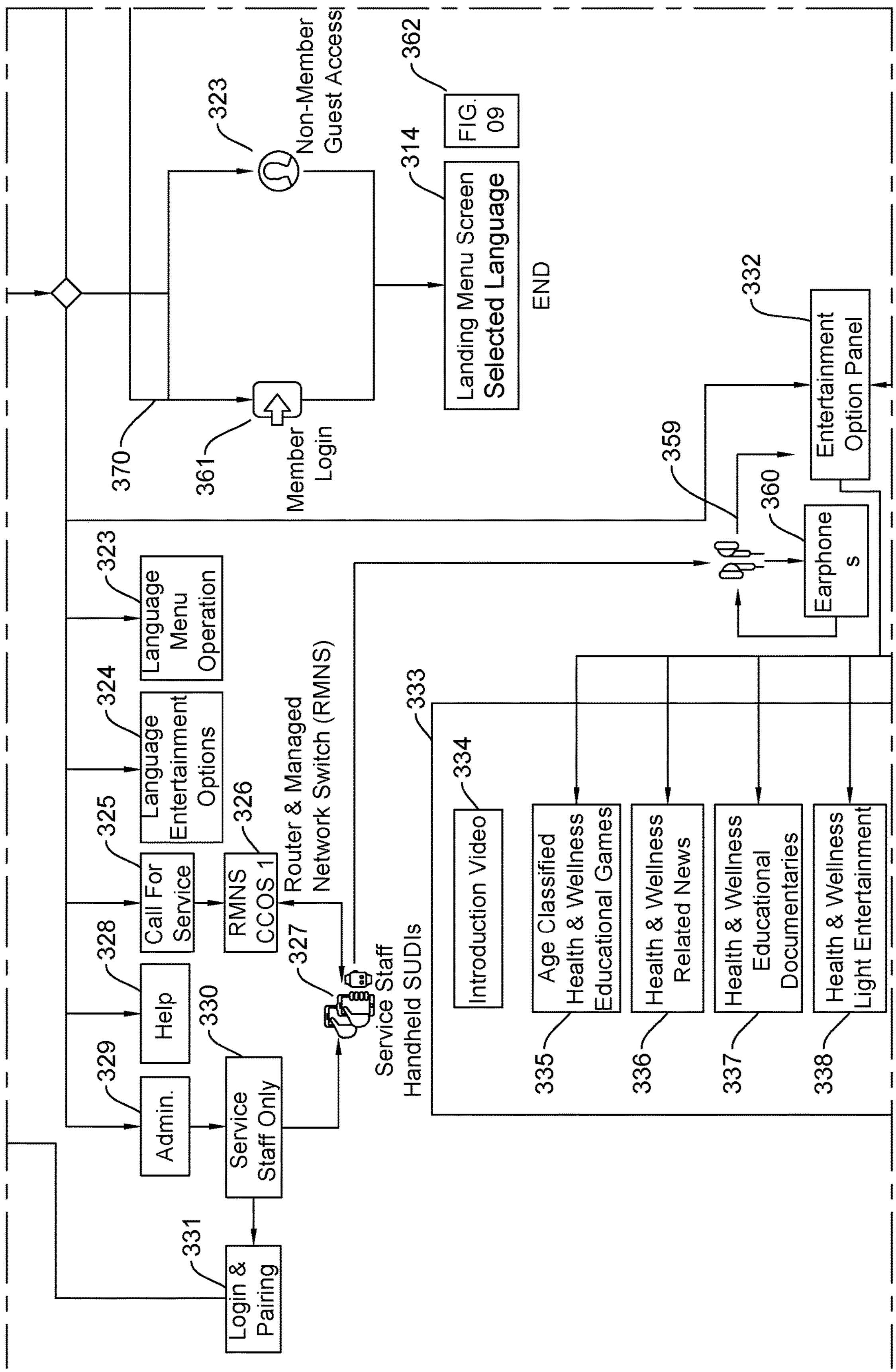
FIG. 8(continuation-part I)

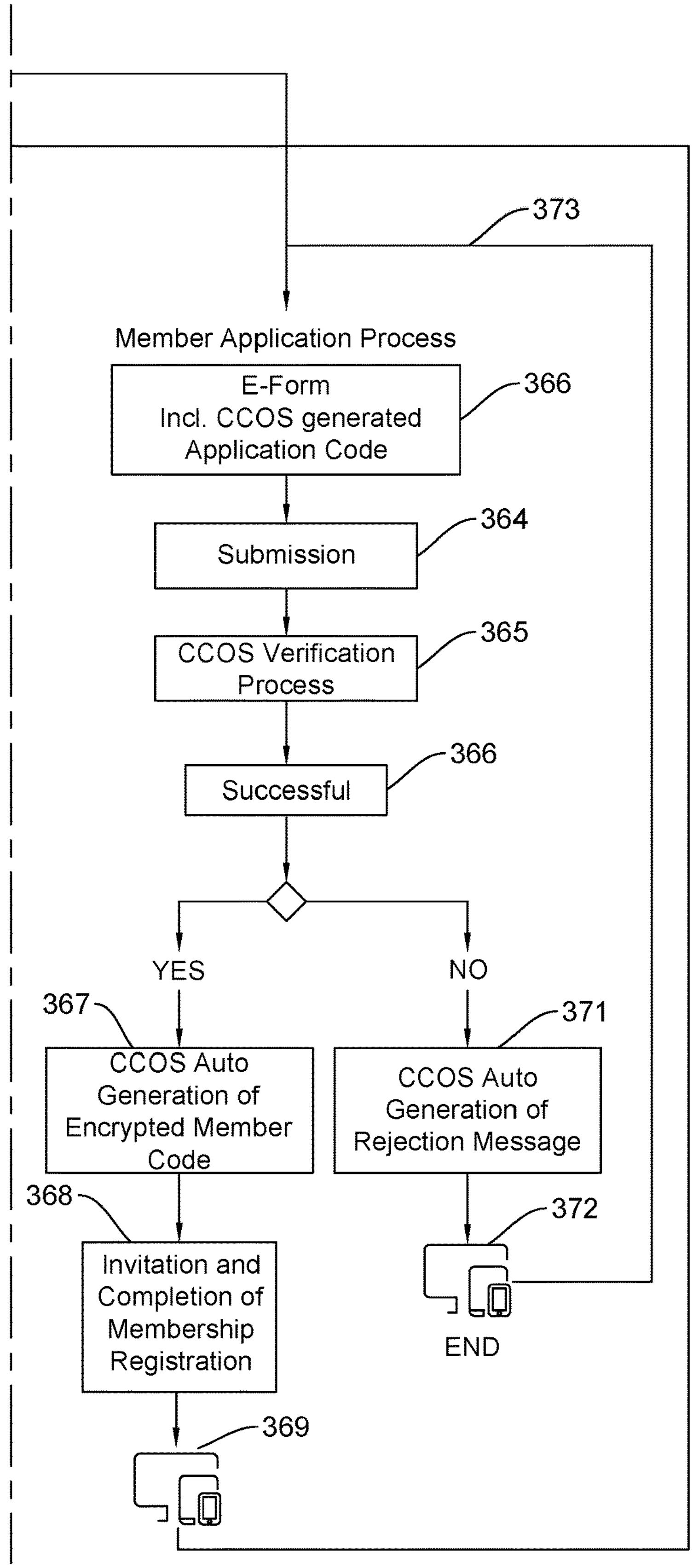
FIG. 8(continuation-part II)

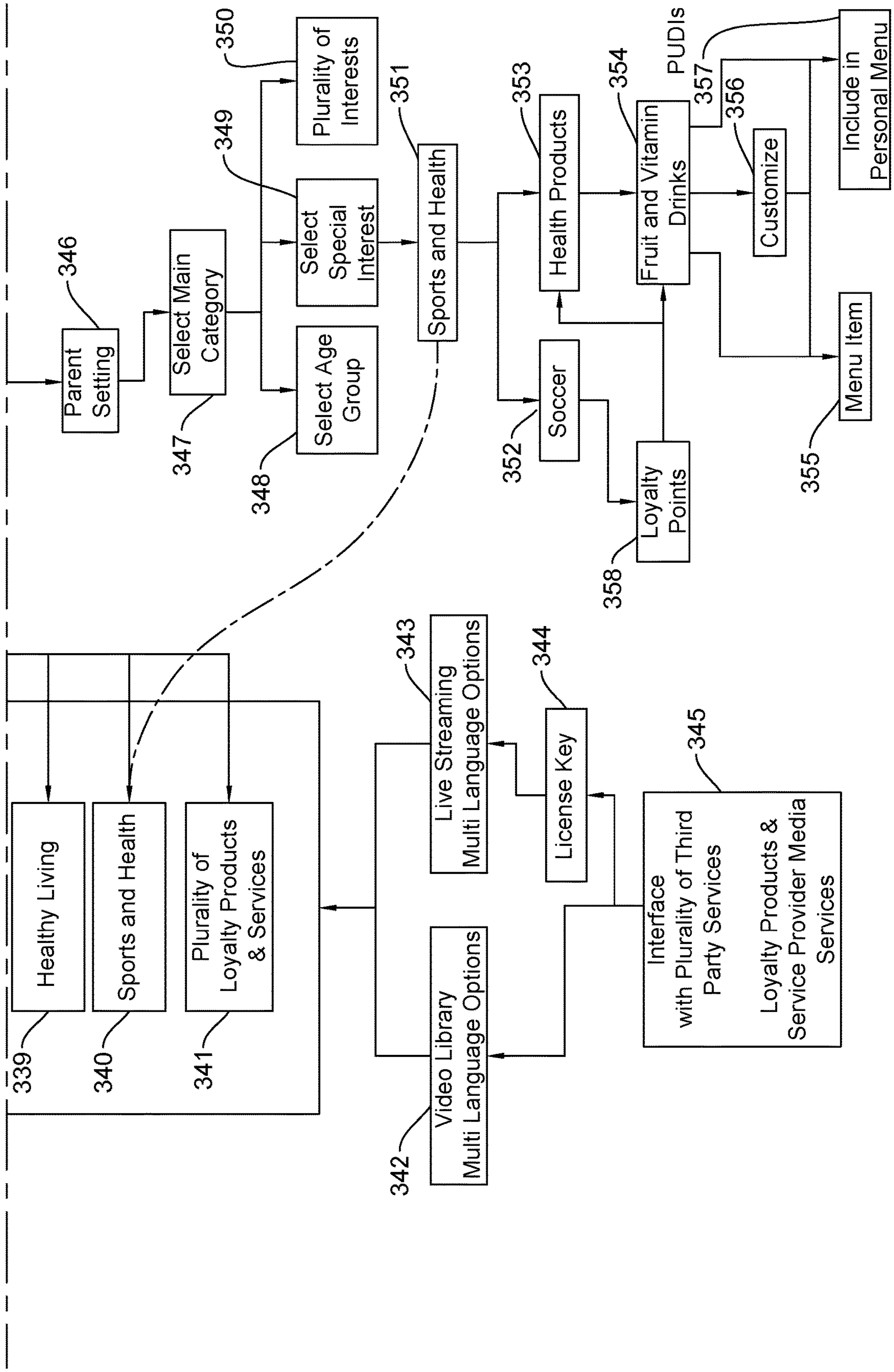
FIG. 8(continuation-part III)

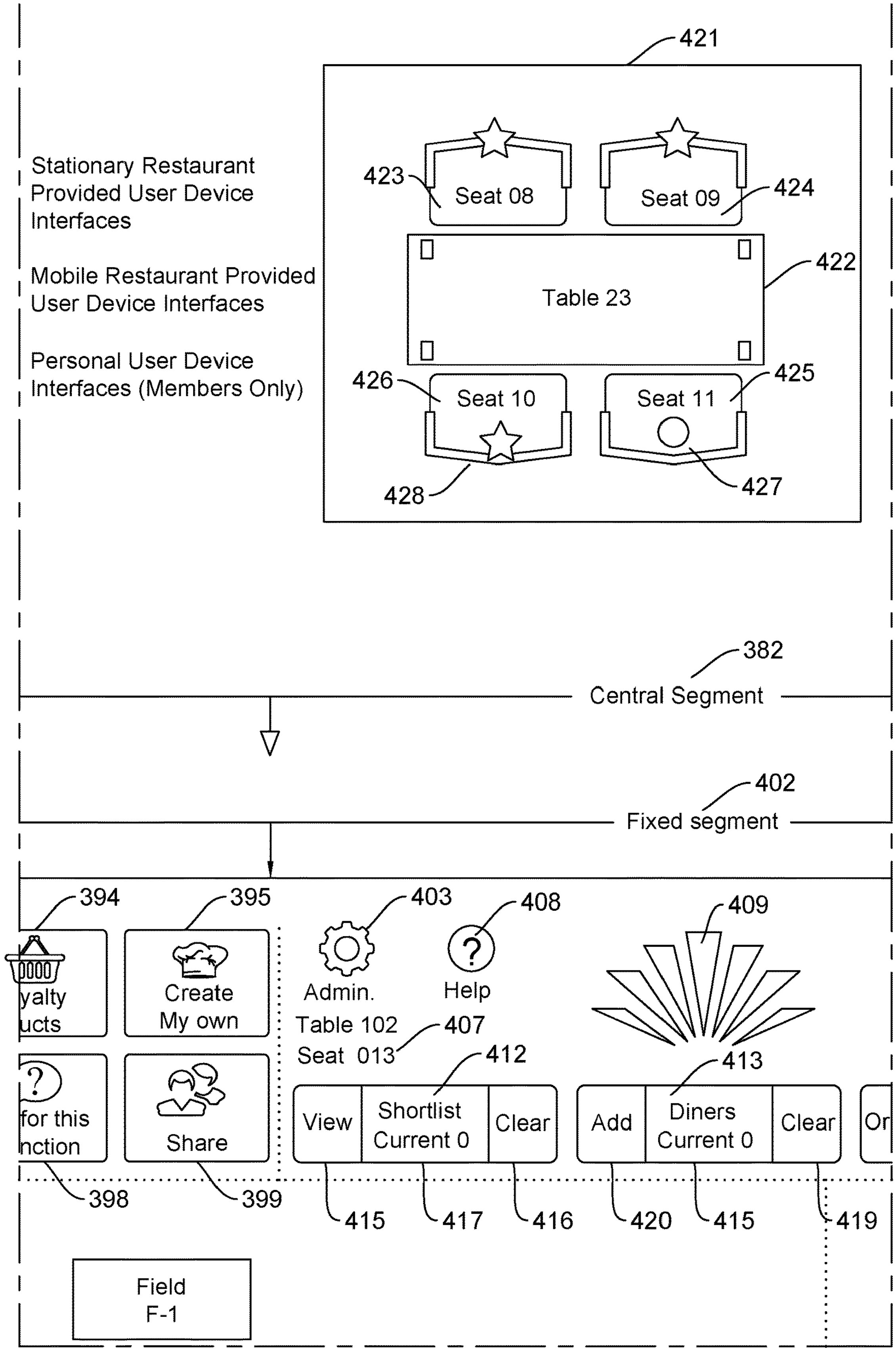
FIG. 9(continuation-part I)

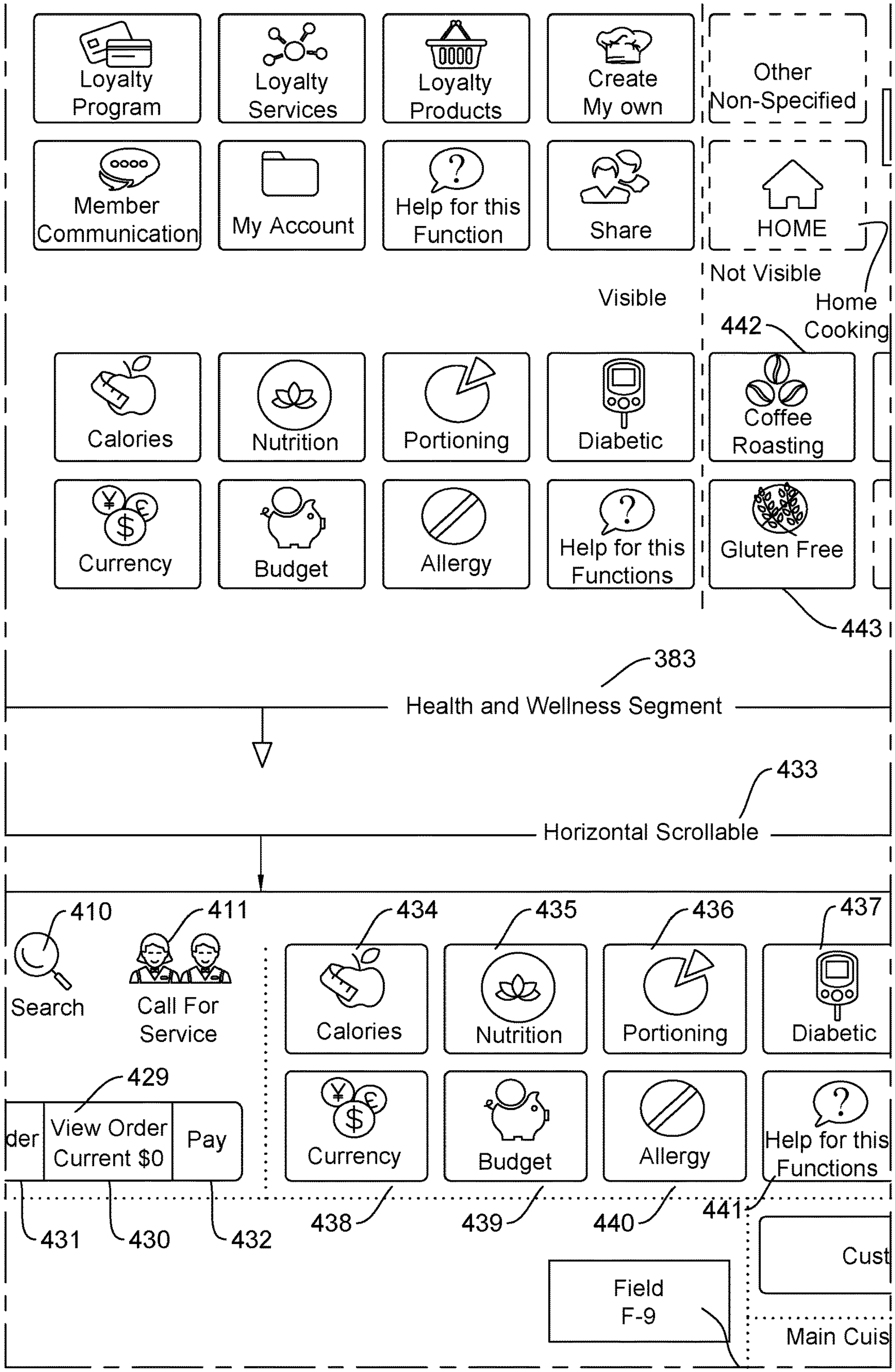
FIG. 9(continuation-part II)

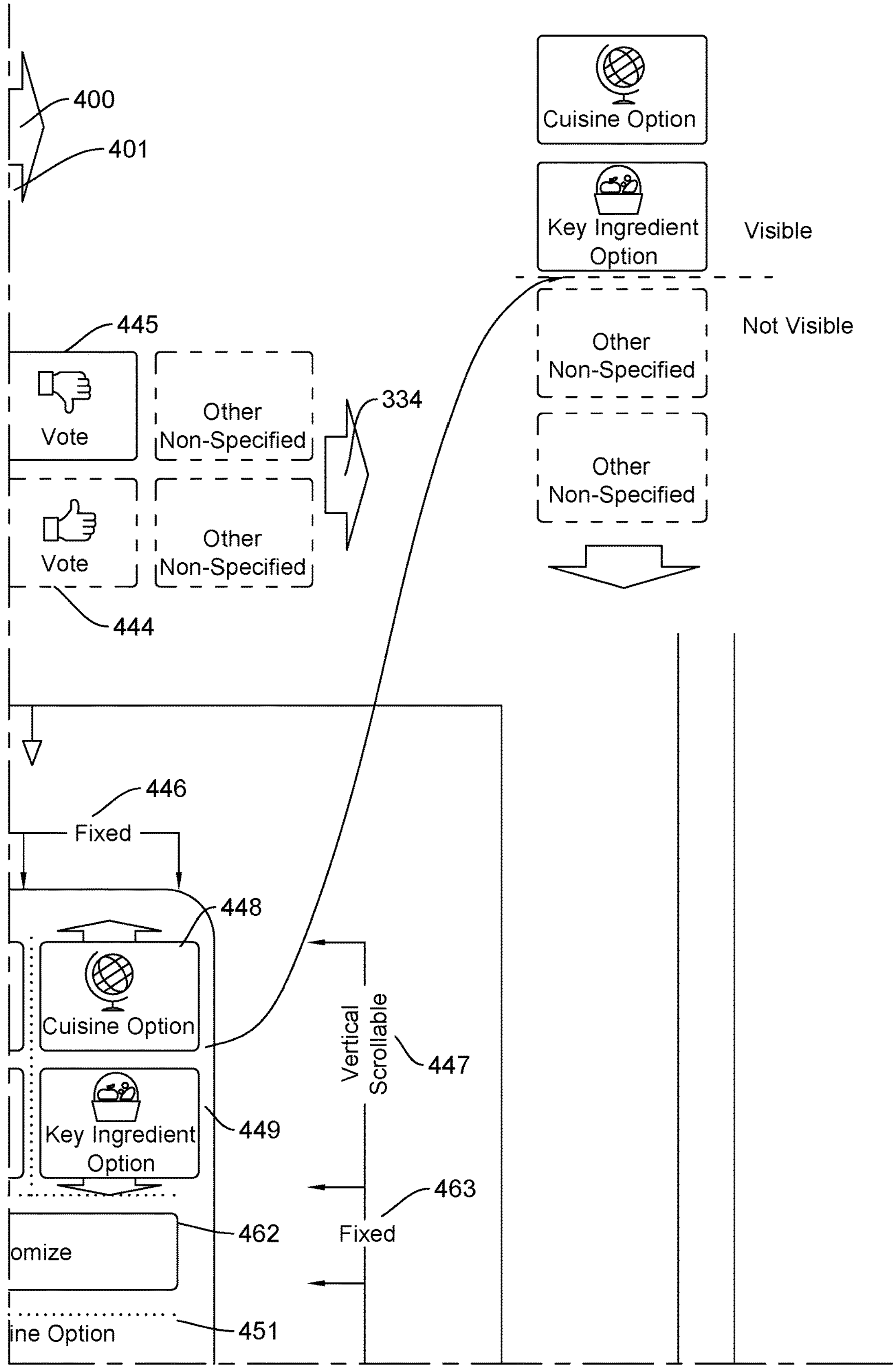
FIG. 9(continuation-part III)

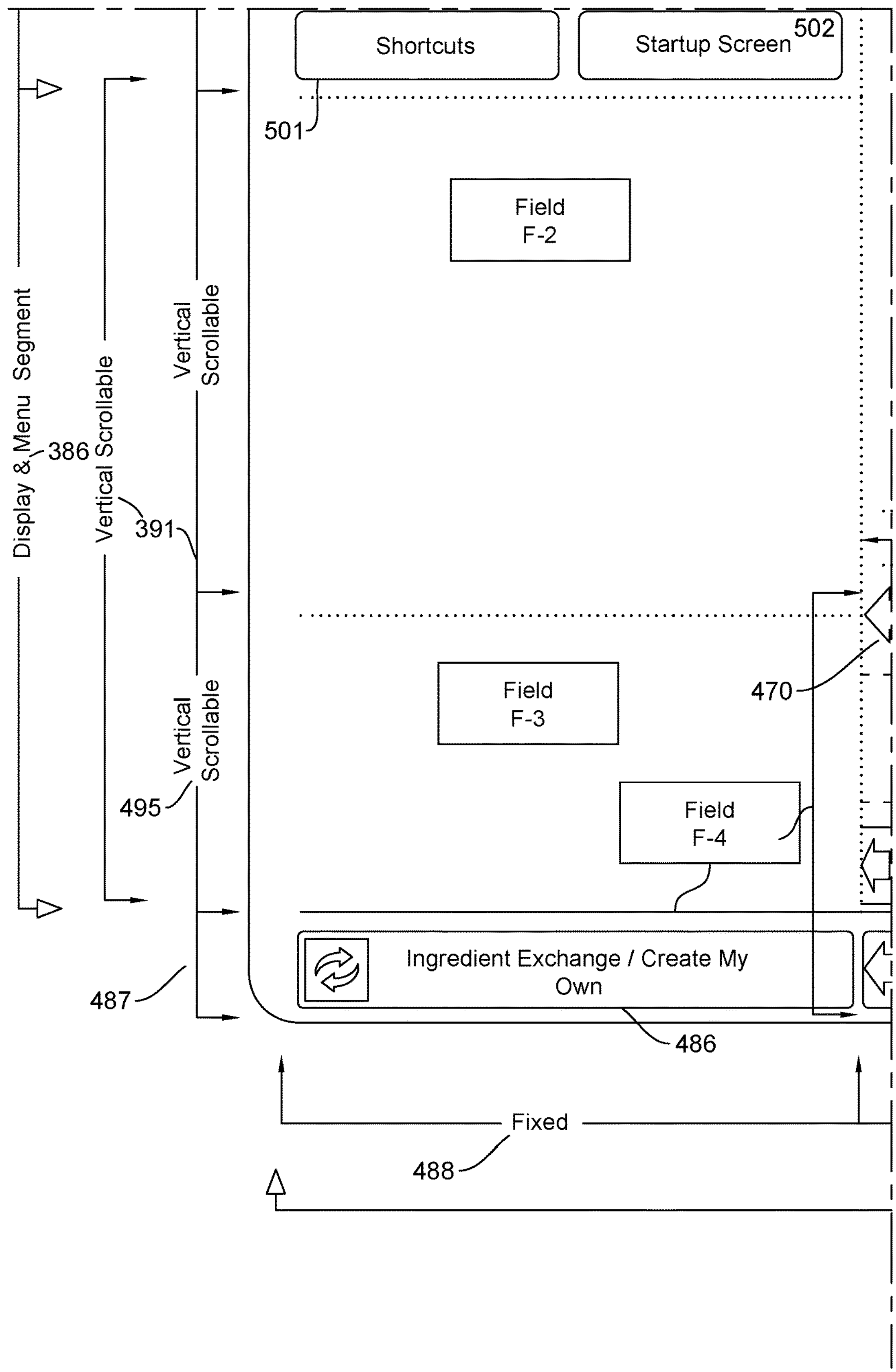
FIG. 9(continuation-part IV)

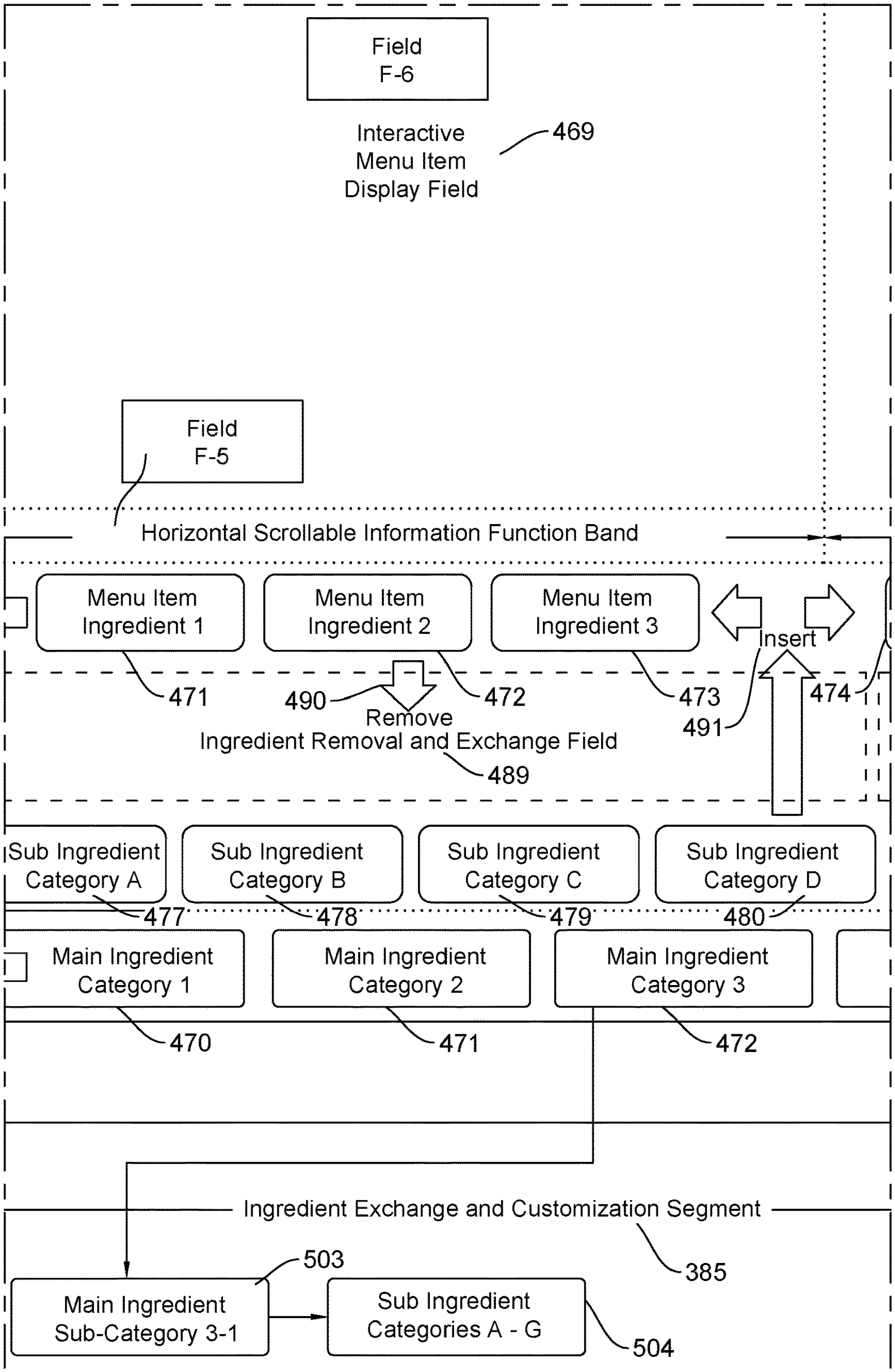
FIG. 9(continuation-part V)

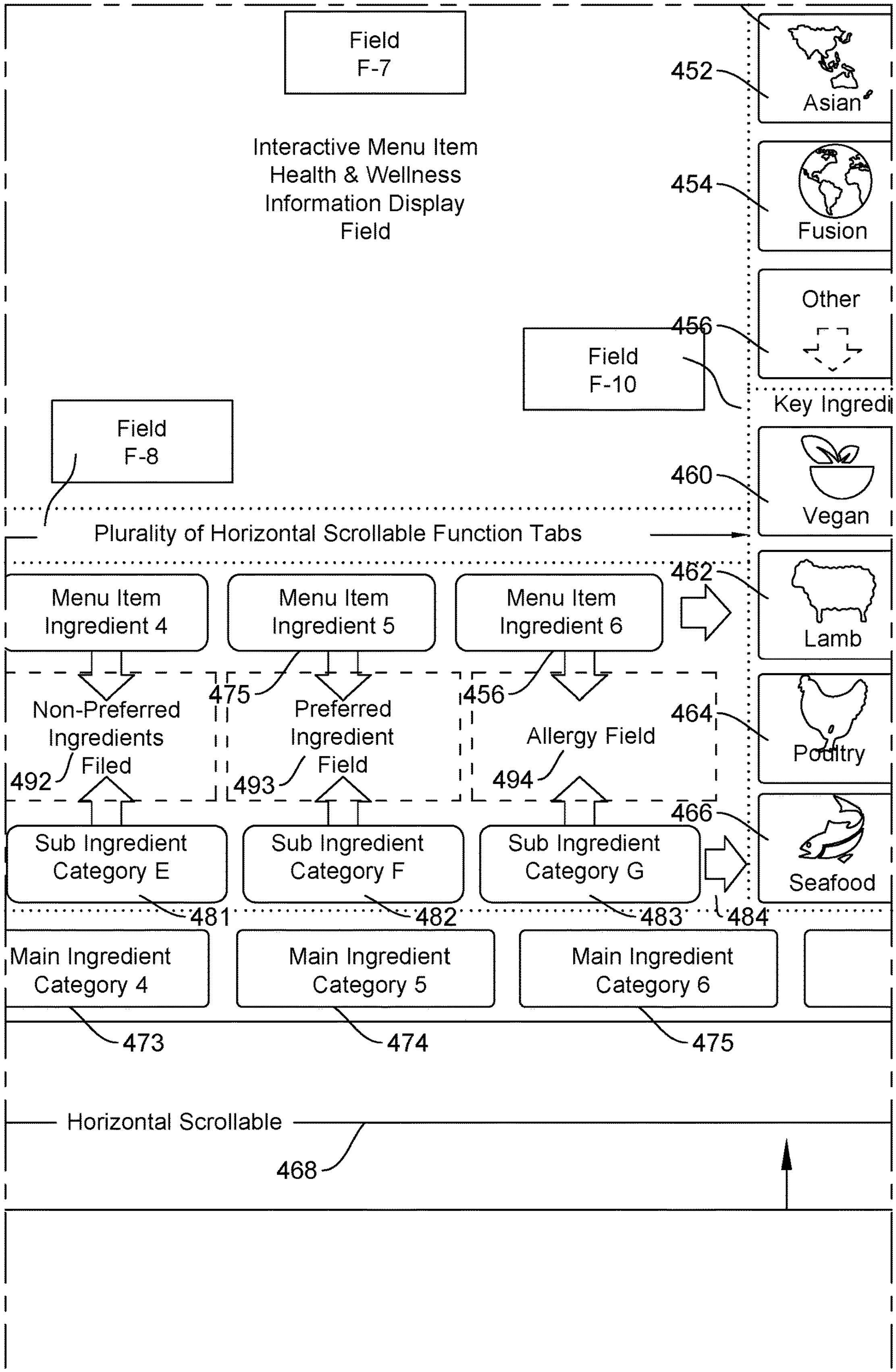
FIG. 9(continuation-part VI)

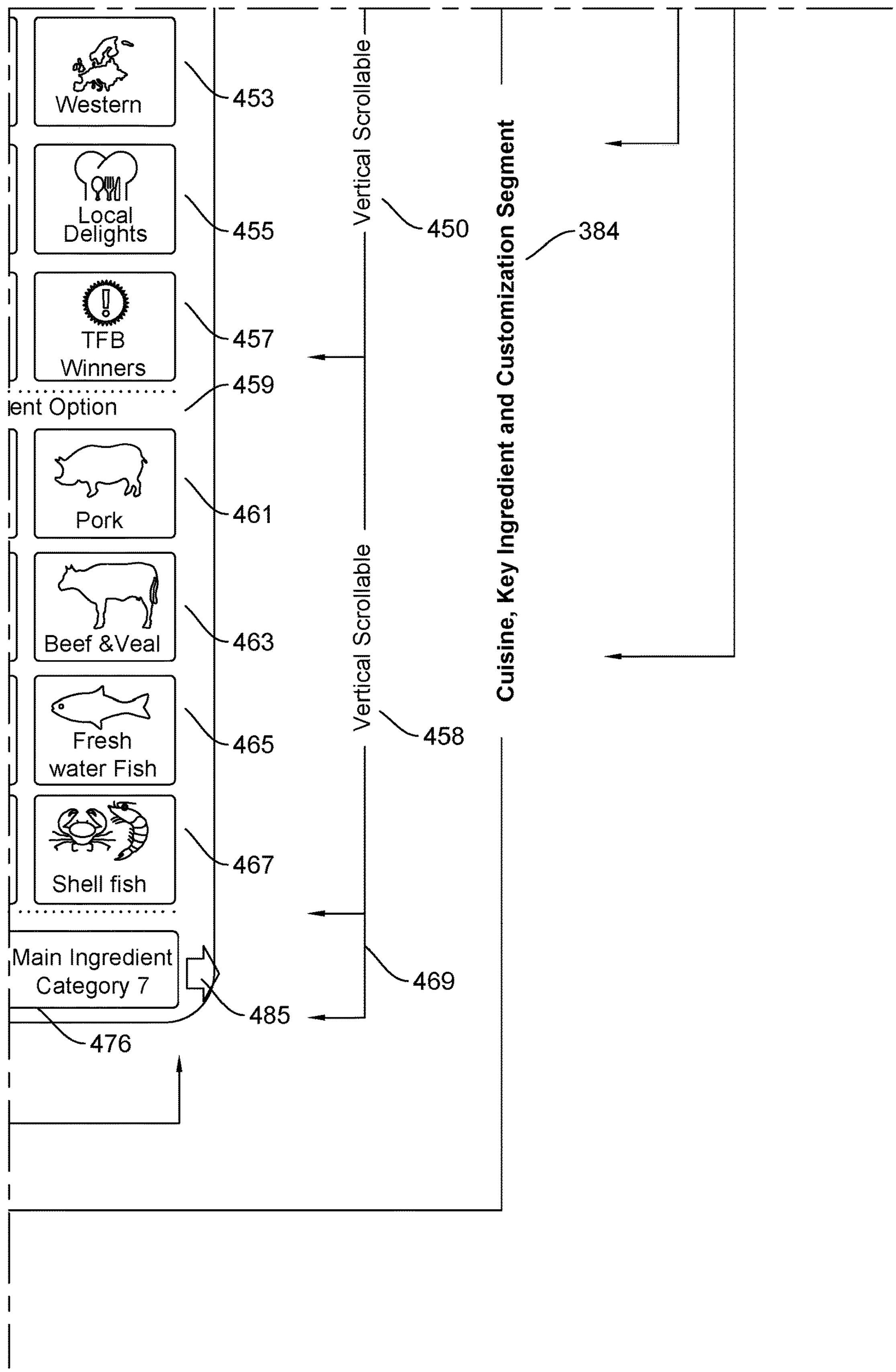
FIG. 9(continuation-part VII)

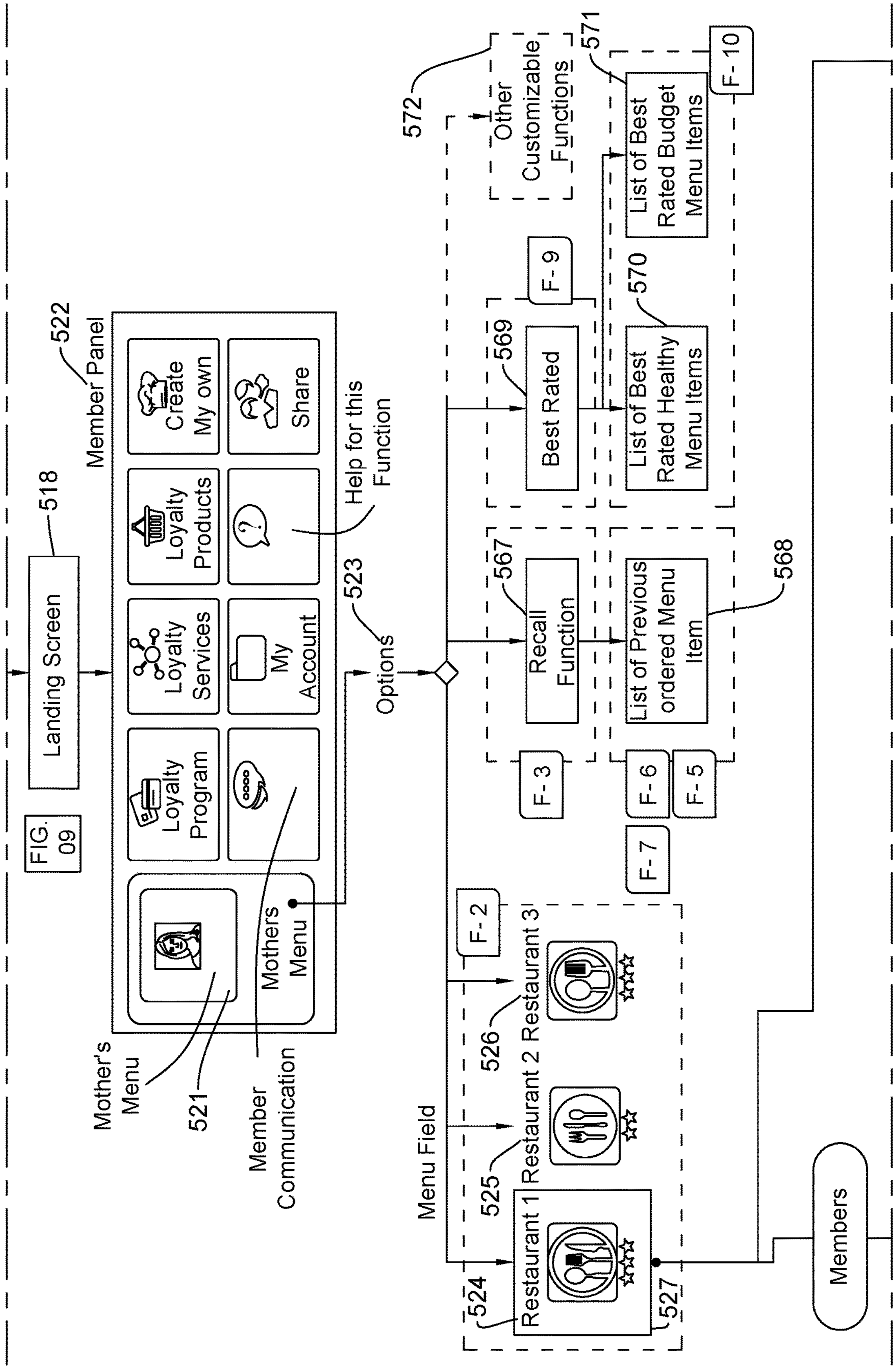
FIG. 10(continuation-part I)

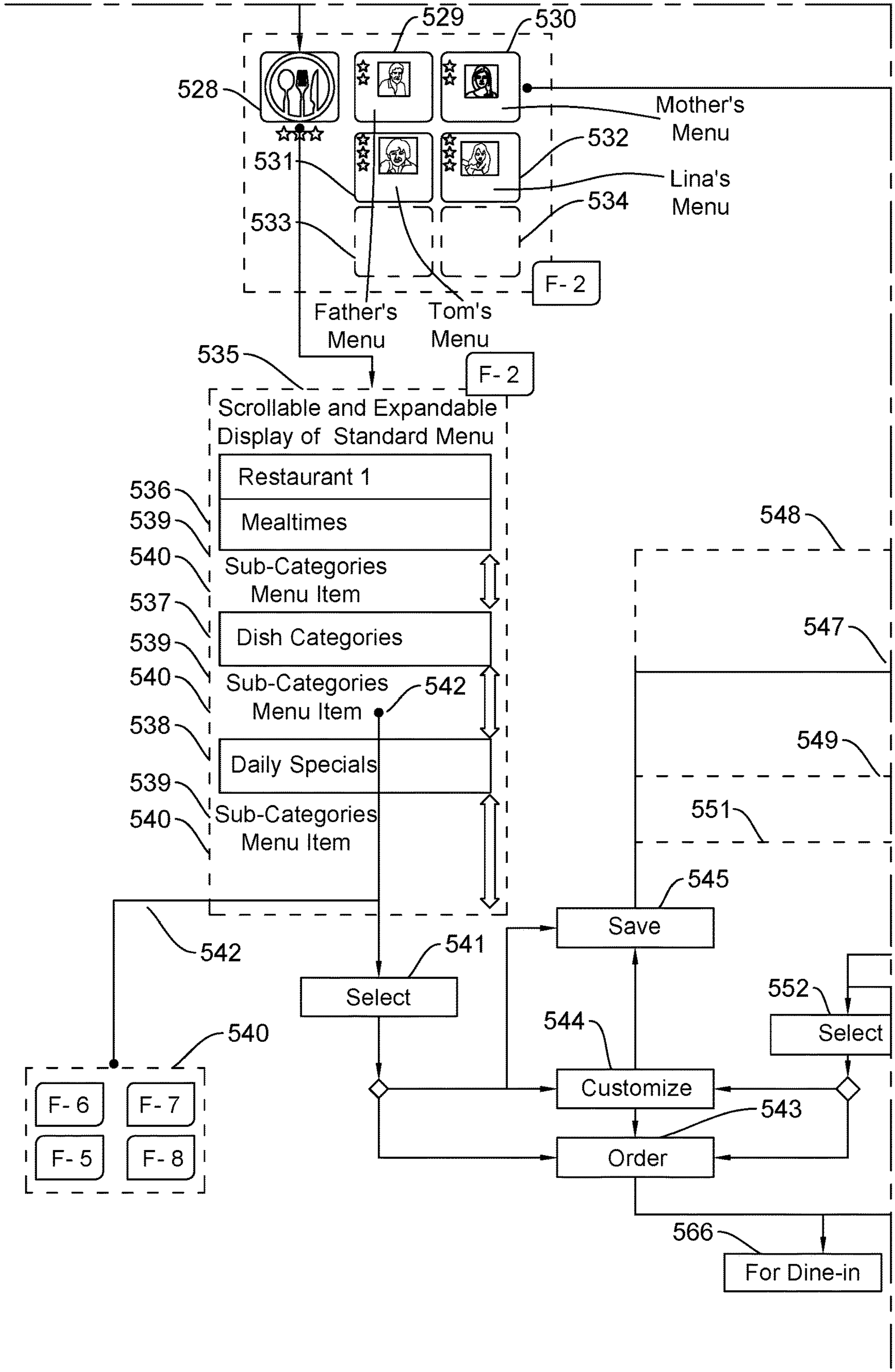
FIG. 10(continuation-part II)

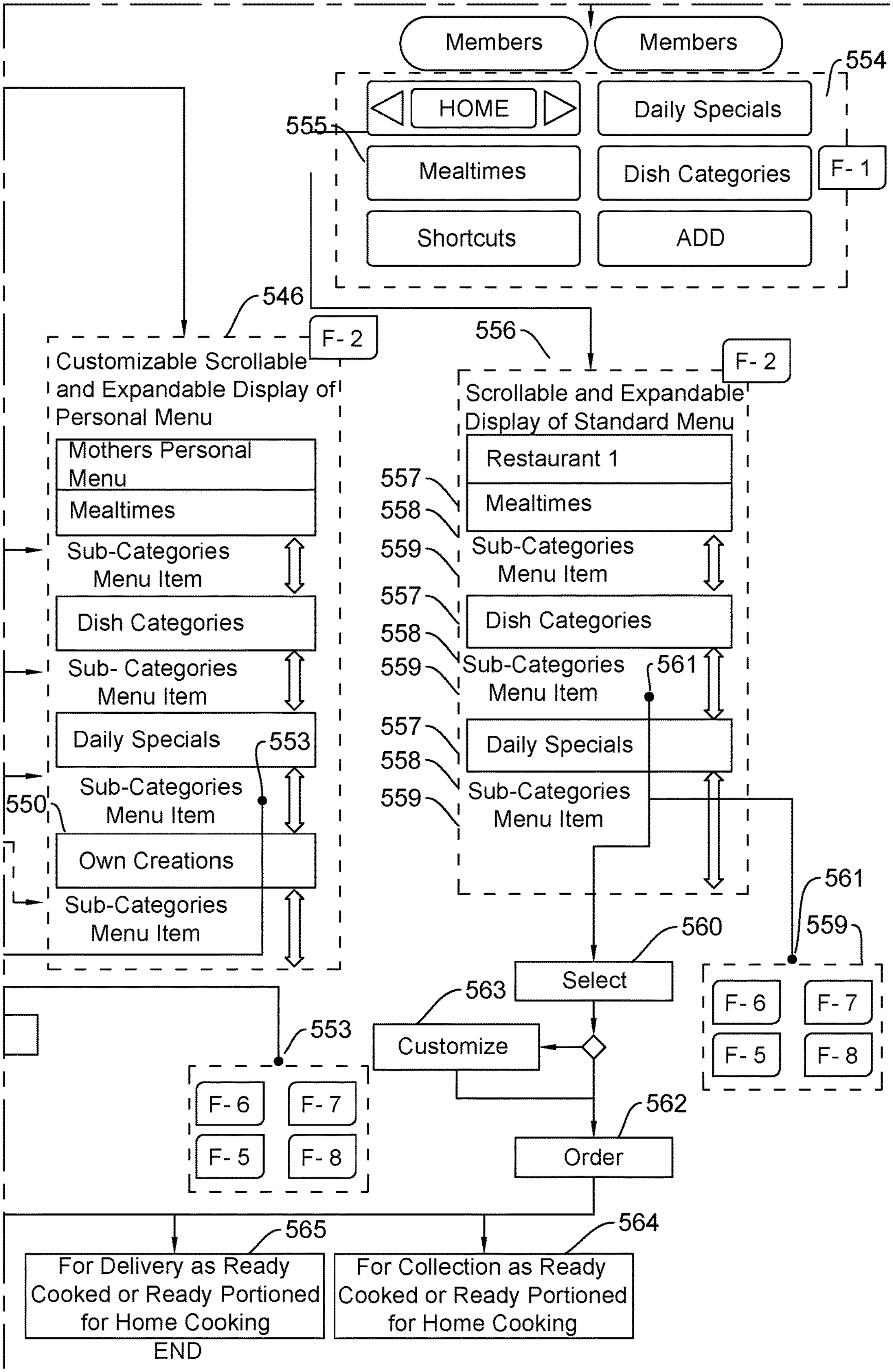
FIG. 10(continuation-part III)

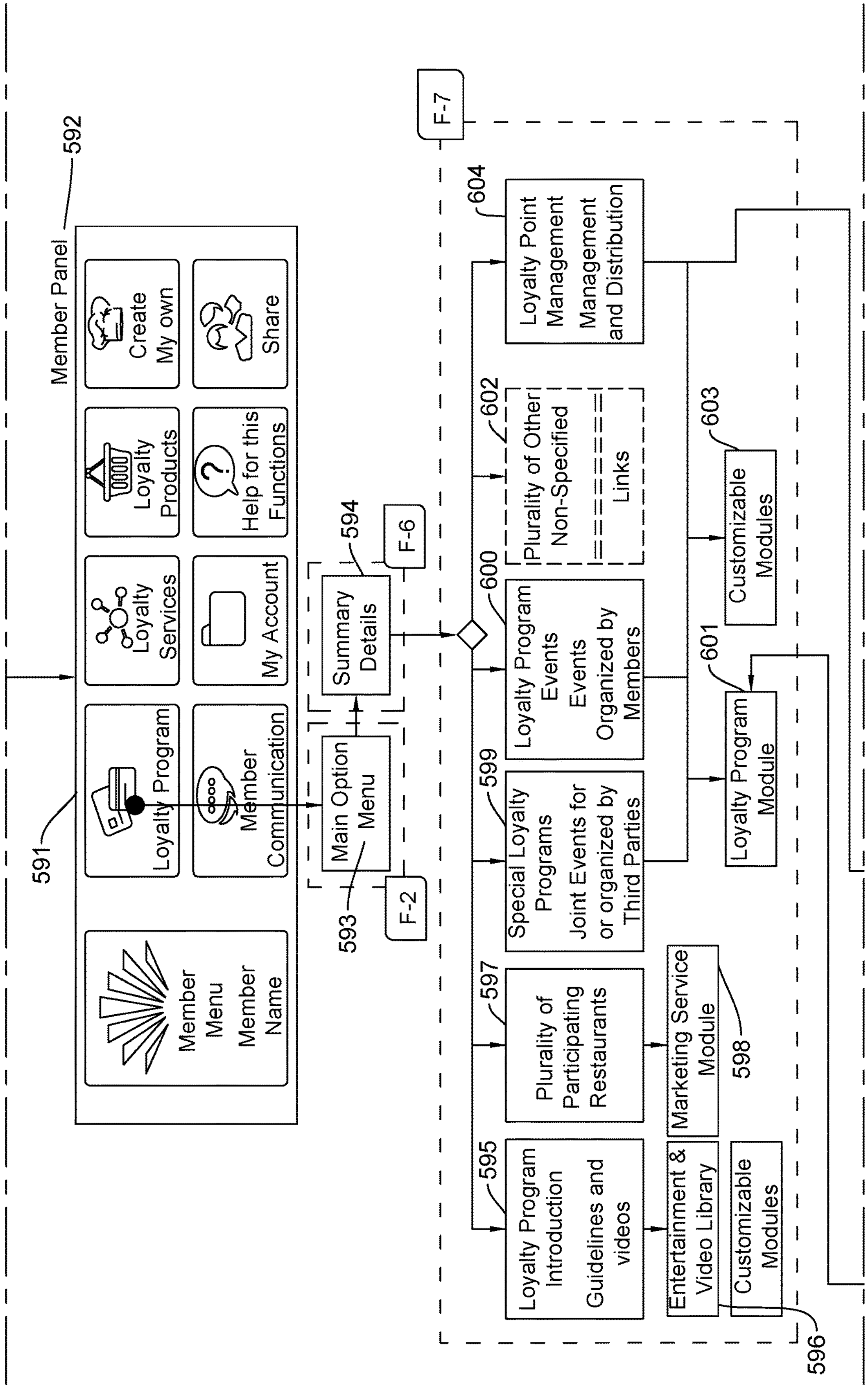
FIG. 11(continuation-part I)

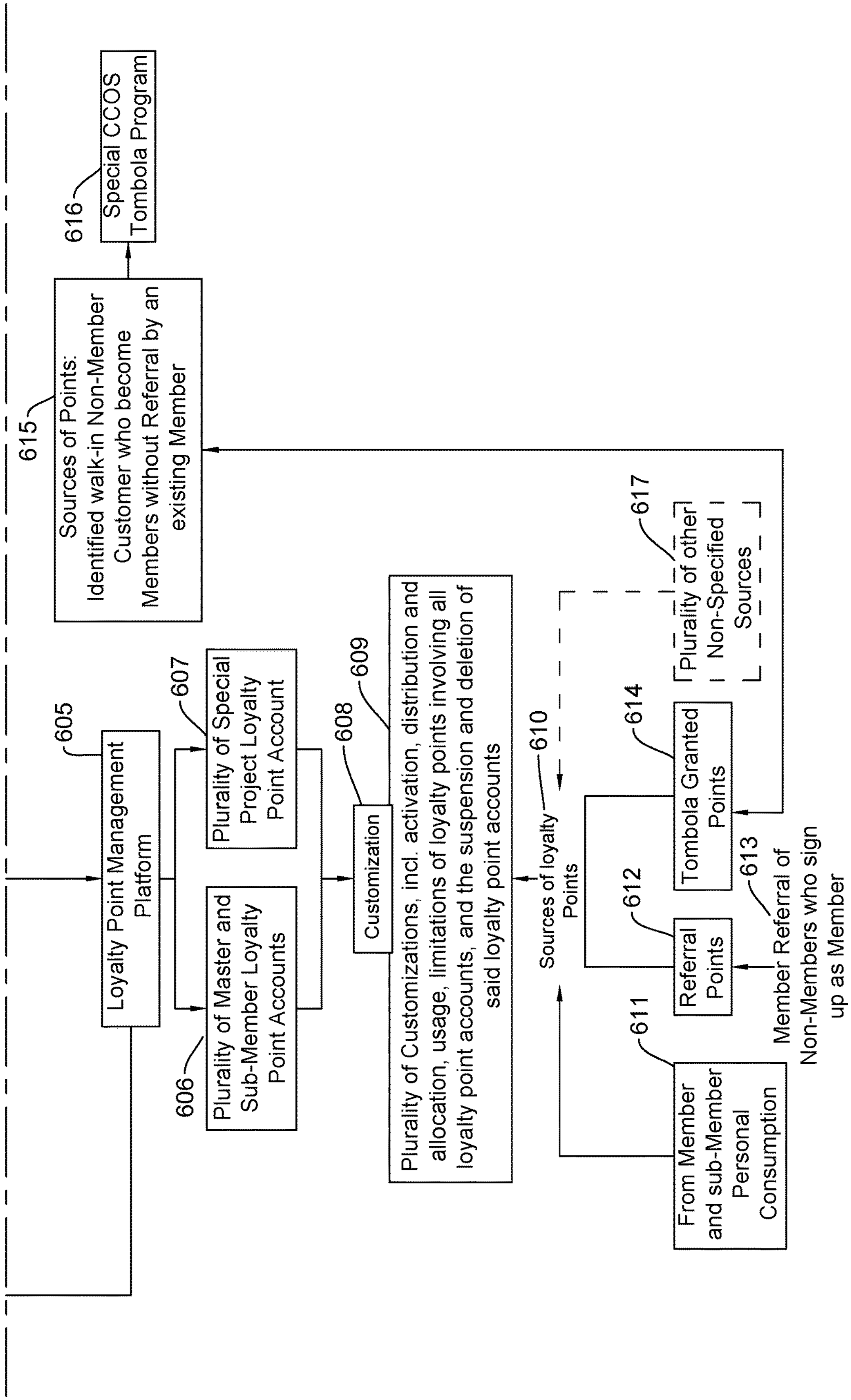
FIG. 11(continuation-part II)

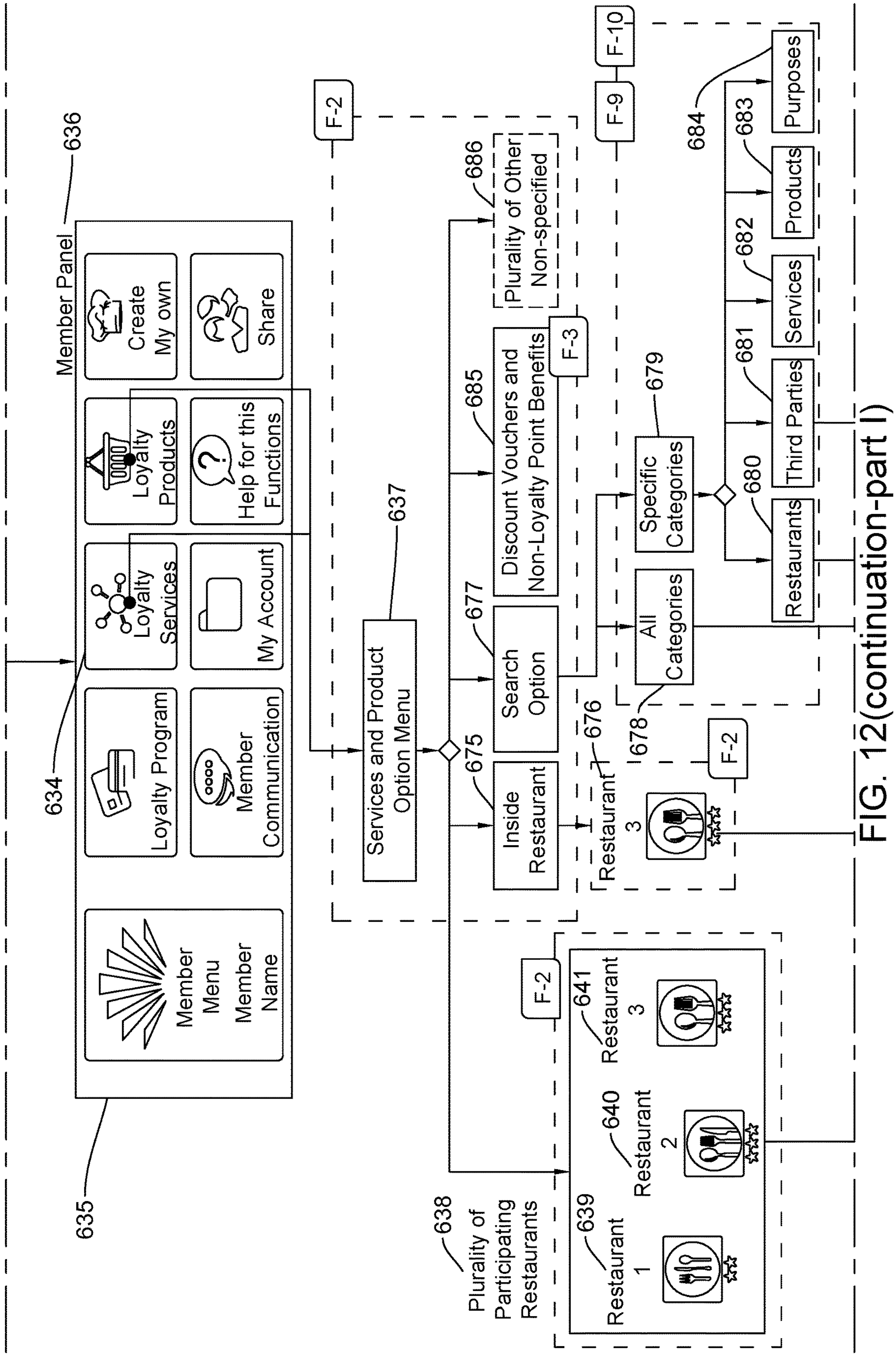
FIG. 12(continuation-part I)

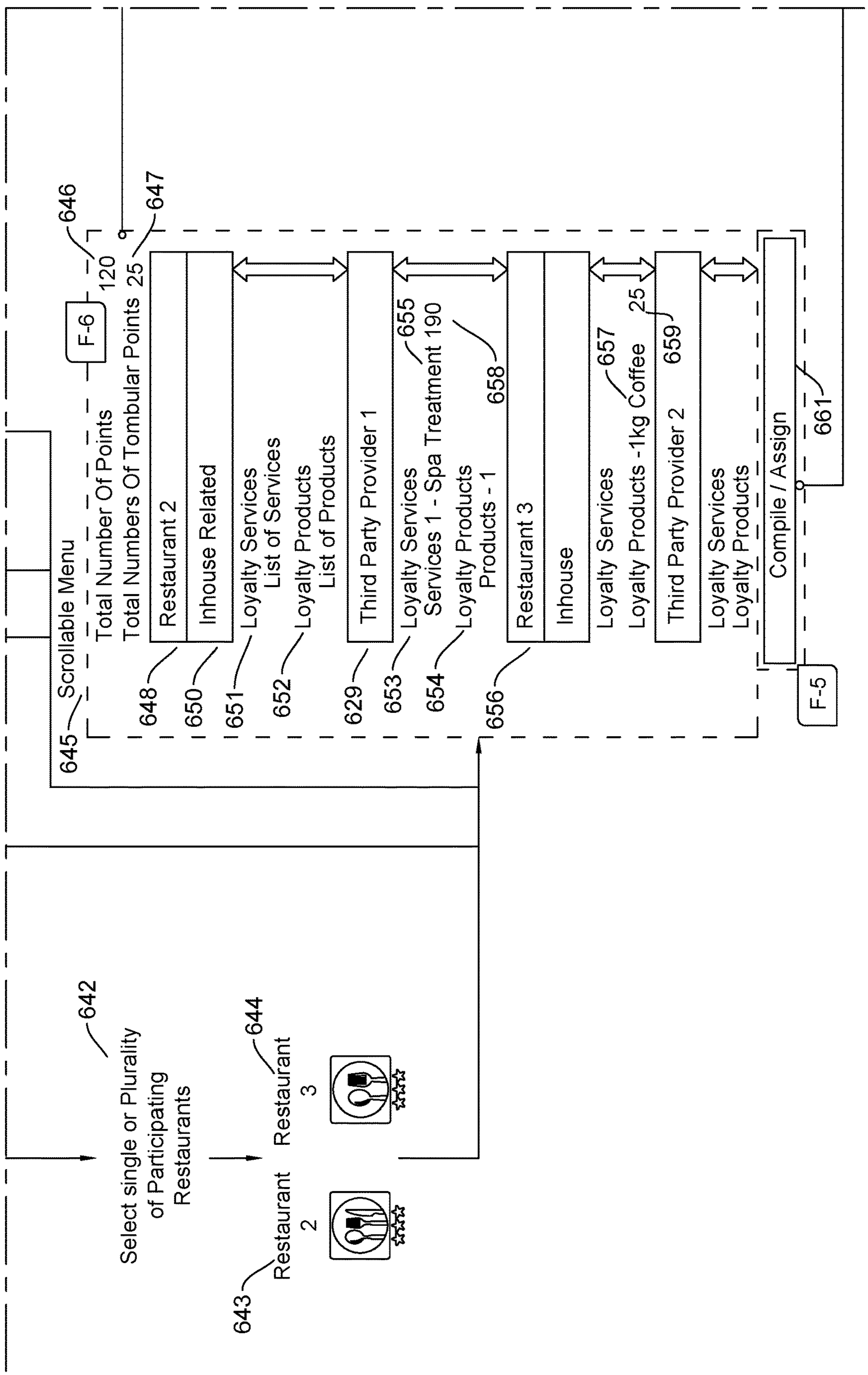
FIG. 12(continuation-part II)

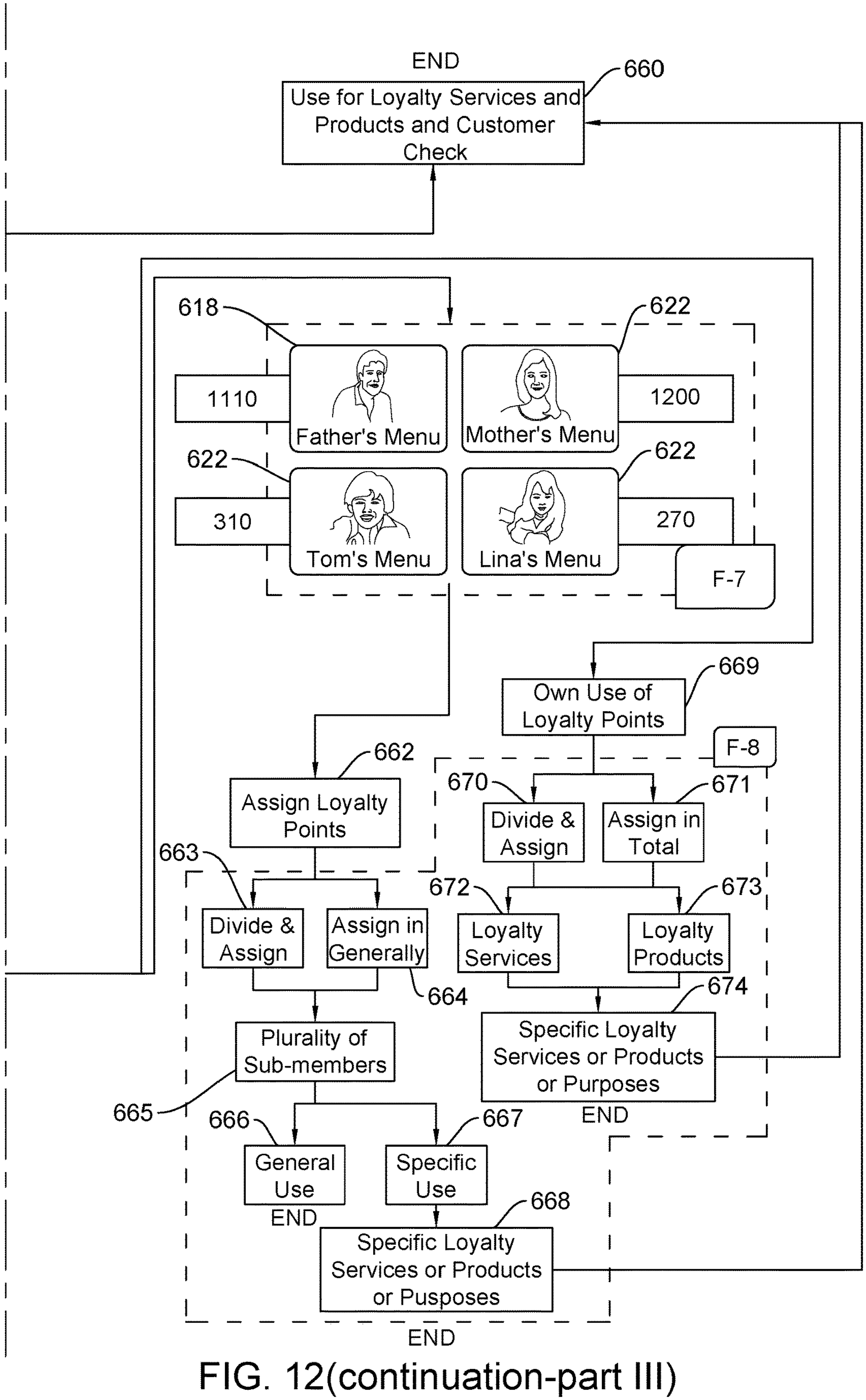
FIG. 12(continuation-part III)

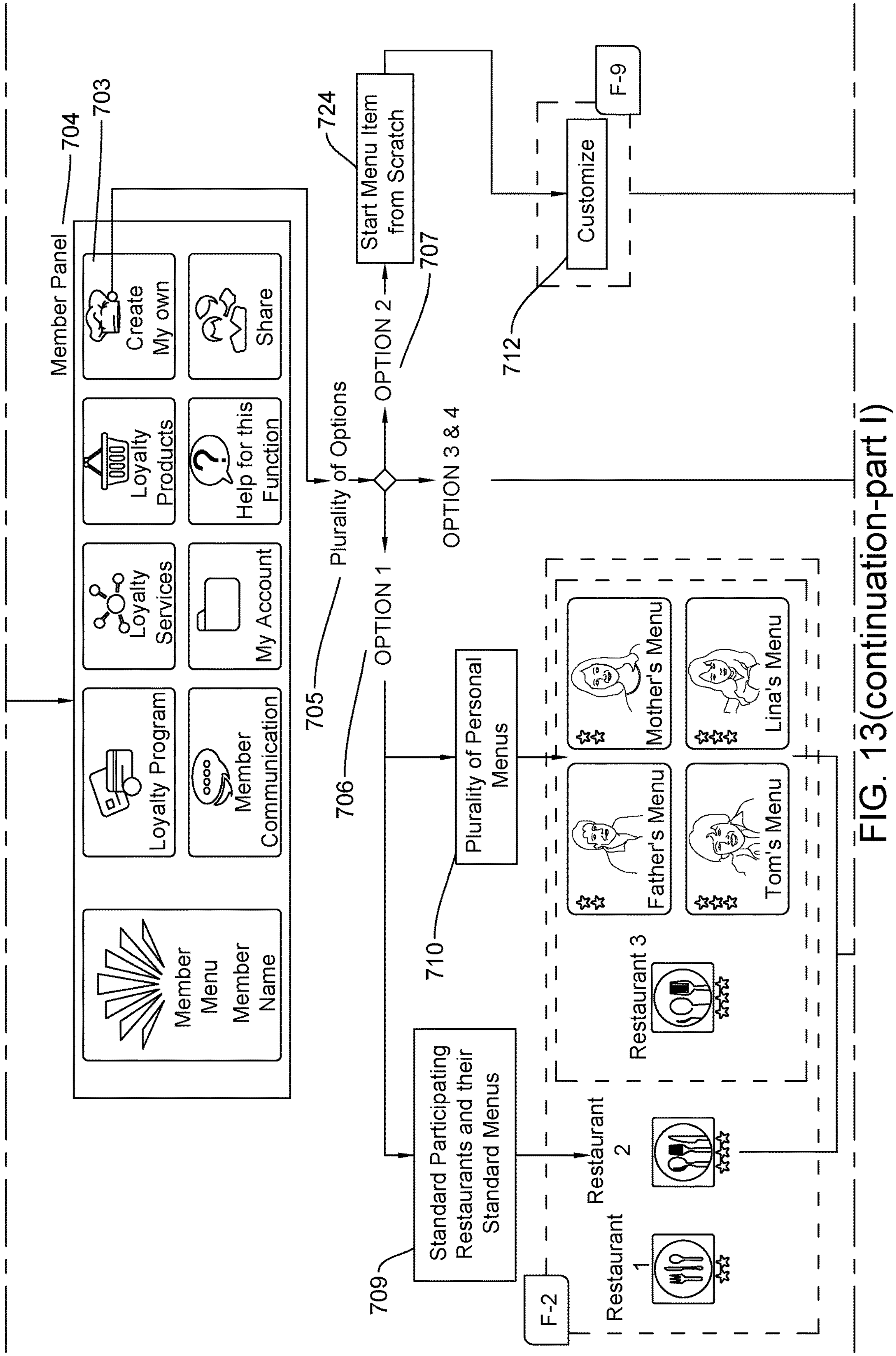
FIG. 13(continuation-part I)

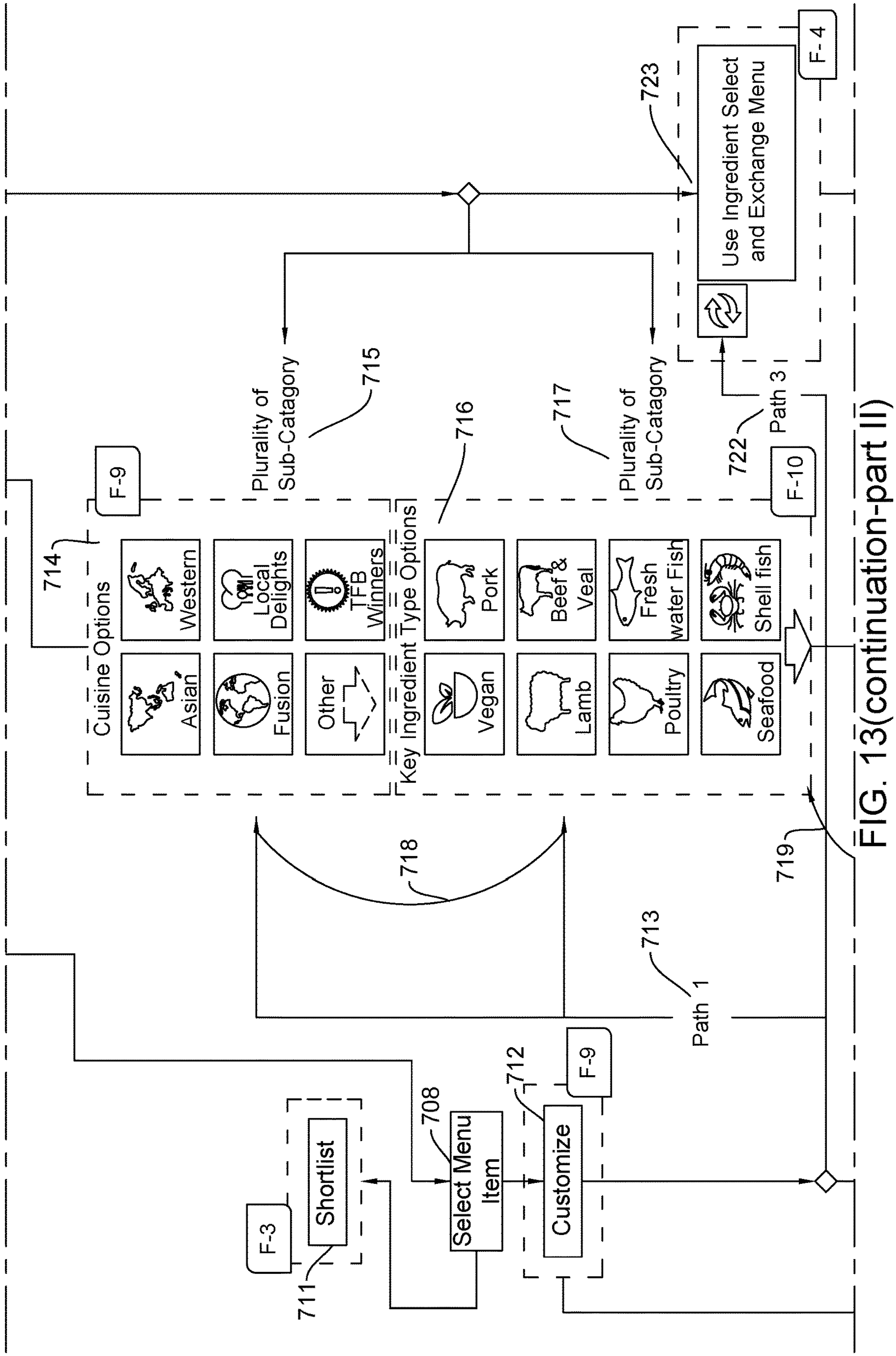
FIG. 13(continuation-part II)

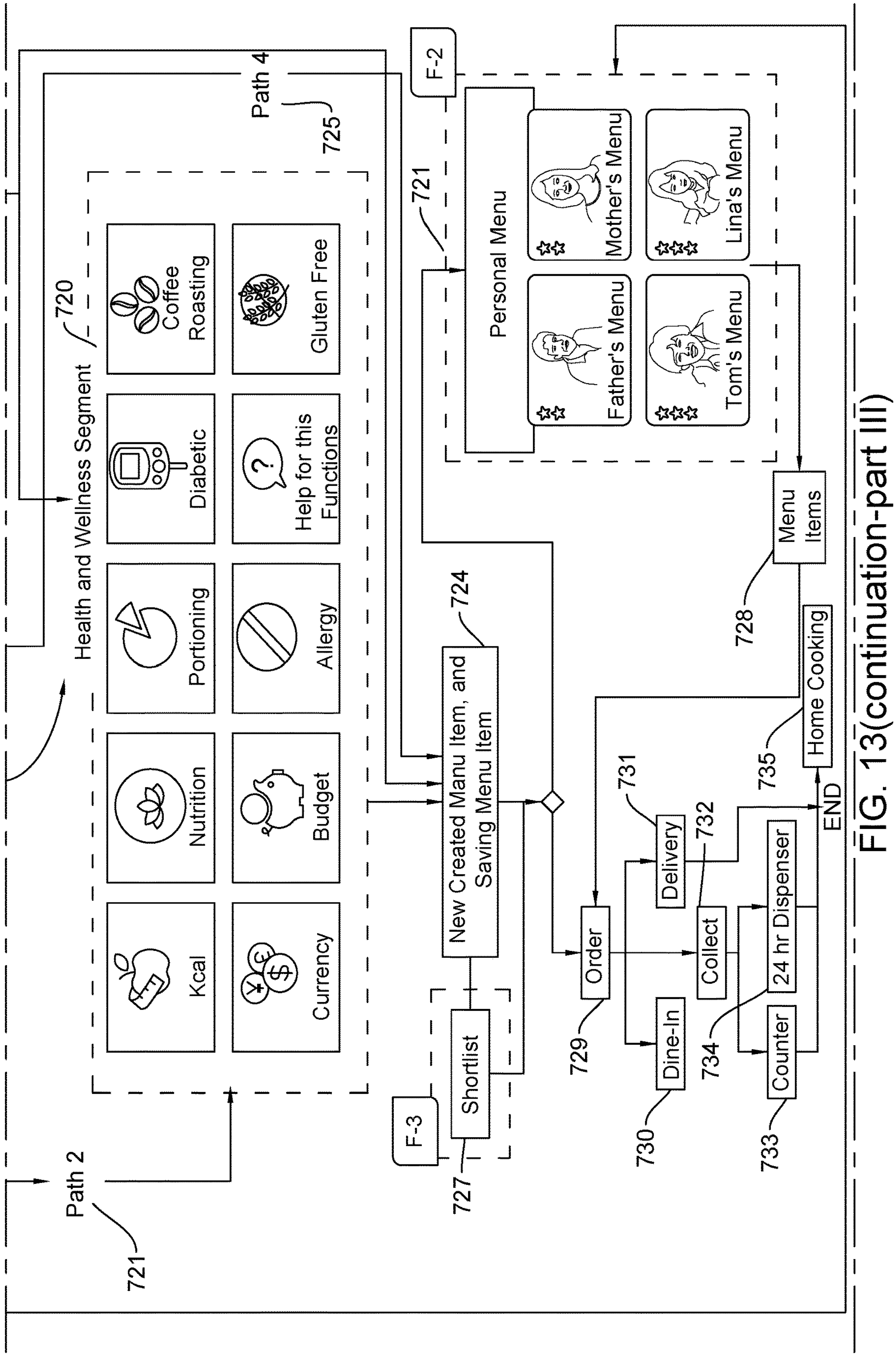
FIG. 13(continuation-part III)

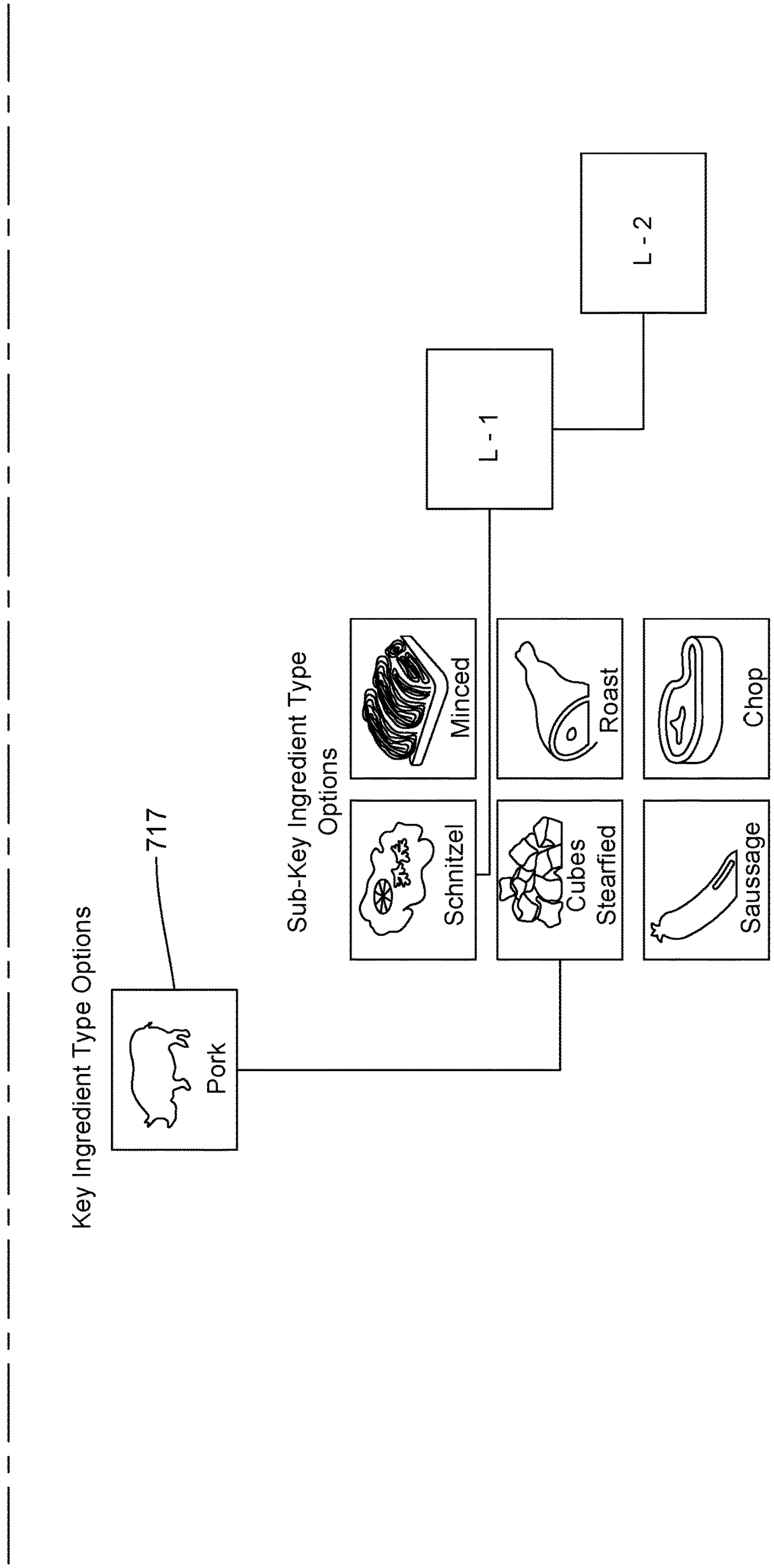
FIG. 13(continuation-part IV)

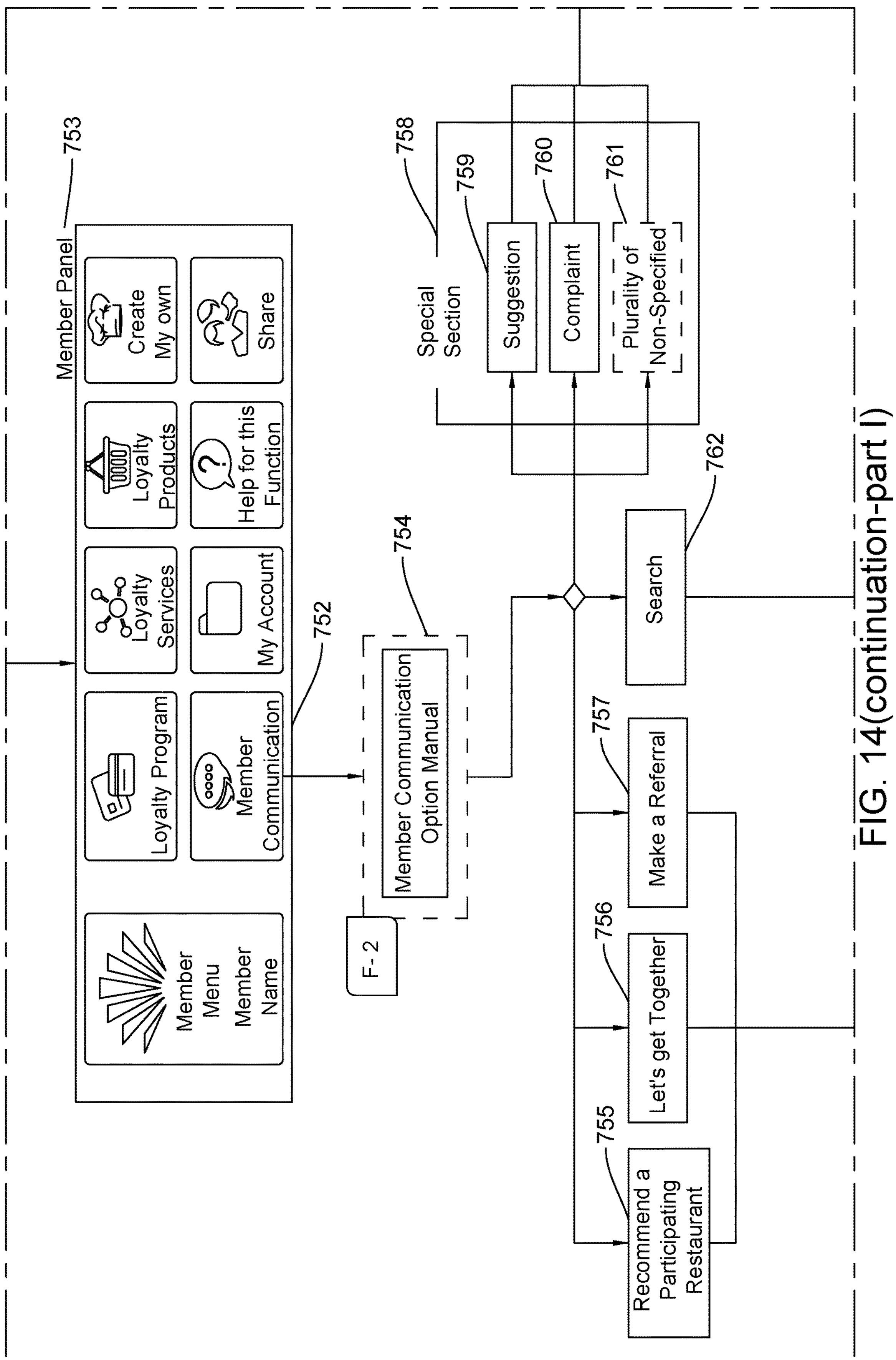
FIG. 14(continuation-part I)

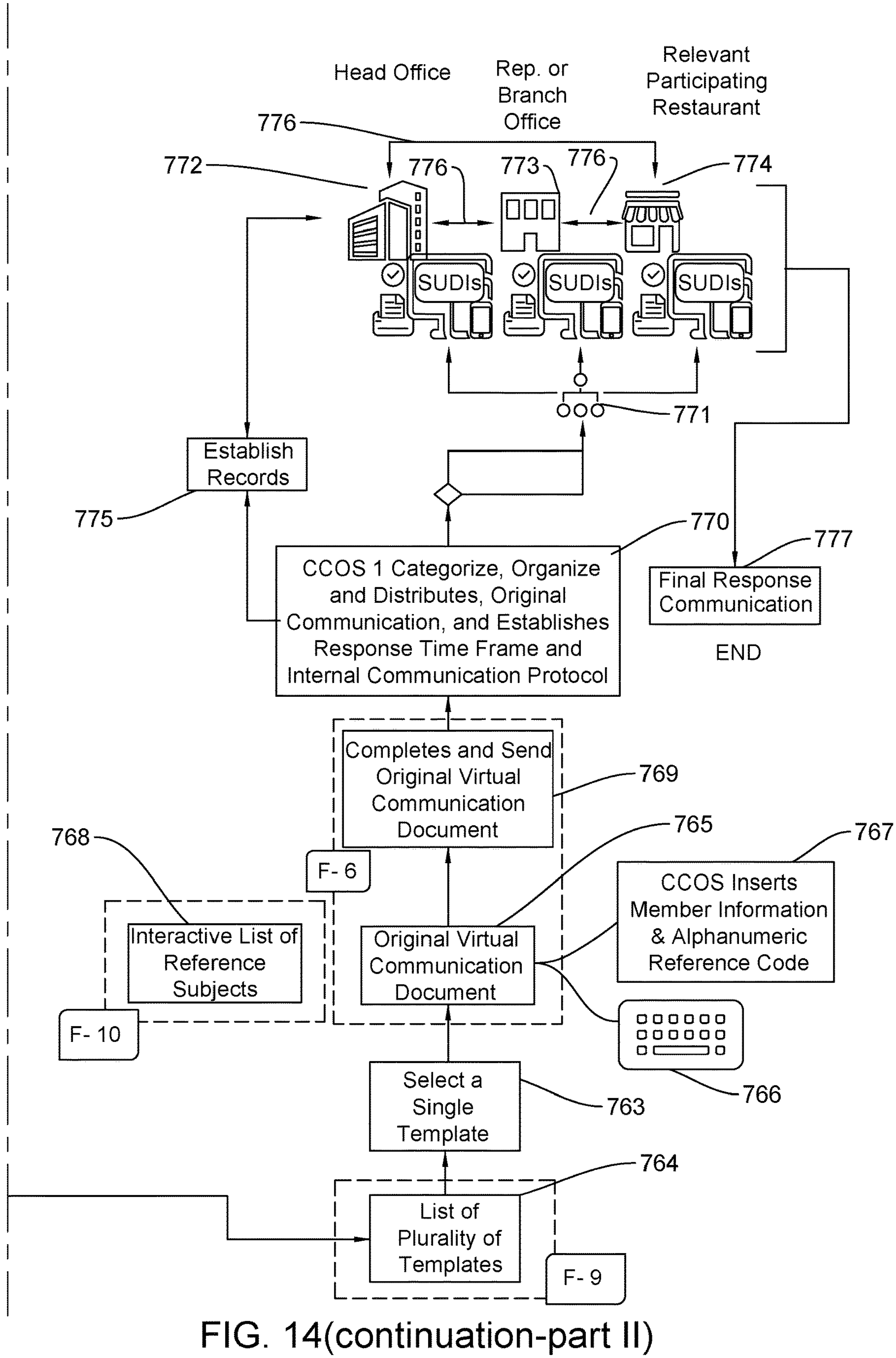
FIG. 14(continuation-part II)

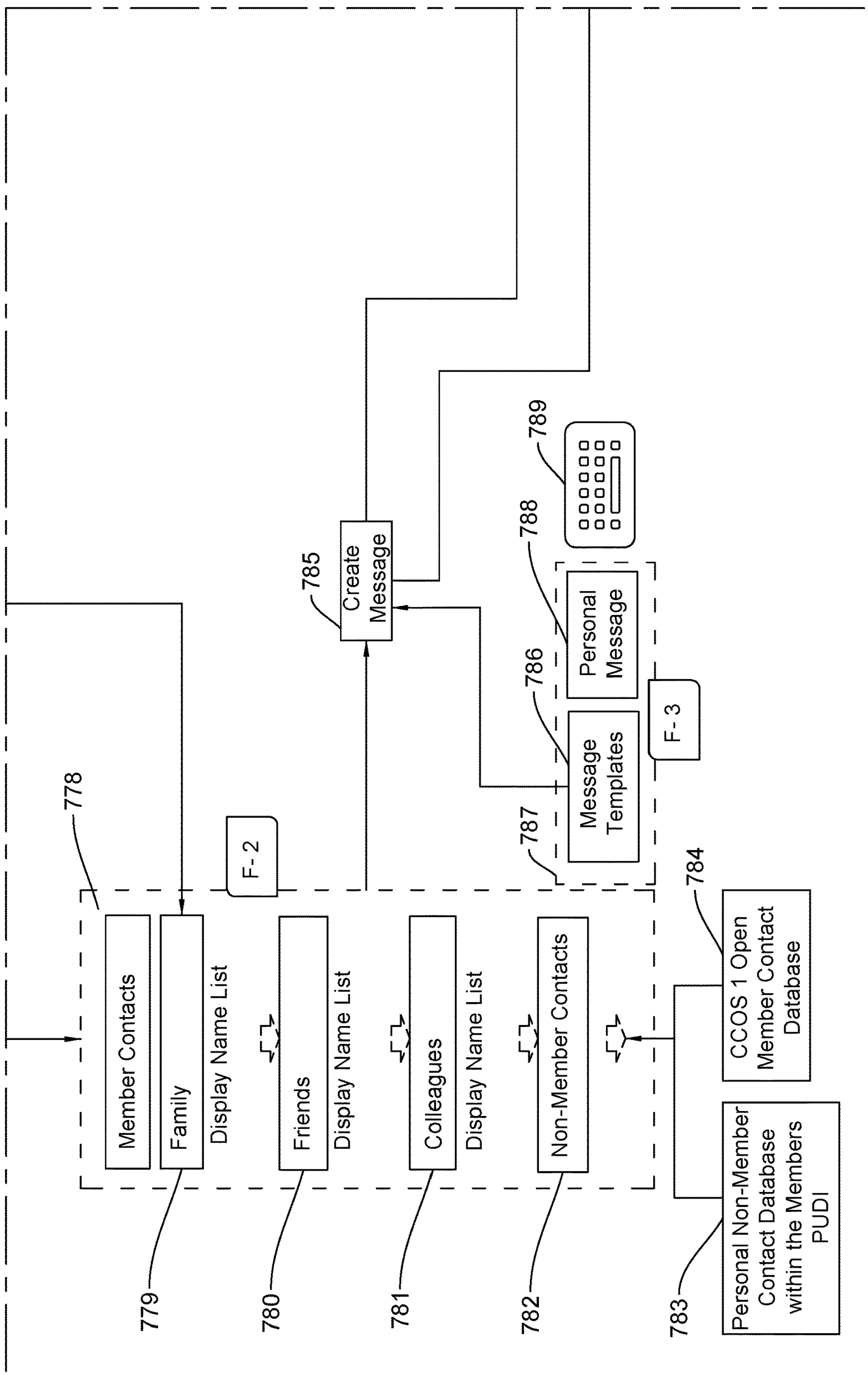
FIG. 14(continuation-part III)

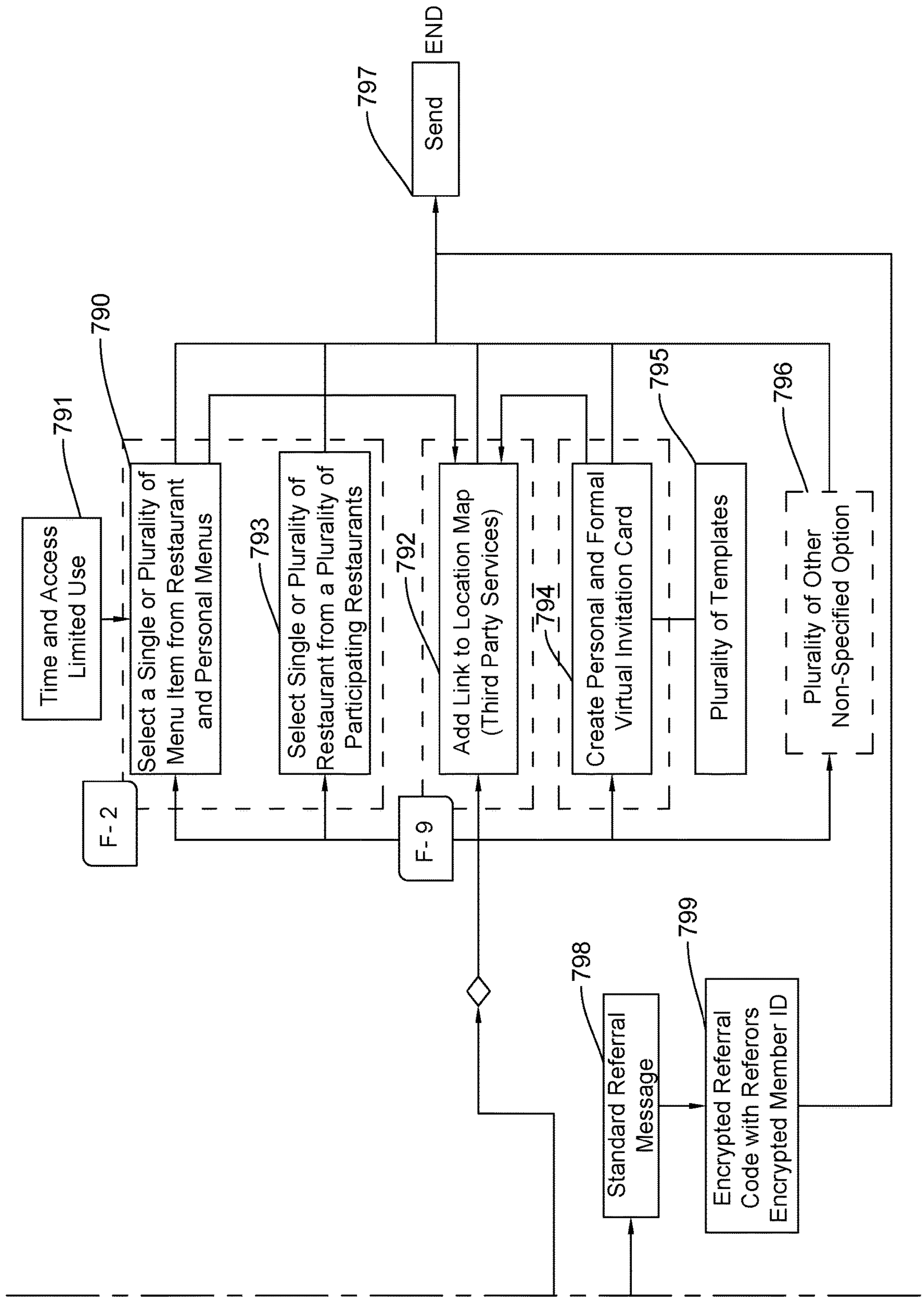
FIG. 14(continuation-part IV)

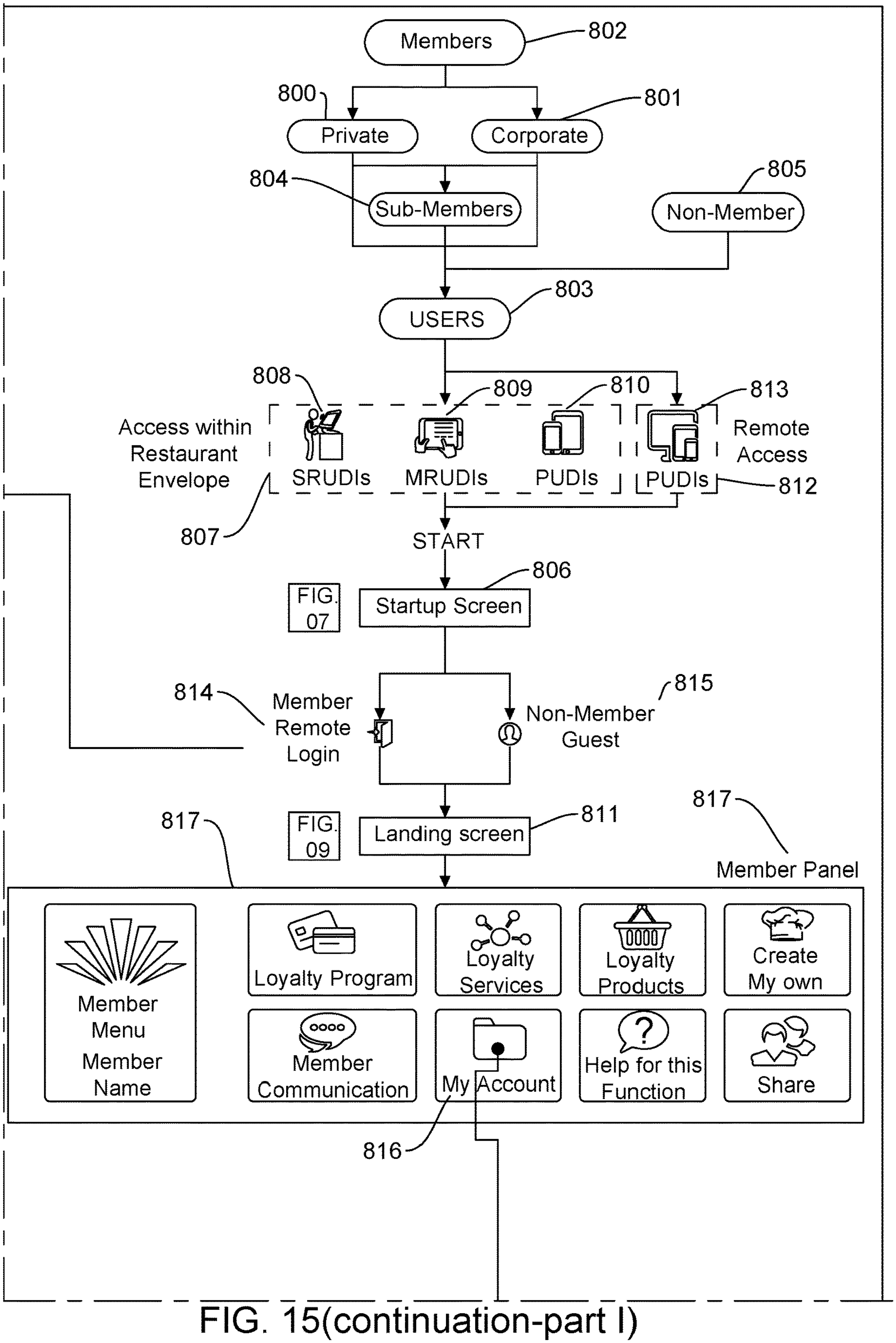
FIG. 15(continuation-part I)

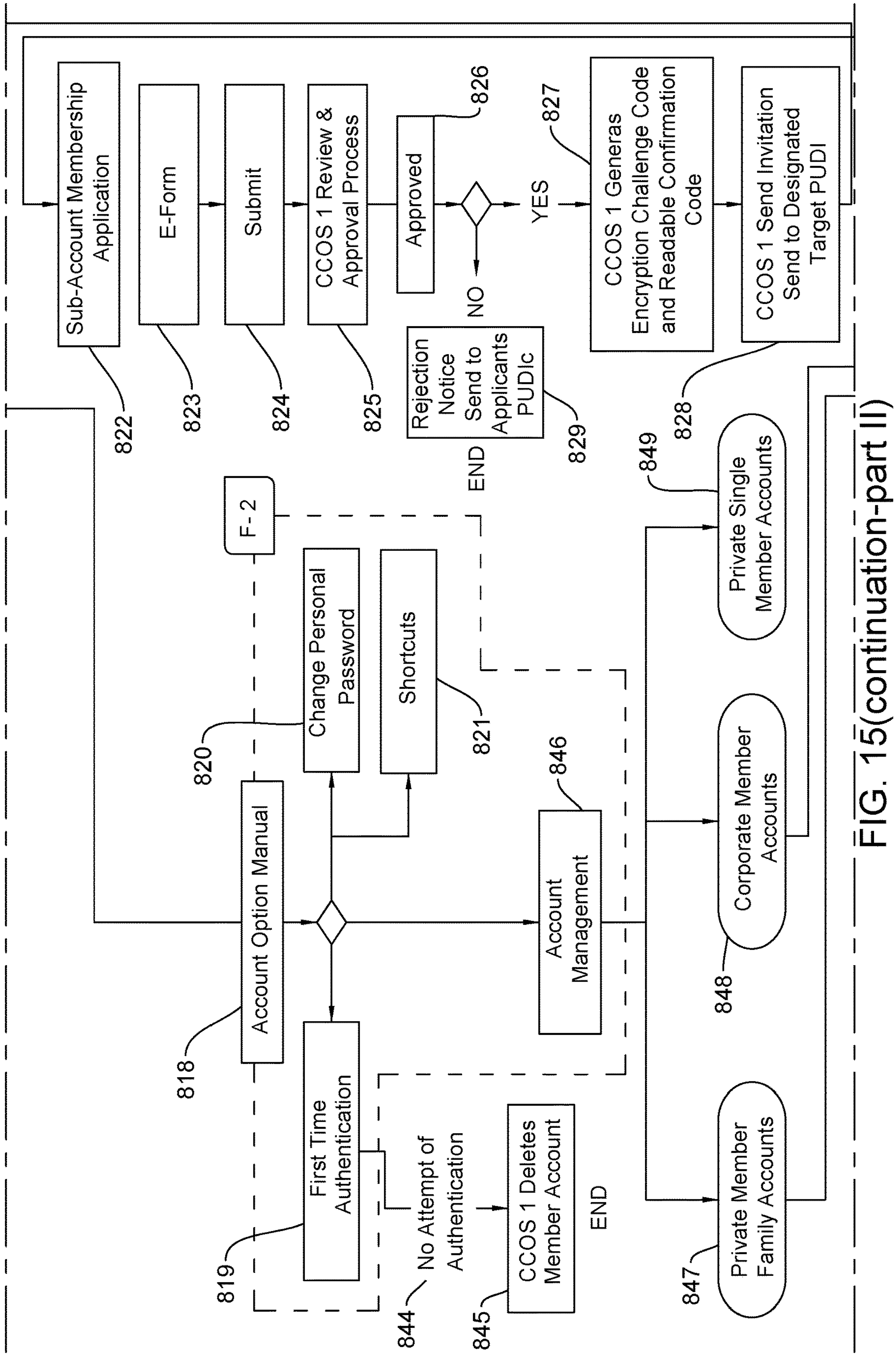
FIG. 15(continuation-part II)

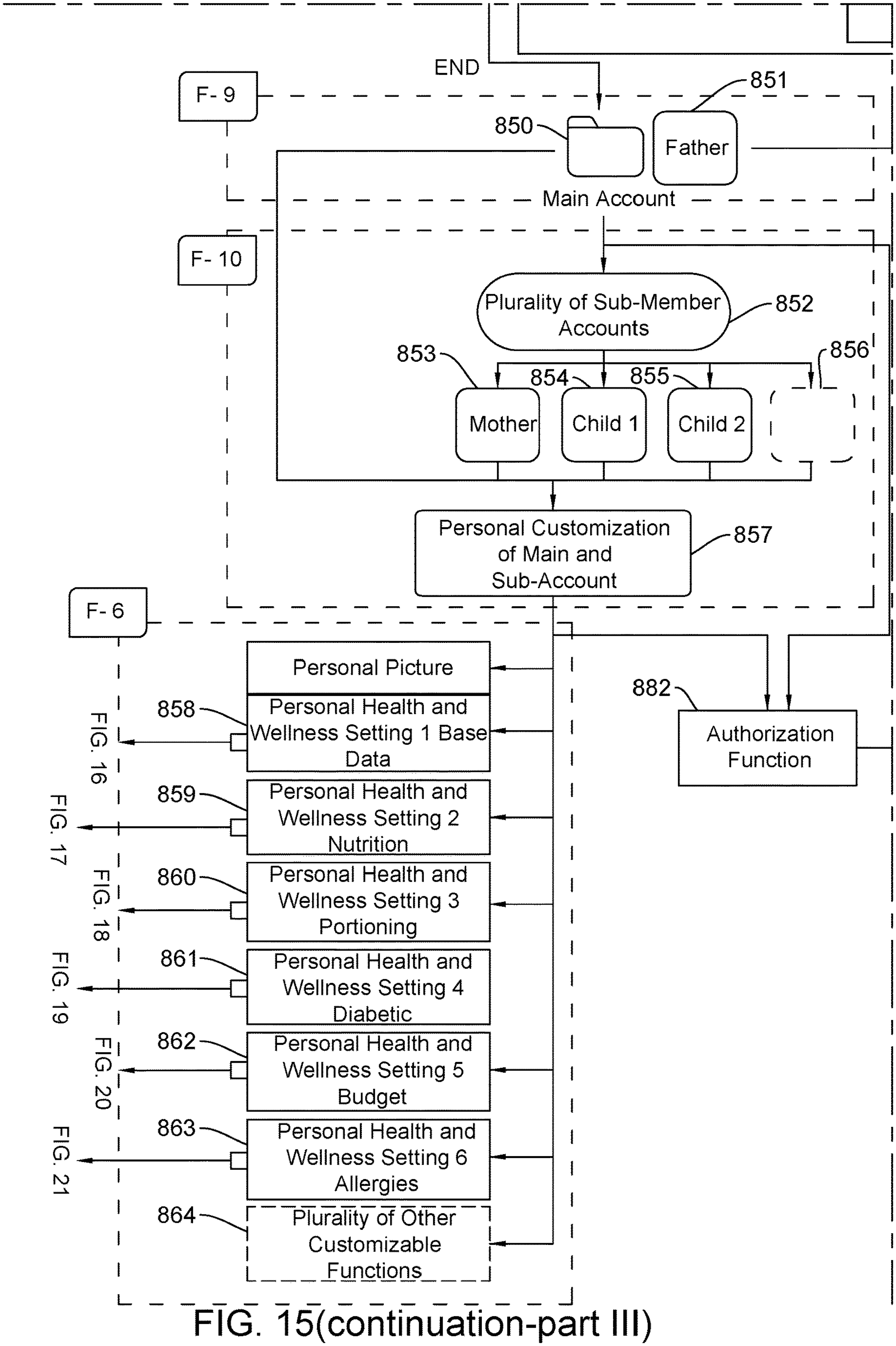
FIG. 15(continuation-part III)

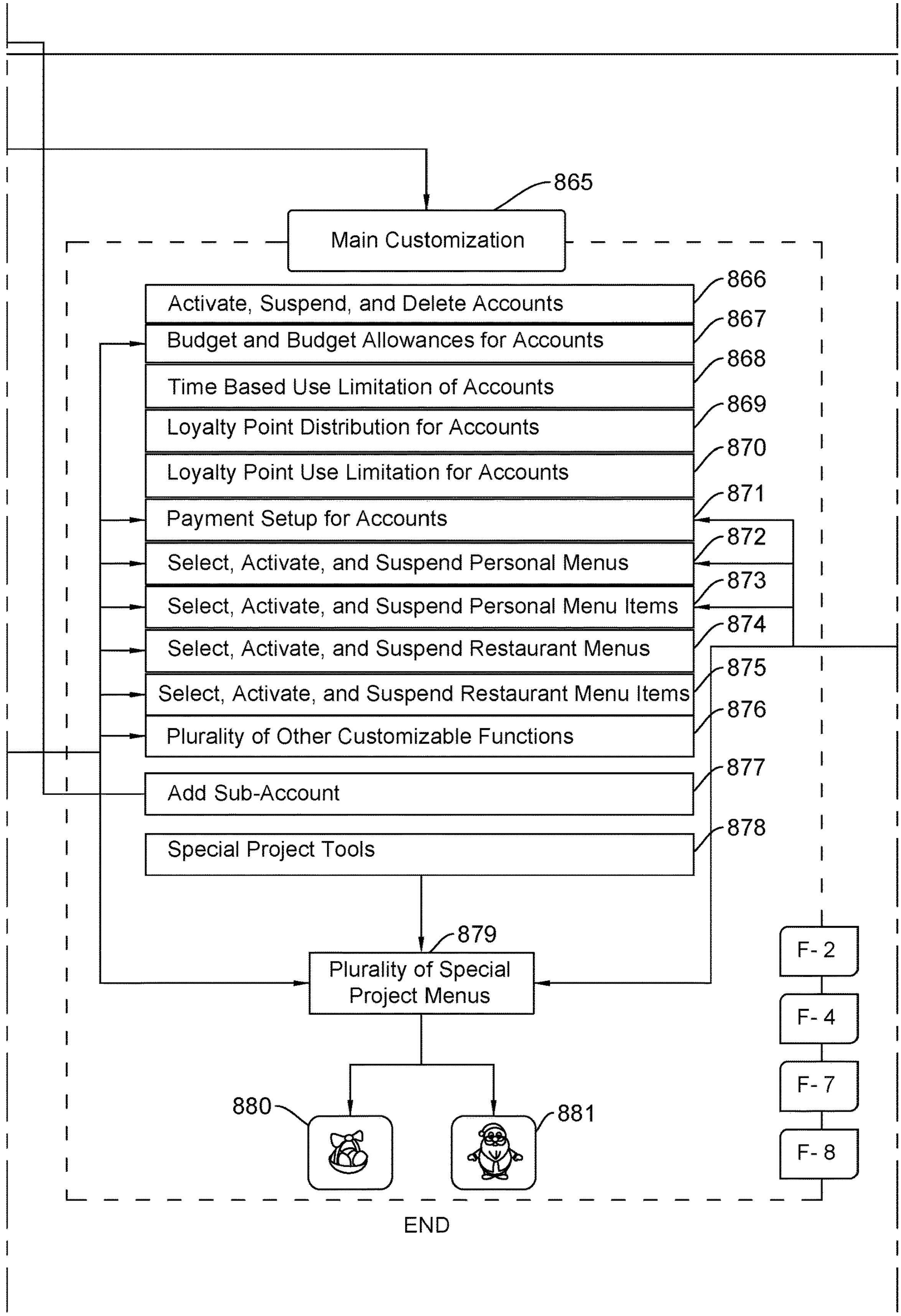
FIG. 15(continuation-part IV)

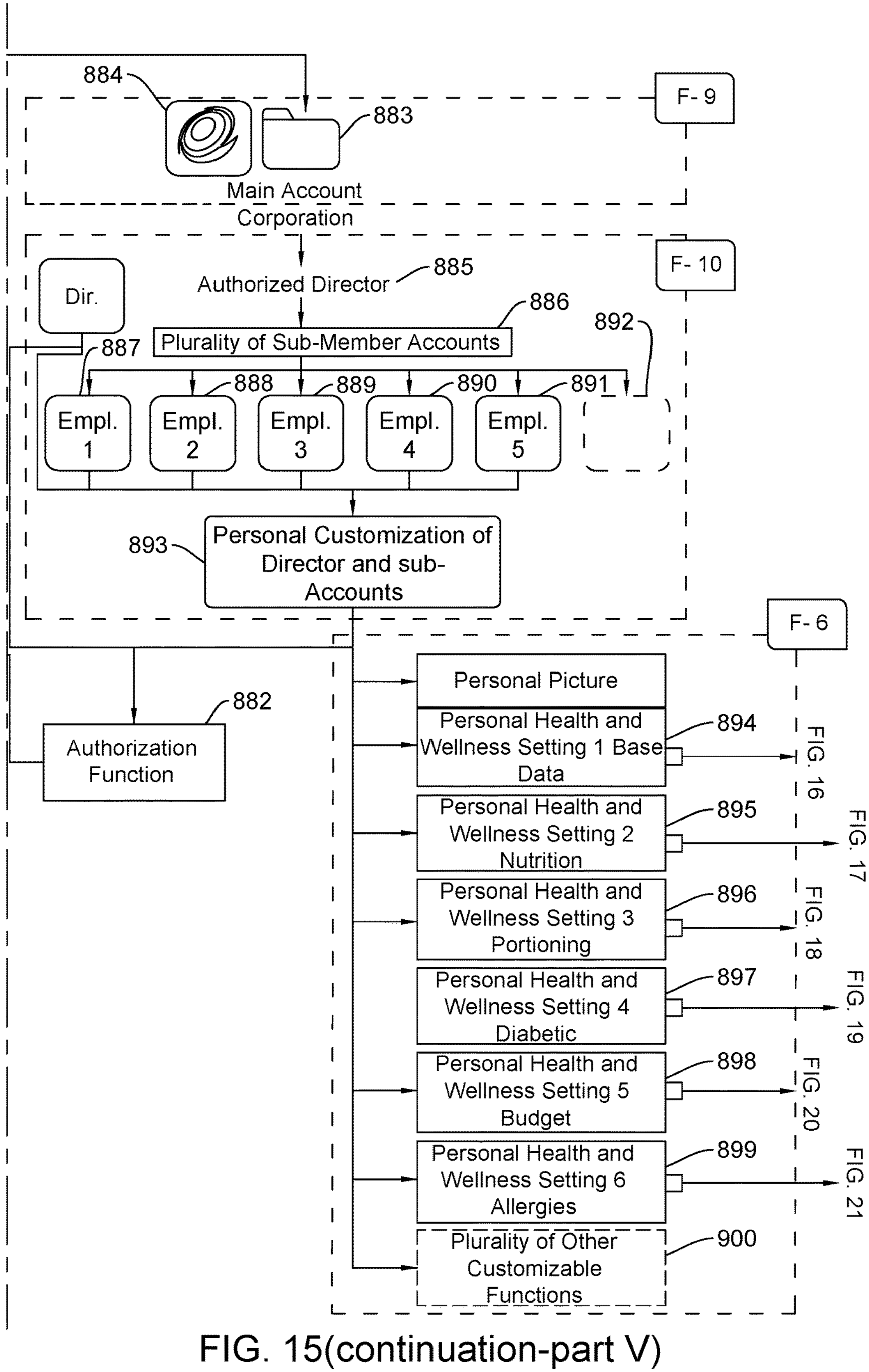
FIG. 15(continuation-part V)

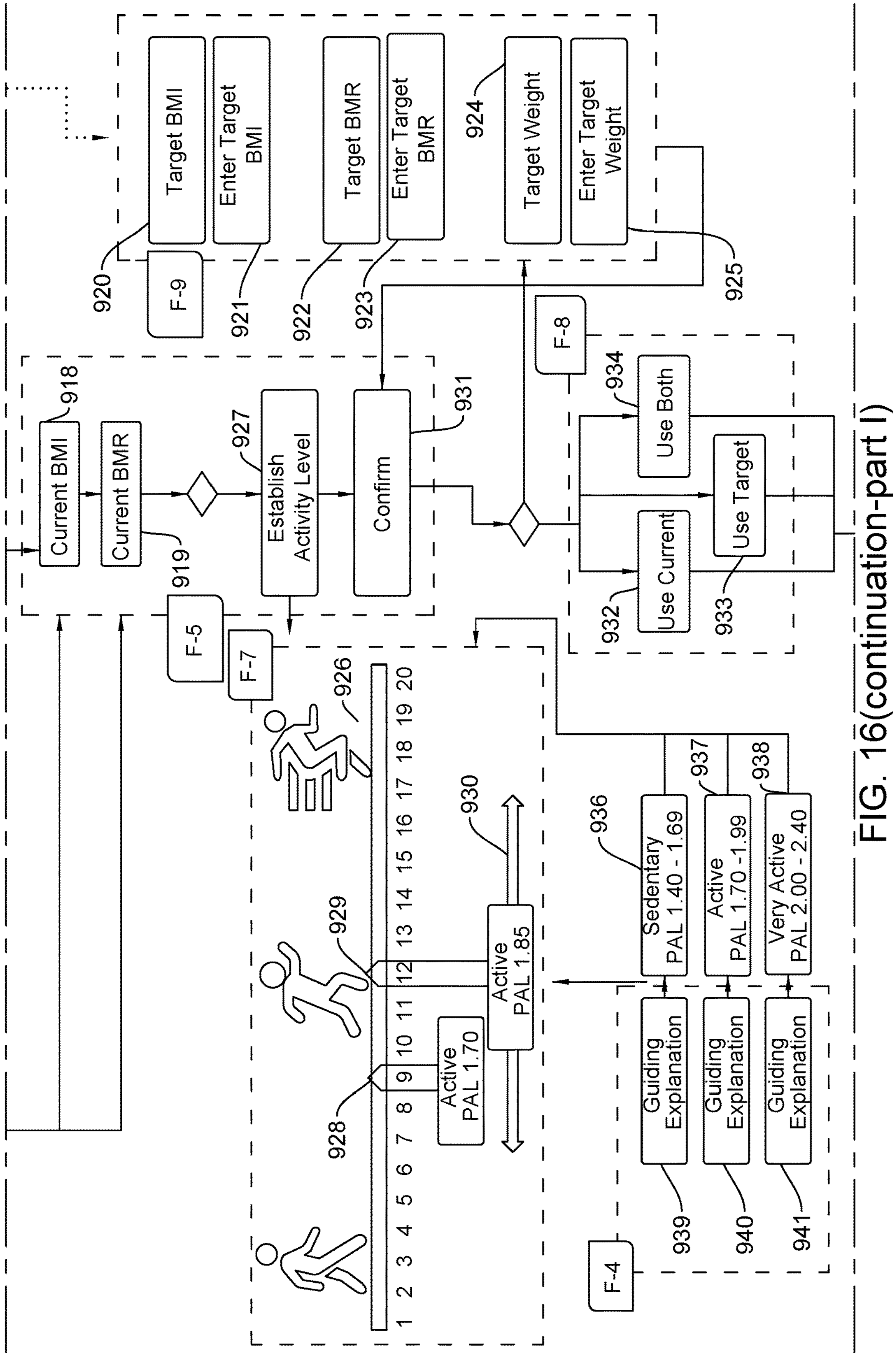
FIG. 16(continuation-part I)

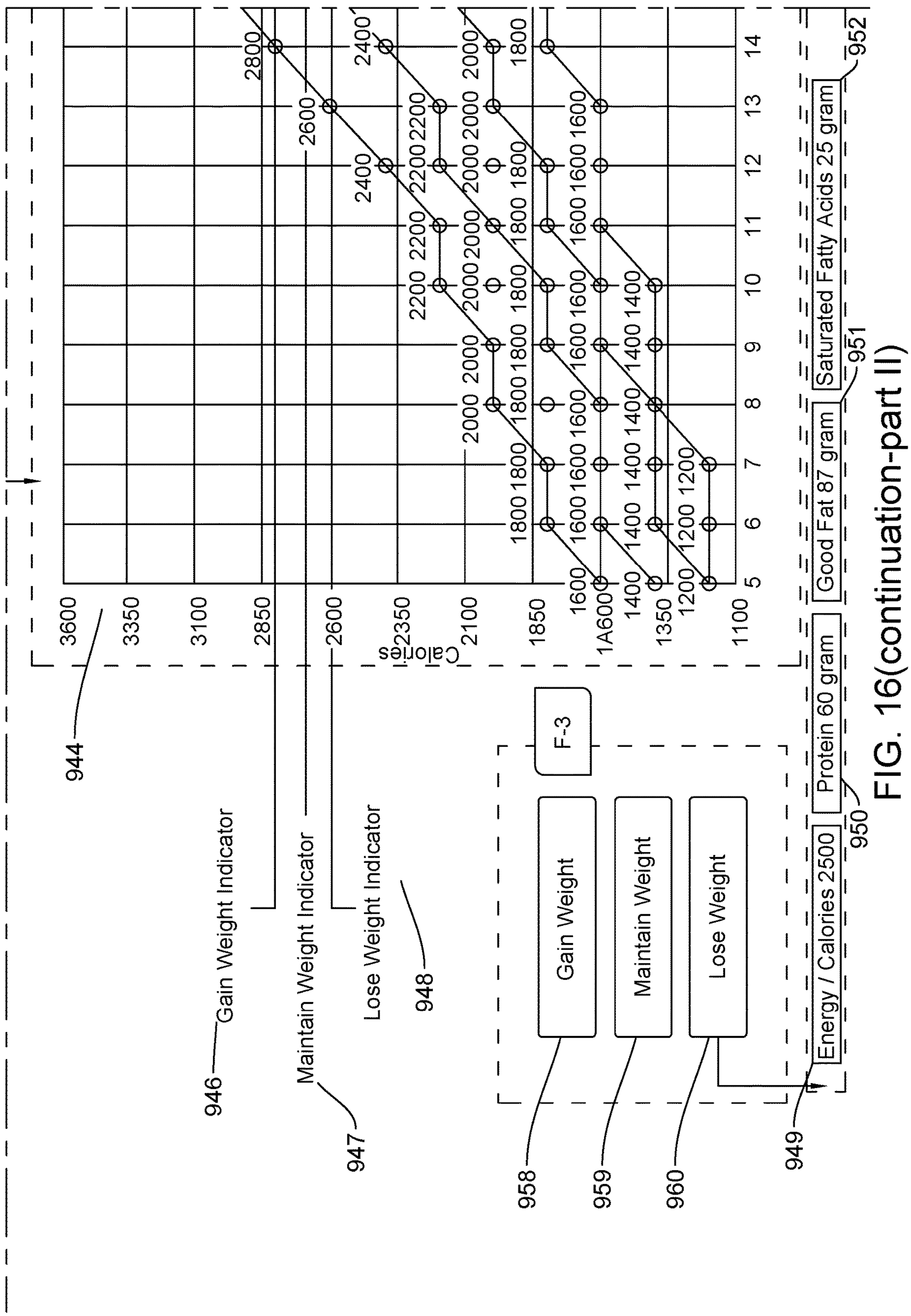
FIG. 16(continuation-part II)

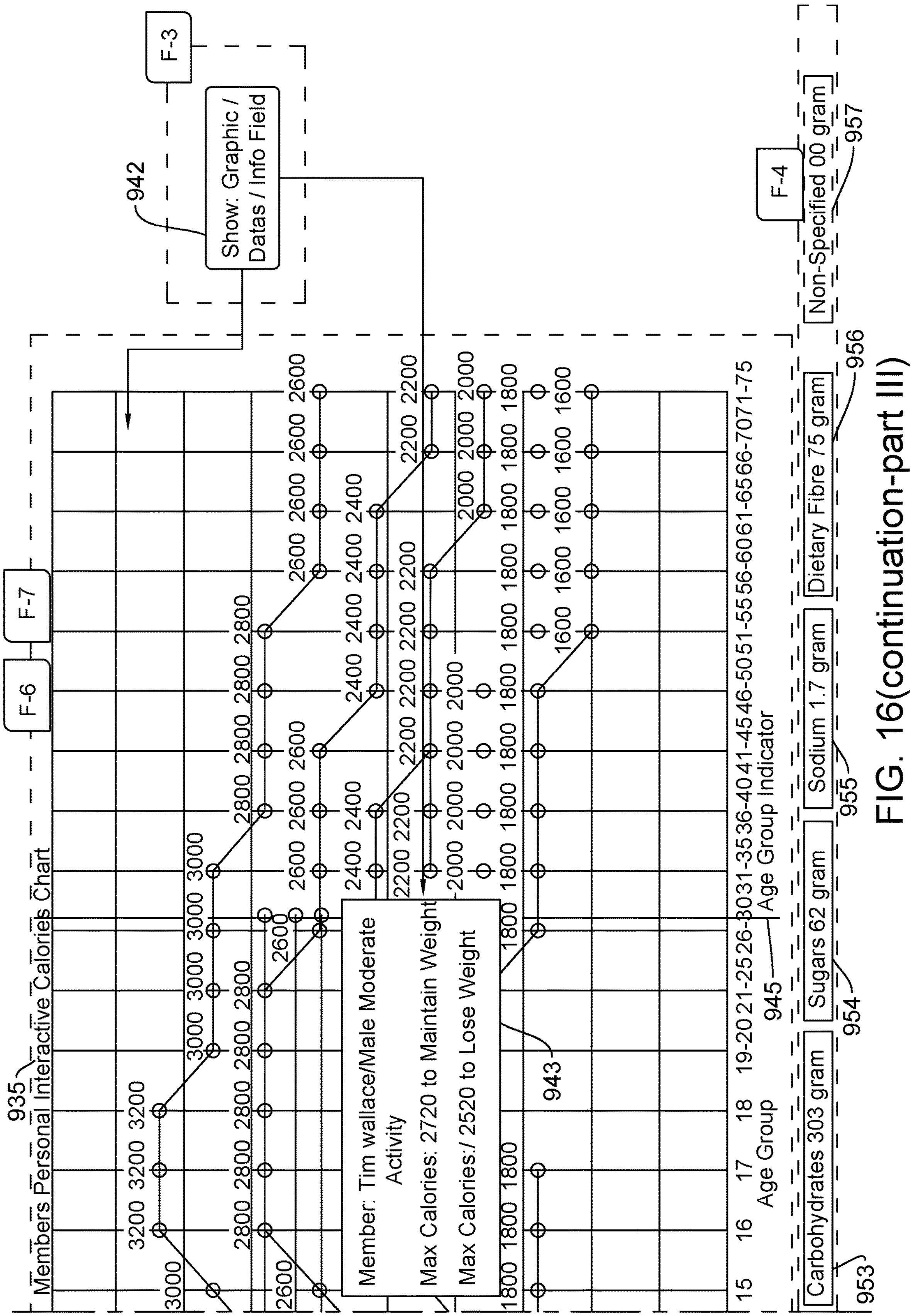
FIG. 16(continuation-part III)

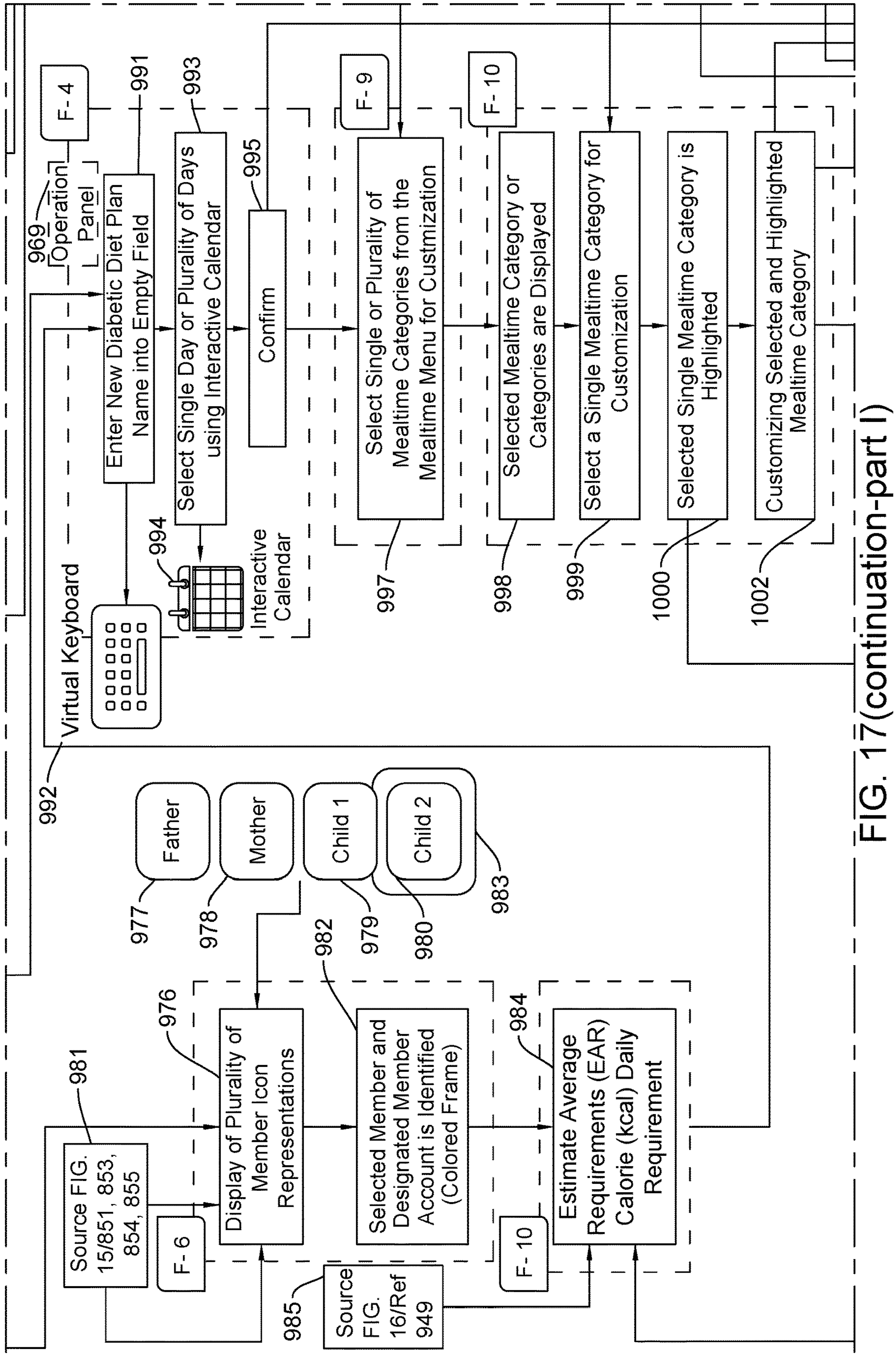
FIG. 17(continuation-part I)

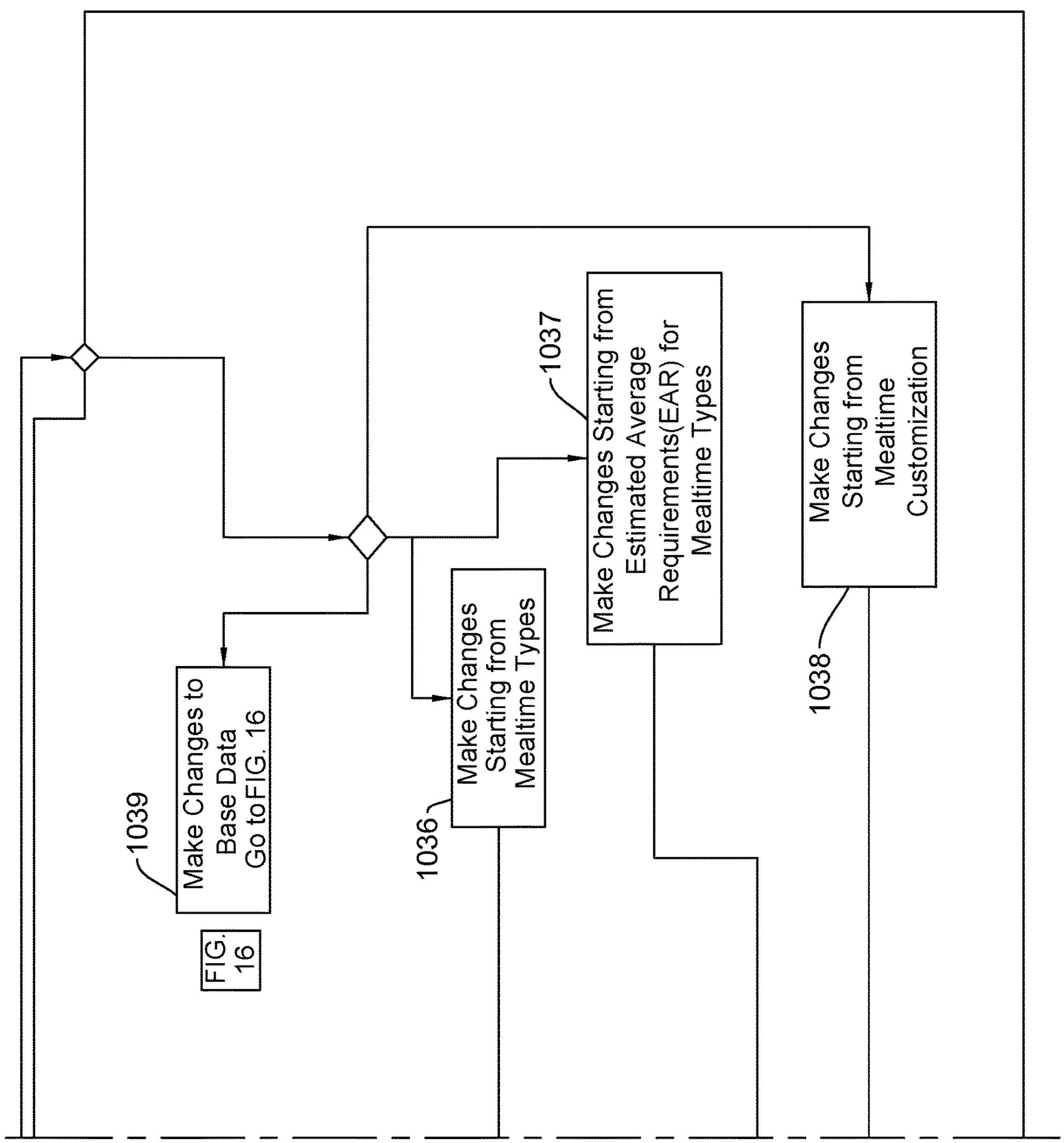
FIG. 17(continuation-part II)

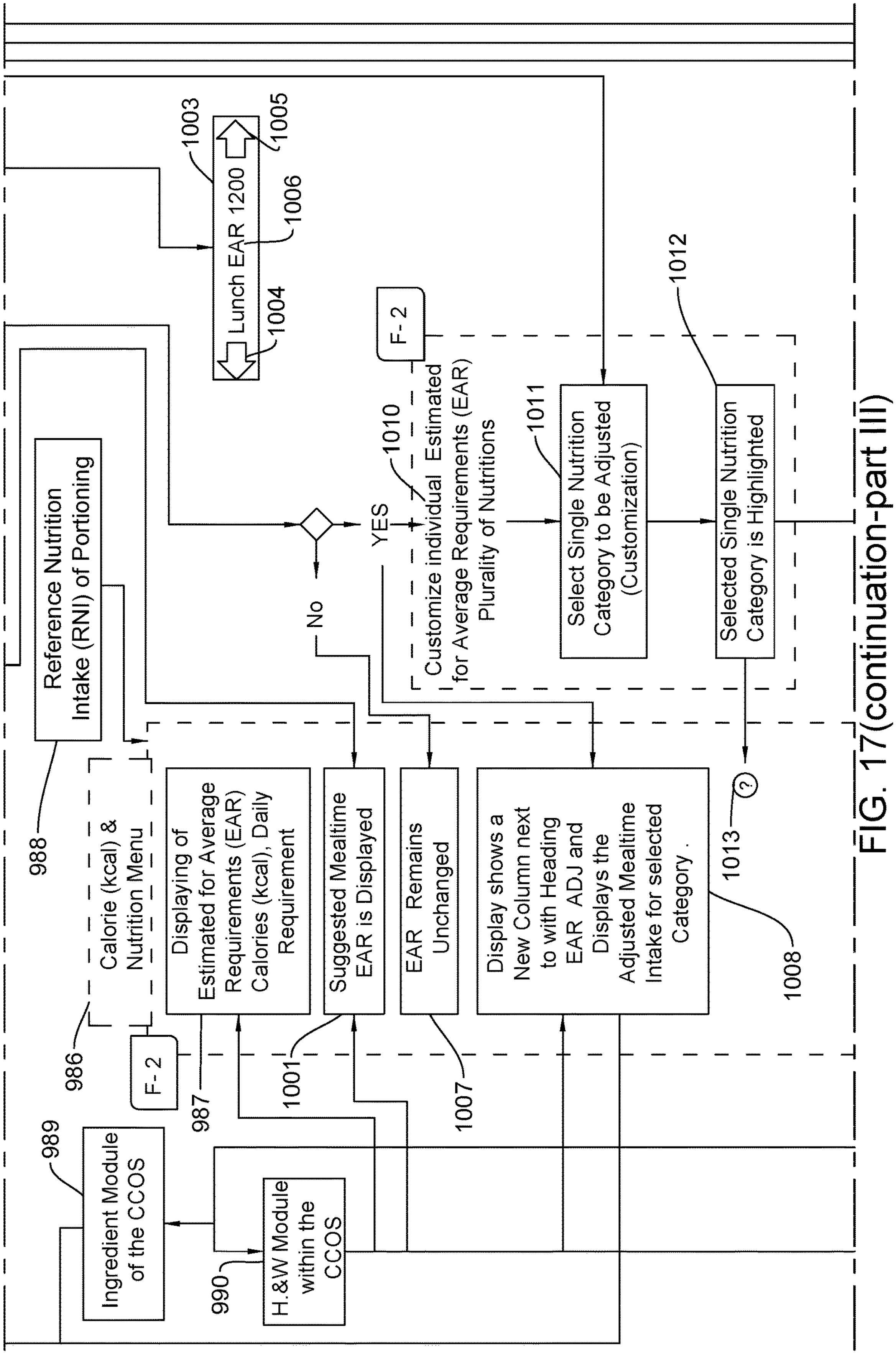
FIG. 17(continuation-part III)

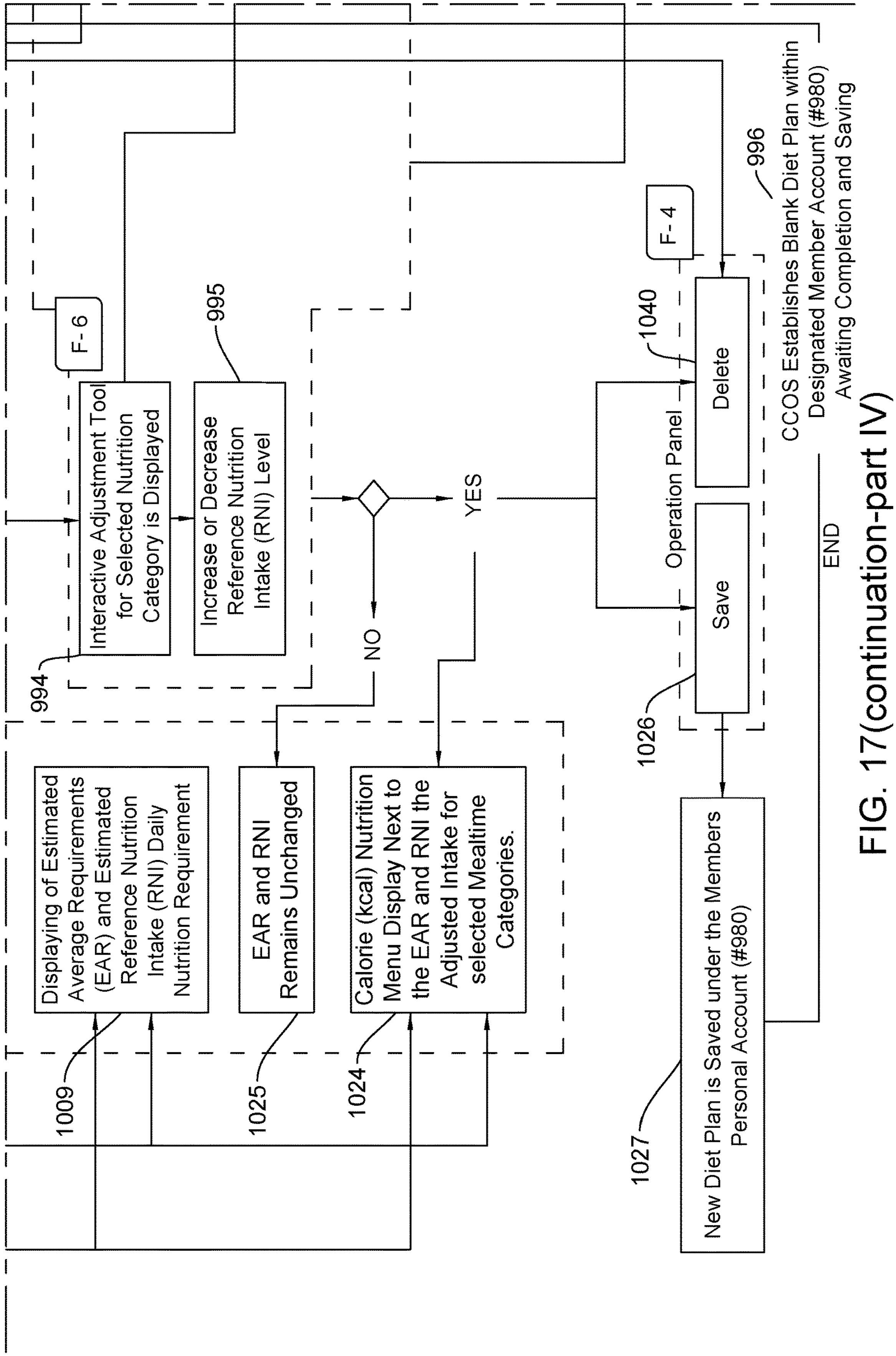
FIG. 17(continuation-part IV)

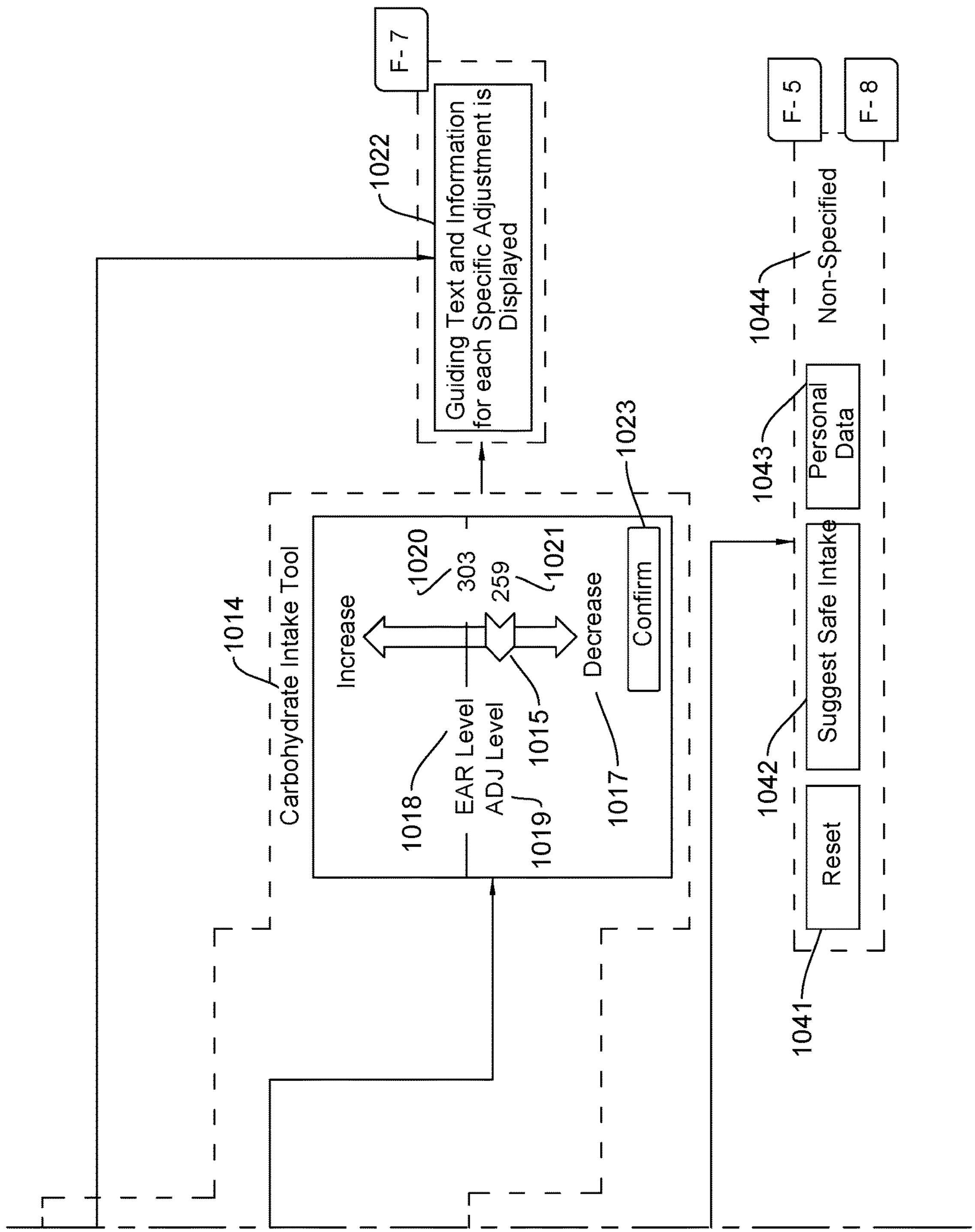
FIG. 17(continuation-part V)

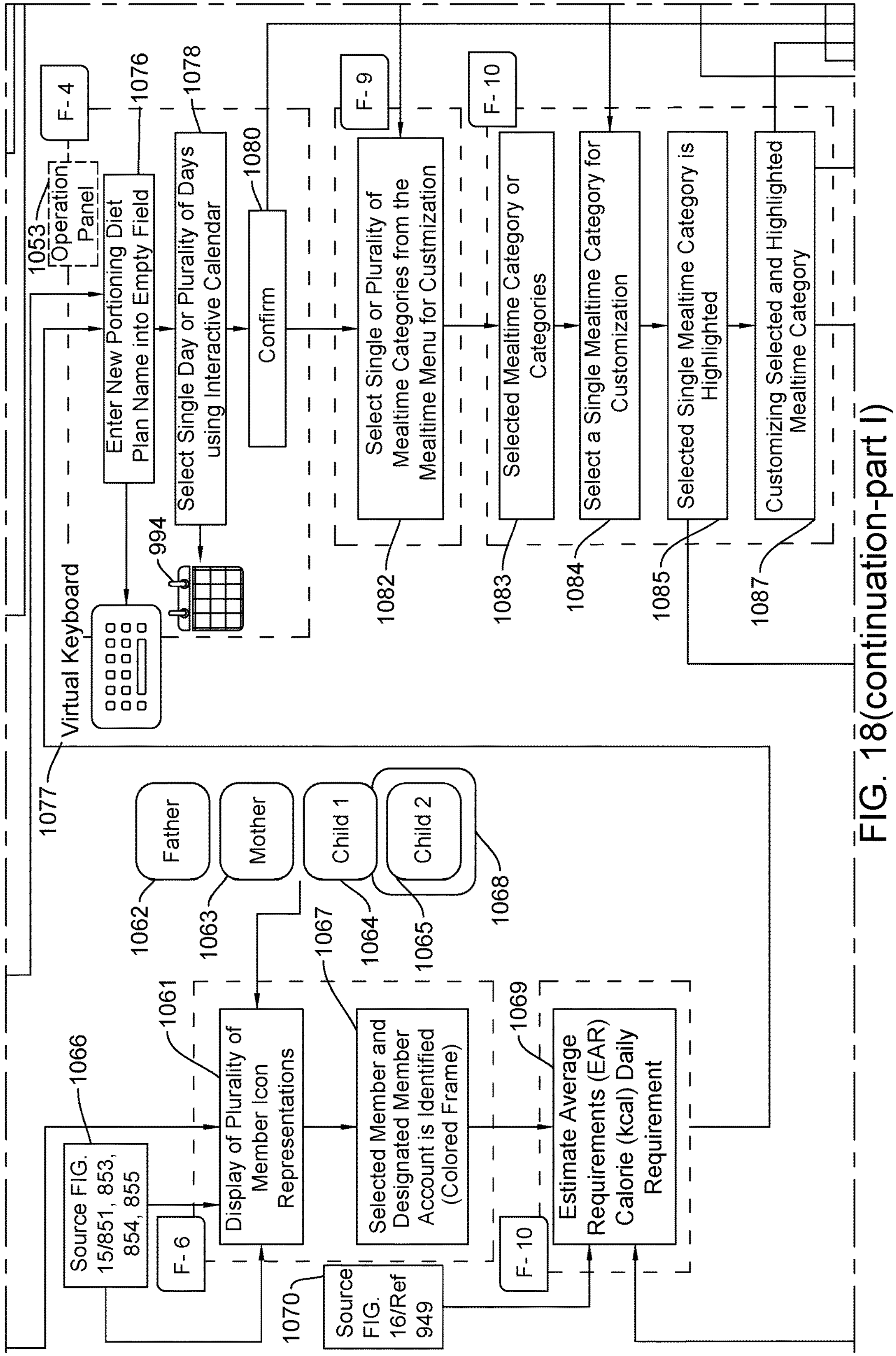
FIG. 18(continuation-part I)

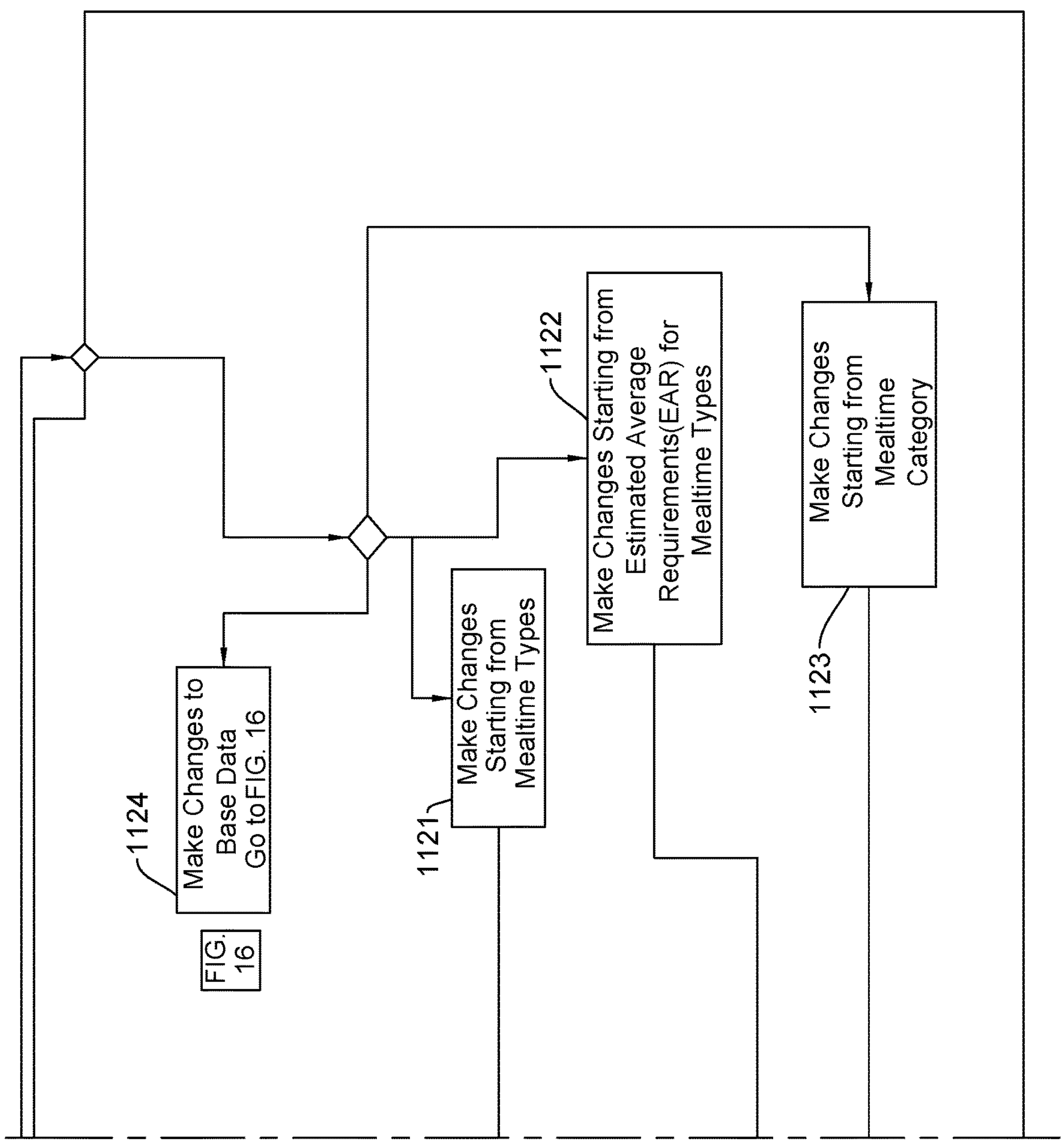
FIG. 18(continuation-part II)

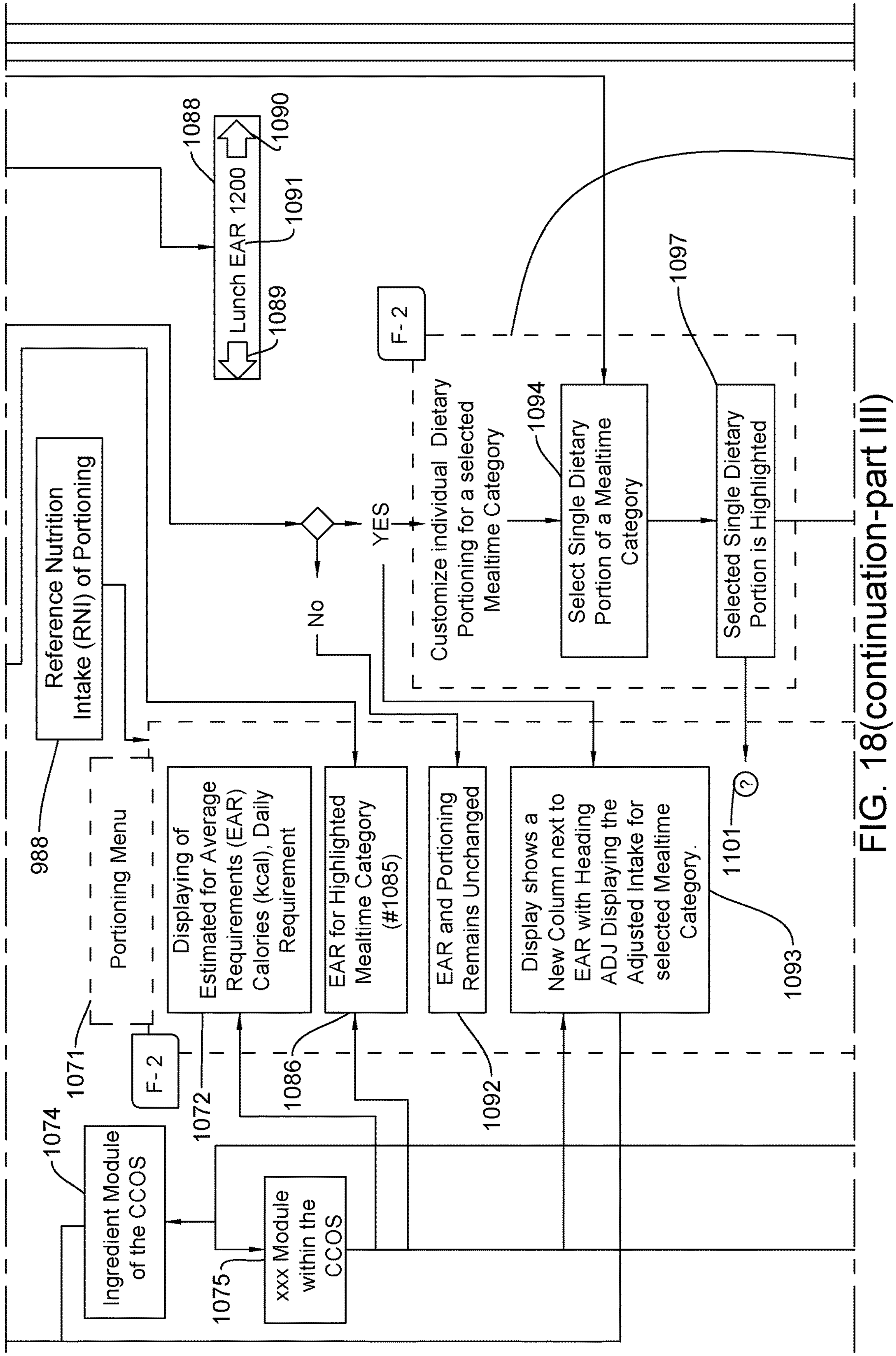
FIG. 18(continuation-part III)

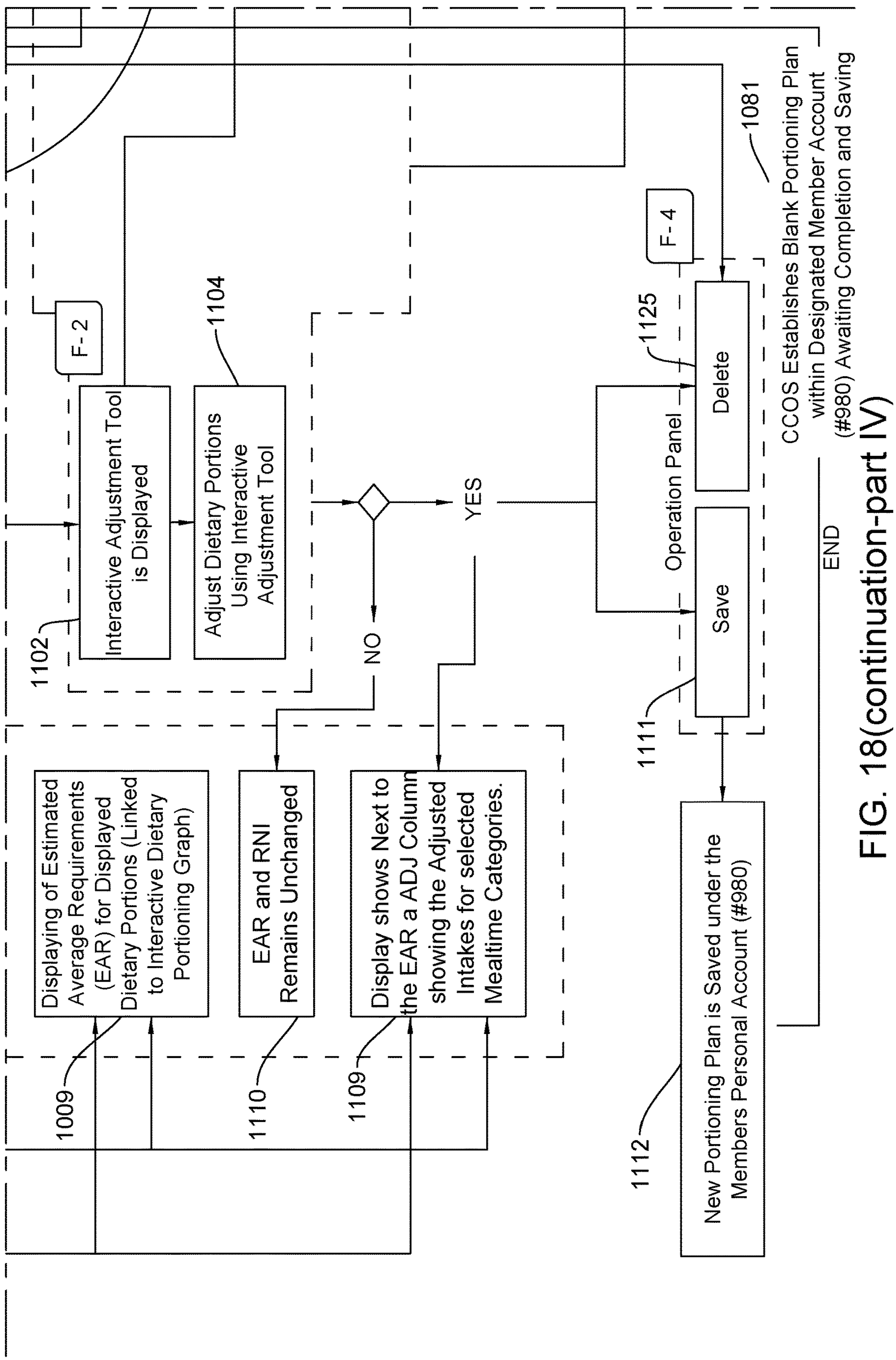
FIG. 18(continuation-part IV)

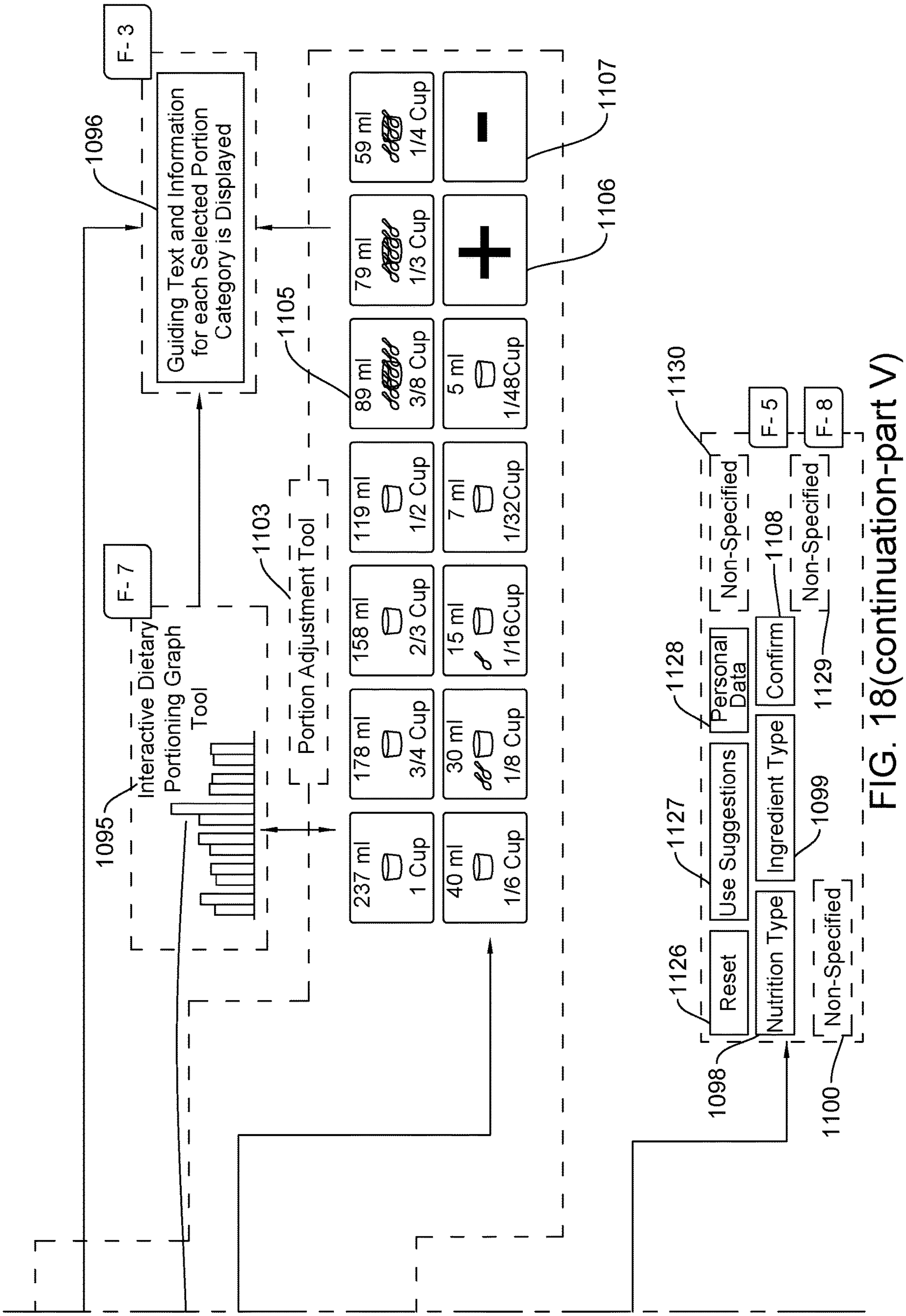
FIG. 18(continuation-part V)

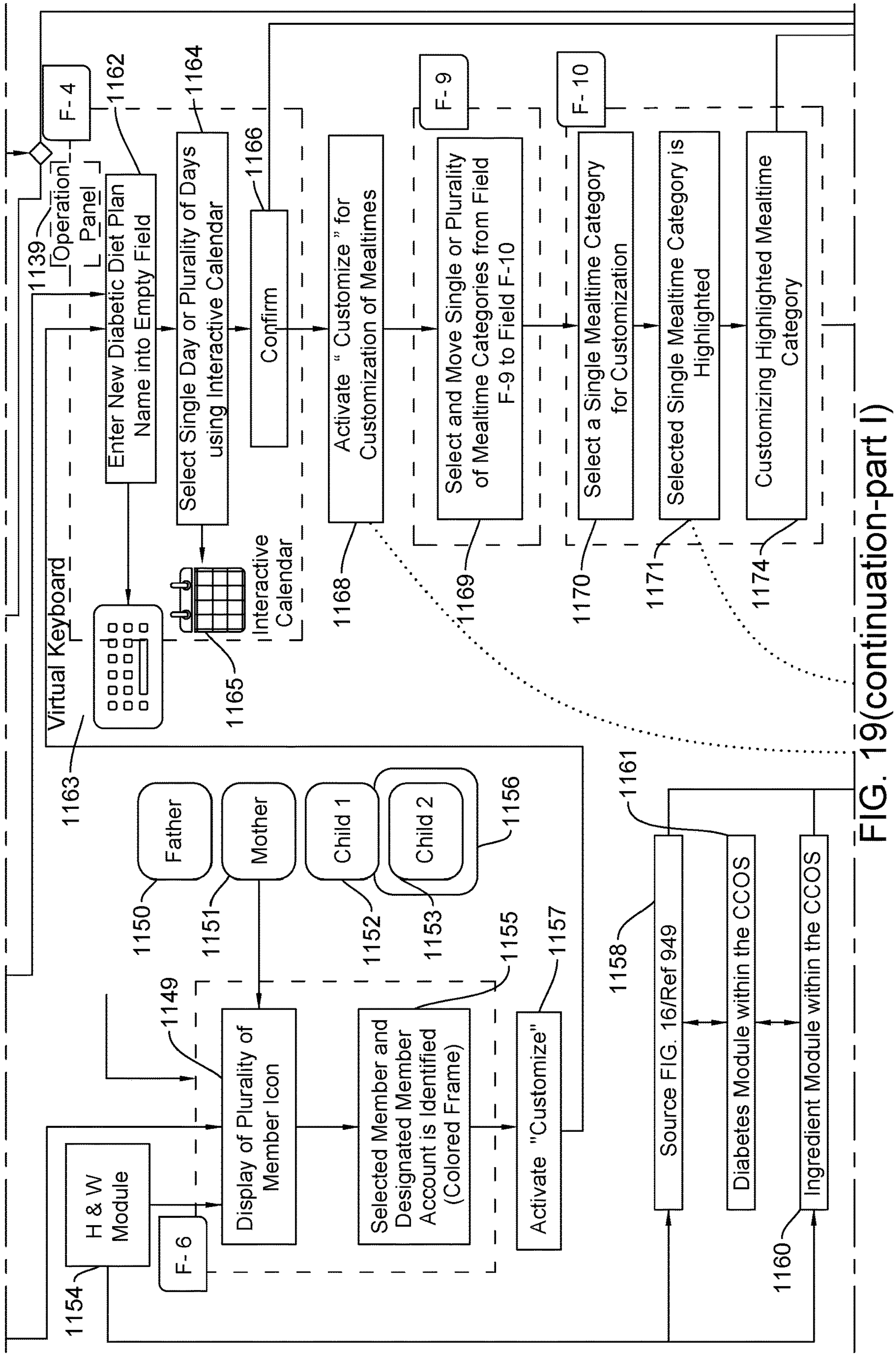
FIG. 19(continuation-part I)

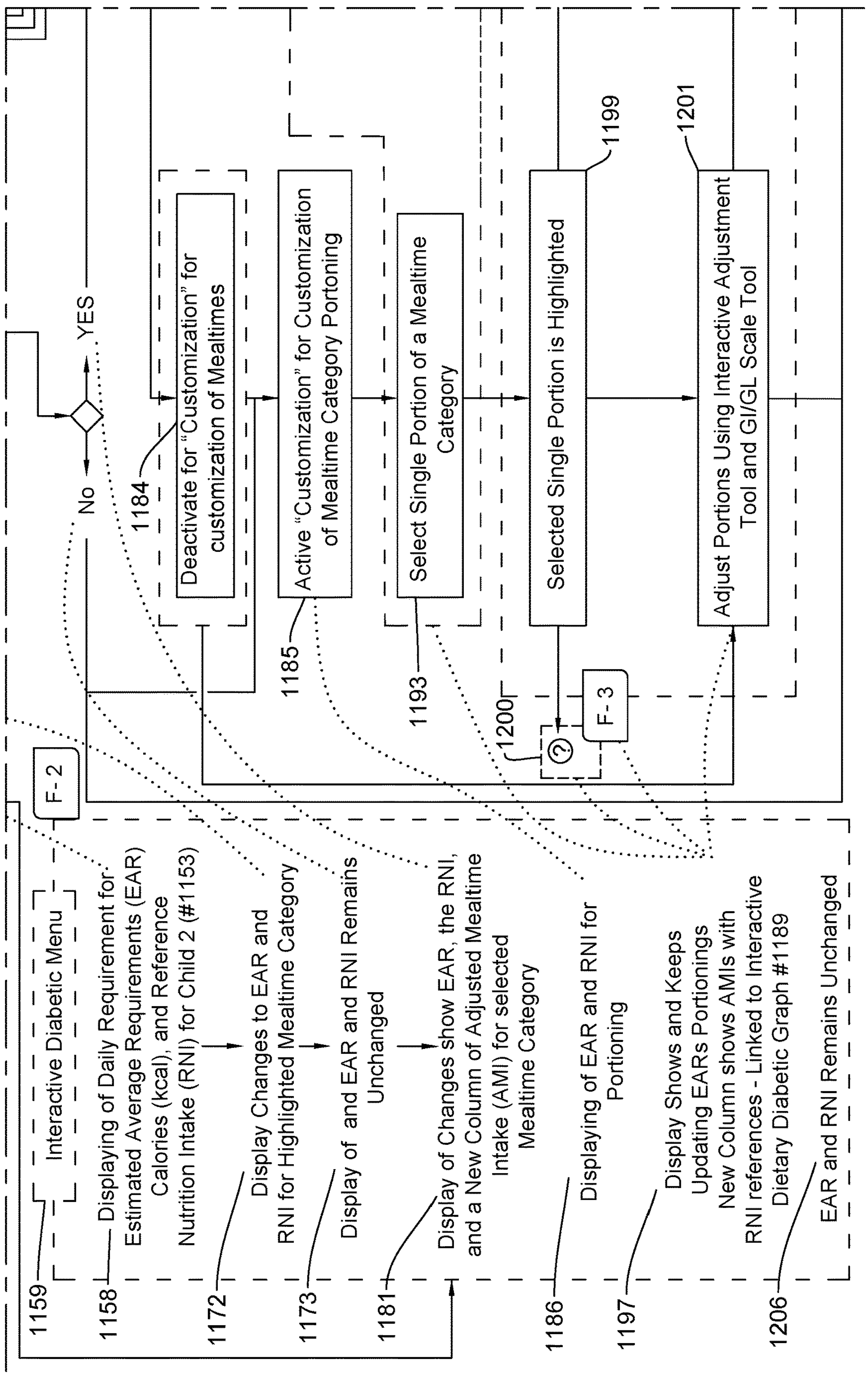
FIG. 19(continuation-part II)

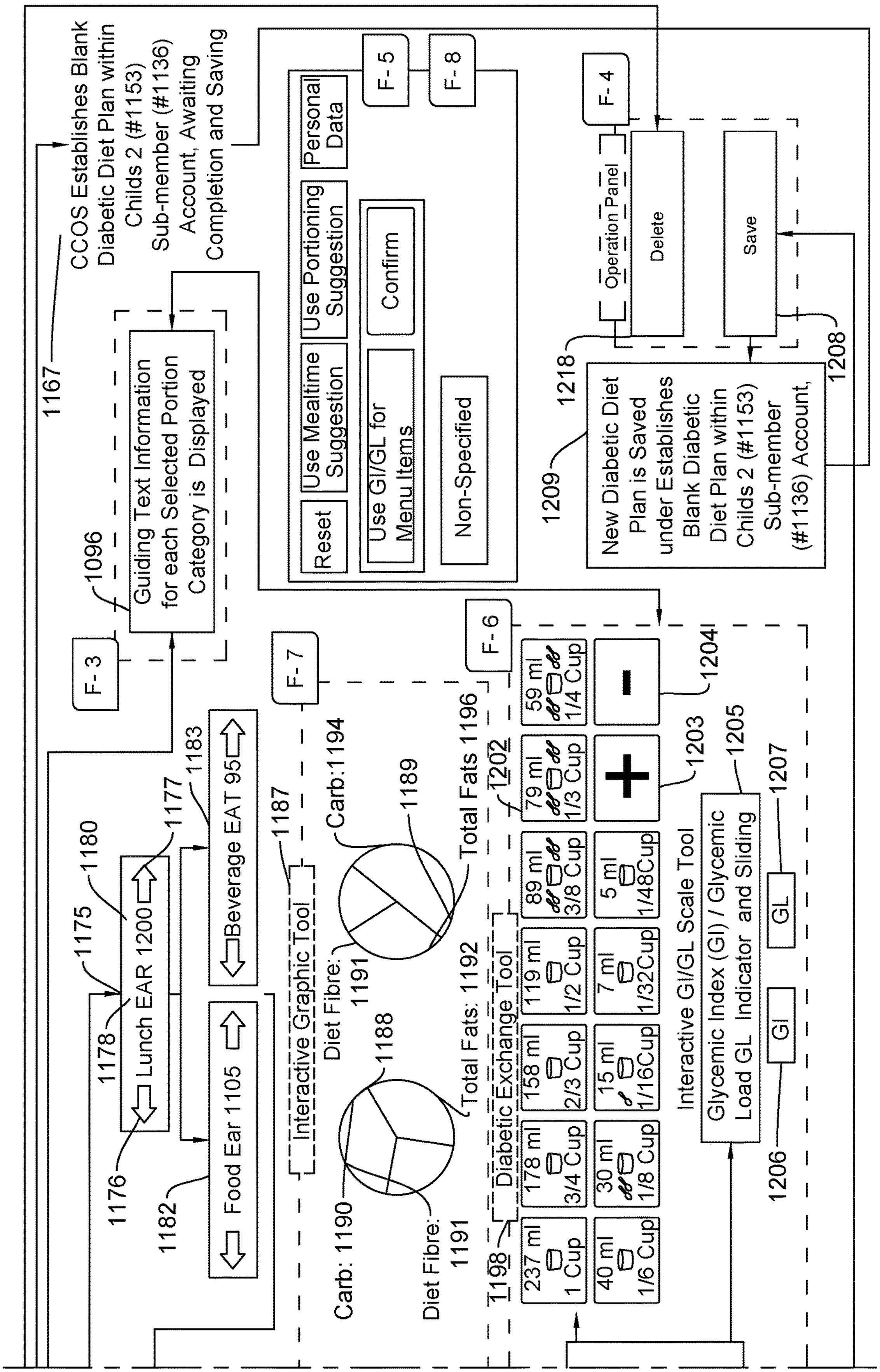
FIG. 19(continuation-part III)

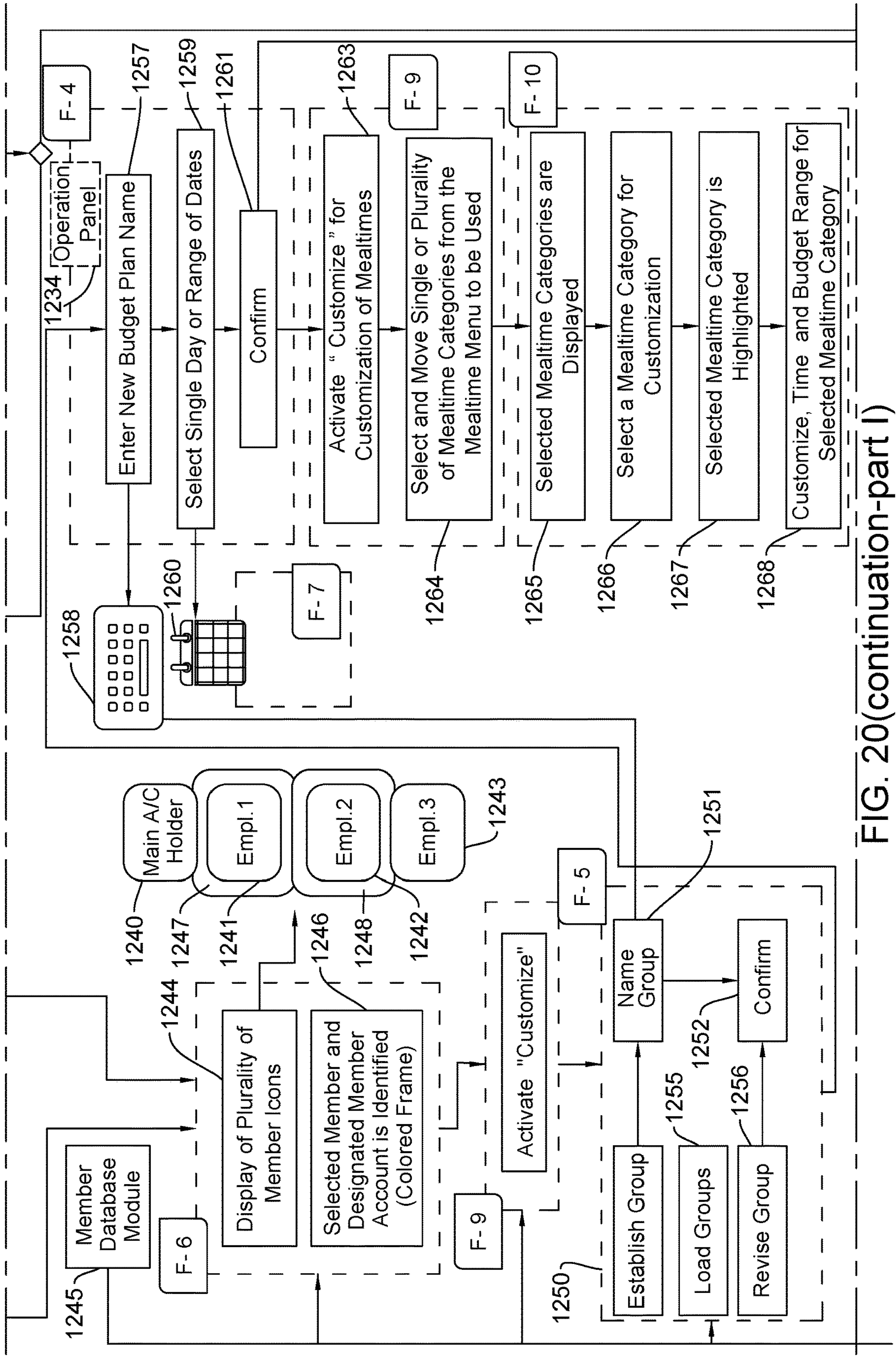
FIG. 20(continuation-part I)

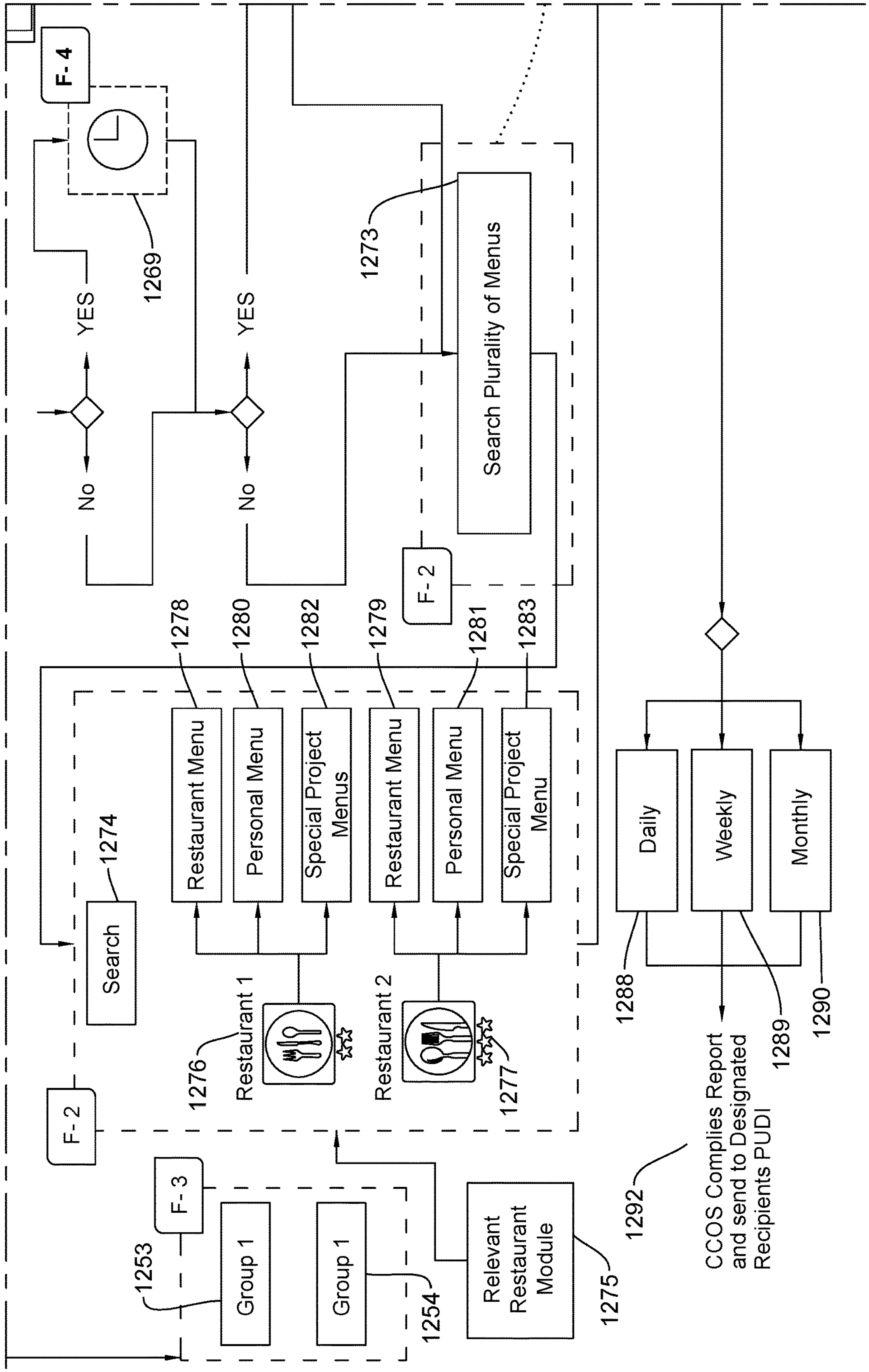
FIG. 20(continuation-part II)

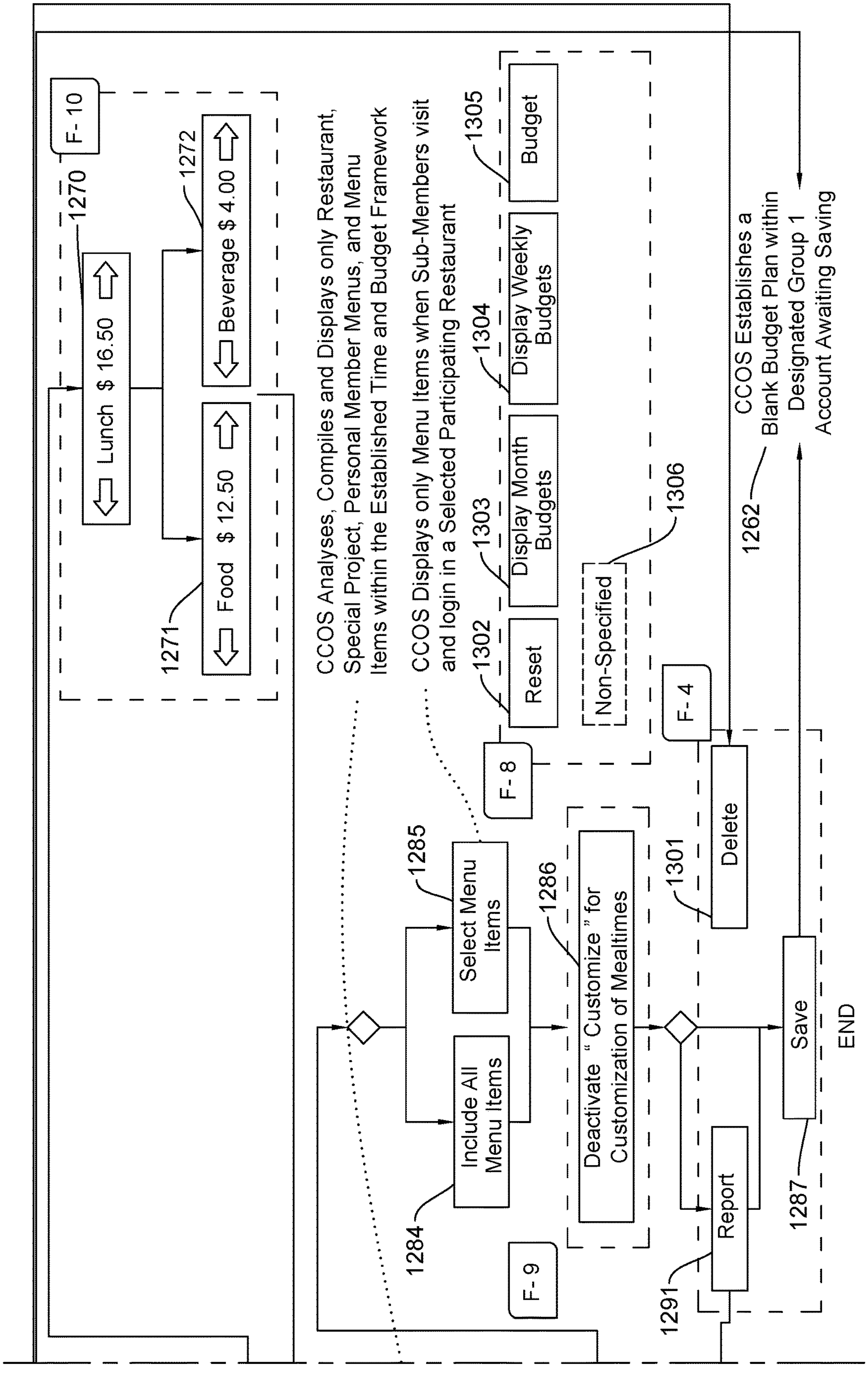
FIG. 20(continuation-part III)

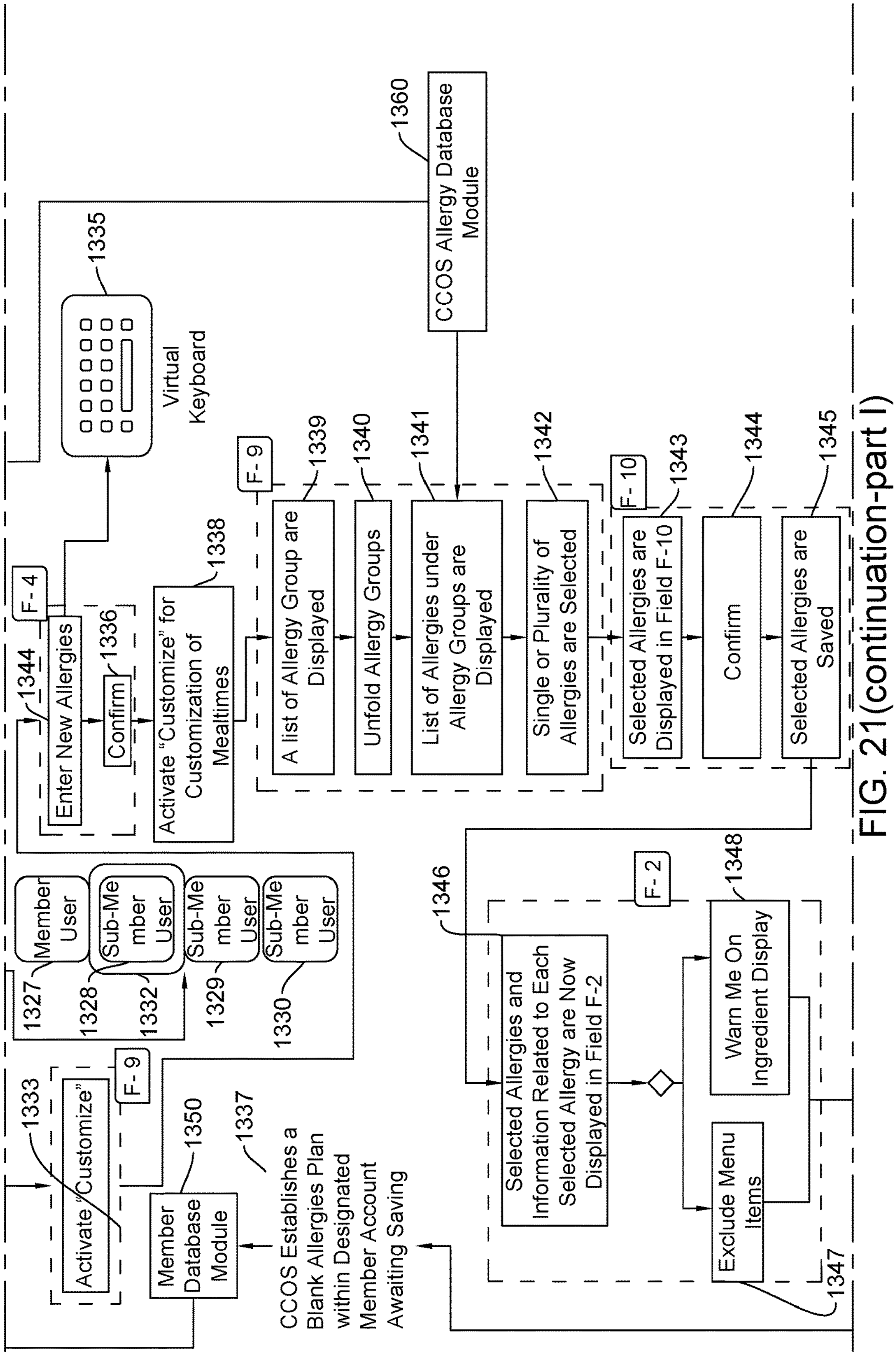
FIG. 21(continuation-part I)

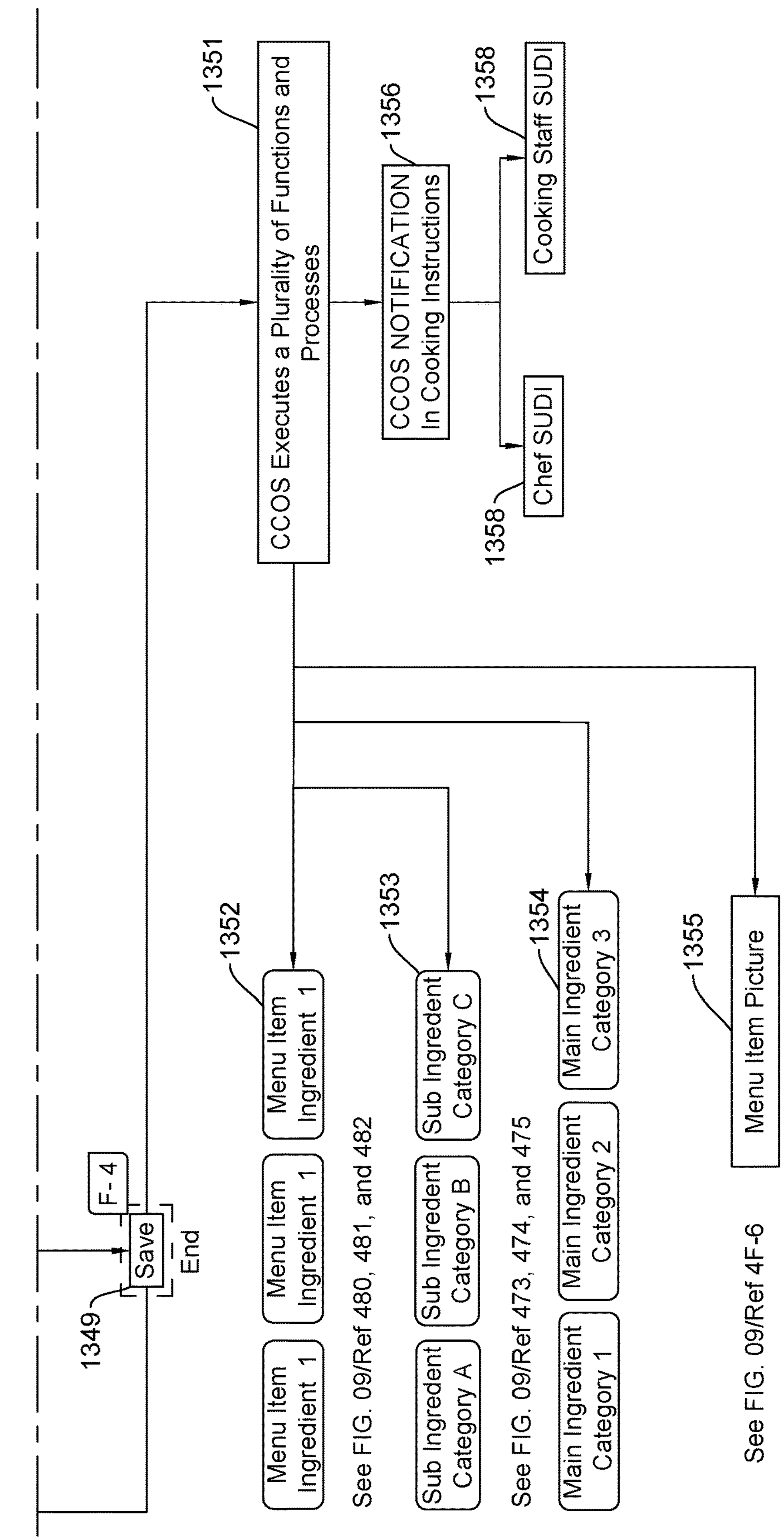
FIG. 21(continuation-part II)

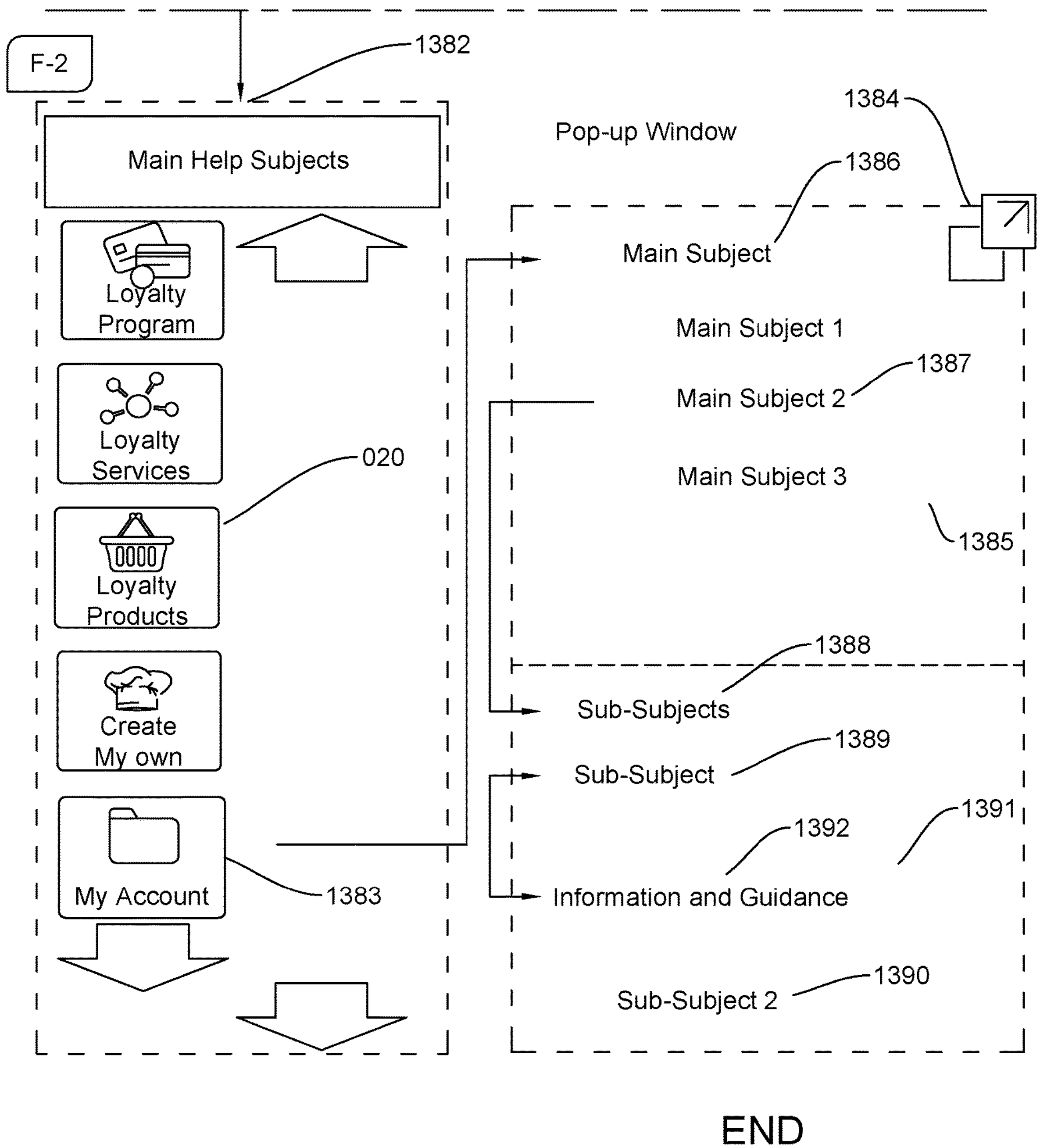
FIG. 22(continuation-part I)

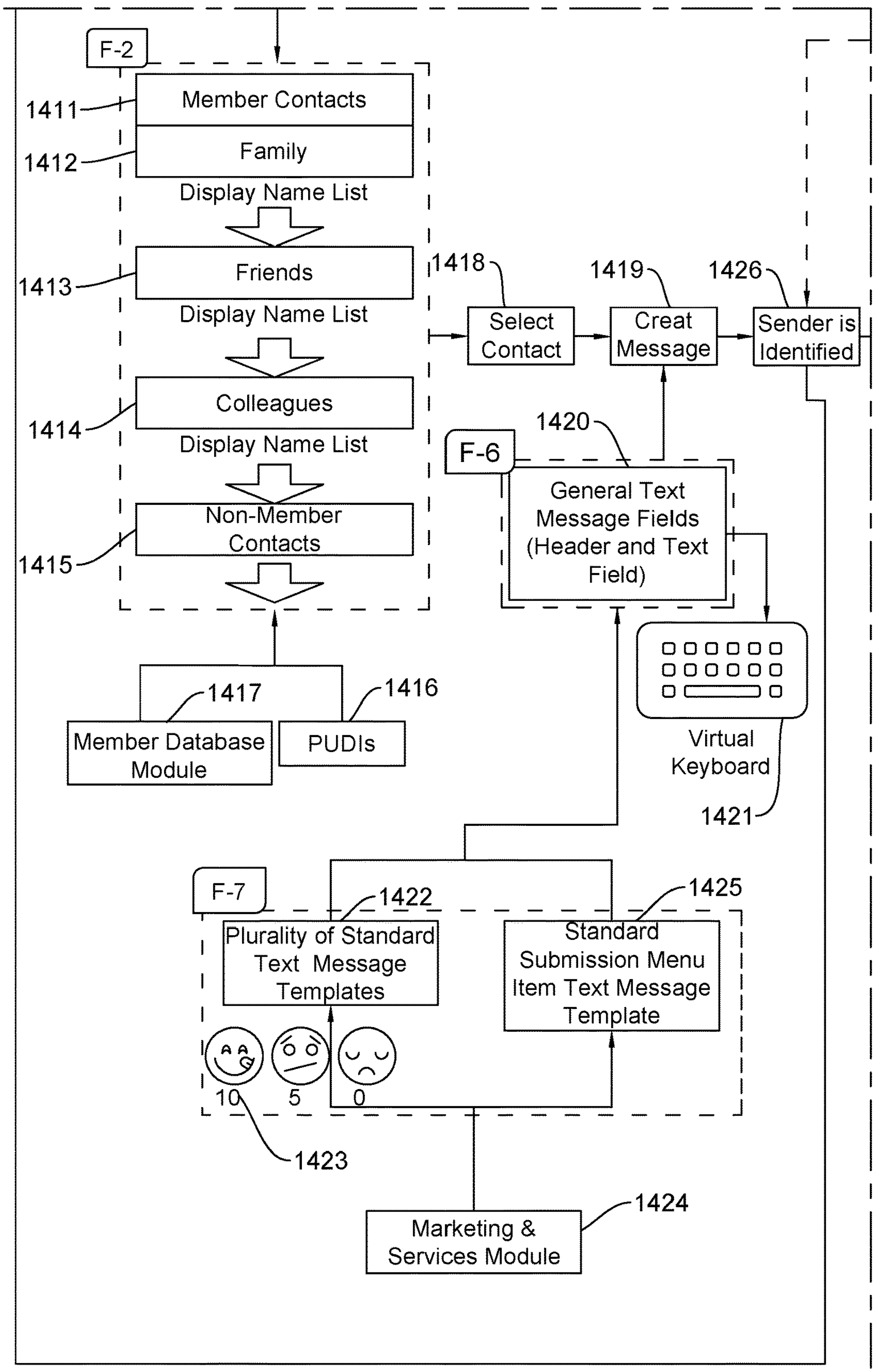
FIG. 23(continuation-part I)

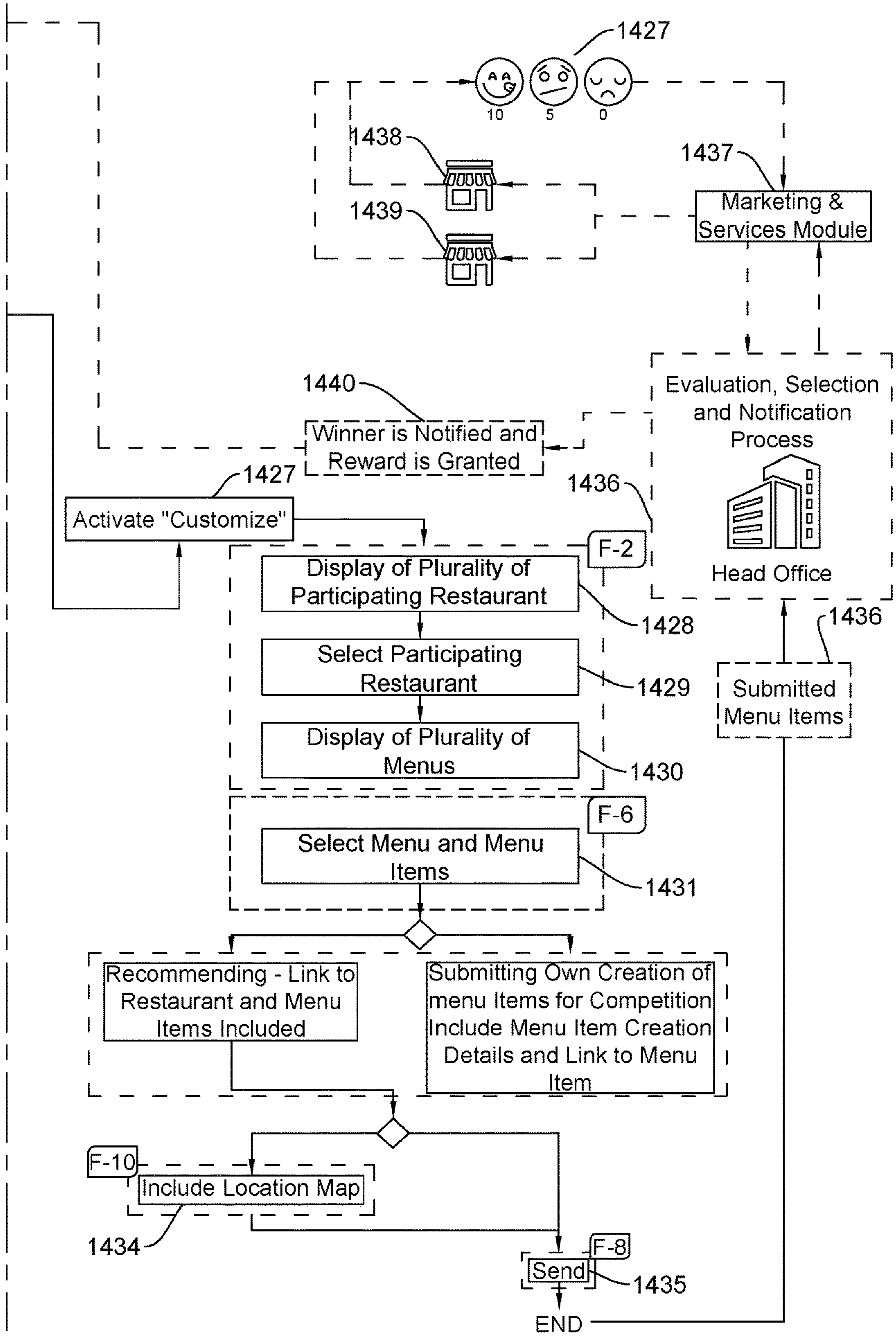
FIG. 23(continuation-part II)

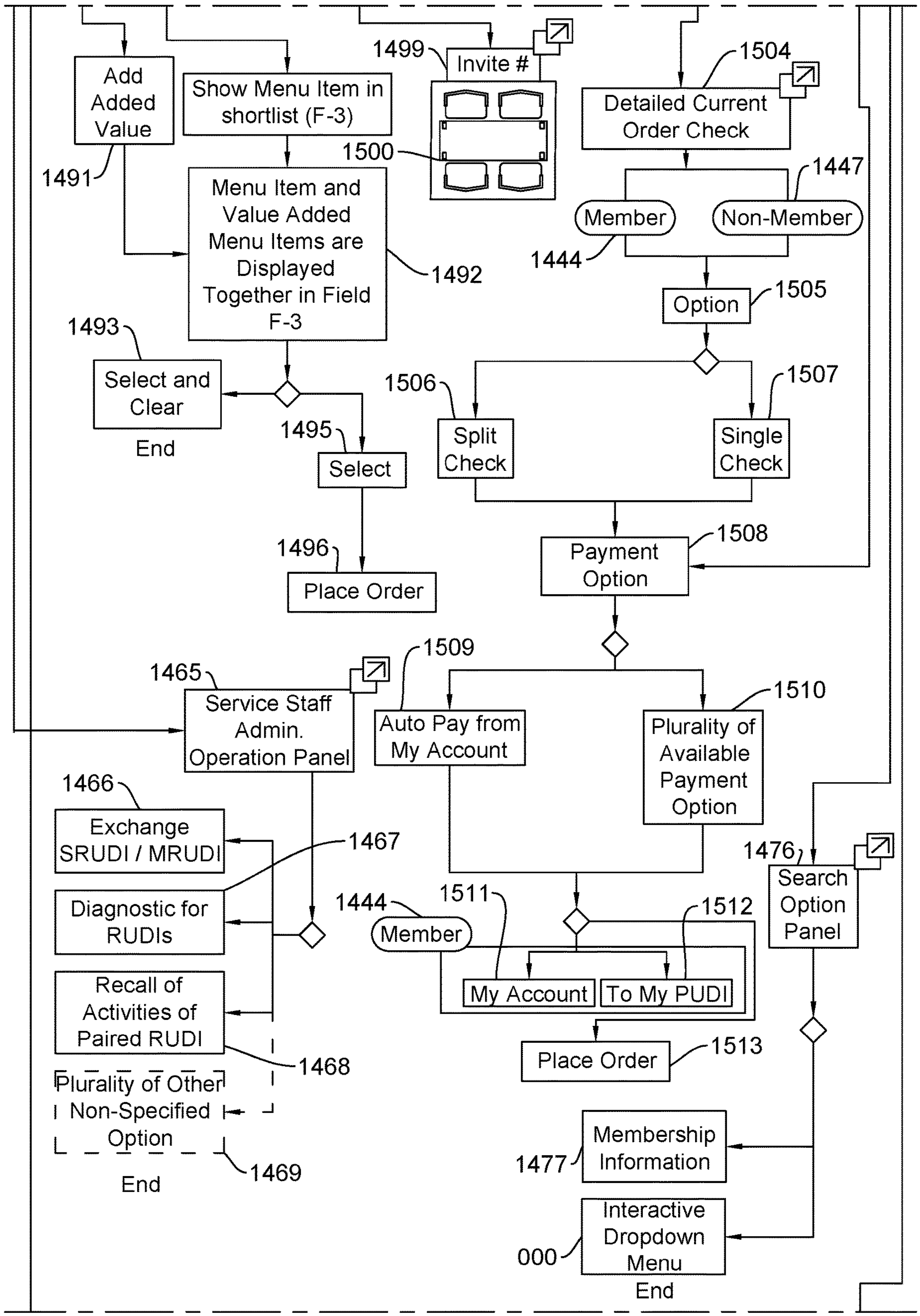
FIG. 24(continuation-part I)

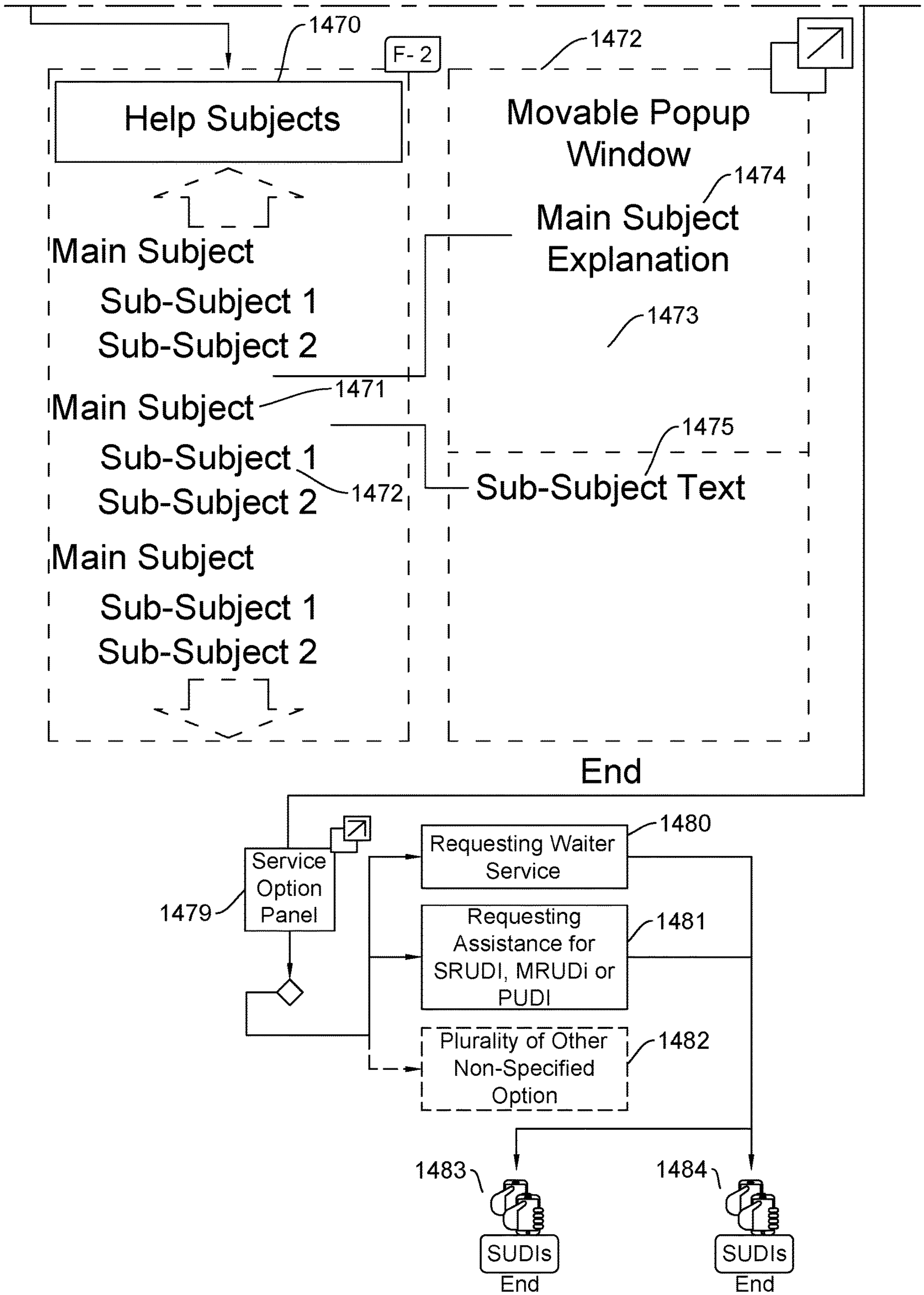
FIG. 24(continuation-part II)

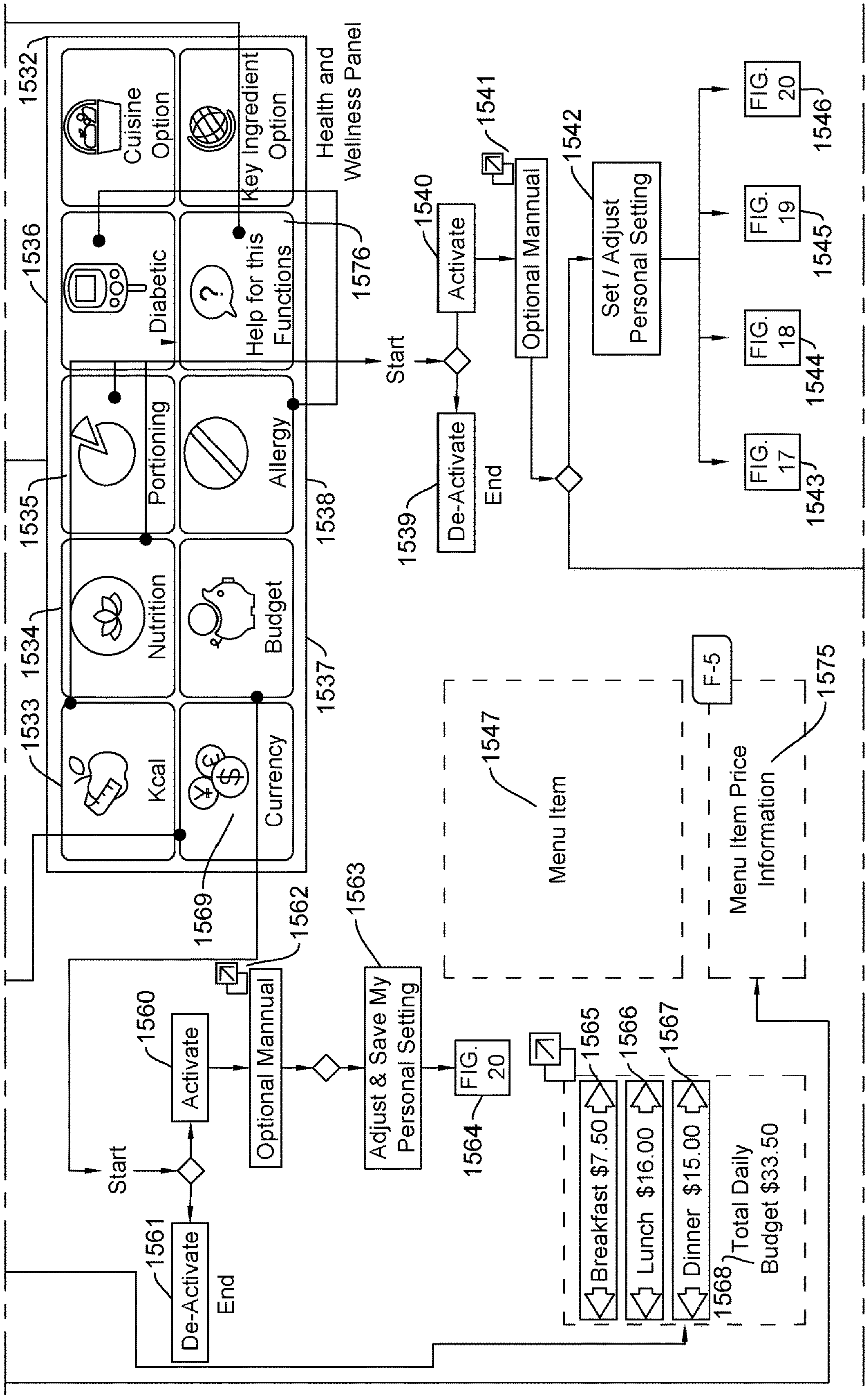
FIG. 25(continuation-part I)

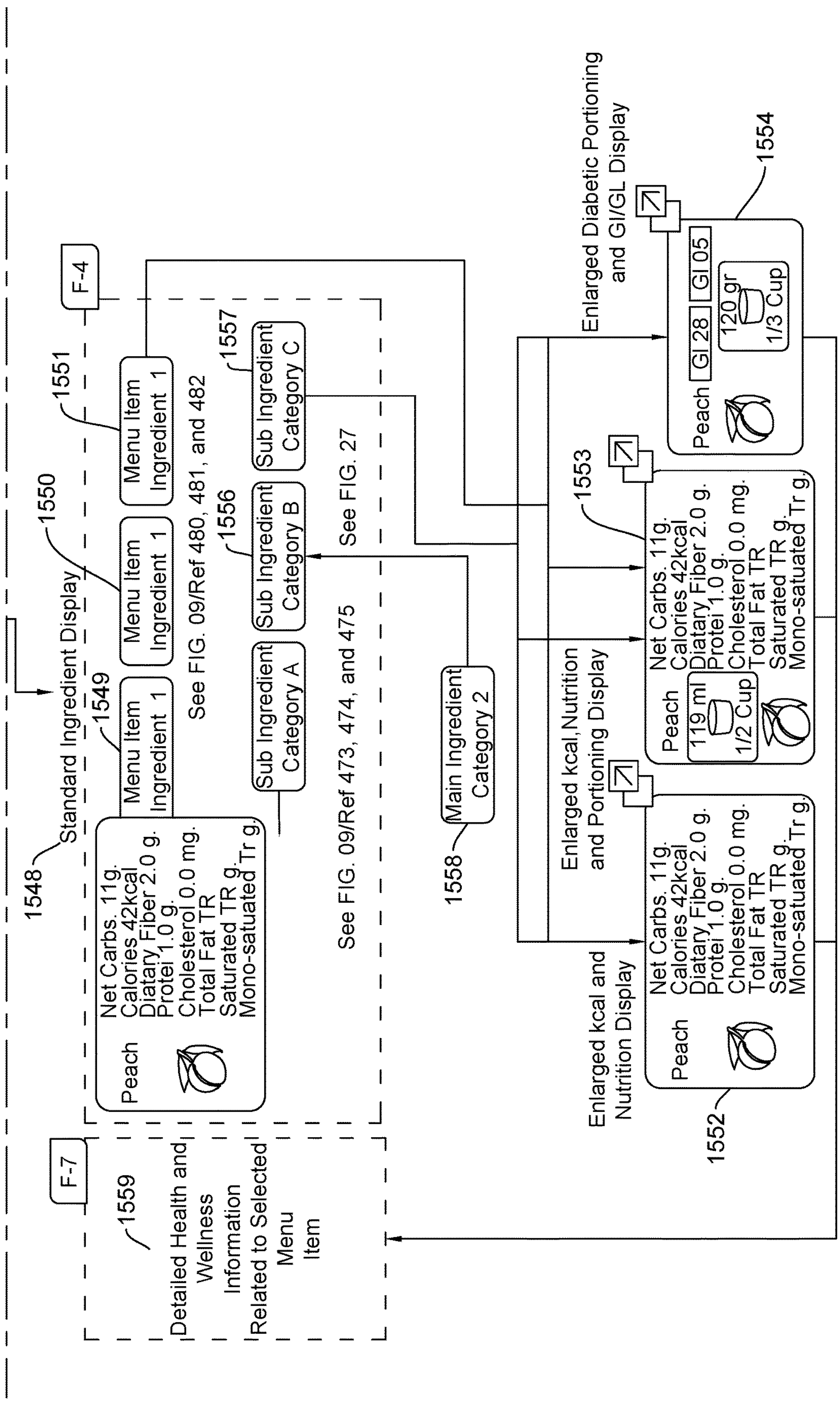
FIG. 25(continuation-part II)

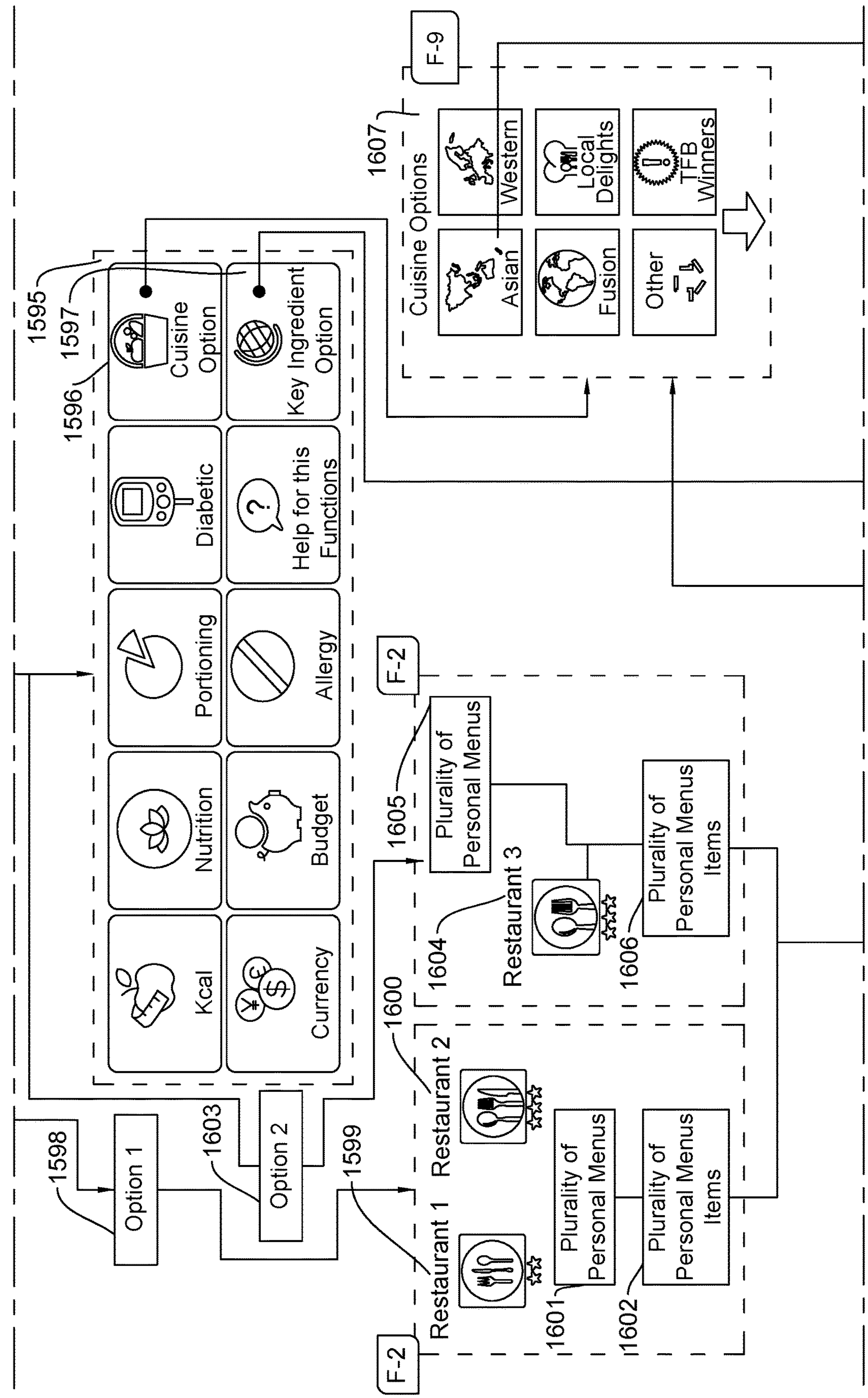
FIG. 26(continuation-part I)

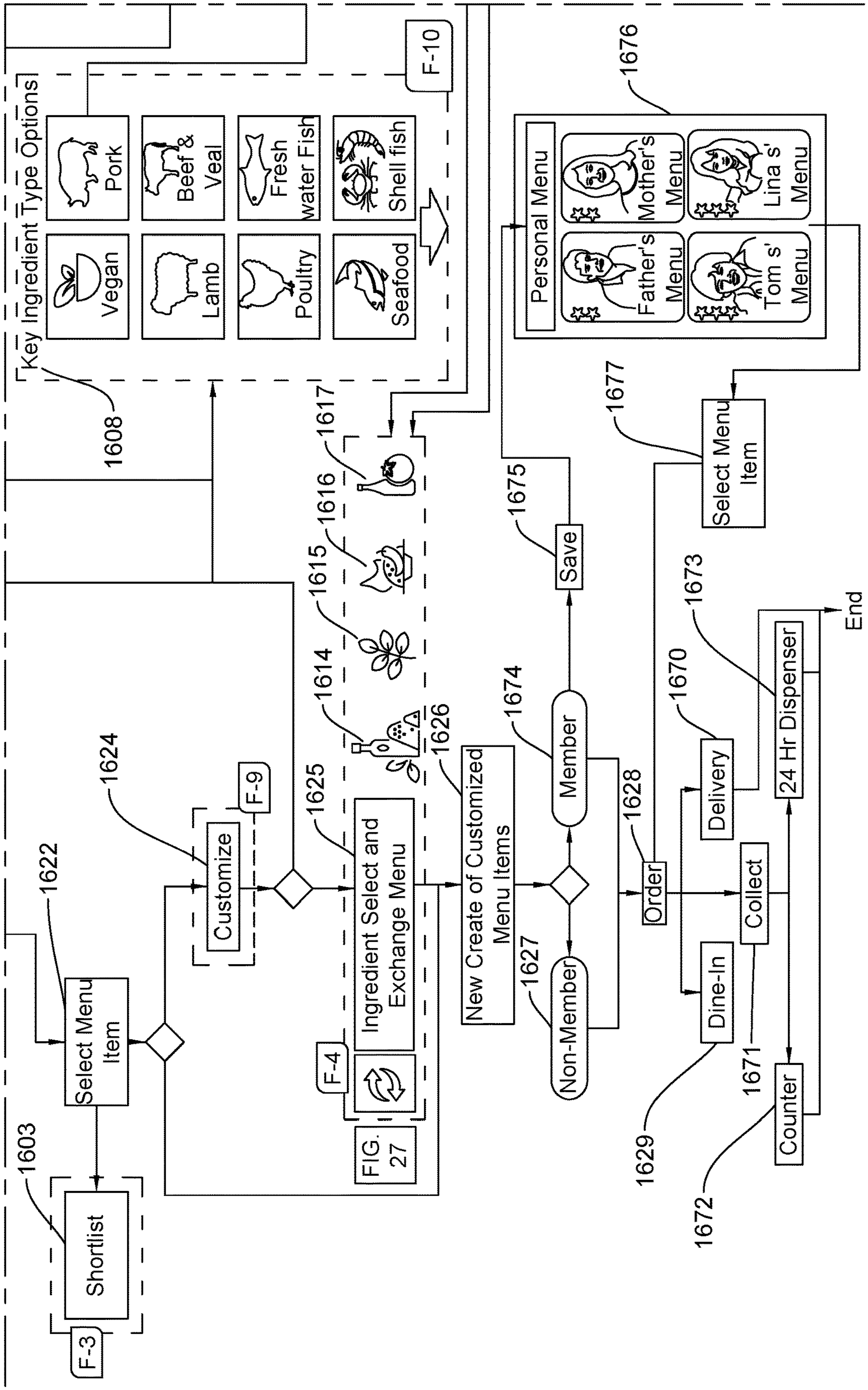
FIG. 26(continuation-part II)

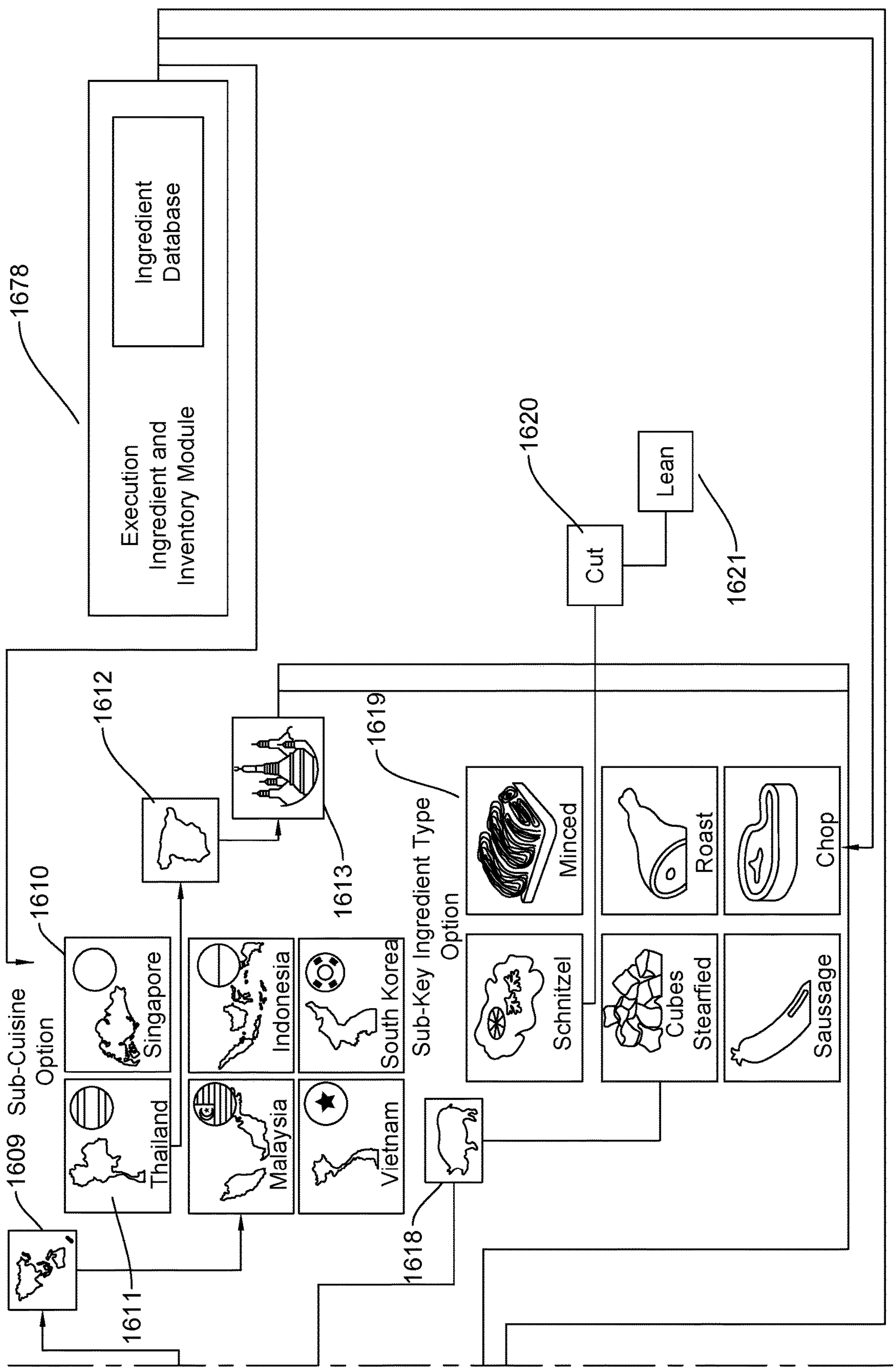
FIG. 26(continuation-part III)

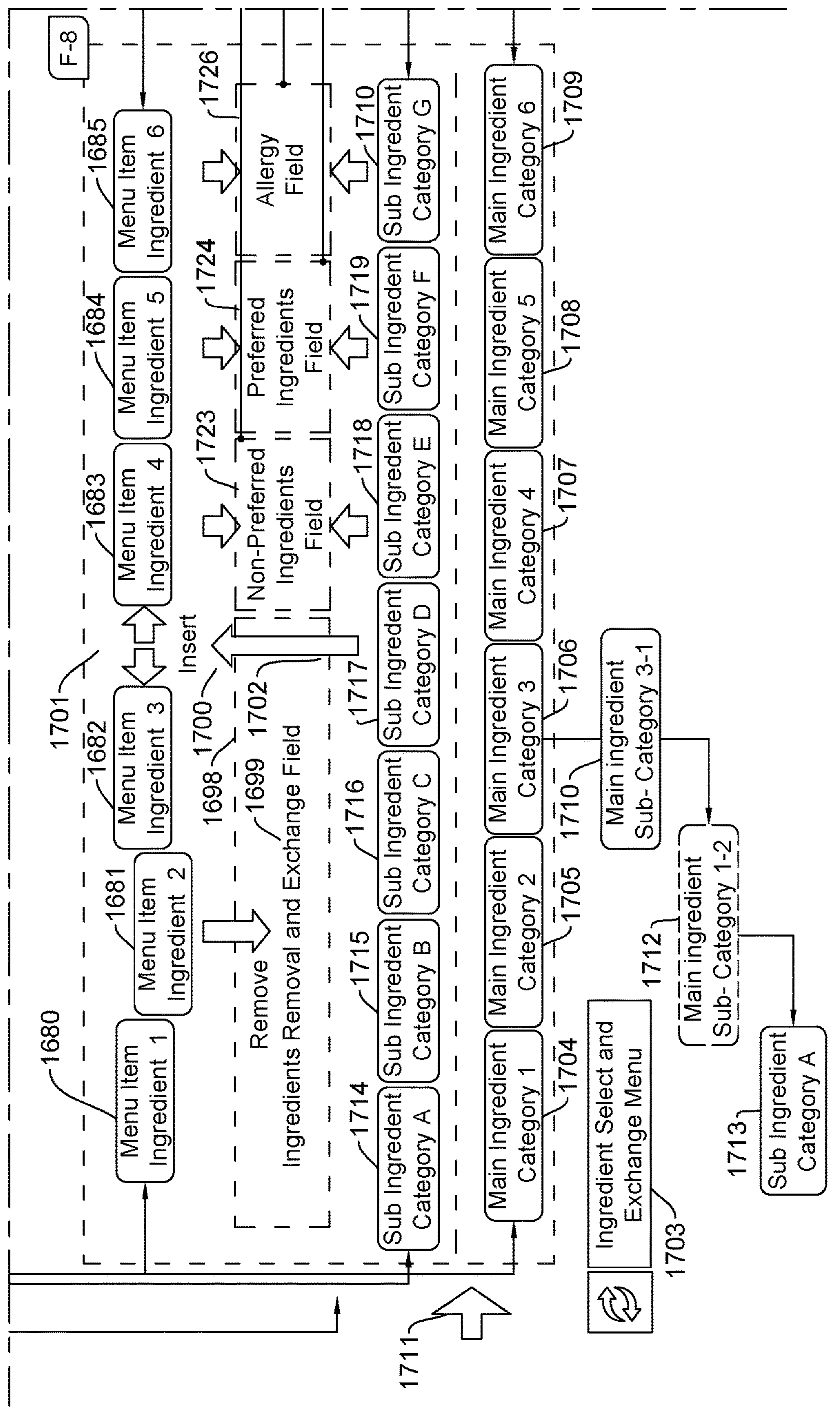
FIG. 27(continuation-part I)

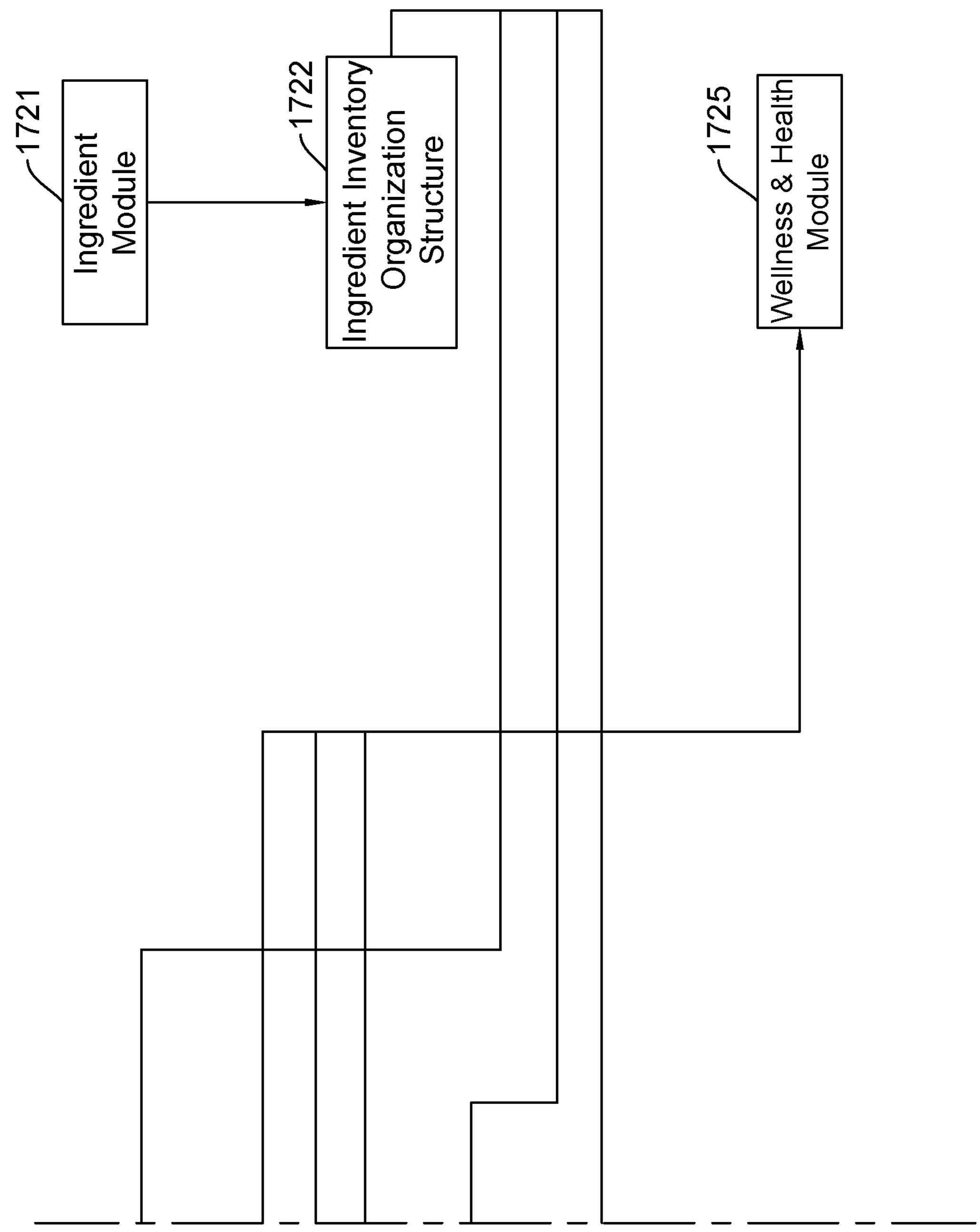
FIG. 27(continuation-part II)

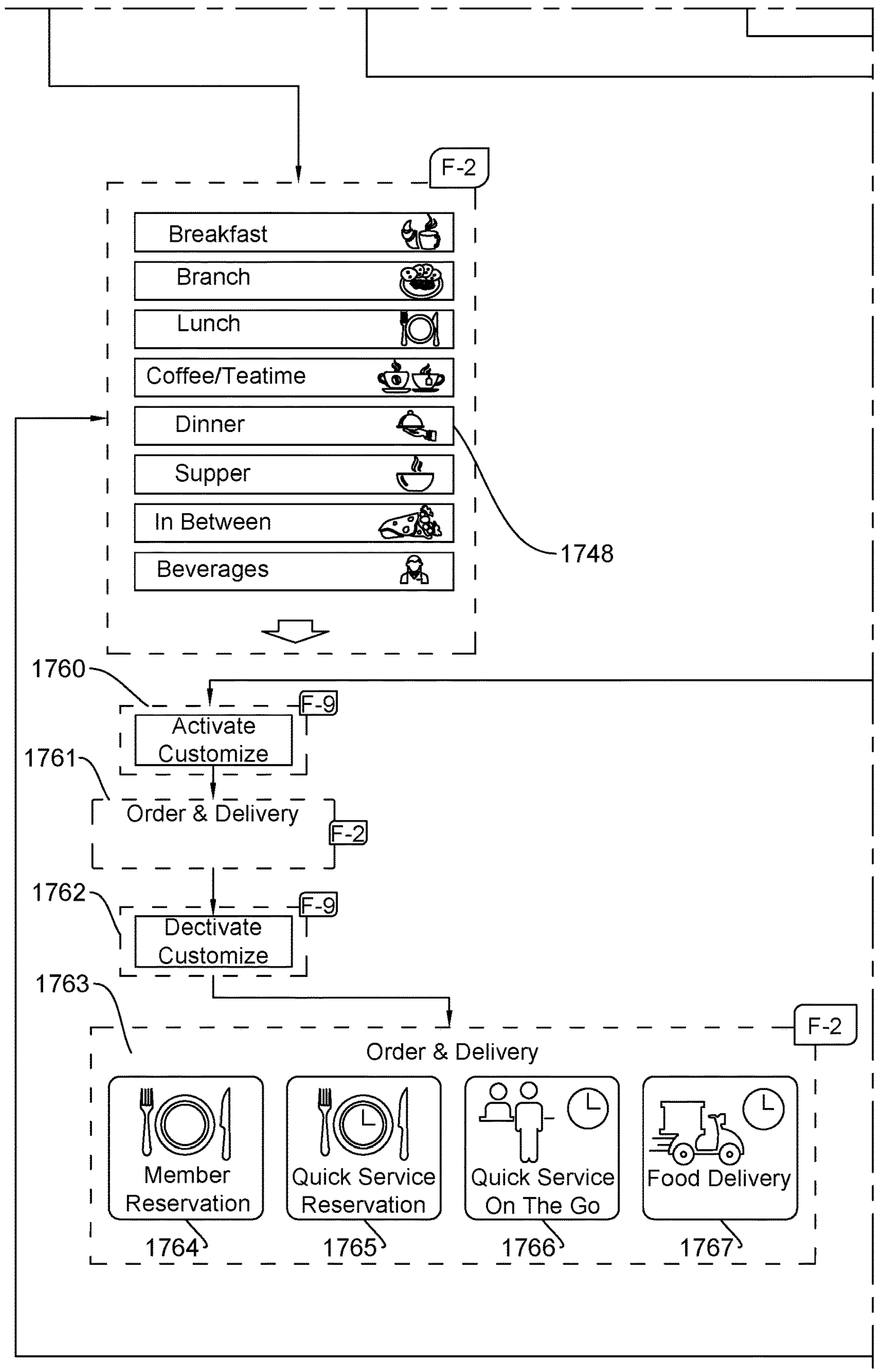
FIG. 28(continuation-part I)

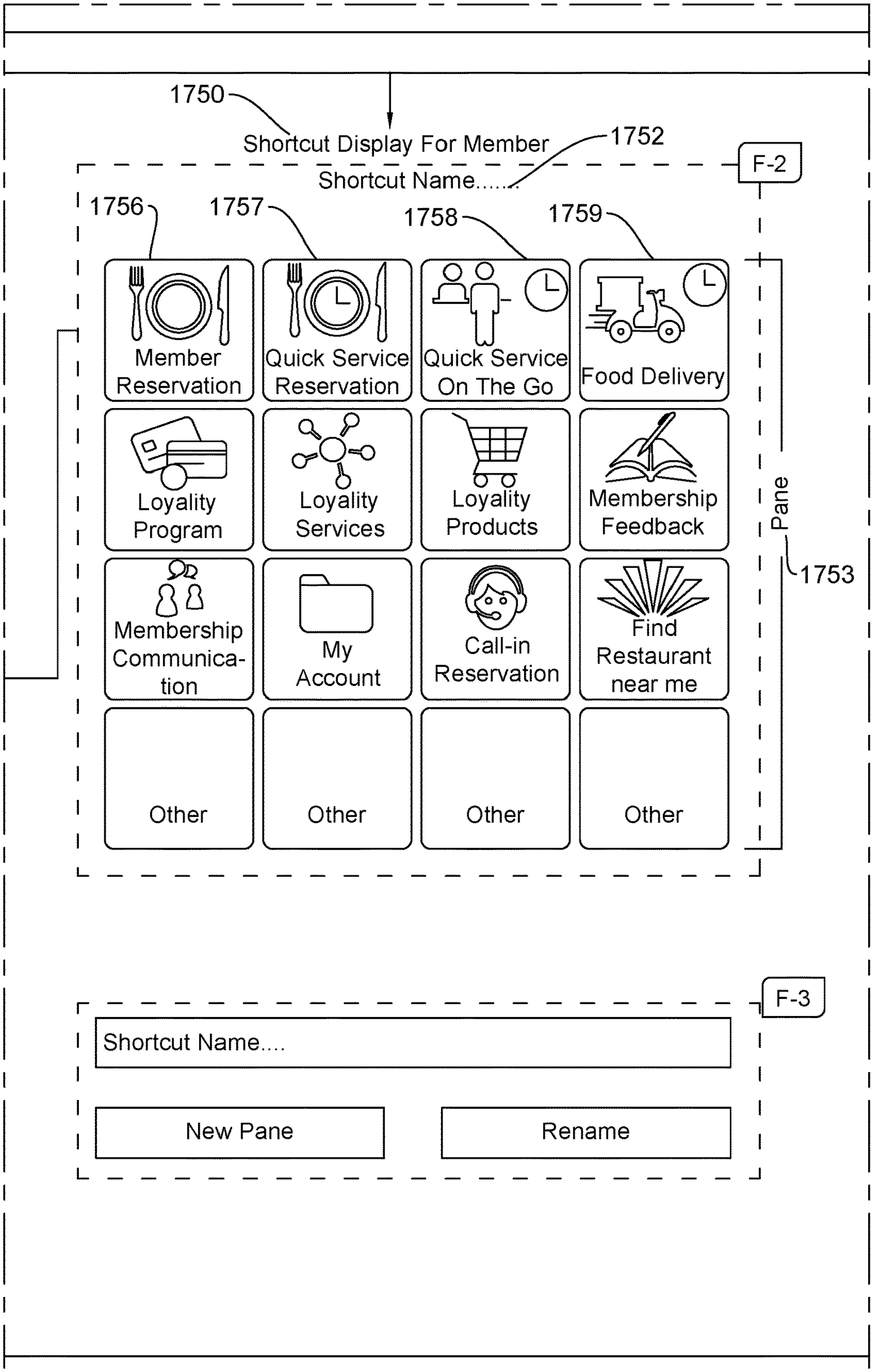
FIG. 28(continuation-part II)

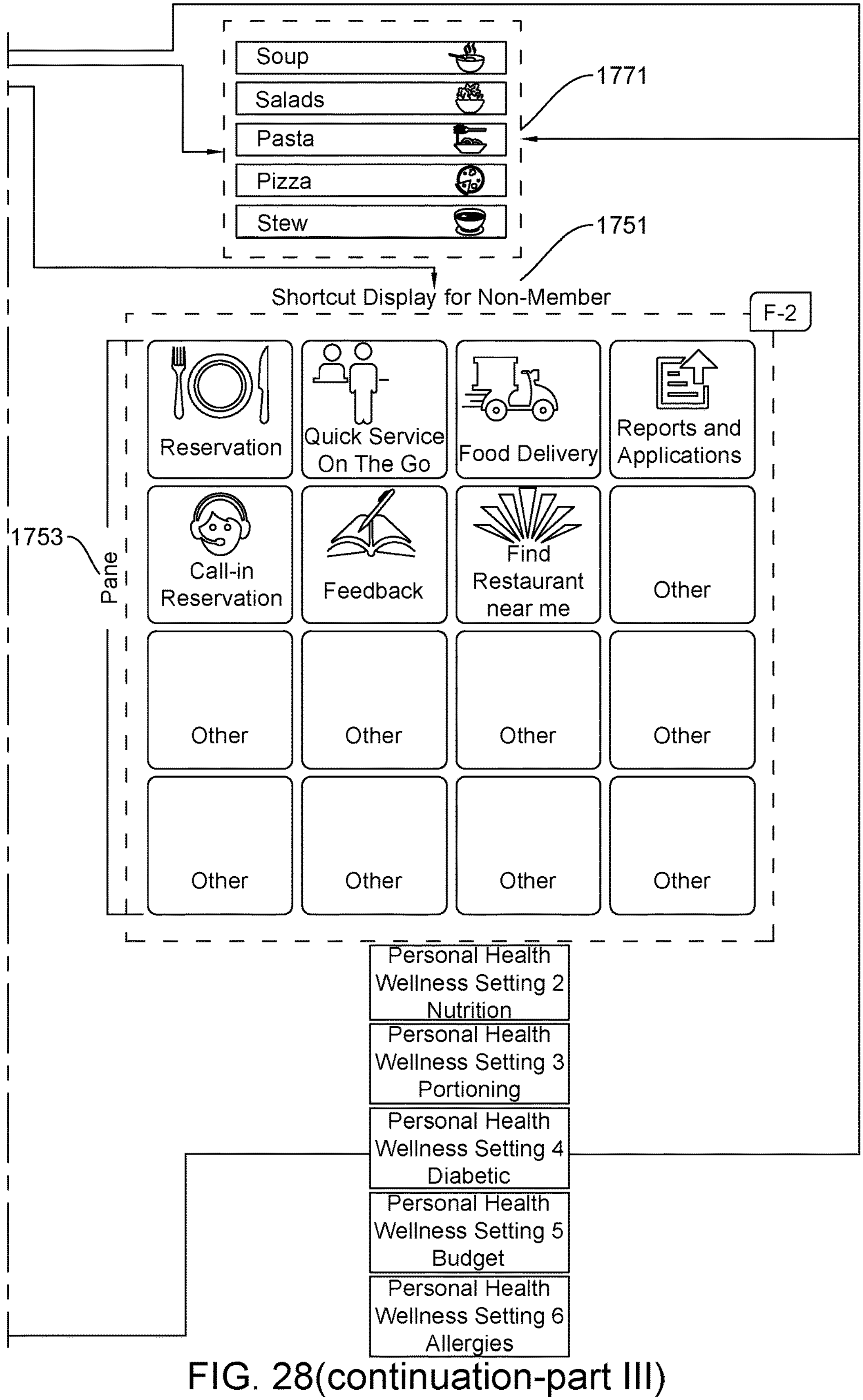
FIG. 28(continuation-part III)

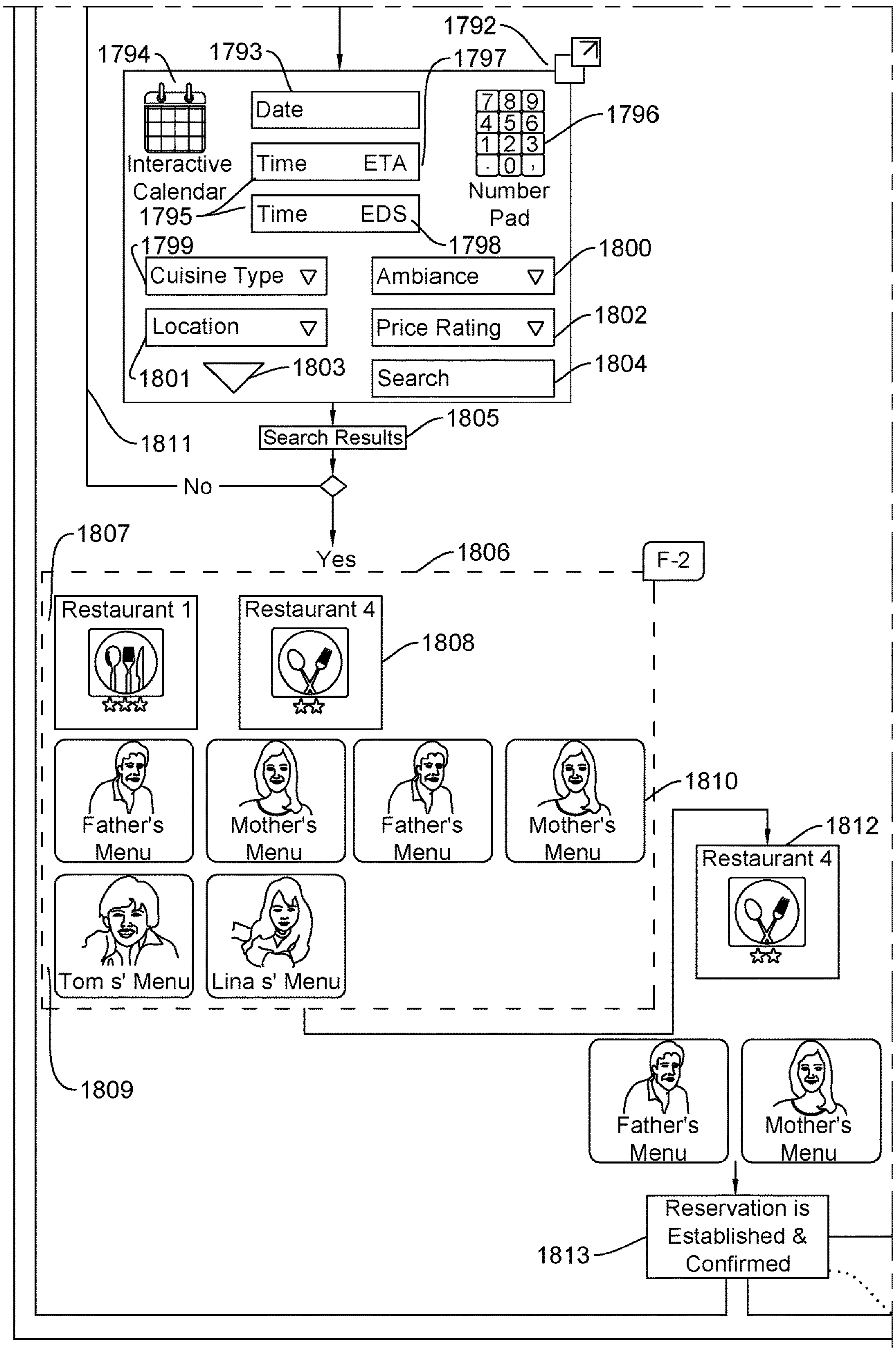
FIG. 29(continuation-part I)

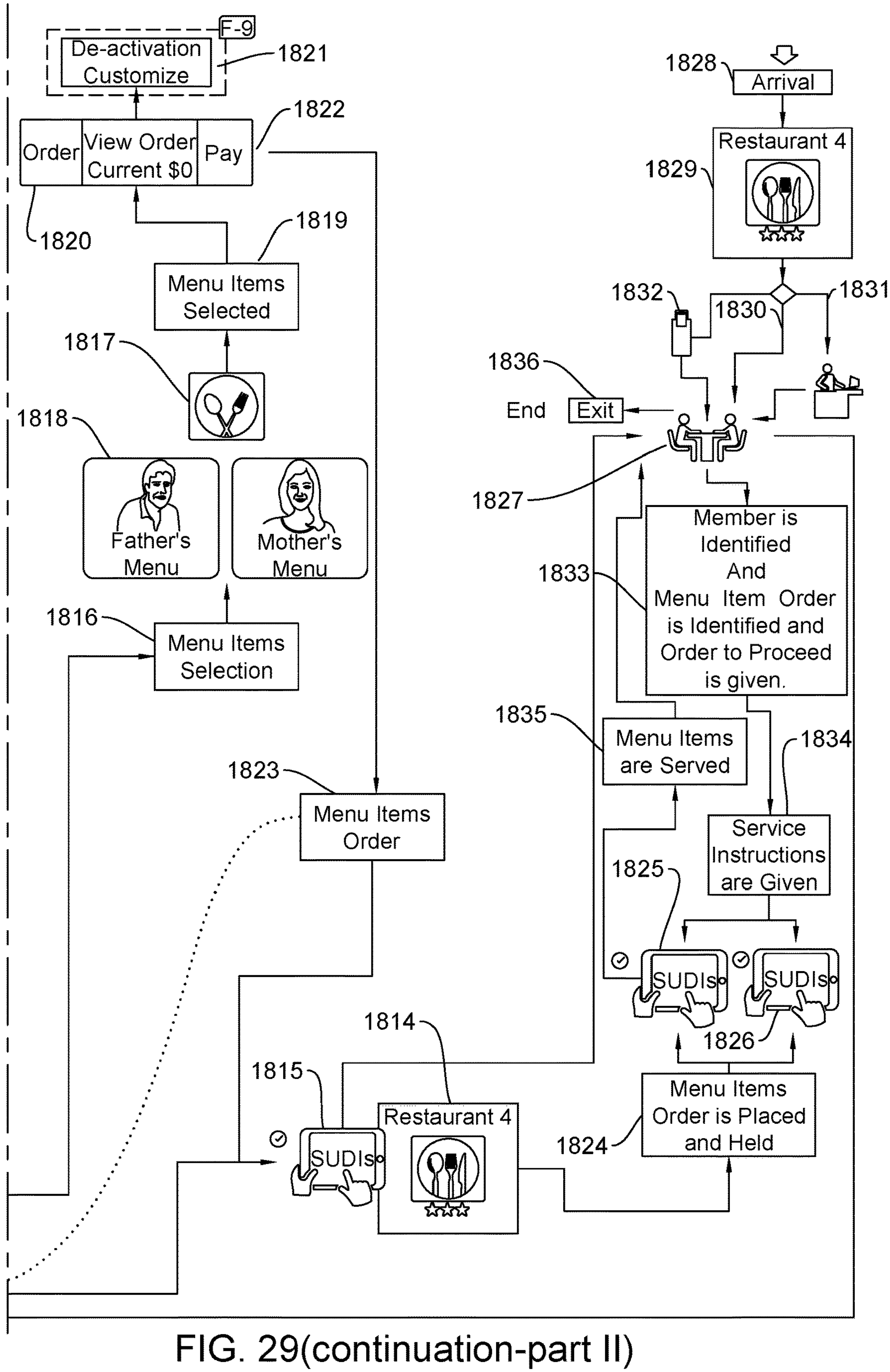
FIG. 29(continuation-part II)

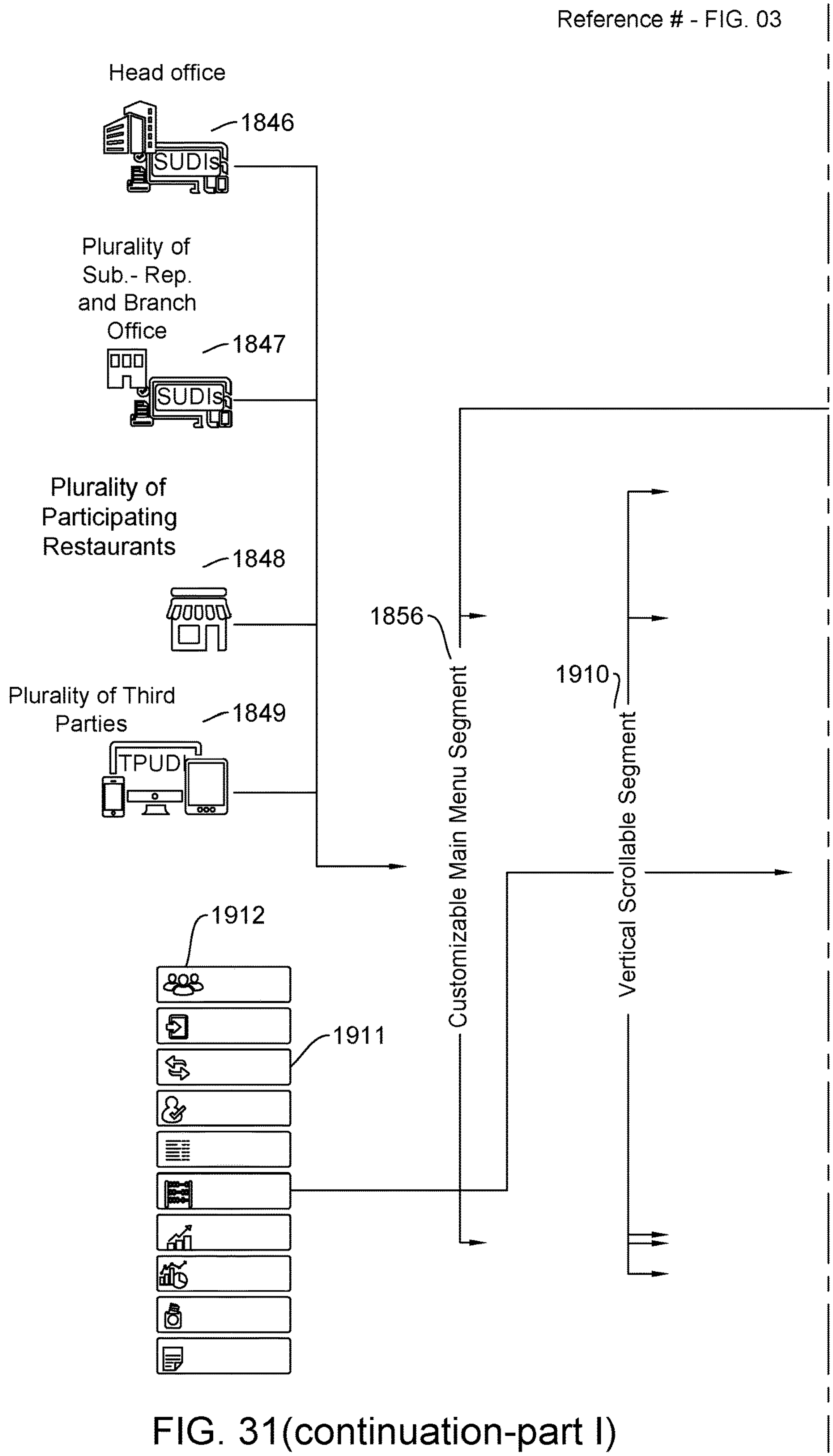
FIG. 31(continuation-part I)

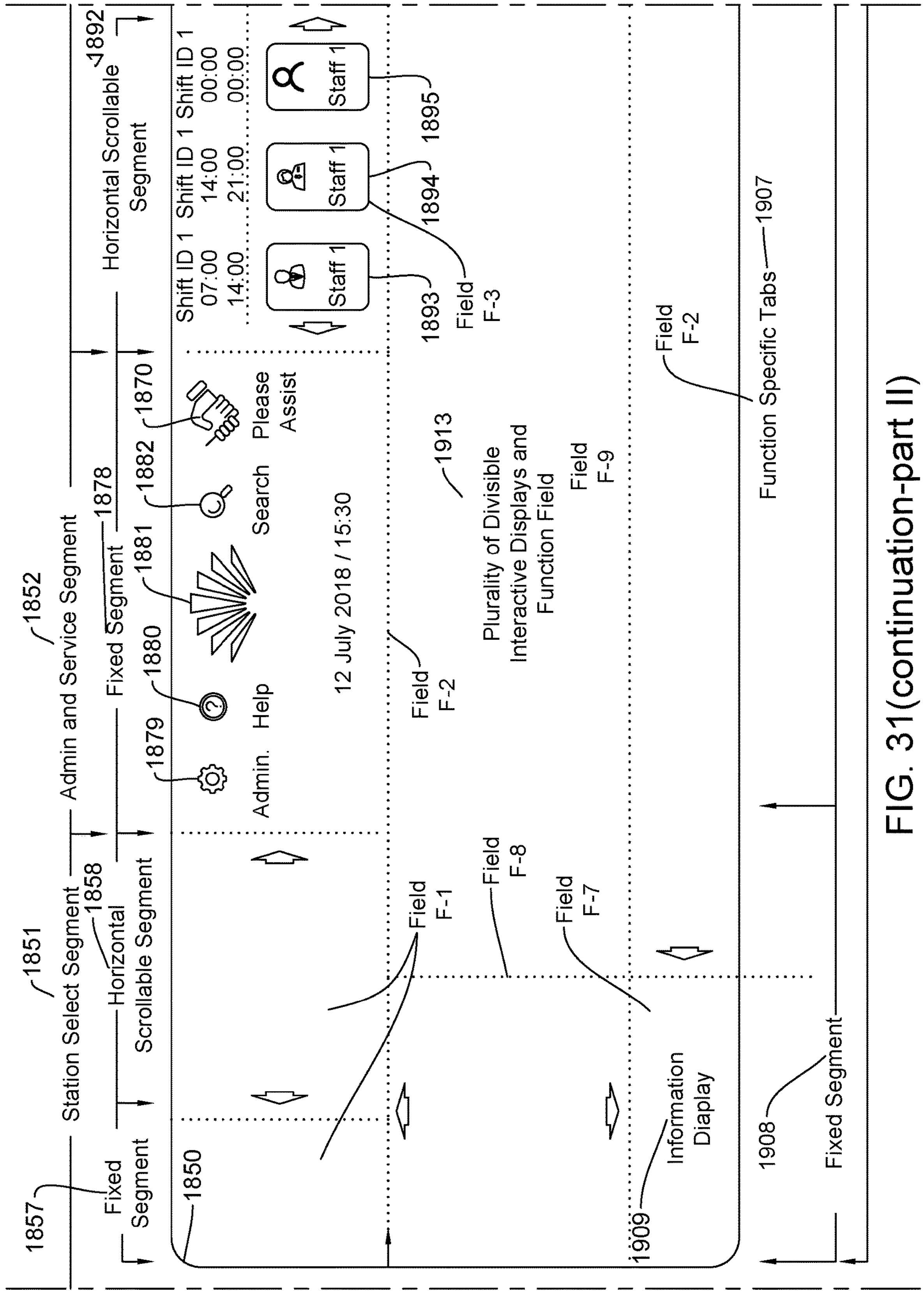
FIG. 31(continuation-part II)

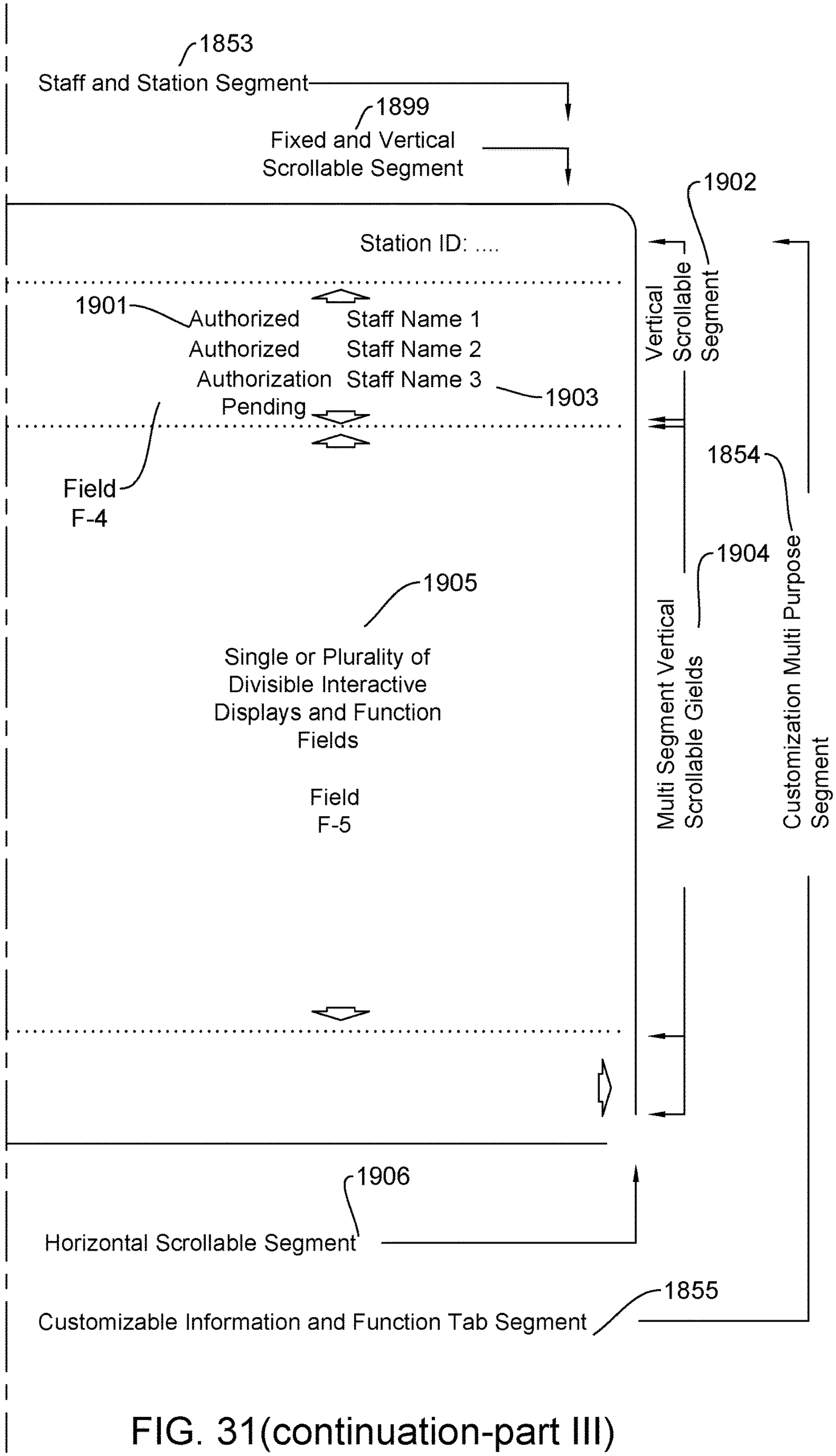
FIG. 31(continuation-part III)

Exemplary SUDI Landing Screen For Manager Office Station

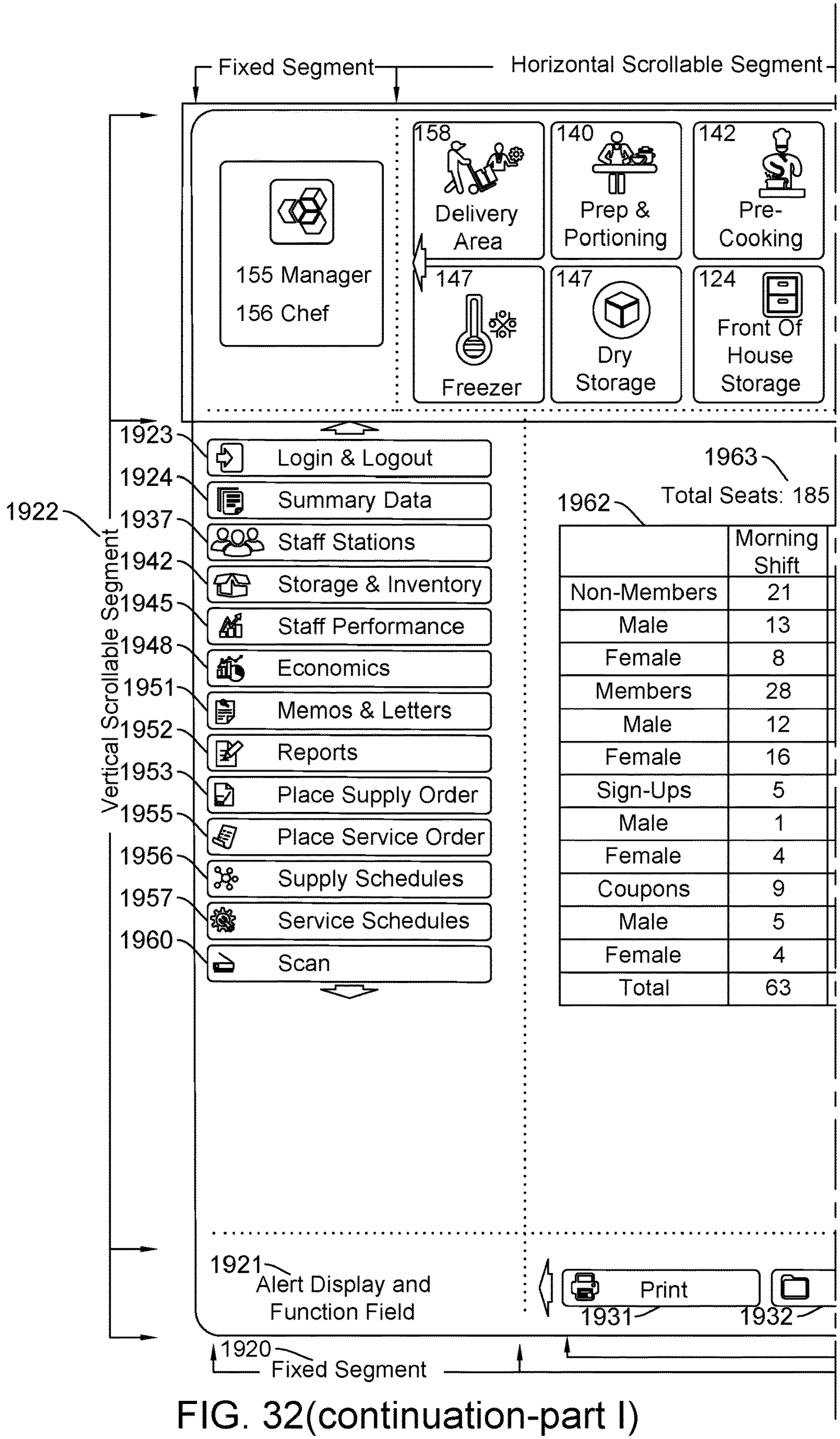
FIG. 32(continuation-part I)

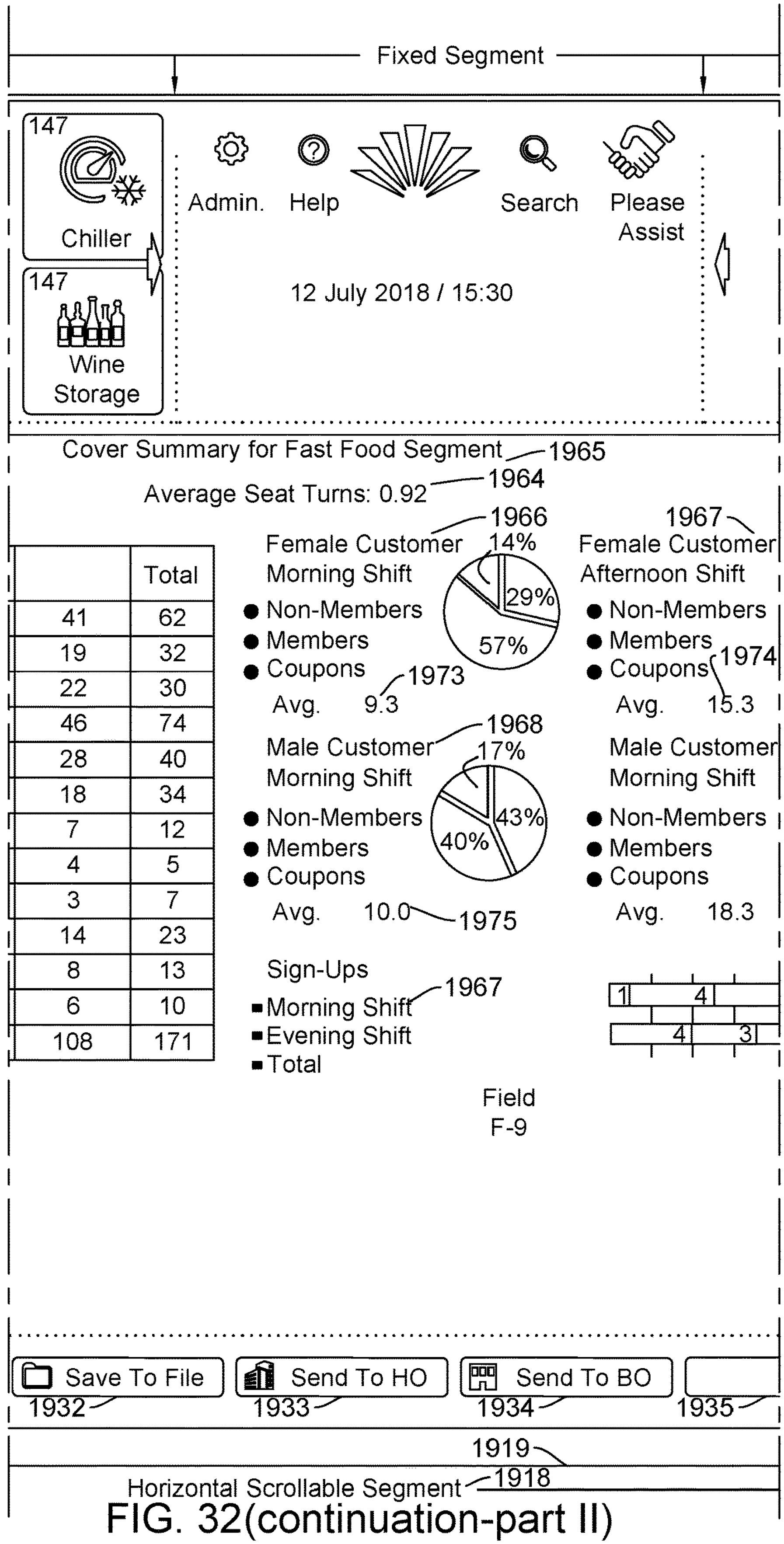
FIG. 32(continuation-part II)

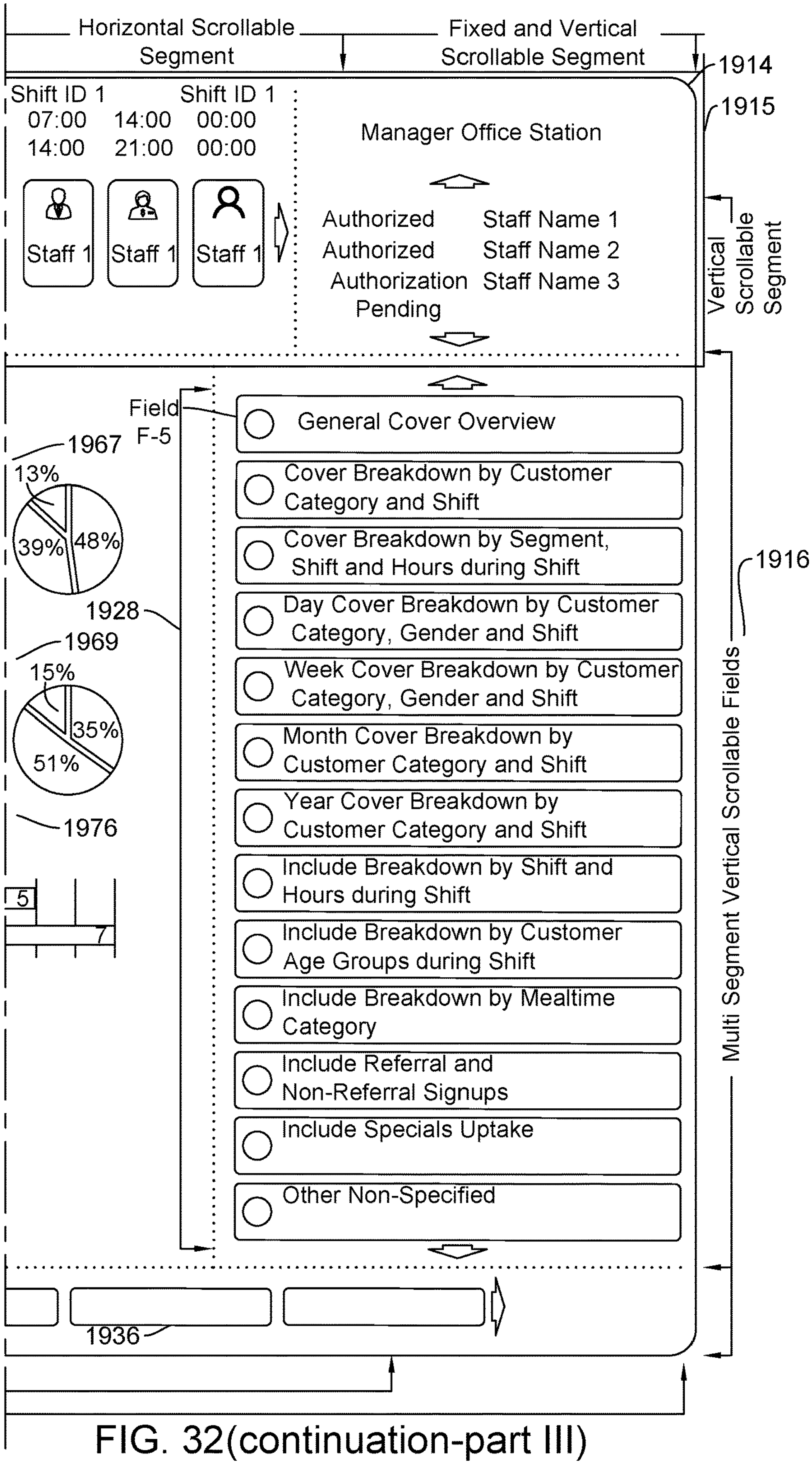
FIG. 32(continuation-part III)

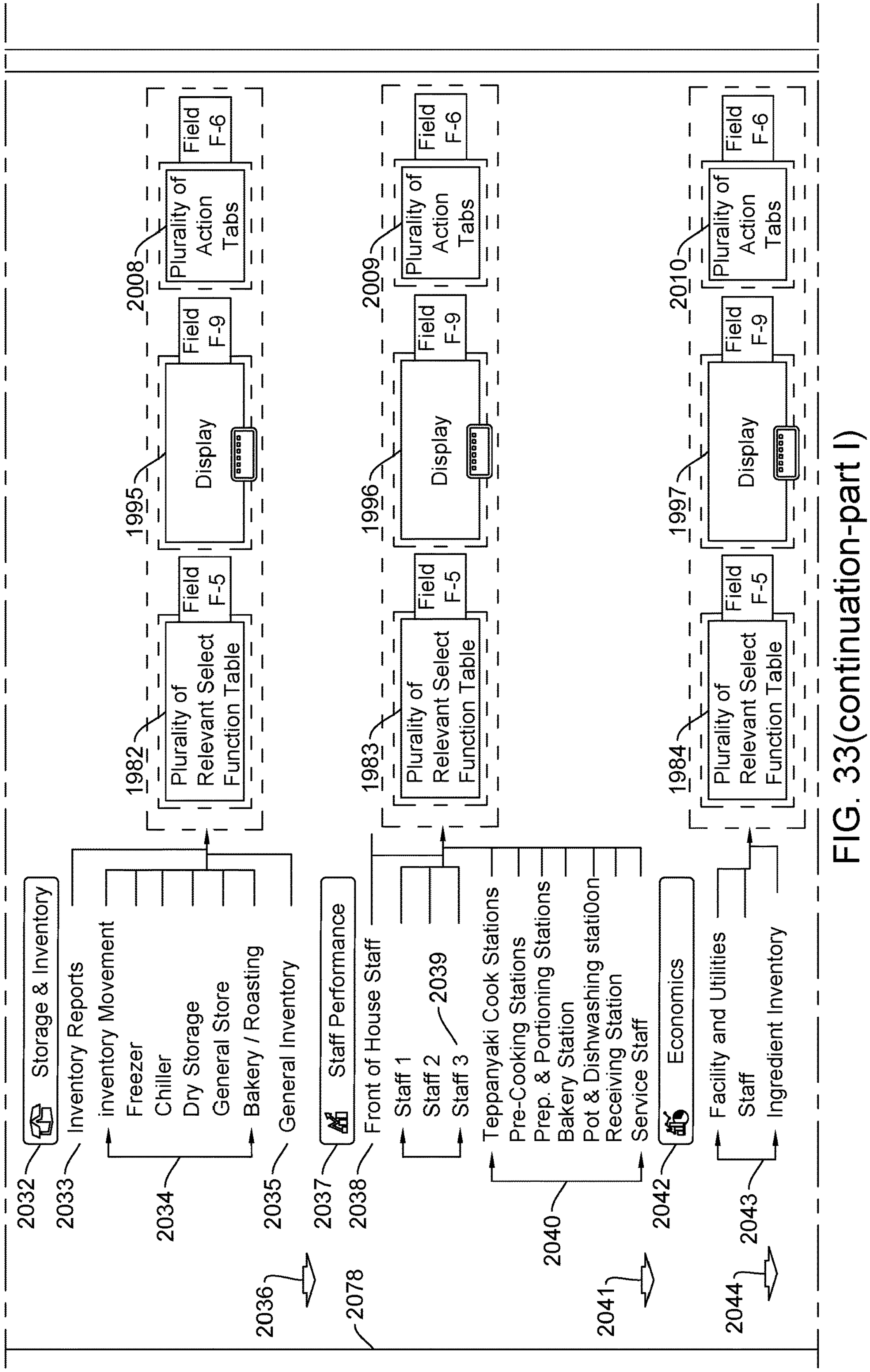
FIG. 33(continuation-part I)

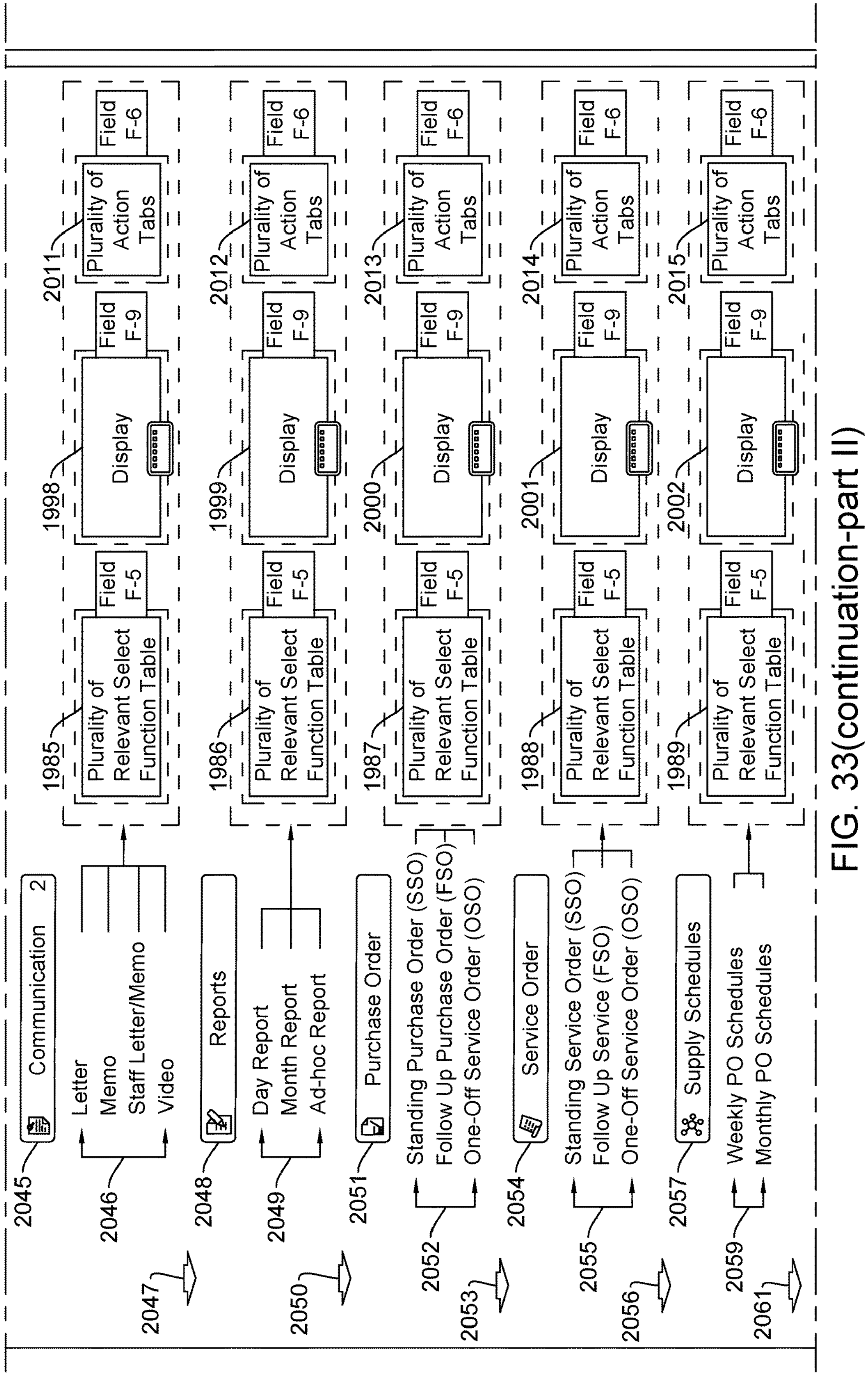
FIG. 33(continuation-part II)

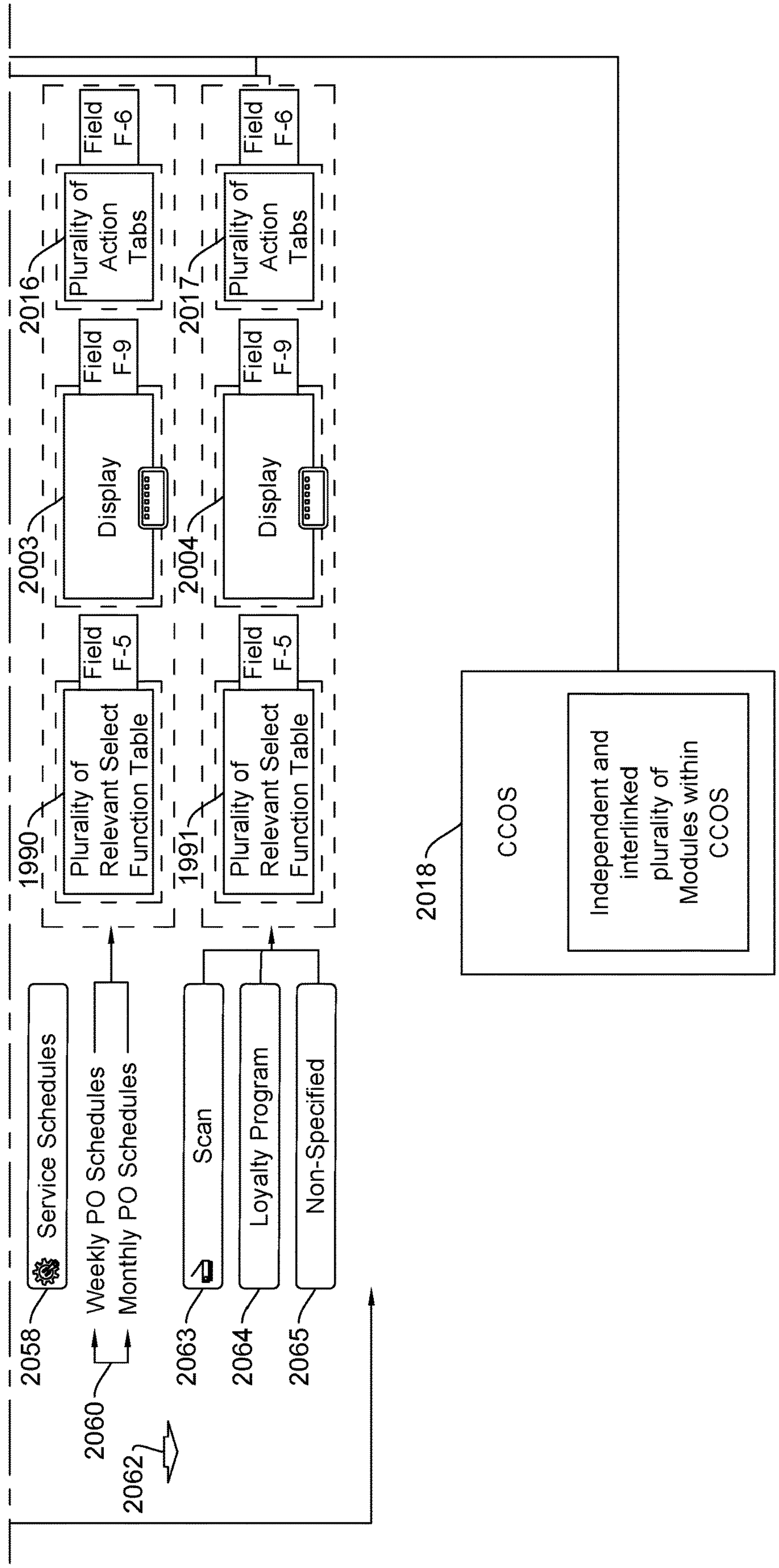
FIG. 33(continuation-part III)

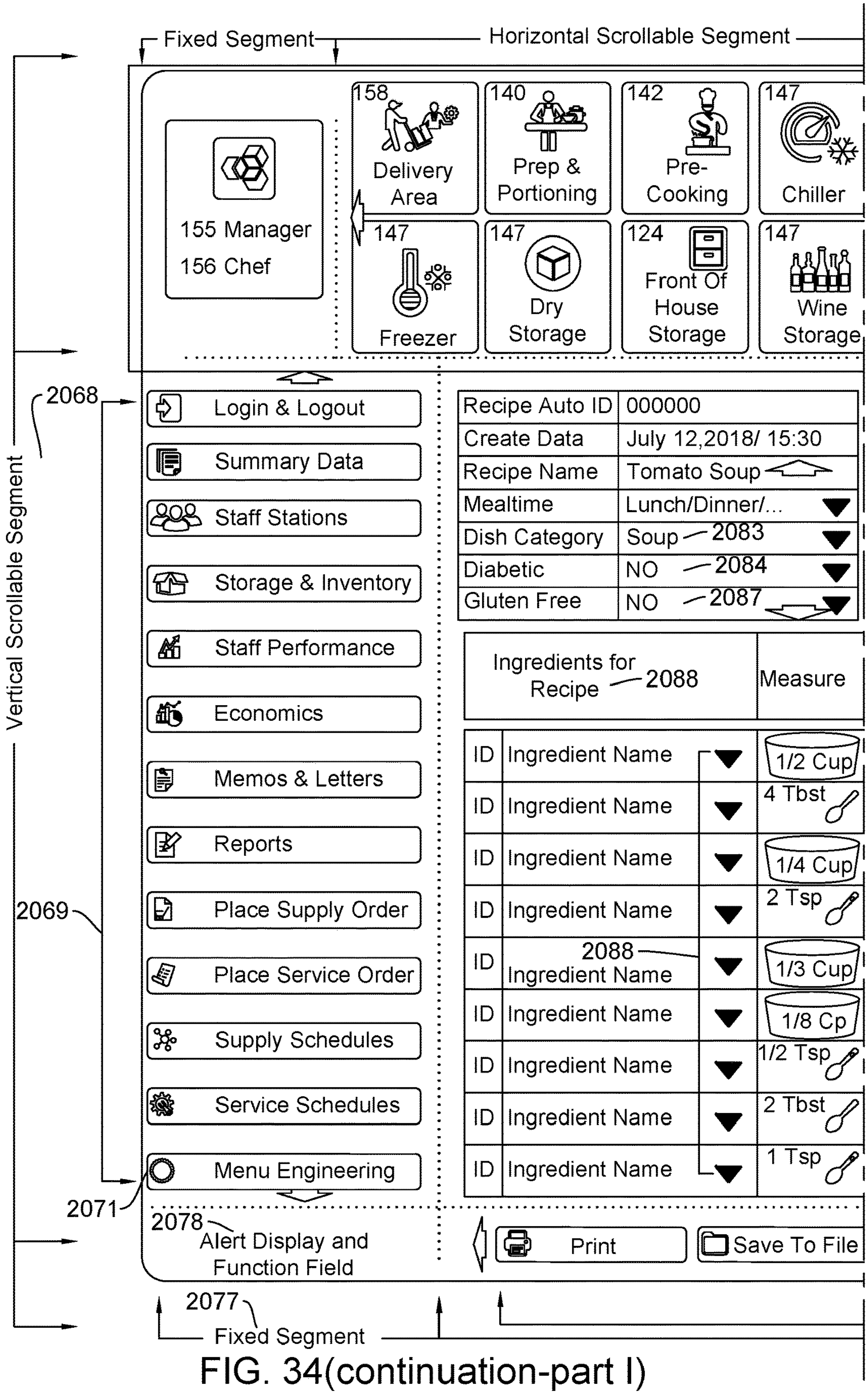
FIG. 34(continuation-part I)

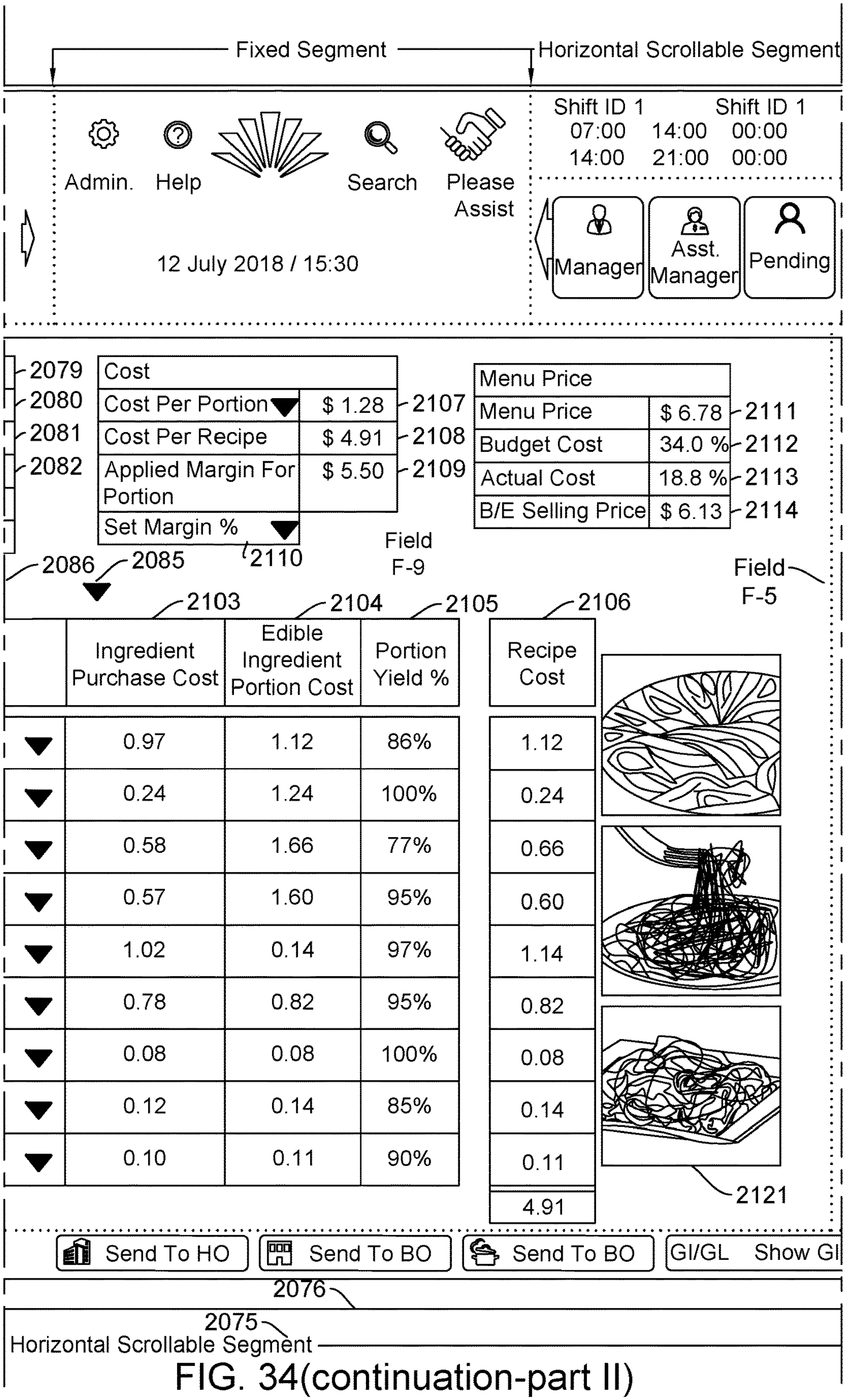
FIG. 34(continuation-part II)

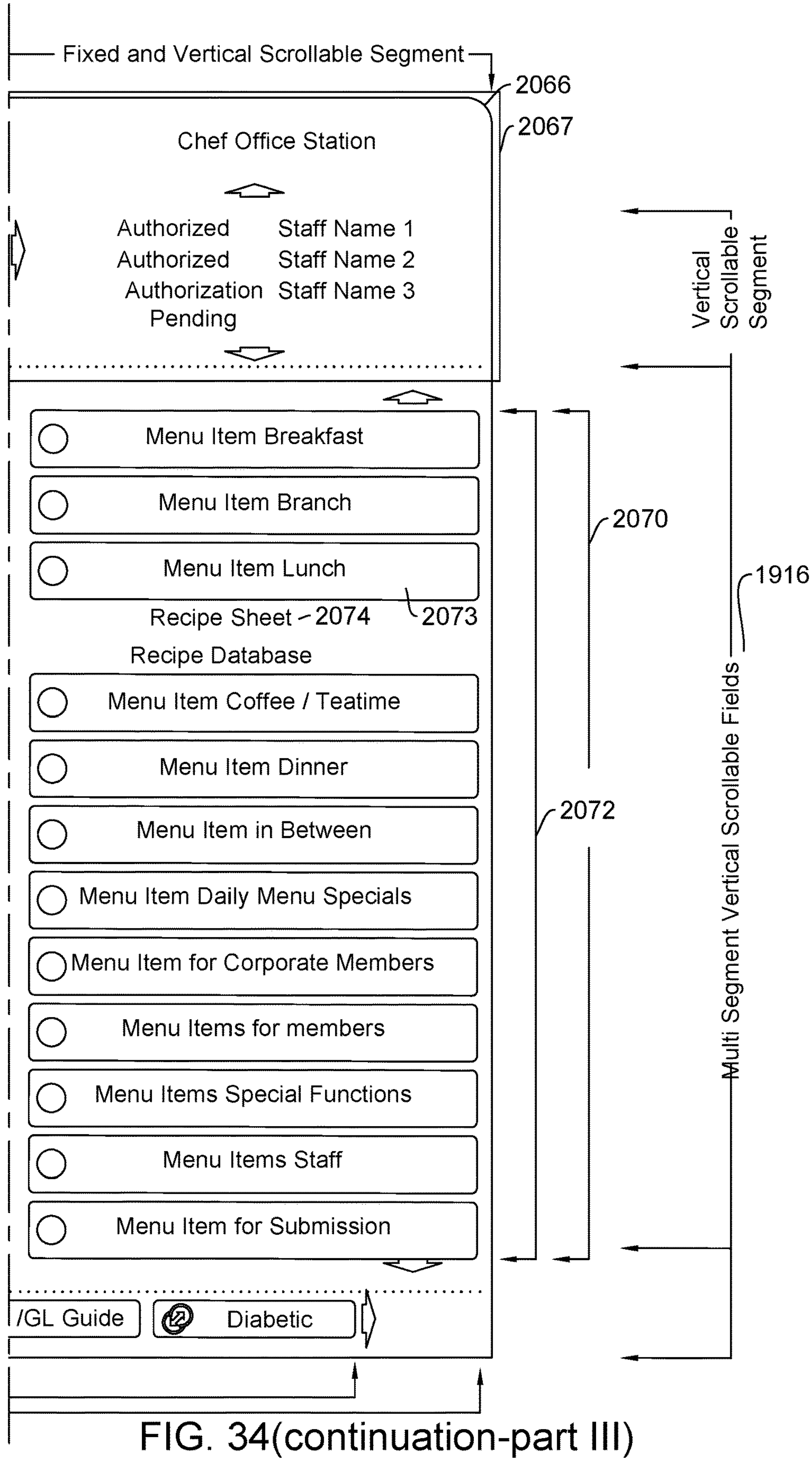
FIG. 34(continuation-part III)

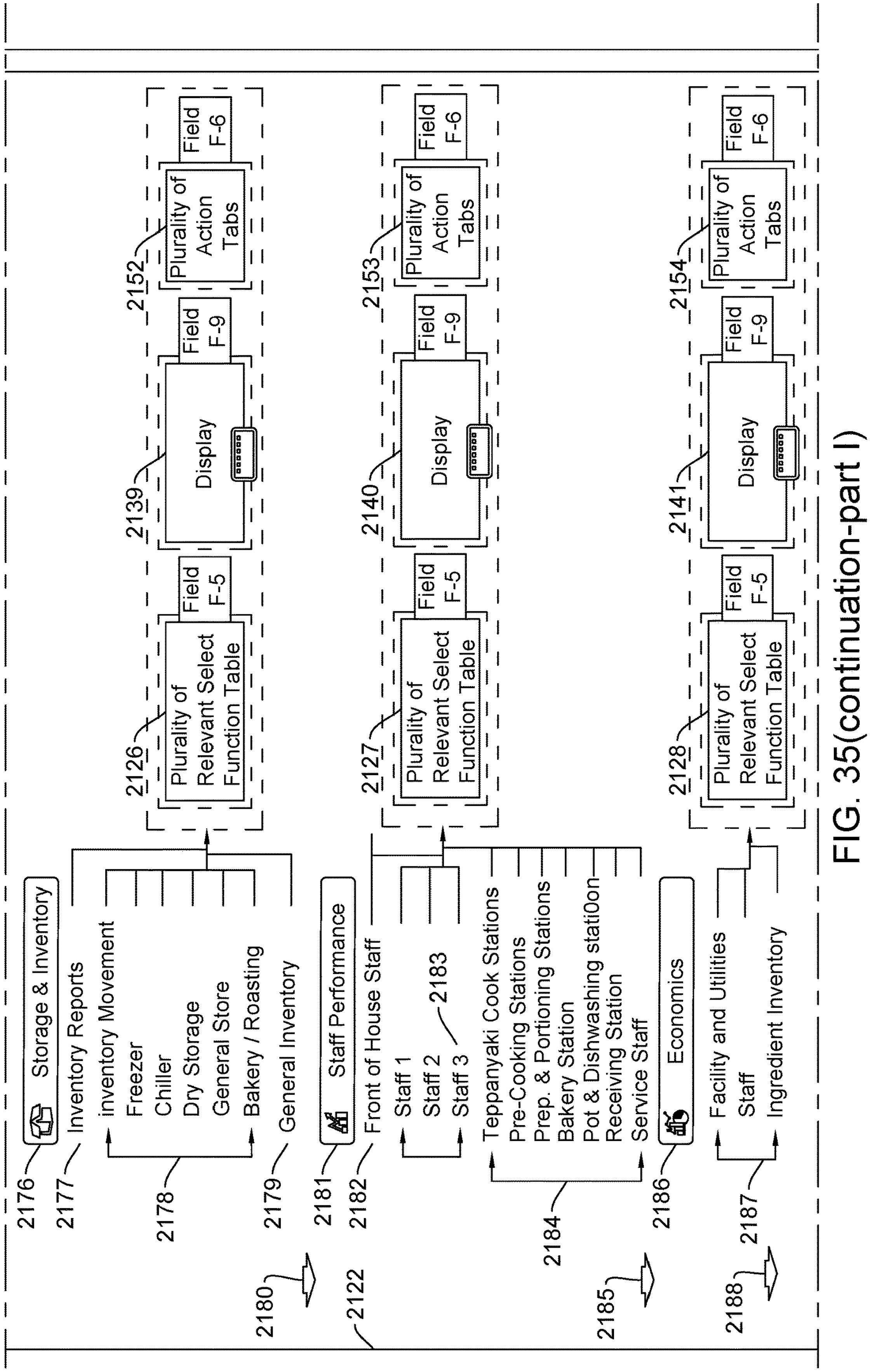
FIG. 35(continuation-part I)

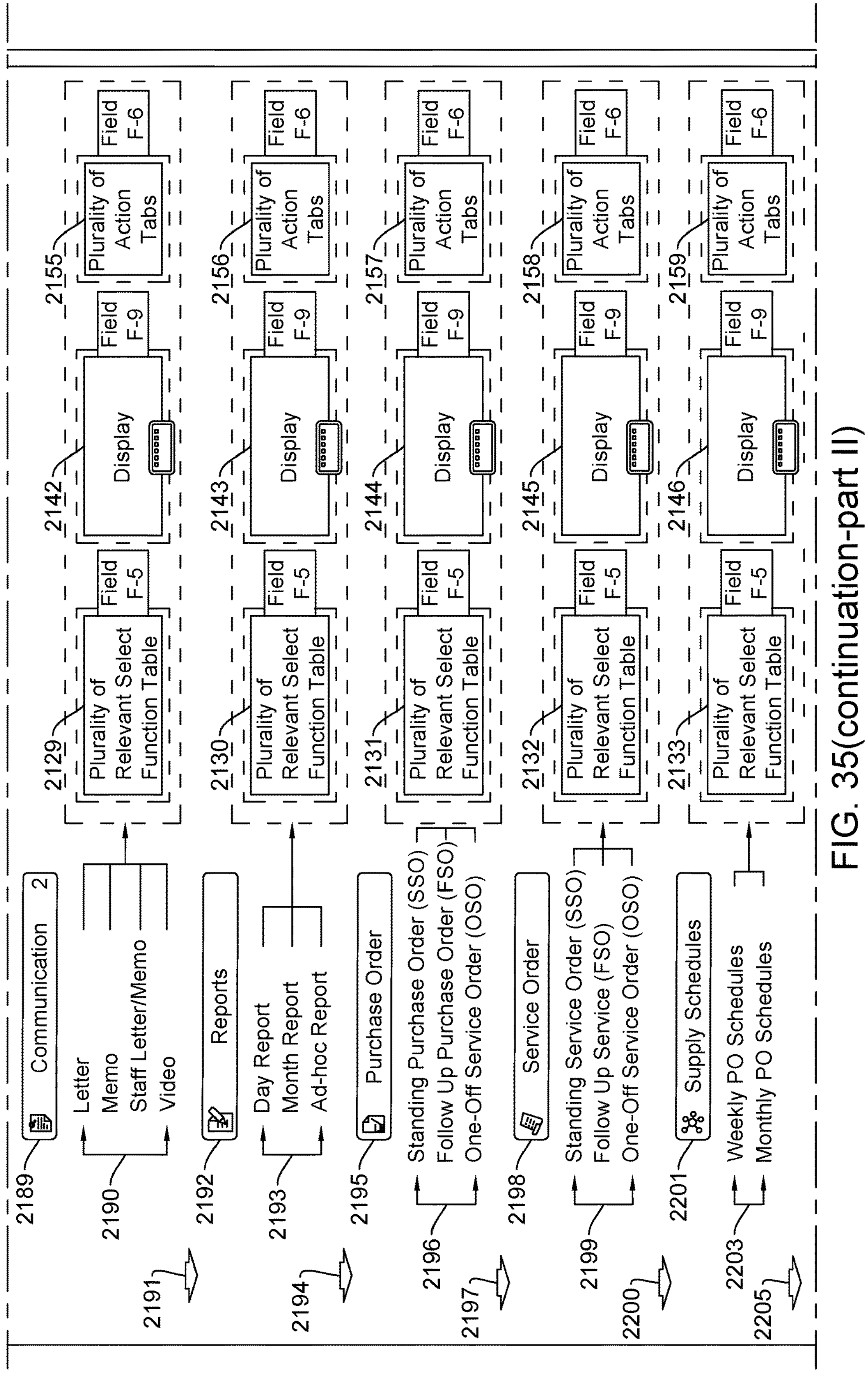
FIG. 35(continuation-part II)

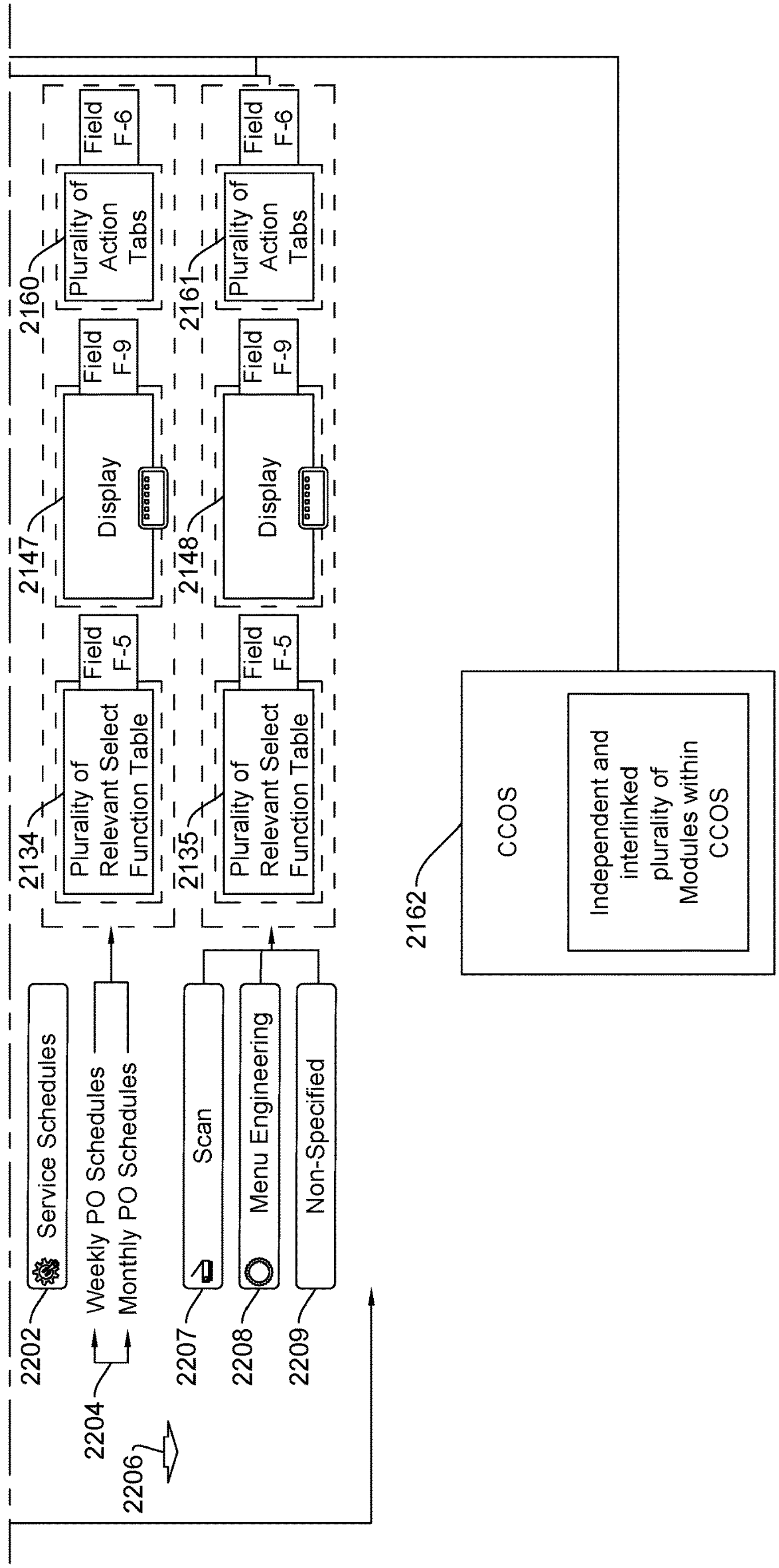
FIG. 35(continuation-part III)

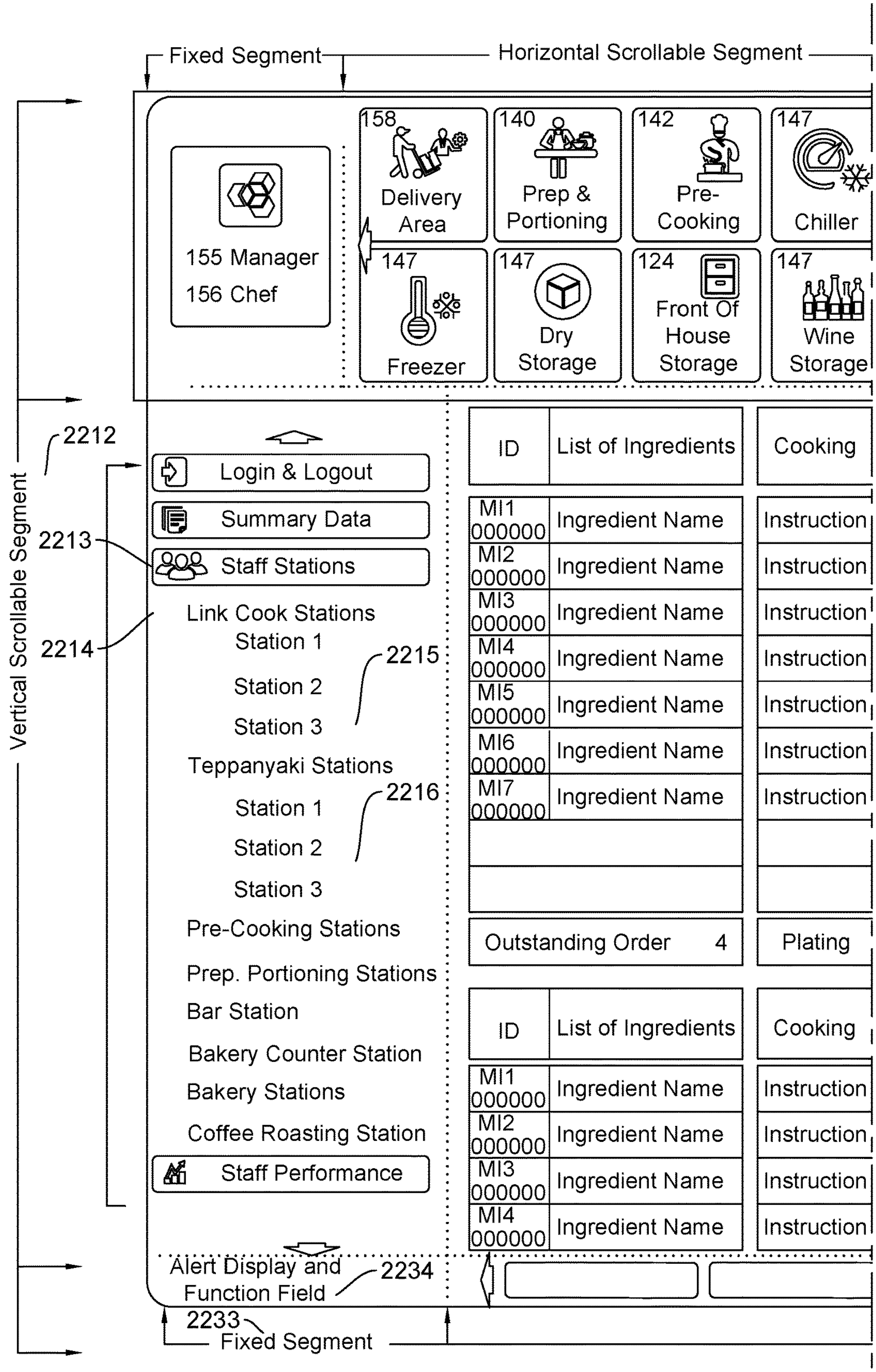
FIG. 36(continuation-part I)

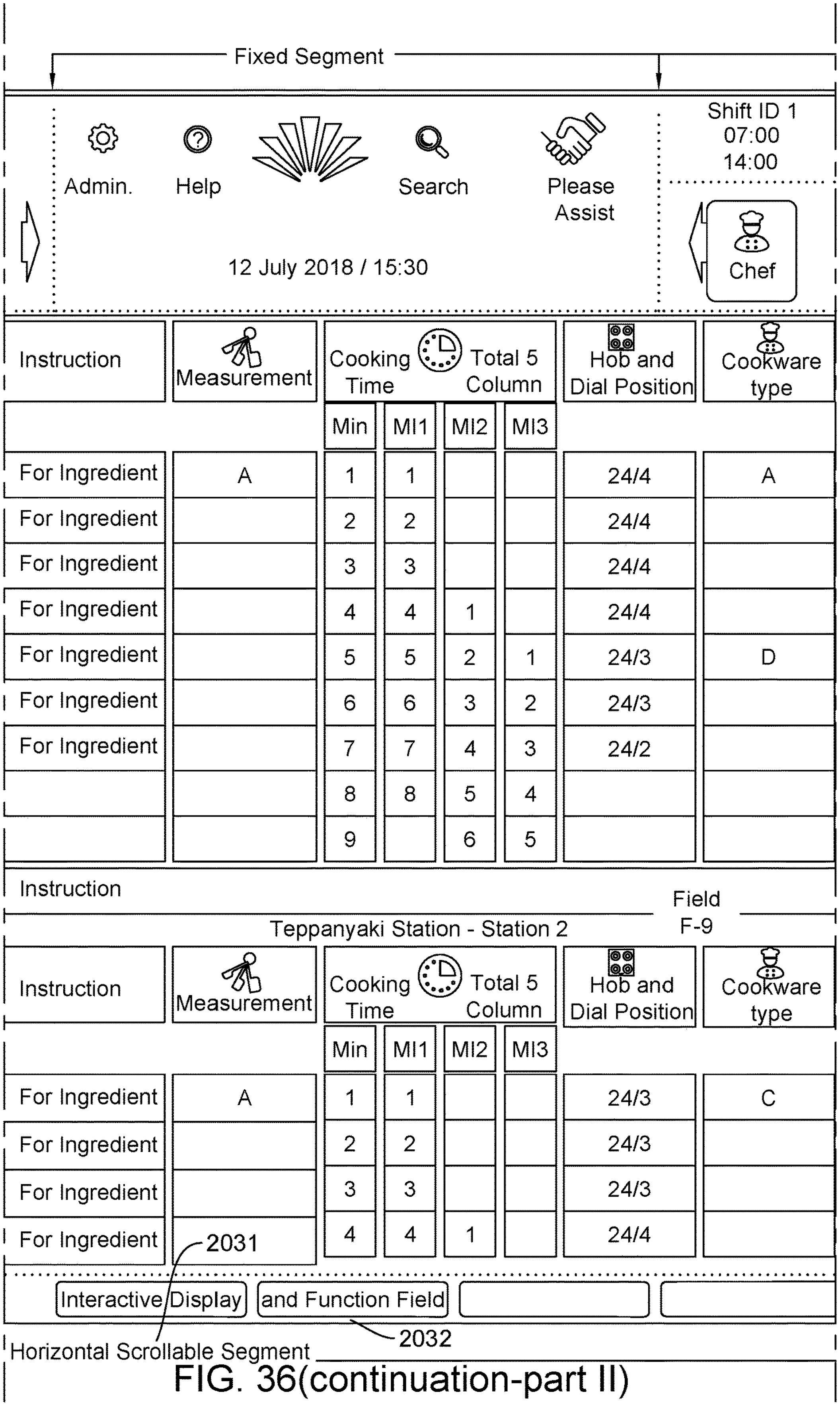
FIG. 36(continuation-part II)

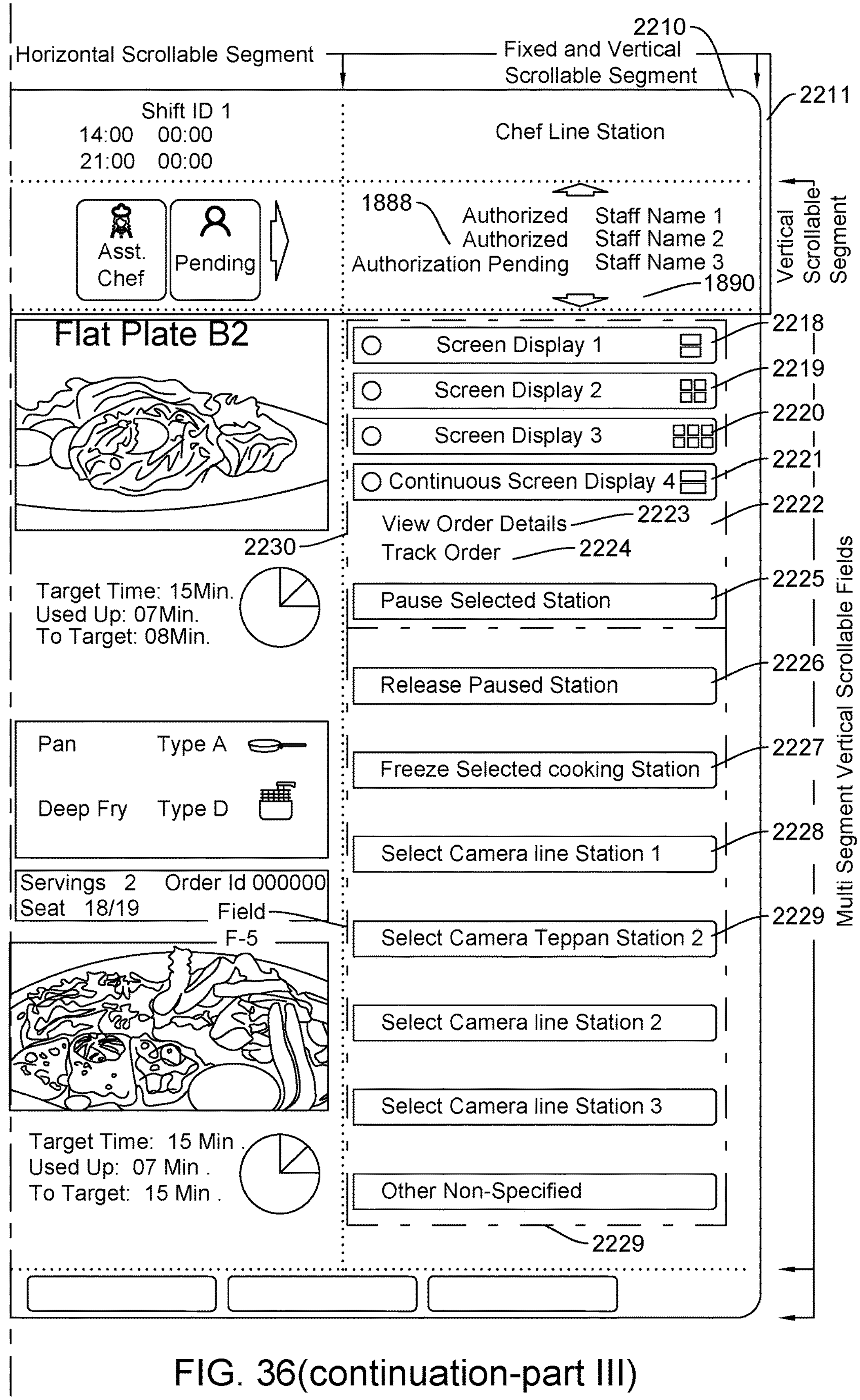
FIG. 36(continuation-part III)

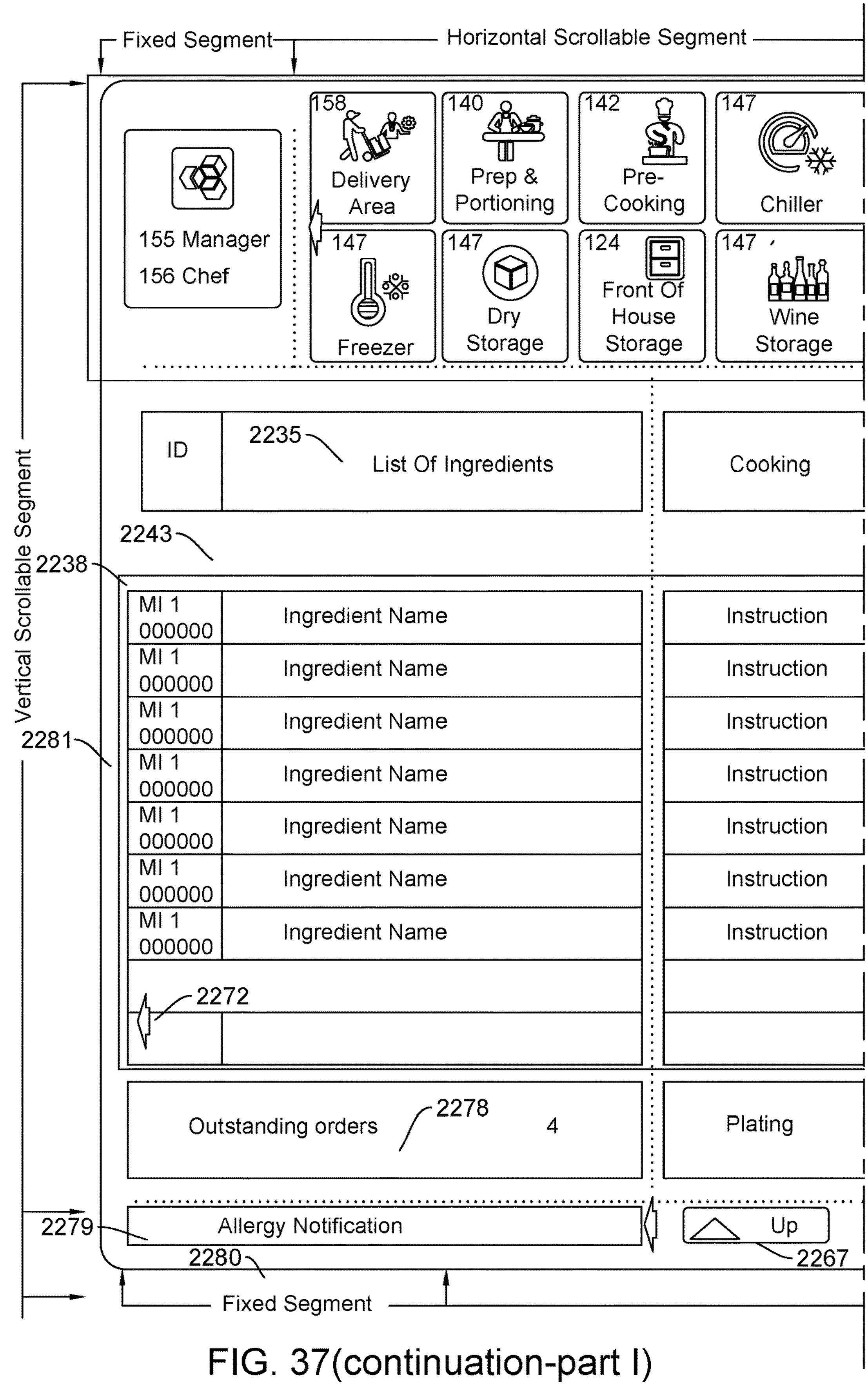
FIG. 37(continuation-part I)

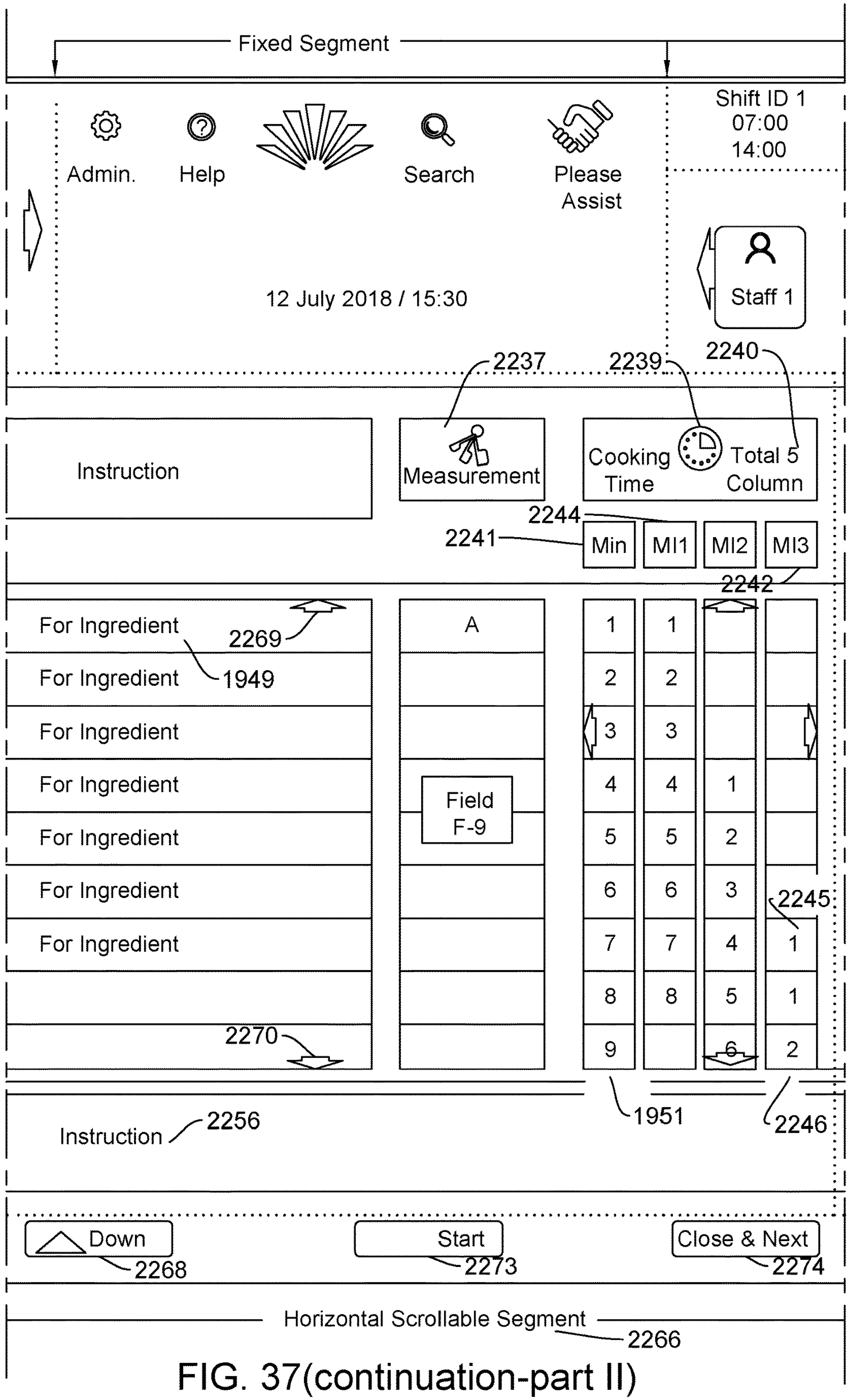
FIG. 37(continuation-part II)

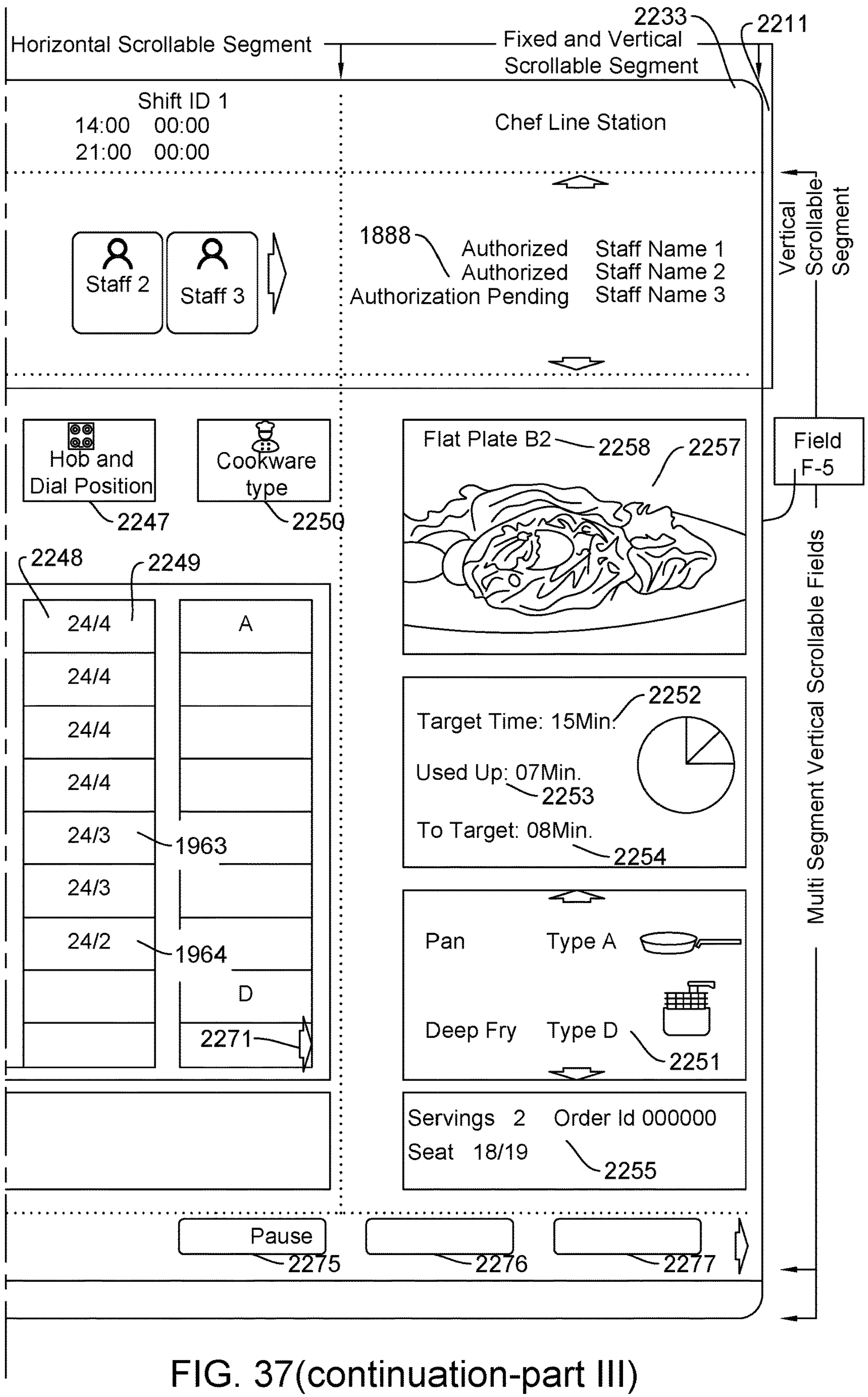
FIG. 37(continuation-part III)

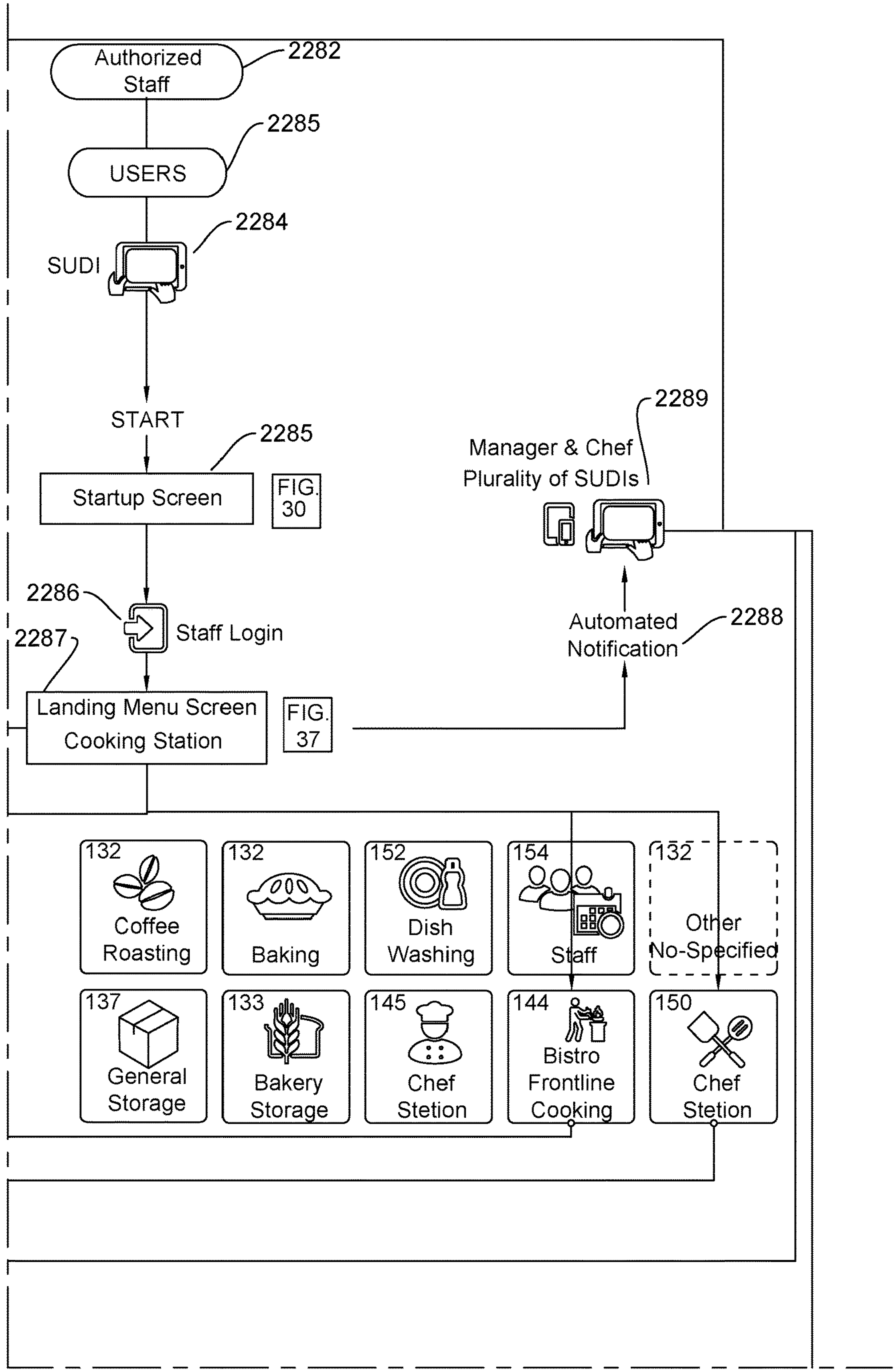
FIG. 38(continuation-part I)

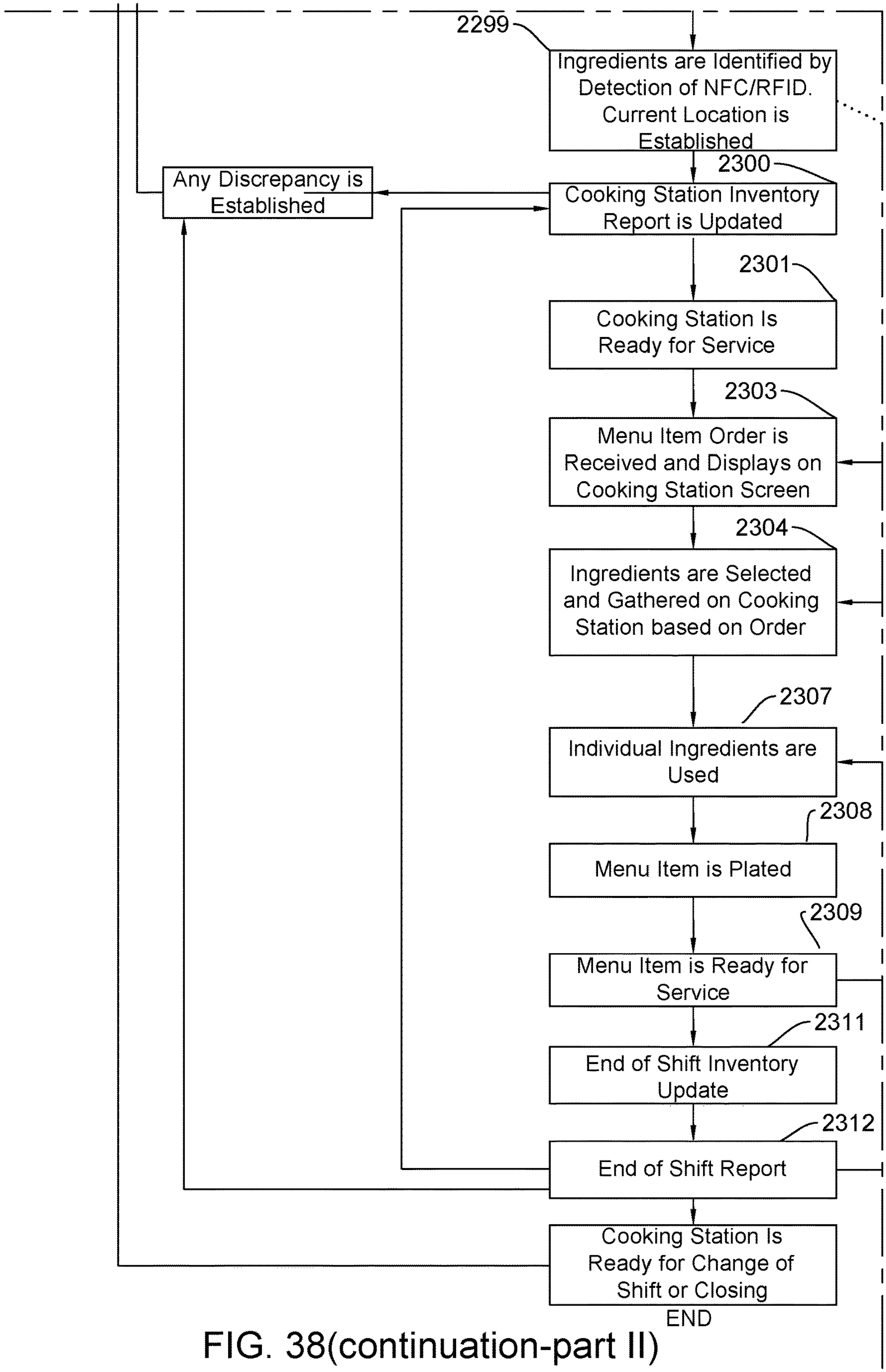
FIG. 38(continuation-part II)

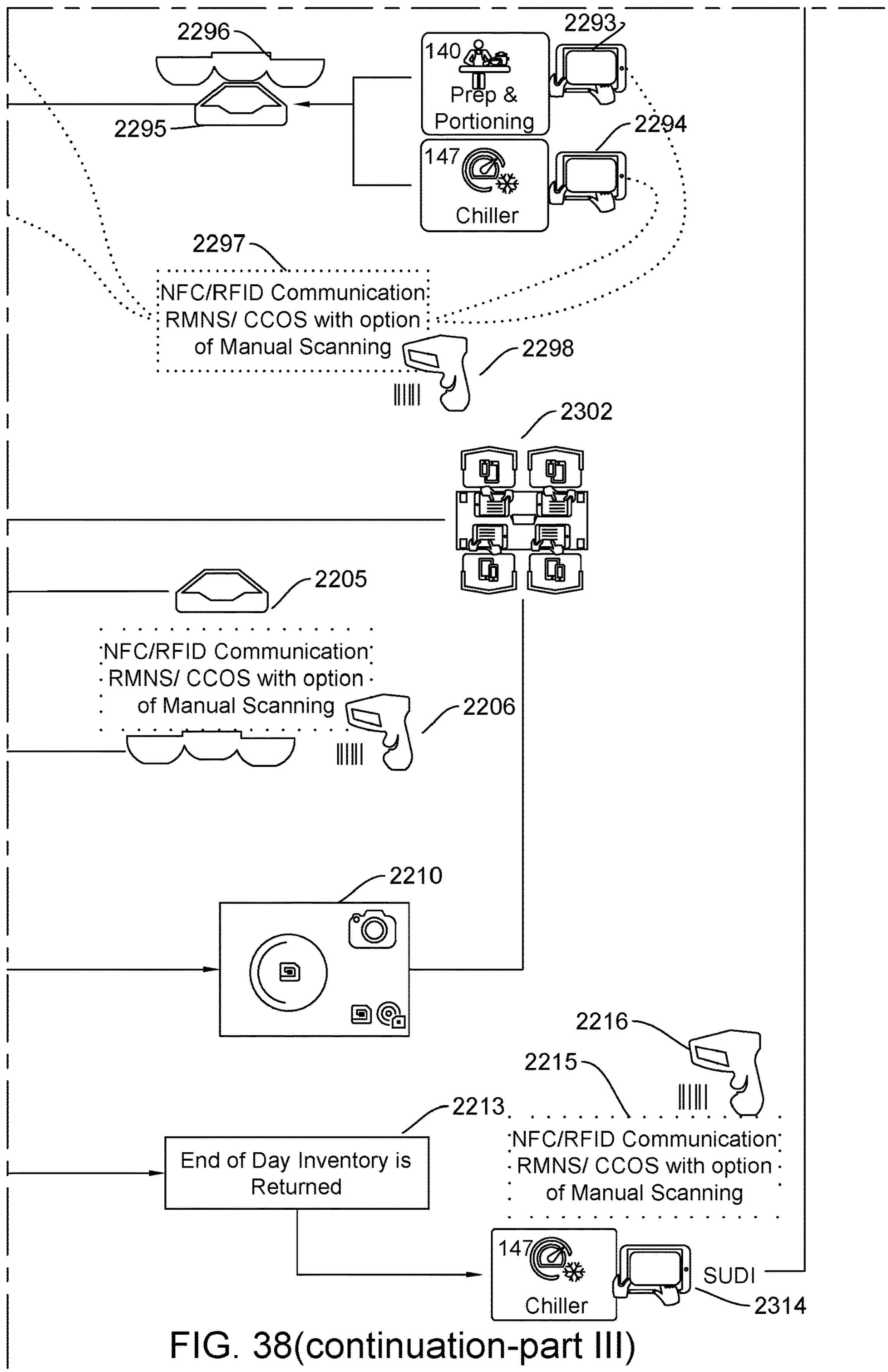
FIG. 38(continuation-part III)

SUDI Landing Screen For Plurality of Back of House Prep & Portioning Stations

See Fig. 03/Ref; 140

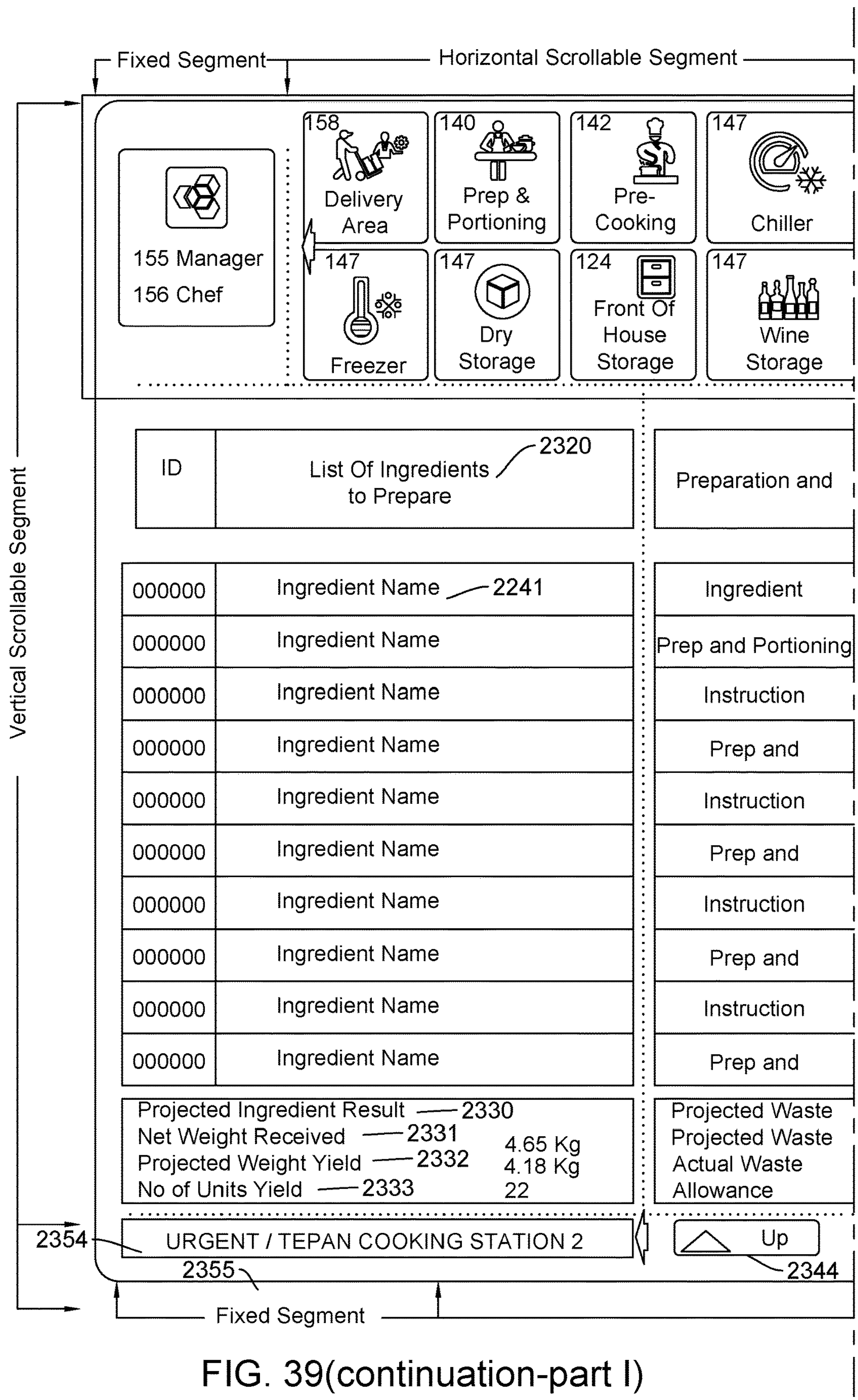
FIG. 39(continuation-part I)

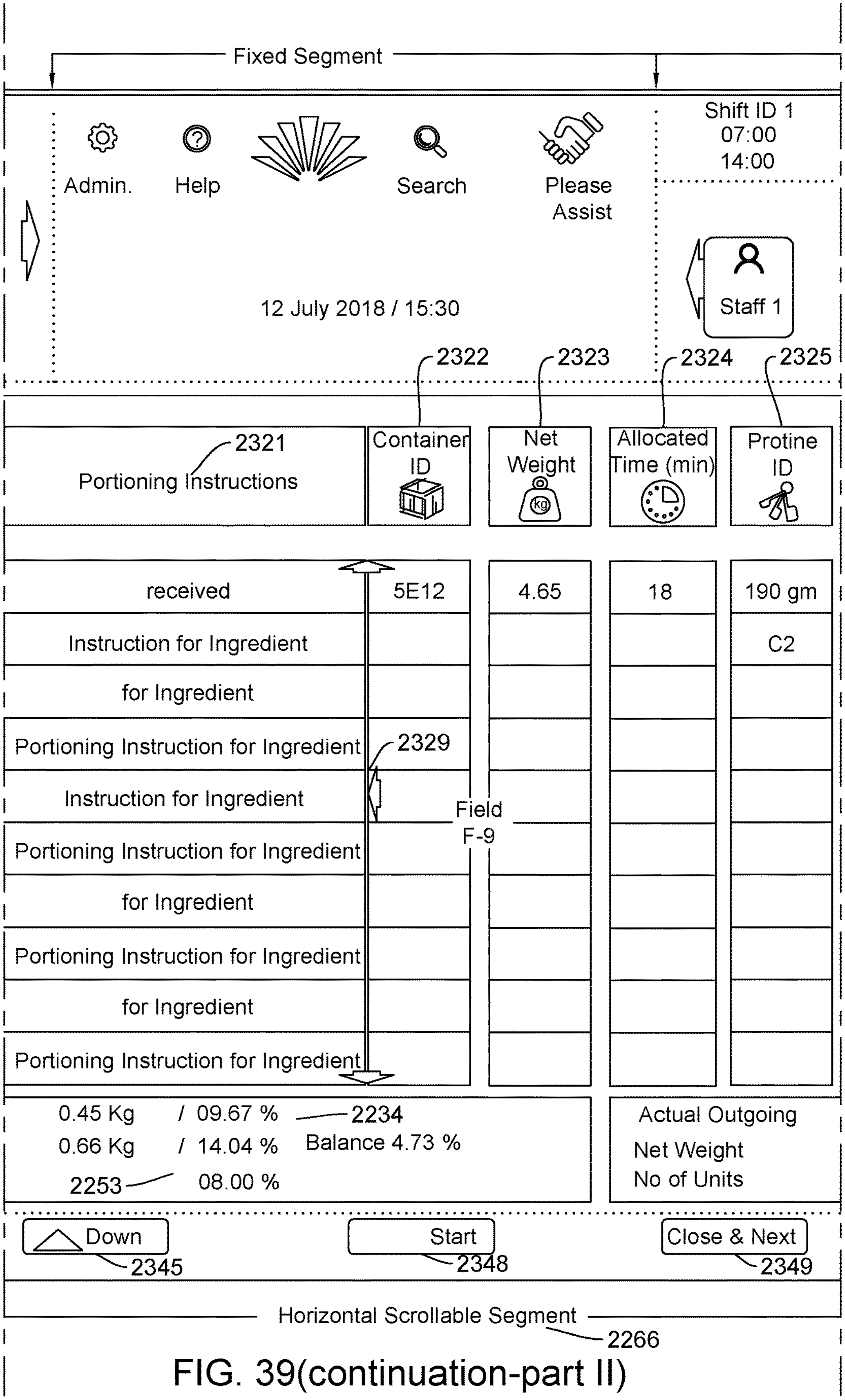
FIG. 39(continuation-part II)

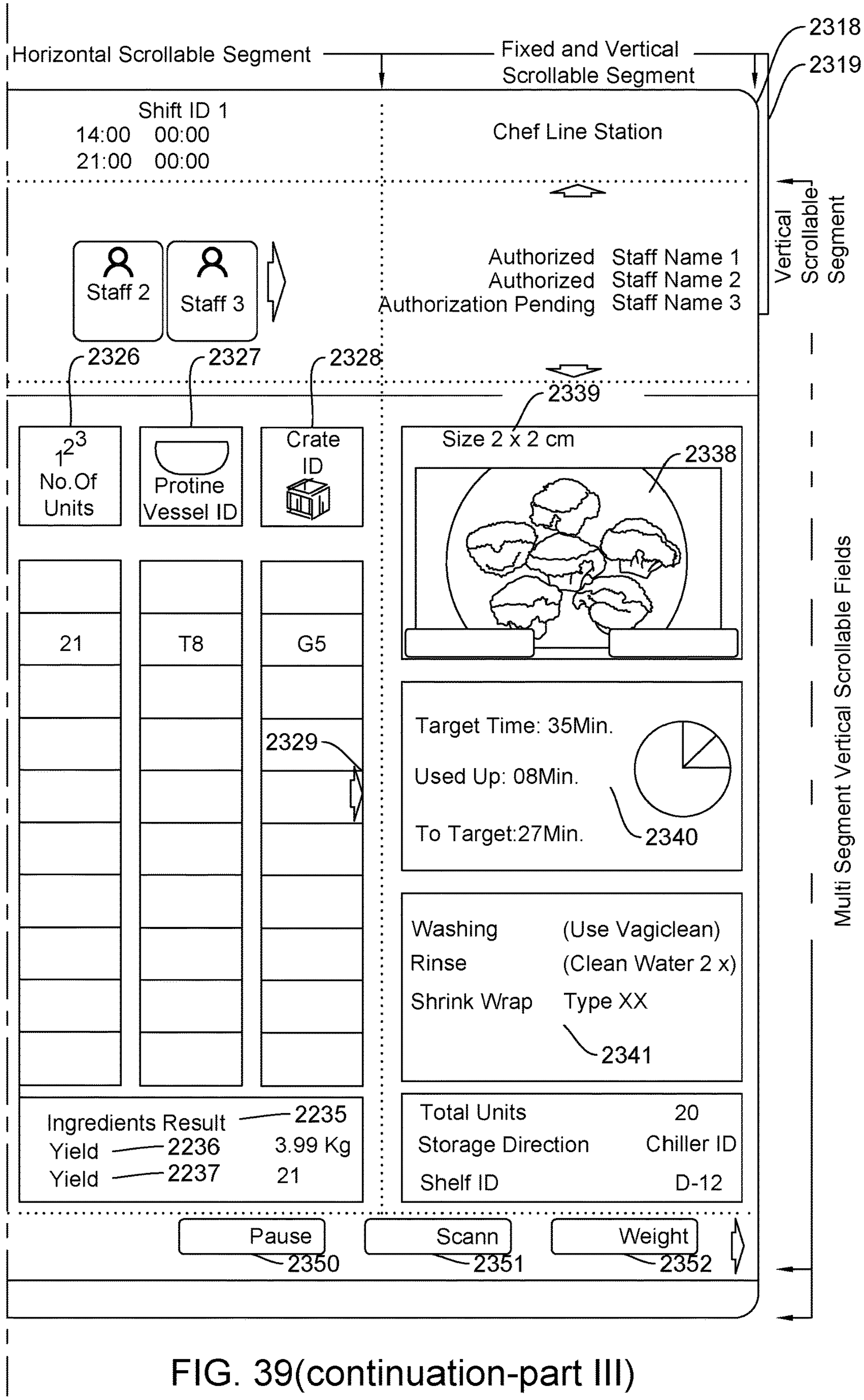
FIG. 39(continuation-part III)

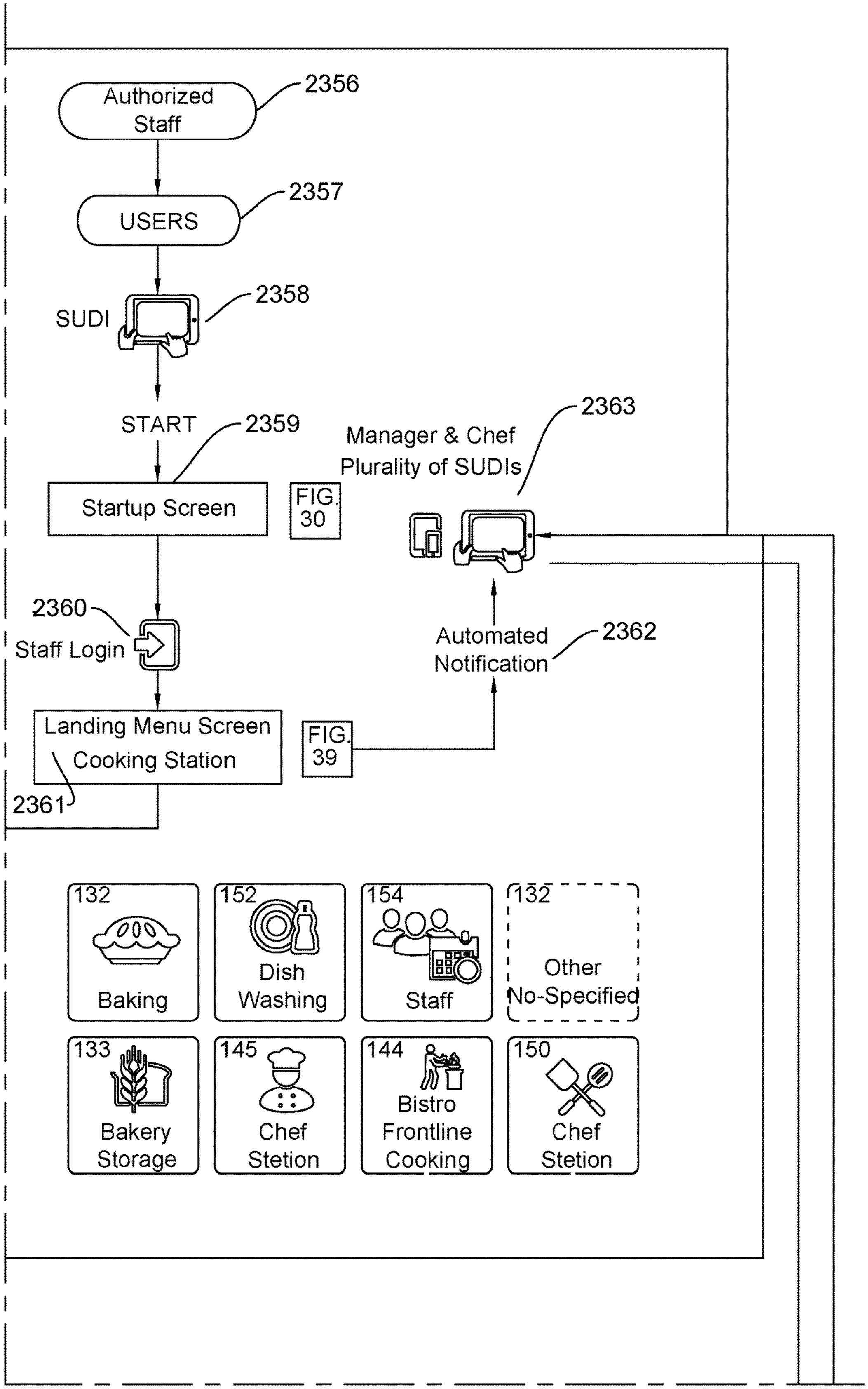
FIG. 40(continuation-part I)

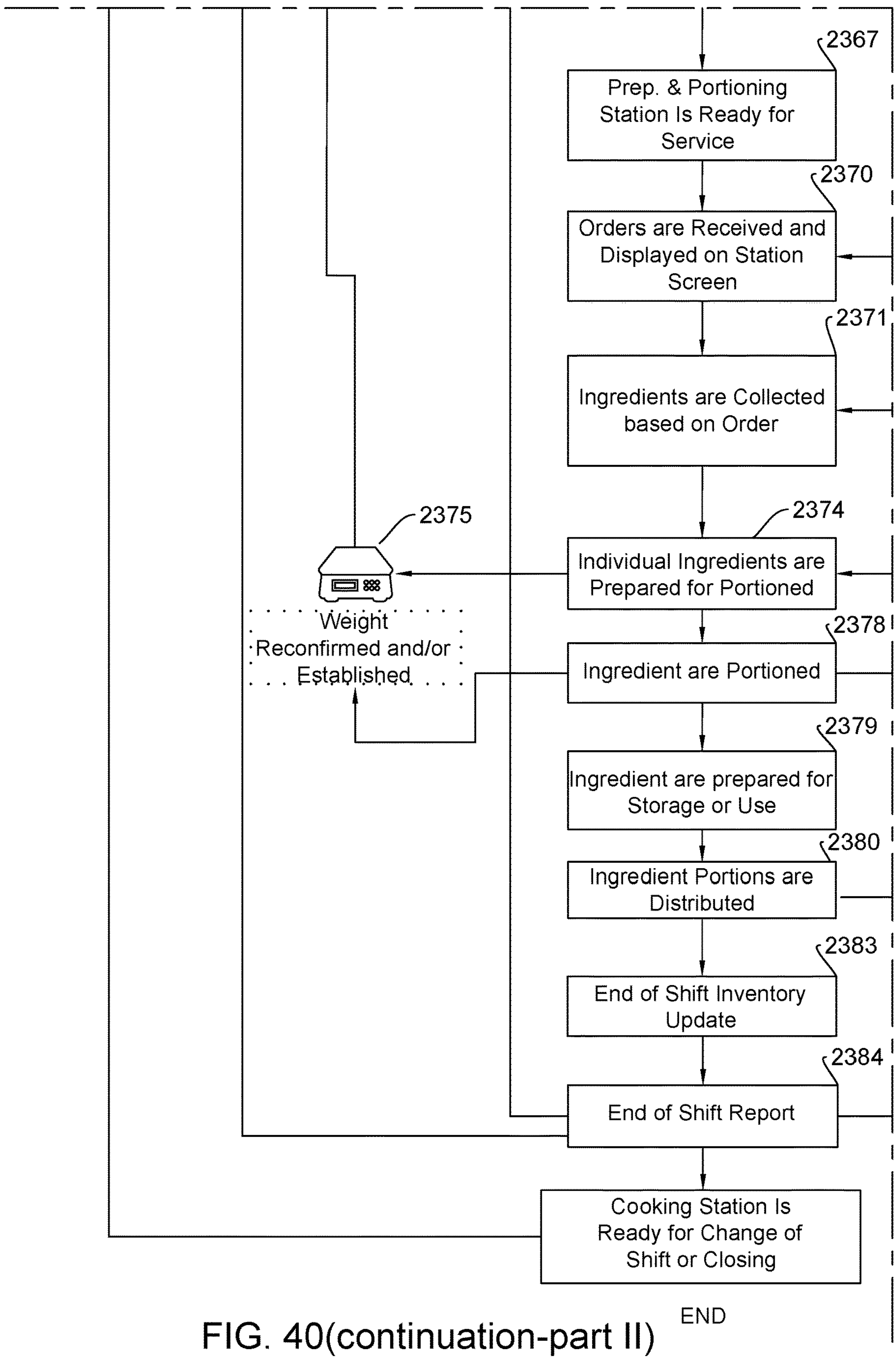
FIG. 40(continuation-part II)

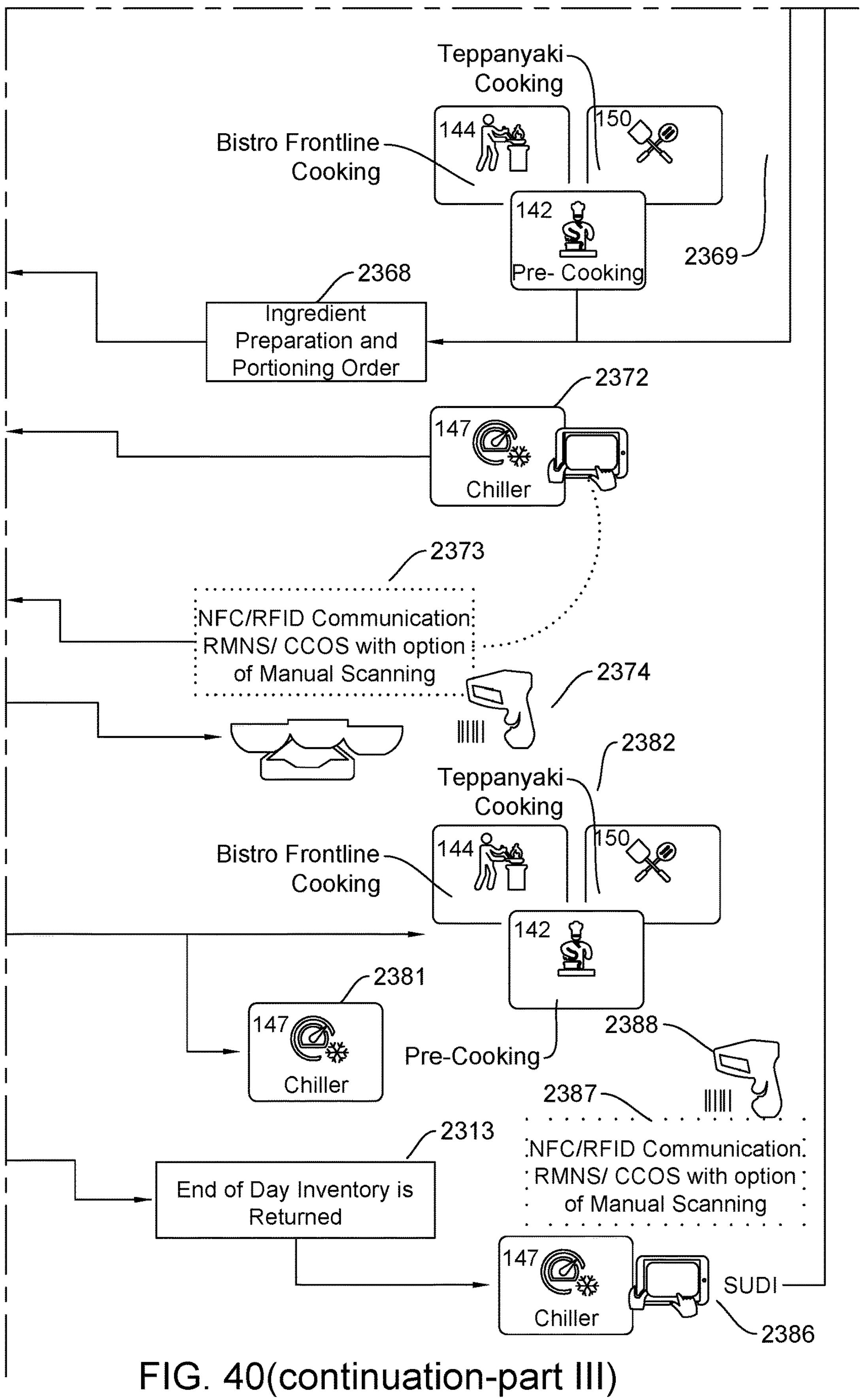
FIG. 40(continuation-part III)

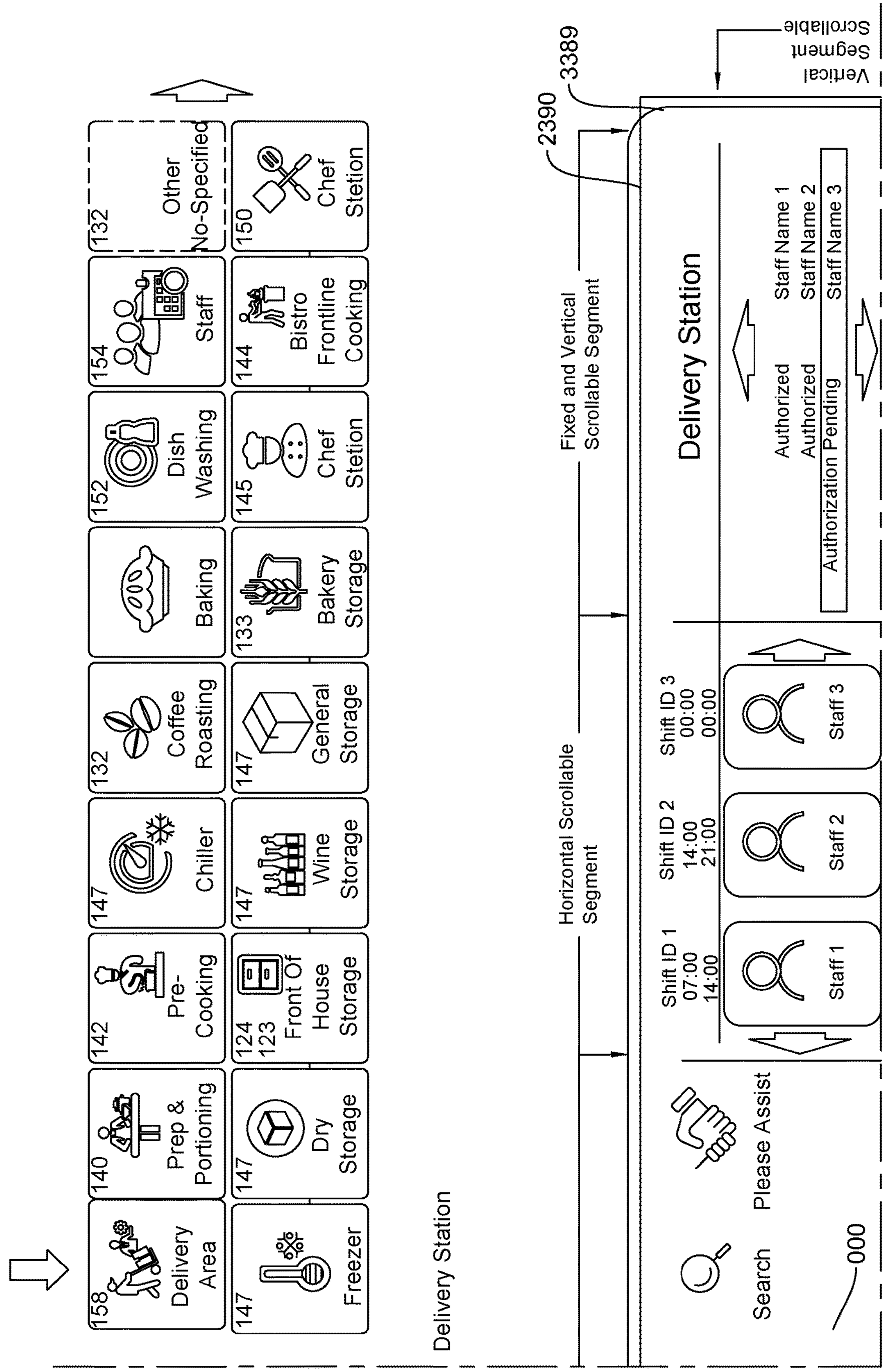
FIG. 41(continuation-part I)

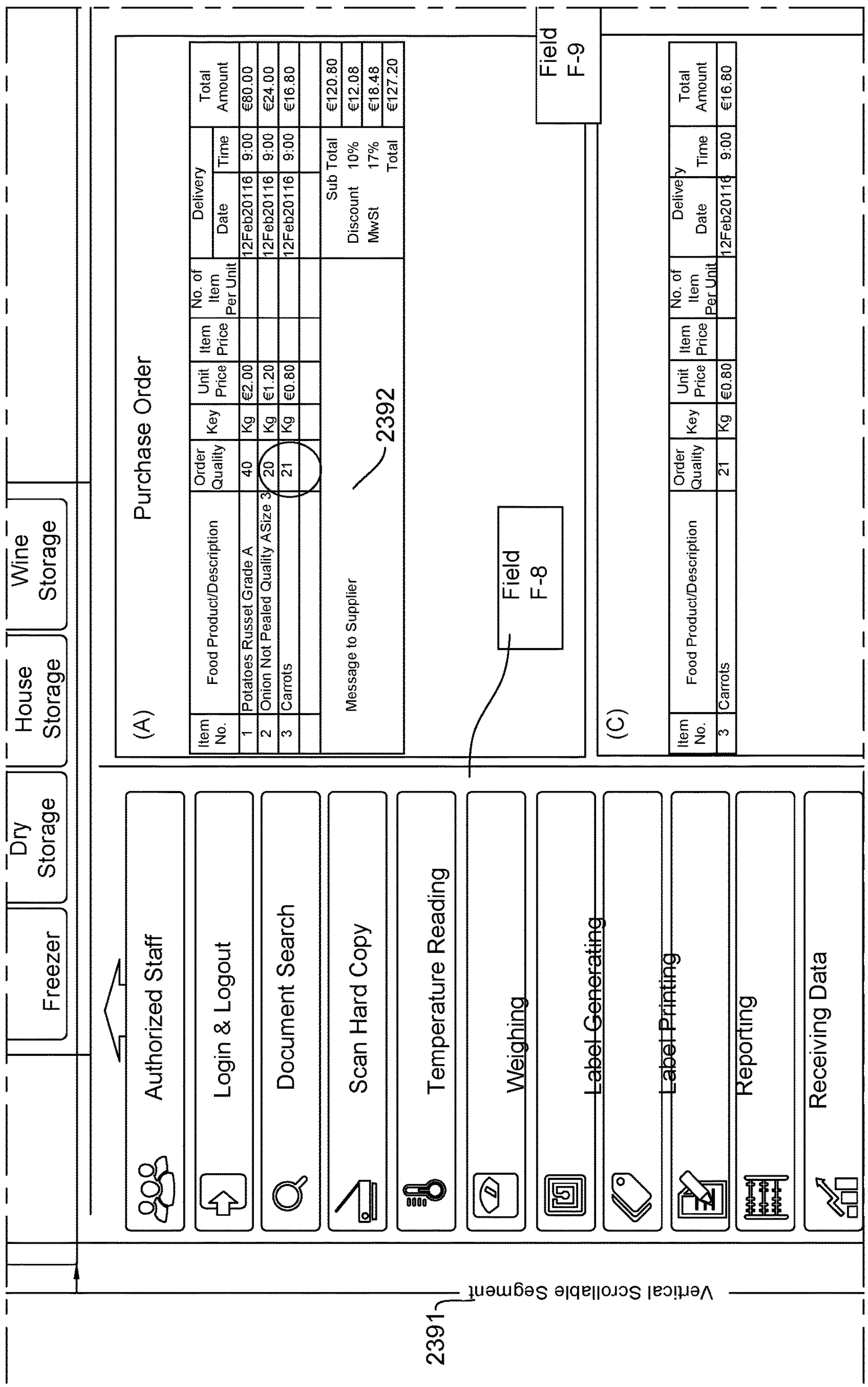
FIG. 41(continuation-part II)

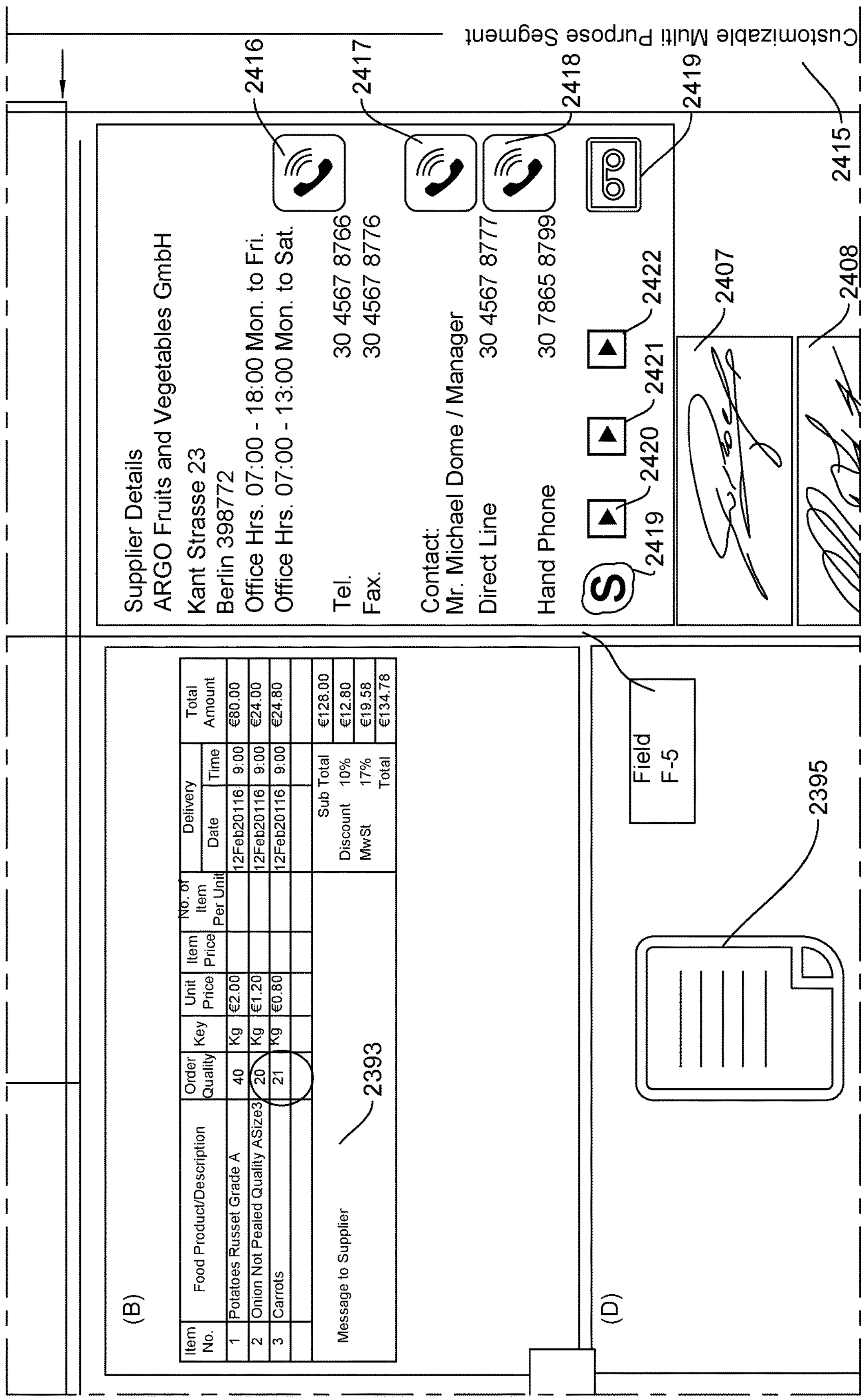
FIG. 41(continuation-part III)

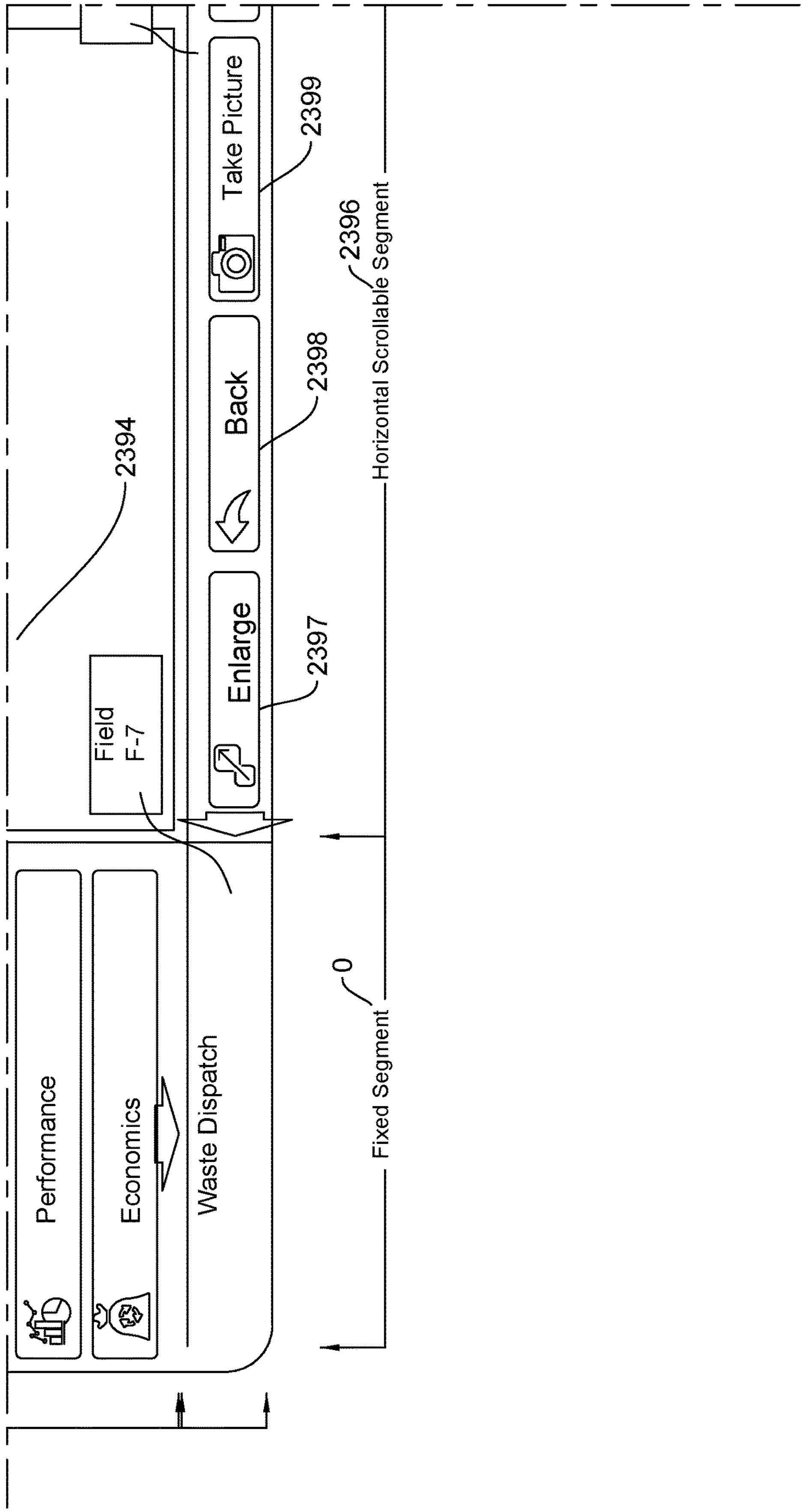
FIG. 41(continuation-part IV)

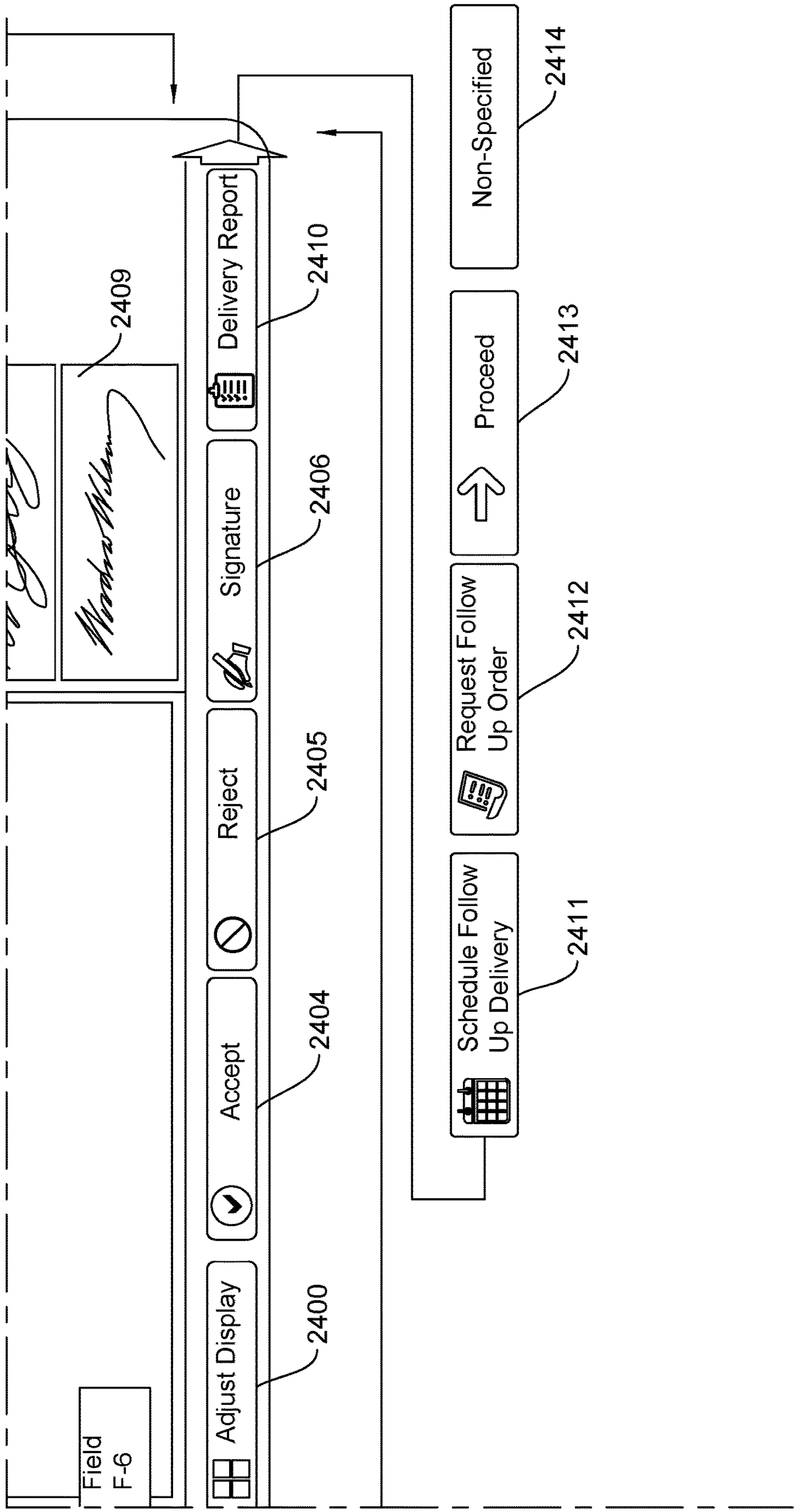
FIG. 41(continuation-part V)

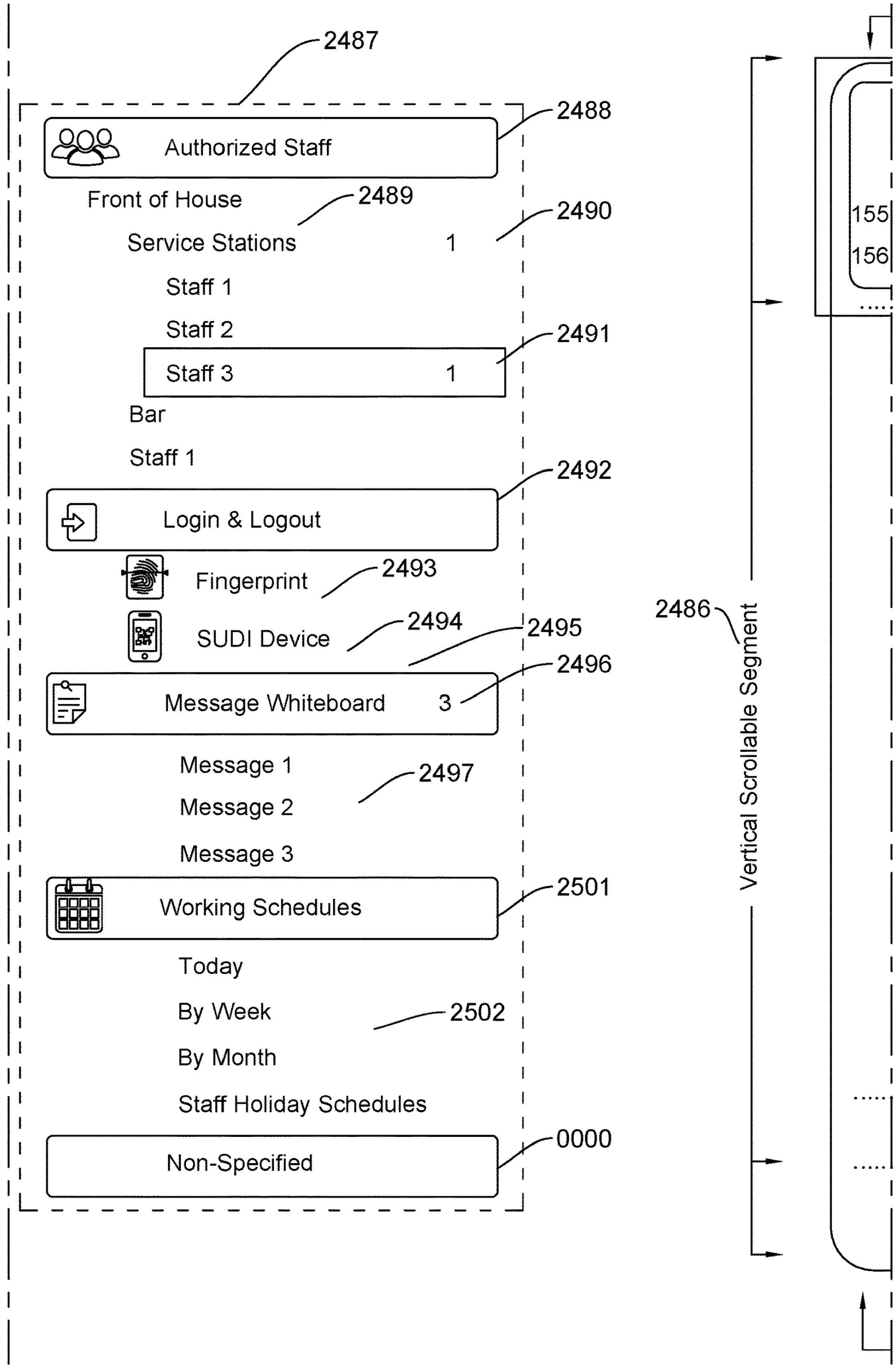
FIG. 42(continuation-part I)

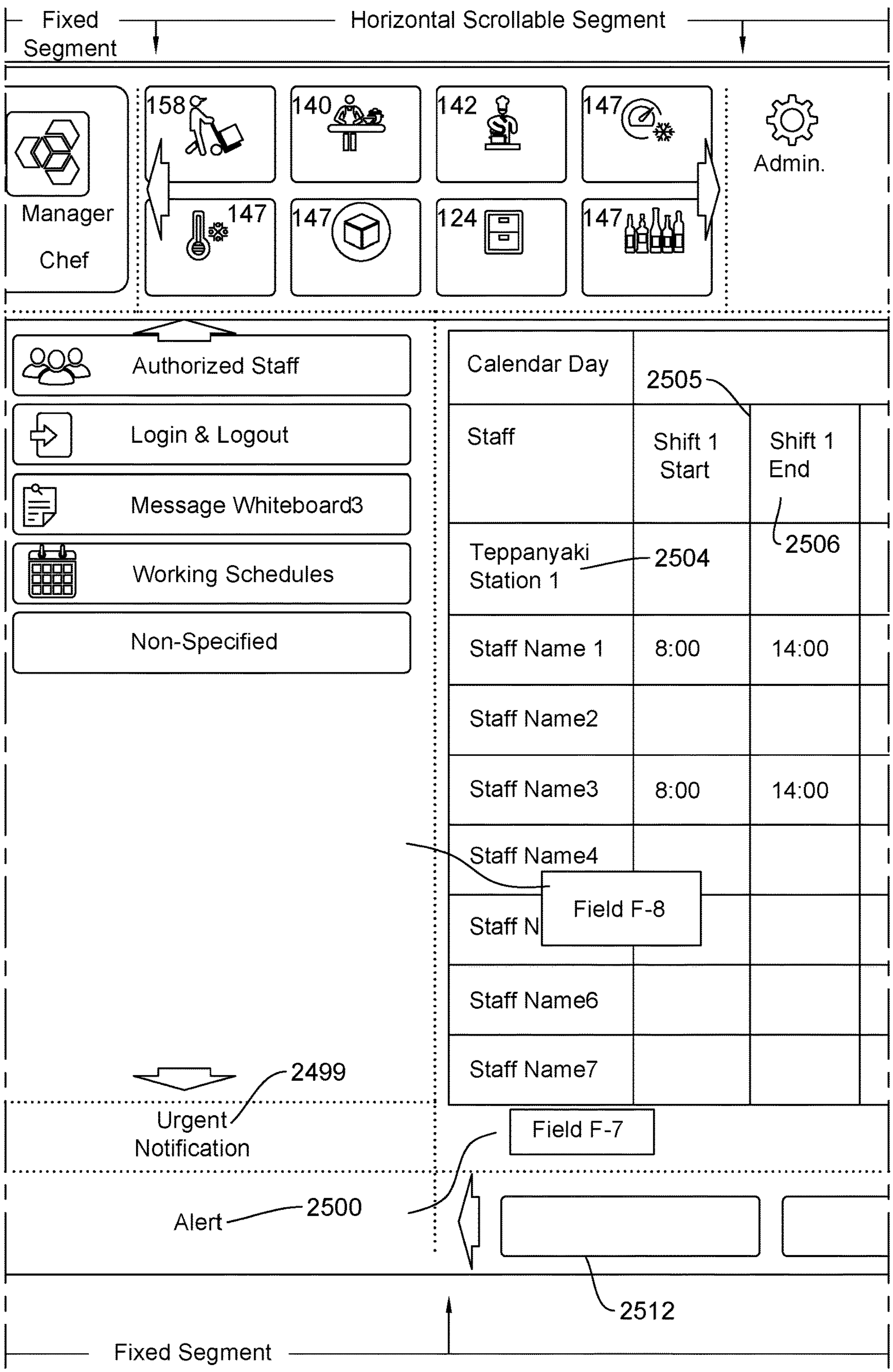
FIG. 42(continuation-part II)

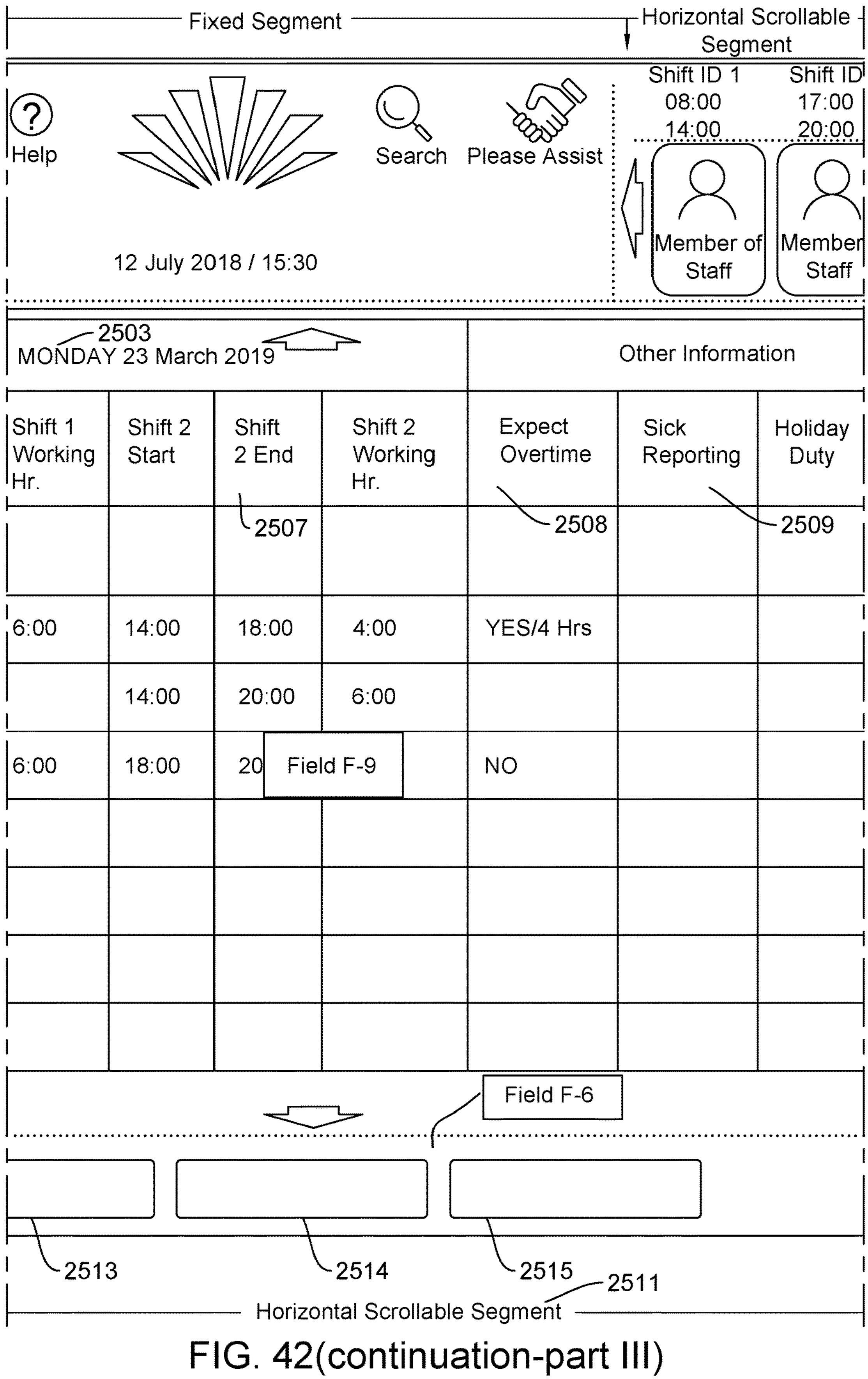
FIG. 42(continuation-part III)

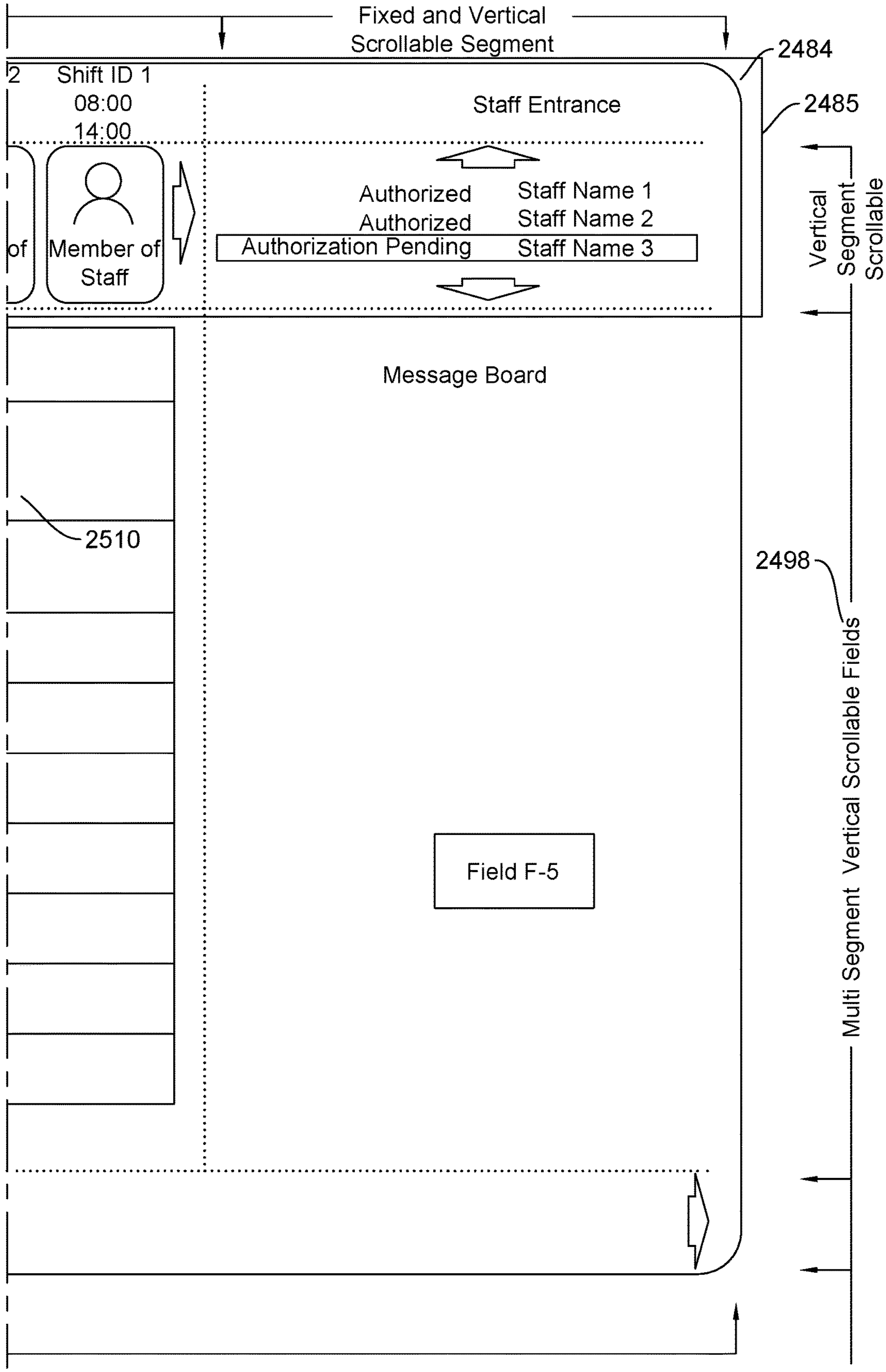
FIG. 42(continuation-part IV)

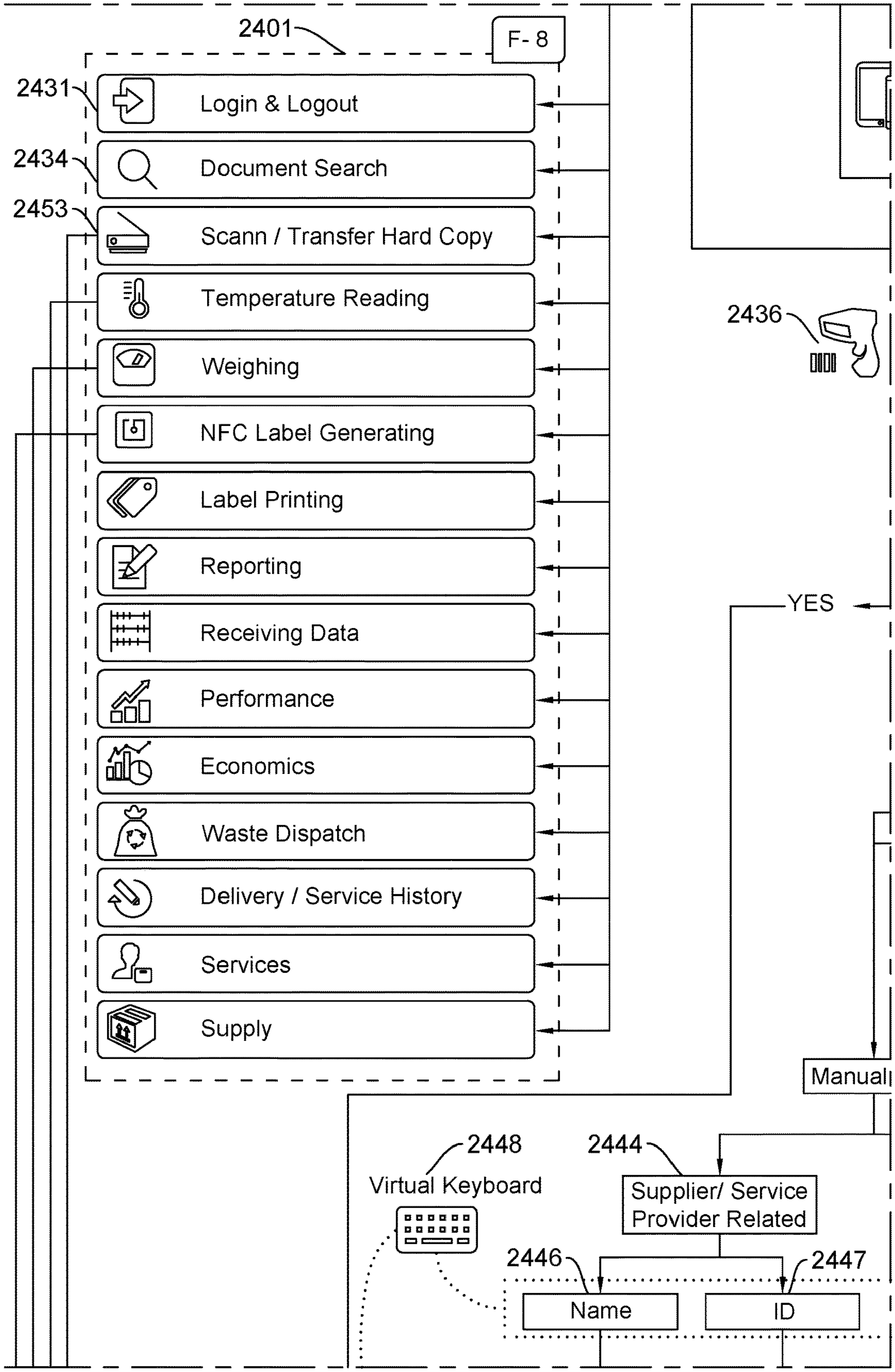
FIG. 43(continuation-part I)

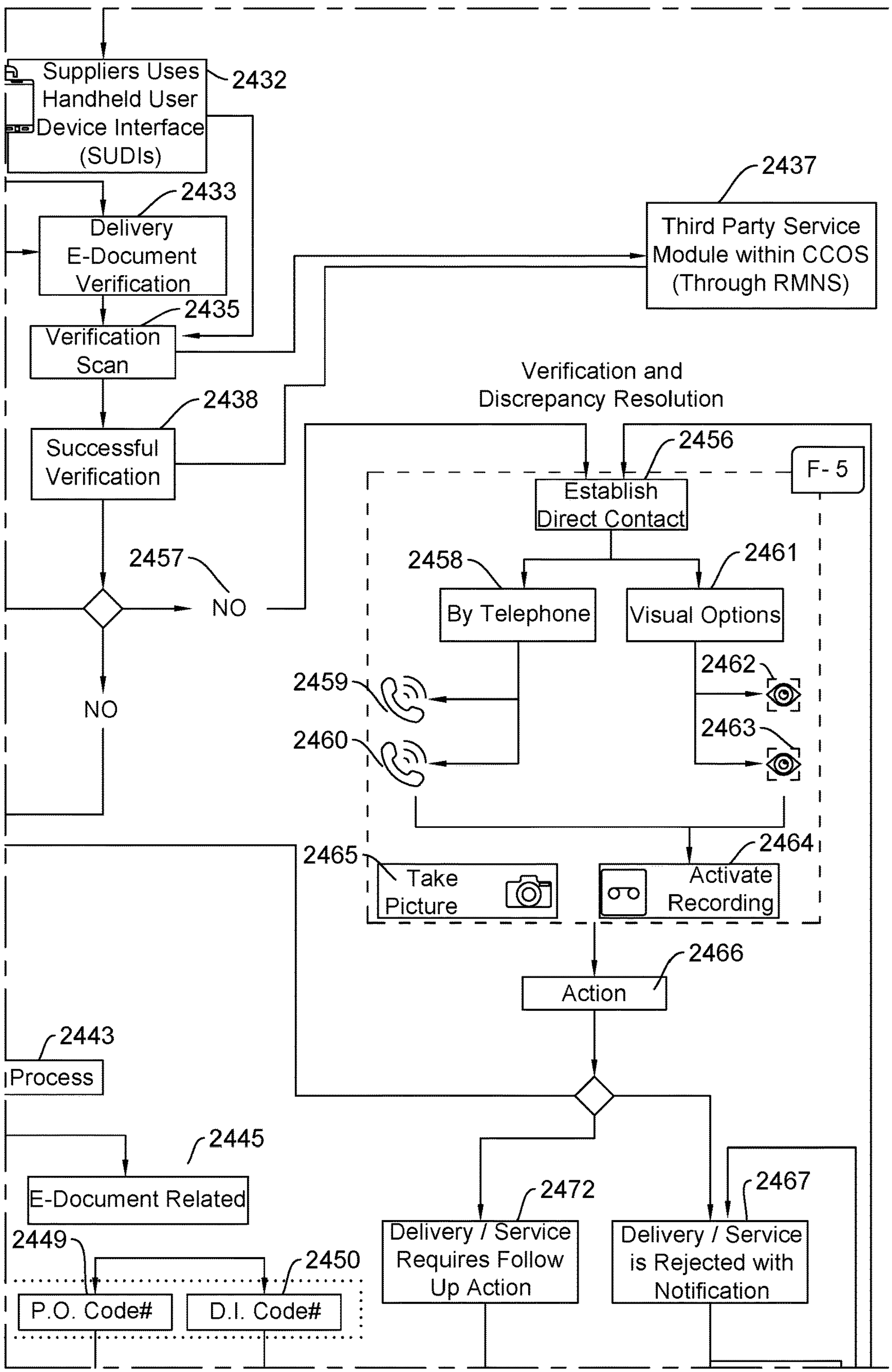
FIG. 43(continuation-part II)

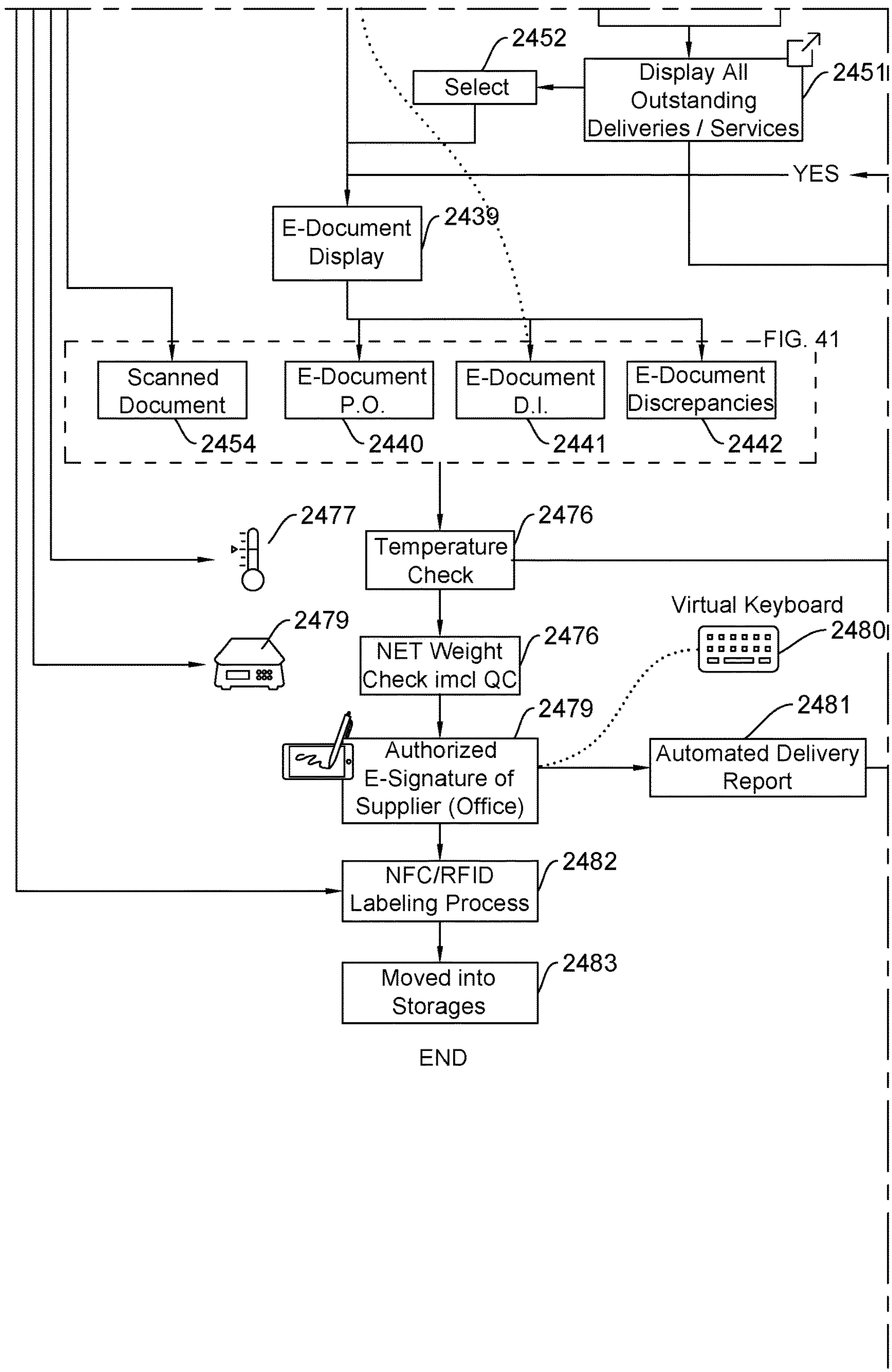
FIG. 43(continuation-part III)

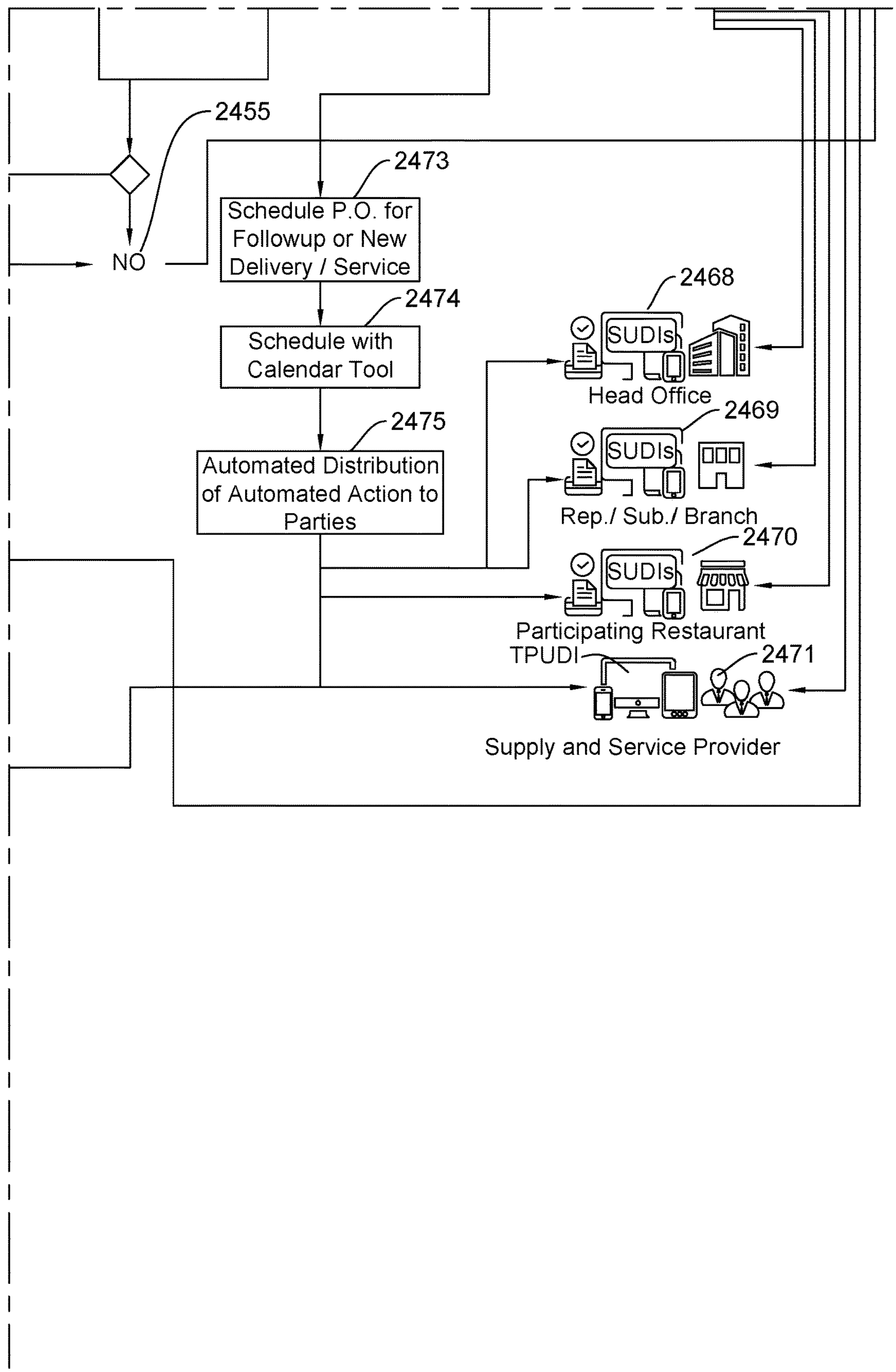
FIG. 43(continuation-part IV)

SUDI Landing Screen For Storages Back of House Station

See FIG. 03/Ref; 147 and 133

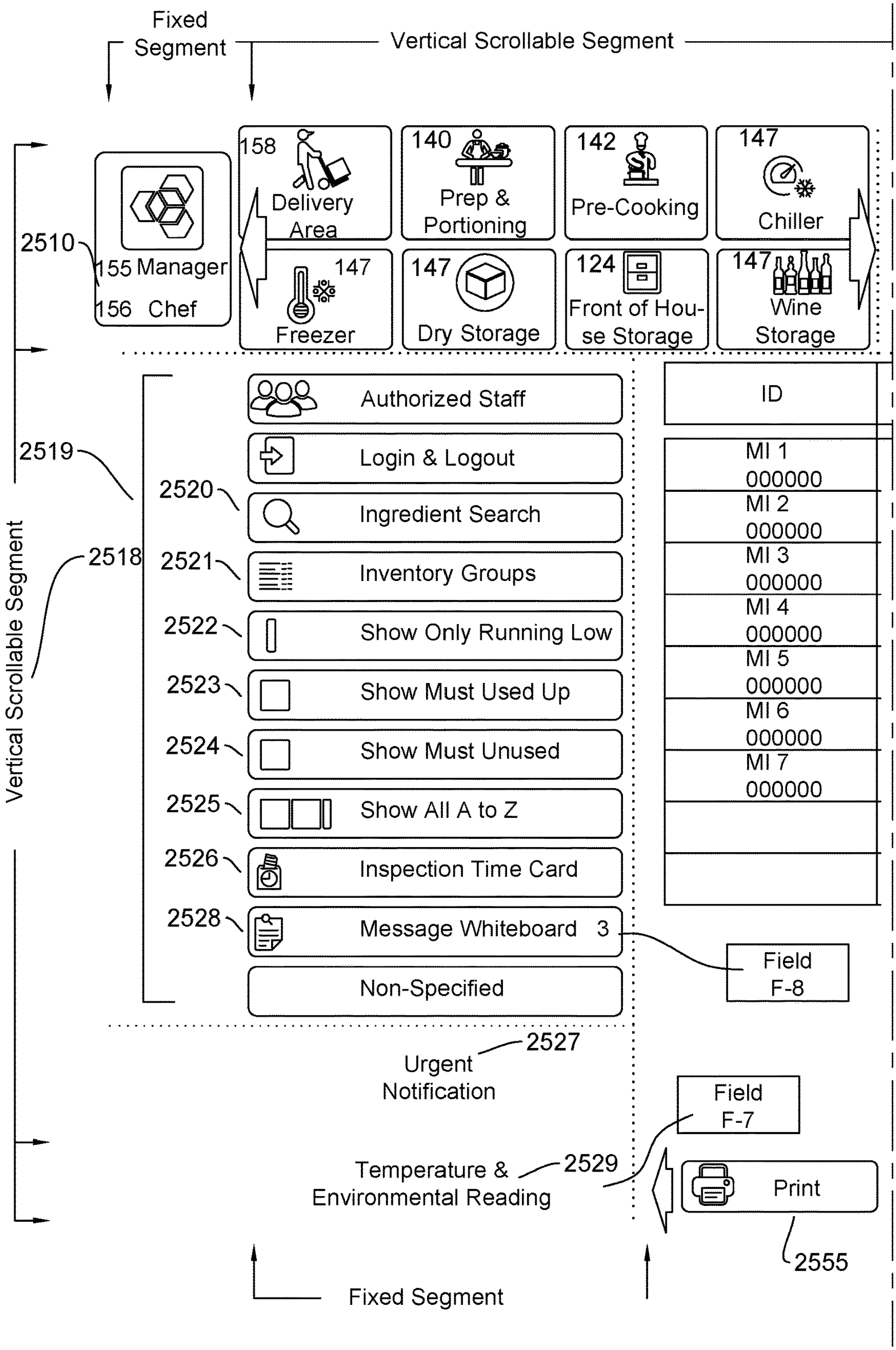
FIG. 44(continuation-part I)

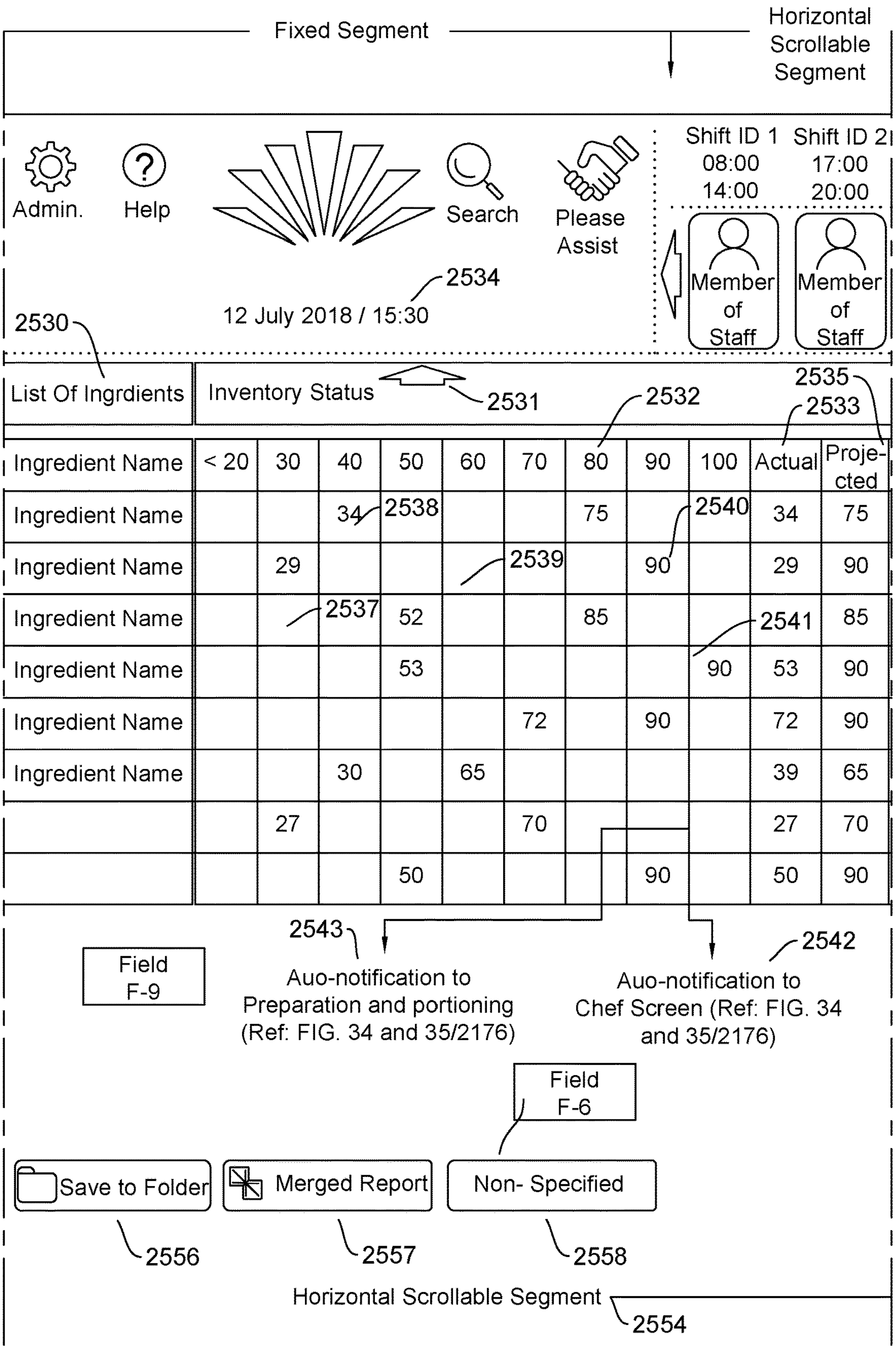
FIG. 44(continuation-part II)

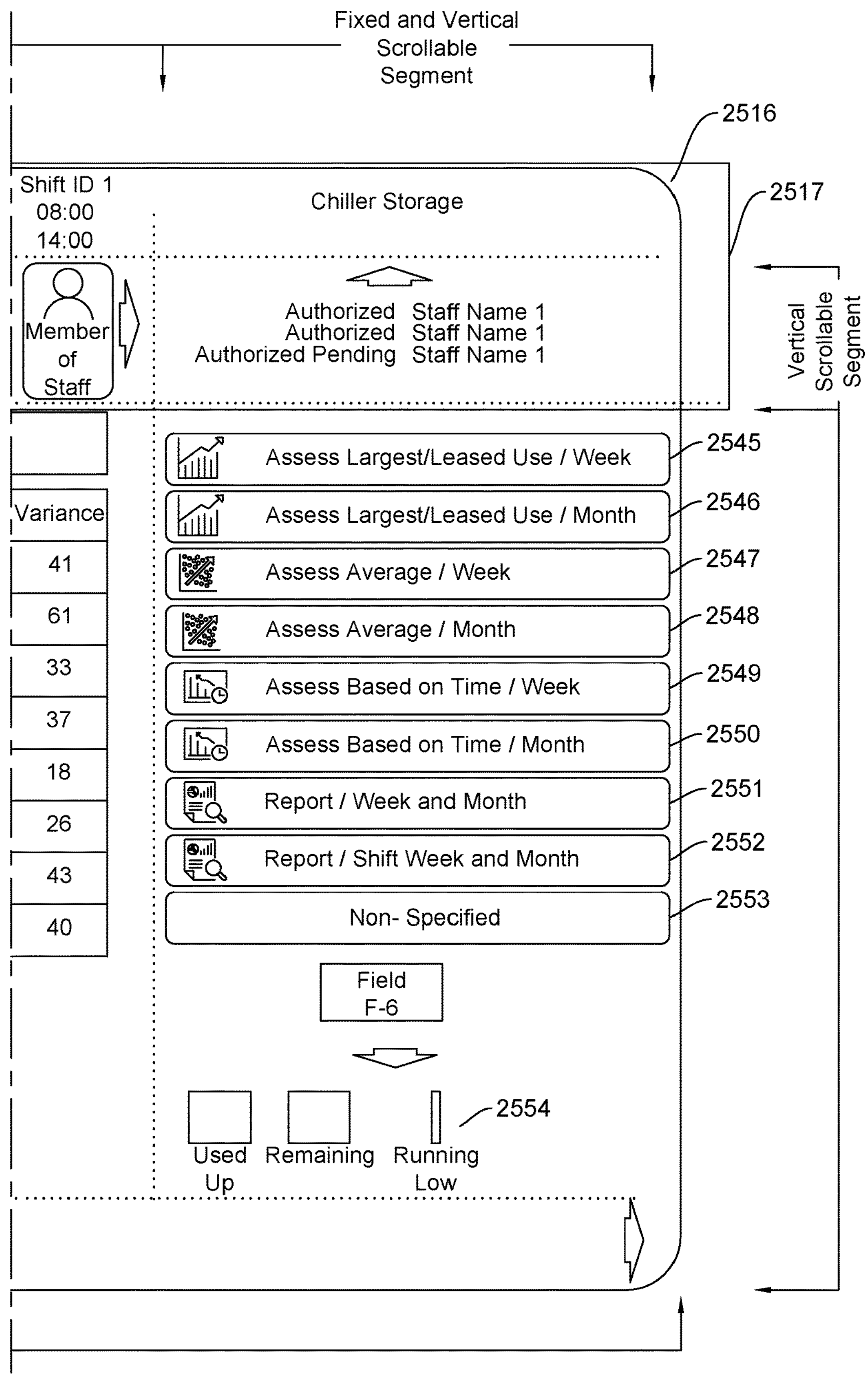
FIG. 44(continuation-part III)

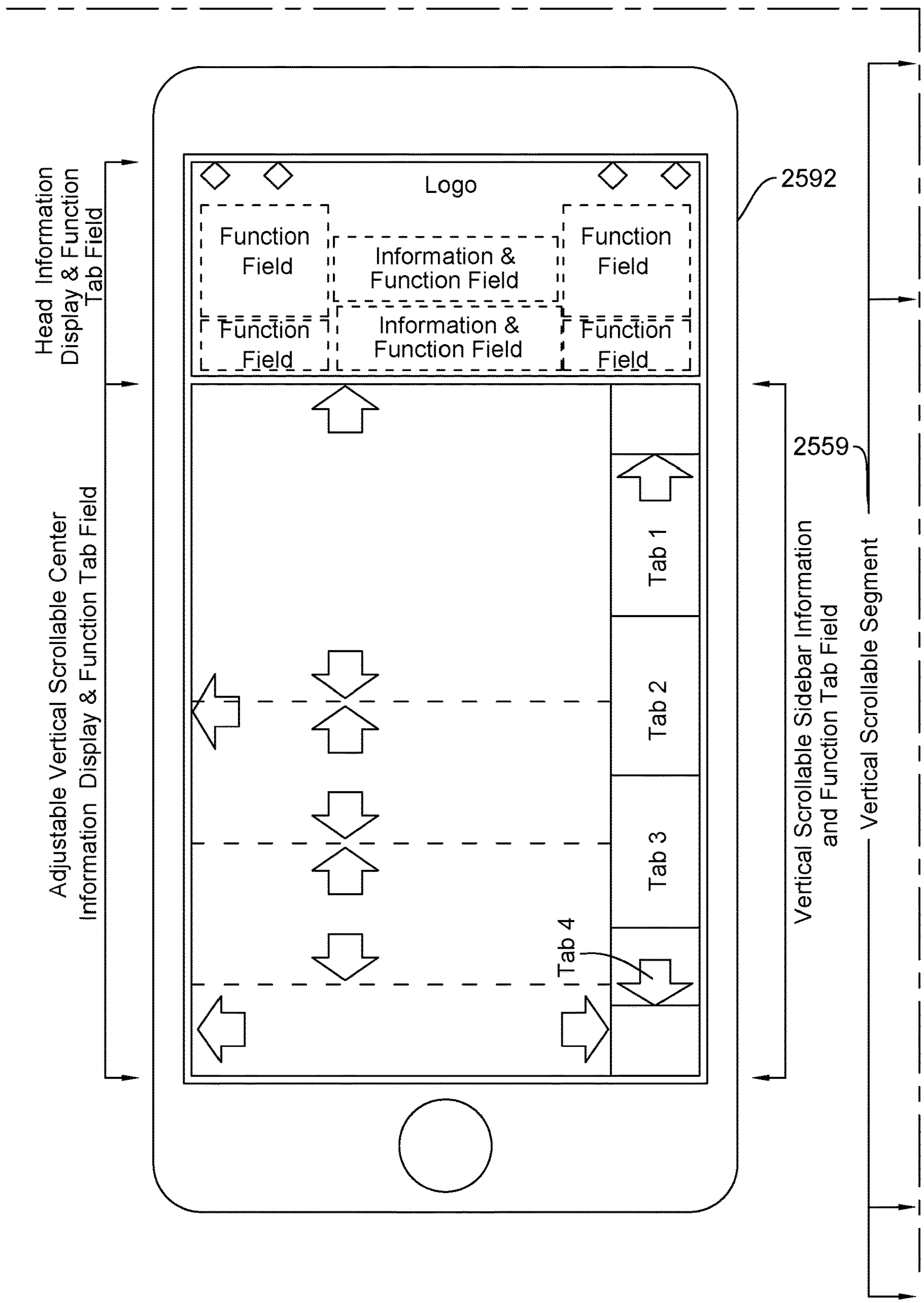
FIG. 45(continuation-part I)

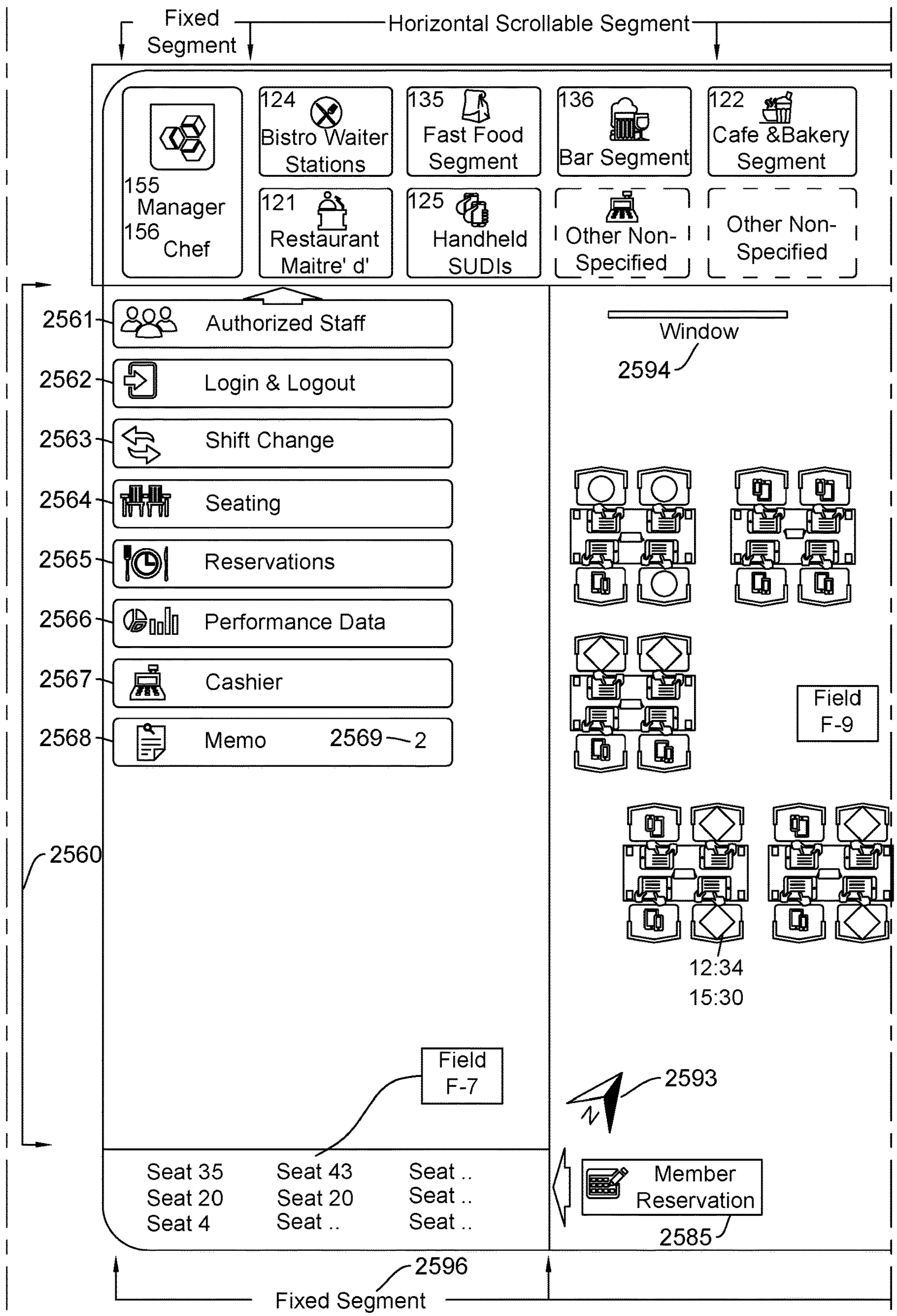
FIG. 45(continuation-part II)

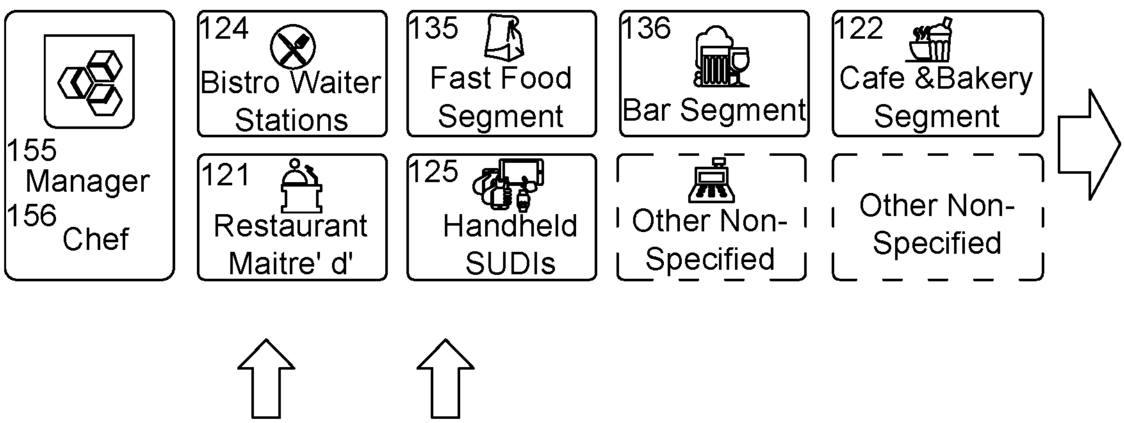
FIG. 45(continuation-part III)

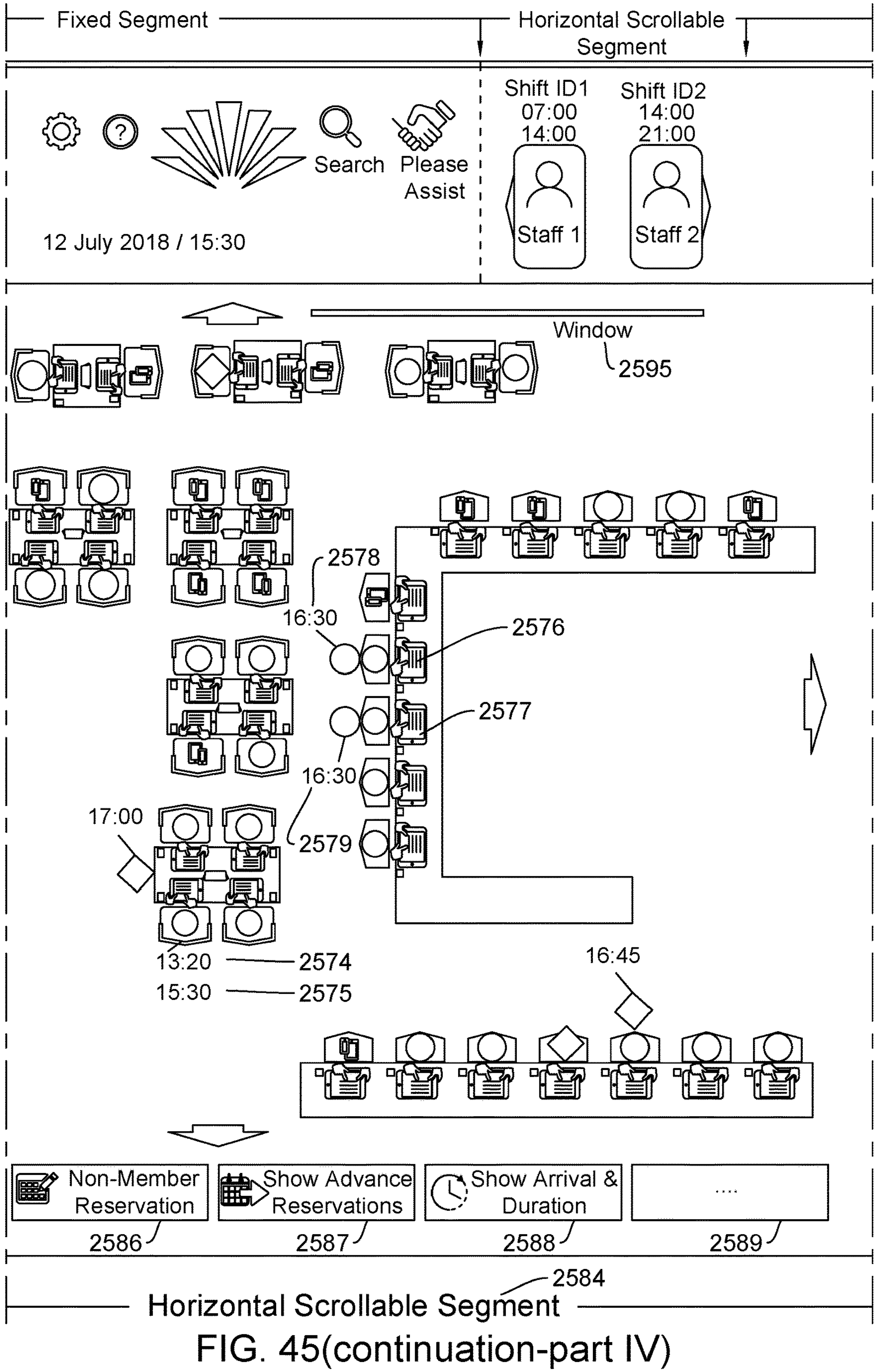
FIG. 45(continuation-part IV)

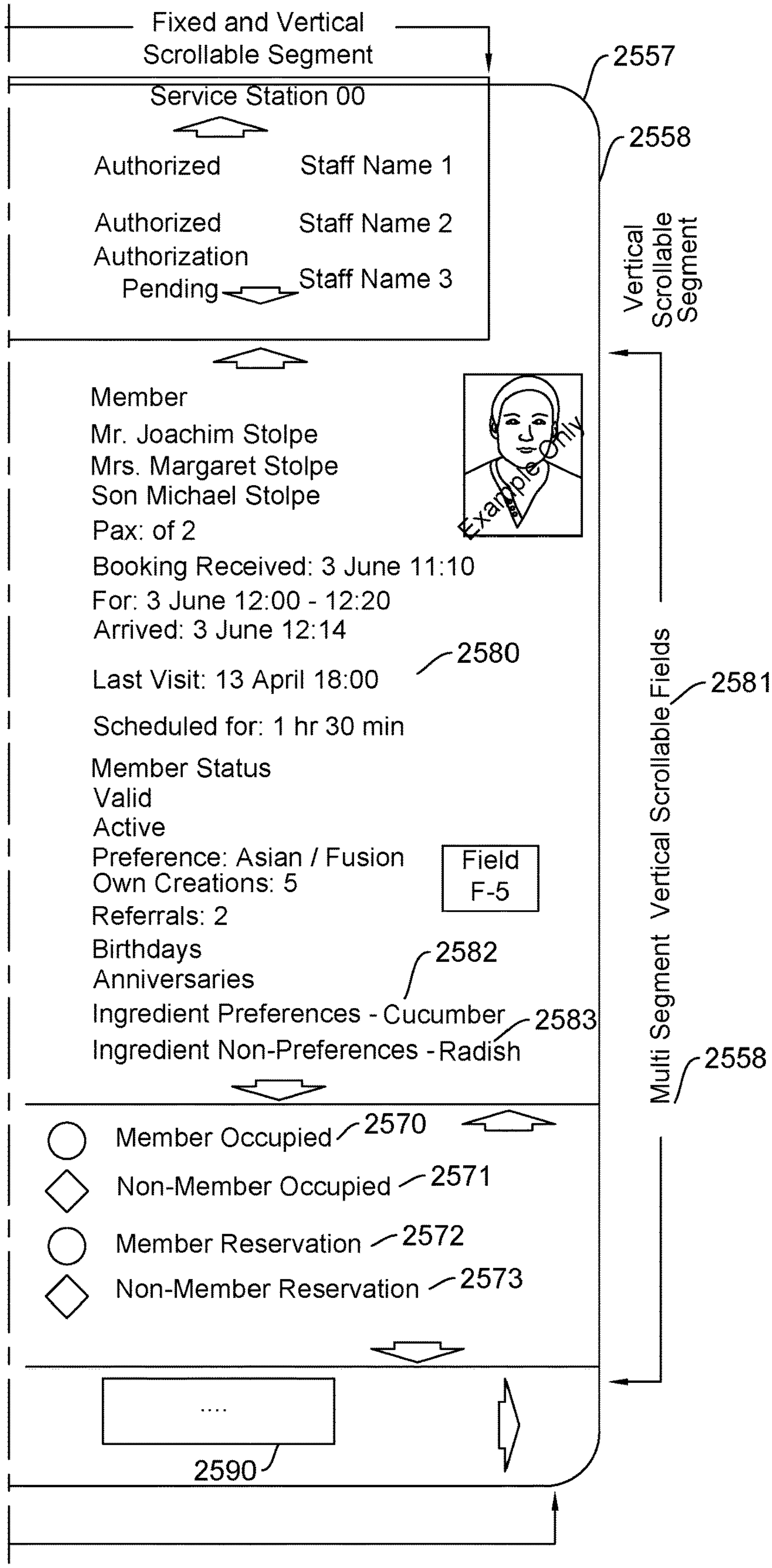
FIG. 45(continuation-part V)

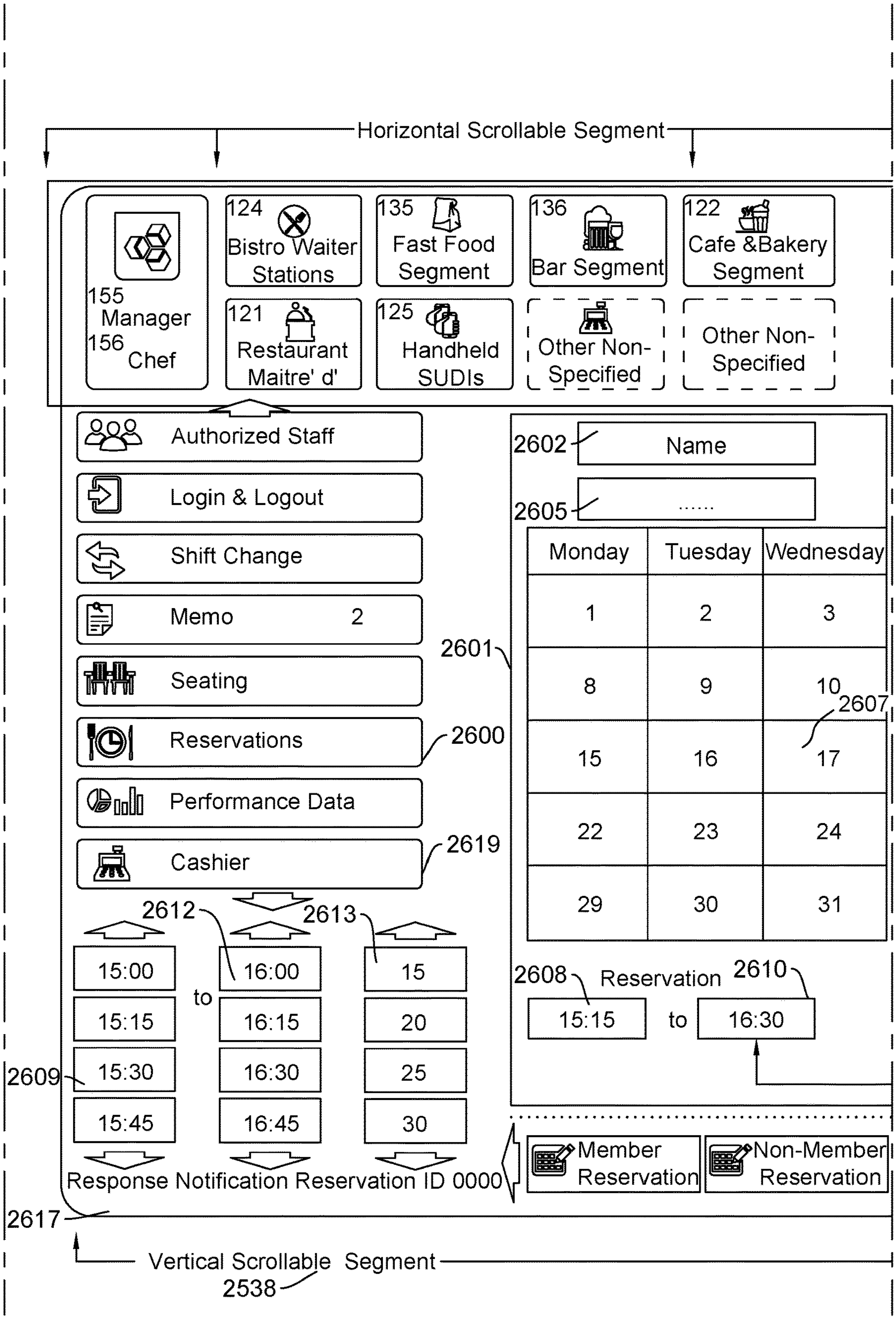
FIG. 46(continuation-part I)

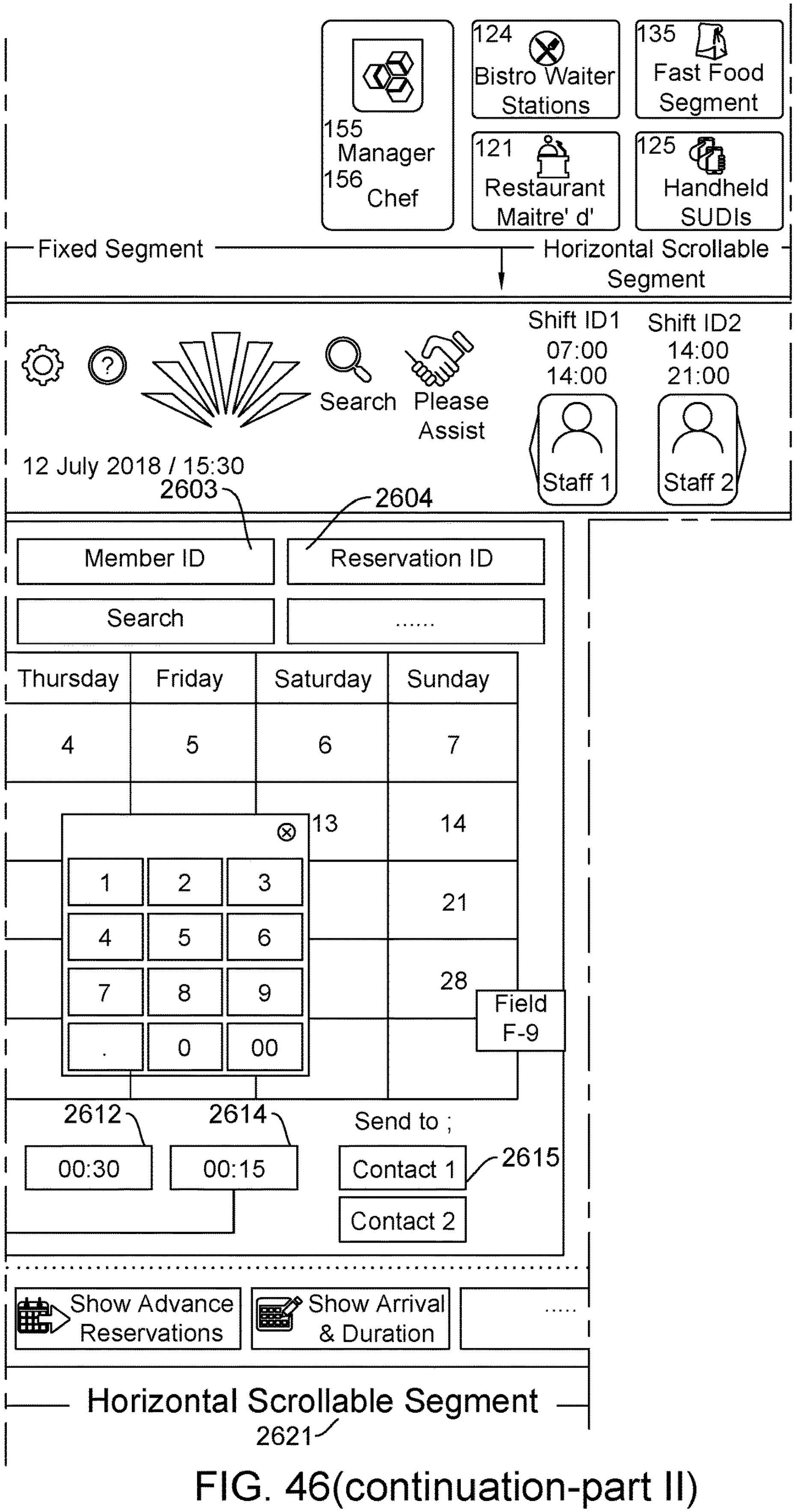
FIG. 46(continuation-part II)

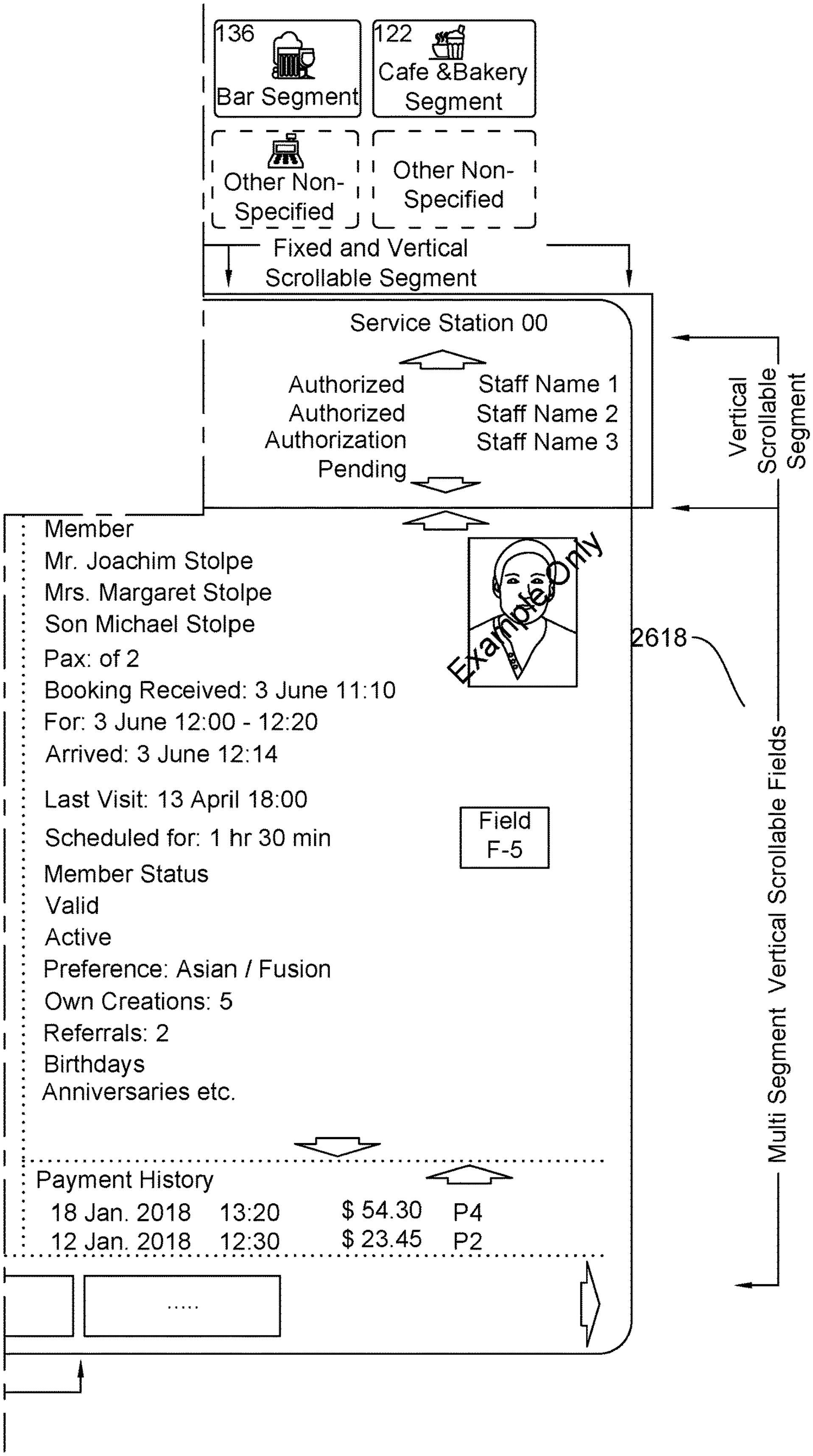
FIG. 46(continuation-part III)

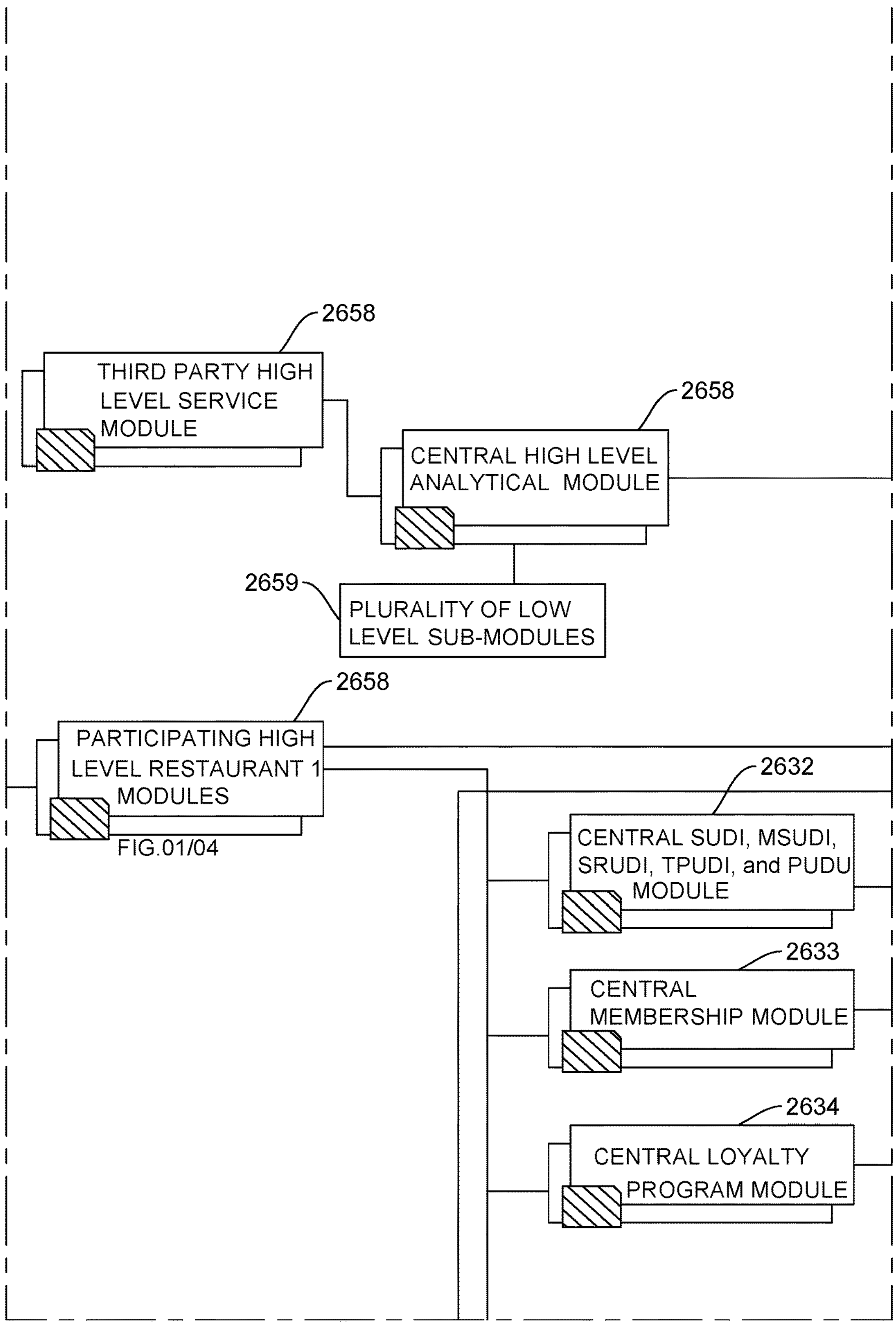
FIG. 47(continuation-part I)

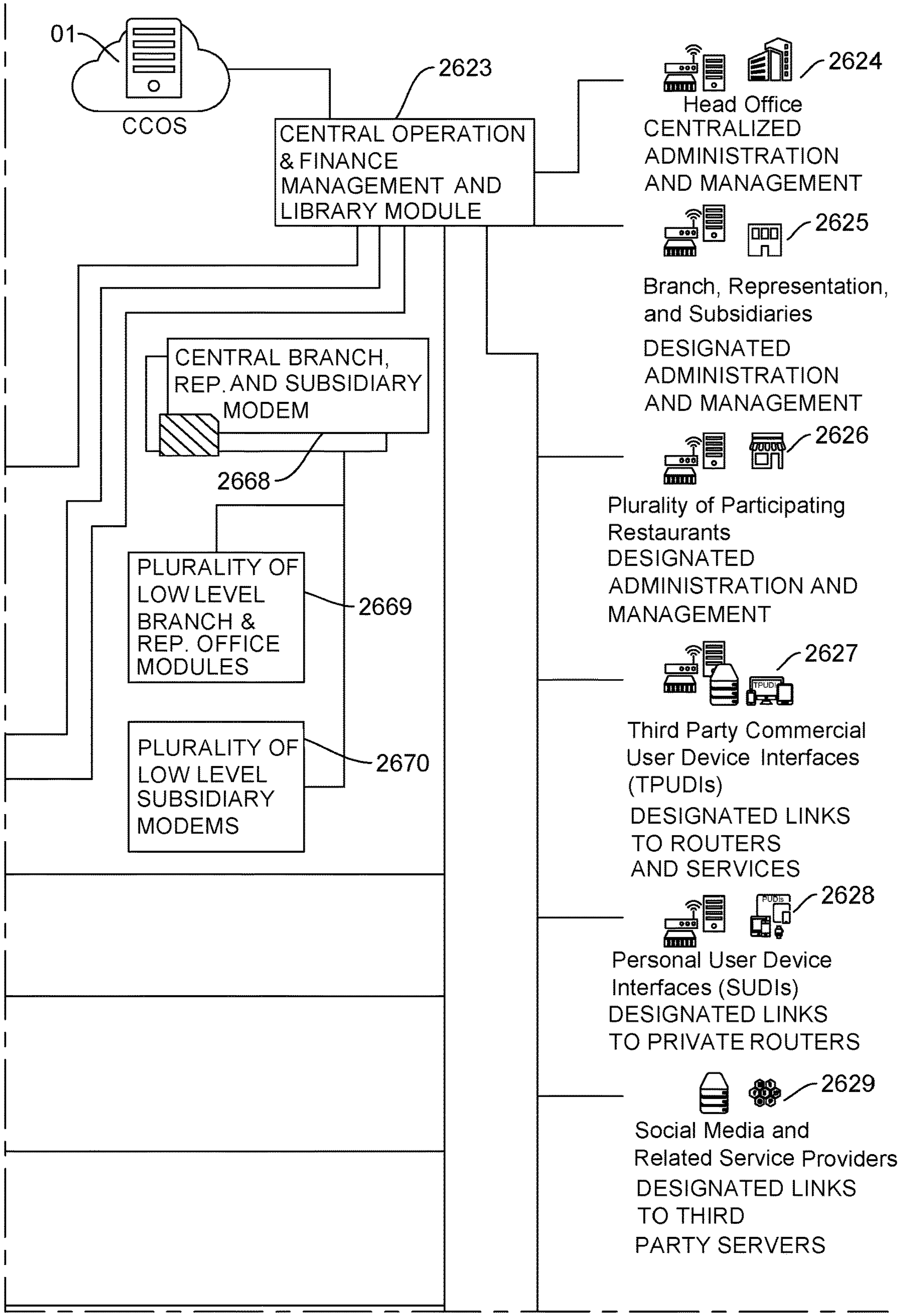
FIG. 47(continuation-part II)

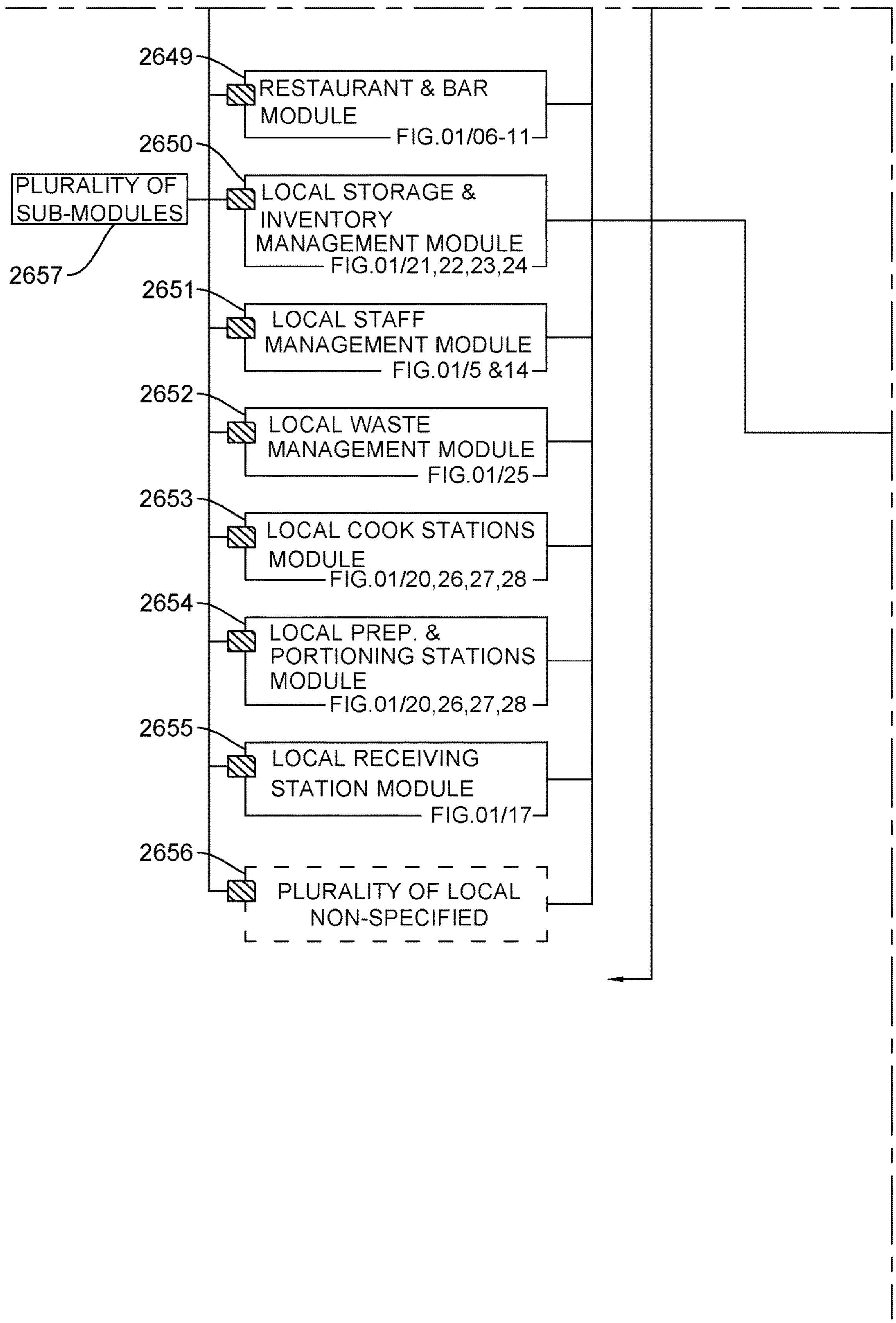
FIG. 47(continuation-part III)

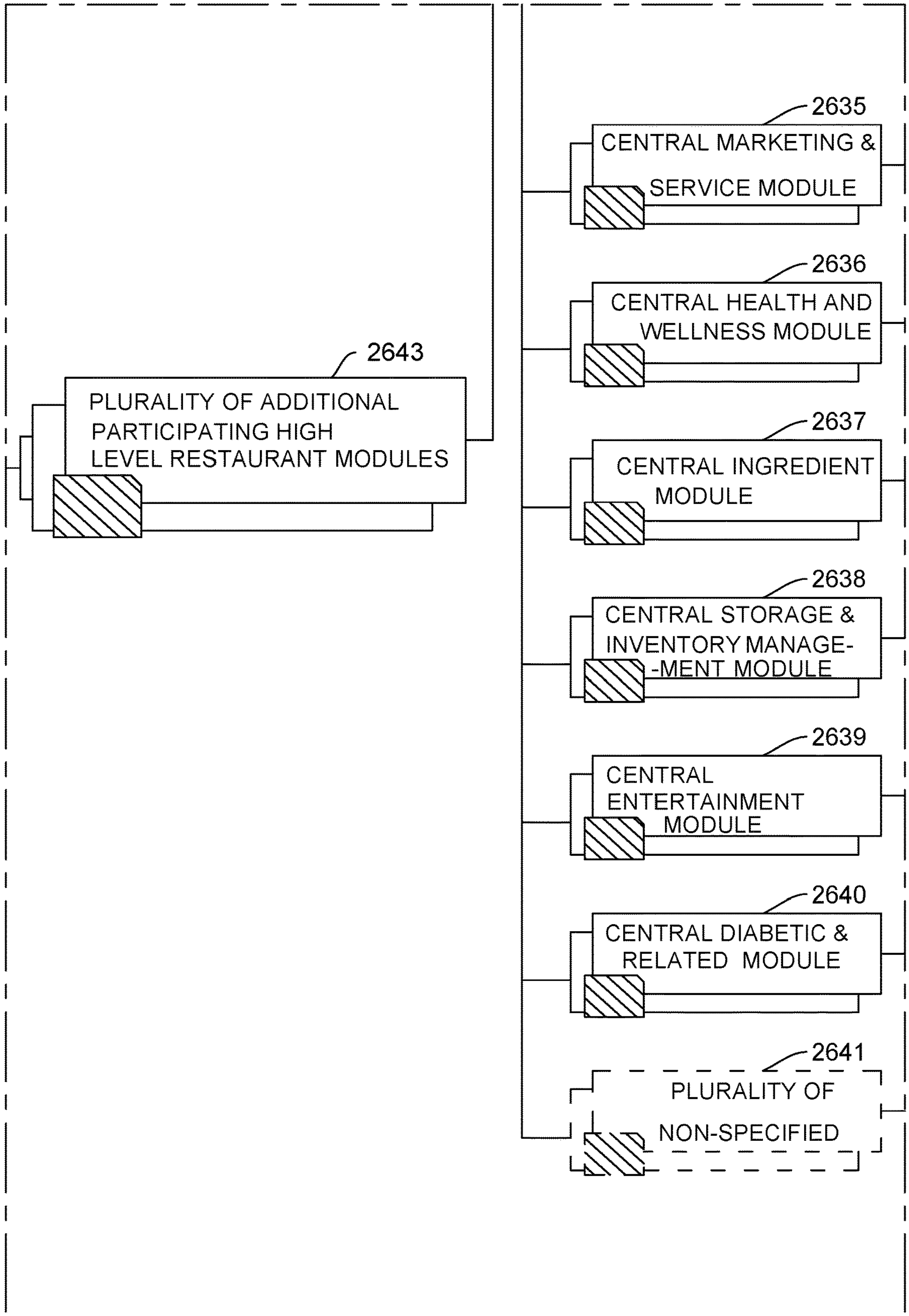
FIG. 47(continuation-part IV)

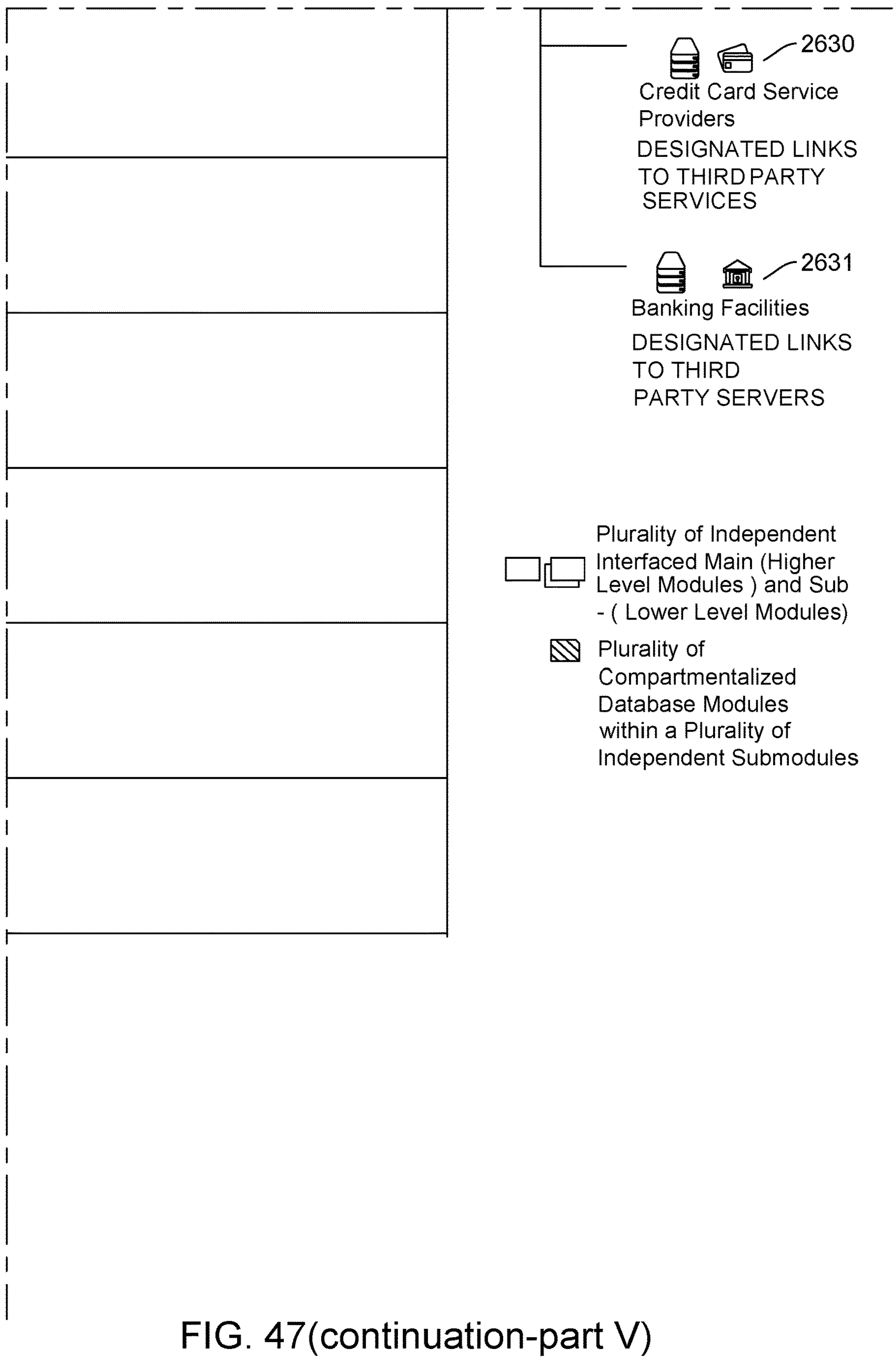
FIG. 47(continuation-part V)

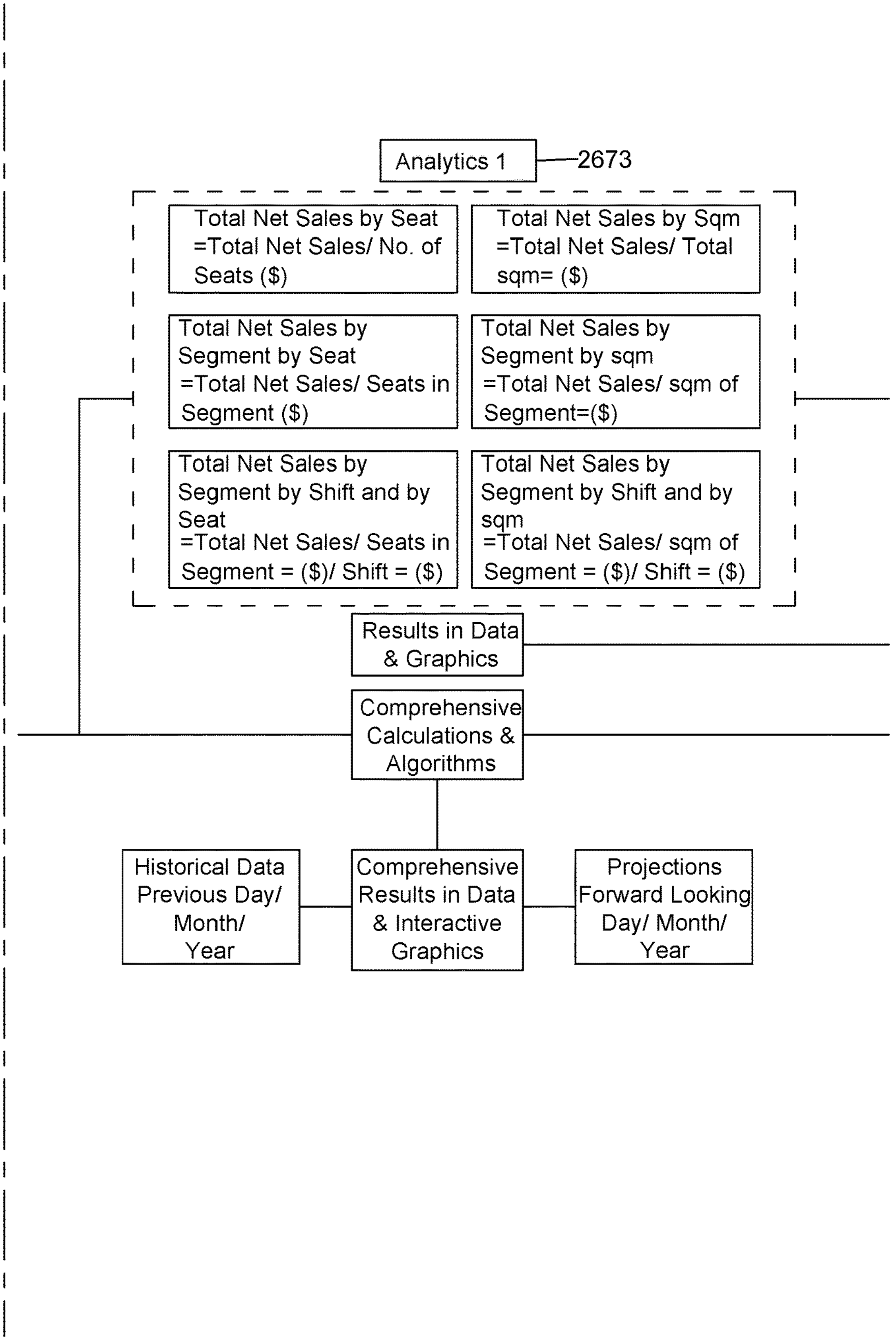
FIG. 48(continuation-part I)

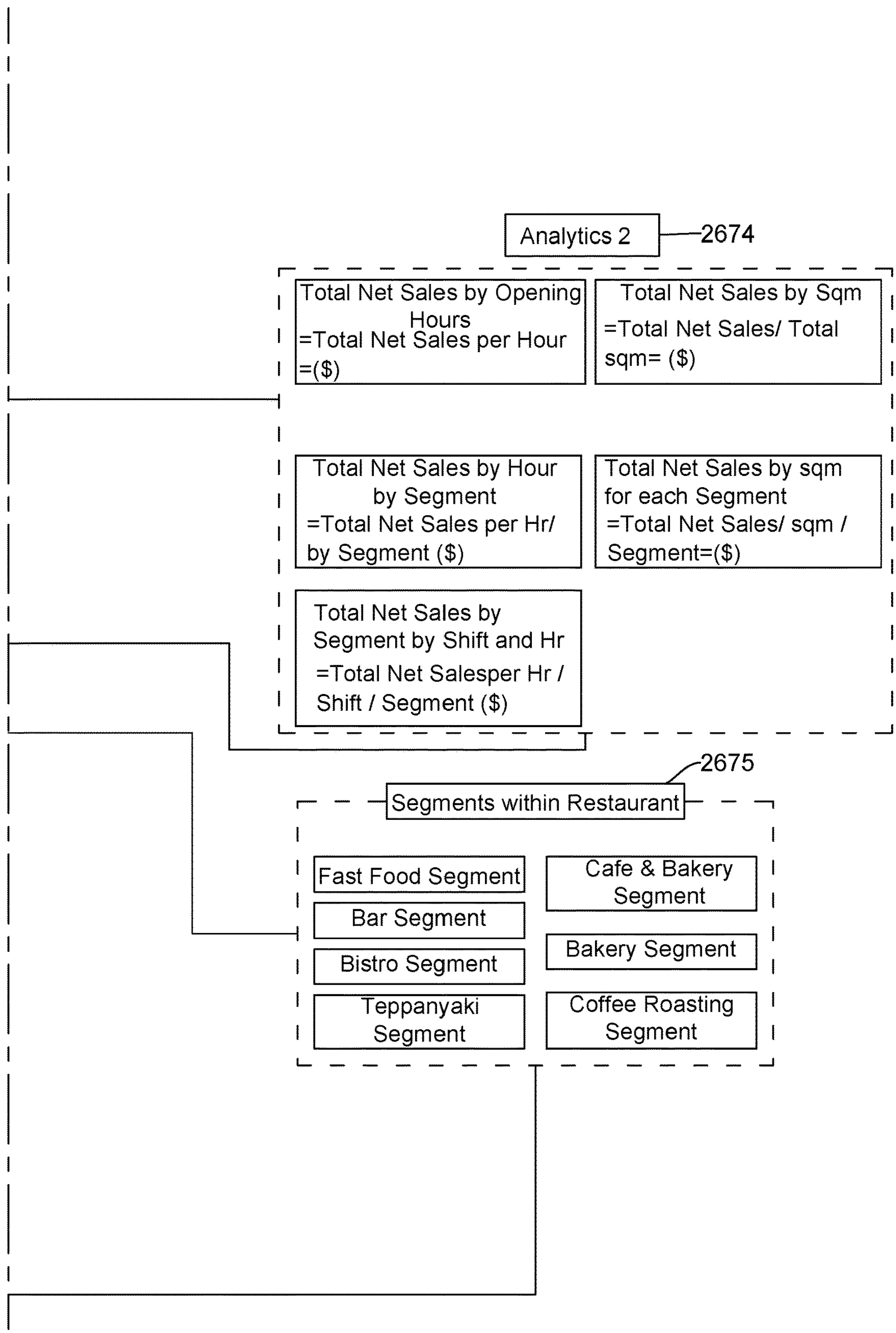
FIG. 48(continuation-part II)

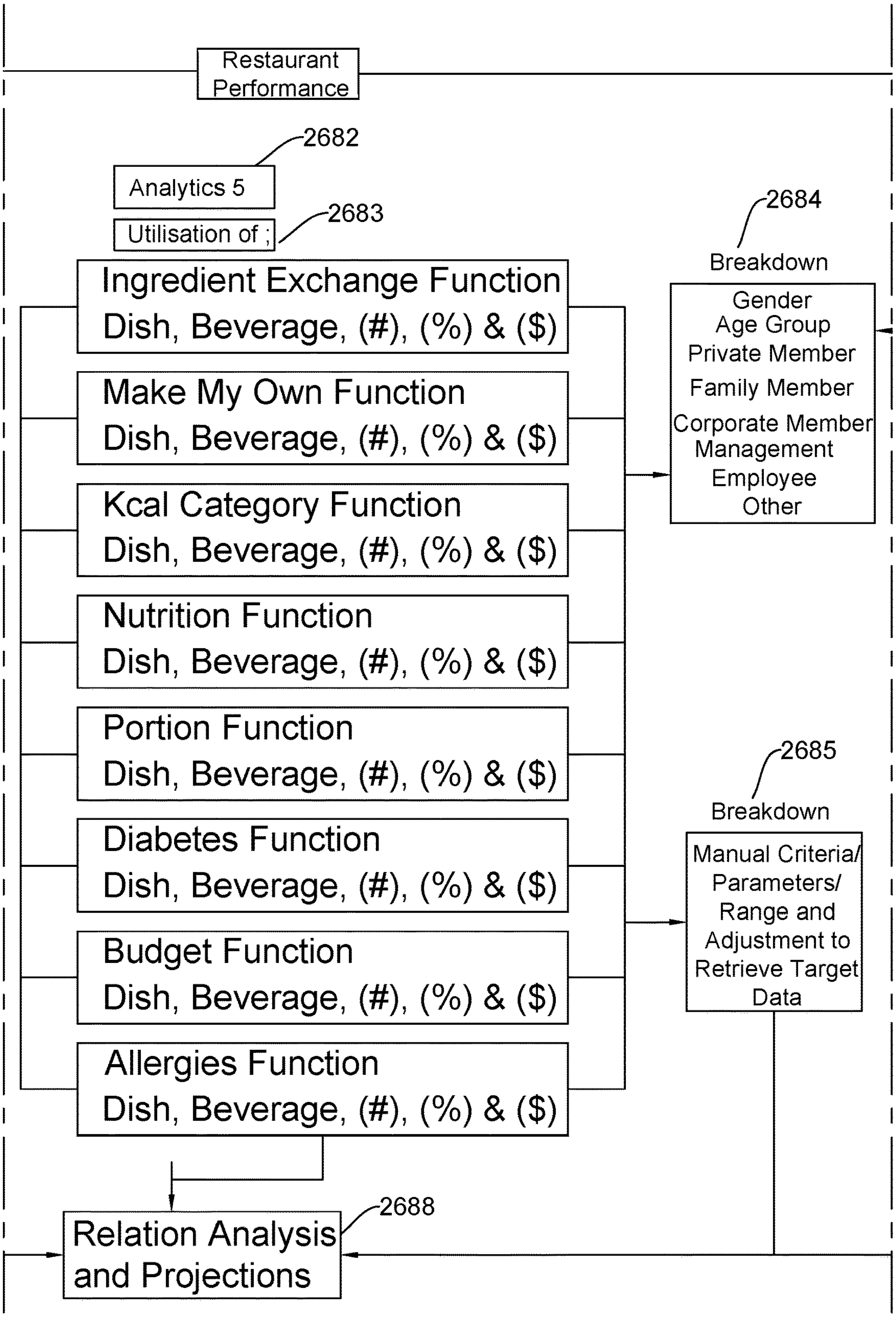
FIG. 49(continuation-part I)

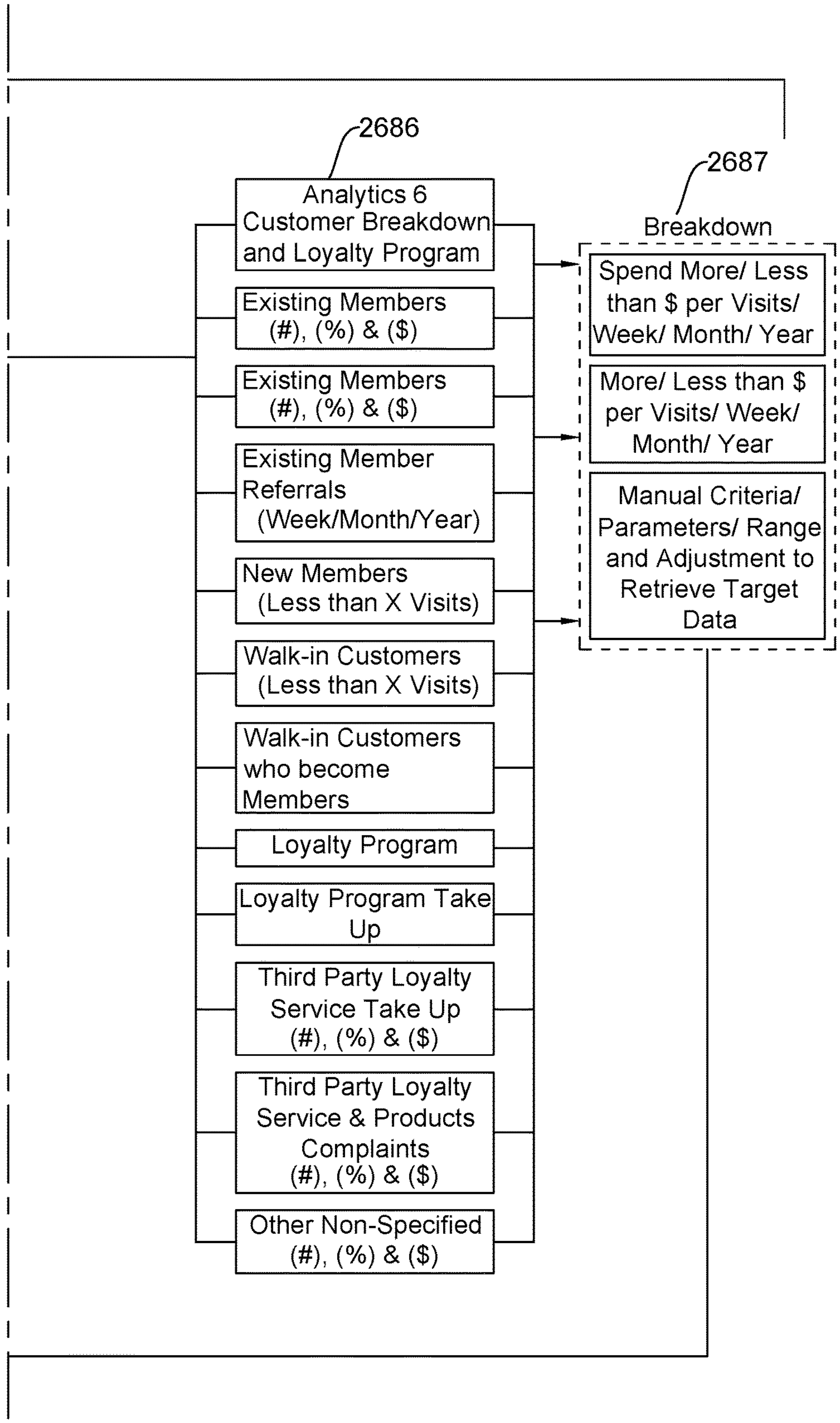
FIG. 49(continuation-part II)

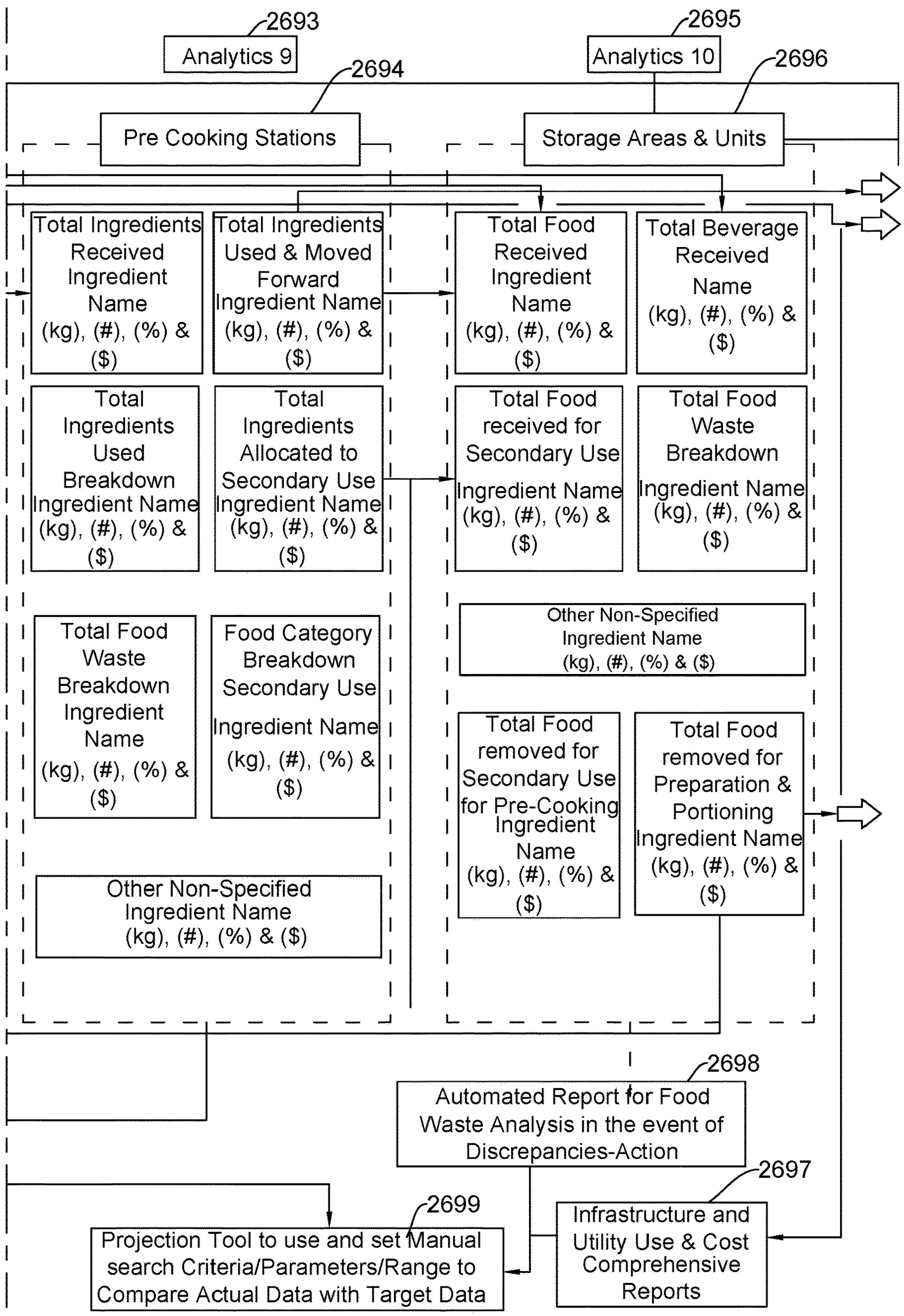
FIG. 50(continuation-part I)

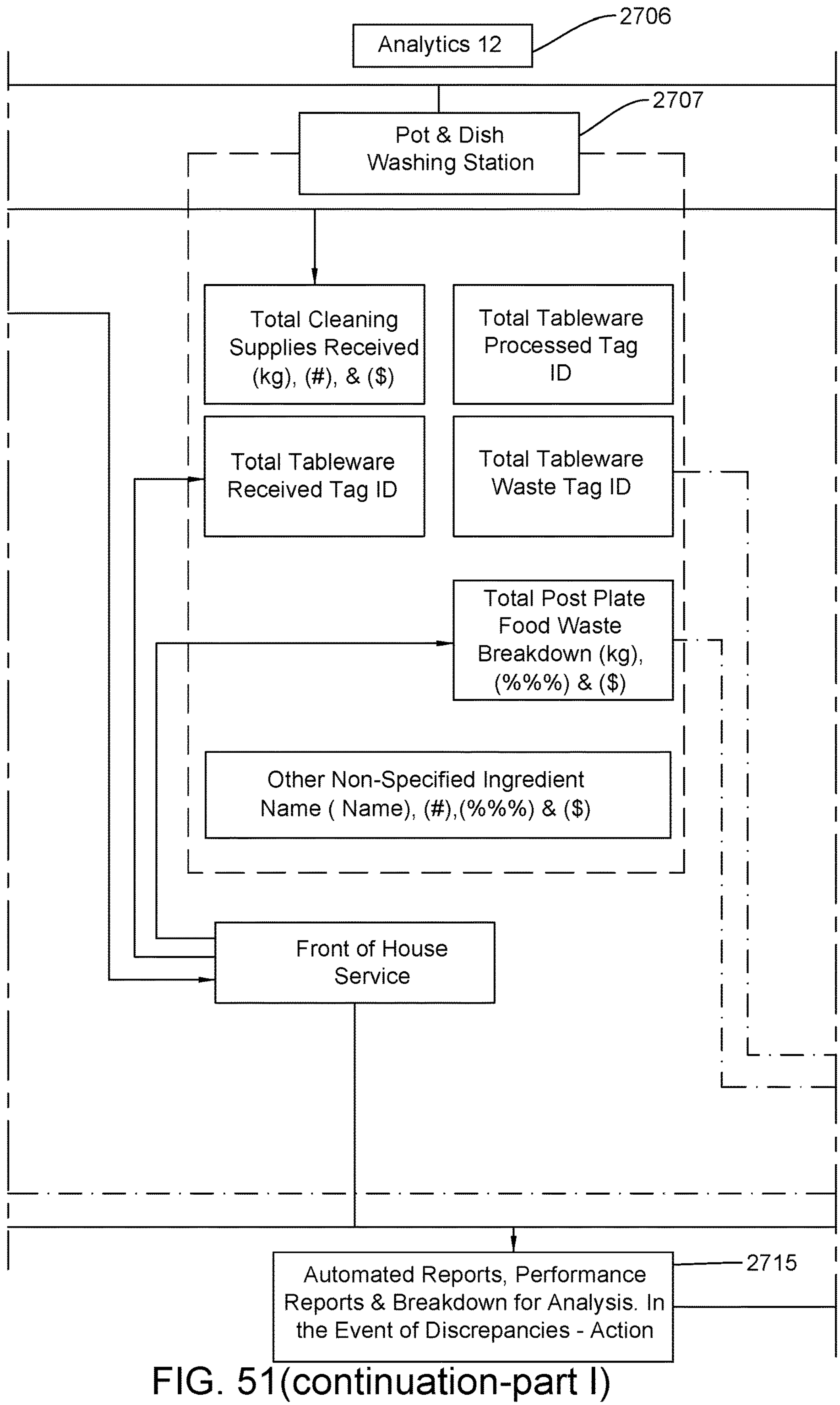
FIG. 51(continuation-part I)

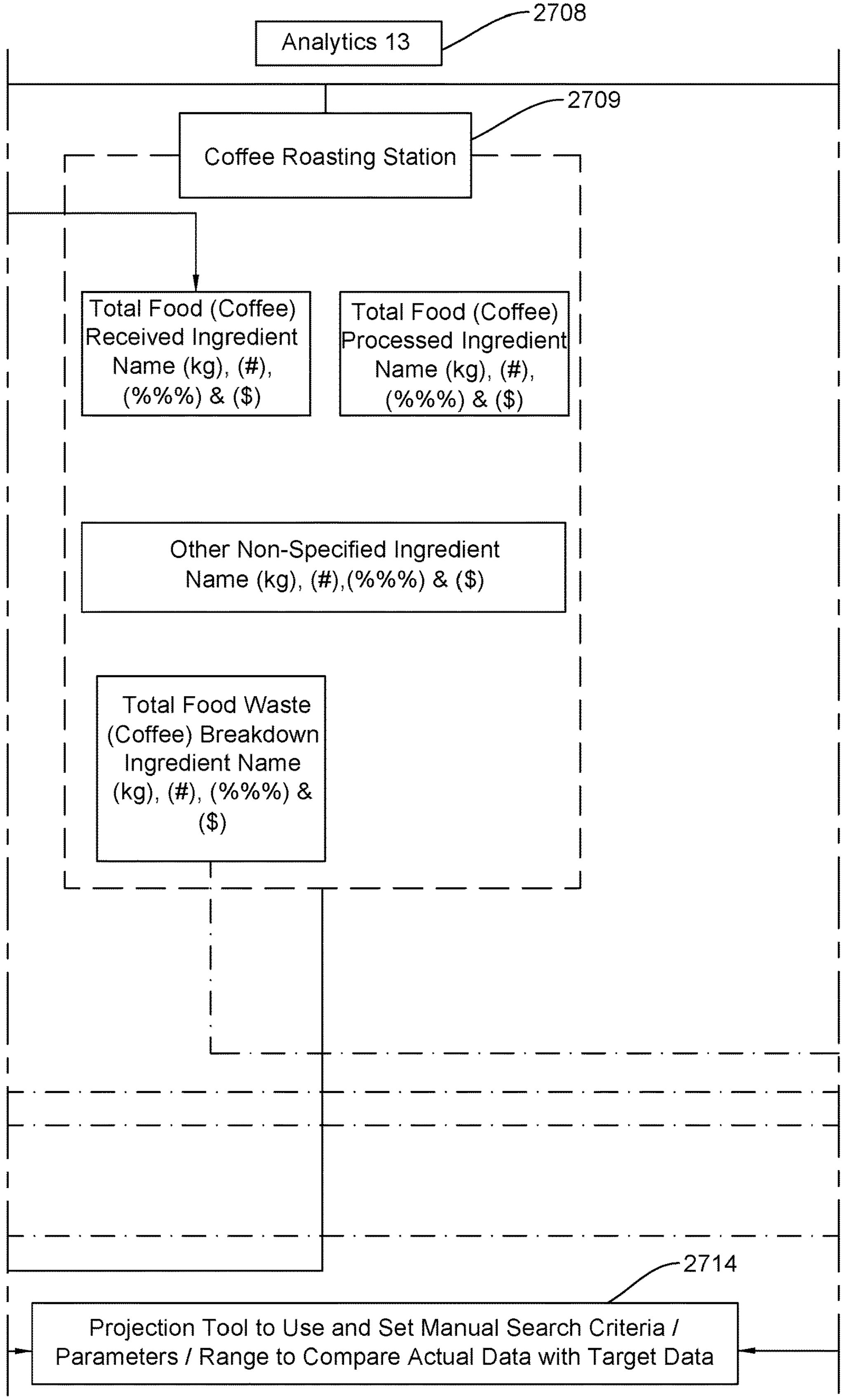
FIG. 51(continuation-part II)

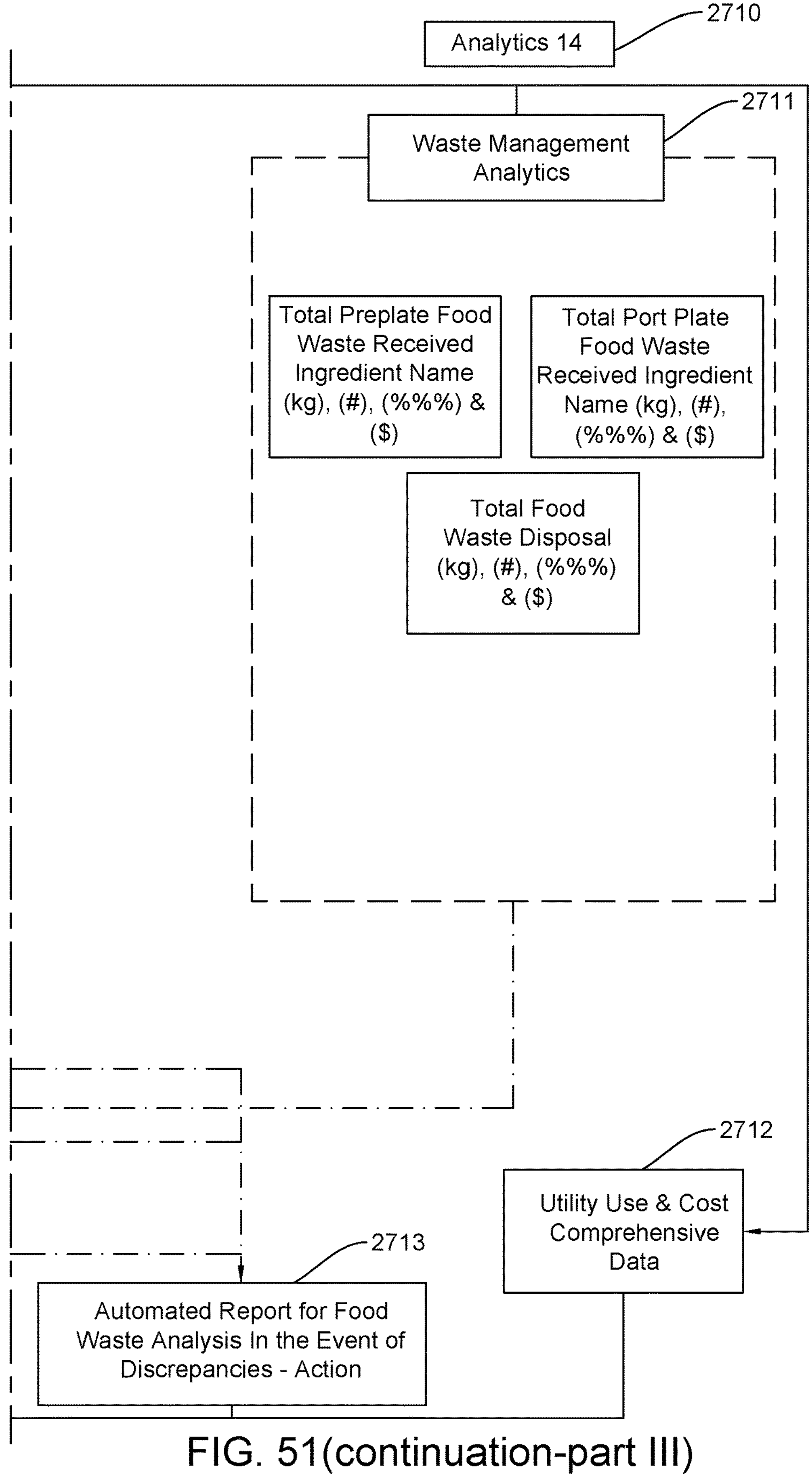
FIG. 51(continuation-part III)

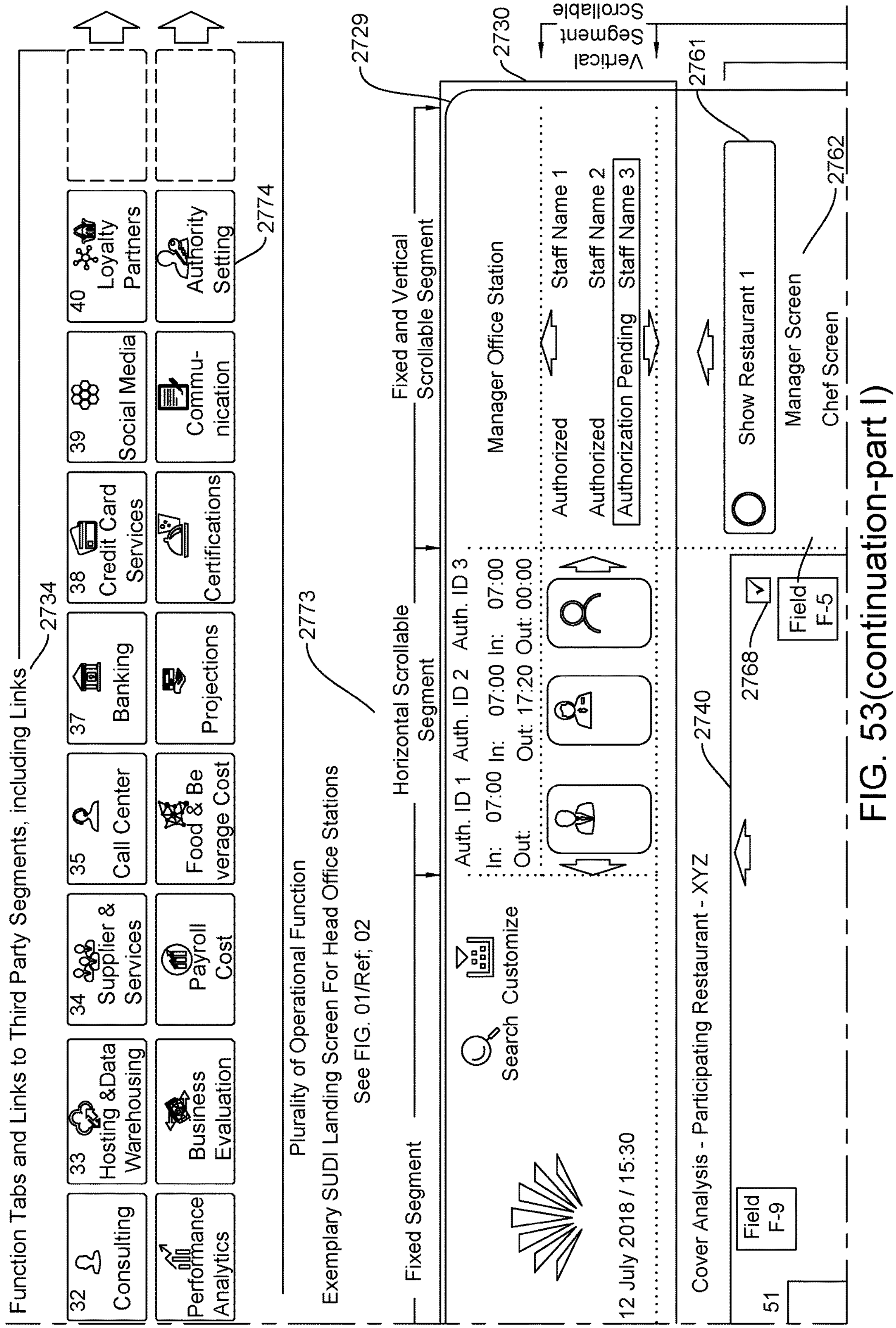
FIG. 53(continuation-part I)

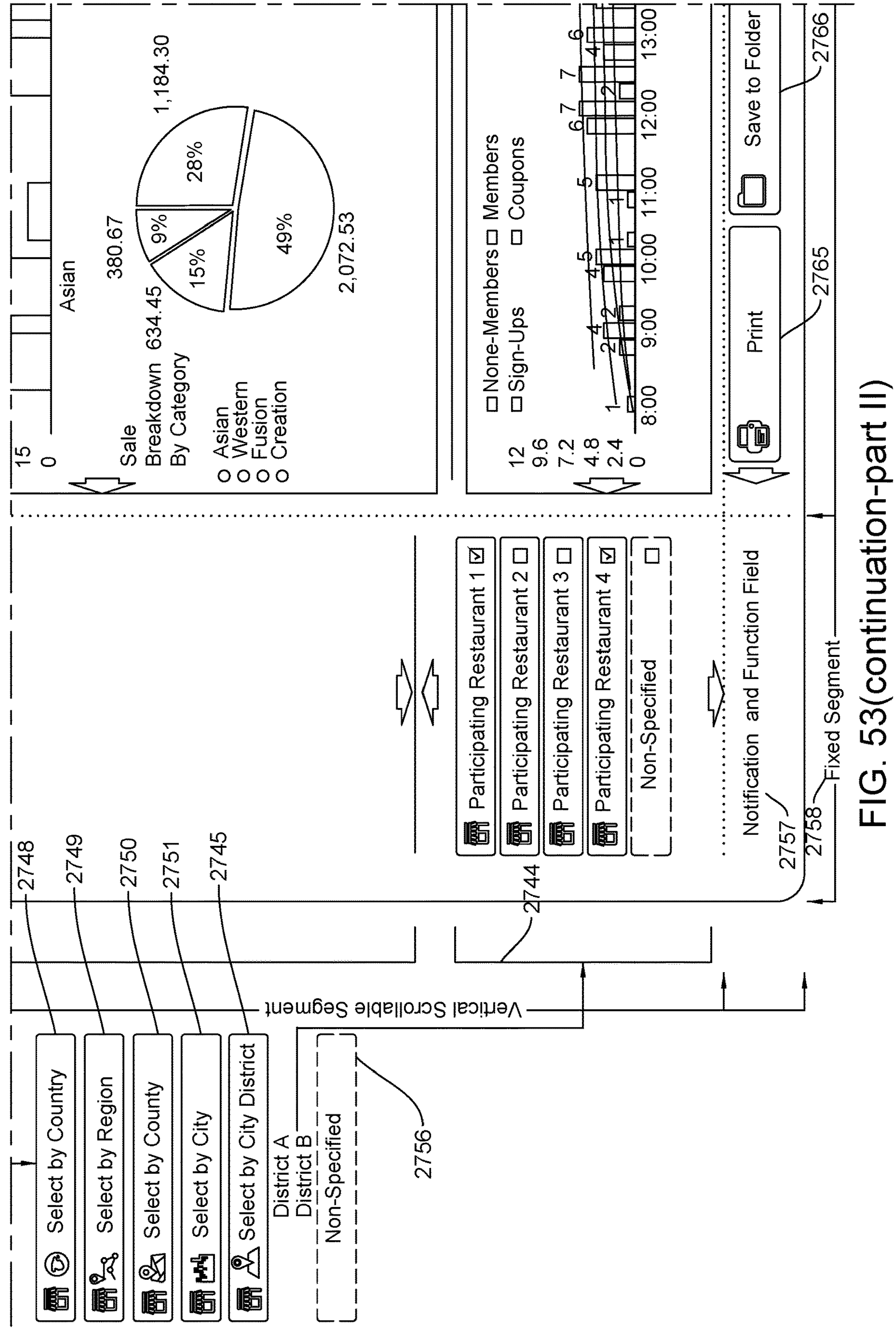
FIG. 53(continuation-part II)

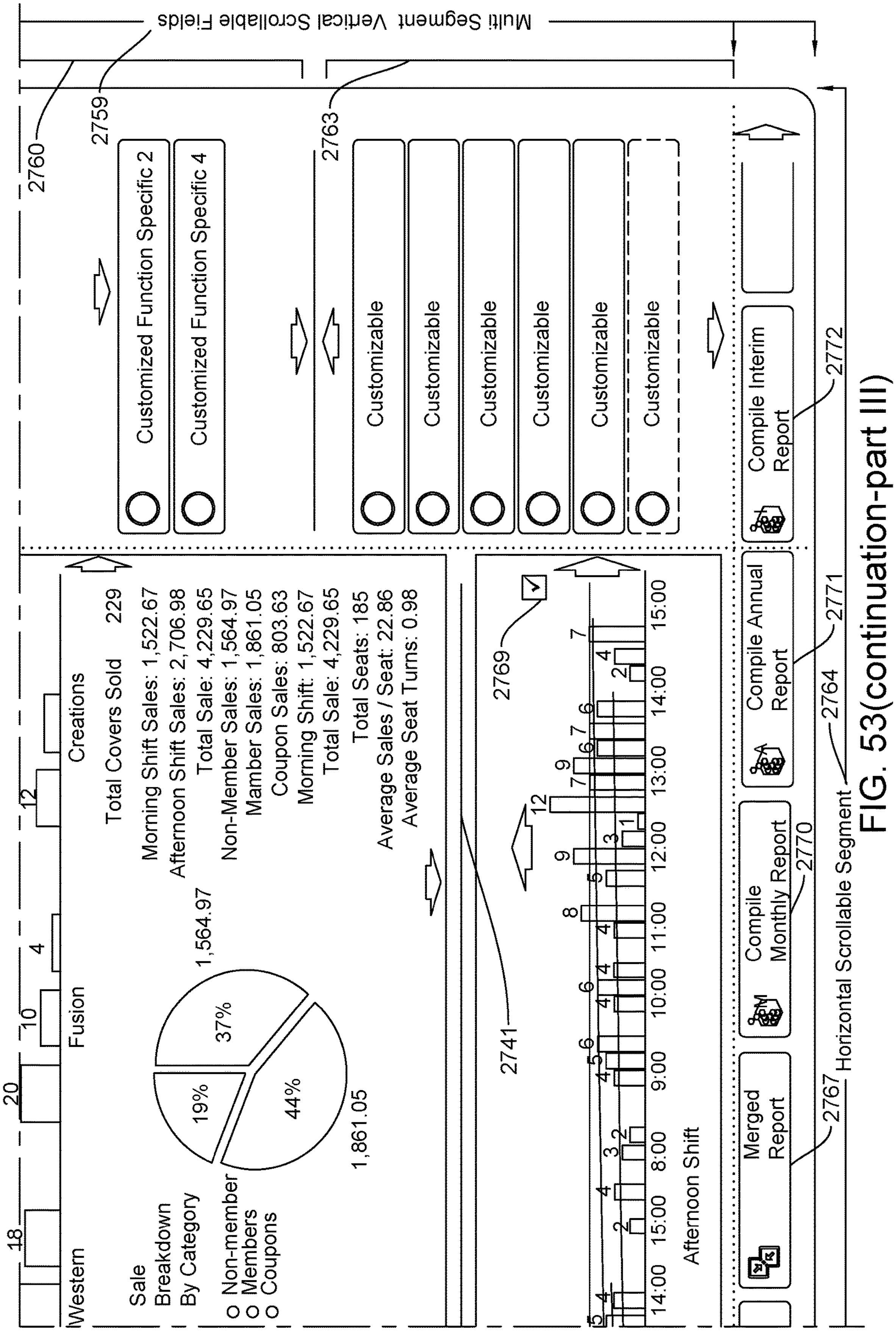
FIG. 53(continuation-part III)

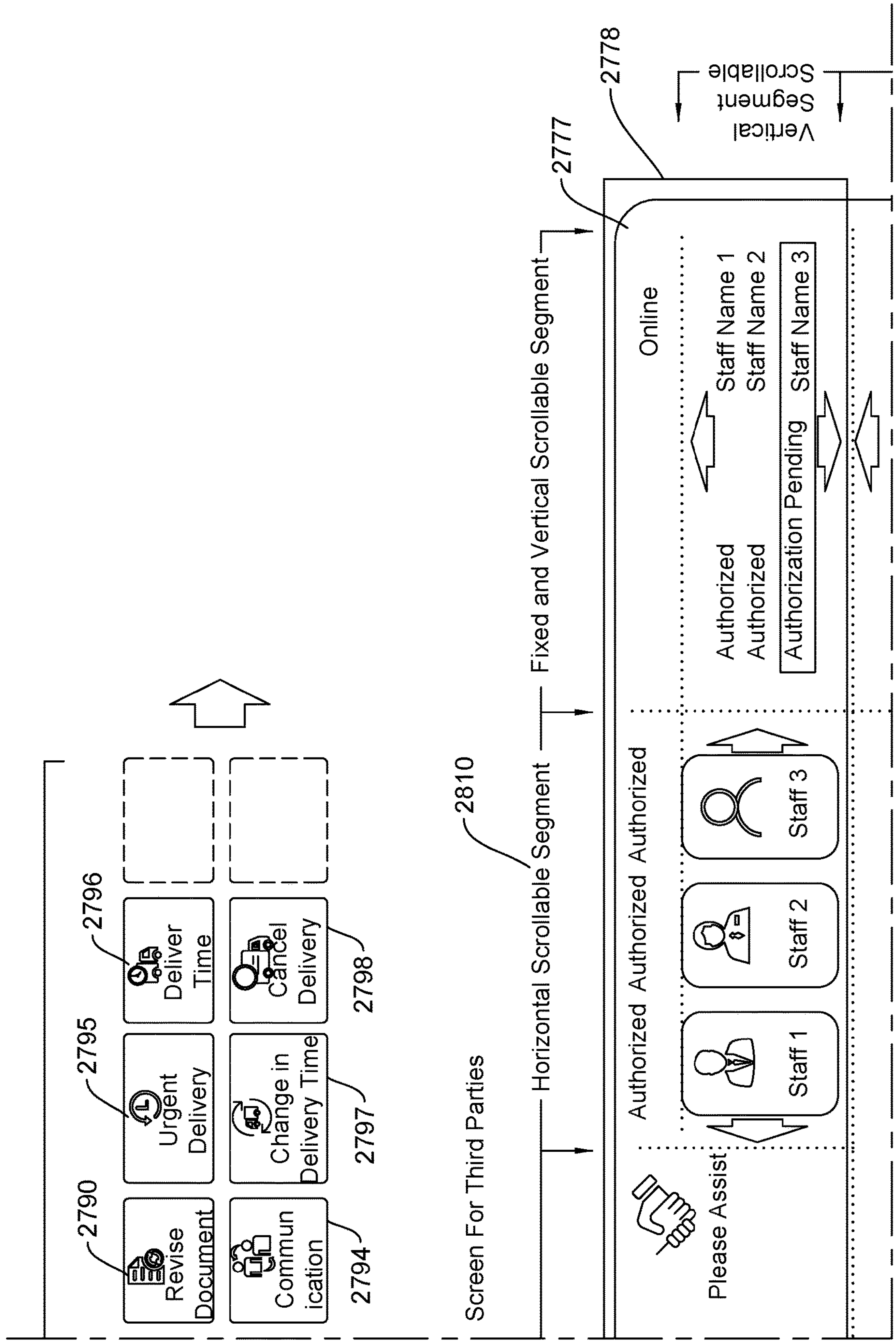
FIG. 54(continuation-part I)

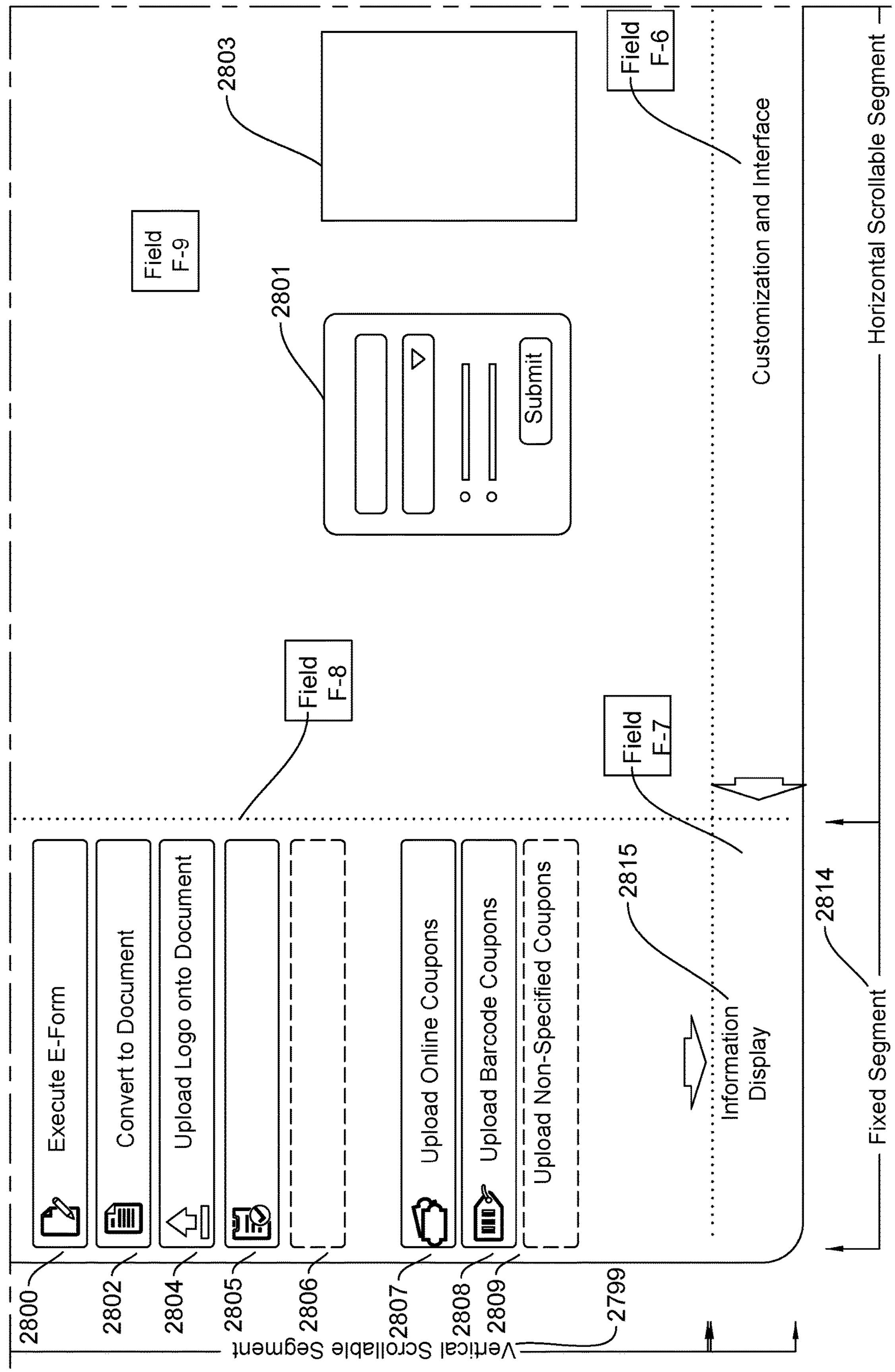
FIG. 54(continuation-part II)

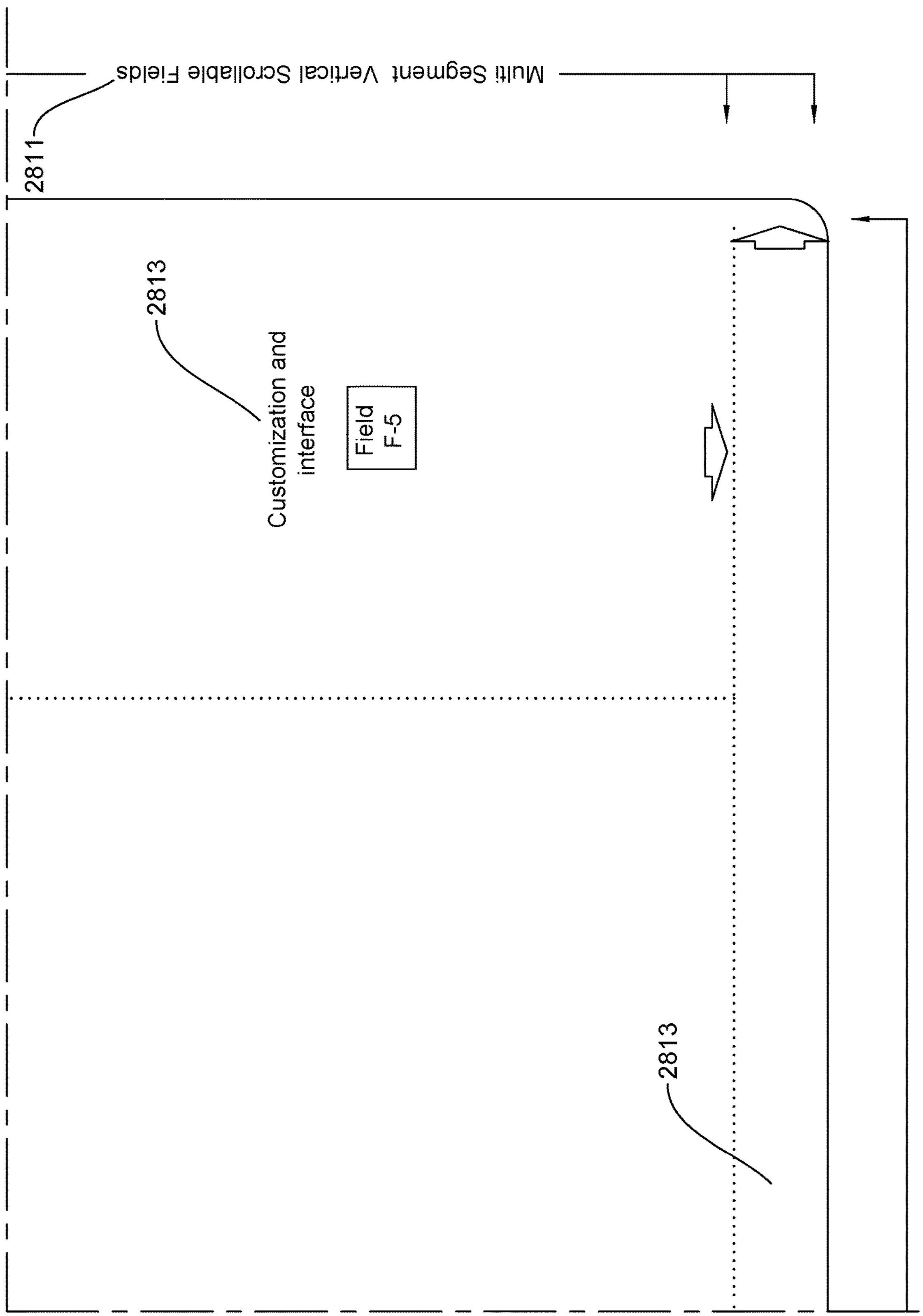
FIG. 54(continuation-part III)

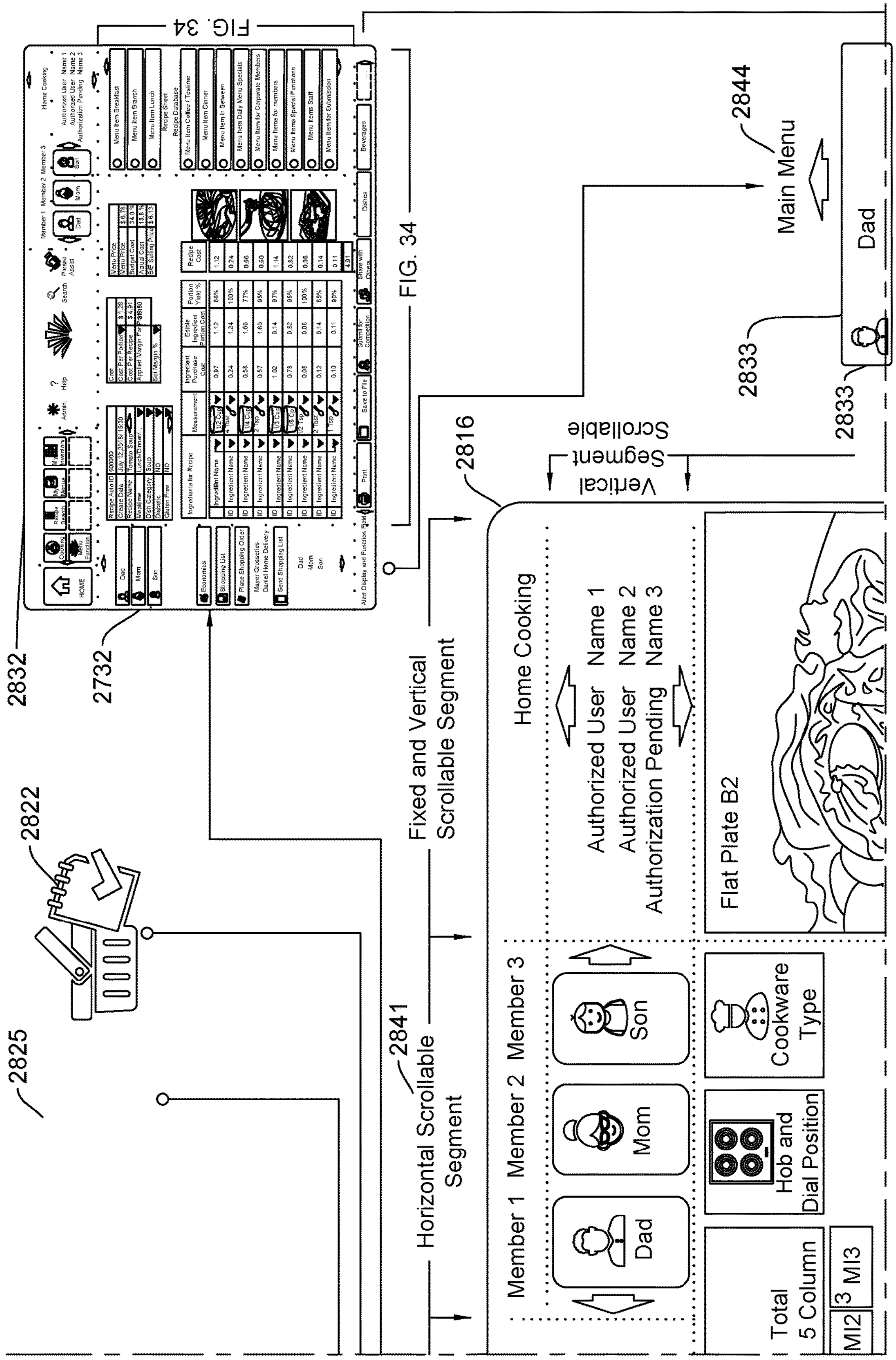
FIG. 55(continuation-part I)

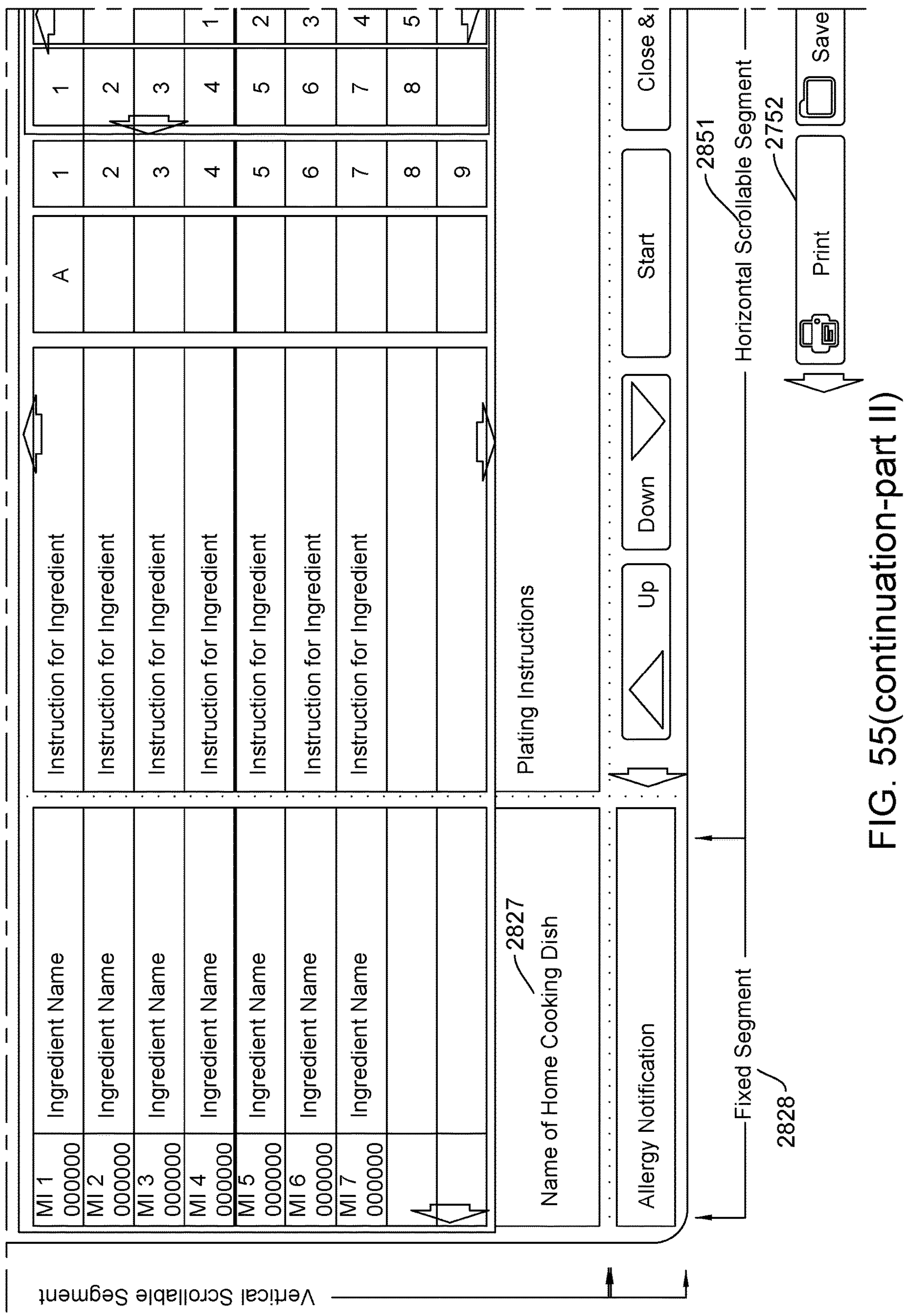
FIG. 55(continuation-part II)

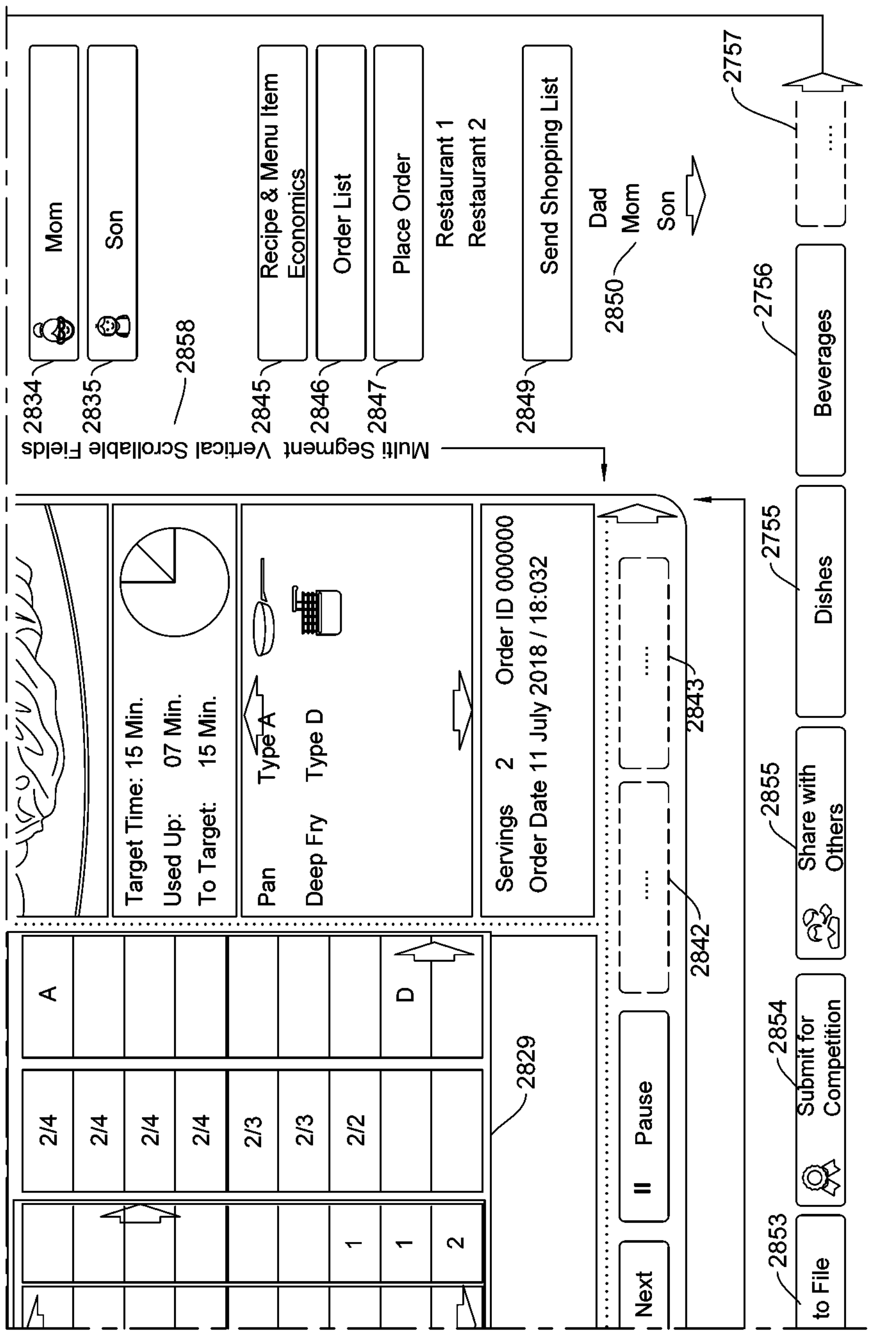
FIG. 55(continuation-part III)

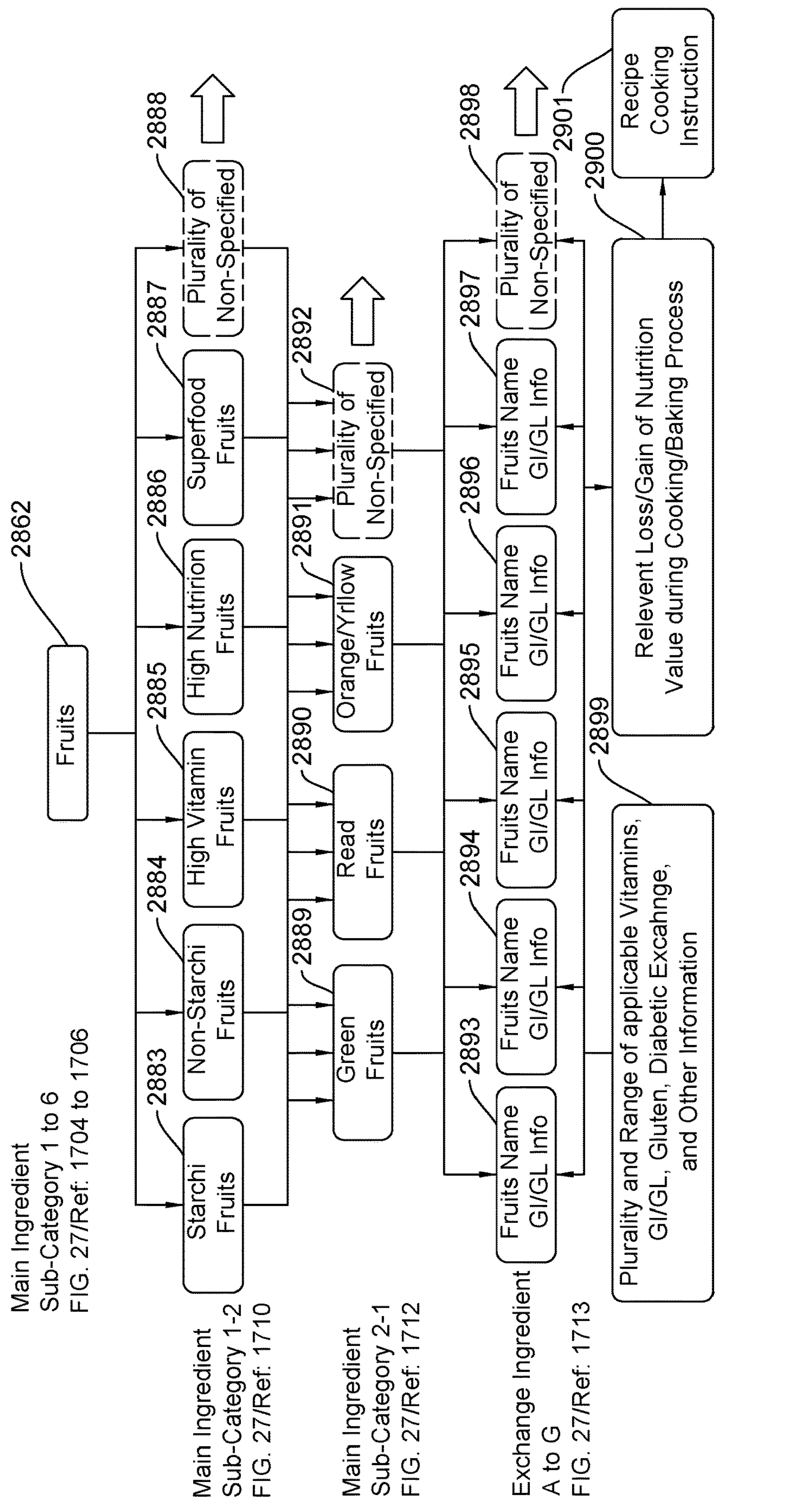
FIG. 56(continuation-part I)

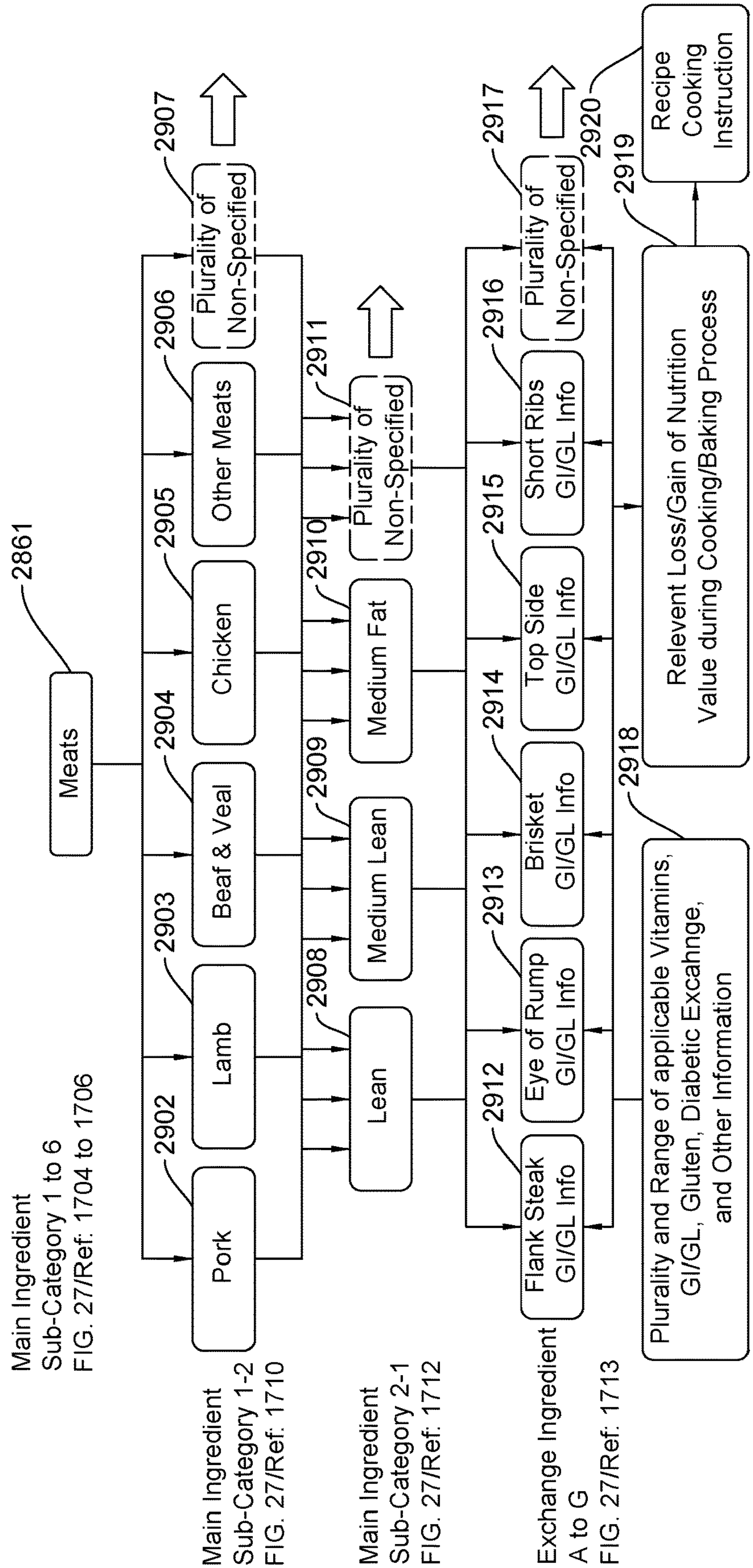
FIG. 56(continuation-part II)

SYSTEM AND METHOD FOR IMPLEMENTING A CENTRALIZED CUSTOMIZABLE OPERATING SOLUTION

CROSS REFERENCE TO RELATED APPLICATION

This application is a National Stage Entry of International Patent Application No. PCT/SG2018/050242, filed May 17, 2018, which claims priority from Singaporean Patent Application No. 10201704297Y, filed May 25, 2017, the entire disclosures of which are incorporated herein by reference.

FIELD OF INVENTION

The present invention relates broadly, but not exclusively, to systems and methods for implementing a centralized customizable operating solution.

BACKGROUND

In many fields of customer service, customers interact with computers in a variety of ways because businesses that provide customer services rely more and more on the interface between customers and computers, and to save costs it has become crucial for many businesses to find ways to facilitate this interaction. There are a wide range and variety of applications designed for handheld computers that use graphical user interfaces (GUI) and voice user interfaces (VUI) and other voice dialogue recognition and synthesizing systems, allowing for customers to engage and communicate wirelessly in many ways destined to evolve further, contributing to the evolution and progress in customer and computer interaction, resulting in a creative service orientated intelligent adaptive interface rather than command and action based, leading to customers to be more active rather than passive. Established customer interactions with computers are based on an archetypal structure and feedback loops, providing for a plurality of information and instruction flows between a customer and a system installed in a computer. For example, a customer has a goal and acts with the intent to achieve the intended goal through a computer that provides for a customer friendly environment under which a customer hopes to achieve the intended goal.

Currently available point of sales (POS) and customer relation management (CRM) systems that are used in the hospitality and restaurant industry still constrains customers choices to a plurality of pre-composed menu items with limited options to fully accommodate customers' requirements, needs, and preferences. As a result, operators are handicapped by such inflexible systems, and customers are inclined to make choices customers would not make if there was a more comprehensive menu solution available to them. Existing POS and CRM systems offer some flexibility, but do not allow customers to comprehensively influence and customize ingredient selection for menu items, or the creation of own menu items to meet a customer's own budgets, health concerns, ingredient preferences, and other personal lifestyle choices, and customers are still required to rely on the presumed skill of service staff within a restaurant, or the willingness of the operator to address all customer's wishes and concerns, especially allergies and diabetic concerns, and personal lifestyles and ingredient preferences. Even when visiting chain restaurants, customers also find themselves again and again to repeat wishes, needs, preferences, and concerns because there is no service platform available today that allows for the sharing of a customer's wishes, needs, preferences, and concerns between said chain restaurants.

A need therefore exists to provide systems and methods for implementing a centralized customizable operating solution.

SUMMARY

Embodiments of the present invention provide a Centralized Customizable Operating Solution (CCOS), which is a cloud computing based and subscription based centralized customizable operating solution for front and back of house operations for a plurality of participating restaurants, but can also be used by a plurality of other business establishments or entities, set up for the purpose to providing customer services that include fully customized products and services, and combinations thereof and fully customizable packages comprising of products and services within their business premises and beyond through the internet. For example, the COOS allows customers to fully customize a plurality of standard menu items available within said participating restaurants to meet customers personal health and lifestyle choices, including calories, nutrition, budget, portioning, allergies and diabetic concerns, and ingredient non-preferences and preferences. The COOS allows a membership structure for private and corporate members, providing member customers with the option to create a plurality of corporate menus for employees and own personal menus that are linked to the relevant plurality of participating restaurants. Member customers can customize and create corporate and personal menu items and orders for said menu items can be placed at any participating restaurant, for dine-in, delivery, or collection as ready cooked menu items, or ready portioned ready to cook menu items for home cooking through an online ordering system and access to online cooking instructions.

There are a plurality of embodiments within the present invention of the cloud based centralized customizable operation solution COOS illustrated exemplarily under FIG. 01 to FIG. 57, embracing an independent, interlinked, interexchangable module infrastructure illustrated exemplarily under FIG. 47 that includes a comprehensive service and supply operation infrastructure provided by third parties to support a plurality of single or multi segments front of house and back of house operation of participating restaurants, illustrated exemplarily for a multi segment restaurant operation under FIG. 03. The COOS also embraces a comprehensive approach of pre-plate and post plate waste management. The COOS monitors all food products and ingredients from the point of receiving them to the point of service and disposal. Allowing for the full customization of menu items illustrated exemplarily under FIG. 26 and FIG. 27, that varies between members and non-members. Menu items can be customized and created while within a participating restaurant, at home, at work and on the go to meet personal health and lifestyle choices and requirements, including making a plurality of personal customizable plans involving but are not limited to calories, nutrition, budget, portioning, allergies and diabetic concerns, illustrated exemplary under FIG. 16, FIG. 17, FIG. 18, FIG. 19, FIG. 20, and FIG. 21; also embracing ingredient preferences and non-preferences illustrated exemplary under FIG. 27. This allows that post plate food waste can be further reduced because customers, applying the full customization options, can save money to plan, scale, and budget what is put on the plate and consumed, without wasting food placed on overloaded plates packed with non-preferred food. Member customers are also able to share a plurality of standard, customized and personal created menu items, illustrated exemplarily under FIG. 23 to introduce others to the concept provided by participating restaurants. A further embodiment of the present invention of the CCOS 1 is a scalable and customizable membership and loyalty service management, including loyalty products and services that are available within a plurality of participating restaurants and/or provided by a plurality of third parties, illustrated exemplarily under FIG. 11 and FIG. 12, allowing for a plurality of customized settings under the plurality of member accounts, illustrated exemplarily under FIG. 15. Member users can log on to an online CCOS 1 service for home cooking instruction for customized ready portioned menu items comprising of a plurality of ingredients that can be delivered and/or collected at a participating restaurant. Through its plurality of relevant independent interlinked interexchangable modules within the COOS 1, the head office can manage the plurality of operations. The COOS 1 allows for adding a single or plurality of said modules and/or groups of modules to expand operations, illustrated exemplarily under FIG. 47.

The cloud based centralized customizable operating solution (COOS), see e.g. FIG. 01, according to an embodiment of the present invention is a centralized management and service approach, involving a plurality of independent interlinked/inter-exchangeable modules within the CCOS FIG. 47 comprising of a central server module that is in communication with a plurality of input and execution modules, wherein each input module is configured to accept inputs from a user relating to customized operations associated with the user; wherein the central server module is configured to generate corresponding outputs based on the accepted inputs, and transmits each output to a relevant execution module for execution of the output. The aforementioned customized operations associated with the user include, but are not limited to tasks, processes, functions and requirements that are specifically selected or chosen by the user. In this manner, each generated output is related to at least one task, process, function and/or requirement that is specifically selected or chosen by the user. The aforementioned CCOS system for implementing a customizable operating solution further includes a plurality of databases linked and/or integrated into the independent interlinked modules. The aforementioned step of generating corresponding outputs based on the accepted inputs includes, but is not limited to the sub-step of: accessing the one or more data sources to retrieve relevant customizable auto calculations, algorithms and/or rules to facilitate generation of the corresponding outputs. The acceptance of the inputs from the user depends on an attribute of the user. In this context, the user includes, but is not limited to: a customer, a staff member or a third party. In this context, an attribute includes, but is not limited to: membership status and customer privilege/priority level. For example, a member or a customer with a higher privilege/priority level has access to more customized operations compared to a non-member or a customer with a relatively lower privilege/priority level. As another example, a staff member with a specific or higher access/privilege/priority level has access to more customized operations compared to staff members with a relatively restricted access or lower privilege/priority level. The aforementioned outputs include, but are not limited to computer executable instructions, output signals and notifications. The aforementioned execution module may be an intelligent cooking station or a service counter placemat. The intelligent cooking station and the service counter placemat can execute instructions received from the central server module. The intelligent cooking station and/or the service counter placemat can utilize tableware identification and tracking (e.g. customizable and programmable waterproof and +95° Celsius heat resistant NFCs/RFIDs devices) to facilitate execution of the instructions. The aforementioned execution module may be also being an inventory management module that utilizes product and product container identification and tracking (e.g. via NFCs/RFIDs devices) for inventory management. One or more of the aforementioned input modules may be connected to a data acquisition module. The data acquisition module is configured to generate an input based on its application data. For example, a data acquisition module may be a electronic weighing apparatus, a temperature sensor and/or barcode scanner. The weighing apparatus and temperature sensor can provide inputs (in the form of weight and temperature readings) to an associated input module.

Further, herein described is a method for implementing a centralized customizable operating solution, comprising, providing a central server module that is in communication with a plurality of input modules and a plurality of execution modules, configuring each input module to accept inputs from a user relating to customized operations associated with the user, configuring the central server module to generate corresponding outputs based on the accepted inputs, and transmit each output to a relevant execution module for execution of the output.

The COOS can be up scaled and customized for franchise operation to support single or plurality of front and back of house segments as illustrated exemplary under FIG. 02 and FIG. 03, and include third party supplies and services. The aforementioned independent interlinked modules include a plurality of comprehensive analytic and projection tools, illustrated exemplary under FIG. 49, 50, 51, 52, 53, and a centralized inventory management system, illustrated exemplary under FIG. 56.

In operation, the COOS uses a plurality of multifaceted screen displays, illustrated exemplary under FIG. 09 for a plurality of provided front of house mobile restaurant use device interfaces MRUDIs and stationary restaurant use devices interface SRUDIs, illustrated exemplary in the exemplary floor plan under FIG. 03. Personal user device interfaces PUDIs, also illustrated exemplary in the exemplary floor plan under FIG. 03 can also access the COOS system within a participating restaurant or remotely, and display the same screen displays, illustrated exemplary under FIG. 09 for a landing screen. Customers who become members can create accounts and sub-accounts, illustrated exemplary under FIG. 15. The COOS allows for private and corporate accounts under which sub-accounts can be established. Member and sub-member accounts include customizable individual personal menus. Members can link their PUDIs with the COOS and use their PUDIs within a restaurant envelope to place orders, whereby member customers, and with some limitations non-members, can order menu items from standard menus provided by participating restaurants, and customize said standard menu items, and create own personal menu item from the scratch using the cuisine options, key ingredient options, and the ingredient exchange function, illustrated exemplary under FIGS. 13 and 27, making use of all available restaurant provided ingredients. Members and sub-members can save said standard, customized, and own created menu items into their personal menus, and order said saved menu items from their personal menus at any participating restaurants for dine-in, delivery, and collection either across the counter or from a 24 hour dispenser (FIG. 10).

Member and sub-member customers can also customize and create menu items based on their personal framework data, illustrated exemplary under FIG. 16, and create and save in their account a plurality of personal menus and diet plans. Such plans can include and based on but are not limited to personal calorie and nutrition intake, illustrated exemplary under FIG. 17, personal portioning preferences illustrated exemplary under FIG. 18, menu item and meal-time budgets illustrated exemplary under FIG. 20, exclude ingredients with allergy concerns illustrated exemplary under FIG. 21, with further option to combine said settings into a single menu and/or diet plan, and activate or de-activate individual settings during a menu item searches, illustrated exemplary under FIGS. 25 and 28. Specific diabetic plans can also be created and saved in the personal menus. It allows for the customization and creation of menu items in line with diabetic requirements applying diabetic exchange tools and glycemic index and glycemic load tools, illustrated exemplary under FIG. 19 and FIG. 25. Ingredient preferences and non-preferences can also be established. Members can share their personal menu items with other member and with non-member, illustrated exemplary under FIG. 23, and make use of a comprehensive loyalty program illustrated exemplary under FIG. 12. The cloud based centralized customizable operating solution COOS FIG. 01 of the present invention also uses a new approach for back of house operations of participating restaurants. It also involves the plurality of the independent interlinked modules system; illustrated exemplary under FIG. 4748 that is linked to a plurality of provided newly conventionalized multifaceted screen displays. A typical screen display is illustrated exemplary under FIG. 31 representing the plurality of service use device interfaces SUDIs that are positioned at a plurality of service stations throughout a participating restaurants back and front of house operation, illustrated exemplary under FIG. 03. It includes, but is not limited to a deliveries station screen and process flow, illustrated exemplary under FIGS. 41 and 43 a plurality of storage station screens, illustrated exemplary for a chiller storage under FIG. 44, a plurality of preparation and portioning station screens and process flow, illustrated exemplary under FIGS. 39 and 40, a plurality of pre-cooking and cooking station screens and process flow, illustrated exemplary for a pre-cooking and cooking station under FIGS. 37 and 38, involving also waste management, illustrated exemplary under FIG. 52. Cooking and service operations are monitored from a chef frontline cooking station screen, illustrated exemplary under FIG. 36. Overall operation management is executed from the manager office station screen, illustrated exemplary under FIG. 32 and includes a chef office station screen, illustrated exemplary under FIG. 34. The COOS is designed to allow for real-time and continued interlinked monitoring and management of services and the movement of ingredients and individual staff performances, and in particular front and back of house service performances, illustrated exemplary under FIG. 05, using sets of customizable and programmable waterproof and +95° Celsius heat resistant NFCs/RFIDs devices and intelligent mats, illustrated exemplary under FIG. 57. The COOS uses the method of standardized portioning and portion pricing throughout a participating restaurant operation, and comprehensive inventory data tracking, involving sets of customizable and programmable waterproof and +95° Celsius heat resistant NFCs/RFIDs devices. Portioning standards are used for menu engineering and customer billing. Ordered standard, customized, and created menu items are sent directly from the MRUDI, SRUDIs, and PUDIs to the relevant back of house SUDI station, illustrated exemplary for an order displayed on the screen of a SUDI cooking station, illustrated exemplary under FIG. 37, showing detailed ingredients, that are listed in sequence of cooking order, the relevant portioning for each ingredient, cooking times for each ingredient, hob and hob dial heat position, use of cookware and equipment, overall time tracker, and use of tableware and plating instruction, and other relevant information to ensure consistency. Every order is tracked from the point of order, illustrated exemplary under FIG. 05, which includes the tracking of an order when it leaves for example a cooking, fast food, bar, and/or cafes' service station. The cloud based COOS and its participating restaurants can expand and can be managed globally, providing member customers the supporting infrastructure to access and order their own personal menus and menu items, and even make adjustments to said personal menu items, while away from home visiting other regions and countries were participating restaurants are situated. The cloud based COOS can be customized to accommodate stand alone restaurant operations, restaurants within hotel operations, hospital and canteen operations etc., and include also non-restaurant operations that provide customized products and services, and packages comprised of products and services like beauty businesses and spa operations, and a plurality of other business operations.

The illustrated exemplary screen displays and diagrams are not intended to suggest any limitation in relation to the scope complexity, and frequency of use, applied methods and application of layout, design, technology, processes, computations and functionality, and the plurality of practical uses and applications of the illustrated functions for a plurality of user device interfaces, including projections of such interactive functions onto a plurality of surfaces, embracing also virtual and augmented reality solutions.

According to one aspect, there is provided a system for implementing a centralized customizable operating solution, comprising: a central server module that is in communication with a plurality of input modules and a plurality of execution modules, wherein each of the plurality of input modules is configured to accept inputs from a user relating to customized operations associated with the user, and wherein the central server module is configured to: generate at least one corresponding output based on the accepted inputs; and transmit the at least one corresponding output to a selected one of the plurality of execution modules for execution of the at least one corresponding output.

The customized operations associated with the user may comprise at least one of:

tasks, processes, functions and requirements that are selected by the user, such that the at least one corresponding output is related to the tasks, processes, functions and/or requirements that are selected by the user.

The system may further comprise at least one data source module that is in communication with the central server module, the at least one data source module having stored therein one or more data sources, wherein the central server module is further configured to:

access the one or more data sources to retrieve a relevant calculation, algorithm and/or rule to generate the at least one corresponding output based on the accepted inputs.

Each of the plurality of input modules may be further configured to determine an attribute of the user such that acceptance of the inputs from the user is based on the determined attribute of the user. The attribute of the user may comprise a membership status or a customer priority level.

The at least one corresponding output may comprise at least one of: computer executable instructions, output signals and notifications.

Each of the plurality of execution modules may comprise either an intelligent cooking station or a service counter placemat that is configured to execute the computer executable instructions received from the central server module.

The intelligent cooking station or the service counter placemat may comprise tableware identification and tracking devices to facilitate execution of the computer executable instructions.

Each of the plurality of execution modules may comprise an inventory management module that is configured to track inventory using product identification and tracking devices.

At least one of the plurality of input modules may be in communication with a data acquisition module that is configured to generate input data for at least one of the plurality of input modules based on acquired data.

According to another aspect, there is provided a method for implementing a centralized customizable operating solution, comprising: providing a central server module that is in communication with a plurality of input modules and a plurality of execution modules, configuring each of the plurality of input modules to accept inputs from a user relating to customized operations associated with the user, and configuring the central server module to: generate at least one corresponding output based on the accepted inputs; and transmit the at least one corresponding output to a selected one of the plurality of execution modules for execution of the at least one corresponding output.

The customized operations associated with the user may comprise at least one of:

tasks, processes, functions and requirements that are selected by the user, such that the at least one corresponding output is related to the tasks, processes, functions and/or requirements that are selected by the user.

The method may further comprise:

providing at least one data source module that is in communication with the central server module, the at least one data source module having stored therein one or more data sources; and configuring the central server module to:

access the one or more data sources to retrieve a relevant calculation, algorithm and/or rule to generate the at least one corresponding output based on the accepted inputs.

The method may further comprise configuring each of the plurality of input modules to determine an attribute of the user such that acceptance of the inputs from the user is based on the determined attribute of the user. The attribute of the user may comprise a membership status or a customer priority level.

The at least one corresponding output may comprise at least one of: computer executable instructions, output signals and notifications.

Each of the plurality of execution modules may comprise either an intelligent cooking station or a service counter placemat, wherein the method may further comprise configuring the intelligent cooking station or the service counter placemat to execute the computer executable instructions received from the central server module.

The intelligent cooking station or the service counter placemat may comprise tableware identification and tracking devices to facilitate execution of the computer executable instructions.

Each of the plurality of execution modules may comprise an inventory management module, wherein the method may further comprise configuring the inventory management module to track inventory using product identification and tracking devices.

At least one of the plurality of input modules may be in communication with a data acquisition module, wherein the method may further comprise configuring the data acquisition module to generate input data for at least one of the plurality of input modules based on acquired data.

DETAILED DESCRIPTION

Figure 1:
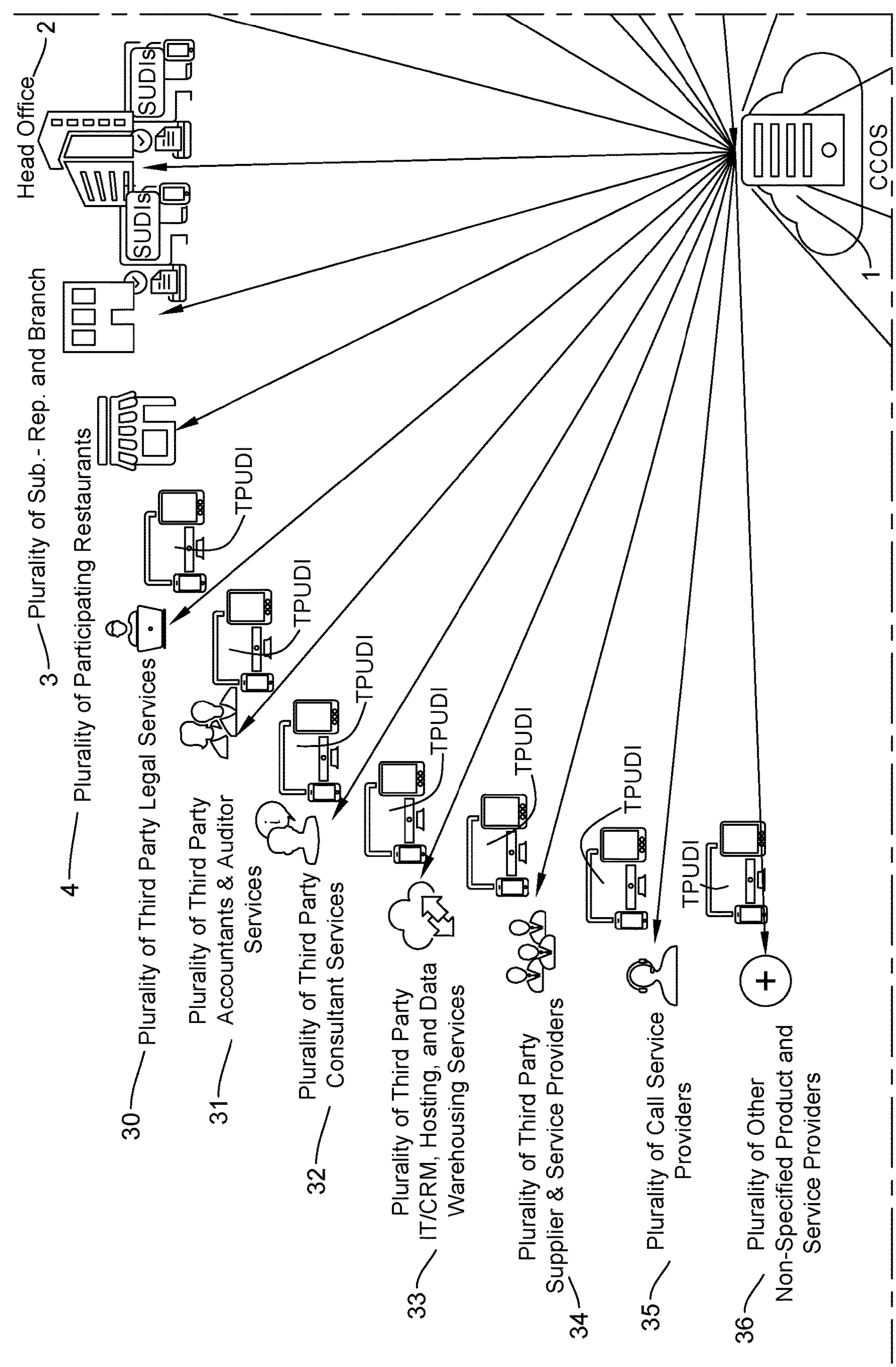
FIG. 01 illustrates a case example of the system network infrastructure diagram of the present invention of a cloud based customizable centralized operating solution CCOS 1.

Some portions of the description which follows are explicitly or implicitly presented in terms of algorithms and functional or symbolic representations of operations on data within a computer memory. These algorithmic descriptions and functional or symbolic representations are the means used by those skilled in the data processing arts to convey most effectively the substance of their work to others skilled in the art. An algorithm is here, and generally, conceived to be a self-consistent sequence of steps leading to a desired result. The steps are those requiring physical manipulations of physical quantities, such as electrical, magnetic or optical signals capable of being stored, transferred, combined, compared, and otherwise manipulated.

Unless specifically stated otherwise, and as apparent from the following, it will be appreciated that throughout the present specification, discussions utilizing terms such as "transmitting", "receiving", "scanning", "calculating", "determining", "replacing", "generating", "initializing", "outputting", or the like, refer to the action and processes of a computer system, or similar electronic device, that manipulates and transforms data represented as physical quantities within the computer system into other data similarly represented as physical quantities within the computer system or other information storage, transmission or display devices.

The present specification also discloses apparatus for performing the operations of the methods. Such apparatus may be specially constructed for the required purposes, or may comprise a computer or other device selectively activated or reconfigured by a computer program stored in the computer. The algorithms and displays presented herein are not inherently related to any particular computer or other apparatus. Various machines may be used with programs in accordance with the teachings herein. Alternatively, the construction of more specialized apparatus to perform the required method steps may be appropriate.

In addition, the present specification also implicitly discloses a computer program, in that it would be apparent to the person skilled in the art that the individual steps of the method described herein may be put into effect by computer code. The computer program is not intended to be limited to any particular programming language and implementation thereof. It will be appreciated that a variety of programming languages and coding thereof may be used to implement the teachings of the disclosure contained herein. Moreover, the computer program is not intended to be limited to any particular control flow. There are many other variants of the computer program, which can use different control flows without departing from the spirit or scope of the invention.

Furthermore, one or more of the steps of the computer program may be performed in parallel rather than sequentially. Such a computer program may be stored on any computer readable medium. The computer readable medium may include storage devices such as magnetic or optical disks, memory chips, or other storage devices suitable for interfacing with a computer. The computer readable medium may also include a hard-wired medium such as exemplified in the Internet system, or wireless medium such as exemplified in the GSM mobile telephone system. The computer program when loaded and executed on such a computer effectively results in an apparatus that implements the steps of the preferred method.

FIG. 01

Figure 46:
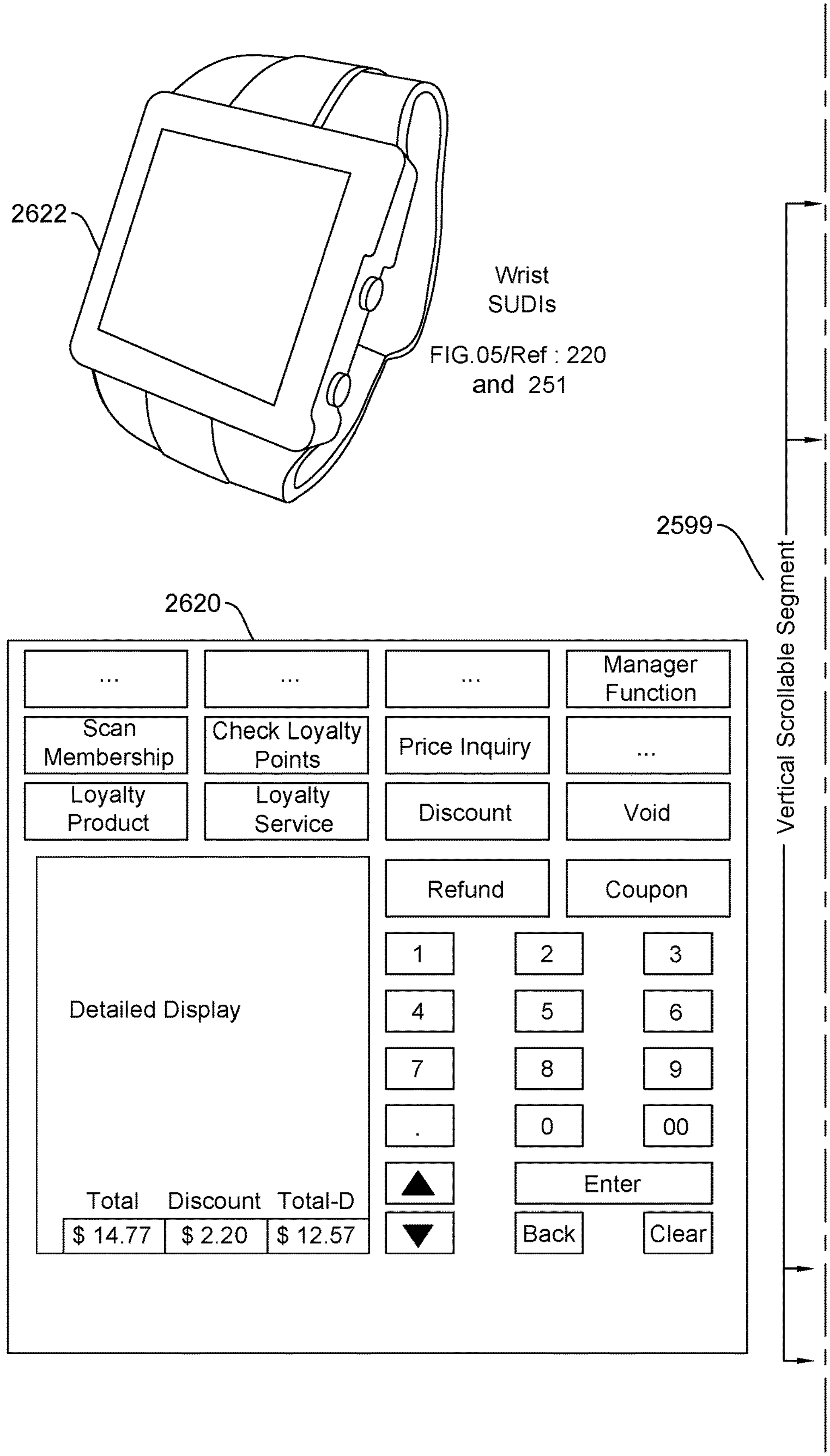
FIG. 46 illustrates exemplarily a typical SUDI screen display of the present invention of the CCOS 1 for a back of house staff station.
Figure 47:
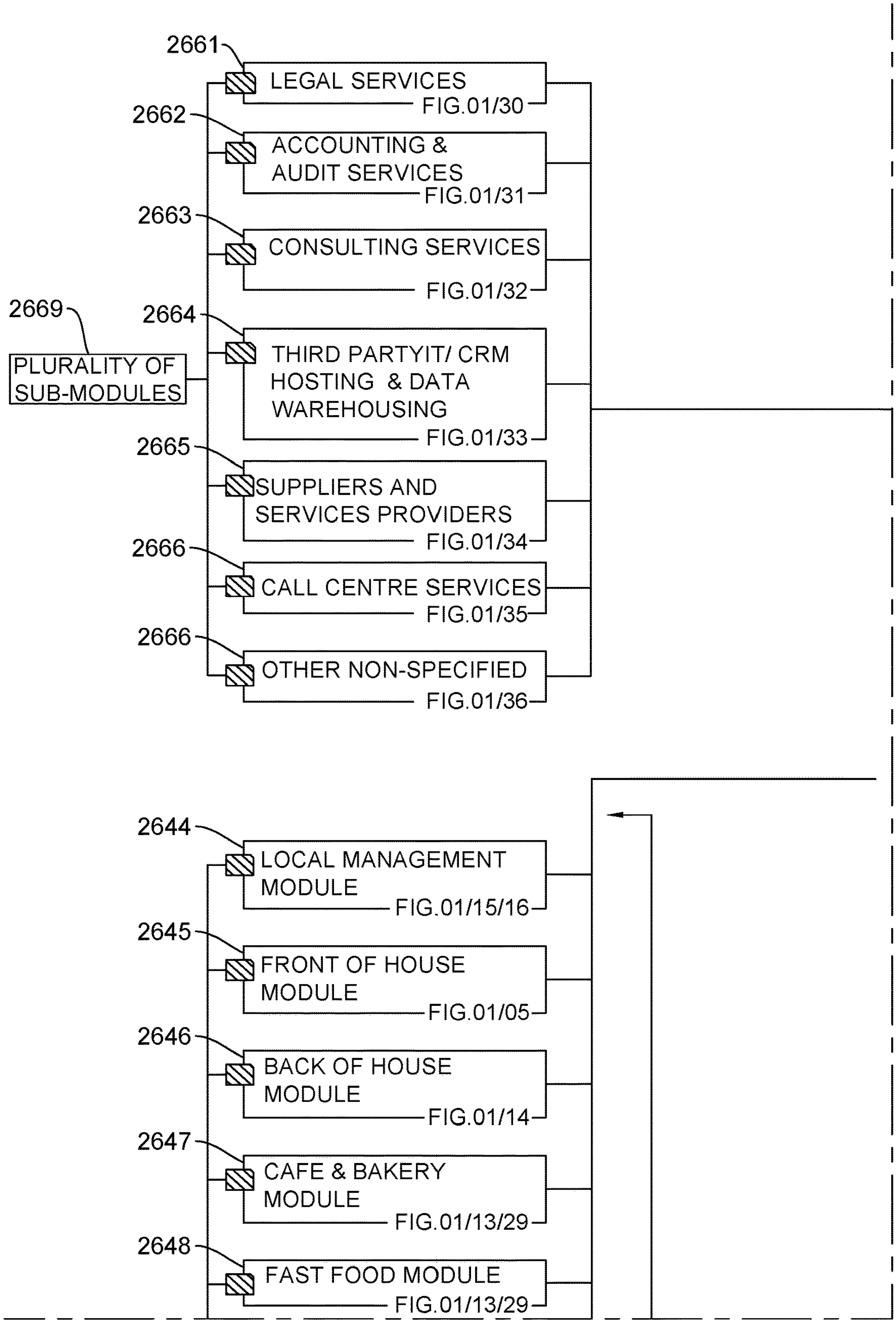
FIG. 47 illustrates exemplarily the independent interlinked and interexchangable plurality of a higher and lower level modem including compartmentalized database modules arrangement of the present invention of the CCOS 1.
Figure 56:
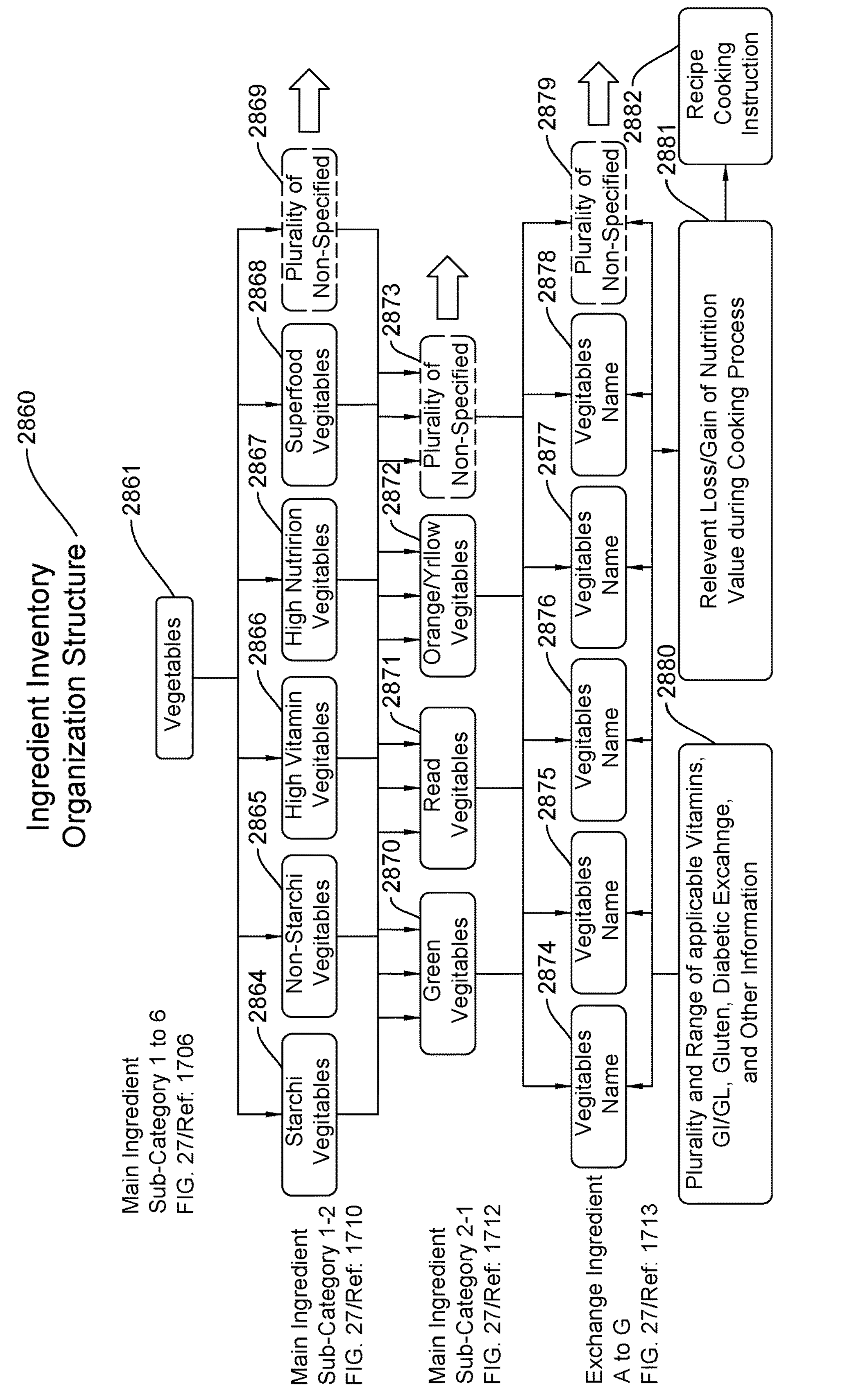
FIG. 56 illustrates exemplarily the typical ingredient inventory identification and organization structure of the present invention of the CCOS 1.

Referring now to FIG. 01, there is illustrated a case example of the system network infrastructure diagram of the present invention of a cloud based customizable centralized operating solution (COOS) 1 that comprises of a central server module and a plurality of customizable independent interlinked interexchangable high and low level modules, allowing for communicating and interfacing to exchange and communicate a plurality of data collectively or independently applying modular programming, illustrated exemplarily under FIG. 47. The COOS 1 links, communicates, exchanges a plurality of data and information wireless throughout its customizable system network infrastructure, involving a plurality of different types, shapes, and sizes of provided touch screen or projected touch sensitive service staff user device interfaces SUDIs, illustrated exemplarily as 2, 3, 6, 7, 10, 11, 12, 13, 15, 16, 17, 18, 19, 20, 21, 22, 23, 24, 25, 26, 27, 28, 29, mobile restaurant user device interfaces MRUDIs, illustrated exemplarily as 8, stationary restaurant user device interfaces SRUDIs, illustrated exemplarily as 9, third party owned user device interfaces TPUDIs, illustrated exemplarily as 30, 31, 32, 33, 34, 35, 36, 40, third party links TPL, illustrated exemplarily as 37, 38, 39, and a plurality of personal user device interfaces PUDIs, illustrated exemplarily as 42. A plurality of different types of apparatuses and devices 43 inclusive of a plurality of different types of NFCs/RFIDs 44 and 45, are also provided and when illustrated linked to the provided plurality of user device interfaces. The cloud based COOS 1 links, communicates, exchanges a plurality of data and information wireless with the plurality of user device interfaces through the world wide web, commonly referred to as the internet with a plurality of local routers and management network switches and/or servers RMNSs, illustrated exemplarily as 41, and executes said links, communications, exchanges of a plurality of data and information through a plurality of customizable independent interexchangable and interconnected modular modules, illustrated exemplarily under FIG. 46, that accept inputs from a plurality of user device interfaces, apparatuses and devices relating to customized operations associated with a user, wherein a central server module is configured to generate corresponding outputs based on the accepted inputs and transmits each output to a relevant customizable independent interexchangable and interconnected modular modules for execution of the output that is transmitted to its intended designated user device interfaces and/or module. The illustrated case example of the COOS 1 system network infrastructure is not intended to suggest any limitation with regards to the plurality of scopes of design, use, tasks, functions, processes, application, and versatility of interconnected operational functionality of the present invention, and illustrates a typical setup for a multi segment restaurant operation. In operation, the head office 2 controls and manages the entire system network infrastructure of the COOS 1, through the management execution module of the COOS 1 allowing for the delegation of a plurality of operational and management control to subsidiaries, representative, branch offices 3, and participating restaurants 4, illustrated exemplarily for a single participating restaurant under FIG. 02, whereby the head office 2 can intervene remotely into any aspect of daily operations in real-time. A participating restaurant can be a single or multi segment restaurant 4 and can involve a simple or a complex front of house 5 and back of house 14 operation. A multi segment restaurant is illustrated exemplarily under FIG. 03. In operation, the head office 2 manages and controls the plurality of authorization and access levels, sources, data organization, and business structure including databases, data management, data creation, customization, and implementation of computing, auto calculation, algorithms, entry and extraction rules and processes. The COOS 1 also includes and provides for a plurality standard and customized hardware comprising of a plurality of different apparatuses and devices 43 including a plurality of customizable and programmable different types of NFC/RFID devices 44 and 45. The said NFC/RFIDs 44 and 45 communicates wireless with the CCOS 1 through a local RMNS 41 including a plurality of SUDIs, MRUDIs, and SRUDIs facilitating the interrogation protocols, and responding, transmitting, receiving, and processing a plurality of data and information, which includes but is not limited to the proper use and authorized movement of a plurality of MRUDIs 8, SRUDIs 9, and PUDIs 42 within a participating restaurant 4 envelope. In operation, the plurality of customizable and programmable different types of NFC/RFID tags and devices, illustrated exemplarily as 44 and 45 are also used to pair a plurality of MRUDIs 8, SRUDIs 9, SUDIs 9, and PUDIs 42 and other devices with the CCOS 1 through a local RMNS 41, and to track all food and other inventory items from the point of delivery, through various stages of use and/or customer services, to the point of disposal including post plate food waste 46, and provide a unique member services taking pictures of customized and created menu items at particular stations, illustrated exemplarily under FIG. 05 and FIG. 56. In operation, the customizable and programmable NFC/RFID tags and devices 44 and 45 are also used to track the movement of all relevant tableware within a participating restaurant envelope, allowing comprehensive tableware inventory management and requirements, and to assess services and service staff performances, illustrated exemplarily under FIG. 05. Certain types of NFC/RFID tags and devices 44 and 45 are also used to manage service staff login/logout 47 and related data. In operation in the illustrated case example of a floor plan example, illustrated exemplarily under FIG. 03, the front of house 5 operation includes a plurality of provided service counter SUDIs 6. A plurality of handheld service staff SUDIs 7 are also provided and linked and communicate the CCOS 1 through a local RMNS 41. There are also a service counter station SUDI 6 and a plurality of provided cashier stations 10 at the bar segment SUDIs 11, the fast food counter station SUDIs 12, and at the café and bakery station SUDIs 13. For the back of house 14 operation, a manager SUDI 15 and chef office SUDI 16 are provided and linked and communicate with the CCOS 1 through a local RMNS 41, allowing for real-time access and management to all relevant back of house SUDIs, illustrated exemplarily as 11, 12, 13, 17, 18, 19, 20, 21, 22, 23, 24, 25, 26, 27, 28, 29, and front of house 5 SUDIs 6, 7, 10, 11, 12, 13. A provided waste management station SUDI 17, and a plurality of preparation and portioning station SUDIs 18 and pre-cooking station SUDIs 19, and a plurality of other provided non-specified SUDIs 20 for replacement and flexible use are also provided and are linked and communicate with the CCOS 1 through a local RMNS 41. There are also a plurality of provided storage management SUDIs 21, 22, 23, 24, a SUDI 25 at the pot and dishwashing station, a chef station SUDI 26, a plurality of provided restaurant line cook station SUDIs 27, a plurality of provided teppanyaki line cook station SUDIs 28, and a plurality of provided bakery station SUDIs 29. All are linked and communicate with the CCOS 1 through a local RMNS 41. The screen displays for the head office 2, the subsidiary, representative or branch office 3, front of house 5 and back of house 14 service staff SUIDs 6, 7, 10, 11, 12, 13, 15, 16, 17, 18, 19, 20, 21, 22, 23, 24, 25, 26, 27, 28, 29 are specifically designed in layout, function, and purpose, to allow for a plurality of operations. The screen displays for a plurality of MRUDIs 8 and SRUDIs 9 are also specifically designed in layout, function, and purpose to allow for a particular operation, and the screen displays for a plurality of TPUDIs 30, 31, 32, 33, 34, 35, 36, 37, 38, 39, 40 are also specifically designed in layout, function, and purpose to allow particular operation. The plurality of provided different types of apparatuses and devices 43, 44, 45 are specifically customized and programmed to allow each user to accomplish a plurality of tasks and functions within the front of house 5 and back of house 14 operations of a participating restaurants 4.

FIG. 02

Figure 2:
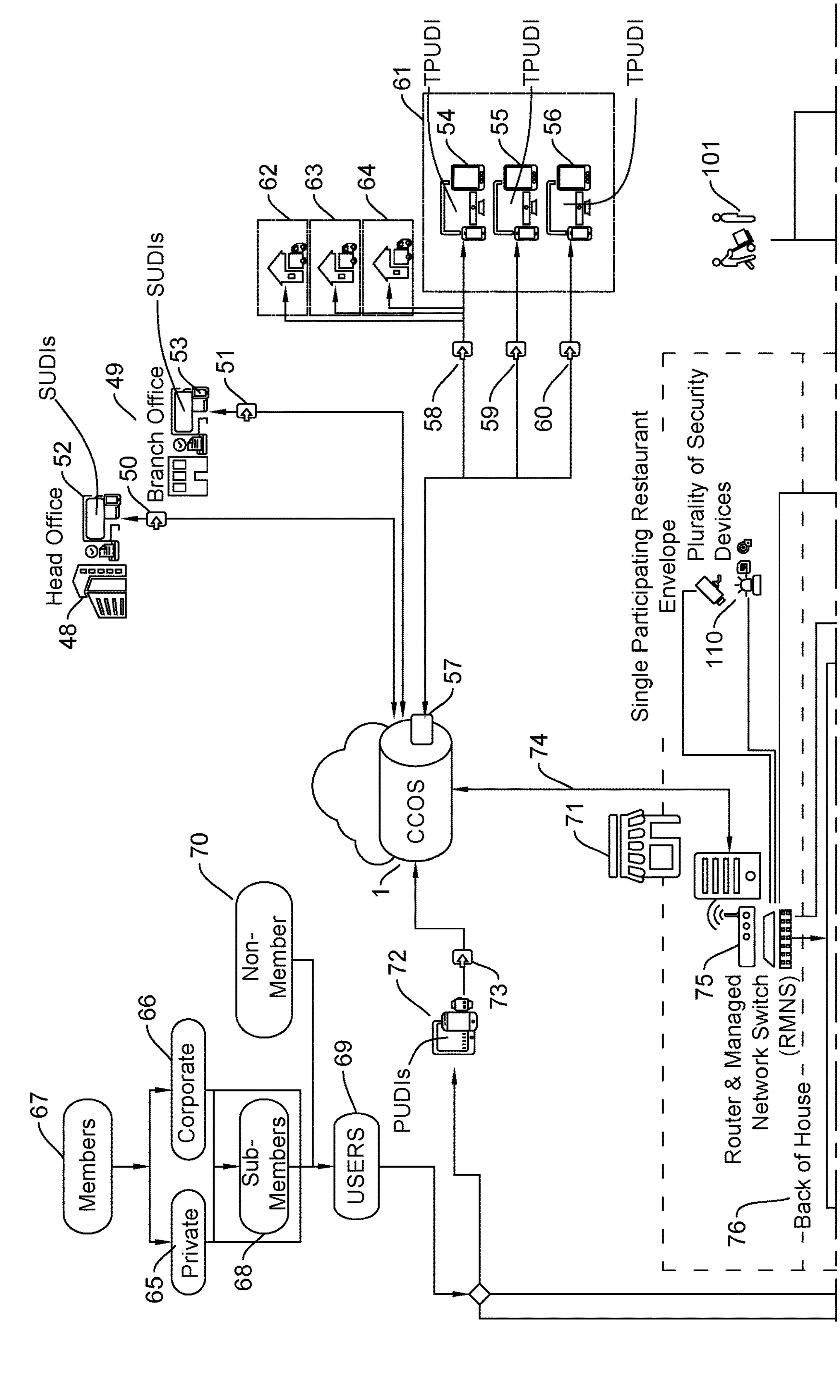
FIG. 02 illustrates a system network infrastructure diagram of the present invention of the cloud based COOS 1, involving exemplarily a single participating restaurant.

Referring now to FIG. 02, there is illustrated a system network infrastructure diagram of the cloud based CCOS 1, involving exemplarily a single participating restaurant 71. In operation, the head office 48 and/or a branch office 49 communicates wireless through the internet and the local RMNS 75, going first through a login protocol 50 and 51 on their respective SUDIs, illustrated exemplarily as 52 and 53, whereby third party product and service provider TPUDIs, illustrated exemplarily as 54, 55, 56 communicate with the COOS 1 through a designated third party services module 57 to customize and execute supplies and services for a plurality of participating restaurants using the online service of the COOS 1, illustrated exemplarily under FIG. 53. In the shown example for a single restaurant 71, third party product and service providers, using their own TPUDIs 54, 55, 56, can login 58, 59, 60 to a third party services module 57, using the head office 48 provided access protocol that identifies each particular third party product and service provider. A third party product and service provider head office 4, its branch office 51, or warehouse can work on the same particular third party services module platform 54 simultaneously to review, prepare, and execute a plurality of online provided e-documentation relevant to the supply of products and services, illustrated exemplarily under FIG. 53, regardless if a third party product and service provider 55, 56, 57 and/or their respective service operations are located within a single demographic location 61 or situated within a plurality of demographic locations, illustrated exemplarily as 62, 63, 64. In operation for the exemplarily single participating restaurant 71, private 65 and corporate 66 members 67 and their sub-member 68 users 59, and non-member 70 users 69 can use within a participating restaurant 71 either the provided SRUDIs 85 and MRUDIs 86, or member 68 and non-member 70 users 59 can use their personal PUDIs 72 and login remotely 73 into the COOS 1 to reach the startup screen, illustrated exemplarily under FIG. 07, and landing screen, illustrated exemplarily under FIG. 09. In operation a participating restaurant 71 in linked 74 to the COOS 1 through a local RMNS 75 that includes a local backup server to provide uninterrupted services for the back of house 76 and front of house 81 operation, whereby the RMNS 75 communicates wirelessly with a plurality of SUDIs inclusive of a plurality of apparatuses and customizable and programmable waterproof and +95° Celsius heat resistant NFCs/RFIDs devices situated or move throughout the back of the house 76, illustrated exemplarily as the SDUI for chef and manager 77, a plurality of service station SUDIs 78, a SUDI for the 24 hour dispenser 79, a plurality of SUDIs for a plurality of working stations and storage stations, and plurality of sensor service mats 80. For the front of house operation 81, the RMNS 75 communicates wirelessly with a plurality of handheld service staff SUDIs 82, a plurality of mobile service staff station SUDIs 83, a plurality of customizable and programmable waterproof and +95° Celsius heat resistant NFCs/RFIDs devices 84 on the customer side of the 24 hour dispenser, a plurality of stationary SRUDIs 85, and a plurality of MRUDIs 86 at a plurality of customer tables 87 and counter positions 88 with integrated customizable and programmable waterproof and +95° Celsius heat resistant NFCs/RFIDs devices 89, illustrated exemplarily under FIG. 04 and FIG. 05 that provide members 67 users 69 the option to login 90 using their PUDIs 91 at a plurality of customer tables 87 and counter positions 88 within a participating restaurant 71, allowing members 67 users 69 the use of their PUDIs 91 in the same way a restaurant provided MRUDIs 86 is used. Members 67 users 69 can also use their plurality of PUDIs 91 and to login 92 at the 24 hour dispenser 84 and login 93 at RUDI stations 85. Non-member 70 users 69 can use their plurality of PUDIs 94 to login 95 at the 24 hour dispenser 84, login 96 at RUDI stations 85, and login 97 at customer tables 87 and counter positions 88 during promotional marketing drives. In operation a plurality of tablewares 98 have affixed to them customizable and programmable waterproof and 95° Celsius heat resistant NFCs/RFIDs devices 99 that allow for the tracking and circulation monitoring of said tablewares 98 within the back of house 76 and front of house 81 of a participating restaurant 71, which includes the tracking and monitoring of staff services, illustrated exemplarily under FIG. 05. In operation, throughout the back of the house 76 and front of the house 81 envelope, all inventory items, all ingredients are transported and/or stored in various types and sizes and multi-colored crates, trays, and vessels that have affixed to them customizable and programmable waterproof and −20°/+95° Celsius cold/heat resistant NFCs/RFIDs devices 100 that allows for uninterrupted tracking and monitoring of individual crates, trays, and vessel through a plurality of handling, processing, waste management stages, illustrated exemplarily, for a receiving station 101, a plurality of processing and preparation stations 102, a plurality of storage units 103, a plurality of pre-cooking stations 104, a bakery and café station 105, a plurality of back of house frontline cooking stations 106, including a plurality of semi-front of house cooking stations 107, a dishwashing station, and a food waste storage prior disposal 109. In operation in the shown case example of the present invention of the COOS 1 for a single participating restaurant, there are also a plurality of security cameras and visual security devices 110 that are connected and in communication with the COOS 1 through a local RMNS 75.

FIG. 03

Figure 3:
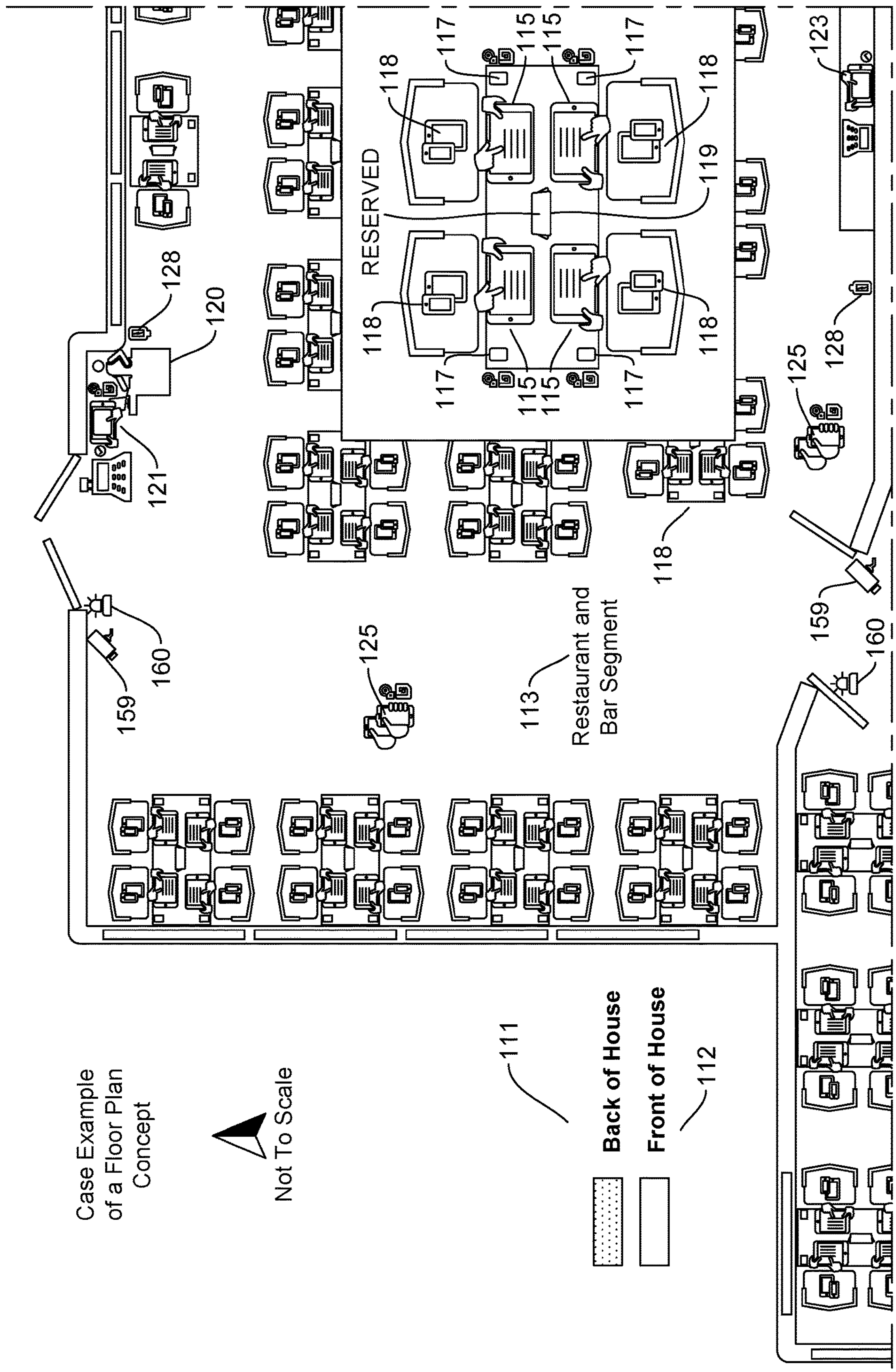
FIG. 03 illustrates a case example of a multi segment restaurant floor plan comprising of a back of the house and front of the house operation.

Referring now to FIG. 03, there is illustrated a case example of a multi segment restaurant floor plan comprising of a back of the house 111 and front of the house 112 operation. Illustrated within the front of the house 112 is a restaurant and bar segment 113 and a café and fast food segment 114. The shown enlarged seating group of a typical four-seater customer table illustrates that each customer seat position allows for a provided MRUDIs 115 that can be stored within a storage compartment at a customer position without the need of a connecting security wire. The plurality of MRUDIs 115 communicate wirelessly with a front of house module within the COOS 1 through a local RMNS 116 that communicates with a plurality of sets of customizable and programmable waterproof and +95° Celsius heat resistant NFCs/RFIDs devices 117, each programmed and customized to identify a particular customer seat position, illustrated exemplarily under FIG. 04, allowing authorized member users to link and use their PUDIs 118 in the same way the restaurant provided MRUDIs 115 can be used and function. Embedded at a plurality of individual and sets of customer positions are electronic alphanumeric displays 119 that communicate wirelessly with the front of house module within the CCOS 1 through a local RMNS 116 and with the service stations 120 SUDIs 121, through which the electronic alphanumeric displays 119 can be manage for reservations and a plurality of other services can be communicated. In operation the front of the house 112 service operation is managed by the service staff at the service station 120 SUDI 121, illustrated exemplarily under FIGS. 44 and 45 allowing for a plurality of operational floor management tasks and function to be managed and designated involving a plurality of service and counter station, including handheld SUDIs, illustrated exemplarily as 122, 123, 124, 125, 135, 136, which also involves a plurality of cashier functions. In operation, the CCOS 1 also allows the pairing of provided SRUDIs 126 within the front of house 112, illustrated exemplarily within the café ' and fast food segment 114. The said provided SRUDIs 126 communicate wireless with the front of house module within the CCOS 1 through a local RMNS 116. There are also a plurality of provided sets of intelligent sensor service mats ISMs within the front of house 112 and back of house 111 that include sets of customizable and programmable waterproof and +95° Celsius heat resistant NFCs/RFIDs devices and autofocus photo cameras 127, illustrated exemplarily under FIG. 05 and FIG. 56. Within the front of the house 112 and the back of the house 111, there are also a plurality of automated provided MRUDI 115 charging stations, illustrated exemplarily as 128. Said charging stations 128 are also equipped with sets of customizable and programmable waterproof and +95° Celsius heat resistant NFCs/RFIDs devices that communicate a plurality of data related to the MRUDI 115 and charging cost to the front of house module within the CCOS 1 through a local RMNS 116. Within the café ' & bakery segment 123 is a mini-bakery 129 and a coffee roasting station 130, with a plurality of working stations SUDIs 131 and a storage 132 SUDI 133 that communicate wireless with the bakery module within the CCOS 1 through a local RMNS 116. Within the front of the house 112, there is also a fast food segment 134 with a SUDI 135 and a plurality of ISMs 127. There is also a 24 hour dispenser unit, comprising of individual temperature and environmental controlled service compartments, each compartment equipped with sets of customizable and programmable waterproof and −20°/+95° Celsius cold/heat resistant NFCs/RFIDs devices that monitors and controls temperature and environment by way of wireless communication with the fast food module within the CCOS 1 through a local RMNS 116. The 24 hour dispenser can be serviced from the inside 137 of the fast food segment 134, and collection is from the outside 138 through the use of member and non-member users PUDIs 118 that communicates wireless with the relevant sets of customizable and programmable waterproof and −20°/+95° Celsius cold/heat resistant NFCs/RFIDs devices to collect ready menu items. In operation within the back of the house 111, there is a preparation and portioning segment 139 with a plurality of SUDIs 140, illustrated exemplarily under FIG. 39 equipped with a plurality of apparatuses and sets of customizable and programmable waterproof and +95° Celsius heat resistant NFCs/RFIDs devices and cameras 159 for monitoring. Each working station SUDI 140 allows for the recording and monitor of processed and portioned ingredient inventory, and the comprehensive recording of product yield and pre-plate waste, water, electricity and a plurality of other data that is communicated wireless to the back of house module within the CCOS 1 through a local RMNS 116. The screen displays for this stations 140 are customized to allow the display of a plurality of detailed instruction, product yield and portioning instructions, illustrated exemplarily under FIG. 39. There is also a pre-cooking segment 141 with a plurality of SUDIs 142, illustrated exemplarily under FIG. 37 equipped with a plurality of apparatuses and sets of customizable and programmable waterproof and +95° Celsius heat resistant NFCs/RFIDs devices and cameras 159 for monitoring. Each working station SUDI 142 allows for the recording and monitor of processed and pre-cooked ingredient inventory, and the recording of production, yield, and pre-plate waste, water, electricity, and a plurality of other data communicated wireless to the back of house module within the CCOS 1 through a local RMNS 116. The screen displays for this stations 142 are customized to allow the display of detailed cooking instructions, illustrated exemplarily under FIG. 37. There is also a back of house 111 restaurant and fast food and line cooking segment 143 and a front of house 112 teppanyaki line cooking segment 149 with a plurality of SUDIs 144 and 150, illustrated exemplarily under FIG. 37 equipped with a plurality of apparatuses and sets of customizable and programmable waterproof and +95° Celsius heat resistant NFCs/RFIDs devices and cameras 159. There is also a service counter 128 with a plurality of ISMs 127, illustrated exemplarily under FIG. 56 and a chef station SUDI 145, illustrated exemplarily under FIG. 36. These SUDIs 144, 145, 150 including the plurality of NFCs/RFIDs communicate wireless with the back of house module within the CCOS 1 through a local RMNS 116 to communicate incoming orders, work through orders, and service orders without the need of paper chits, illustrated exemplarily under FIG. 05 and FIG. 38. The chef station 145 controls and monitors a plurality of orders, cooking instructions, cooks performances, and re-direct automated orders to a particular cooking station, illustrated exemplarily under FIG. 36. It also allows for the recording and wireless communication of cooking station pre-plate ingredients inventory, post-plate food waste, water, electricity and a plurality of other data to the back of house module within the CCOS 1 through the RMNS 116. In operation, there are also a plurality of multi purpose storage units within the back of the house illustrated within segment 146 and within the mini bakery 129, with a plurality of SUDIs 147 and 133, connected to a plurality of apparatuses and sets of customizable and programmable waterproof and +95° Celsius heat resistant NFCs/RFIDs devices and cameras 159 that allow for the recording of a plurality of data, including but not limited to inventory management, movement of inventory, waste management, temperature and environment reading, and access information, that is communicated wireless to the respective bakery and back of house module within the CCOS 1 through the RMNS 116, involving particular ingredient inventory that is received and processed in various stages, exemplarily for prior and post preparation and portioning 140, pre-cooking 142, line cooking 144 front of house cooking 150 beverage inventory movement 136, fast food ingredient and inventory movement 135, and waste disposal 158. It allows for comprehensive realtime data and analysis of a plurality of vital inventory movement, their storage condition and related information, including ingredient management, handling performances, electricity consumption, and a plurality of other data and information, that is communicated wireless to the back of house module within the CCOS 1 through a local RMNS 116. In operation, there is also a pot and dishwashing segment 151 with a SUDI 152 equipped with apparatuses and sets of customizable and programmable waterproof and +95° Celsius heat resistant NFCs/RFIDs devices and cameras 159 that allows for the recording of post-plate waste, water and electricity consumption and a plurality of other data and information, that is communicate wireless to the back of house module within the CCOS 1 through a local RMNS 116. In operation, a staff locker segment 153 with staff SUDI 154, illustrated exemplarily under FIG. 43 equipped with apparatuses and sets of customizable and programmable waterproof and +95° Celsius heat resistant NFCs/RFIDs devices and cameras 159 that allows for the activity for each individual staff to be wireless communicated to the back of house module within the CCOS 1 through a local RMNS 116. There is also a manager working station SUDI 155, illustrated exemplarily under FIG. 32 and FIG. 33, and a chef working station SUDI 156, illustrated exemplarily under FIG. 34 and FIG. 35 equipped with apparatuses and sets of customizable and programmable waterproof and +95° Celsius heat resistant NFCs/RFIDs devices that communicate wireless to the back of house module within the CCOS 1 through a local RMNS 116. The local RMNS 116 can also positioned within this said area. There is also a delivery and dispatch segment 157 with a SUDI 158, illustrated exemplarily under FIG. 41 equipped with apparatuses and sets of customizable and programmable waterproof and +95° Celsius heat resistant NFCs/RFIDs devices that also communicate wireless with the back of house module within the CCOS 1 through a local RMNS 116. There is also a security system complete with cameras 159 and visual 160 alarm that also communicate wireless with the back of house module within the CCOS 1 through a local RMNS 116.

FIG. 04

Figure 4:
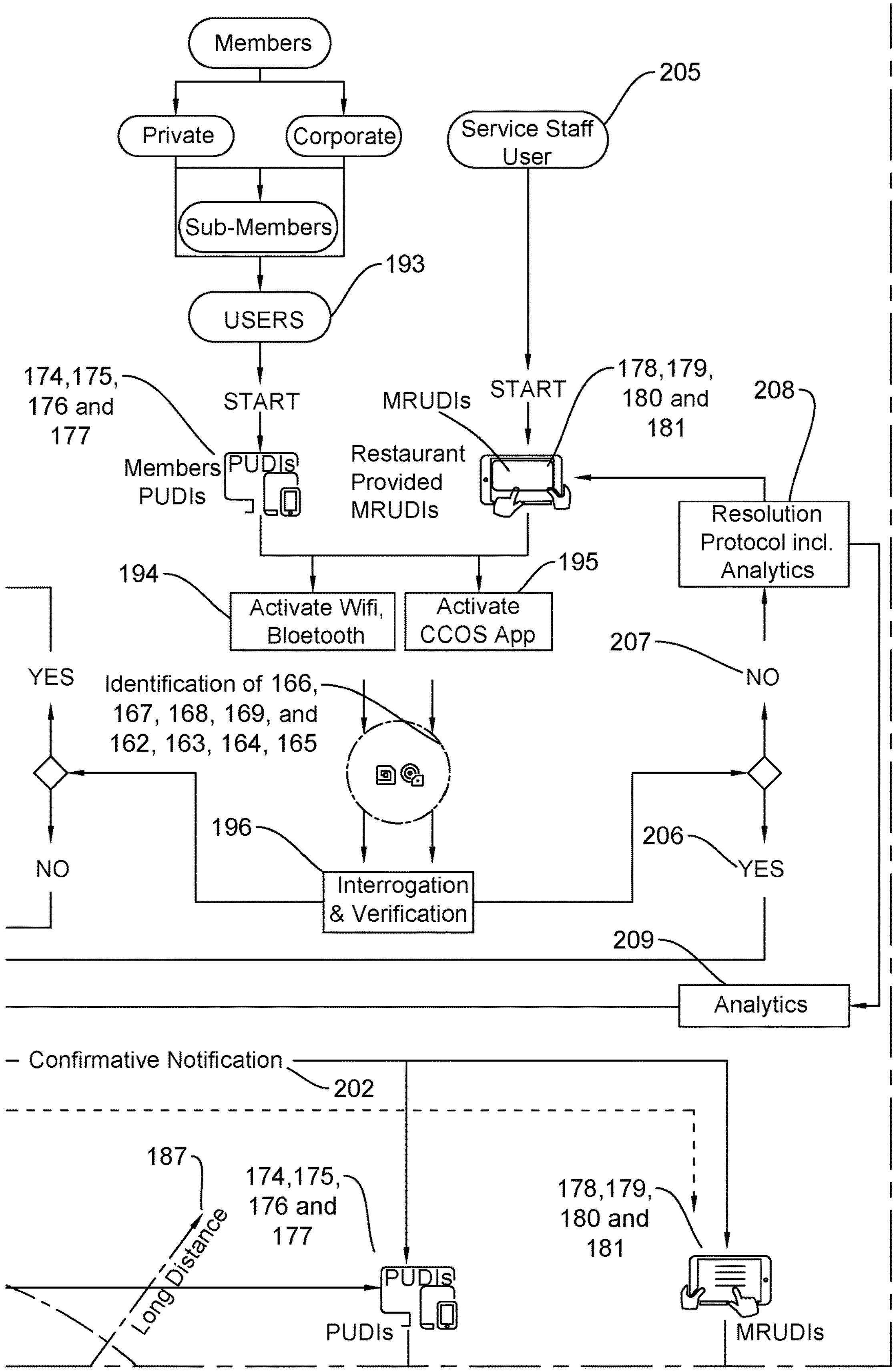
FIG. 04 illustrates a typical case example of the pairing of a plurality of restaurant provided MRUDIs and member PUDIS at a table within a participating restaurant.
Figure 7:
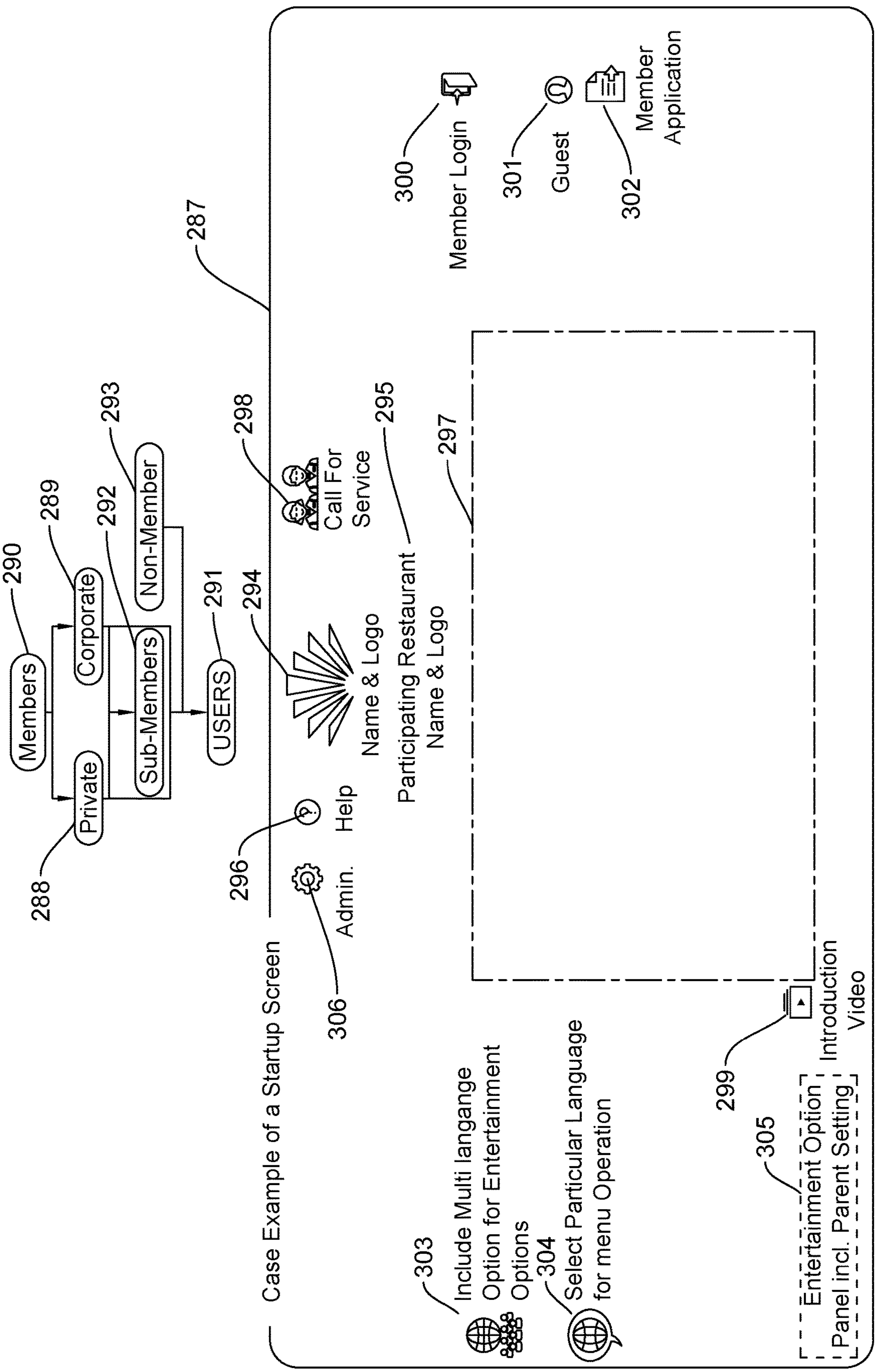
FIG. 07 illustrates exemplarily a startup screen that provides private and corporate member users and their respective sub-members users, and non-member users the entrance to receive access to the COOS 1.

Referring now to FIG. 04, there is illustrated a case example of a typical four-seater table 161 and a related diagram, illustrating the wireless login and pairing of member users 193 PUDIs, illustrated exemplarily as 174, 175, 176, 177 and restaurant provided MRUDIs, illustrated exemplarily as 178, 179, 180, 181 with the CCOS 1 through a local RMNS 190 within a participating restaurant. The same login and pairing method applies for all customer positions within a participating restaurant. In operation every customer seat positions, illustrated exemplarily for a four-seater table 161 as 162, 163, 164, 165, has integrated in the table 161 (or counter position) a set of customizable and programmable waterproof and +95° Celsius heat resistant NFCs/RFIDs devices, illustrated exemplarily as 166, 167, 168, 169 that allows for the execution of a plurality of short range plurality of communications, illustrated exemplarily as 170, 171, 172, 173, and for wider range plurality of communications, illustrated exemplarily as 182, 183, 184, 185, and an extended range plurality of communication, illustrated exemplarily as 186, 187, 188, 189, through wireless communication and bluetooth technology that allow for expedient communication with the front of house module within the CCOS 1 through the RMNS 190. One function of the NFCs/RFIDs 166, 167, 168, 169 is the close contact interrogation between PUDIs, illustrated exemplarily as PUDI 174, 175, 176, 177 and the NFCs/RFIDs 166, 167, 168, 169, for the login and pairing. Another function is the creation and maintaining of a plurality of detection fields, illustrated exemplarily as field 182, 183, 184, 185 that recognize and communicate wireless with the unique identifiable temper-proof full duplex NFC tags, illustrated exemplarily as 178A, 179A, 180A, 181A which are affixed to the provided MRUDIs, illustrated exemplarily as 178, 179, 180, 181. When a MRUDIs 178, 179, 180, or 181 is taken beyond their designated detection fields 182, 183, 184, or 185, a wireless communication exchange between the table 161 based sets of NFCs/RFIDs 166, 167, 168, or 169 and the full duplex NFC tags 178A, 179A, 180A, or 181A takes place, resulting in a visual and sound warning, on the MRUDI 178, 179, 180, or 181, with instructions to take the MRUDI 178, 179, 180, or 181 back into the assigned detection fields 186, 187, 188, or 189. When the warning is ignored and the MRUDI 178, 179, 180, or 181 is taken further beyond the assigned detection field 182, 183, 184, or 185 and the NFCs/RFIDs 186, 187, 188, or 189 lose contact with the full duplex NFC tags 178A, 179A, 180A, or 181A and an automated wireless communication is sent from the respective NFCs/RFIDs 186, 187, 188, or 189 to the CCOS 1 through a local RMNS 190 that a MRUDI 178, 179, 180, or 181 is moved beyond the permitted detection field, resulting in an automated consequential wireless communication from the CCOS 1 through a local RMNS 190 to a plurality of service staffs handheld SUDIs, illustrated under FIG. 3/Ref 125, alerting the staff of a detection field breach involving a particular MRUDI 178, 179, 180, or 181. Simultaneously other visual and sound alarms within the participating restaurant are also activated. Every seat position, illustrated exemplarily for a table 161 has also an embedded electronic multi-purpose function and information display 191 that communicates wireless with the front of house module within the CCOS 1 through a local RMNS 116. The multi-purpose function and information display 191 can be controlled by the service counter staff, illustrated under FIG. 3/Ref 120 and 121. In a self-serve restaurant, the multi-purpose function and information display 191 also communicates wireless with the ISMs through a local RMNS 190 with the CCOS 1, illustrated exemplarily under FIG. 05 to inform customers that a particular menu item can be collected. In operation the shown diagram illustrated exemplarily four-seater table 161 the signin and pairing process between a member users 193 PUDI 174, 175, 176 177, and/or the restaurant provided MRUDI 178, 179, 180, 181 with the COOS 1 through a local RMNS 190, which also involves the relevant set of customizable and programmable waterproof and +95° Celsius heat resistant NFCs/RFIDs devices 166, 167, 168, 169. When member users 193 wish to pair a PUIDs 174, 175, 176 177 with the local network of the COOS 1, and use a PUIDs 174, 175, 176 177 within an participating restaurant for the purpose of using a PUIDs 174, 175, 176 177 as the restaurant menu, member users 193 activate on their PUDIs 174, 175, 176 177 the Wifi and bluetooth function 194, and the COOS App 195, and place the PUDIs 174, 175, 176, 177 on the NFC/RFID identified point 166, 167, 168, 169. Upon close contact between the member users 193 PUIDs 174, 175, 176, 177 the relevant set of customizable and programmable waterproof and +95° Celsius heat resistant NFCs/RFIDs devices 166, 167, 168, 169, starts a fully automated interrogation and verification 196 process involving the activated CCOS App and includes but is not limited to the identification of the member users 193 authorization code that is embedded in the COOS App 195. A successful 197 interrogation 196 between a PUDIs 174, 175, 176, 177 and the sets of customizable and programmable waterproof and +95° Celsius heat resistant NFCs/RFIDs devices 166, 167, 168, 169 reveals the unique NFC/RFID position on a table 191 that is then communicated through the front of house module to the CCOS 1 through a local RMNS 190. An automated login and pairing process results in a time limited WIFI access to the local RMNS 190 network of the CCOS 1. Simultaneously, a plurality of automated encrypted communications 197 between the member users 193 PUDI 174, 175, 176, 177 with the front of house module within the CCOS 1 through the RMNS 116, results in a confirmative notification 202 with full access 203 to the participating restaurants local RMNS 190 network of the CCOS 1. The startup screen 204, illustrated exemplarily under FIG. 07 is displayed. A unsuccessful login and pairing interrogation 196 captures the unique PUDIs 174, 175, 176, 177 identification 198 and executes an automated failure notice 199 displayed on the screen of the PUDIs 174, 175, 176, 177. A record is established and communicated wireless to the front of house module within the CCOS 1 through a local RMNS 116. An automated analytical match attempt is also initiated 201. When the unique PUDIs 174, 175, 176, 177 identification is on record, and was previously validated during a member user 193 login and pairing 196, the CCOS 1 will send an automated email and text message 200 to the member users 193 designated email address and/or SMS message, and displays on a PUDI 174, 175, 176 177 a failure notice with a plurality of possible causes and solutions. When a PUDI 174, 175, 176, 177 is not on record but the unique encrypted member user 193 authorization code embedded in the CCOS App 195 matches, the member user 193 is requested to execute an automated update protocol. If none of the identifications can be verified the unsuccessful attempt will be recorded and communicated wirelessly to the front of house module within the CCOS 1 through the RMNS 116, to record and identify recurring unauthorized attempts. In the event MRUDIs 178, 179, 180 181 are already logged in and paired to a seat position, and an attempt is made to login and pair also a PUDI 174, 175, 176, 177, the CCOS 1 automatically suspends 210 the particular MRUDIs 178, 179, 180, or 181, and automatically reactivates the suspended MRUDIs 178, 179, 180, 181 only when the said PUDI 174, 175, 176, or 177 is disconnected again. This safety feature ensures that only a single user device interface is linked to a set of customizable and programmable waterproof and +95° Celsius heat resistant NFCs/RFIDs devices 166, 167, 168, 169. Member users 193 who have reached the landing screen 203 can pause the use of a PUDIs 174, 175, 176 177 for short breaks when leaving the table 161. For example a restroom break, but the connection will automatically terminate when the member user 193 leaves the long distance detection parameter 186, 187, 188, 189. In operation, when a service staff user 205 wish to link a restaurant provided MRUDIs, illustrated exemplarily as 178, 179, 180, 181 to a local RMNS 190 network of the CCOS 1, the service staff 205 activates the CCOS App 195 within the administration function of the startup screen on the MRUDIs 178, 179, 180 181 that activates automatically the WIFI and bluetooth function 194 on the MRUDIs 178, 179, 180 181. The service staff then places the MRUDIs 178, 179, 180 181 on the NFCs/RFIDs identified point 166, 167, 168 169, and a fully automated login and pairing interrogation 196 process takes place between the sets of customizable and programmable waterproof and +95° Celsius heat resistant NFCs/RFIDs devices 166, 167, 168, 169 that communicate wireless with the front of house module within the CCOS 1 through the RMNS 116, identifying of the unique MRUDI 178, 179, 180, 181 identification and the affixed full duplex NFC tag, illustrated exemplarily as 178A, 179A, 180A, 181A, resulting in full WIFI access and a plurality of automated encrypted communication 197 with the front of house module within the CCOS 1 through the RMNS 116, identifying the unique NFCs/RFIDs positions 166, 167, 168 169 at particular seat positions. Upon successful 206 login and pairing 196, and a successful automated encrypted communication 197, results in a confirmative notification 202 to the MRUDIs 178, 179, 180, 181, confirming that the MRUDIs, illustrated exemplarily as 178, 179, 180, 181 is ready for use, and the startup screen 203, illustrated exemplarily under FIG. 07, is displayed. A unsuccessful 198 pairing interrogation 207 results in the display of a resolution protocol on the MRUDI 178, 179, 180, 181 and a service staff user 205 has to completed, an automated analytic 209 and a report is communicated wireless to the back of house module within the CCOS 1 through a local RMNS 116. If a resolution cannot be achieved, the service staff user 205 changes the MRUDI. The same applies for the provided SRUDIs, illustrated under FIG. 03.

FIG. 05

Figure 5:
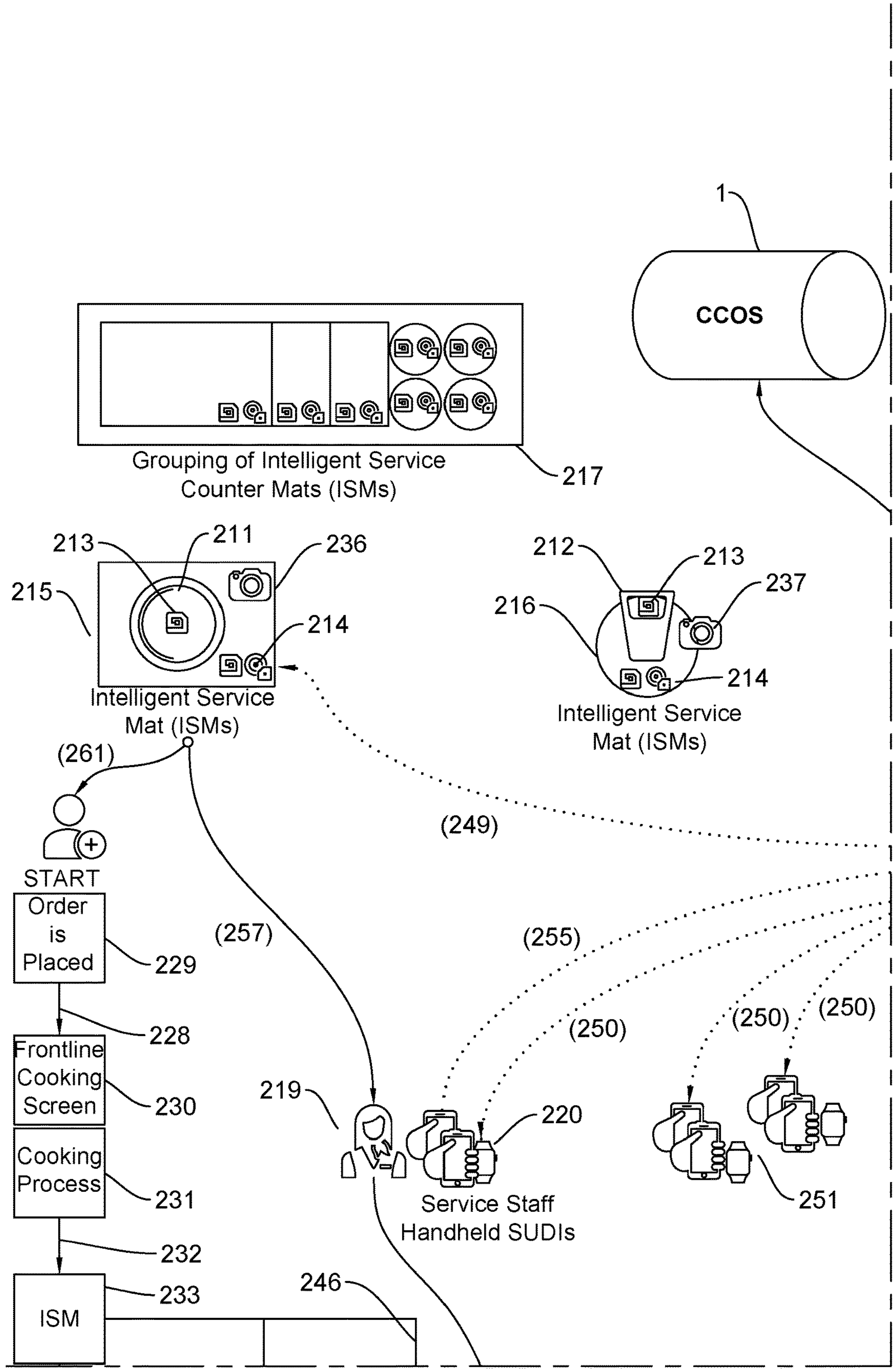
FIG. 05 illustrates a case example of a typical four-seater table and a related diagram, illustrating the wireless login and pairing of MRUDIs and PUDIs. The SUDIs are not reflected.

Referring now to FIG. 05, there is illustrated the tracking and monitoring of a plurality of different types and categories of tableware within a participating restaurant, illustrated exemplarily as a plate 211 and glass 212, using a plurality of sets of customizable and programmable waterproof and +95° Celsius heat resistant NFCs/RFIDs devices 213 that are affixed exemplarily to plates 211 and glasses 212. Said NFCs/RFIDs are also incorporated into plurality of different shapes, sizes, and groupings of built-in or movable ISMs, illustrated exemplarily as 215, 216, 217 are also shown, illustrated exemplarily under FIG. 56. Tables and counter customer positions, illustrated exemplarily as a four-seater table 218 are also equipped with a plurality of said NFCs/RFIDs 213 and 214, which are customized and programmed to allow wireless communication with the relevant plurality of modules of the particular restaurant within the CCOS 1 through a local RMNS 116, and include a plurality of front of house staff 219 SUDIs 220. In operation, the tracking and monitoring starts when member 222 users 223 and non-member 224 users 223 place an order 224 for a menu item 225 within a participating restaurant, using the provided MRUDI 226 or a PUDI 227. The CCOS 1 tracks and records the time period 228 from the moment an order is placed 229 to the moment the order instructions are displayed on the relevant staff SUDI 230, illustrated exemplarily under FIG. 37; the preparation and/or cooking process period 231, until the ready menu item order is placed on a ISM 233; the time period 234 from the moment the order is ready and is placed on a ISM 233 to the moment the notification is received on the service staff SUDI 235; the time period 236 from the moment the service staff receives the notification on their SUDI 235 to the moment the service staff collects the order 237; the time period 238 from the moment the service staff collects the order 237 to the moment the order was served 239; and the time period 240 between the moment the order was served 239 to the moment the table or counter position was cleared 241 and tracked at pot and dishwashing station.

For participating self-serve restaurants, the CCOS 1 sends the notification to the member 222 users 223 PUDI 243, and tracks the time period 242 from the moment the order is ready and is placed on a ISM 233 to the moment the notification is received on the member 222 users 223 PUDI 243, and the time period from the moment the order is collected 245 to the moment the table or counter position was cleared 241. For non-member 224 users 223, the CCOS 1 sends the notification to the table or counter position display 247 and/or the said NFCs/RFIDs displays 214. The tracking is executed through wireless communication with the relevant plurality of modules of the particular restaurant within the CCOS 1 through a local RMNS 116 and allows the CCOS 1 to record and analyse individual stages and individual performances in graphic and data, providing the local management, illustrated under FIG. 32, the head office FIG. 52, and plurality of subsidiaries and branch offices realtime and historic information in relation to individual staff and service performances. The flow diagram and the related schematic illustrate the process and interactions between the CCOS 1, the RMNS 221, the exemplary table 218 based sets of customizable and programmable waterproof and +95° Celsius heat resistant NFCs/RFIDs devices 214, the plurality of ISMs 215, 216, 217, the plurality of SUDIs 220, and the plurality of table based displays 242 and the plurality of MRUDIs 243 and PUDIs 244. When a menu item 224 order is placed 225, the relevant back of house screen 245, illustrated exemplarily under FIG. 37, displays the menu item 224 preparation and/or cooking instruction 224 on the relevant staff screen 245. When the menu item 224 is ready 246, the relevant service staff, exemplarily a cooking station service staff, confirms the ready order 247 by holding a plate 211 with the affixed NFC device 213 in close proximity of the sets of customizable and programmable waterproof and +95° Celsius heat resistant NFCs/RFIDs devices 214 that is connected to the back of house screen 245. The NFC device 213 is validated (in good order), and the sets of customizable and programmable waterproof and +95° Celsius heat resistant NFCs/RFIDs devices 214 that is connected to the back of house screen 245 interrogates and communicates wirelessly with the plates NFC device 213, involving also the RMNS 221, and the CCOS 1, resulting in confirmative communication that a particular menu item 224 order 225 is now linked to a particular validated plate 211, illustrated exemplarily under. The cooking service staff places now the menu item 224 on the plate 211 and the plate 211 on the ISM 248 (215), and the sets of customizable and programmable waterproof and +95° Celsius heat resistant NFCs/RFIDs devices 214 of the ISM 248 (215) interrogates and communicates wirelessly with the plates NFC device 213 to reconfirm the order 249 on a particular ISM 248 (215) and communicates wirelessly to the CCOS 1 via the RMNS 221, and the CCOS 1 through a local RMNS 221 sends a wireless communication 250 to the CCOS 1 through a local RMNS 221 to a plurality of service staff SUDIs 251 that a particular order 225 of a particular menu item 224 for a particular table and seat, illustrated exemplarily as table 218 and seat 252 is ready for service at a particular ISM, illustrated exemplarily ISM 215. Simultaneously, the CCOS 1 through a local RMNS 221 sends a notification to a plurality of service staff SUDIs 254 that an order 224, designated for a particular table 218 and seat position 252 is ready for service. A service staff, illustrated exemplarily as 219, confirms the notification 255, resulting in the removal of the said notification from all other service staff SUDIs 251 that the service will be performed by the confirming service staff 219. If the order cannot be confirmed, manual action 253 can be taken. The confirming service staff 219 collects 256 the plate 211 from the ISM 215 and delivers 257 it to the table 218 and to the seat position 252, holding or sliding the plate in close proximity to the embedded the NFCs/RFIDs 214. Upon close proximity, to the embedded the said NFCs/RFIDs 214 at a tables 218 seat position 252 interrogates the plates full duplex NFC tag 213, and communicates wirelessly to the front of house module within the CCOS 1 through the RMNS 116 that the order is fulfilled 256. The service staff will also see said confirming communication and the service action is deleted from the SUDI 220. In the event an order 224 is returned and or rejected 259, the service staff 219 uses the SUDI 220, and selects one of a plurality of options linked to the earlier notification 254 on the SUDI 220 to select from a plurality of option the reason for the return of the order 224, and returns the plate 211 to the service counter for further action that is also communicated wirelessly to the front of house module within the CCOS 1 through a local RMNS 116. For self-serve restaurants, the CCOS 1 through a local RMNS 221 send a notification 260 to the said relevant NFCs/RFIDs 214 of seat 252 and/or to a particular MRUDI 243 or PUDI 244 from which the menu item 225 order 224 was placed. The member 222 user 223 or non-member 224 user 223 can now collect 261 the order from the relevant ISM, illustrated exemplarily as ISM 215. In the event an order 224 is rejected and/or returned 259 by a member 222 user 223 or non-member 224 user 223, the service counter staff uses the ISM 215, and selects one of a plurality of options on the ISM 215 to specify the return of the order 224, and returns the plate 211 to the relevant service station for further action. The CCOS 1 records such action.

FIG. 06

Figure 6:
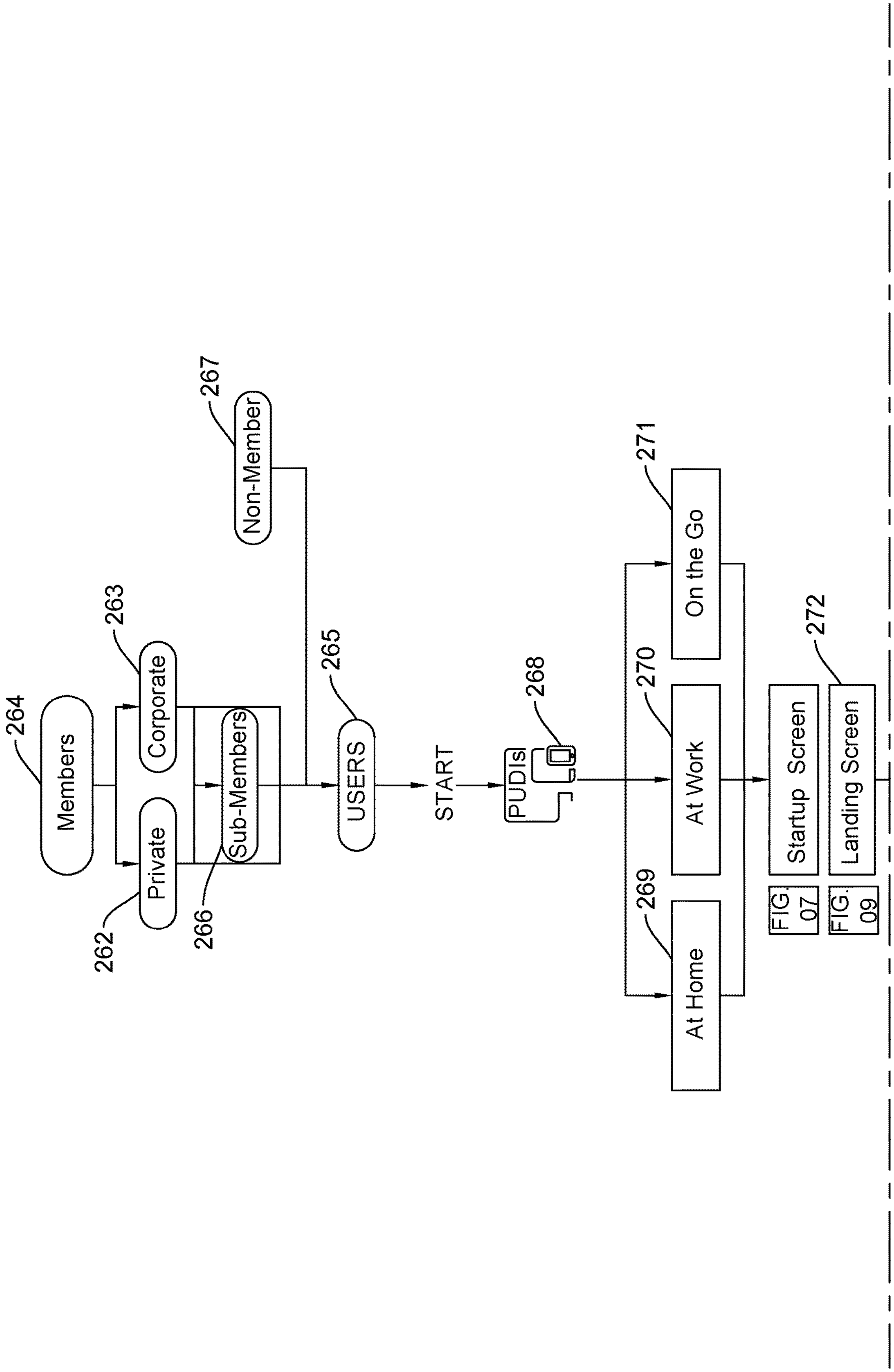
FIG. 06 illustrates a diagram that illustrates the versatility of the present invention of the COOS
Figure 13:
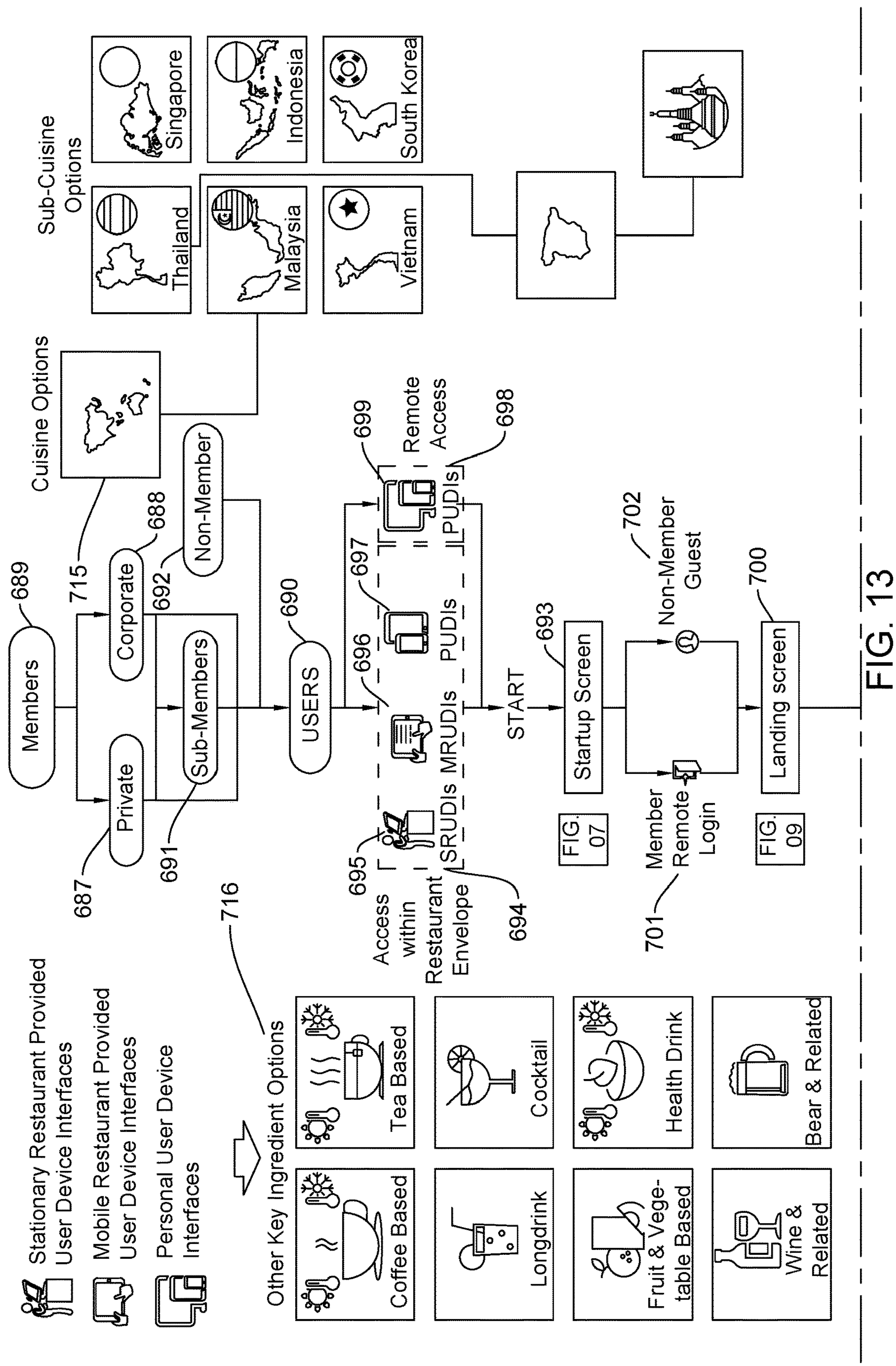
FIG. 13 illustrates a flow diagram of a member user create my own function of the landing screen illustrated exemplarily under FIG. 09 of the present invention of the CCOS 1.

Referring now to FIG. 6 there is illustrated a diagram that illustrates the versatility of the present invention of the CCOS 1. Private 262 and corporate 263 member 264 users 265 and their respective sub-members 266 users 265, and non-member 267 users 265 can use a PUDIs 268 to place orders of standard menu items remotely from home 269, at work 270, or on the go 271 when accessing the startup and landing screen 272. Non-member 267 users 265, illustrated exemplarily as 273 can proceed with all available non-member 273 services, including selecting and placing orders 276 for standard menu items, illustrated exemplarily under FIG. 10 at a local participating restaurant, illustrated exemplarily as 274, whereby only standard limited health and wellness customization functions 277, illustrated exemplarily under FIG. 13 are available to non-member 267 users 265. Member 264 users 265, illustrated exemplarily as 275 can proceed selecting standard menu items, customizing said menu items, and creating menu items from scratch 276, illustrated exemplarily under FIG. 13, drawing from personalized and customized health and wellness and budget settings 277 and established diet and budget plans 278, illustrated exemplarily under FIG. 16, 17, 18, 19, 20, 21; and order said customized and created menu items 276 at a local participating restaurant, illustrated exemplarily as restaurant 1 274, or save a plurality of said standard, customized, and created menu items 276 in a personal menu 279 for later ordering, when visiting other participating restaurants 280 in a plurality of other districts, cities, countries etc., illustrated exemplarily as 281, using the provided MRUDI or SRUDI, illustrated exemplarily as 282, or own PUDI 283 to place an order in the said other participating restaurant 280. The CCOS 1 also allows for integration into a plurality of food and beverage settings including hotel restaurants and chain restaurants 284 in a plurality of districts, cities, countries etc., illustrated exemplarily as 281, allowing member 264 users 265 to use a PUDIs 285, or use the provided MRUDI and SRUDI 286 to place their order, including possible further customization.

FIG. 07

Figure 8:
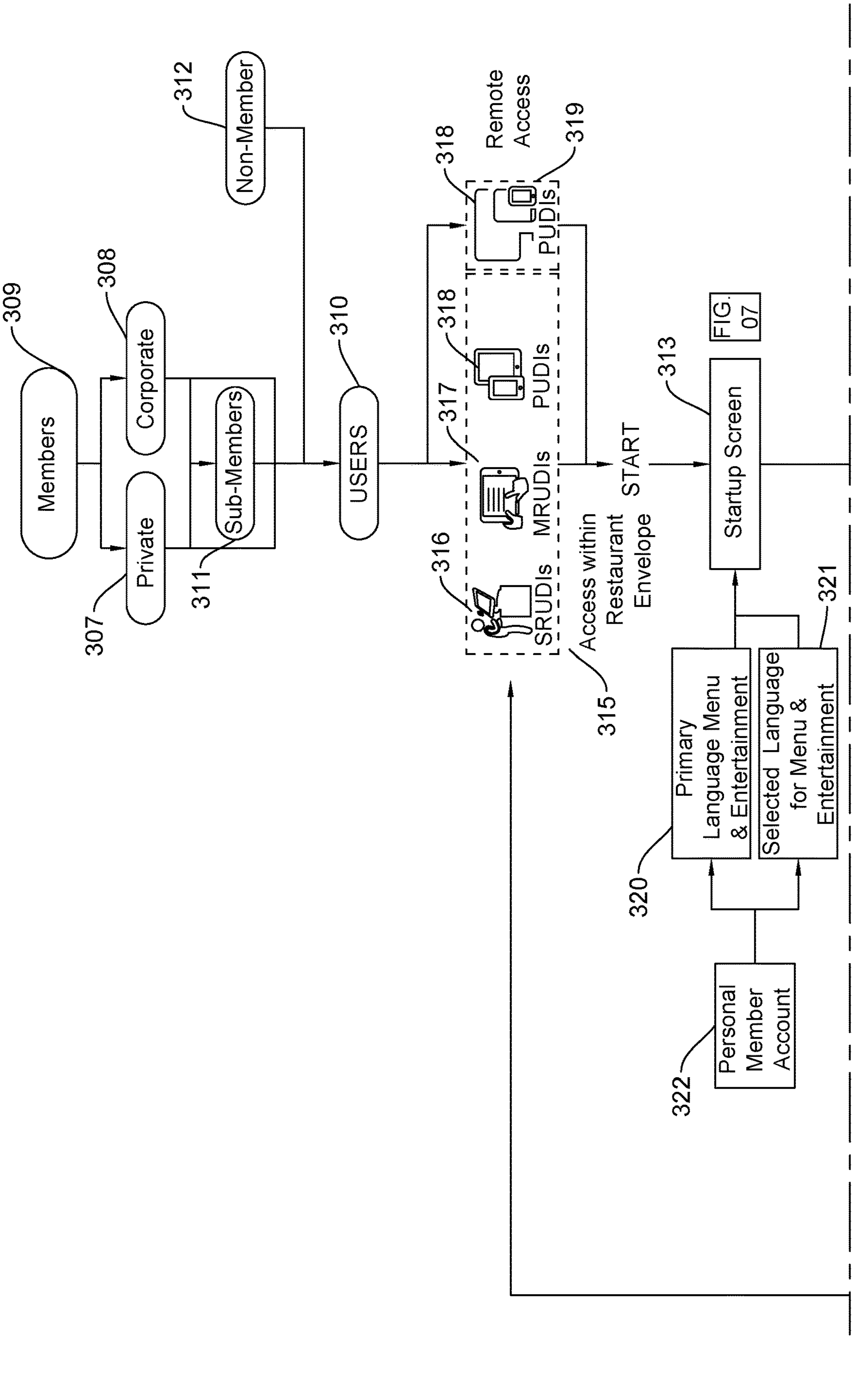
FIG. 08 illustrates a diagram in relation to the startup screen, illustrated exemplarily under FIG. 07 that leads to the landing screen, illustrated exemplarily under FIG. 09 of the present invention of the COOS 1.
Figure 9:
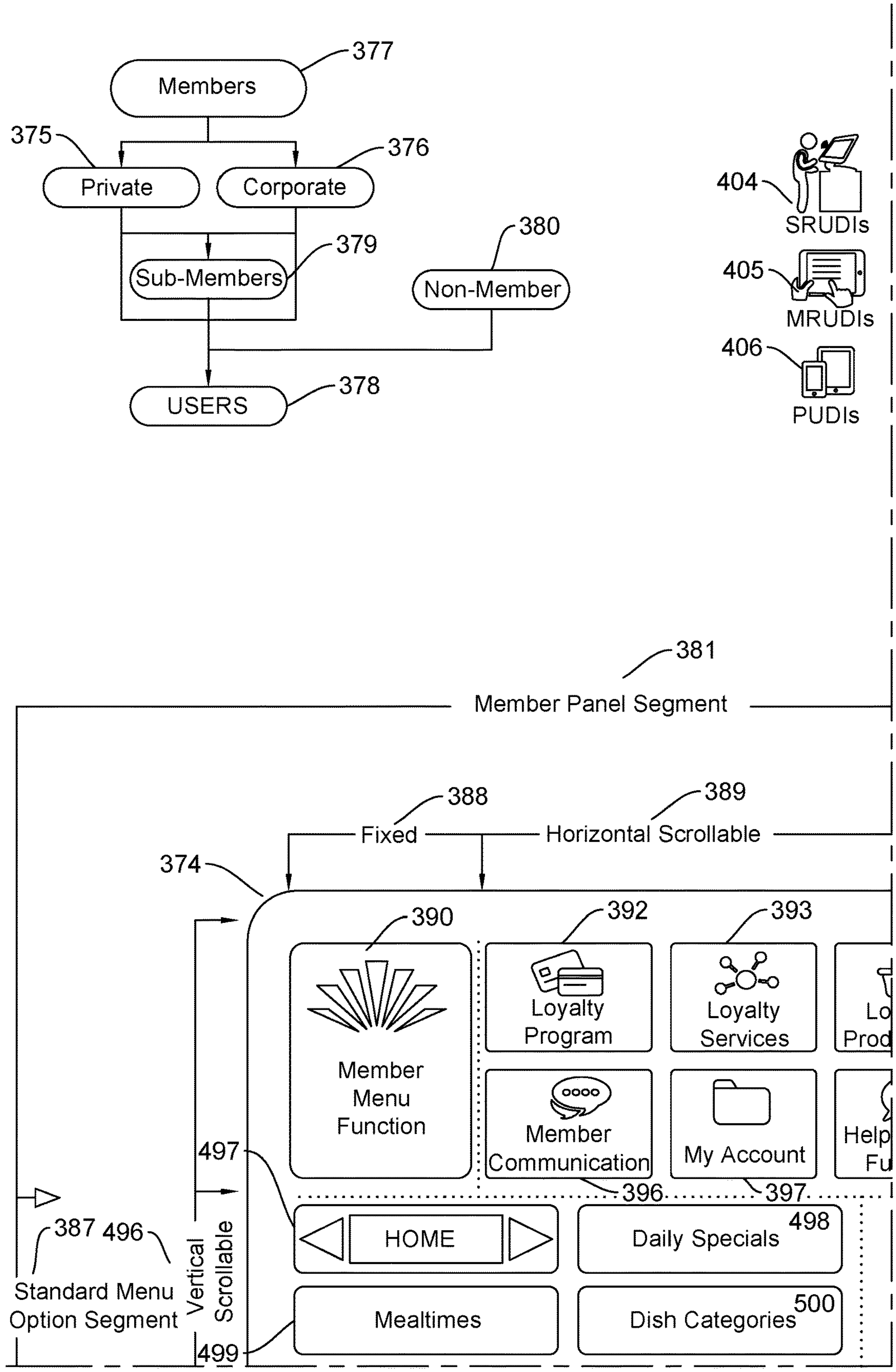
FIG. 09 illustrates exemplarily the interactive landing screen illustrated exemplarily under FIG. 09 of the present invention of the COOS 1.

Referring to FIG. 07, illustrating exemplarily a startup screen 287 that provide private 288 and corporate 289 member 290 users 291 and their respective sub-members 292 users 291, and non-member 293 users 291 the entrance to receive access to the CCOS 1, and in particular to the landing screen, exemplarily illustrated under FIG. 09. In operation, the participating restaurant provided MRUDIs and SRUDIs are on energy saving mode, and display only a customizable logo. The illustrated exemplary startup screen 287 only activates upon a member 290 user 291 and non-member 293 user 291 interacting with the screen by touch or other means of interaction. The startup screen 287, when activated, identifies the COOS 1 brand by name and logo 294, and allows for the display of the plurality of selectable names of the relevant participating restaurant 295 that can be scrolled through and selected. A fixed participating restaurant name is displayed when member 290 users 291 and non-member 293 user 291 use a provided SRUDI or MRUDI, or when member 290 users 291 use a PUDIs within a participating restaurant envelope at any NFC/RFID position, illustrated exemplarily under FIG. 04 and FIG. 05. The same screen display including the display of the plurality of selectable names of the relevant participating restaurant 295 procedure applies when member 290 users 291 and non-member users 293 use PUDIs with the intent to login and/or receive access through the internet from remote location. In operation, the help function 296 provides member 290 users 291 and non-member users 293 assistance in text form in the vertical scrollable field 297, structured in form of icon menu headings that mirrors the icons on the startup screen 287 for the plurality of available functions, illustrated exemplarily as 294, 295, 296, 297, 298, 299, 300, 301, 302, 303, 304, 305, 306. In operation within a participating restaurant envelope, the call for service function 298 is linked to the handheld SUDIs of the service staff, exemplarily illustrated under FIG. 08/Ref 327, resulting also, upon activation, of wireless communication with the front of house module within the CCOS 1 through a local RMNS 116 to direct the service staff to the relevant seat position. In operation, the introduction video function tab 299 provides unfamiliar member 290 users 291 and non-member users 293 a short introduction video within field 297. The activation of the introduction video function and its evaluation by all users is designed to improve services. In operation, the member login gateway 300 triggers a popup window that allows member 290 users 291 to login 300. Non-member 293 users 291 are considered guests 301 and do not require login. When non-members 293 users 291 select the guest function 301, guests will be reminded of the advantages of a membership. In operation, non-member 293 users 291 have the possibility to complete the member application 302, illustrated exemplarily under FIG. 08/Ref: 363. In operation, the COOS 1 provides for two language select option, 303 and 304. Member 290 users 291 and non-member 293 users 291 have the option to select a plurality of preferred languages for the entertainment options 303, and select the preferred language for the menu operation 304. In operation, the CCOS 1 provides for families with children the option for parents to keep the children entertained while concentrating on the selection of menu items. Parents can use for the entertainment function 305 and the parent setting function, exemplarily illustrated under FIG. 08/Ref 344. In operation, the administration function 306 is for service staff use only. It is used for the login and pairing of MRUDIs and SURDIs, exemplarily illustrated under FIG. 04, and for service related troubleshooting.

FIG. 08

Referring now to FIG. 8 there is illustrated a diagram in relation to the startup screen 313, illustrated exemplarily under FIG. 07 that leads to the landing screen 314, illustrated exemplarily under FIG. 09. Private 307 and corporate 308 member 307 users 310 and their respective sub-members 311 can use, within a participating restaurant envelope 315, the provided SRUDIs 316 and MRUDIs 317, and own PUDIs 318. Non-members 312 users 310, can only use the provided SRUDIs 316 and MRUDIs 317. Member 307 users 310 can also access the startup screen 313 remotely, illustrated exemplarily as 319, using PUDIs 318. In operation the startup screen 313 automatically uses the pre-set primary language for menu operation and entertainment that is set for a particular participating restaurant 320, or the language a member 307 users 310 has selected for menu operations and entertainment 321 under the personal account setting 322. A member 307 users 310 has the option to change the pre-set primary language setting, and opt ad-hoc for any other available language 323. The CCOS 1 will then use the add-hoc setting for the current login session only. A member 307 users 310 can independent set ad-hoc languages for the entertainment options 324. Non-member 312 users 310 can only use the pre-set primary language 320, or select from a range of languages for the menu operation only. The COOS 1 filters out any non-selected language for menu and entertainment operation. In operation, the startup screen 313 allows a member 307 users 310 and a non-member 312 users 310 to call for service 325 within a restaurant envelope 315. The call for service 325 function communicates the request wirelessly to the front of house module within the CCOS 1 through a local RMNS 326 notifying the service staff's SUDIs 327 that service is required, identifying the specific table and/or counter seat position, and a unique service reference code for CCOS 1 service performance tracking. If a member 307 users 310 uses a PUDI 318 within a restaurant envelope, the attention notification includes the reference that a PUDI 318 was used. Upon arrival on the table or counter seat position that called for service, the service staff registers the arrival at the table based NFCs/RFIDs devices, that communicate wirelessly to the front of house module within the COOS 1 through the RMNS 116 the response time. Individual service staff performances can be reviewed in real time and in detail on the managers and chefs SUDI, illustrated exemplarily under FIGS. 32, 33, 34 and 35. There is also a help 328 function that embraces all relevant help subjects relevant for the startup screen 310. The administration 329 function is for service staff use only 330. It allows service staff to login and pair 331 SRUDI 316 or MRUDI 317 with a local RMNS 326 and the COOS 1, illustrated exemplarily under FIG. 05, and execute a plurality of diagnostics functions and processes that are communicated wirelessly to the front of house module within the COOS 1 through the RMNS 326. It also allows the service staff to register their handheld SUDIs 327 as temporary user, and assist the member 307 users 310 and non-members 312 users 310 for a plurality of menu operation, including the placement of orders that need to be confirmed by the member 307 users 310 and non-members 312 users 310. When registering as a temporary user, the service staff SUDI 327 communicate wirelessly with the front of house module within the COOS 1 through a local RMNS 116, capturing and analysing the data that can be used to improve services and menu operation. In operation, the startup screen has an entertainment option panel 332. When activated on the startup screen, it displays a plurality of entertainment options 333 in word supported by icon symbols, and includes an introduction video 337, shown in the center of the screen, illustrated exemplarily under FIG. 07/Ref: 297, educating about the services, functions and advantages when using the interactive menu, and the advantages of a membership. There are also a plurality of age group classified health and wellness related educational games 335 that teaches children and adults in a play-and-fun kind of way the importance of eating and living healthy. There are also a plurality of health and wellness related news 336 related to health and wellness, including products and advertisements of products and services with links to the respective product and service providers. There are also health and wellness related educational documentaries 337 comprising of a plurality of discoveries, health and wellness science, and personal experiences. There are also health and wellness related light entertainment 338 comprising of a plurality of light health and wellness entertainment programs. There is also a healthy living 339 options that provide information of healthy living at home and while working, including advertisements from a plurality of health and wellness professionals and links to such professionals. There is also a sport and health option 340 providing information and education in the relation to sports and healthy living, including a plurality of exercise and weight related information and advertisements of related services provided by professionals with links to such professionals. There are also a plurality of loyalty products and services 341 provided by third parties and embraced by the member loyalty program and links to the interactive loyalty program member menu, addressed under FIG. 09. The entertainment options 333 are linked and communicate wirelessly with the entertainment module within the CCOS 1 through a local RMNS 116 for the retrieval of the relevant videos and information from the video library 342. Live streaming 343 is envisioned in future development phase that requires a plurality of license keys 344, and a plurality of interfaces with a plurality of third parties 345. The entertainment option 332 allows a parent setting 346, providing a parent the means and methods to set limit or prevent the access to particular entertainment options for a child. A parent can select a single or plurality of main category 347 from a plurality of main categories, set the age group 348, select a special interest 349 or plurality of interests 350, illustrated exemplarily for a plurality of options as a sport and health 351, with subcategories soccer 352 including health products 353, illustrated exemplarily involving fruit and vitamin drinks 354 that a member 307 users 310 can order by selecting the respective link to the menu item 355, or customize using the menu options 356, and save and include in the personal menu 357. As for the soccer sub-category 352, a member 307 users 310, can use the loyalty point 358 to buy a products, which can include soccer tickets. The entertainment option also allows the use of earphones 359 that can be obtained and can only be activated by the service staff 327. Providing earphones 359 is executed using an earphone execution protocol 360 within the administration 329 function because the loss of earphones 359 is chargeable. In operation, member 307 users 310 login 361 to receive access to the landing screen 314, non-members 312 users 310 receive access as guests 362, but the startup screen 313 allows a Non-member 312 users 310 to apply via e-form 363 for membership. Submission 364 and verification 365 by way of wireless communication the membership module within the CCOS 1 through a local RMNS 326 is instantaneous. A successful 366 application results in an auto generation of an encrypted member code 367, and invitation 368 to the applicants designated PUDI 369 to completion of membership registration 370, illustrated exemplarily under FIG. 15. Unsuccessful applications result in an autogeneration of a rejection message 371 communicated wireless to the non-member 312 users 310 designated SUDI 372, with option to re-apply 373.

FIG. 09

Figure 27:
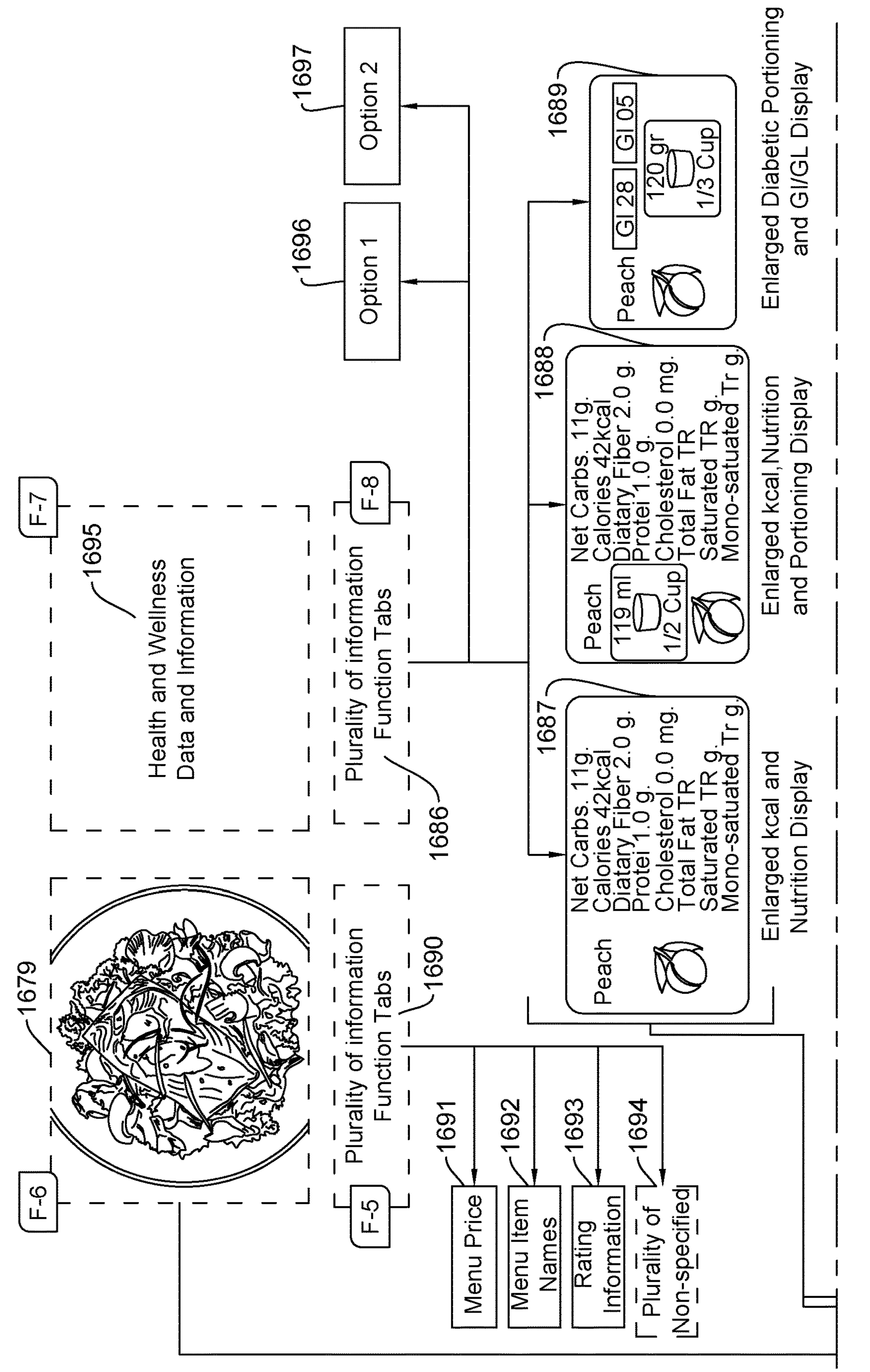
FIG. 27 is illustrates a diagram of the ingredient exchange segment, illustrated exemplarily under FIG. 09 of the present invention of the CCOS 1.

Referring now to FIG. 09 illustrating exemplarily the interactive landing screen 374 of the CCOS 1. In operation private 375 and corporate 376 member 378 users 377 and their respective sub-members 379 users 378, and their non-member 380 users 378 reach the landing screen 374 after passing through the startup screen, illustrated exemplarily under FIG. 07. The outer line segments illustrate a plurality of key segments comprising of a member panel segment 381, a central segment 382, a health and wellness segment 383, a cuisine and key ingredient customization segment 384, an ingredient exchange option customization segment 385, an interactive display and menu field segment 386, and a standard menu option segment 387. Within the fixed 388 and horizontal scrollable 389 segments of the member panel segment 381 is the member menu function tab 390. When a member 377 user 378 selects the member menu function tab 390 within a participating restaurant envelope, it results in the display of the standard menu and a plurality of established personal member menus in the vertical scrollable 391 field F-2 that allows expansion to include also field F-3. The respective menus are illustrated exemplarily under FIG. 10. Within the horizontal scrollable segment 389 are a plurality of function tabs, comprising of a loyalty program function tab 392, illustrated exemplarily under FIG. 11, a loyalty service function tab 393 and a loyalty products function tab 394, illustrated exemplarily under FIG. 12, a create my own function tab 395, illustrated exemplarily under FIG. 13, a member communication function tab 396, illustrated exemplarily under FIG. 14, a my account function tab 397, illustrated exemplarily under FIG. 15, a help function tab, illustrated exemplarily under FIG. 22, and a share function tab 399, illustrated exemplarily under FIG. 23. Although only the aforementioned function tabs are shown within the member segment panel 381, additional customizable function tabs can be added 400, including a home cooking function tab 401, illustrated exemplarily under FIG. 54 that allows member 360 users 378 to cook ready portioned menu items received and/or collected from a participating restaurant, using the same screen display as the frontline cook, illustrated under FIG. 37. Within the fixed segment 402 under the central segment 382 is an administration function tab 403 that changes its color. Red conveys a SRUDI 404, a MRUDI 405 or PUDI 406 is not paired. Green conveys a SRUDI 404, a MRUDI 405 or PUDI 406 is successfully paired. Blue conveys a faulty SRUDI 404, a MRUDI 405 or PUDI 406. It allows the service staff and the SRUDI 404, a MRUDI 405 or PUDI 406 users 378 visual understanding of the current status including the relevant table and seat identification 407. There is also a general help function tab 408. When selected generates an expandable vertical scrollable help menu in filed F-3. It allows the users 361 to employ the help function at any time and receive step by step guidance for all functions available on a landing screen 374. There is also an interactive logo function tab 409, when selected, results in the display of an interactive pop-up window showing all linked participating restaurants. There is also a search function 410 that allows for a plurality of searches that embraces all elements and functions accessible to member 378 users 377 and non-member 380 users 378. There is also a call for service function tab 411 that is linked to a plurality of service staff SUDIs, illustrated exemplarily under FIG. 03, FIG. 05 and FIG. 08. There are also a plurality of triple use function tabs 412, 413, 414. Selecting the centre of a shortlist function tab 412 results in the shortlisting a currently displayed menu item in field F-6. The shortlist is displayed in field F-3. Selecting the view function tab 415 displays the plurality of shortlisted menu items in field F-2 for selection. Selecting the clear function tab 416 clears the shortlisted menu items. The number of currently menu items shortlisted are also displayed a number 417. Member 378 users 377 and non-member 380 users 378 can use the diners function tab 413 to invite a plurality of diners by using the add function tab 418, and use the clear function tab 419 to remove diners from the diners list. The number of current diners are displayed as a number 420. Adding diners can also be executed by way of an interactive popup window 421 that emerges when the diners function tab 413 is selected. The interactive popup window 421 shows the relevant seating and/or table arrangement, and identifies the table and seat numbers, illustrated exemplarily for a four-seater table 422 with four seats 423, 424, 425, 426. Selecting a seat is confirmed by a mark, and de-selecting a seat removes the mark, whereby, illustrated exemplarily, the inviting seat 427 shows a different mark from the invited seats 428. Selecting the view order function tab 429 results in the emerging of a popup window reflecting the detailed order. The total amount is also shown 430, and allows the member 378 users 377 and non-member 380 users 378 to place the order 431 without seeing the detailed order. Selecting the pay function tab 432 allows member 377 users 376 to execute a autopay function, illustrated exemplarily under FIG. 15/871 Within the horizontal scrollable segment 433 under the health and wellness segment 383 are a plurality of health related function tabs, calories 434, nutrition 435, portioning 436, diabetic 437, budget 439, allergy 440. Each of these function tabs can be activated and de-activate separately or jointly to apply the auto customization of menu items based on a member 307 users 310 pre-setting and saved plans under the kcal and nutrition function, illustrated exemplarily under FIG. 17, a portioning function, illustrated exemplarily under FIG. 18, a diabetic function, illustrated exemplarily under FIG. 19, a budget function, illustrated exemplarily under FIG. 20, and an allergy function, illustrated exemplarily under FIG. 21. Non-member 380 users 378 can only use the standard functions that are available by way of a popup window for each of the said function tabs 434, 435, 436, 437, 439, 440. The currency select and exchange function tab 438, generates a popup window from which a currency can be selected, resulting in the auto-conversion of the current amount 430 within the function tab 429, and the amount shown in the detailed bill into the selected currency. The help function tab 441 offers assistance for the health and wellness panel segment 383, following the same principal arrangement illustrated exemplarily under FIG. 22. Additional functions are not visible, but are illustrated for coffee roasting 442, that allows member 377 users 378 to customize their coffee roasting order to meet personal health and wellness requirements. The glutenfree function tab 443 allows member 377 users 378 and non-member 380 users 378 to exclude menu items in line with a gluten free diet. The thumbs up 444 and thumbs down 445 function tabs allow member 307 users 310 and non-member 380 users 378 to vote for menu items listed by member 377 users 378 for competitions under other cuisine options 456. Within the fixed and vertical scrollable segment 446/447 under the health and wellness segment 383 is a cuisine option function tab 448 and key ingredient option function tab 449 that allows further additions. Both function tabs can be applied independently or jointly. When the cuisine option function tab 448 is selected, the vertical scrollable segment 450 in field F-9 under the cuisine, key ingredients and customization segment 384 displays a plurality of cuisine options 451, illustrated exemplarily as a cuisine asian function tab 452, a western function tab 453, a fusion function tab 454, a local delights function tab 455 a plurality of other customizable main cuisine option categories function tabs 456, and a winners function tab 457, which refers to menu items created and submitted for competitions by member 377 users 378, using the create my own function 395 are illustrated exemplarily under FIG. 13, and using the cuisine sub-categories are also illustrated under FIG. 13. When the cuisine option function tab 448 is not activated, the plurality of cuisine options 451 are not visible, and the same space is available for a plurality of other uses and applications, for example an interactive membership advertisement or a vertical scrollable list of special menu items. When the key ingredient function tab 449 is selected the vertical scrollable segment 458 in field F-10 under the cuisine, key ingredients and customization segment 384 displays a plurality of key ingredient options 459, illustrated exemplarily as a vegan function tab 460, a pork function tab 461, lamb function tab 462, beef and veal function tab 463, poultry function tab 464, freshwater fish function tab 465, seafood function tab 466, shellfish function tab 467, and a plurality of non-illustrated key ingredient function tabs. Using the key ingredient options 459 and sub-options are illustrated exemplarily under FIG. 13. When the key ingredient option function tab 459 is not activated, the plurality of key ingredient options 459 are not visible, and the same space is available for a plurality of other uses and applications, for example for advertisement or a vertical scrollable list of loyalty products and services. Within the horizontal scrollable segment 468 under the ingredient exchange and customization segment 385 in field F-4 are a plurality of customization function and function tabs, illustrated exemplarily in more detail under FIG. 27. For menu items shown in the interactive menu item display field 469 in field F-6 the display shows a plurality of horizontal scrollable 470 corresponding interactive exchangeable menu item ingredient icons, illustrated exemplarily as menu item ingredient 1 471, menu item ingredient 2 472, menu item ingredient 3 473, menu item ingredient 4 474, menu item ingredient 5 475, and menu item ingredient 6 476. There is also within a horizontal scrollable 468 segment within the vertical segment 469 a plurality of horizontal scrollable interactive and customizable main ingredient category icons, illustrated exemplarily as main ingredient category 1 470, main ingredient category 2 471, main ingredient category 3 472, main ingredient category 4 473, main ingredient category 5 474, main ingredient category 6 475, and main ingredient category 7 476, with relevant corresponding interactive pluralities of exchangeable sub-ingredient categories, illustrated exemplarily as sub-ingredient category A 477, sub-ingredient category B 478, sub-ingredient category C 479, sub-ingredient category D 480, sub-ingredient category E 481, sub-ingredient category F 482, and sub-ingredient category G 483. Both, the main ingredient categories and sub-ingredient categories are horizontal scrollable 484 and 485. Initially, the plurality of ingredients are not visible, and this portion of field F-4 can be used for a plurality of other purposes. The plurality of said ingredients only emerges upon activation of the ingredient exchange or create my own function tab 486 within segment 487 and segment 488. Within the horizontal scrollable 468 ingredient segment, is an ingredient removal and exchange field 489. Ingredients to be removed 490 or inserted 491 must be moved manually over this field. There is also a non-preferred ingredient field 492, a preferred ingredient field 493, and an allergy field 494. Exchangeable ingredients can be moved onto these fields. The purpose and the functions are illustrated exemplarily in more detail under FIG. 27. The vertical scrollable segment 495 in field F-3 under the display and menu segment 368, when not used for menu item shortlist 412, or help 408 can also serve advertisements and a plurality of other purposes. With the vertical scrollable segment 496 under the standard menu option segment 387 provides in field F-1 for the display of a plurality of standard menu function tabs including a triple use function tab comprising of a home function tab 497 with backward and forward function that allows the member 377 users 378 and non-member 380 users 378 to move, one step at the time, back and forward. Selecting center home field of the function tab 497, brings the member 377 users 378 and non-member 380 users 378 back to the original display of the landing screen 374. The daily specials function tab 498 displays in field F-2 the daily specials, whereby for member 377 users 378, who have customized their health and wellness functions, illustrated under FIGS. 16, 17, 18, 19, 20 and 21, the COOS 1 will automatically apply said settings for the plurality of available daily specials and filter out and/or adjust the daily specials in line with said settings. When the member 377 users 378 and non-member 380 users 378 select a daily specials 498 menu item, the selected menu item in the list is highlighted, and the menu item picture is displayed in the interactive display field F-6 with some relevant information of the selected menu item displayed in field F-5, and the relevant corresponding health and wellness information displayed in field F-7. Member 377 users 378 and non-member 380 users 378 have option to customize the display within field F-7 using a plurality of relevant function tabs in field F-8, whereby non-member 380 users 378 options are limited. There is also a mealtime function tab 499 that displays in field F-2 a plurality of mealtime categories, showing a plurality of menu items under each main mealtime category, whereby for member 377 users 378, who have customized their health and wellness functions, illustrated under FIGS. 16, 17, 18, 19, 20 and 21, the CCOS 1 can automatically apply said settings for the plurality of mealtime categories. When member 377 users 378 and non-member 380 users 378 select a menu item under a mealtime category 499, the selected menu item in the list is highlighted, and the menu item picture is displayed in the interactive display field F-6 with the relevant plurality of information of the selected menu item displayed in field F-5, and the relevant corresponding health and wellness information displayed in field F-7, with option to customize the display in field F-7 using a plurality of relevant function tabs in field F-8. Member 377 users 378 have the option to fully customize a selected menu item, using the ingredient exchange function, illustrated under FIG. 27, and save the menu item the member 377 users 378 personal menu, illustrated exemplarily under FIG. 10, using all available functions available to member 377 users 378. Non-member 365 users 361 can customize menu items with limitations. The same process and options are available for dish categories 500. The shortcut function tab 501 is fully functional for member 377 users 378, and with limitations for non-member 365 users 361, illustrated exemplarily under FIG. 28 and FIG. 29. The startup screen function 502 brings the member 377 users 378 and non-member 380 users 378 back to the startup screen, illustrated under FIG. 07. For clarity, main ingredient categories 503, illustrated exemplarily as main ingredient category 3 472 allow for a plurality of two sub-levels, illustrated exemplarily a sub-ingredient category A-G 504. Only sub-ingredient categories 504 are exchangeable. The CCOS 1 allows for further customization to create further non-exchangeable ingredient levels as illustrated exemplarily under FIG. 27 and FIG. 55 illustrating the ingredient organization structure.

FIG. 10

Figure 10:
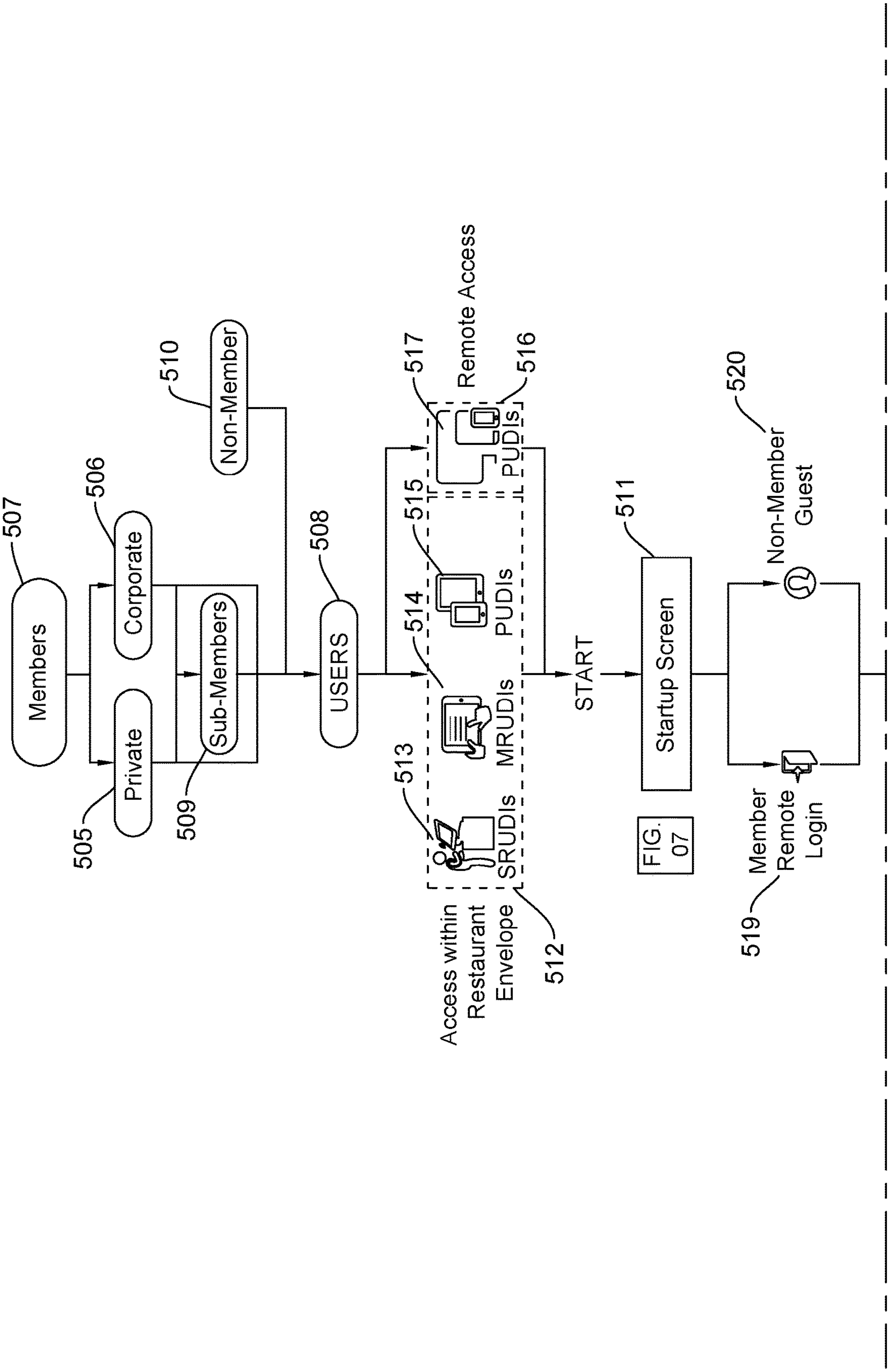
FIG. 10 illustrates a diagram of a member users menu function of the landing screen illustrated exemplarily under FIG. 09 of the present invention of the COOS 1.

Referring now to FIG. 10 there is illustrated a diagram of a member 510 users 508 menu function 521 of the present invention of the CCOS 1. In operation the member menu function tab 521 is for private 505 and corporate 506 member 507 users 508 and their respective sub-members 509 only. Non-members 510 users 508 cannot use this function. Member 507 users 508 can access the startup screen 511, illustrated exemplarily under FIG. 07, within a participating restaurant envelope 512 using either the participating restaurant provided SRUDIs 513 and MRUDIs 514, or their own PUDIs 515. Member 507 users 508 can also access the startup screen 511 from remote locations 516 using a plurality of PUDIs 517. To access to the landing screen 518, illustrated exemplarily under FIG. 09, member 507 users 508 must login 519 to receive access. Non-members 510 users 508 are allowed as guests 520, but can receive access during promotional marketing drives. In operation member 507 users 508 can select the member menu function tab 521 within a horizontal scrollable member panel 522, illustrated exemplarily under FIG. 09/Ref 389. When member 507 users 508 have uploaded a personal picture when providing the personal data, illustrated exemplarily under FIG. 15/Ref 858, the picture, illustrated exemplarily for this illustration as the picture of a mother, is shown within member menu function tab 521 for visual reference. In operation, when selecting the member menu function 521, member 507 users 508 have a plurality of options 523. When within a particular participating restaurant envelope 512, member 507 users 508 see within the vertical scrollable field F-2 a logo icons and text information of a plurality of participating restaurants, illustrated exemplarily as restaurant 1 524, restaurant 2 525, and restaurant 3 526, identifying the particular participating restaurant 1 524 in first position identified by a colored frame 527. When accessing the landing screen 518 from a remote location 516, member 507 users 508 see within the vertical scrollable field F-2 a plurality of participating restaurants, illustrated exemplarily as restaurant 1 524, restaurant 2 525, and restaurant 3 526, and member 507 users 508 can select a single participating restaurant, except when searching and planning and/or making a reservation, member 507 users 508 can select a plurality of restaurants as illustrated exemplarily under FIG. 29. When selecting a single restaurant the display in field F-2 changes, and displays in field F-2 a plurality of menu option, including the relevant applicable participating restaurant menu icon 528, and a plurality of personal menus associated to the applicable participating restaurant, illustrated exemplarily as a fathers personal menu 529, a mother's personal menu 530, a son's 531, and a daughter's personal menu 532, with possible other personal 533 and special project 534 menus, illustrated exemplarily under FIG. 15/Ref 879, 880 and 881. Member 507 users 508 can either select the menu 528 of the said particular restaurant, or any of the authorized personal menus, illustrated exemplarily as personal menu 529, 530, 531, 532, whereby the main account holder, illustrated exemplarily under FIG. 15/580, being the father, and/or any authorized person by the father, can access all personal menus established under the main account. For corporate 506 member 507 users 508 the authorized director, illustrated exemplarily under FIG. 15/Ref 885 exercises the same authority as illustrated exemplarily under FIG. 15. When the menu logo icon of a participating restaurant is selected 528, the display in field F-2 changes and the participating restaurant standard menu 535 emerges in field F-2 displaying a plurality of main menu categories, illustrated exemplarily as mealtime categories 536, dish categories 537, and daily specials 538 with the respective subcategories 539 under the said main menu categories, with a plurality of menu items 540 listed the respective subcategories 539 and displayed in the merged fields F-6, F-7, F-5, and F-8. Member 507 users 508 can select either the listed or picture menu item. When a selection is made, the merged fields F-6, F-7, F-5, and F-8 change and the selected 541 menu item 542 will be displayed in field F-6 with specific health and wellness information displayed in field F-7 allowing for comprehensive customization, illustrated exemplarily under FIGS. 16, 17, 18, 19, 20 and 21. A selected 541 menu item 542 can be order 543 for dine-in 566, for delivery as ready cooked or ready portioned for home cooking 565 or for collection as ready cooked or ready portioned for home cooking 564, or the said menu item 542 save 545 without customization in the personal menu 546 under the same subcategory 547, or under any other subcategory, illustrated exemplarily 548 or 549. Or a new main category, illustrated exemplarily as own creation 550 can be created with a sub-category 551 and the said menu item 542 can be save 545 under such said new sub-category 551. Or the said menu item can be customize 544 and save 545 in the personal menu 546 under the same subcategory 547, or any other category. When the menu logo icon of a personal menu, illustrated exemplarily as the mothers menu 530, is selected the display in field F-2 changes and the personal menu 546 of the mother emerges in field F-2 displaying a plurality of main, sub-categories, and menu items, mirroring the menu structure and display of the illustrated participating restaurant 535. A menu item 553 can be select 552 from either the listed or picture menu of the personal menu 546, to place an order 543 for dine-in 566, delivery 565 or collection 564, or customized 544 and an order 543 placed for dine-in 566, delivery 565 or collection 564, or saved 545 in the personal menu 546. There is no limitation on the number of customizations 544 or the creation of personal new main and sub-categories 550 for the personal menu 546. Member 507 users 508 can also use the standard menu functions 554 in field F-1. Non-member 510 users 508 can only use the vertical scrollable standard menu options in field F-1, illustrated exemplarily under FIG. 09. Non-member 510 users 508 can select, illustrated exemplarily, the mealtime function tab 555 and the filed F-2 changes and displays in field F-2 the standard menu 556 of the participating restaurant 1 524 with a plurality of available main 557, sub-category 558, and the menu items 559, listed under the respective sub-categories 559 and a picture menu in the merged fields F-6, F-7, F-5, and F-8. Non-member 510 users 508 can select 560 a menu item 561 and order 562 the menu item 561, or select 560 a menu item 561, customize 563 the selected 560 menu item 561 and order 562 the customized 563 menu item 561 for dine-in 566, delivery 565 or collection 564. Non-member 510 users 508 can also select from a plurality of restaurants, illustrated exemplarily as restaurant 1 524, restaurant 2 525, and restaurant 3 526, and select 560 a menu item 561 either from the list or picture menu and order 562 the menu item 561, or select 560 a menu item 561, customize 563 the selected 560 menu item 561 and order 562 the customized 563 menu item 561 for dine-in 566, for delivery as ready cooked or ready portioned for home cooking 565 or for collection as ready cooked or ready portioned for home cooking 564. Non-member 510 users 508 cannot establish or access a personal menus. In operation, the COOS 1 allows for a customizable time limited capturing and recording of ordered menu items within the front of house module within the COOS 1 through a local RMNS 116. Member 507 users 508 can use in field F-3, a recall function tab 567, when selected, displays in field F-6 a vertical scrollable lists of menu item pictures of previously ordered menu items 568. Tapping on a particular previously ordered menu item picture displays the selected menu item picture in field F-6 with the related health and wellness information displayed in field F-7. Tapping on the reverse function tab in field F-5 reverses it back to the list of menu item pictures displayed in field F-6. In operation, the COOS 1 allows for a customizable time limited capturing and recording of a plurality of rated menu items menu items within a plurality of independent and interconnected modules within the COOS 1 through the RMNS 116. A plurality of rating functions tabs are available within the horizontal scrollable field F-9 and embedded in the menu item picture displayed in field F-6 with the related health and wellness information displayed in field F-7. Member 507 users 508 and non-member 510 users 508 can chose between a plurality of rating options, illustrated exemplarily as best rated healthy menu item 570 and best rated budget menu item 571 in field F-10. The COOS 1 allows for the adding of options, illustrated exemplarily as other customizable functions 572.

FIG. 11

Figure 11:
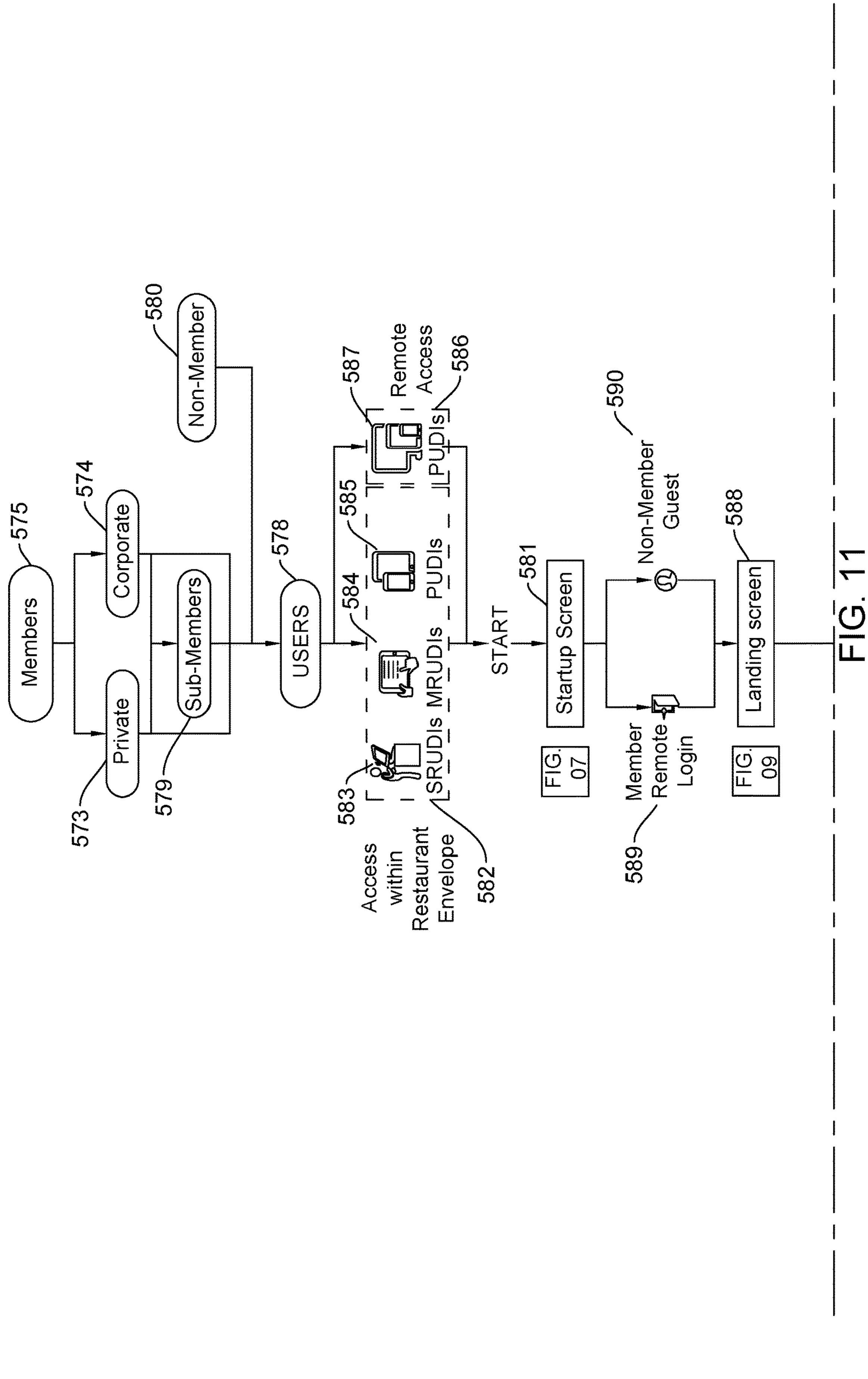
FIG. 11 illustrates a flow diagram of a member use loyalty program function of the landing screen illustrated exemplarily under FIG. 09 of the present invention of the COOS 1.

Referring now to FIG. 11 illustrating a flow diagram of a member 575 use 578 loyalty program function 591 of the COOS 1. In operation in the illustrated flow diagram for a landing screen 588 of the COOS 1, the loyalty program function 591 is for private 573 and corporate 574 member 575 users 578 and their respective sub-members 579 only. Non-members 580 users 578 cannot use this function. Member 575 users 578 can access the startup screen 581 within a participating restaurant envelope 582 through the restaurant provided SRUDIs 583 and MRUDIs 584, and member 575 users 578 can also use their own PUDIs 585 within a participating restaurant envelope 582 to access the startup screen 581. Member 575 users 578 can access the startup screen 581, addressed under FIG. 07, from remote locations 586 using a plurality of PUDIs 587. To access to the landing screen 588, addressed under FIG. 09, member 575 users 578 must login 589 to receive an access. Non-member 580 users 578 are allowed as guests 590. In operation member 575 users 578 can select the loyalty program function tab 591 within horizontal scrollable member panel 592, addressed under FIG. 09. When member 575 users 578 select the loyalty program function tab 591, field F-2 displays an interactive main option manual 593, field F-6 that displays the summary details 594 related to each main subject, and field F-7 displays the particular details of the selected subject, illustrated exemplarily as loyalty program introduction 595 which is situated in the entertainment and library 596 within the entertainment module of the CCOS 1, illustrated exemplarily under FIG. 08. There is also a loyalty program relation to a plurality of participating restaurants 597 that are linked to the marketing and service module 598 of the COOS 1 and special loyalty programs 599 and loyalty program events 600 linked to the loyalty program module 601 of the COOS 1 and a plurality of customizable non-specified loyalty programs, illustrated exemplarily as plurality of other non-specified 602 for which customizable modules are available 603. There is also a loyalty point management 604 linked to a loyalty point management platform 605 within the loyalty program module 601. Under the loyalty point management platform 605, member 575 users 578 can establish and manage a plurality of their own master loyalty points account and a plurality of sub member loyalty points accounts 606 and special project loyalty points accounts 607 linked to the respective member 575 users 578 accounts, illustrated exemplarily under FIG. 15, and make use of their respective loyalty points, illustrated exemplarily under FIG. 12. Within the loyalty point management platform 605, member 575 users 578 can use the customization functions 608 to customize activation, distribution and allocation, and usage of loyalty points involving a plurality of loyalty point accounts, including suspension and deletion of said loyalty point accounts. The COOS 1 allows for a plurality of sources of loyalty points. The COOS 1 allows for an automated delivery of loyalty points to member 575 users 578, based on the prevailing loyalty point allocation setting 609. Sources of loyalty points 610 are loyalty points from own personal consumptions 611 for orders placed at any participating restaurant, loyalty points derived from referrals 612 when member 575 users 578 refer 613 non-members 580 users 578 and those referred non-members 580 users 578 become members 507, and tombola granted loyalty points 614. Tombola granted loyalty points 614 derive from a self-governed tombola program 615 within the loyalty program module of the COOS 1, that automatically collects and allocates points 615 from paying walk-in non-referred non-member customers 580 who decide to become members 507. Such points are collected within the tombola program 616 within the loyalty program module of the COOS 1, and randomly distributed to active member 575 users 578 and their employing a customizable program structure that recognizes loyal member 575 users 578. The COOS 1 allows for additional loyalty point 617 sources to be added.

FIG. 12

Figure 12:
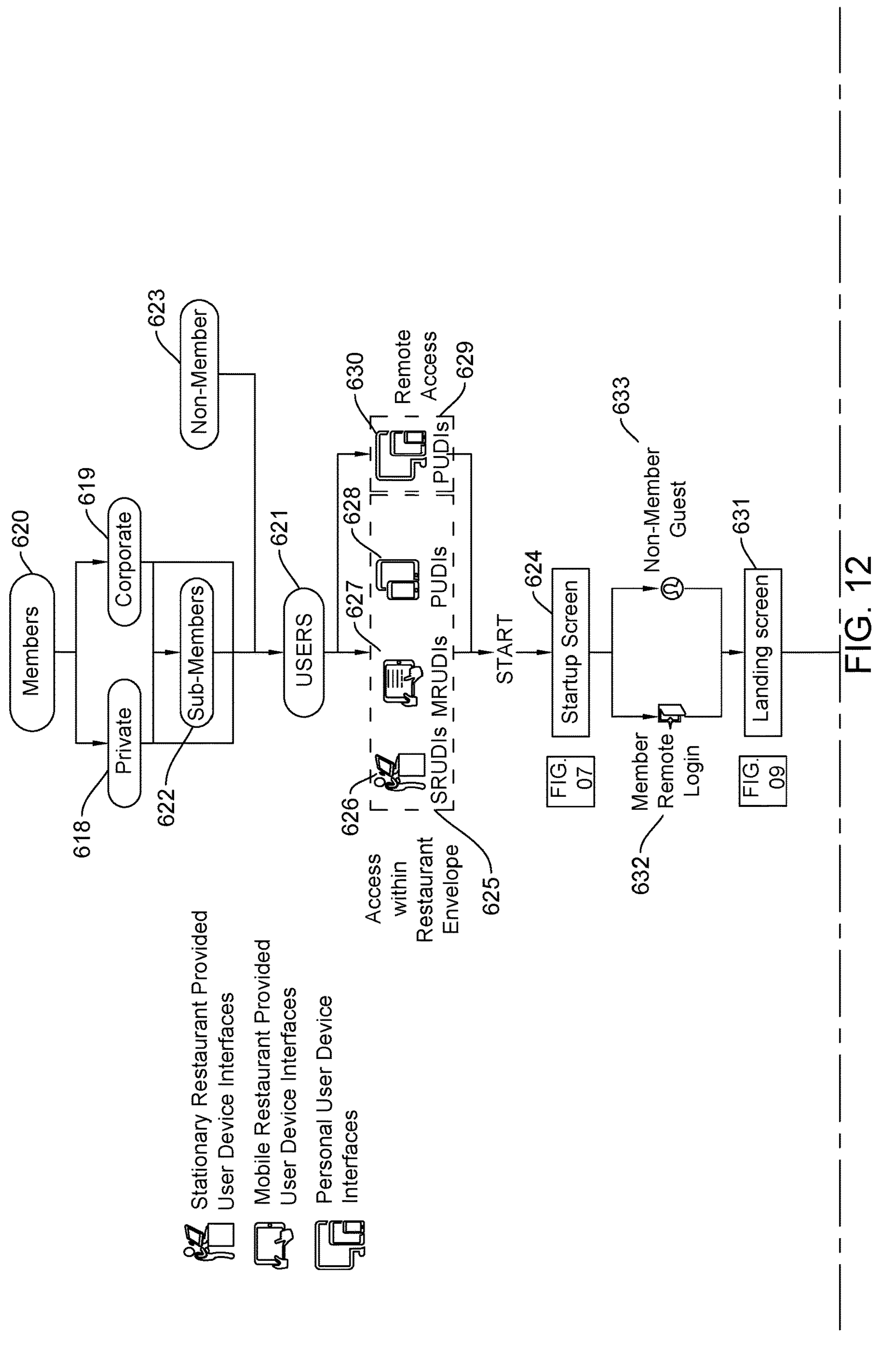
FIG. 12 illustrates a flow diagram of a member user loyalty services and products function tabs and of the landing screen illustrated exemplarily under FIG. 09 of the present invention of the CCOS 1 of the present invention of the CCOS 1.

Referring now to FIG. 12 illustrating a flow diagram of a member 620 user 621 loyalty services and products function tabs 634 and 635 of the CCOS 1. In operation in the illustrated flow diagram for a landing screen 631 of the present invention of the CCOS 1, the loyalty services and products function tab 634 and 635 is for private 618 and corporate 619 member 620 users 621 and their respective sub-members 622 users 621 only. Non-members 623 users 621 cannot use this function. Member 620 users 621 can access the startup screen 624 within a participating restaurant envelope 625 through the restaurant provided SRUDIs 626 and MRUDIs 627, and member 620 users 621 can also use their own PUDIs 628 within a participating restaurant envelope 625 to access the startup screen 624. Member 620 users 621 can access the startup screen 624, addressed under FIG. 07, from remote locations 629 using a plurality of PUDIs 630. To access to the landing screen 631, illustrated exemplarily under FIG. 09, member 620 users 621 must login 632 to receive a access. Non-member 623 users 621 are allowed as guests 633. In operation member 620 users 621 can select the loyalty service or loyalty product function tab 634 and 635 within horizontal scrollable member panel 636, illustrated exemplarily under FIG. 09. When a member 620 users 621 selects either the loyalty service 634 or loyalty products 635 function tab on the member panel 636, the CCOS 1 displays an interactive menu option 637 in filed F-2 allowing member 620 users 621 a plurality of options. When the restaurant option 638 is selected, field F-2 the displays in field F-2 changes, displaying a plurality of participating restaurants, illustrated exemplarily as restaurant 1 639, restaurant 2 640, and restaurant 3 641. A member 620 users 621 can select a single of plurality of restaurant 642, illustrated exemplarily as restaurant 2 643 and restaurant 3 644. When selecting a single to plurality of restaurants, the COOS 1 displays in field F-6 a vertical scrollable menu 645, showing the total number of loyalty points 646, and the total number of tombola loyalty points 647. Loyalty points 646 and tombola points 647 have different uses and values as maybe determined from time to time. The menu 645 displays also a plurality of selected restaurants, illustrated exemplarily as restaurant 2 648 and restaurant 3 469, and distinguishes between a plurality of inhouse related 650 loyalty services 651 and products 652, illustrated exemplarily for restaurant 2 648 specifying spa treatment 655 under loyalty services 653. Inhouse related 650 and third party provider 629 loyalty services 653 or loyalty products 654 can vary in scope and range, between restaurants, illustrated exemplarily for restaurant 3 656 offering a coffee product 657. The required or authorized use of loyalty points are also displayed (190 and 25), illustrated exemplarily by 658 and 659. Member 620 users 621 can make use of the loyalty points 646 and tombola loyalty points 647 to pay for a customer check within a participating restaurant, or for loyalty services and loyalty products 660. Member 620 users 621 can also select the compile/assign function tab 661 in field F-5 that allows member 620 users 621 to assign loyalty points 662. Upon selecting the compile/assign function tab 661, the CCOS 1 displays, illustrated exemplarily the relevant member 620 users 621 in field F-7 including the number of the currently accumulated loyalty points. The same display format applies for corporate 619 member 620 users 621. Member 620 users 621 can use a plurality of vertical scrollable designated function tabs in field F-8 to divide and assign 663 or assign loyalty points 664 to a single or plurality of member 620 users 621 who are displayed in field F-7, allowing for further instruction for general use 666 or specific use 667 by specifying the use for specific loyalty services, products or purposes 668. The recipient member 620 users 621 of said assigned loyalty points can accumulate the required loyalty points for later use 660. Member 620 users 621 can also make own use of loyalty points 669 by dividing and assigning 670 loyalty points, or assigning loyalty points 671 to a plurality of loyalty services 672 and loyalty products 673 and accumulate the required loyalty points for specific loyalty services, loyalty products, and purposes 674 for later or immediate use 660 including paying for customer check. When inside 675 a participating restaurant, illustrated exemplarily as restaurant 3 676, the same menu 645 display emerges in field F-2, with the difference that restaurant 3 676 is listed on top. All other scrollable menu 645 function including assigning loyalty points 662 and own use of loyalty points 669 functions and processes apply in the same way. The CCOS 1 provides member 620 users 621 a search 677 function in field F-2, that allows provides member 620 users 621 to specify in field F-9 a search by categories 678 and make a selection from a dropdown list in field F-10. There is also a specific category search function 679 in field F-9 that allows member 620 users 621 to specify the search in field F-10 by restaurants 680, third parties 681, loyalty services 682, loyalty products 683, and loyalty purposes 684. There is also a function in field F-2 that allows for the display of discount vouchers and other non-loyalty point benefits 685 in field F-3. The CCOS 1 allows for the adding of a plurality of other functions, illustrated exemplarily as a plurality of non-specific 686.

FIG. 13

Referring now to FIG. 13 illustrating a flow diagram of a member 689 user 690 crate my own function 703 of present invention of the CCOS 1. In operation in the illustrated flow diagram for a landing screen 700 of the present invention of the CCOS 1, the create my own function 703 is for private 687 and corporate 688 member 689 users 690 and their respective sub-members 691 only. Non-members 692 users 690 cannot use this function. Member 689 users 690 can access the startup screen 693 within a participating restaurant envelope 694 through the restaurant provided SRUDIs 695 and MRUDIs 696, and Member 689 users 690 can also use their PUDIs 697 within a participating restaurant envelope 694 to access the startup screen 693. Member 689 users 690 can access the startup screen 693, addressed under FIG. 07, from remote locations 698 using a plurality of PUDIs 699. To access to the landing screen 700, illustrated exemplarily under FIG. 09, member 689 users 690 must login 701 to receive a access. Non-members 692 are allowed as guests 702. In operation, the create my own function tab 703 on the member panel 704 allows private 618 and corporate 619 member 620 users 621 and their respective sub-members 622 a plurality of options 705 to proceed, illustrated exemplarily as option 1 706, option 2 707, and option 3 and 4 708. Upon selecting the create my own function tab 703, the CCOS 1 displays in field F-2 a plurality of standard menus from a plurality of participating restaurants, illustrated exemplarily as restaurant 1, restaurant 2, and restaurant 3 709, and aligns and displays a plurality of existing related personal menus, illustrated exemplarily as the personal menus of a family 710 beside a standard menu of the participating restaurant 3 709. Under option 1 706 an existing menu item can be selected 708 from a standard menu 709 or personal menu 710 to form the basis of a new menu item creation 724. A plurality of selected menu items 708 can be placed into a shortlist folder 711 displayed in field F-3, using the shortlist function illustrated exemplarily under FIG. 09/Ref 410 before making a final choice of shortlisted menu item 708. The shortlist folder allows for the compiling of a plurality of menu items 708 for consideration of customization. Customization is executed by selecting first the customize function tab 712, illustrated exemplarily under FIG. 09/462. When the customize function tab 712 is selected in combination with the create my own function 703, the CCOS 1 highlights the personal menus 710 in filed F-2, and a selection can be made for which single or plurality of personal menus the menu item can be created. When a selection is made, the CCOS 1 creates under the single or plurality of selected personal menus, illustrated exemplarily for all family members 721, a temporary menu item file within the selected personal menus 710 until the newly created menu item was saved 724. Customization 712 of a selected menu item 708 can be executed in a plurality of ways in no particular order. Illustrated exemplarily for this diagram is option 1 706, option 2 707, option 3 and 4 708. Applying option 1 706, a selected menu item 708 can be customized 712 choosing the exemplarily path 1 713, determining first the type of cuisine including flavour 714 displayed in field F-9, which includes also a plurality cuisine type flavour sub-categories, exemplarily organized for illustration purpose as country, region, and city 715 organized in a plurality of levels. Followed by selecting a single or plurality of key ingredients 716 which includes also a plurality of sub-categories for each main key ingredient, illustrated exemplarily for two level (L-1 and L-2) 717, which can be further extended to add specific ingredient and sub-ingredient options, as illustrated exemplarily under the ingredient inventory organization structure under FIG. 55. Or, proceed vice versa by selecting first a single or plurality of key ingredients, followed by selecting the cuisine flavour 718. This can be followed 719 by including and/or excluding a plurality of available health and wellness option functions under the health and wellness segment 720, with the possibility to make adjustments to any individual health and wellness functions during the selection process. The exemplarily path 2 721 allows to establish the health and wellness framework 720 first, with adjustments when desired, followed by 719, using the ingredient type options 716, and cuisine options 714 in no particular order. The exemplarily path 3 722 allows for the customization 712 of a selected menu item 708 without consideration of the cuisine options 714 and/or the key ingredient options 716 and/or health and wellness functions 720, using only the ingredient select and exchange menu option 723, illustrated exemplarily under FIG. 27. Option 2 allows for the creation of a menu item from scratch 724, by selecting the customize function 712 in field F-9, followed by composing the ingredients using the ingredient select and exchange menu 723, illustrated exemplarily under FIG. 27. Option 3 and 4 708, including path 4 725 allows to determine the cuisine flavour option 714, key ingredients 716 without consideration of the health and wellness options 720. A plurality of newly created and saved menu items 724 can also be put into a shortlist folder 727 displayed in filed F-3 using the shortlist function illustrated exemplarily under FIG. 09/Ref 410. It allows for the compiling of a plurality of newly created and saved menu items 724 before filing said menu items in a single or plurality of respective personal menus 721. Shortlisted menu items can also be deleted using the clear function, illustrated exemplarily under FIG. 09/Ref 414. For example, it allows a parent to create, save, and/or adjust a plurality of healthy menu items 724 for children or others, and place said menu item into the children's personal menus or special project menus like diet plans for an elderly or any other person. Menu items 728 can then be selected from a single or plurality of personal menus 721 and ordered 729 for dine-in 730, delivery 731, or collection 732 at the counter 733 or the 24 hour dispenser 734, including for home cooking 735.

FIG. 14

Figure 14:
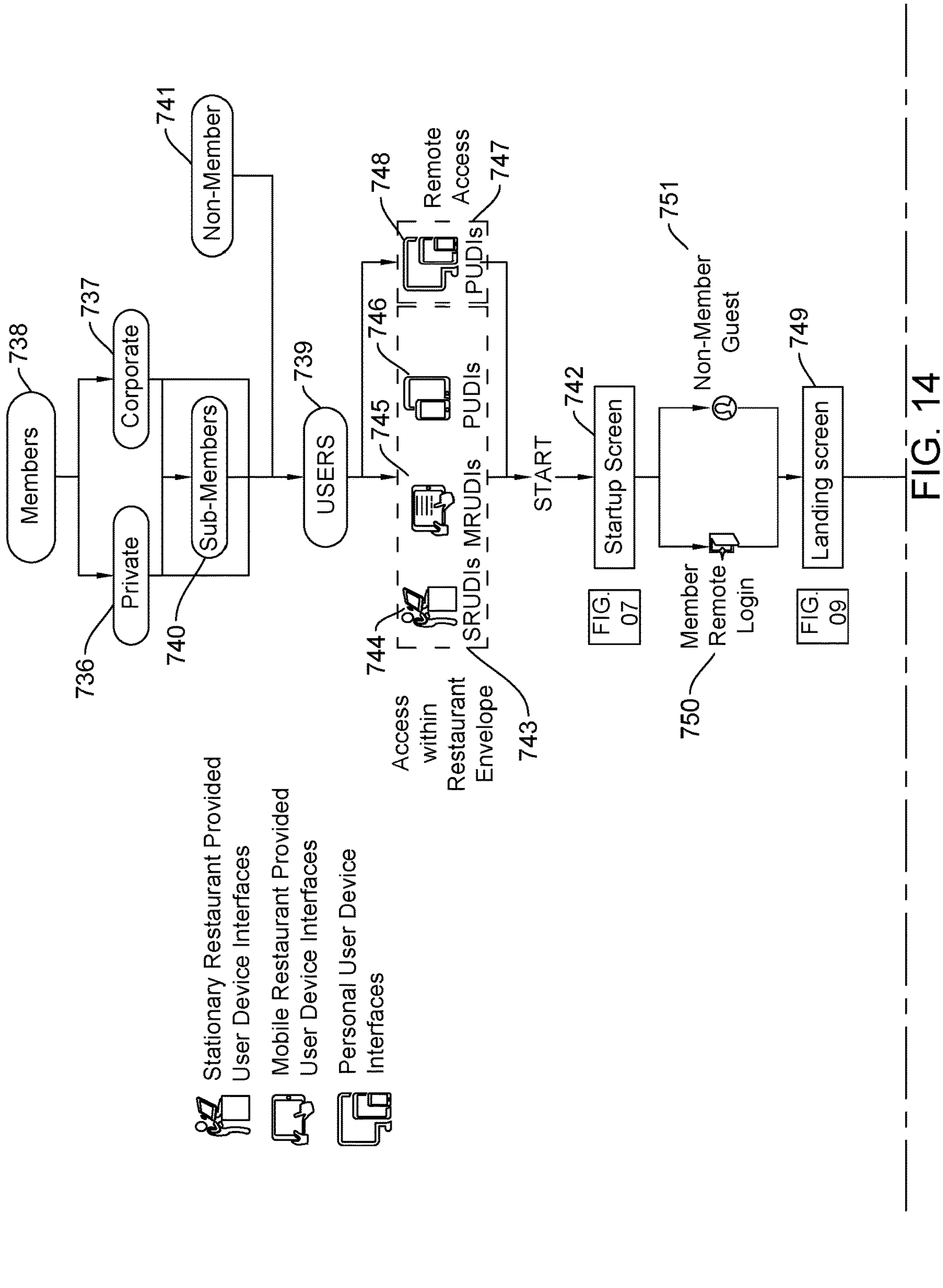
FIG. 14 illustrates a flow diagram of a member user communication function of the landing screen illustrated exemplarily under FIG. 09 of the present invention of the CCOS 1.

Referring now to FIG. 14 illustrating a flow diagram of a member 738 user 739 communication function 752 of present invention of the COOS 1. In operation in the illustrated flow diagram for a landing screen 749 of the present invention of the COOS 1, the member 738 communication function tab 752 is for private 736 and corporate 737 member 738 users 739 and their respective sub-members 740 only. Non-members 741 users 739 cannot use this function. member 738 user 739 can access the startup screen 742 within a participating restaurant envelope 743 through the restaurant provided SRUDIs 744 and MRUDIs 745, and member 738 user 739 can also use their own PUDIs 746 within a participating restaurant envelope 743 to access the startup screen 742. Member 738 user 739 can access the startup screen 742, addressed under FIG. 07, from remote locations 747 using a plurality of PUDIs 748. To access to the landing screen 749, illustrated exemplarily under FIG. 09, member 738 user 739 must login 750 to receive access. Non-members 741 are allowed as guests 751. In operation, when selecting the communication function tab 752 member 738 user 739 reach an option manual 754 in field F-2 displaying a plurality of sub function tabs, illustrated exemplarily as recommend a participating restaurant 755, let's get together 756, make a referral 757, and under a special section 758, submit a suggestions 759, submit a complaint 760. Further options can be added during customization, illustrated exemplarily as a plurality of non-specified as 761. There is also a search function 762. A plurality of special communications 758, illustrated exemplarily as 759, 760, and 761 can be executed by member 738 user 739 using a single template 763 from a plurality of available templates 764 displayed in filed F-9. The selected template is converted into an interactive virtual communication 765 displayed in field F-6. Simultaneously the COOS 1 generates a virtual keyboard 766 and captures the member 738 user 739 particulars and inserts said member 738 user 739 information 767 into the original virtual communication 765, including an alphanumeric reference code. Simultaneously, the COOS 1 displays an interactive list of possible reference subjects 768 from which a suitable reference subject can be selected and included. Based on the alphanumeric reference code the COOS 1 categorizes, organises, distributes, and establishes a response time and the internal communication protocol 770 in relation to the original communication 765, and directs the communication to the relevant departments 771 within the head office 772, representative or branch office 773, and the relevant participating restaurant 774. Simultaneously the COOS 1 establishes under the marketing and service module within the COOS 1 the relevant corresponding records 775 linked to the alphanumeric reference code of the original communication 765, including alphanumeric tracking reference number, and an interactive action list with distribution and attendance reference and confirmation fields, follow up sequence, and time report fields, response time analytics in form of a plurality of data and graphics, and links to the plurality of relevant internal communications 776 are also created and linked to the alphanumeric reference code of the original communication 765, allowing for a final response communication 777 in response to the original communication 765. In operation the COOS 1 allows for communication between members 738. Selecting one of the function tabs, illustrated exemplarily as recommend a participating restaurant 755, let's get together 756, make a referral 757, changes the display in field F-2, generating in field F-2 an interactive member 738 contact list 778 organized by family members 779, friends 780, colleagues 781, and non-member 741 contacts 872 to which member 738 user 739 can also import personal contacts, including visible member contacts 784 available within the COOS 1 member database in the membership module. An open member contact are contacts explicitly authorised to be made public by a member 738 user 739 for open listing. In operation, member 738 user 739 can select to recommend a single or plurality of participating restaurants 755, or arrange a get together 756 in a participating restaurant with other member 738 users 739 by selecting first a single or plurality of contacts from the contact list, illustrated exemplarily as 779, 780, 781, and 782, followed by creating a message 785, whereby a message can be created using a template from the plurality of message templates 786 in field F-3 787, or use the standard message format and create a personal message 788. In both cases, a virtual keyboard 789 emerges, and the COOS 1 generates a alphanumerical tracking reference when a message is created 785. A created message 785 can include a link to a single or plurality of menu items from a single or plurality of participating restaurants or personal menu items 790, with the option to limit the time and access 791. A location map 792 can be linked. When the function 790 or 793 is selected, the display in F-2 changes and the COOS 1 displays the participating restaurants and plurality of standard restaurant and personal menus, illustrated under FIG. 10 from were a selection can be made. Member 738 user 739 can also create a plurality of personal and formal virtual invitation cards 794 from available templates 795. The CCOS 1 allows for the adding of further functions, illustrated exemplarily as plurality of other non-specified options 796. Sending a message creates also a message record within the member 738 user 739 account, illustrated under FIG. 15. Member 738 user 739 can also send out standard referral messages 798 to non-members 741, with the option to add a personal message 788. For every referral message 798, the COOS 1 generates automatically an encrypted referral code 799 that is linked to the sending member 738 user 739 member ID and account, allowing the COOS 1 to recognize and record a referral as a successful referral when the referred non-member 741 becomes a member 738 user 739.

FIG. 15

Figure 15:
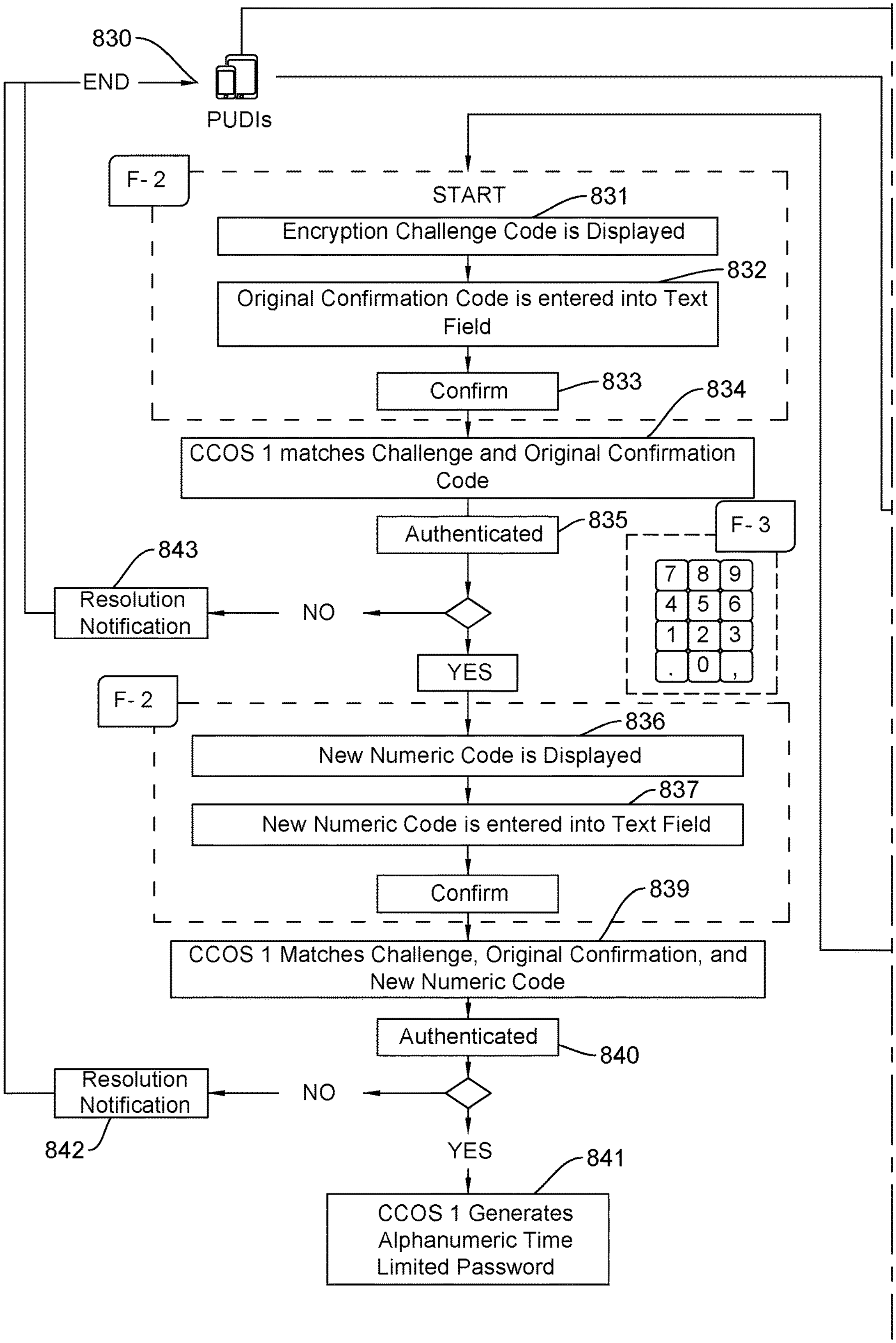
FIG. 15 illustrates a flow diagram of a member 802 user 803 account function tab 816 of the landing screen illustrated exemplarily under FIG. 09 of the present invention of the CCOS 1.

Referring now to FIG. 15 illustrating a flow diagram of a member 802 user 803 account function tab 816 of present invention of the COOS 1. In operation in the illustrated flow diagram for a landing screen 811, the member account function tab 816 is for private 800 and corporate 801 member 802 users 803 and their respective sub-members 804 only. Non-members 805 users 803 cannot use this function. Member 802 users 803 can access the startup screen 806 within a participating restaurant envelope 807 through the restaurant provided SRUDIs 808 and MRUDIs 809, and member 802 users 803 can also use their own PUDIs 810 within a participating restaurant envelope 807 to access the startup screen 806. Member 802 users 803 can access the startup screen 806, addressed under FIG. 07, from remote locations 812 using a plurality of PUDIs 813. To access to the landing screen 811, illustrated exemplarily under FIG. 09, member 802 users 803 must login 814 to receive a access. Non-members 805 are allowed as guests 815. In operation, member 802 users 803 can select the my account function tab 816 within horizontal scrollable member panel 817, illustrated exemplarily under FIG. 09. When the my account tab 816 is selected an account option manual 818 is displayed in field F-2, comprising of a plurality of functions tabs including first time authentication 819, setup and change personal password 820, and account management 846. Upon successful authentication, the COOS 1 also displays a plurality of shortcuts 821 under main customization 865, illustrated exemplarily as 866, 867, 868, 869, 870, 871, 872, 873, 874, 875, 876, 876, 877 878. In operation, the plurality of accounts are displayed in field F-9 and F-10 allowing existing private 800 and corporate 801 main account member 802 users 803 to establish a plurality of sub-members 804 accounts by completing and submitting sub-account membership applications 822 using the provided e-form 823, and submit 824 the e-form 823 for a review and approval process 825. If approved 826, the COOS 1 generates an encrypted alphanumeric challenge code and a readable confirmation code 827 and sends an invitation to the designated target PUDI 828 named in the e-form 823 of the sub-account membership application 822. Simultaneously, the COOS 1 establishes the generated encrypted alphanumeric challenge code and an original numeric confirmation code 827 for a customizable time limited authentication process. In operation the invitation authentication is executed by an invited sub-member 804 in two phases, using the original numeric confirmation code 827 as password for the login 814. On the account option manual 818 the first time authentication function tab 819 is selected. Field F-2 changes and displays the encrypted alphanumeric challenge code 831 and a free text field 832 is displayed. Phase one includes entering the original numeric confirmation code, using a numeric keypad that is displayed in field F-3. The function tab confirm 833 is activated. The COOS 1 executes an authentication protocol to match the challenge and original confirmation code 834. A successful authentication 835 results in the display of a new numeric code 836. An unsuccessful authentication 835 results in the CCOS 1 sending a resolution notification 843 to the designated PUDI 830, providing a plurality of resolutions. Phase two includes the entering of the new numeric code into a free text field 837, and the confirm function tab 838 is activated. The COOS 1 matches now the challenge code, the original numeric confirmation code, and the new numeric code 839. When successful authenticated 840 the CCOS 1 generates a new time limited alphanumeric password 841 that can be used for login 814. An unsuccessful authentication 835 results in the CCOS 1 sending a resolution notification 842 to the designated PUDI 830, providing a plurality of resolutions. Upon receipt of the alphanumeric time limited password 841 the new sub-member 804 is advised to use the change password function 820 to a personal password. CCOS 1 allows for plurality changes of a password. If not changed within a suggested time frame, the CCOS 1 sends reminders to the designated PUDI 830. If password is still not changed, CCOS 1 suspends the account until the password is changed. If no first time authentication attempted 844 is made within a specified time frame after receiving an invitation 827 the CCOS 1 automatically deletes 845 the account with prior notification to the applicant. In operation, member 802 users 803 can use the account management function tab 846 in filed F-2 to manage their respective accounts. The CCOS 1 allows for a plurality of Member 802 users 803 accounts, illustrated exemplarily as a private family member account 847 and a corporate member account 848. Private single member accounts 849 can also be established following the same principle. A typical private member family account 847 consists of a single main account 850, illustrated exemplarily as a fathers 851 main account 850, and a plurality of sub-member accounts 852, illustrated exemplarily for a mother 853 and two children 854 and 855. Further sub-member accounts 852 can be added, illustrated exemplarily as 856. Private member accounts can be established using at first the member application, illustrated under FIG. 07. Under a private member family account 847, the main account holder 850 and the plurality of sub-member 804 account holder 863, 854, 855, 856 can personalize 857 their individual accounts 851, 853, 854, 855, 856 by uploading a personal picture 858 that will be reflected on a plurality of function tabs and screen displays after login in 814. The main account holder 850 and the plurality of sub-member 804 account holder 853, 854, 855, 856 can proceed to establish and customize a plurality of personal health and wellness settings in filed F-6, using the personal customization function 857, by uploading a personal picture and providing base data 858, illustrated exemplarily under FIG. 16, establish personal kcal and nutrition objectives and requirements 859, illustrated exemplarily under FIG. 17, establish personal portion settings 860, illustrated exemplarily under FIG. 18, establish personal diabetic settings 861, illustrated exemplarily under FIG. 19, establish a plurality of personal budget targets 862, illustrated exemplarily under FIG. 21, establish personal allergy settings 863, illustrated exemplarily under FIG. 21. The CCOS 1 allows for a plurality of other customizable health and wellness functions to be added, illustrated exemplarily as plurality of customizable functions 864. The main account holder 850 have the authority to use the main customization function 865 to activate, suspend, and delete a main and a plurality of sub-accounts 866, to set and administer budget allowances for a main and a plurality of sub-accounts 867, to set and administer time based and use limitations for a main and a plurality of sub-accounts 868, to set and administer the loyalty point distribution for a main and a plurality of sub-accounts 869, to set and administer the loyalty point use for a main and a plurality of sub-accounts 870, to set and administer the payment setup for a main and a plurality of sub-accounts 871, including a autopay function, to set and administer the selection, activation and suspension for a plurality of personal menus for a main and a plurality of sub-accounts 872, to set and administer the selection, activation and suspension for a plurality of personal menu items for a main and a plurality of sub-accounts 873, to set and administer the selection, activation and suspension for a plurality of restaurant menus for a main and a plurality of sub-accounts 874, and to set and administer the selection, activation and suspension for a plurality of participating restaurant menu items for a main and a plurality of sub-accounts 872. The COOS 1 allows for a plurality of other customizable functions to be added, illustrated exemplarily as plurality of customizable functions 876. A main account holder 850 can add a plurality of sub-accounts 877 through the application process 822. A main account holder 850 can also use the special project tool 878 to add, administer, and delete a plurality of special project accounts 879, illustrated exemplarily as eastern 880 and Christmas 881. A main account holder 850 can give limited autonomy to a plurality of sub-members 804 using the authorization function 882 for a plurality of main customizations 865, illustrated exemplarily for 871, 872, 873, 874, 875, 876, 879. A corporate member account 883 with its authorized director account 885 are displayed in field F-9, and the plurality of employees sub-accounts are displayed in field F-10, allowing for a single main account 883 for a corporation, illustrated exemplarily by a corporation's logo 884, and an authorized administrator being an authorized director 885, who can establish and administers a plurality of sub-member employee accounts 886, illustrated exemplarily as employee 1 to 5 887, 888, 889, 890, 891. Further sub-member accounts 886 can be added, illustrated exemplarily as 892. Corporate accounts can be established using the member application, illustrated under FIG. 07, but require additional documentation. The authorized director 885 and the plurality of sub-member account holders 887, 888, 889, 890, 891 can customize 893 their individual accounts 887, 888, 889, 890, 891 uploading a personal picture 894 that will be reflected on a plurality of function tabs and screen displays after login in 814. The authorized director 885 and the plurality of sub-member account holders 887, 888, 889, 890, 891 can establish and customize a plurality of personal health and wellness settings in field F-6, using the personal customization function 893, uploading a personal picture and providing base data 894, illustrated exemplarily under FIG. 16, establish personal kcal and nutrition objectives and requirements 895, illustrated exemplarily under FIG. 17, establish personal portion settings 896, illustrated exemplarily under FIG. 18, establish personal diabetic settings 897, illustrated exemplarily under FIG. 19, establish a plurality of general employee and personal budget targets 898, illustrated exemplarily under FIG. 20. establish personal allergy settings 899, illustrated exemplarily under FIG. 21. The COOS 1 allows for a plurality of other customizable health and wellness functions to be added, illustrated exemplarily as plurality of customizable functions 900. A authorized director 885 can give limited autonomy to a plurality of sub-members using the authorization function 901 for a plurality of main customization functions 865 to activate, suspend, and delete a main and a plurality of sub-accounts 866, to set and administer budget allowances for a main and a plurality of sub-accounts 867, to set and administer time based use limitations for a main and a plurality of sub-accounts 868, to set and administer the loyalty point distribution for a main and a plurality of sub-accounts 869, to set and administer the loyalty point use for a main and a plurality of sub-accounts 870, to set and administer the payment setup for a main and a plurality of sub-accounts 871, to set and administer the selection, activation and suspension for a plurality of personal menus for a main and a plurality of sub-accounts 872, to set and administer the selection, activation and suspension for a plurality of personal menu items for a main and a plurality of sub-accounts 873, to set and administer the selection, activation and suspension for a plurality of restaurant menus for a main and a plurality of sub-accounts 874, and to set and administer the selection, activation and suspension for a plurality of participating restaurant menu items for a main and a plurality of sub-accounts 872. The COOS 1 allows for a plurality of other customizable functions to be added, illustrated exemplarily as plurality of customizable functions 876. A main account holder 850 can add a plurality of sub-accounts 877 through the application process 822. The authorized director 885 can also use the special project tool 878 to add, administer, and delete a plurality of special project accounts 879, illustrated exemplarily as eastern 880 and Christmas 881. A authorized director 885 can give limited autonomy to a plurality of sub-members 887, 888, 889, 890, 891 using the authorization function 882 for a plurality of main customizations 865, illustrated exemplarily for 871, 872, 873, 879.

FIG. 16

Figure 16:
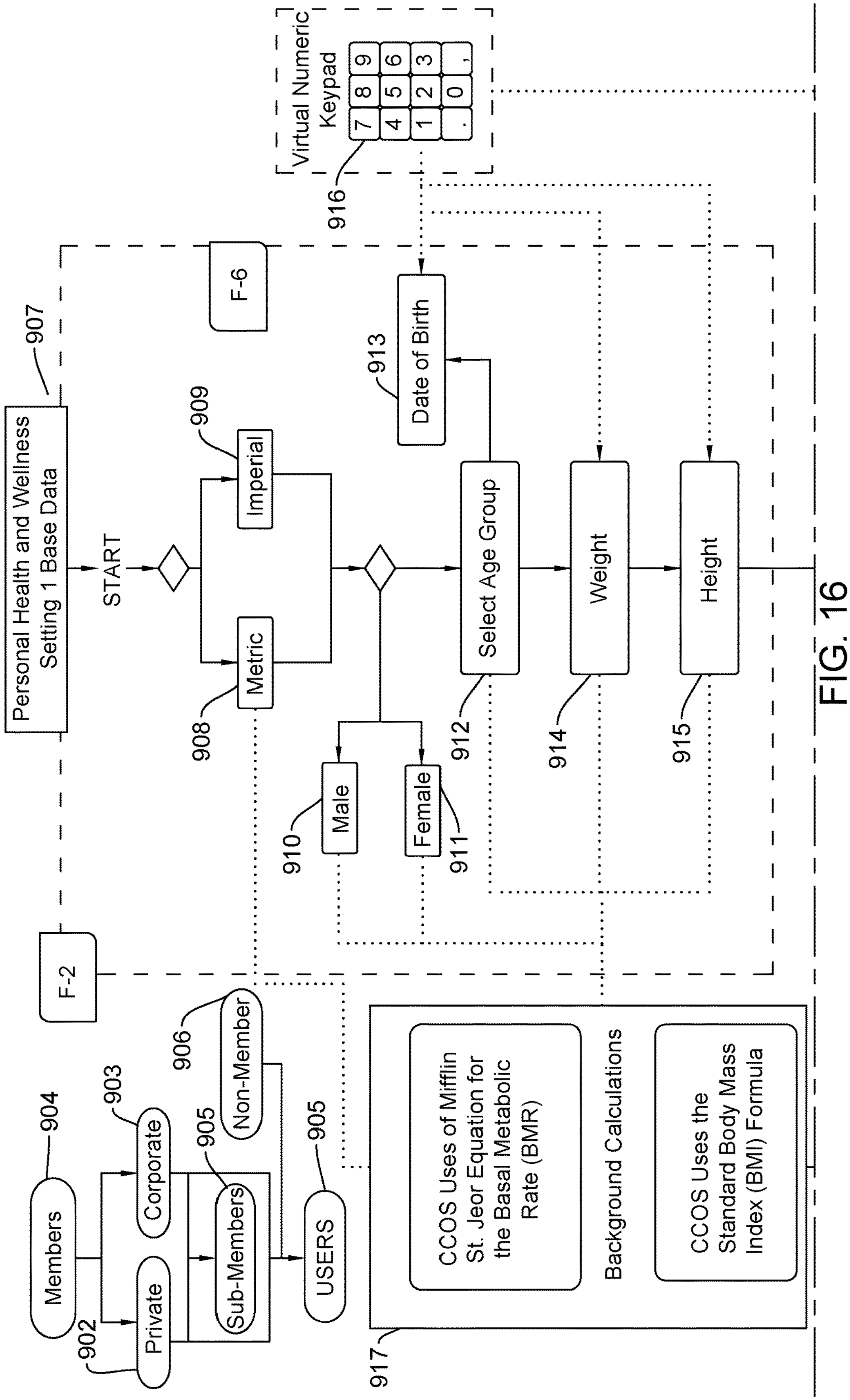
FIG. 16 illustrates a flow diagram of personal health and wellness setting 1 involving a plurality of base data of the landing screen illustrated exemplarily under FIG. 09 of the present invention of the COOS 1.

Referring now to FIG. 16 illustrating a flow diagram of personal health and wellness setting 1 involving a plurality of base data 907 of the CCOS 1. In operation private 902 and corporate 903 member 904 users 905 and their respective sub-members 905 can provide their base data in filed F-6 that the CCOS 1 will apply to a plurality of calculations and algorithms that will be applied to a plurality of health and wellness functions under the health and wellness module within the CCOS 1. Non-members 906 users 905 are only able to use the standard functions under the health and wellness segment, illustrated under FIG. 09/REF:383. The base data provided in field F-6 establishes the personal reference data, comprising of the selection between metric 908 or imperial measurements 909, followed by selecting the gender, male 910 or female 911, followed by giving the age group 912, with option to enter the date of birth 913, weight 914 and height 915, using a virtual numeric keypad 916 in filed F-10. When the date of birth 913 option is used, the age group 912 is displayed automatically. The CCOS 1, using within the health and wellness module established and recognized standards and calculations 917 to establish the prevailing BMI 918 and the current BMR 919, displayed in field 838. Member 904 users 905 can then select in field F-9 the BMI target function tab 920 and enter manually a personal target BMI 921, select the BMR target function tab 922, and enter manually the personal target BMR 923, also using the visual numeric keypad. When selecting the target weight function tab 824 a target weight 924 can be entered manually, using also the virtual numeric keypad 916 in field F-10. Using an interactive sliding tool 926 in field F-7 member 904 users 905 can establish their own current physical activity level PAL 927, illustrated exemplarily as PAL of 1.7 928. The CCOS 1, takes the age 912, weight 914, height 915, current BMI 918, current BMR 919, the target BMI 921, the target BMR 923, and the target weight 925 into consideration for its background calculation 917. The physical activity tool displays also a second activity pointer 929 with the suggested PAL goal, illustrated exemplarily as 1.85 930. The current pointer 928 cannot move as it establishes the current situation. The second pointer 929 can be move to increase or decrease the activity level 930 and confirmed 931 to set a goal. The relevant PAL data visible in the sliding tool in field F-7 is drawn from a plurality of reference data within the health and wellness module within the CCOS 1, illustrated exemplarily as 936, 937, 938 with guiding text information visible member 904 users 905 in field F-4, illustrated exemplarily as 939, 940, 941. The CCOS 1 allows member 904 users 905 a plurality of options to use current 932 data. When use current data 932 is selected the CCOS 1 executes calculations and displays a personal chart 935 in the combined fields F-6 and F-7 based on the age 912, current weight 914, current height 915, current BMI 918, current BMR 919, and the current activity level 928. When use target data 933 is selected the CCOS 1 executes calculations and displays a personal chart 935 in the combined fields F-6 and F-7 based on the age 912, current weight 914, target weight 914, height 915, current BMI 918, current BMR 919, target BMI 918, target BMR 919, and the target PAL 930. When use both 934 is selected, the CCOS 1 executes calculations and combines both data 932 and 933 to arrive at an achievable goal, and reflect the result in a personal chart 935 in the combined fields F-6 and F-7. A toggle function tab 942 in field F-3 allows to toggle between the three options 932, 933, 934, and the center information field 943 can be shown or hidden. The personal chart 935 reflects the plurality of general and recommended daily kcal (calorie) consumptions based on age groups, displaying the kcal (calorie) in a vertical display 944, and in a horizontal display the numerical indicators for the relevant age groups 845 with linear indicators to provide visual assistance. There are also a plurality of personal line indicators, illustrated exemplarily as a gain weight indicator 946, a maintain weight indicator 947, and a lose weight indicator 948. The center display 943 reflects the respective data in text and numerical format. When member 904 users 905 have completed the wellness and health setting 2 and 3 for nutrition and portioning, illustrated exemplarily under FIG. 17 and FIG. 18, the CCOS 1 displays also the relevant daily nutrition consumption tabs in field F-4, reflecting on the face of a plurality of information function tabs the relevant prevailing guideline amounts, illustrated exemplarily as energy/calories 2500 949, protein 60 gram 950, good fat 87 gram 951, saturated fatty acids 25 gram 952, carbohydrates 303 gram 953, sugars 6 gram 954, sodium 1.7 gram 955, dietary fibre 75 gram 956, and a plurality of additional information, exemplarily represented by non-specified 00 gram 957. Adjustments to the said daily nutrition amounts can be made by selecting a particular function tab (e.g. sugars) 954, and the merged display F-6 and F-7 changes into a two part display, showing the reduced graphic in field F-7, and in field F-6 the display, illustrated exemplarily under FIG. 17/1014, to allow for manual adjustment of the sugar 954 intake. Selecting in field F-3 either the gain weight function tab 958, the maintain weight function tab 959, or the lose weight function tab 960, the CCOS 1 will recalculate, adjust, and display the relevant guideline amounts, considering the member 904 users 905 plurality of provided data, and displays the adjusted amounts for the shown categories 949, 950, 951, 952, 953, 954, 955, 956, and 957.

FIG. 17

Figure 17:
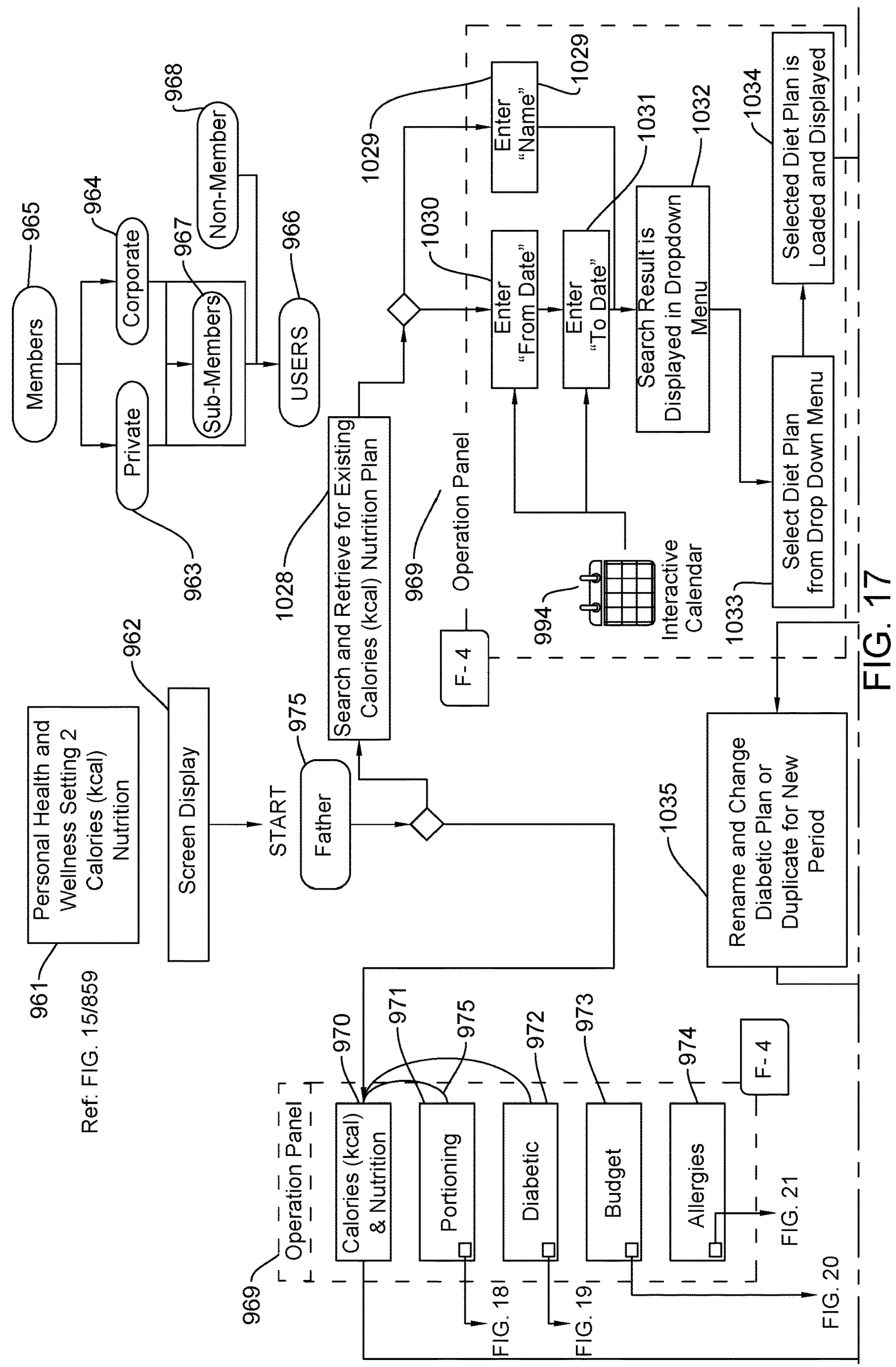
FIG. 17 illustrates a diagram of the calories (kcal) and nutrition function of the landing screen illustrated exemplarily under FIG. 09 of the present invention of the CCOS 1.

Referring now to FIG. 17 illustrating a diagram of the calories (kcal) and nutrition function 961 of the CCOS 1. In operation, private 963 and corporate 964 member 965 users 966 and their respective sub-members 967 can customize the estimated average requirement (EAR) for calories (kcal) and a plurality of nutrition for a plurality of menu items to meet their personal calories (kcal) and nutrition goals, necessities and requirements. Non-members 968 cannot use this function. When the calories (kcal) and nutrition function tab 961 is selected, the CCOS 1 brings the member 965 users 966 to a screen display, indicated as 962. On the operation panel 969 are a plurality of function tab, illustrated exemplarily as calories (kcal) and nutrition 970, a portioning function tab 971, illustrated exemplarily under FIG. 18, a diabetic function tab 972, illustrated exemplarily under FIG. 19, a budget tab 973, illustrated exemplarily under FIG. 20, and an allergy function tab 974, illustrated exemplarily under FIG. 21. The functions calorie (kcal) and nutrition 970, portioning function 971, and diabetic function 972 can be linked 975 so member 965 users 966 can receive more comprehensive information. To start the creation of a personal new diet plan, member 965 users 966, illustrated exemplarily being a father 975 who is the private 963 member 965 family member account holder, activates in field F-4 the calorie (kcal) and nutrition function tab 970. A plurality of member icon representations 976, illustrated exemplarily comprising of the father 977 being the private 963 member 965 account holder, with the mother 978 and two children 979 and 980 the sub-member 967 account holders are displayed in field F-6. The source data 981 is drawn from the relevant data, illustrated exemplarily under FIG. 15. A member icon representation is selected 982, illustrated exemplarily for child 2 980 for whom a diet plan is to be created, or a search for an existing diet plan 1028 is to be initiated. The selected member icon representation 982 for child 2 980 is identified by a colored frame 983. When the member icon for child 2 980 was selected, the estimated average requirements (EAR) calorie (kcal) daily requirements 984 for child 2 980 is displayed in field F-10. The source data 985 is drawn from the results of the base data, illustrated exemplarily under FIG. 16. Simultaneously, a calorie (kcal) and nutrition menu 986 is generated and displayed in field F-2, displaying the numerical estimated average requirements (EAR) for calorie (kcal) 987 and plurality of nutrition 988, including the numerical daily reference nutrition intake (RNI) 988 for child 2 980 that is adequate to ensure that child 2 980 daily reference requirements are met. The source of data (EAR) and (RNI) derives from the ingredient module within the COOS 1 989, and the personal base data for child 2 980 derives from the plurality of data provided under FIG. 16, with the results and calculations executed under the health and wellness module 990 of the COOS 1. In operation, the diet plan form child 2 980 is created by entering a new name for the diet plan into a text field 991 using a virtual keyboard 992, and a single or plurality of days 993 selected, using an interactive calendar 994 in field F-4, and the name and date or dates are confirmed 995, resulting in the establishment of a blank diet plan 996 within childs 2 908 sub-member 967 account, awaiting further completion and saving 1026. The diet plan can now be further customized, specifying the calorie (kcal) for a single or plurality of mealtime categories displayed in field F-9 997 by selecting (moving) a single or plurality of mealtime categories from in field F-9 to field F-10 998, and further select a single mealtime category 999, which is then highlighted 1000, and the calorie (kcal) and nutrition menu 986 changes from displaying daily EAR 987, to display now the EAR for the highlighted mealtime category 1000. Customization of selected and highlighted mealtime categories 1002, illustrated exemplarily as a lunch mealtime 1003 is executed by tapping on the arrows to decrease 1004 or increase 1005 the calorie (kcal). The EAR for a selected mealtime category is displayed 1006, and is automatically updated to ADJ, including a color background change when changes to the EAR are made to convey a clear distinction between EAR and ADJ. If no changes are made to the EAR, the EAR in field F-2 remain unchanged 1007. If calories (kcal) adjustments were made a second column is created in field F-2 1008 showing the adjusted total calorie (kcal) intake under a heading ADJ. The relevant EAR and RNI for a plurality of nutritions are updated 1009 in line with pre-established plurality of calculations based on the reference data available and drawn from the health and wellness module 990. The diet plan can be further customized 1010 making adjustments to individual EAR for a plurality of nutritions in field F-2. Making adjustments to a plurality of nutrition intakes 1010 is executed by selecting a single nutrition category 1011 for customization. The selected nutrition category is highlighted 1012. The COOS 1 provides for a summary educational information 1013. When a nutrition category is highlighted 1012 an interactive adjustment tool, illustrated exemplarily for carbohydrate intake 1014 is displayed in field F-6. It allows for the manual slider adjustment 1015 to increase 1016 or decrease 1017 the EAR level 1018 resulting in an ADJ level 1019. The numeric EAR level 1020 and ADJ level 1021 is shown. Guiding text information are displayed 1022 for calorie (kcal) and a plurality of nutritions to assist with the adjustments. Confirming 1023 creates a second column in field F-2 1008 showing the adjusted nutrition intake under a heading ADJ. The relevant EAR and RNI for a plurality of nutritions are updated 1024 in line with pre-established plurality of calculations based on the reference data available and drawn from the health and wellness module 990. When no nutrition intake adjustment is made, the EAR and RNI intake intake amounts in field F-2 remain unchanged 1025. When executing the save function 1026, the newly created diet plan 1027 overwrites the blank calories diet plan 996. In operation, the CCOS 1 allows for the searching and retrieving of existing diet plans 1028. Retrieving an existing diet plans can be executed within the operation panel in field F-4 by entering a known dietplan name 1029, providing for a suggestion dropdown function. Retrieving an existing diet plans can also be executed by way of single date 1030, or date range 1030 and 1031, using the interactive calendar 994. A search result is compiled in an interactive dropdown menu 1032 from which a particular diet plan can be selected 1033. When selected, the diet plan is loaded and displayed 1034. A retrieved diet plan can be renamed and duplicate 1035 using all existing setup parameters, or changes can be made, illustrated exemplarily as 1036, 1037, and 1038, and changes to the base data can be made 1039. A retrieved diet plan can also be deleted by the delete function tab 1040. An active diet plan can also be reset 1041 to its original EAR setting. The suggest safe intake function tab 1042, results in the CCOS 1 adjusting the calorie (kcal) and plurality of nutritions to suggestions applying pre-established plurality of calculations based on the reference data available and drawn from the health and wellness module 990 that are based on the provided base data under FIG. 16. The function tab 1043 changes the screen display to the screen display of FIG. 16 to allow changing the base data. A plurality of additional categories that can be added during customization, illustrated exemplarily as 1044.

FIG. 18

Figure 18:
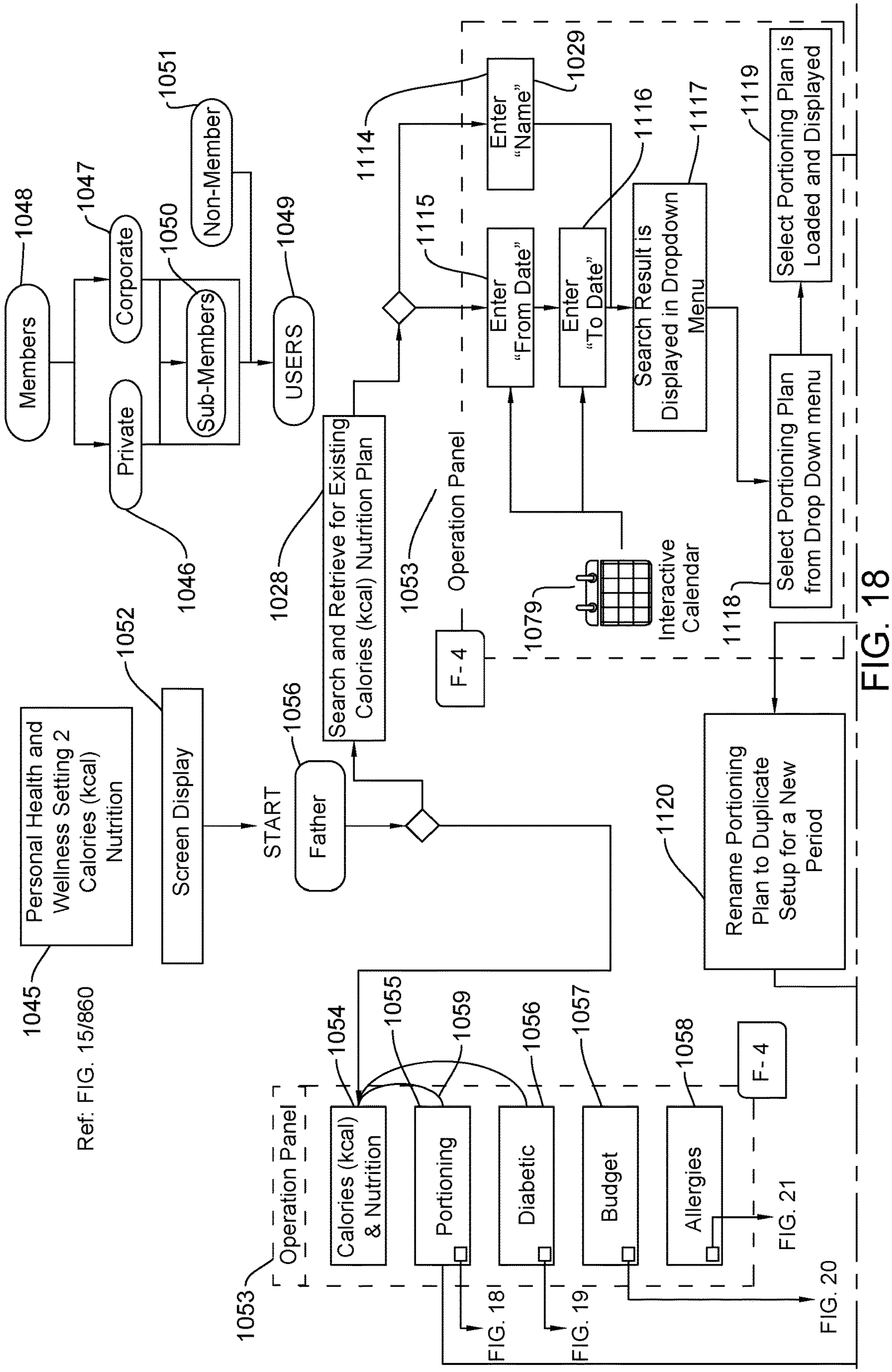
FIG. 18 illustrates a diagram of the portionings function of the landing screen illustrated exemplarily under FIG. 09 of the present invention of the CCOS 1.

Referring now to FIG. 18 illustrating a diagram of the portionings function 1045 of present invention of the CCOS 1. In operation, private 1046 and corporate 1047 member 1048 users 1049 and their respective sub-members 1050 can customize the estimated average requirement (EAR) by way of portioning for a plurality of menu items to meet their personal dietary goals, necessities and/or requirements. Non-members 1051 cannot use this function. When the portionings function tab 1045, also illustrated under FIG. 22 is selected, the CCOS 1 brings the member 1048 users 1049 to a screen display, indicated as 1052. On the operation panel 1053 are a plurality of function tab, illustrated exemplarily as calorie (kcal) and nutrition 1054, illustrated exemplarily under FIG. 17, a portioning function tab 1055, illustrated exemplarily under FIG. 18, a diabetic function tab 1056, illustrated exemplarily under FIG. 19, a budget tab 1057, illustrated exemplarily under FIG. 20, and an allergy function tab 1058, illustrated exemplarily under FIG. 21. For visual reference, the functions calories (kcal) and nutrition function 1054, portioning function 1055, and diabetic function 1056 can be linked 1059 so member 1048 users 1049 can receive more comprehensive information. To start the creation of a personal new portioning diet plan, member 1048 users 1049, illustrated exemplarily being a father 1060 who is the private 1046 member 1048 family member account holder, activates in field F-4 the portioning function tab 1055. A plurality of member icon representations 1061, illustrated exemplarily comprising of the father 1062 being the private 1046 member 1048 account holder, with the mother 1063 and two children 1064 and 1065 are the sub-member 1050 account holders displayed in field F-6. The source data 1066 is drawn exemplarily from FIG. 15/Ref 851, 853, 584, 855. A member icon representation is selected and identified 1067, illustrated exemplarily for child 2 1065 for whom a portioning diet plan is to be created, or a search for an existing portioning diet plan 1113 is to be initiated. The selected member icon representation for child 2 1065 is identified by a colored frame 1068. When the member icon for child 2 1065 is selected, the estimated average requirements (EAR) for daily calorie (kcal) requirements 1069 for child 2 1065 is displayed in field F-10. The source data 1070 is drawn from the results of the base data under FIG. 16. Simultaneously, a portioning menu 1071 is generated and displays in field F-2 the numerical estimated average requirements (EAR) for daily calorie (kcal) 1072 and the daily reference nutrition intake (RNI) of portioning 1073 for child 2 1065 that is adequate to ensure that child 2 1065 daily reference requirements are met. The source of data (EAR) and (RNI) derives from the ingredient module 1074 within the COOS 1, and the personal base data for child 2 1065 derives from the plurality of source data 1066 provided under FIG. 16, with the relevant calculations executed under the health and wellness module 1075 within the COOS 1. In operation, the diet plan form child 2 1065 is created by entering a new name for the diet plan into a text field 1076 using a virtual keyboard 1077, and a single or plurality of days 1078 is selected, using an interactive calendar 1079 in field F-4, and the name and date, or dates are confirmed 1080, resulting in the establishment of a blank portioning diet plan 1081 within childs 2 1065 sub-member 1050 account, awaiting further completion and saving 1111 in field F-4. The portioning diet plan can now be further customized, specifying the portioning for a single or plurality of mealtime categories displayed in field F-9 1082 by selecting (moving) a single or plurality of mealtime categories from in field F-9 to field F-10 1083, and further select a single mealtime category 1084, which is then highlighted 1085, resulting in a change in the portioning menu 1071 from displaying the daily EAR 1072, to the EAR for the highlighted mealtime category 1086. Customization of a highlighted mealtime categories 1087, illustrated exemplarily as a lunch mealtime 1088 meal category is executed by tapping on the arrows to decrease 1089 or increase 1090 the calorie (kcal). The EAR for a selected mealtime category is initially displayed 1091, but changes to ADJ when the EAR is adjusted, including a change in the background color to convey a clear distinction between EAR and ADJ. If no changes are made to the EAR, the EAR reflected in field F-2 remain unchanged 1092. If EAR calories (kcal) adjustments were made, a second column in the portion menu 1071 in field F-2 1093 is created, showing next to the EAR the adjusted ADJ in line with pre-established plurality of calculations based on the prevailing reference data available and drawn from the health and wellness module 1075. The portioning diet plan can be further customized making adjustments to individual dietary portions for the highlighted mealtime category 1085. Making adjustments to a plurality of dietary portions is executed by selecting a single dietary portion 1094 within an interactive dietary portioning graph tool 1095 displayed in field F-7, displaying initially a plurality of portioning columns that reflect the relevant EARs complete with numerical and colored icon indicators. The relevant guiding text information 1096 displayed in field F-3. The selected dietary portion within interactive dietary portioning graph tool 1095 is highlighted 1097. The Initial display of the interactive dietary portioning graph tool 1095 comprising of a plurality of categories, including carbohydrates, protein, sugars, total fat, saturated fat, sodium, dietary fibre is linked to the nutrition type function tab 1098 in field F-51F-8. The display of the interactive dietary portioning graph tool 1095 can be changed in field F-5/F-8, selecting the ingredient type function tab 1099, resulting in the display of startchy carbs, vegetables, protein, fruit etc. A plurality of additional nutrition type categories 1098 can be added during customization, illustrated exemplarily as 1100. The COOS 1 provides for a summary educational information 1101 relevant to the dietary portioning. When a dietary portion is in the highlighted 1097 within the interactive dietary portioning graph tool 1095, an interactive adjustment tool 1102 is displayed in field F-7, illustrated exemplarily as 1103. It provides for dual functions. Portions can be individually adjusted 1104 by selecting a quick portion icon, illustrated exemplarily as 1105 to increase or decrease a selected dietary portion, or the plus 1106 and minus 1107 function tabs can be used to increase or decrease the selected dietary portion. The interactive dietary portioning graph tool 1095 updated automatically, and guiding text information for each selected dietary portion in displayed 1096 in field F-3. If adjustments to portions are made, confirming 1108 creates a second column in the portioning menu 1071 in field F-2 1109 showing the adjusted ADJ intakes. The ADJ is updated in line with pre-established plurality of calculations based on the reference data available and drawn from the health and wellness module 1075. When no adjustment is made, the EAR in the portion menu 1071 in field F-2 remains unchanged 1110. When executing the save function 1111 in field F-4, the newly created portioning diet plan 1112 overwrites the blank portioning diet plan 1081. In operation, the CCOS 1 allows for the searching and retrieving of existing diet plans 1113. Retrieving an existing diet plans can be executed within the operation panel in field F-4 by entering a known dietplan name 1114, a suggestion dropdown function is provided. Retrieving an existing diet plans can also be executed by way of single date 1115, or date range 1115 and 1116, using the interactive calendar 1079. A search result is compiled in an interactive dropdown menu 1117 from which a particular diet plan can be selected 1118. When selected, the diet plan is loaded and displayed 1119. A retrieved diet plan can be renamed and duplicate 1120 using all existing setup parameters, or changes can be made, illustrated exemplarily as 1121, 1122, and 1123, and changes to the base data can be made 1124. A retrieved diet plan can also be deleted by the delete function tab 1125. An active portioning diet plan can also be reset 1126 to its original EAR setting. The suggest safe intake function tab 1127, results in the CCOS 1 adjusting the calorie (kcal) portioning to suggestions applying pre-established plurality of calculations based on the reference data available and drawn from the health and wellness module 1075 that are based on the provided base data under FIG. 16. The function tab 1128 changes the screen display to the screen display of FIG. 16 to allow changing the base data. A plurality of additional categories can be added during customization including vitamin and mineral specific categories, illustrated exemplarily as non-specified 1129 and 1130.

FIG. 19

Figure 19:
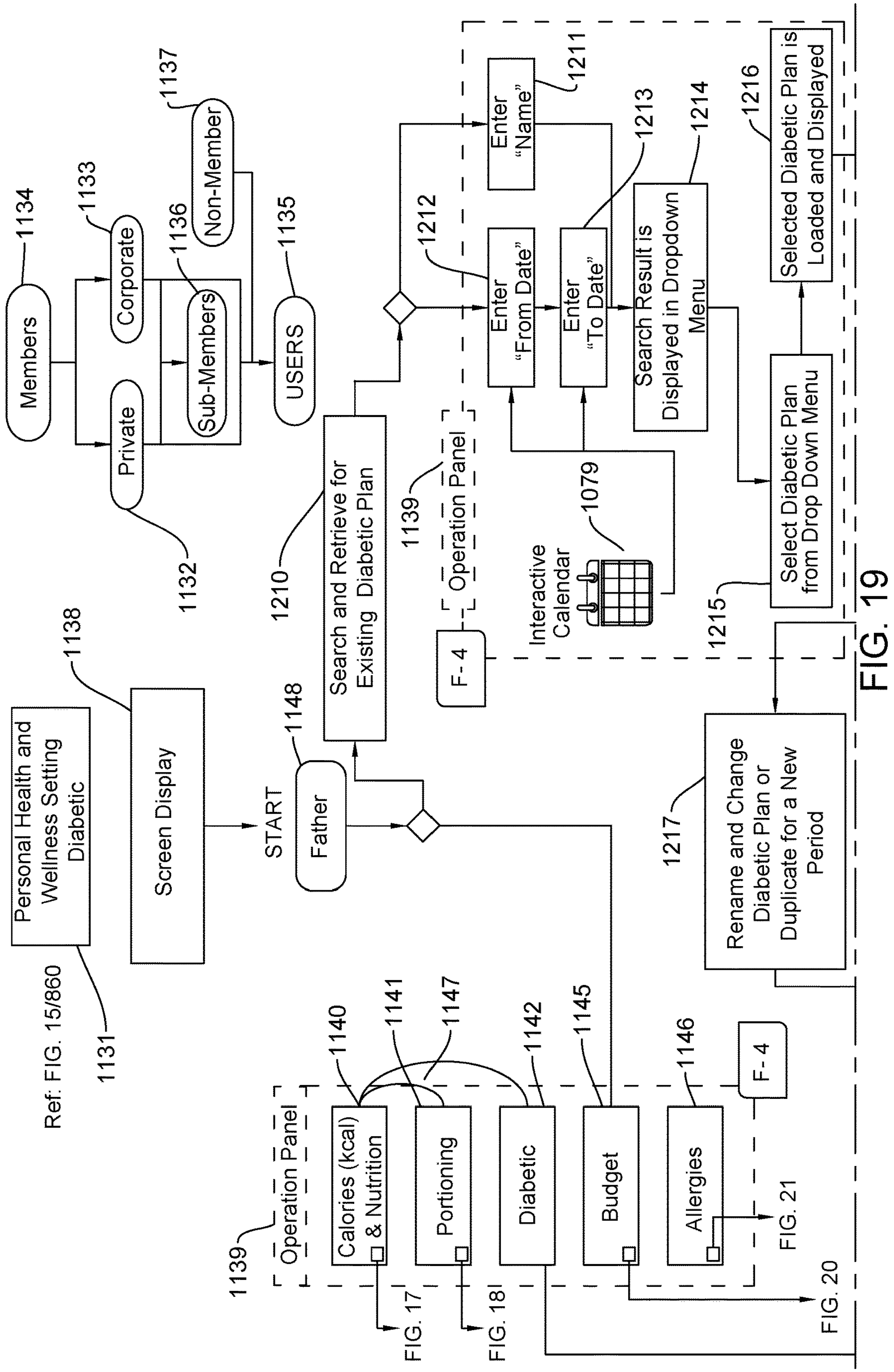
FIG. 19 illustrates a diagram of the Diabetics function of the landing screen illustrated exemplarily under FIG. 09 of the present invention of the CCOS 1.

Referring now to FIG. 19 illustrating a diagram of the Diabetics function 1131 of present invention of the CCOS 1. In operation, private 1132 and corporate 1133 member 1134 users 1135 and their respective sub-members 1136 can customize the estimated average requirement (EAR) for diabetics for a plurality of menu items to meet their personal diabetic dietary goals, necessities and requirements. Non-members 1137 cannot use this function. When the diabetics function tab 1131, is selected it brings member 1134 users 1135 to a screen display, indicated exemplarily as 1138. On the operation panel 1139 are a plurality of function tabs, illustrated exemplarily as calorie (kcal) and nutrition 1140, illustrated exemplarily under FIG. 17, a portioning function tab 1141, illustrated exemplarily under FIG. 18, a diabetic function tab 1142, illustrated exemplarily under FIG. 19, a budget function tab 1143, illustrated exemplarily under FIG. 20, and an allergy function tab 1146, illustrated exemplarily under FIG. 21. The functions calories (kcal) and nutrition function 1140, portioning function 1141, and diabetic function 1142 can be linked 1147 so member 1134 users 1135 can receive more comprehensive information. To search for or create a personal diabetic diet plan, member 1134 users 1135 have a plurality of options. Illustrated exemplarily for this diagram a father 1148 being a private 1132 member 1134 can search for 1210, or establish a diabetic plan for his child 2 1153. In operation, illustrated exemplarily a father 1148, activates the diabetic function tab 1142 in the operation panel in field F-4. A plurality of member icons 1149, comprising of the father 1150 as the main account holder, and the mother 1151 and two children 1152 and 1153 as the sub-members 1136 are displayed in field F-6, with the respective plurality of source data drawn from the health and wellness module 1154. Exemplarily for this diagram, the sub-member 1136 icon of child 2 1153 is selected 1155 to create, or a search 1210 for an existing diabetic diet plan 1113. The selected member icon for child 2 1153 is identified by a colored frame 1156. In operation, a customized diabetic diet plan is initiated by activating the customize function tab 1157 that results in then display of the estimated average requirements (EAR) for daily calorie (kcal) and the prevailing daily reference nutrition intake (RNI) 1158 for child 2 1153 within the interactive diabetic menu 1159. The relevant source data derives from the ingredient module 1060 within the CCOS 1, the personal data for child 2 1153 derives from the membership module including a plurality of the relevant core data and calculations derive from the diabetes module 1161 within the COOS 1. In operation, the diet plan for child 2 1153 is created by entering a new diabetic diet plan name into a text field 1162 using a virtual keyboard 1163, and establish a single or plurality of days 1164 using an interactive calendar 1165 available in field F-4. The new diabetic diet plan is confirmed 1166, resulting in the COOS 1 to establish of a blank diabetic diet plan 1167 within childs 2 1153 sub-member 1136 account, awaiting further completion and saving 1208 in field F-4. The execution of confirm deactivates the active customize function. The blank diabetic diet plan 1167 can now be customized specifying the diabetic requirements for a single or plurality of mealtime categories 1169 that are displayed in field F-9. Diabetic customization of mealtime categories is executed by activating again the customize function 1168, followed by selecting and moving a single or plurality of mealtime categories from in field F-9 to field F-10 1169, and further select a single mealtime category 1170 to be customized, which is then highlighted 1171, and results in a changed display within the interactive diabetic menu display 1159 in field F-2, displaying now the EAR and RNI for the highlighted mealtime category 1172. If no changes to the EAR of a selected mealtime category is made the EAR and RNI reflected in field F-2 remain unchanged 1173. Customization of the EAR of a highlighted mealtime category 1174, illustrated exemplarily as a lunch mealtime category 1175 is executed by using the arrow functions tabs within the lunchtime mealtime category 1175 to decrease 1176 or increase 1177 the EAR. The suggested EAR 1178 for the selected lunch mealtime category 1175, illustrated exemplarily as 1200 1180 changes to the adjusted mealtime intake (AMI) when the suggested EAR is adjusted. When the EAR is adjusted, the interactive diabetic menu 1159 changes and adds a new column and displays also the AMI 1181. The RNI in the interactive diabetic menu display 1159 remains unchanged, but starts blinking if the AMI adjustments exceeds the pre-set margin within the diabetic module 1161 within the CCOS 1 for the RNI. A mealtime category, illustrated exemplarily as a lunch mealtime category 1175, can be further customized by determining the EAR of food 1182 and beverage 1183 in the same way. Any adjustment also includes a change in the background color of the selected mealtime function tabs 1178, 1182 and 1183 to convey visible distinction between EAR and AMI. To close the customization of a mealtime categories the customize function tab is deactivated 1184, and the COOS 1 applies the plurality of diabetic mealtime settings 1178, 1182, 1183 to a plurality of selected food and beverage menu items during a menu item search. A diabetic diet plan can be further customized by making adjustments to the diabetic portioning of a highlighted mealtime category 1171. Customization is executed by activating first the customize function 1185. The interactive diabetic menu display 1159 within field F-2 changes again, displaying now the EAR and RNI of the respective mealtime category dietary portion 1186. The prevailing EAR and RNI data is linked to an interactive piechart graphic tool 1187 displayed in field F-7. The interactive tool comprises of two pie charts 1188 and 1189, both pie charts 1188 and 1189 reflecting first the EAR of a plurality of diabetic portions, illustrated exemplarily for pie chart 1188 as carbohydrates 1190, dietary fibre 1191, and total fats 1192. The pie chart 1189 portioning can be selected 1193, illustrated exemplarily for pie chart 1189, adjusting exemplarily the said portions for carbohydrates 1194, dietary fibre 1195, and total fats 1196, displaying in the interactive diabetic menu 1159 the updated portioning, reflecting EAR and AMI, with references to RNIs 1197. Adjustments to a plurality of diabetic dietary portions, illustrated exemplarily as carbohydrates 1194, dietary fibre 1195, and total fats 1196, can be executed using an interactive diabetic exchange tool 1198 that is displayed in field F-6 when a single dietary portion in the pie chart 1189 is selected 1193 and highlighted 1199. The COOS 1 provides for summary educational information 1200 relevant to the selected diabetic portioning in field F-3. The interactive diabetic portion exchange tool is displayed 1198 provides for dual functions and allows for the exchange of a plurality of pre-set portionings 1201. Selecting a pre-set portioning, illustrated exemplarily as 1202 will exchange the current portioning of carb 1190, illustrated exemplarily in graph 1188 with the pre-set portioning 1202, and the portioning of carb 1194 in graph 1189 is updated to the selected portioning 1202. The data in the interactive diabetic menu 1159 is also updated, allowing clear understanding of the impact of adjustment with respect to EAR and RNI. A dietary portion can also be adjusted using the "plus" 1203 and "minus" 1204 function tabs to increase or decrease the selected dietary portion. Simultaneously, when the interactive diabetic exchange tool 1198 is displayed, an interactive glycemic index (GI) and glycemic load (GL) indicator and scale tool 1205 is also displayed in field F-6. Adjustment to the GI 1206 and GL 1207 can be made independently to set a GI 1206 and GL 1207 ceiling using the GI/GL scale tool 1205, exemplarily for carb. 1194. If no adjustments are made to the portioning, and no GI/GL is pre-set, the EAR and RNI remains unchanged 1206. When a GI and GL ceiling is set, the COOS 1 will filter out ingredients that exceed the pre-set carbohydrate GI/GL ceiling, with the option that when such said ingredient is selected, the portion for such said ingredient can be further adjusted. The GI/GL can be independently pre-set without pre-setting the portioning. In such case, the COOS 1 to always take primarily the GI/GL pre-setting instruction when applying to menu item searches. Saving 1208 a new created diabetic diet plan 1209 overwrites the established blank diabetic diet plan 1167.

Applying the plurality of diabetic pre-settings can be done by activating the diabetic function on the menu panel, illustrated under FIG. 09/Ref 429. In operation, the COOS 1 allows for the searching and retrieving of existing diet plans 1210. Retrieving an existing diabetic diet plans 1210 can be executed within the operation panel in field F-4 by entering a known diabetic diet plan name 1211, a suggestion dropdown function is provided. Retrieving an existing diet plans can also be executed by way of single date 1212, or date range 1212 and 1213, using the interactive calendar 1079. A search result is compiled in an interactive dropdown menu 1214 from which a particular diet plan can be selected 1215. When a selected, the diabetic diet plan 1215 is loaded and displayed 1216, it can be renamed and duplicate 1217 using all existing setup parameters, changing part of or all settings of an existing diabetic diet plan 1217. A retrieved and loaded 1216 diabetic diet plan can also be deleted by the delete function tab 1218. In field F-5 and F-8 are a plurality of function tabs, comprising of a reset function tab 1219 that resets the mealtime EAR and the mealtime portioning to the original setting. When the mealtime suggestion function tab 2120 is selected, and the GI 1206 and GL 1207 is established, the COOS 1, uses the selected mealtime AMI 1181, and calculates and adjusts within the diabetes module 1161 the respective portioning within the interactive graphic tool 1187 to stay within the established GI 1206 and GL 1207 level. If the use portioning suggestion 1221 is selected the COOS 1, uses the customized portioning in the interactive diabetic exchange tool 1198 and calculates and adjusts within the diabetic module 1161 the respective EAR of the selected mealtime. Selecting the personal data function tab 1222 changes the screen display to the screen display of FIG. 16 to make changes to the base data, with a revert function to arrive back to this screen. The use GI/GL for menu items function tab 1223 allows to go direct from customization of mealtime 1184 to the interactive GI/GL scale tool 1205, adjust the GI 1206 and GL 1207 to meet personal goals and requirements and confirm 1224. The COOS 1 will then apply the established GI 1206 and GL 1207 levels to a plurality of menu items during a menu item search and a menu item order. A plurality of other functions tabs can be added during customization, illustrated exemplarily as 1225.

FIG. 20

Figure 20:
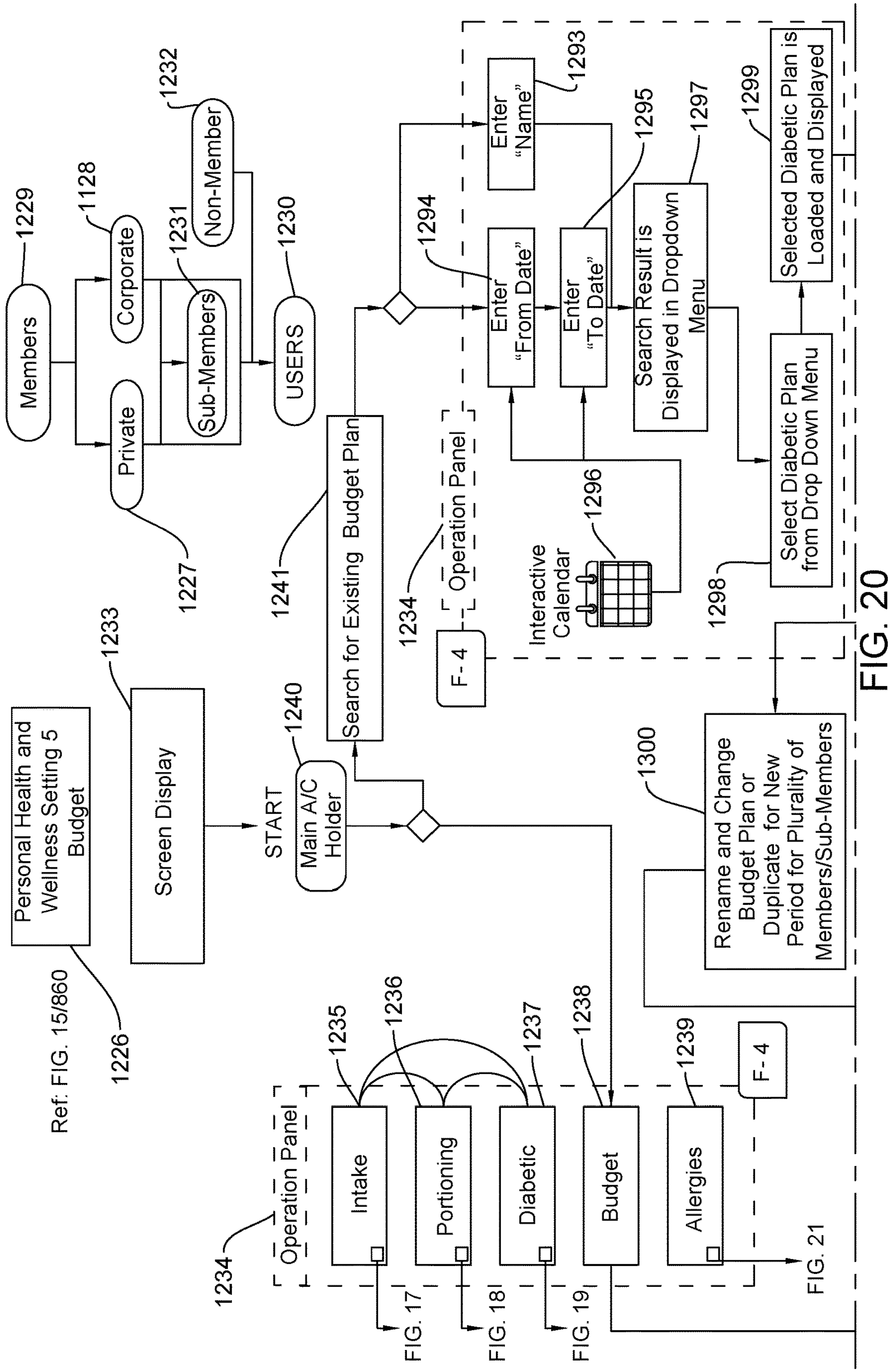
FIG. 20 illustrates a diagram of the Budget function of the landing screen illustrated exemplarily under FIG. 09 of the present invention of the CCOS 1.

Referring now to FIG. 20 illustrating a diagram of the Budget function 1226 of the COOS 1. In operation, private 1227 and corporate 1228 member 1229 users 1230 can customize a budget plan to establish budgets for a plurality of family members and employees. Non-members 1232 cannot use this function, unless on an adhoc basis during marketing drives only. When the budget function tab 1226 is selected, the COOS 1 brings the member 1229 users 1230 to a screen display, indicated exemplarily as 1233. On the operation panel 1234 within field F-4 are a plurality of function tabs, illustrated exemplarily as calories (kcal) and nutrition 1235, illustrated exemplarily under FIG. 17, a portioning function tab 1236, illustrated exemplarily under FIG. 18, a diabetic function tab 1237, illustrated exemplarily under FIG. 19, a budget function tab 1238, illustrated exemplarily under FIG. 20, and an allergy function tab 1239, illustrated exemplarily under FIG. 21. To search 1242 for or create a Budget plan, member 1229 users 1230 have a plurality of options. Illustrated exemplarily for this diagram a main member 1240 being a corporate 1228 member 1229 can search 1241 for, or establish a budget plan for a plurality of employees. Illustrated exemplarily a corporate 1228 member 1229, being a main account holder 1240 establishes a budget plan for a plurality of employees, illustrated exemplarily as employee 1 1242, employee 2 1243, and employee 3 1243. When the main account holder 1240 activates the budget function tab 1238 in the operation panel in field F-4. A plurality of sub-member 1231 employee icons, comprising of employee 1 1242, employee 2 1243, and employee 3 1243 are displayed 1244 in field F-6, with the respective plurality of source data drawn from the membership module 1245. Exemplarily for this diagram, the sub-member 1231 icon of employee 1 1242, employee 2 1243 is selected 1246 to create, or a search for an existing budget plan 1113. The selected sub-member 1231 icons are identified by a colored frame 1247 and 1248. In operation, a customized budget diet plan is initiated by activating the customize function tab 1249 in filed F-9. When the customize function tab 1249 is activated, field F-5 displays a plurality of options, comprising of a establish group function tab 1250 that allows for the establishment of a plurality of groups 1250, exemplarily with different budget plans for different groups of employee levels. Groups are established by selecting first a plurality of employee 1246, followed by activating the customize function tab 1249 in field F-9, followed by selecting the establish group function tab 1250, followed by naming the group, using the virtual keyboard 1258, followed by selecting confirm 1252. The established groups, illustrated exemplarily as group 1 1253, and group 2 1254 are displayed in field F-3. There is also a load group function tab 1255 and a revise group function tab 1256 that allows for the review and/or revising of existing groups. Revising existing groups is executed by selecting first the load group function tab 1255, groups are loaded in field F-3, exemplarily group 1 1253 and group 2 1254, followed by activating customize 1249 in field F-9, followed by deselecting previously identified sub-member 1231 employees, followed by selecting confirm 1252. In operation, a budget plan is created by entering a new budget plan name into a text field 1257 using a virtual keyboard 1258, and establish a single or plurality of days 1259 using an interactive calendar 1260 available in field F-4. The new Budget plan is confirmed 1261, resulting in the CCOS 1 to establish of a blank Budget plan 1262 within designated group account, illustrated exemplarily as group 1 1253, awaiting further completion and saving 1287 in field F-4. The execution of confirm deactivates the active customize function 1249. The blank budget plan 1262 can now be customized specifying for a single or plurality of mealtime categories, by reactivating customize 1263 in field F-9. Customization of budgets for a plurality of mealtime categories is executed by activating the customize function 1263, followed by selecting and moving a single or plurality of mealtime categories from in field F-9 to field F-10 1264. Selected mealtime categories are displayed 1265 in field F-10. Select a single mealtime category 1266 to be customized, which is then highlighted 1267, and results in a partially changed display in field F-4, to provide for the customization 1268 of time 1269. It will allow to set a time frame during which a selected mealtime is available and included in the budget plan. If no changes to time are made for a selected mealtime category there is no time limitation. A budget can now be established for a selected mealtime, illustrated exemplarily as a lunch mealtime category 1270, can be further customized by determining the budget for food 1271 and beverage 1272 in the same way. Any adjustment also includes a change in the background color of the selected mealtime function tabs 1270, 1271 and 1272 to convey visible distinction that a budget is devised. When a plurality of mealtime categories are selected, the total daily budget is displayed in field F-10. A search of a plurality of menus 1273, selecting the search function tab 1274 in field F-2 results in a change of display in field F-2, activating a search within the relevant restaurant module 1275 within the CCOS 1, resulting in the search results displayed in field F-2 comprising of a plurality of participating restaurant, illustrated exemplarily as restaurant 1 1276 and restaurant 2 1277, the respective restaurant menus 1278 and 1279, the respective personal menus 1280 and 1281, and the respective special project menus 1282 and 1283, listing only menu items that fall within the specified plurality of selected mealtimes 1267, times 1269, and budget framework 1270, 1271, 1272 of the said budget plan. The CCOS 1 allows for all suitable menu items to be included 1284, or for a plurality of menu items to be selected 1285. Deactivation of the "customize function tab 1286 closes the customization, and the budget plan can be saved 1287 and the new budget plan overwrites the established blank budget plan, with the option to instruct the CCOS 1 to send a daily 1288, weekly 1289 or monthly 1290 use of budget report 1291 to a designated PUDI 1292. Retrieving an existing Budget plans 1241 can be executed within the operation panel in field F-4 by entering a known Budget plan name 1293, a suggestion dropdown function is provided 1297. Retrieving an existing diet plans can also be executed by way of single date 1294, or date range 1294 and 1295, using the interactive calendar 1296. A search result is compiled in an interactive dropdown menu 1297 from which a particular diet plan can be selected 1298. When a selected, the Budget plan 1298 is loaded and displayed 1299, it can be renamed and duplicate 1300 using all existing setup parameters, changing part of or all settings of an existing Budget plan. A retrieved and loaded 1299 Budget plan can also be deleted by the delete function tab 1301. In field F-8 are a plurality of function tabs, comprising of a reset function tab 1302 that resets the budget plan to the original setting. Selecting the display month budget 1303 displays in the calendar in field F-7 all daily budgets within the respective calendar days, with the total budget displayed in a section of field F-8. Selecting display weekly budgets 1304 displays in the calendar in field F-7 all daily budgets of the selected week within the respective calendar days, with the total budget displayed in a section of field F-8. Selecting budget 1305 displays in the calendar in field F-7 all daily budgets of the created or selected budget, with the total budget displayed in a section of field F-8. Additional function tabs can be added during customization, illustrated exemplarily as 1306.

FIG. 21

Figure 21:
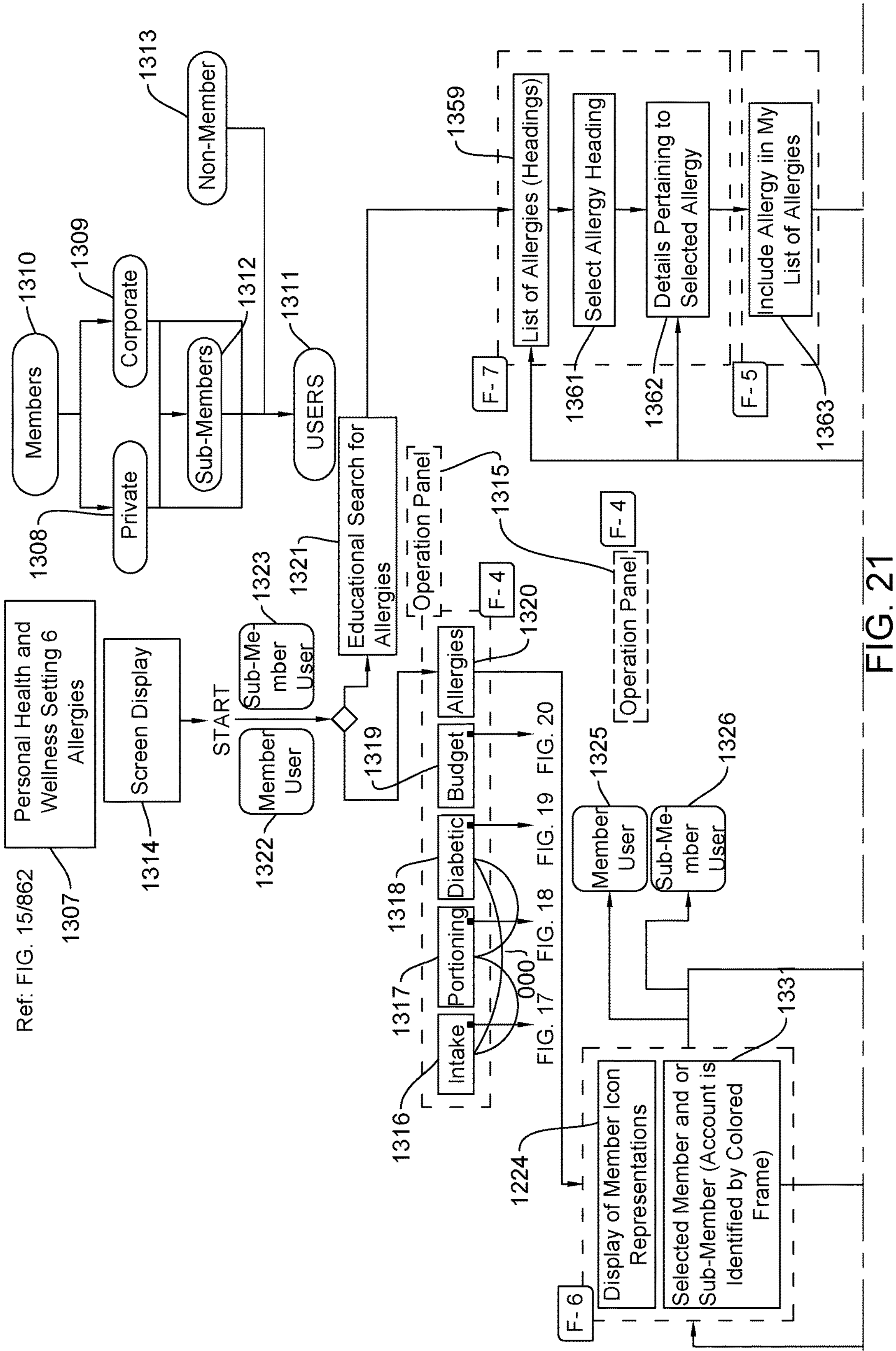
FIG. 21 illustrates a diagram of the allergy function of the landing screen illustrated exemplarily under FIG. 09 of the present invention of the CCOS 1.
Figure 22:
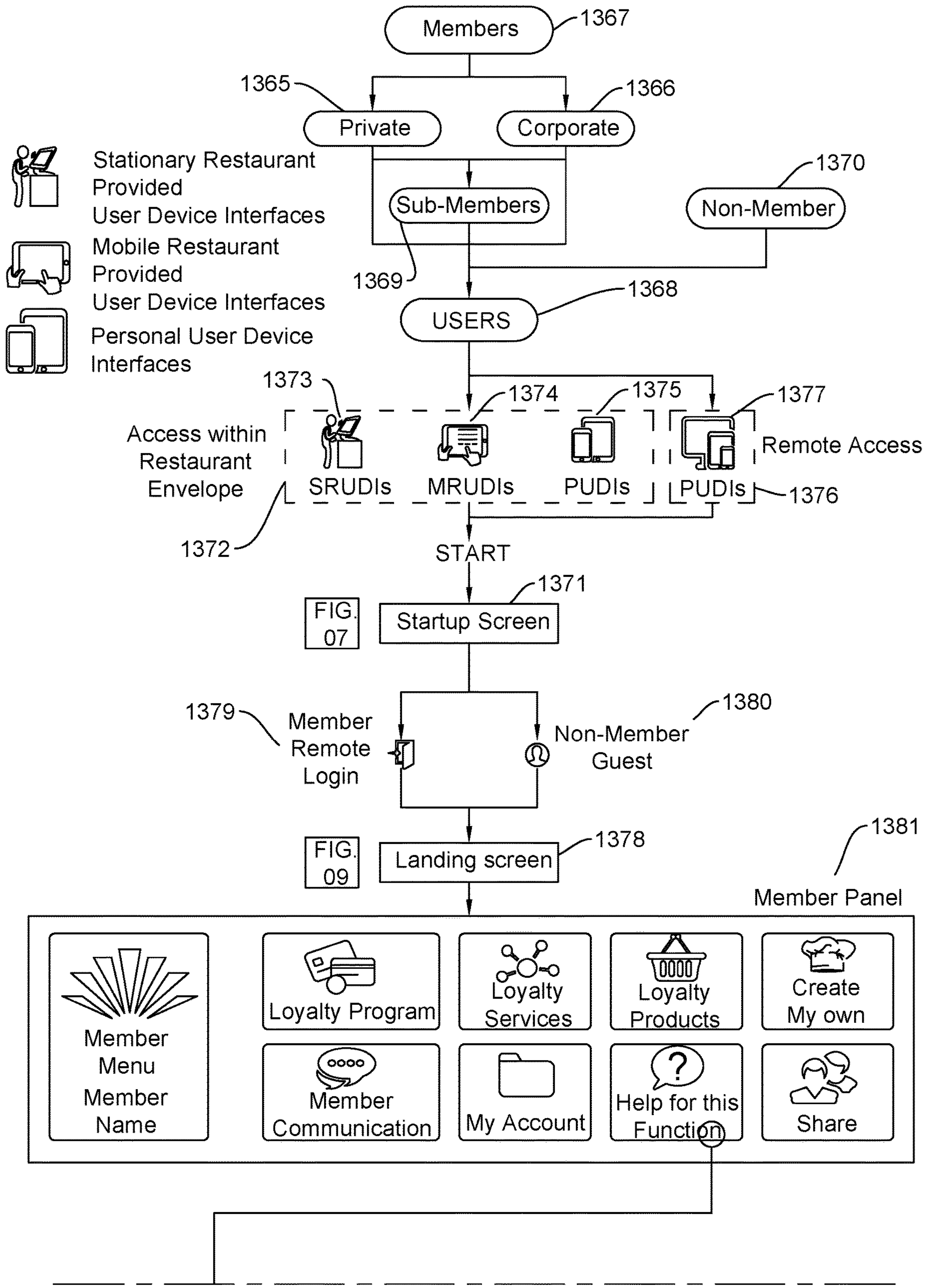
FIG. 22 illustrates a diagram of the member help function of the landing screen illustrated exemplarily under FIG. 09 of the present invention of the CCOS 1.

Referring now to FIG. 21 illustrating a diagram of the allergy function 1307 of the COOS 1. In operation, private 1308 and corporate 1309 member 1310 users 1311 and their respective sub-members 1312 can customize an allergy plan to establish these allergies for a plurality of menu items. Non-members 1313 can use this function on an adhoc basis only. When the Allergy function tab 1307 is selected, the COOS 1 brings the member 1310 users 1311 to a screen display, indicated exemplarily as 1314. On the operation panel 1315 within field F-4 are a plurality of function tabs, illustrated exemplarily as calorie (kcal) and nutrition 1316, illustrated exemplarily under FIG. 17, a portioning function tab 1317, illustrated exemplarily under FIG. 18, a diabetic function tab 1318, illustrated exemplarily under FIG. 19, a budget function tab 1319, illustrated exemplarily under FIG. 20, and an allergy function tab 1320, illustrated exemplarily under FIG. 21. To search for or create an allergy plan, member 1310 users 1311 have a plurality of options. Illustrated exemplarily for this diagram, a private 1308 and corporate 1309 member 1310 users 1311 and their respective sub-members 1312 can search for 1321, or establish an allergy plan under their own personal member 1310 or sub-member 1312 account. When a member 1310 users 1311, illustrated exemplarily as 1322 and 1323 selects the allergy function tab 1320 in the operation panel in field F-4, field F-6 displays 1324 their respective icon representation, illustrated exemplarily as 1325 and 1326. Except for a private 1308 member 1310 users 1311 who established as parent a family member 1310 account. In such cases field F-6 displays 1324 the member 1310 user 1311 and all sub-member 1312 users 1311, illustrated exemplarily as 1327, 1328, 1329, 1330, allowing member 1310 users 1311 to establish an allergy setting for a sub-member 1312 user 1311, exemplarily a parent for a child or another member of the family. Selection of an icon representation 1331 is executed, illustrated exemplarily for icon representation 1328. A colored frame 1332 identifies the selected icon representation. The relevant data is drawn from the membership module 1338. In operation, a customized allergy plan is initiated by activating the customize function tab 1333 in filed F-9. A allergy plan is created by entering a new allergy plan name into a text field 1334 using a virtual keyboard 1335, The new allergy plan is confirmed 1336, resulting in the COOS 1 to establish of a blank allergy plan 1337 within the selected 1332 sub-member 1312 users 1311 account, awaiting further completion and saving 1349 in field F-4. Executing confirm deselects the customize function. The blank allergy plan 1337 can now be customized, selecting allergies to be considered when the selected 1332 sub-member 1312 user 1311 searches for, and the COOS 1 returns, the results of a plurality of menu items. Selection of allergies is executed by activating the customize function 1338. A list of allergy groups are displayed 1339 in field F-9. Allergy ingredient groups have sub-ingredient groups 1340 and allergies under each ingredient group is displayed 1341. A single or plurality of allergies can be selected 1342, which are automatically displayed 1343 in field F-10. The confirm function tab 1344 saves the allergies as selected 1345, and are now displayed 1346 in field F-2 including relevant information below each selected allergy, and can be further customized by determining to exclude all menu items 1347 that contain ingredients that represent an allergy concern, or only display a warning notification on the displayed ingredients 1348, to allow inclusion of all menu items and the option to exchange of an ingredient. The allergy plan can now be saved 1349 in the selected 1332 sub-member 1312 users 1311 account, resulting in the overwriting of the previously established blank allergy plan 1337 within the member database module 1350. In operation, when the selected 1332 sub-member 1312 user 1311 searches for a menu item, the COOS 1 executes a plurality of functions and processes 1352 resulting in the exclusion of any menu item that contain an ingredient that represents and allergy concern Ref. 1347, or displays on the respective ingredient icons, illustrated exemplarily as 1352, 1353, and 1354 visible notifications by way of color code that the color coded ingredient is an allergy concern. Simultaneously, the menu item picture 1355 displays also an allergy notification if one ingredient within a plurality of ingredients is an allergy concern. The allergy notification on the displayed menu picture 1355 only disappears if no ingredient is an allergy concern. There is also a further backup process. During the cooking process, the COOS 1 communicates wirelessly within the cooking instruction 1356 an allergy notification to the chefs SUDI 1357 and the cooking staff SUDI 1358. A member 1310 user 1311 and sub-member 1312 user 1311 can receive education regarding allergies in field F-7, where a heading list of allergies is displayed 1359. The source data derives from the COOS 1 allergy database module 1360. A single or plurality of heading can be selected 1361 and educational details are displayed below each heading 1362, and a function tab 1363 allows to include a single or plurality of allergies to be included in a member 1310 users 1311 account

FIG. 22

Referring now to FIG. 22 there is illustrated a diagram of the member help function 1364 of the COOS 1. In operation the member help function tab 1364 is for private 1365 and corporate 1366 member 1367 users 1368 and their respective sub-members 1369 users 1368 only. Non-members 1370 users 1368 cannot use this function. Member 1367 users 1368 can access the startup screen 1371, illustrated exemplarily under FIG. 07, within a participating restaurant envelope 1372 using either the participating restaurant provided SRUDIs 1373 and MRUDIs 1374, or their PUDIs 1375. Member 1367 users 1368 can also access the startup screen 1371 from remote locations 1376 using a plurality of PUDIs 1377. To access to the landing screen 1378, illustrated exemplarily under FIG. 09, member 1367 users 1368 must login 1379 to receive a access. Non-members 1370 users 1368 can be allowed as guests 1380 during promotional marketing drives. When the help function tab 1364 is selected within the member panel 1381, an icon list mirroring the plurality of icon subjects within the member panel display 1381 are displayed in a vertical scrollable menu 1382 in field F-2. When a single icon subject, illustrated exemplarily the "create my own" function tab is selected 1383. An interactive and movable two-part pop window 1384 emerges that displays in the upper portion 1385 a plurality of main subjects 1386. A single main subject, illustrated exemplarily main subject 2 1387, and a plurality of sub-subjects 1388, illustrated exemplarily as sub-subject 1 1389 and sub-subject 2 1390 are displayed in the lower portion 1391. When a sub-subject, exemplarily sub-subject 1 1389 is selected, a plurality of information and guidance unfolds 1392 below the selected sub-subject 2 1389.

FIG. 23

Figure 23:
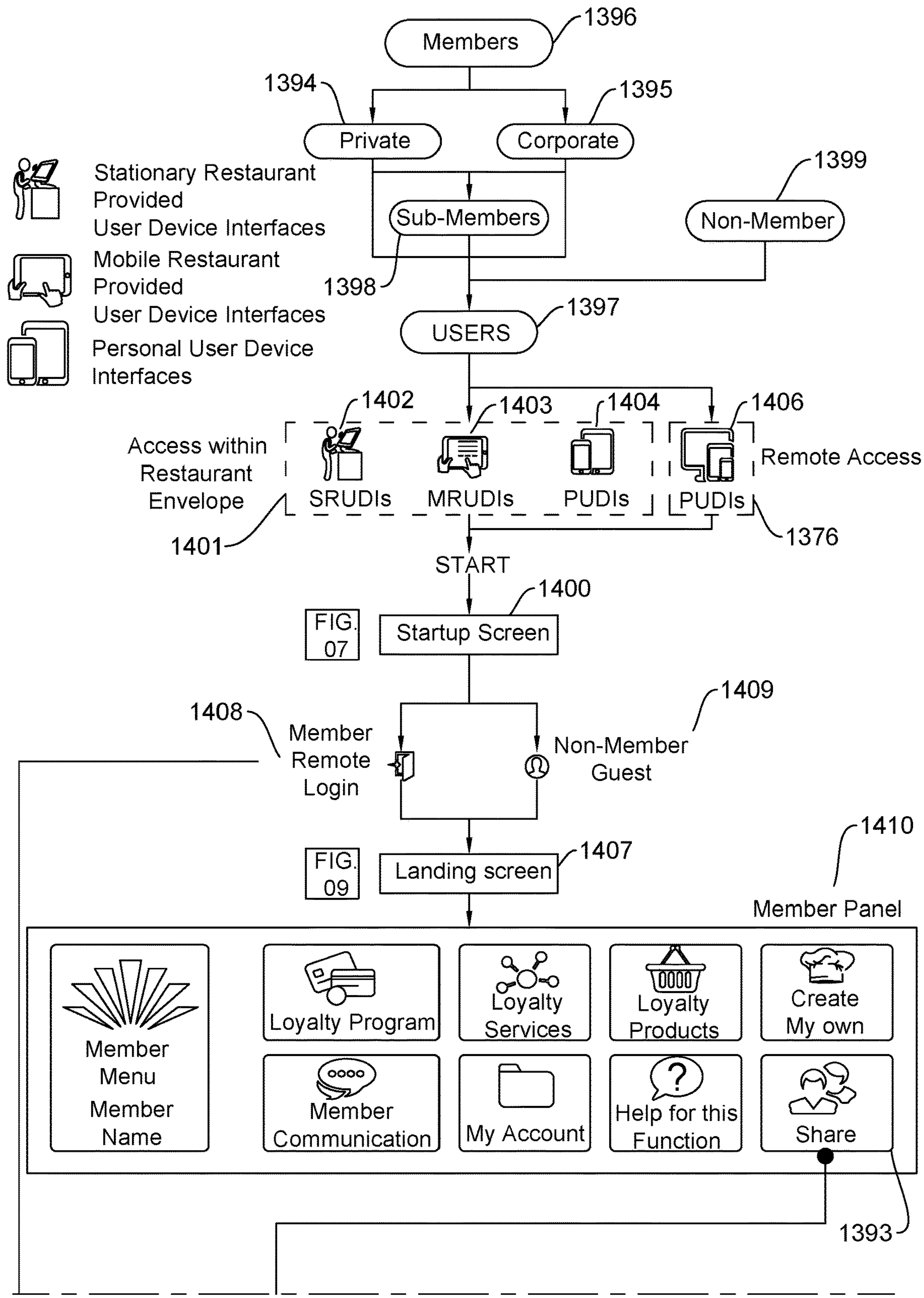
FIG. 23 illustrates a diagram of the member sharing function of the landing screen illustrated exemplarily under FIG. 09 of the present invention of the CCOS 1.

Referring now to FIG. 23 there is illustrated a diagram of the member sharing function 1393 of the present invention of the CCOS 1 that allows for the sharing of a plurality of menu items, restaurants, and restaurant locations, and submit a created menu item for competition. In operation the member sharing function tab 1393 is for private 1394 and corporate 1395 member 1396 users 1397 and their respective sub-members 1398 users 1397 only. Non-members 1399 users 1397 cannot use this function. Member 1396 users 1397 can access the startup screen 1400, illustrated exemplarily under FIG. 07, within a participating restaurant envelope 1401 using either the participating restaurant provided SRUDIs 1402 and MRUDIs 1403, or their own PUDIs 1404. Member 1396 users 1397 can also access the startup screen 1400 from remote locations 1405 using a plurality of PUDIs 1406. To access to the landing screen 1407, illustrated exemplarily under FIG. 09, member 1396 users 1397 must login 1408 to receive a access. Non-members 1399 users 1397 can be allowed as guests 1409 during promotional marketing drives. When the member sharing function tab 1393 is selected within the member panel 1410, field F-2 displays a plurality of member 1396 contact 1411, that are organized as family 1412 friends 1413 and colleagues 1414. Non-member 1399 contacts 1415 can also be imported from a plurality of PUDIs 1416. Member contacts 1411 are created and maintained within the membership module 1417 within the CCOS 1. A single or plurality of contacts can be selected 1418, followed by creating a text message 1419. A text message can be created 1419 in field F-6 1420 comprising of a header and text message, using a virtual keyboard 1421. A plurality of text templates 1422 can also be used for a text message 1420 by selecting a single template in field F-7, including an icon and numerical rating 1423. Text templates are drawn from the marketing and services module 1424 within the CCOS 1. There is also a standard menu item submission text template 1425 and a plurality of related message templates. Simultaneously the sender is identified 1426. Activating the customize function tab 1427, illustrated exemplarily under FIG. 09/Ref:462 starts the submission process and field F-2 changes, displaying a plurality of participating restaurants 1428. A participating restaurant is selected 1429. The display of field F-2 changes and a plurality of menus, including the standard menu of the selected participating restaurant and a plurality of personal menus related to the selected restaurant, are displayed. A menu and a single or plurality of menu item are selected 1431. A choice can be made in field F-5, to use the recommend function tab 1432 to recommend a selected participating restaurant 1429, and include a single or plurality of menu items 1431. A link to the selected participating restaurant 1429 and selected menu items 1431 is included and displayed in the message text. Using the submit function tab 1433 submits an own creation of a selected menu item 1431 for competition. A link to the own creation of a menu item and a plurality of other information, include the date and time of creation, place of creation, list of ingredients, price of menu item, and a plurality of health and wellness information. A location map 1434 can be included before the message is send 1435. When a menu item was submitted for competition 1435, the submitted menu items will be administered and evaluated by the head office 1436 and processed within in the marketing and services module 1437 within the CCOS 1. Upon successful evaluation and approval for placement, the submitted menu item 1436 is added into the standard menu of participating restaurants, illustrated exemplarily as 1438 and 1439, accessible within menu screen display, illustrated exemplarily under FIG. 09/Ref446. Other member 1396 users 1397 and non-members 1399 users 1397 can use a simple icon and numerical rating to rate a plurality of submitted menu item 1436. Rating results are compiled within the marketing and services module 1437 and are subject to final valuation by the head office 1436 with subsequent announcement, and notification and reward allocation to the winner 1440.

FIG. 24

Figure 24:
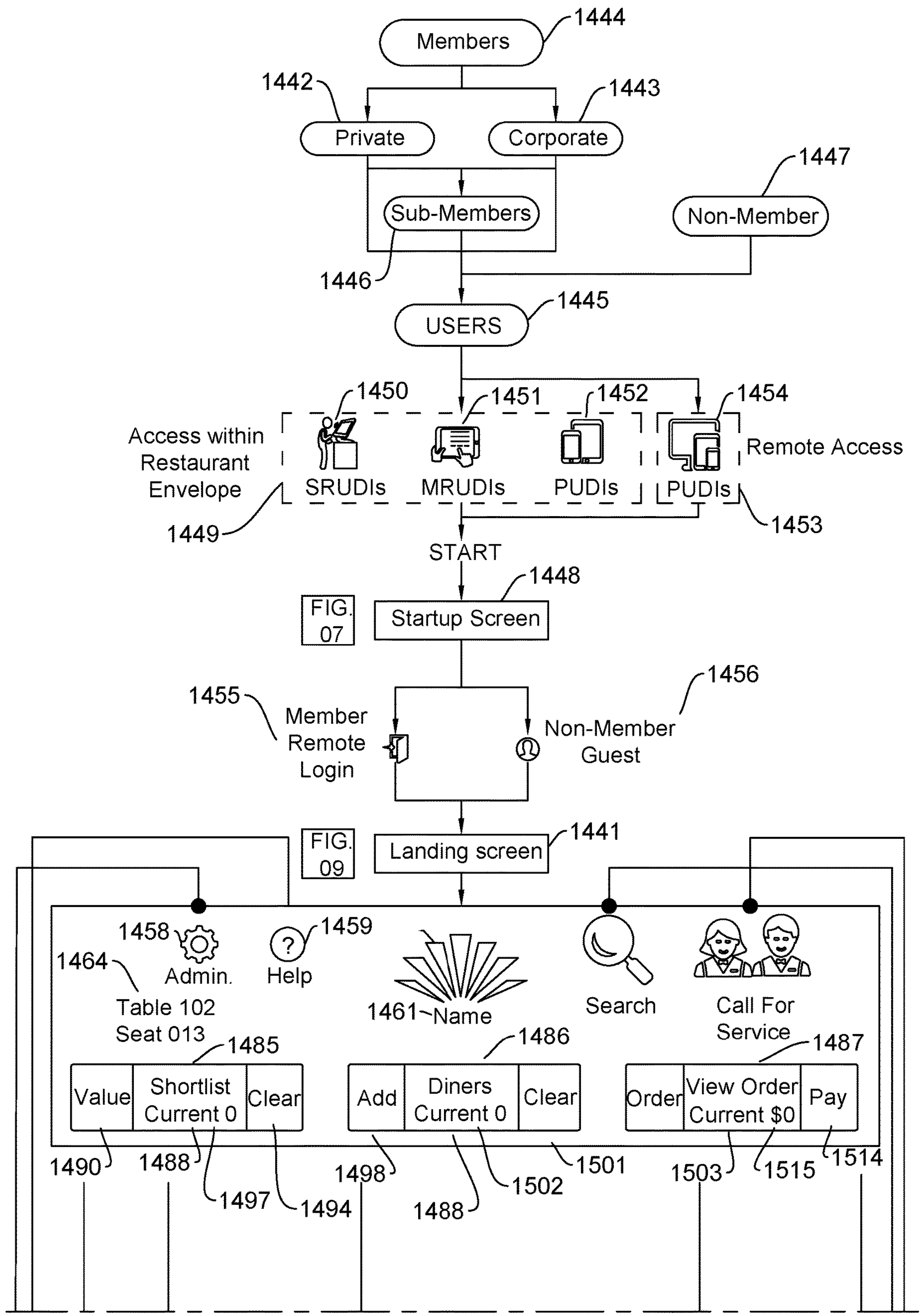
FIG. 24 illustrates a diagram of the central segment of the landing screen of the landing screen, illustrated exemplarily under FIG. 09 of the present invention of the CCOS 1.

Referring now to FIG. 24 there is illustrated a diagram of the central segment of the landing screen 1441 of the present invention of the CCOS 1, illustrated exemplarily under FIG. 09/Ref 382. Private 1442 and corporate 1443 member 1444 users 1445 their respective sub-members 1446 users 1445 and non-members 1447 users 1445 can use this functions. member 1444 users 1445 and non-members 1447 users 1445 can access the startup screen 1448, illustrated exemplarily under FIG. 07, within a participating restaurant envelope 1449 using either the participating restaurant provided SRUDIs 1450 and MRUDIs 1451, or their PUDIs 1452. Member 1444 users 1445 and non-members 1447 users 1445 can also access the startup screen 1448 from remote locations 1453 using a plurality of PUDIs 1454. To access to the landing screen 1441, illustrated exemplarily under FIG. 09. Member 1444 users must login 1455 to receive a access. Non-members 1447 users 1445 are allowed as guests 1456. The central segment 1457 comprises of a plurality of service function tabs and information displays, comprising of an administration function tab 1458, a general help function tab 1459, a logo function tab 1460, a name display 1461, a general search function tab 1462, a call for service function tab 1463, and a MRUDI and PUDI table and seat identification display 1464. In operation, when the administration function tab 1458 is selected, a popup window of the service staff operation panel emerges 1465, providing for a plurality of option, illustrated exemplarily as an exchange SRUDI or MRUDI function tab 1466, that allows for the exchange of a SRUDI or MRUDI 1466 in the event of malfunction without the loss of information, exemplarily during menu item selection and customization. A diagnosting function tab 1467 that allows for a plurality of diagnostics in the event of malfunction. A recall function tab 1468 that allows for recalling of activities and review of such said activities to allow for comprehensive service assistance. Further function tabs can be added during customization, illustrated exemplarily as 1469. Selecting the general "help" function tab 1459 results in the display of a help menu 1470 in field F-2 displaying a plurality of main subjects under which sub-subjects unfold, illustrated exemplarily as 1471 and 1472. When a main sub-subject is selected, exemplarily 1471, a movable and scrollable two part popup window 1472, displaying in the upper portion 1473 explanation 1474 to a selected main subject, exemplarily 1471, and in the lower portion guiding text information 1475 related to the selected sub-subject, exemplarily 1472. Selecting the general "search" function tab 1462 results in the display of a popup window search function 1476 allowing for a membership related search 1477, and general search using an interactive alphabetic organized dropdown menu 1478 embracing a plurality of subjects. Selecting the call for service function tab 1463 results in the emerging of a movable popup window displaying a service option panel 1479 with a plurality of function tabs, requesting waiter service from a service staff 1480, requesting assistance regarding the SRUDI, MRUDI, PUDI 1481. A plurality of additional function tabs can be added during customization, illustrated exemplarily as 1482. Selecting a function tab, 1480, 1481, 1482 results in a notification to predetermined SUDIs, illustrated exemplarily as 1483 and 1484. Selecting the logo function tab 1460 inclusive of 1461 displays in filed F-6 summarized guidance for the use and application of the provided SRUDI, MRUDI, and in field F-7 a list of a plurality of participating restaurants. There are also three plural purpose function tabs 1485, 1486, and 1487. Each function tab 1485, 1486, and 1487 has a triple function. Selecting the center field 1488 of the shortlist function tab 1485, adds a selected menu item to a shortlist 1489 in field F-3. A plurality of menu items can be short listed in F-3 before making a final selection for ordering, customization and saving in a personal menu. Selecting value 1490 adds a plurality of added value menu item 1491 to a plurality of relevant selected menu items in shortlist 1492. Individual menu items and their added value menu items can be selected and removed 1493 using the clear function tab 1494. Menu items and relevant value added menu items can be selected 1495 for ordering 1496. The shortlist function tab displays also the current menu items in a short list 1497. The dinners function tab 1486 allows to invite a plurality of dinners by using the add function 1498 that results in the display of a popup window 1499 including an interactive seat selection display 1500 of a plurality of seats nearby, whereby invited seats are marked. Invitees can be deselected using the clear function 1501 diners of the invitee list. The dinner's function tab 1486 displays also the current dinners 1502. There is also a view order function tab 1487. Selecting the "view order" function 1503 results in the emerging of a popup window displaying all the details of the current order check 1504 applicable for members 1444 and non-members 1447 based on standard menu prices or for customized and created menu items based on prevailing individual ingredient pricing, with a plurality of further options 1505 to split a check 1506, single check payment 1507, including a plurality of payment options 1508, including auto payment 1509 that automatically deducts the current order check 1504 using virtual non-cash payment, or a plurality of other available methods of payments 1510. Member 1444 users 1445 will receive the current order check in their member accounts 1511, and request that a copy is send to their PUDI 1512. When payment is made the order is placed 1513. Payment 1514, without reviewing the detailed order check 1504 can also be made, accepting the current total amount changed 1515.

FIG. 25

Figure 25:
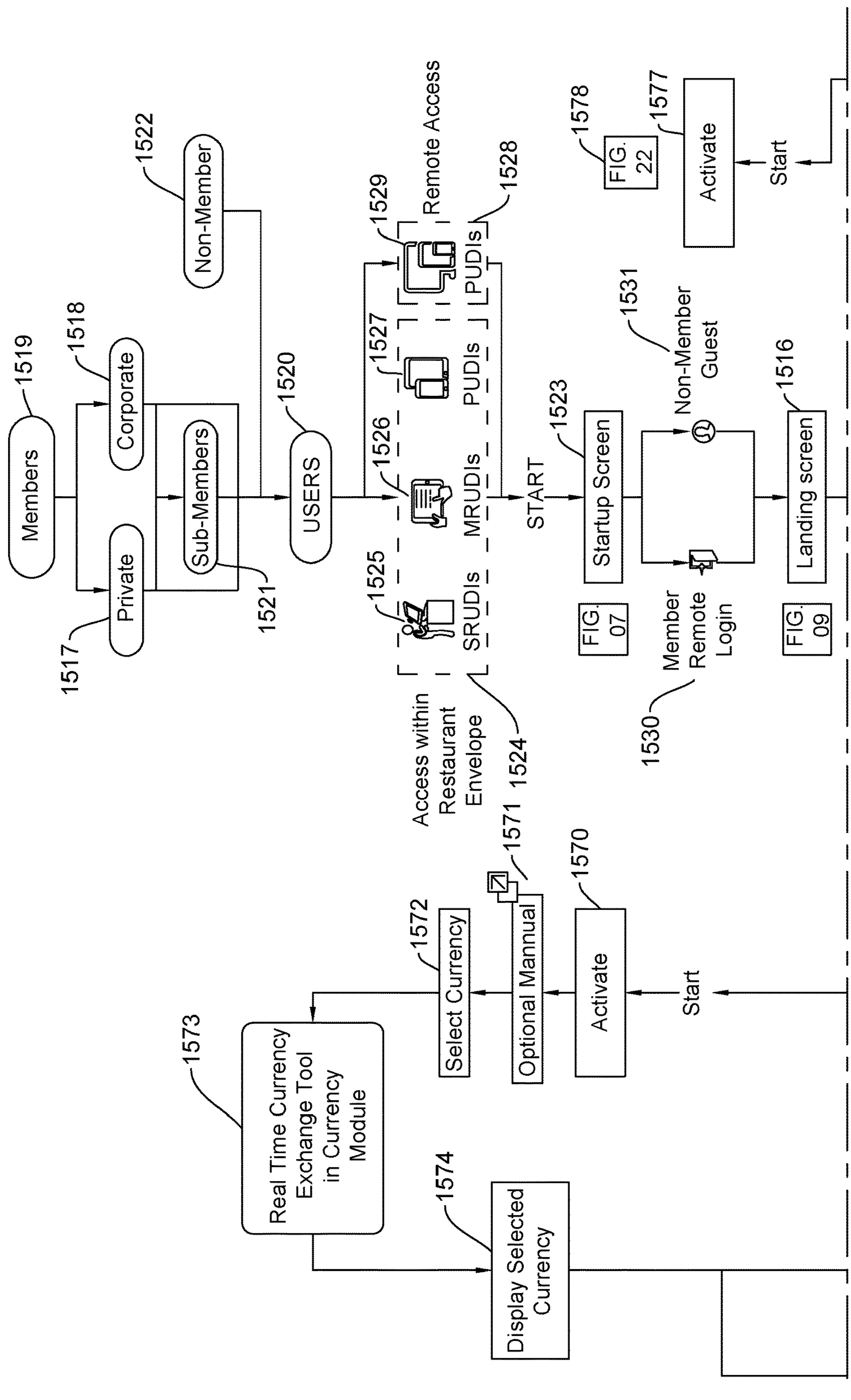
FIG. 25 illustrates a diagram of the health and wellness segment of the landing screen illustrated exemplarily under FIG. 09 of the present invention of the CCOS 1.

Referring now to FIG. 25 there is illustrated a diagram of the health and wellness segment of the landing screen 1516 of the present invention of the COOS 1, illustrated exemplarily under FIG. 09/Ref 383. Private 1517 and corporate 1518 member 1519 users 1520 their respective sub-members 1521 users 1520 and non-members 1522 users 1520 can use this functions, with limitations for non-members 1522 users 1520. Member 1519 users 1520 and non-members 1522 users 1520 can access the startup screen 1523, illustrated exemplarily under FIG. 07, within a participating restaurant envelope 1524 using either the participating restaurant provided SRUDIs 1525 and MRUDIs 1526, and member 1519 users 1520, and during promotion and marketing drives, also non-members 1522 users 1520 can or their own PUDIs 1527. Member 1519 users 1520 and non-members 1522 users 1520 can also access the startup screen 1523 from remote locations 1528 using a plurality of PUDIs 1529. To access to the landing screen 1516, illustrated exemplarily under FIG. 09, member 1519 users 1520 must login 1530 to receive a access. Non-members 1522 users 1520 are allowed as guests 1531. On the landing screen is a health and wellness panel 1532 with a plurality of function tabs including a kcal function tab 1533, a nutrition function tab 1534, a portioning function tab 1535, a diabetic function tab 1536, a budget function tab 1537 and an allergy function tab 1538. Each function tab allows for activation 1539 and deactivation 1540, providing for a plurality of function and display combination. When activated, a popup menu of an option manual emerges 1541 that allows, when authorized, the setting and/or adjustments to personal settings 1543, and using displayed interactive tools to make adjustments to the respective functions and processes illustrated exemplarily under FIG. 17 1543, FIG. 18 1544, FIG. 19 1545, FIG. 20 1546, including the allergy function. When no adjustments are made, and a menu item 1547 is selected and displayed in field F-6 the COOS 1 generates simultaneously a plurality of ingredients included in the selected menu item 1547 in the standard ingredient display 1548 in field F-4 illustrated exemplarily as interactive menu item ingredient 1 1549, menu item ingredient 2 1550, and menu item ingredient 3 1551. Depending on the selection of function tabs 1533, 1534, 1535, 1536 and 1538 or any combination thereof, the interactive surfaces of the respective menu item ingredient function icons 1549, 1550, and 1551 display a variety and combination of picture and information, illustrated exemplarily as simple kcal and nutrition 1552, kcal, nutrition, and portioning 1553, or diabetic portioning and GI/GL display 1554. Said ingredient function icons 1549, 1550, and 1551 can also be enlarged by holding a menu item ingredient icon, resulting in a popup window display of an enlarged menu item ingredient icon. The same principle applies for the plurality of sub-ingredient categories of main ingredient categories, illustrated exemplarily for subingredient category A 1555, subingredient category B 1556, and subingredient category C 1557 under main ingredient category 2 1558. The relevant complete health and wellness information related to a selected menu item 1559 are displayed in field F-7. On the health and wellness panel 1532 is also a budget function tab 1537 that can be activated 1560 and de-activated 1561. When activated 1560, a popup menu of an option manual emerges 1562 that allows, when authorized, adjustments to personal settings 1563, using the respective functions and processes illustrated exemplarily under FIG. 20 1564. A portion of the option manual 1562 displays the prevailing budgets, illustrated exemplarily for breakfast 1565, lunch 1566, and dinner 1567, and the total budget for the current day 1568. There is also a currency function tab 1569. When activated 1570, a popup menu of an option manual emerges 1570 and a currency can be selected 1572, that activates a realtime currency exchange tool within the currency module 1573, resulting in displaying the selected currency 1574 in the option manual popup window 1562 for breakfast 1565, lunch 1566, and dinner 1567, and for the selected and displayed menu item 1547 price information 1575 in field F-5. The help function 1576, when activated 1577 follows the same principal as the help function addressed under FIG. 22 1578.

FIG. 26

Figure 26:
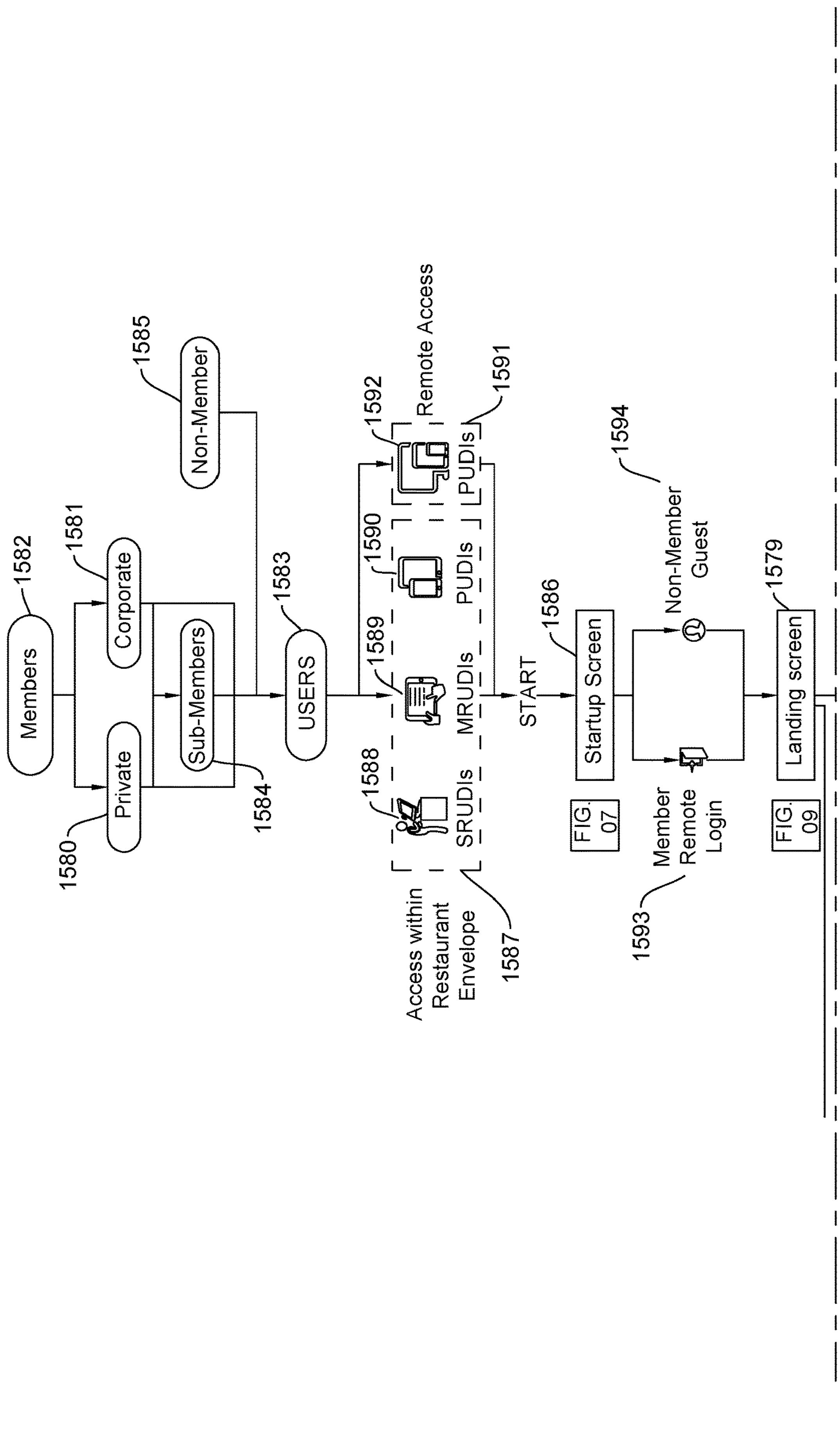
FIG. 26 illustrates a diagram of the cuisine option and key ingredient option of the landing screen, illustrated exemplarily under FIG. 09 of the present invention of the CCOS 1.

Referring now to FIG. 26 there is illustrated a diagram of the cuisine option 1596 and key ingredient option 1597 of the landing screen 1579 of the present invention of the COOS 1, illustrated exemplarily under FIG. 09. Private 1580 and corporate 1581 member 1582 users 1583 their respective sub-members 1584 users 1583 and non-members 1585 users 1583 can use this functions with limitations for non-members 1585 users 1583. member 1582 users 1583 and non-members 1585 users 1583 can access the startup screen 1586, illustrated exemplarily under FIG. 07, within a participating restaurant envelope 1587 using either the participating restaurant provided SRUDIs 1588 and MRUDIs 1589, and non-members 1585 users 1583 during promotional and marketing drives, their own PUDIs 1590. Member 1582 users 1583 and non-members 1585 users 1583 can also access the startup screen 1586 from remote locations 1591 using a plurality of PUDIs 1592. To access to the landing screen 1579, member 1582 users 1583 must login 1593 to receive a access. Non-members 1585 users 1583 are allowed as guests 1594. On the landing screen 1579, illustrated exemplarily under FIG. 09 is a health and wellness segment 1595 and a cuisine option function tab 1596 and a key ingredient option function tab 1597. The shown diagram illustrates a plurality of option a member 1582 users 1583 and non-members 1585 users 1583 can proceed. Option 1 1598 display applies when accessing the landing screen 1579 remotely 1591, and illustrates exemplarily the display in field F-2 of a plurality of participating restaurants standard menus, illustrated exemplarily as restaurant 1 1599 and restaurant 2 1600, and the plurality of relevant personal menus 1601 from which a single or plurality of menu items can be selected 1602. Option 2 1603 display applies when accessing the landing screen 1579 from within a participating restaurant, and illustrates exemplarily the display in field F-2 of a single participating restaurants standard menu, illustrated exemplarily as restaurant 3 1604 and the plurality of relevant personal menus 1605 from which a single or plurality of menu items can be selected 1606. Member 1582 users 1583 and non-members 1585 users 1583 can proceed by option 1 1598 or option 2 1603 to make their menu item selection 1602 or 1606, or by including the activation of the cuisine option function tab 1596 and/or the key ingredient option function tab 1597 that results in field F-9 in the display of available main cuisine options 1607 and in field F-10 in the display of available key ingredient options 1608. The COOS 1 allows for a plurality of drill down levels. When a main cuisine option 1607, illustrated exemplarily as asia as a global region 1609 is selected, the display in field F-9 changes, displaying now a plurality of relevant countries 1610 relevant to the asian region 1609; and when a country 1610 is selected, illustrated exemplarily as Thailand 1611 the display in field F-9 changes again displaying now a plurality local regions within Thailand 1612; and when a local region 1612 is selected the display in field F-9 changes again, displaying now a plurality of cities 1613 within Thailand 1611 and the selected local region 1612. Each country 1611, local regions 1612 and cities 1613 are associated with distinctive and unique flavour categories that are progressively displayed in field F-4 that comprising of available ready mixed flavours including spice flavours, paste flavours, and sauce flavours, illustrated exemplarily as 1614, 1615, 1516, and 1617. A single or plurality of flavours can be selected. The COOS 1 automatically refines and updates the list of participating restaurants and their standard menus in field F-2, narrowing down the restaurants and their respective menus down to specific menu items that match the selected cuisine option categories. The same can be executed to specify key ingredient options 1608, illustrated exemplarily for pork 1618, pork shoulder cut 1619, minced 1620, lean 1621. The COOS 1 also allows under option 1 1598 or option 2 1603 to select first a menu item 1622, place a selection of menu items 1622 into a shortlist 1623 using the function, illustrated exemplarily under FIG. 09/Ref; 410, and customize 1624 the selected menu items using either the ingredient select and exchange function 1625, illustrated exemplarily under FIG. 27 or the cuisine option 1607 and key ingredient option 1608. In operation, when a new or customized menu item is created 1626, non-members 1627 and proceed with the ordering 1628 for dine-in 1629 service, for delivery 1670, or collection 1671 at the counter 1672 or at the 24 hour dispenser 1673. Member 1582 users 1583 (members) 1674 can save 1675 new or customized menu item 1626 in their respective personal menus 1676 and select 1677 the saved 1675 menu items from their personal menus 1676 for ordering 1628 for dine-in 1629 service, for delivery 1670, or collection 1671 at the counter 1672 or at the 24 hour dispenser 1673. The plurality of relevant source data and information for the plurality of exemplarily cuisine options 1607, plurality of exemplarily key ingredient options 1608, and flavour categories, illustrated exemplarily as 1614, 1615, 1616 and 1617 derive 1678 from the execution ingredient and inventory and database module within the COOS 1.

FIG. 27

Referring now to FIG. 27 there is illustrated a diagram of the ingredient exchange segment of the present invention of the COOS 1, illustrated exemplarily under FIG. 09. When selecting a menu item, illustrated exemplarily as 1679, displayed in field F-6 can be customized by removing, exchanging, or adding a plurality of ingredients. In operation, when a selected menu item is displayed 1679 in filed F-6 a plurality of ingredients contained within the selected menu item 1679, are displayed in field F-4 in form of interexchangable ingredient function tabs, illustrated exemplarily as, menu item ingredient 1 1680, menu item ingredient 2 1681, menu item ingredient 3 1682, menu item ingredient 4 1683, menu item ingredient 5 1684, and menu item ingredient 6 1685. There are a plurality of function tabs in field F-8 that that can be selected 1686 to change the display on the surface information on the interexchangable ingredient function tabs, illustrated exemplarily as enlarged kcal and nutrition display 1687, as enlarged kcal, nutrition and portion display 1688, and as enlarged diabetic, portioning and GI/GL display 1689. There are also a plurality of information and function tabs 1690 in field F-5, comprising of the menu price 1691 and the menu item name 1692 of the selected menu item 1679, and menu item 1679 rating information 1693. A plurality of additional information and function tabs, illustrated exemplarily as 1694 can be added during customization. The relevant detailed health and wellness data and information relevant to the selected menu item 1679 are also displayed 1695 in field F-7, allowing for a plurality of display option that can be selected using a plurality of responding function tabs, illustrated exemplarily as 1696 and 1697. A single or plurality of menu item ingredients, illustrated exemplarily as 1680, 1681, 1682, 1683, 1684, 1685 can be exchanged and/or removed 1698. Exchange and/or removal is executed exemplarily for menu item ingredient 2 1681 by holding and sliding menu item ingredient 2 1681 onto the ingredient removal and exchange field 1699. A single or plurality of new or replacement ingredients, illustrated exemplarily as exchangeable sub-ingredient category C 1715 can be inserted 1700 into the menu item ingredient list 1701 by the same hold and slide movement 1702. To execute the removal and insert the ingredient select and exchange function tab 1703 must be activated, results in the display of the plurality of main ingredient categories in field F-4, illustrated exemplarily as main ingredient category 1 1704, main ingredient category 2 1705, main ingredient category 3 1706, main ingredient category 4 1707, main ingredient category 5 1708, and main ingredient category 6 1709. A main ingredient category can be selected, illustrated exemplarily as main ingredient category 3 1706, and the relevant plurality of ingredient sub-categories, illustrated exemplarily as main ingredient sub-category 3-1 1710 emerges within the second line 1711. A further plurality of main ingredient sub-categories, illustrated exemplarily as main ingredient sub-category 3-2 1712 can be added when required during customization. The exchangeable ingredient category is the third level being sub-ingredient categories 1713, illustrated exemplarily as sub-ingredient category A 1714, sub-ingredient category B 1715, sub-ingredient category C 1716, sub-ingredient category D 1717, sub-ingredient category E 1718, sub-ingredient category F 1719, and, sub-ingredient category G 1720. The source data derives from the ingredient module 1721 within the CCOS 1 in line with the ingredient organization structure, illustrated exemplarily under FIG. 55 1722. There is also in field F-4 a non-preferred ingredient field 1723 and a preferred ingredient field 1724. Ingredients from the list of the selected menu item 1679, illustrated exemplarily as menu item ingredient 4 1683 and menu item ingredient 5 1684, and sub-ingredient category E 1718 and sub-ingredient category F 1719 can be moved by hold and slide action on to the respective fields 1723 or 1724. The COOS 1 will capture record the information under the relevant member users personal data, within the wellness and health module 1725 and automatically list menu items that contain non-preferred ingredients last, and menu item that contain preferred ingredient first. There is also an allergy field 1726. Ingredients from the list of the selected menu item 1679, illustrated exemplarily as menu item ingredient 6 1685 and sub-ingredient category G 1720 can be moved by hold and slide action on to the allergy field 1723. The CCOS 1 will capture record the information under the member users personal data within the wellness and health module 1725 and automatically exclude menu items that contain menu that contain allergy marked ingredients.

FIG. 28

Figure 28:
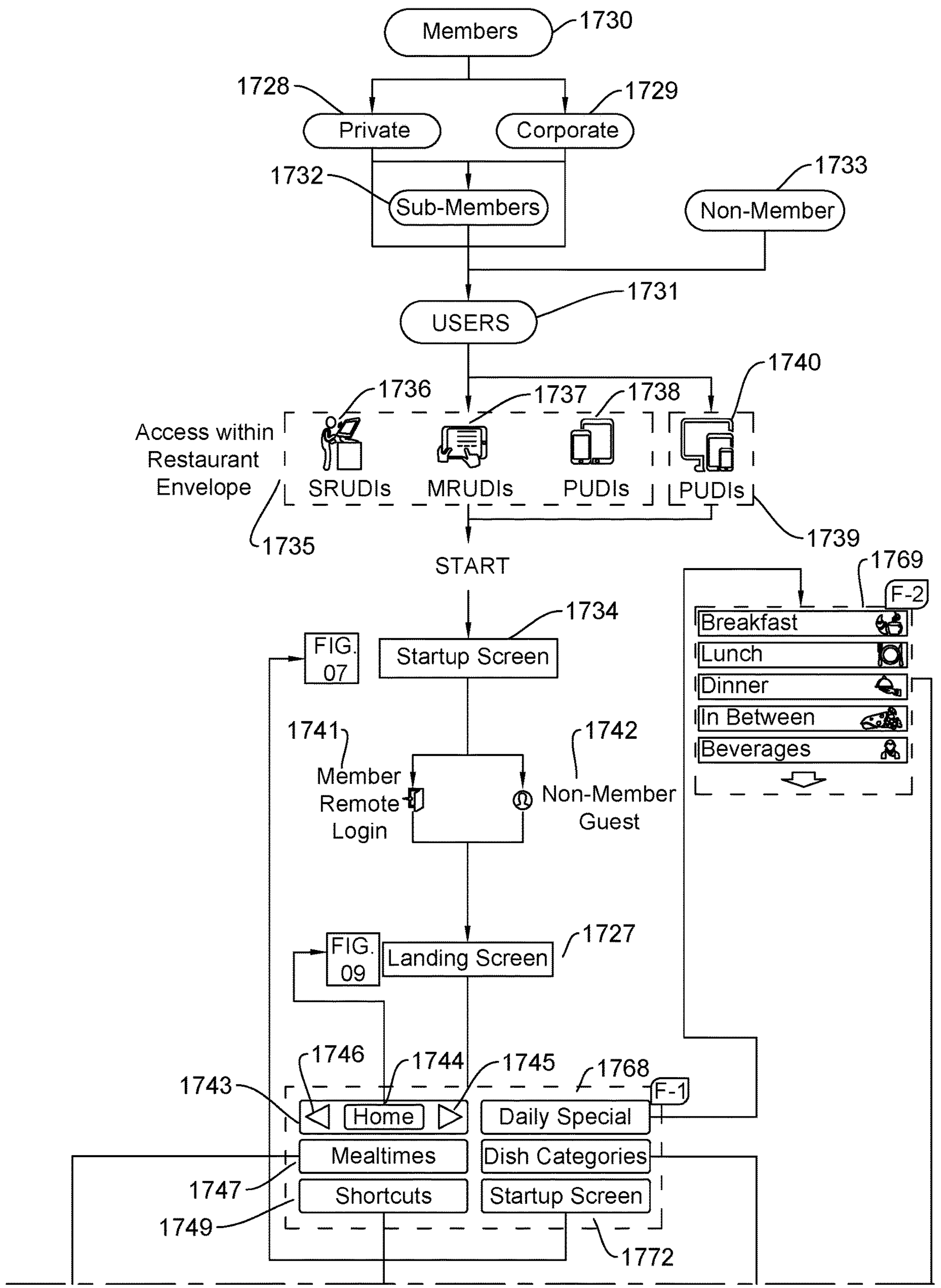
FIG. 28 illustrates a diagram of the standard menu segment of the landing screen illustrated exemplarily under FIG. 09 of the present invention of the CCOS 1.

Referring now to FIG. 28 there is illustrated a diagram of the standard menu segment of the landing screen 1727 of the present invention of the COOS 1, illustrated exemplarily under FIG. 09/Field F-1. Private 1728 and corporate 1729 member 1730 users 1731 their respective sub-members 1732 users 1731 and non-members 1733 users 1731 can access the startup screen 1734, illustrated exemplarily under FIG. 07, within a participating restaurant envelope 1735 using either the participating restaurant provided SRUDIs 1736 and MRUDIs 1737, or their PUDIs 1738. Member 1730 users 1731 and non-members 1733 users 1731 can also access the startup screen 1734 from remote locations 1739 using a plurality of PUDIs 1740. To access to the landing screen 1727, illustrated exemplarily under FIG. 09, member 1730 users 1731 must login 1741 to receive a access. Non-members 1733 users 1731 are allowed as guests 1742. The standard menu panel consists of a plurality of function tabs comprising of a triple function home function tab 1743. Selecting home 1744 returns to the landing screen 1727. Selecting forward 1745 or backward 1846 movement allows moving one step forward or backward. Selecting the mealtime function tab 1747 displays in field F-2 a plurality of mealtime categories 1748, also illustrated exemplarily under FIG. 10/Ref; 555. Selecting the shortcut function tab 1749 displays in field F-2 sets of shortcut displays 1750 for members 1730 users 1731 and for non-members 1733 users 1731. The respective displays 1750 and 1751 display an assemblment of shortcut functions tabs on a pre-named 1752 pane 1753. Member 1730 users 1731 can create new panes 1754 or rename existing panes 1755 in field F-3, and place a plurality shortcut function tabs onto a plurality of panes. Illustrated exemplarily, the placement or moving of shortcut function tabs is executed by pressing down a single or plurality of functions tabs until the function tabs change color, illustrated exemplarily for member reservations 1756, quick service reservation 1757, quick service to go 1758, and food delivery 1759, followed by activating the customize function tab 1760 in field F-9, illustrated exemplarily under FIG. 09/Ref 462; followed by pressing down on the new and empty order and delivery pane 1761 in field F-2 until the pane changes color; followed by de-activating the customize function 1762 in field F-9, which automatically results in the placement of the selected shortcut function tabs 1756, 1757, 1758, and 1759 on the "order and delivery pane" 1760, illustrated exemplarily by 1764, 1765, 1766, and 1767. Non-member 1733 users 1731 cannot customize. Selecting the daily special function tab 1768 displays in field F-2 a plurality of daily specials categories 1769. Selecting the dish category function tab 1770 displays in field F-2 all available menu items by dish category 1771, in a plurality of color backgrounds to distinguish between a plurality of mealtimes 1748 and also daily specials 1769. Selecting the startup screen function tab 1772 returns the screen to the startup screen, illustrated exemplarily under FIG. 07.

FIG. 29

Figure 29:
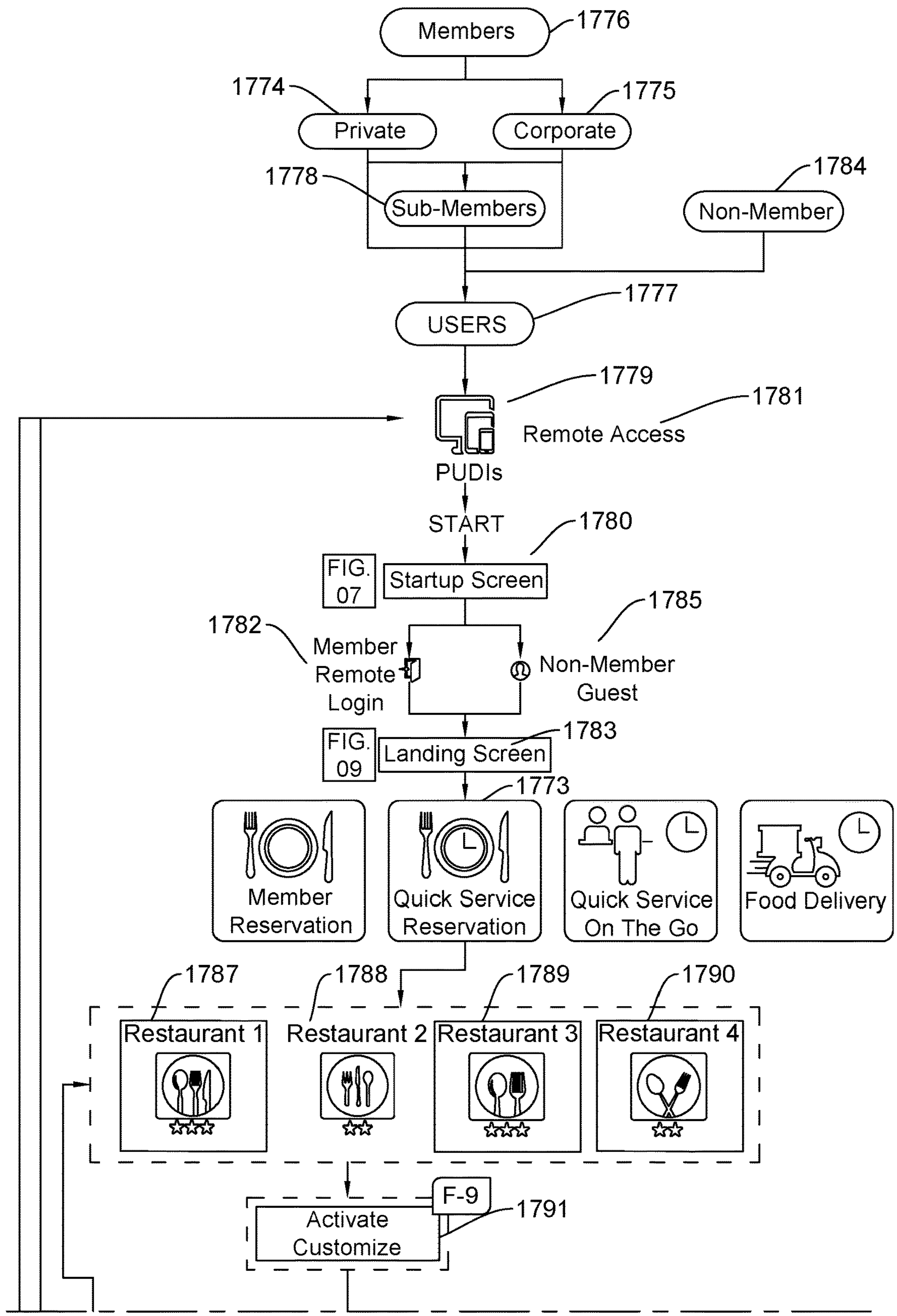
FIG. 29 illustrates a diagram of the shortcut menu function process, exemplarily for the pre-order quick service reservation shortcut of the present invention of the CCOS 1.

Referring now to FIG. 29 there is illustrated a diagram of the shortcut menu function process, exemplarily for the pre-order quick service reservation shortcut 1773, illustrated exemplarily under FIG. 28/Ref 1765. Private 1774 and corporate 1775 member 1776 users 1777 their respective sub-members 1778 users 1777 can use this function to pre-screen potential restaurants for seat availability on an specific date and time before selecting a final restaurant choice, and make a pre-order of menu items. Member 1776 users 1777 can use their PUDIs 1779 to access the startup screen 1780, illustrated exemplarily under FIG. 07, from a remote location 1781. To access the landing screen, illustrated exemplarily under FIG. 09, and login 1782 to receive a access to the landing screen 1783, illustrated exemplarily under FIG. 09. Non-members 1784 users 1777 are allowed as guests 1785, but cannot use this function unless during introduction and marketing drives. In operation when the quick service reservation shortcut 1773 is selected, a plurality of participating restaurants 1786 are displayed in field F-2. A plurality of restaurants are displayed, illustrated exemplarily as restaurant 1 1787 restaurant 2 1788, restaurant 3 1789, and restaurant 4 1790. A single or plurality of restaurants, illustrated exemplarily as restaurant 1 1787 restaurant 3 1789, and restaurant 4 1790 are selected and identified by a colored frame. The customize function tab 1791 is activated and a popup window emerges 1792. A date is selected 1793, using an interactive calendar 1794, a time is determined 1795, using an interactive number pad 1796, providing an estimated arrival time (ETA) 1797 and the estimated duration of stay (EDS) 1798. Dining preferences can be selected from a plurality of dropdown menu preferences, illustrated exemplarily as cuisine type 1799 embracing the relevant cuisine types, illustrated exemplarily under FIG. 26, ambiance 1800 using criteria established based on a plurality of pre-set standards, location 1801 that can include an interactive map, and price range 1802 based on menu pricing of a plurality of participating restaurants. Additional preferences 1803 can be added during customization like for seating or table selection from an interactive restaurant table and seat floor plan. When the search function tab 1804 is selected, the front of house module of the relevant restaurants within the COOS 1 reviews a plurality of relevant data from a plurality of selected participating restaurants 1787, 1789 and 1790, and filters out the potential restaurants that meet the particular required criteria. Search results 1805 are displayed 1806 in field F-2, comprising of the potential restaurants, illustrated exemplarily as restaurant 1 1807 (1787) and restaurant 4 1808 (1790) including any personal menus related to the said restaurants 1807 and 1808, illustrated exemplarily as set of personal menu 1809 and 1810. Unsuccessful search results 1811 displays again the original display in field F-2 with initially selected restaurants 1787 and 1789 and 1790 identified, allowing for a revised search. A particular restaurant can be selected, illustrated exemplarily as restaurant 4 1812. Upon selection, the front of house module of the relevant restaurants within the COOS 1 executes a booking for the ETA 1797 for the EDS 1798 at the selected 1812 restaurant 4 1808. The booking is established and confirmed 1813 to the member 1776 users 1777 PUID 1779 and to the restaurant 4 1814 and reflected on the relevant screens on a plurality of relevant SUDIs 1805 of the said selected restaurant 1814, including a plurality of relevant data and information related to the particular member 1776 user 1777 who made the pre-order quick service reservation. A single or plurality menu item can be selected 1816 from the standard restaurant menu 1817 and/or from the plurality of personal menus, illustrated exemplarily as 1818, including customization of menu items, illustrated exemplarily under FIG. 26. When menu items are selected 1819 the order can be viewed, placed, and payment executed 1820 using the triple function tabs, illustrated exemplarily under FIG. 09/Ref 412, 423 and 424. The customize function tab is automatically de-activated 1821 upon payment 1822. Upon payment 1822, restaurant 4 1814 receives the order 1823 for menu items that are tied to the said reservation 1813, and is placed but held 1824 in the relevant SUDIs involved in the preparation and cooking of the menu items, illustrated exemplarily as 1825 and 1826. A table and/or seat booking is also scheduled and established 1827, illustrated exemplarily under FIG. 4/Ref; 191 and FIG. 5/Ref; 242, and confirmed back to the member 1776 users 1777 PUDI 1779. Upon arrival 1828 at the said restaurant 4 1829 the said member 1776 user 1777 has three option to proceed. Either directly to the seat and/or table 1830, the customer service counter 1831, or to the entrance column 1832. When the member 1776 users 1777 goes directly to the designated table 1827 and hold the PUDI 1779 in close proximity to the sets of customizable and programmable waterproof and +95° Celsius heat resistant NFCs/RFIDs devices, illustrated exemplarily under FIG. 4/Ref; 166, 167, 168 or 169. The member 1776 users 1777 arrival 1828, reservation 1813, and order of menu items 1823 is identified 1833 and its retrieval service and instructions communicated 1834 to the relevant SUDIs, illustrated exemplarily as 1825 and 1826. Menu items are prepared and served 1835. When the member 1776 users 1777 goes to the customer service counter 1831, the member 1776 users 1777 can place the PUDI 1779 on a designated a sets of customizable and programmable waterproof and +95° Celsius heat resistant NFCs/RFIDs devices, illustrated exemplarily under FIG. 4/Ref; 166, 167, 168 or 169. The member 1776 users 1777 arrival 1828, reservation 1813, and order of menu items 1823 is identified 1833 on the SUDI screen of the customer service counter. The member 1776 users 1777 is guided to the designated seat and/or table 1827. The retrieval of the order of menu items 1823 is executed and service instructions communicated 1834 to the relevant SUDIs, illustrated exemplarily as 1825 and 1826. Menu items are prepared and served 1835. When the member 1776 users 1777 goes to the entry service column 1832 and holds the PUDI 1779 in close proximity to the sets of customizable and programmable waterproof and +95° Celsius heat resistant NFCs/RFIDs devices at the entry service column 1832, the member 1776 users 1777 arrival 1828, reservation 1813, and order of menu items 1823 is identified 1833 and its retrieval service and instructions communicated 1834 to the relevant SUDIs, illustrated exemplarily as 1825 and 1826. Menu items are prepared and served 1835. Upon having consumed the menu items the said member 1776 users 1777 can leave 1836 without having to wait for payment service.

FIG. 30

Figure 30:
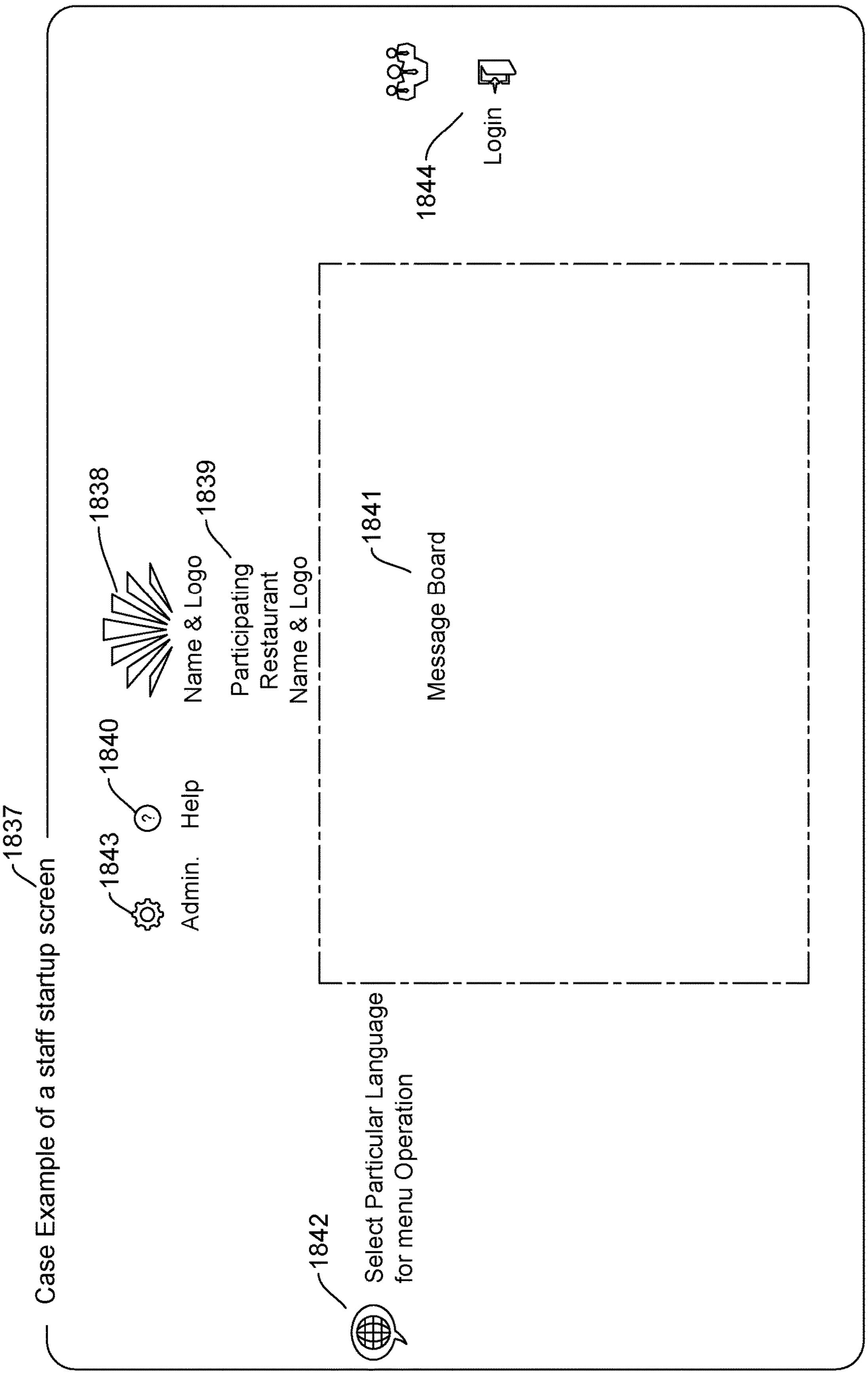
FIG. 30 illustrates exemplarily a startup screen for a plurality of SUDIs, illustrated exemplarily under FIG. 30 providing a plurality of staff users and third party users the mode to access to the CCOS 1.

Referring now to FIG. 30 illustrating exemplarily a startup screen 1837 for a plurality of SUDIs, illustrated exemplarily under FIG. 01 and FIG. 03, and the online landing screens for a plurality of third parties, illustrated exemplarily under FIG. 01 providing a plurality of staff users and third party users the mode to receive access to the CCOS 1. The startup screen 1837, when activated, identifies the CCOS 1 brand by name and logo 1838, and allows for the display of the name of the said participating restaurant 1839. The help function tab 1840 provides assistance within the interactive message board 1841 allowing for the selection of a plurality of main and sub-categories. The language select option 1842, although visible, can only be used through the administration function 1843 to set the primary language. The login function 1844 is for third party users only, allowing for the customization and implementation of a plurality of login protocols that can be adapted for login development evolutions over time. The message board can display a plurality of messages and information targeted to particular third parties during the login 1844 process.

FIG. 31

Figure 31:
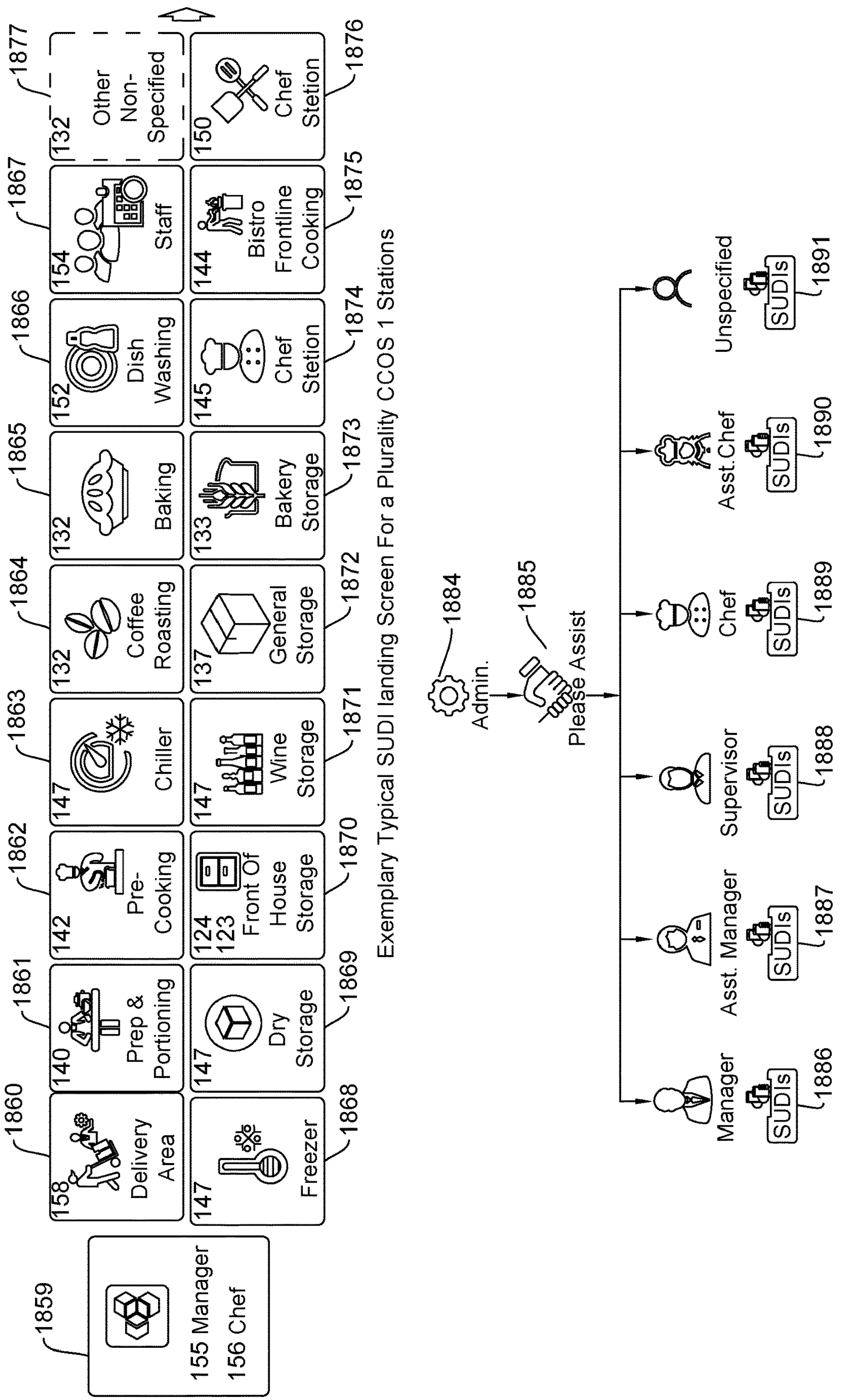
FIG. 31 illustrates exemplarily a typical SUDI landing screen 1845 for the head office, subsidiary, representation offices, branch offices, and participating restaurants of the present invention of the CCOS 1.

Referring now to FIG. 31 illustrating exemplarily a typical SUDI landing screen 1845 for the head office 1846, subsidiary, representation offices, or branch offices 1847, participating restaurants 1848, illustrated exemplarily under FIG. 01 and FIG. 03, and the online landing screen for a plurality of third parties 1849, illustrated exemplarily under FIG. 01. A typical SUDIs landing screen 1850 comprises of a station segment select 1851, an administration and service segment 1852, a staff and station segment 1853, a customizable multi purpose segment 1854, a customizable information and function tab segment 1855, and a customizable main menu segment 1856. Within the station select segment 1851, illustrated exemplarily as field F-1 is a fixed segment 1857 and a horizontal scrollable segment 1858. For restaurant used SUDIs, the fixed segment 1857 is designated for the manager and chef function tab 1859, and the horizontal scrollable segment 1858 is designated for a plurality of station function tabs, illustrated exemplarily as a delivery station function tab 1860, illustrated exemplarily under FIG. 03/Ref; 158 and FIG. 41, a preparation and portioning station function tab 1861, illustrated exemplarily under FIG. 03/Ref; 140 and FIG. 39, a pre-cooking station function tab 1862, illustrated exemplarily under FIG. 03/Ref; 142 and FIG. 37, a chiller storage station function tab 1863, illustrated exemplarily under FIG. 03/Ref; 147, a coffee roasting station function tab 1864, illustrated exemplarily under FIG. 03/Ref; 131, a baking station function tab 1865, illustrated exemplarily under FIG. 03/131, a pot and dishwashing station function tab 1866, illustrated exemplarily under FIG. 00/Ref; 152, a staff entry/exit station function tab 1867, illustrated exemplarily under FIG. 03/Ref 154, a freezer storage station function tab 1868, illustrated exemplarily under FIG. 03/Ref; 147, a dry storage station function tab 1869, illustrated exemplarily under FIG. 03/Ref; 147, a front of house storage station function tab 1870, illustrated exemplarily under FIG. 03/Ref; 123 and 124, a wine storage station function tab 1871, illustrated exemplarily under FIG. 03/Ref; 147, a general storage station function tab 1872, illustrated exemplarily under FIG. 03/Ref; 147, a bakery storage station function tab 1873, illustrated exemplarily under FIG. 03/Ref; 133, a chef station function tab 1874, illustrated exemplarily under FIG. 03/145, a frontline cooking station function tab 1875, illustrated exemplarily under FIG. 03/Ref; 144, and a teppanyaki frontline cooking station function tab 1876, illustrated exemplarily under FIG. 03/Ref; 150. Additional function tabs can be added during customization, illustrated exemplarily as 1877. Within the administration and service segment 1852 and within a fixed segment 1878 in field F-2 is an administration function tab 1879, a help function tab 1880, space for a logo and date and time 1881, a search function tab 1882, and please assist function tab 1883 that can be pre-set, involving the administration function 1884 to send, upon selection 1885 a request for assistance to a single to plurality of SUDIs, illustrated exemplarily to the manager 1886, the assistant manager 1887, the supervisor 1888, the chef 1889, and the assistant chef 1890, or any additional SUDIs 1891 is added during customization. Within the staff and station segment 1853 and within the horizontal scrollable 1892 in field F-3 is the authorized staff ID display for any particular SUDI, illustrated exemplarily as staff 1 1893, staff 2 1894, and staff 3 1895. The related shift ID and working times for a shift is also displayed 1896, 1897, and 1898. Under the same staff and station segment 1853 within a fixed and vertical scrollable field 1899 of field F-4, the station ID 1900 is in the fixed portion of the field 1899, and the respective authorization levels 1901 relevant staff, displayed in field F-3, is displayed in the vertically scrolled field portion 1902 of field F-4, with any pending authorization highlighted 1903. Within the customizable multi purpose segment 1854 and within the multi segment vertical scrollable fields 1904 in field F-5, is a field that is customizable for information and function tabs as maybe required for a particular station, allowing for a single or plurality of dividable vertical display fields and function tabs 1905. Within the customizable display and function segment 1855 and within the horizontal scrollable segment 1906 of field F-6 is space for a plurality of function specific function tabs 1907, whereby the fixed segment 1908 in field F-7 is designated to display a plurality of information 1909. Within the customizable main menu segment 1856 and within the vertical scrollable segment 1910 in field F-8 is the expandable display for a plurality of menu function tabs, illustrated exemplarily as individual empty and customizable function tabs 1911, that allows also for the display or icon symbols 1912 to identify particular functions. The center field F-9 also allows for a single or plurality of dividable vertical display fields, exemplarily illustrated as 1913.

FIG. 32

Figure 32:
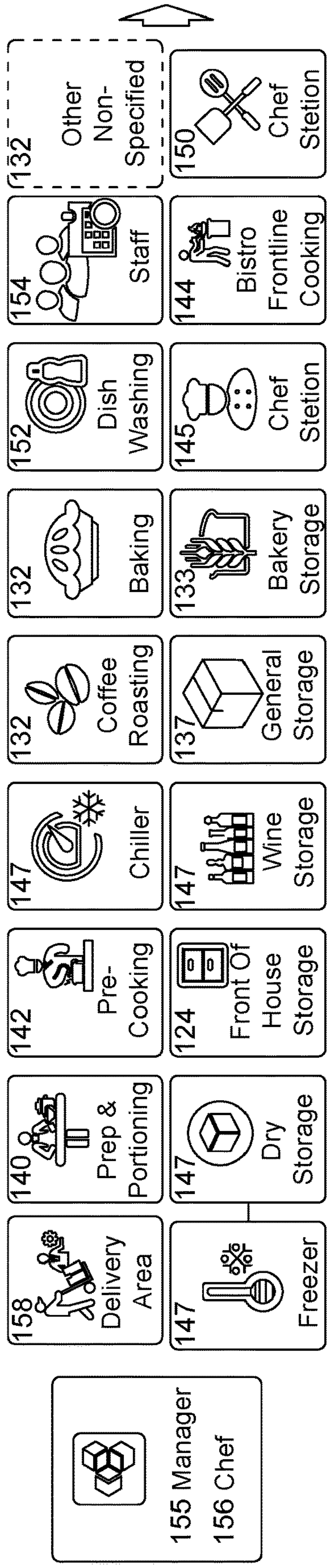
FIG. 32 illustrates exemplarily a typical SUDI landing screen of the present invention of the CCOS 1 for the managers SUDI of a participating restaurant.

Referring now to FIG. 32 illustrating exemplarily a typical SUDI landing screen 1914 for the managers SUDI, illustrated exemplarily under FIG. 03/Ref: 155. The upper segment 1915, is comparable to the illustrated exemplary typical landing screen under FIG. 30. Within the multi segment vertical scrollable fields 1916 is a customizable field displaying customizable function tabs linked to the relevant plurality of the main menu function tabs within the vertical scrollable segment 1917. Within the horizontal scrollable segment 1918 is the space for a plurality of action specific function tabs 1919, whereby the fixed segment 1920 is designated to display a plurality of incoming alerts and notifications 1921 from a plurality of other SUDI stations. Within the vertical scrollable segment 1922 is the display for a plurality of main menu function tabs for the managers SUDI station, illustrated exemplarily as login/logout function tab 1923 that, when selected, allows for a log-in/logout protocol to be completed in field F-5. The summary data function tab 1924, when selected, opens a plurality of categories, illustrated exemplarily as financial summary 1925, cover summary 1926, and trend summary 1927, that can be jointly or individual selected. Each said category is linked to a plurality of customizable specific select function tabs 1928 in field F-5 that automatically align themselves conforming to the selection made under the respective category function under the summary data 1924, providing a plurality of display options that transform and adjust in field F-9, illustrated exemplarily for a cover summary of the fast food segment 1930. The display in field F-9 can be printed 1931, can be saved to a specific or plurality of files 1932, send to the head office 1933 or branch office 1934 or shared assigning other function tabs, illustrated exemplarily as 1935 and 1936 during a customization. The staff station function tab 1937 allows for the review of all stations within a restaurant envelope, illustrated exemplarily as line cook stations 1938, teppanyaki stations 1939, pre-cook stations 1940, and preparation and portioning stations 1941 that allows for the display in field F-9 of particular details, illustrated under FIG. 35. A plurality of select function tabs in field F-5 provide for further information. Visual observation feeds can also be added in field F-5 from cameras illustrated exemplarily under FIG. 03/Ref 159. The current storage inventory and inventory movement can be reviewed under the storage and inventory function tab 1942, illustrated exemplarily for the current inventory within the chiller 1943 and the current realtime status IN and OUT of the chiller 1944. The current inventory is displayed in field F-9 in form of alpha numerical data and information, and in graphic formats that derive from the tracing of a plurality of sets of NFCs/RFIDs affixed to crates and trays. The realtime inventory movement also deriving from the tracing of a plurality of sets of NFCs/RFIDs affixed to crates and trays, and displays in the same field F-9, is reflected by identification of particular stations to which inventory is moved or retrieved from. The relevant responding details are reflected in field F-5. The staff performances for each station throughout the restaurant can be assessed. Selecting the staff performance function tab 1945, opens a plurality of station 1946 under which the authorized staff 1947 for each station are listed. Performance reports are listed as files in field F-5, and station performances are reflected as line graphics in field F-9, reflecting the customizable targeted time a performance have to be accomplished, an actual time achieved, and a plurality of marks for incomplete and failed performances. The economic function tab 1948 allows for the review of past, current, and projected utility related costs and expenses 1949, staff related matters 1950, marketing related, and a plurality of other non-illustrated. In field F-5 specific economical can be identified and reflected in field F-9. There is also a memo and letter function tab 1951 that allows the use of a plurality of templates for communication, including auto-alpha-numeric references and sender identification. There is also a report function tab 1952, when activated, automatically compiles a pre-set customizable set of data and information in one action. The place order function tab 1953 allows for the selection of a plurality of different categories of purchase orders. Selecting the regular purchase order (RPO) 1954 generates a autocompiled RPO in field F-9. Individual items and quantities of a RPO derive from the ingredient inventory module within the COOS 1, identified and compiled based on a pre-set customizable inventory level for every ingredient, which is automatically updated and revised based on the established consumption level within the analytical module within the COOS 1. Prior sending a RPO for approval, adjustments can be recommended in a special column for individual approval. The same procedure applies when using the place service order function tab 1955. The supply schedules function tab 1956 and the service schedule function tab 1957 allows for the display and review of a plurality of supply and service schedules 1958 and 1959. There is also a scan function tab 1960 that allows for the scanning and determination in which folder a scanned document is placed, displaying a plurality of folders to select from in field F-5. Additional function tabs can be added during customization, illustrated exemplarily as 1961. The displays in field F-9 is illustrated exemplarily the current realtime of cover summary 1962 including total seats 1963 and average seat turns 1964 for the fast food segment 1965, which is a sub-function tab under the summary data 1924. It allows, applying a single or plurality of select function tabs in field F-5 to expand on the basic customer cover data 1962. Exemplarily is shown a breakdown by female morning 1966 and afternoon shift 1967, and male morning 1968 and afternoon shift 1969; and further broken down by covers ordered by non-members 1970, members 1971, and usage of coupons 1972, with average customers for each category group also shown 1973, 1974, 1975, and 1976. The signup membership data, divided by shift 1977 is also shown, which can be further divided by female and male customer and age group.

FIG. 33

Figure 33:
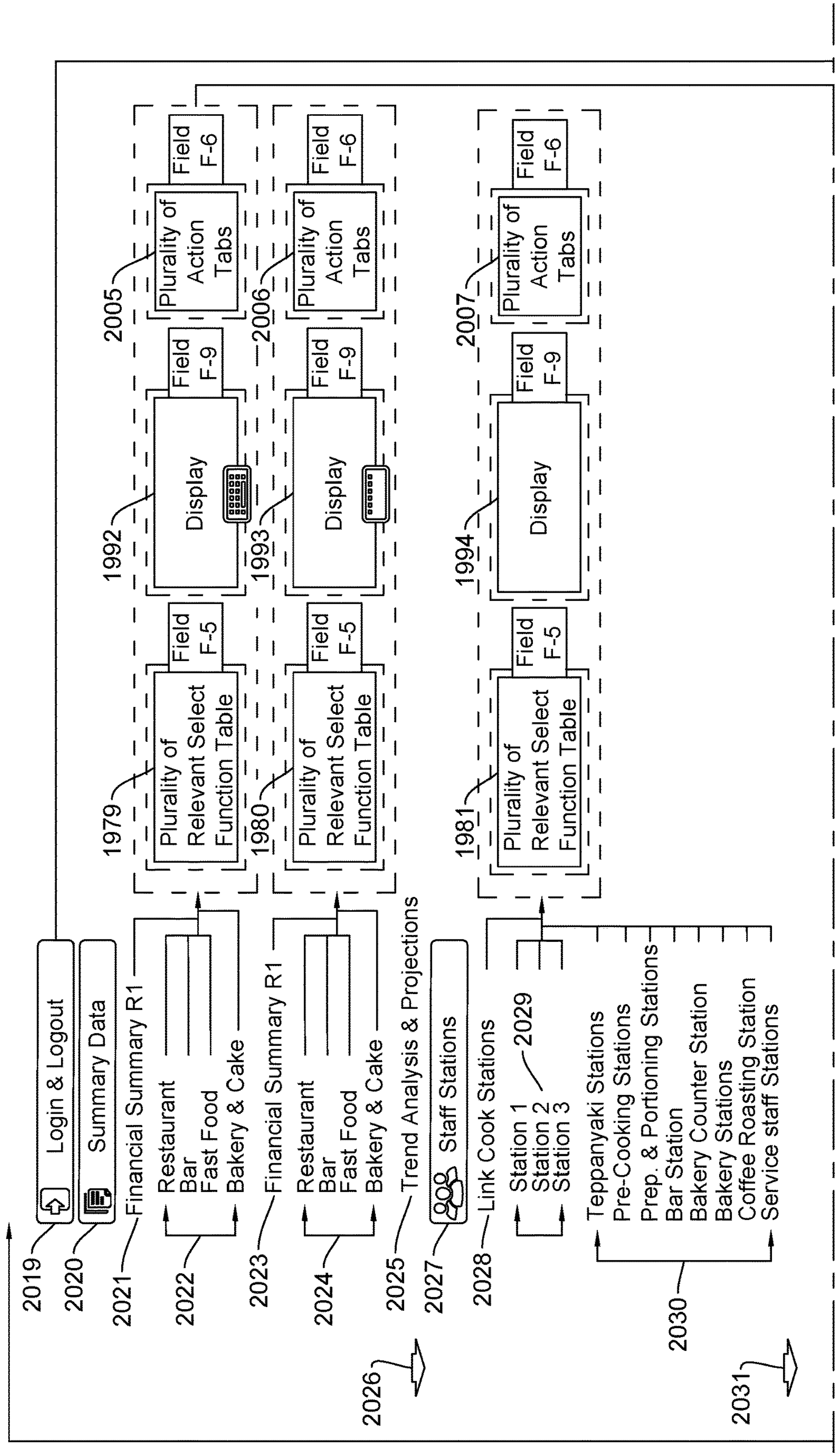
FIG. 33 illustrates exemplarily the managers SUDI landing screen plurality of customizable main menu function tabs of the present invention of the CCOS 1.
Figure 34:
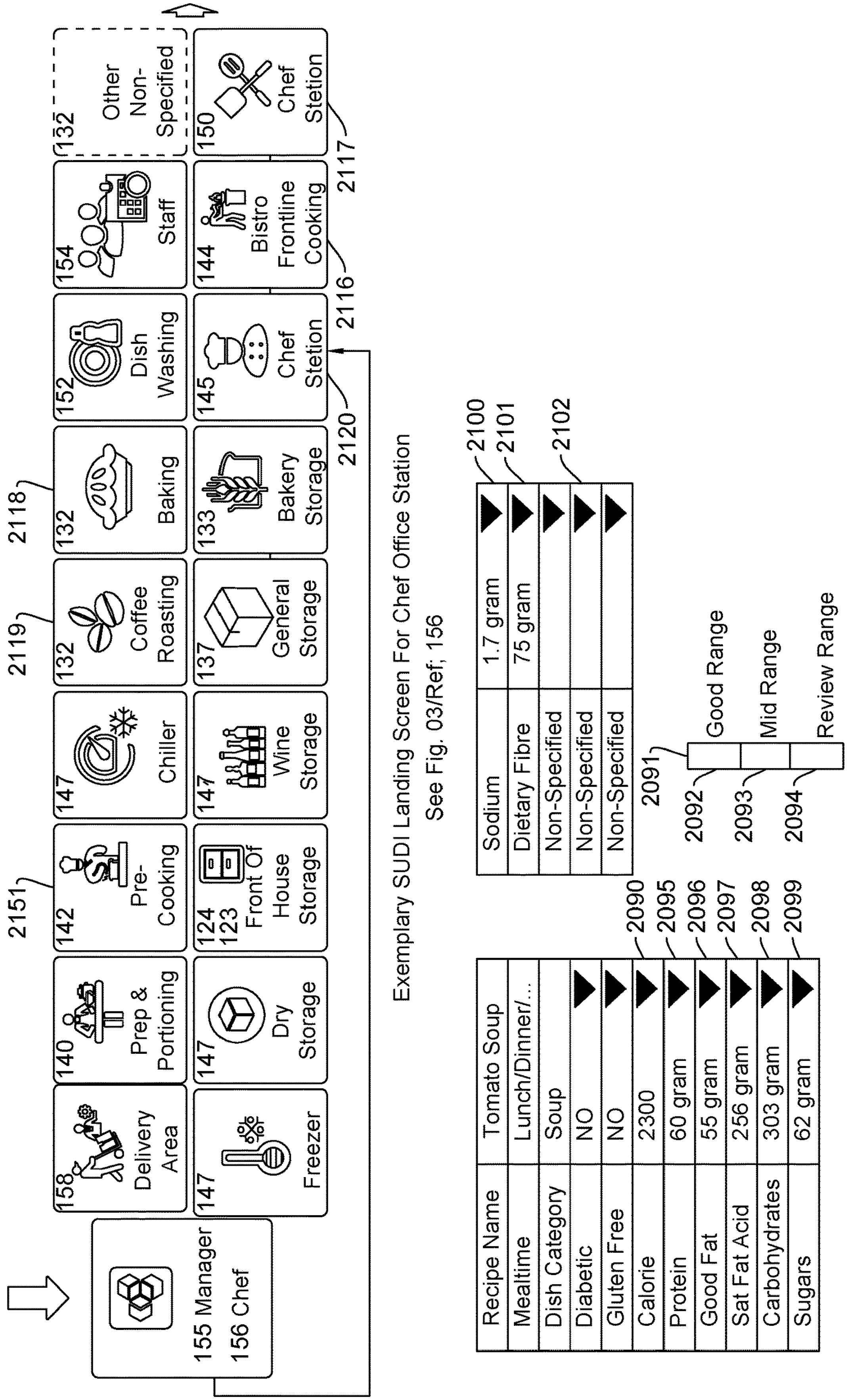
FIG. 34 illustrates exemplarily a typical SUDI landing screen of the present invention of the CCOS 1 for the chefs SUDI of a participating restaurant.

Referring now to FIG. 33 illustrating the exemplarily SUDI landing screen for a manager, illustrated exemplarily under FIG. 32/Ref: 1914 and its plurality of customizable main menu function tabs, jointly referred to as 1978 and their individual corresponding plurality of customizable select function tabs 1979, 1980, 1981, 1982, 1983, 1984, 1985, 1986, 1987, 1988, 1989, 1990, 1991 in field F-5 that allow the user to transform, based on the distinctive designated function, a single or plurality of displays in field F-9, illustrated exemplarily as 1992, 1993, 1994, 1995, 1996, 1997, 1998, 1999, 2000, 2001, 2002, 2003, 2004, that can be further influenced by a plurality of customizable corresponding action function tabs, illustrated exemplarily as 2005, 2006, 2007, 2008, 2009, 2010, 2011, 2012, 2013, 2014, 2015, 2016, 2017 in field F-4. Functions and processes interact and communicate wireless through the internet with a plurality of independent interlinked modules within the COOS 1 through a RMNS 2018. In operation, there is a login/logout function tab 2019 that allows a plurality of authorized staff users, illustrated exemplarily under FIG. 32, to access and use the plurality of functions for this landing screen 1914. There is a summary data function tab 2020 with a sub-function tab for financial summary 2021 that provides for comprehensive realtime financial summary gathered from a single or plurality of participating restaurants, illustrated exemplarily as an auto-numbered financial summary for R1, deriving from a plurality of data, illustrated exemplarily under FIG. 49, 50, 51, 52, 53, which can, using the plurality of relevant select function tabs 1979 in field F-5, transform the display 1992 in field F-9, comment text added using a virtual keyboard, and allow action to be taken through the use of a plurality of action tabs 2005 in field F-6. A plurality of realtime financial data, and historic data, can also be retrieved and displayed from a plurality of individual segments, illustrated exemplarily as 2022 within a participating restaurant. The same concept applies to cover summary 2023 and individual segments 2024 under the cover summary 2023, involving also a plurality of relevant select function tabs 1980 in field F-5, the display 1993 in field F-9, add comment text using a virtual keyboard, and execute action through a plurality of action tabs 2006 in field F-6. There is also a trend analysis and projections function tab 2025 that allows drill-down into a plurality of financial data, and related covers, and customize all said data and covers for hypothetical exercises and projections, also involving a plurality of relevant select function tabs 1980 in field F-5, the display 1993 in field F-9, add comment text using a virtual keyboard, and execute action through a plurality of action tabs 2006 in field F-6. These main menu function tabs are customizable and extendable to add and include additional main function tabs 2026. Any retrieved summary data 2020, must be acknowledged by sign-in password confirming such said information and data was read, or screen switches to a screenwide logo, resulting in a screen block and a report to the head office. There is also a staff station function tab 2027 that allows the manager to see, in realtime, activities of other screen displays, illustrated exemplarily for line cook stations 2028, and particularly station 2 2029. Using the plurality of relevant select function tabs 1981 in field F-5, the manager can transform the display 1994 in field F-9, add comment text using a virtual keyboard, and execute action through a plurality of action tabs 2007 in field F-6. The same concept applies for the plurality of other individual segments, illustrated exemplarily as 2030. These main menu function tabs are customizable and extendable to add and include additional main function tabs 2031. Any access to staff stations 2027, must be acknowledged by sign-in password confirming such said information and data was read, or screen switches to a screenwide logo, resulting in a screen block and a report to the head office. There is also a storage inventory function tab 2032 that allows the manager to see a realtime inventory data report 2033 including but not limited to a total and plurality of usages, reserves, and requirements. Using the plurality of relevant select function tabs 1982 in field F-5, the manager can transform the display 1995 in field F-9 and execute action to be taken through the use of a plurality of action tabs 2008 in field F-6, including the displaying and furnishing of breakdown reports for a plurality of storages, illustrated exemplarily as 2034. The general inventory 2035 refers to the entire fixed and movable inventory Fixtures, Furniture, and Equipment, and a plurality of other items like tableware and alike, including their original and residual value, and their projected replacements. Using the plurality of relevant select function tabs 1982 in field F-5, the manager can transform the display 1995 in field F-9, add comment text using a virtual keyboard, and execute action through the use of a plurality of action tabs 2008 in field F-6. These main menu function tabs are customizable and extendable to add and include additional main function tabs 2036. Any access and review of storage & Inventory 2032, must be acknowledged by sign-in password confirming such said information and data was read, or screen switches to a screenwide logo, resulting in a screen block and a report to the head office. There is also a staff performance function tab 2037 that allows the manager to see, in realtime, activities and performances of a plurality of staff, illustrated exemplarily for front of house staff 2038, and particularly for staff 3 2039. Performances are monitored, exemplarily illustrated under FIG. 05 and FIG. 36. Using the plurality of relevant select function tabs 1983 in field F-5, the manager can transform the display 1996 in field F-9, add comment text using a virtual keyboard, and execute action through the use of a plurality of action tabs 2009 in field F-6. The same concept applies for the plurality of other individual segments, illustrated exemplarily as 2040. These main menu function tabs are customizable and extendable to add and include additional main function tabs 2041. Any access and review of staff performance 2037, must be acknowledged by sign-in password confirming such said information and data was read, or screen switches to a screenwide logo, resulting in a screen block and a report to the head office. There is also an economic function tab 2042 that allows the manager to see, in realtime, economical data, illustrated exemplarily for a plurality of facility and utility related data, staff cost related, and ingredient inventory related 2043. Using the plurality of relevant select function tabs 1984 in field F-5, the manager can transform the display 1997 in field F-9, add comment text using a virtual keyboard, and execute action through the use of a plurality of action tabs 2010 in field F-6. These main menu function tabs are customizable and extendable to add and include additional main function tabs 2044. Any access to economics 2042, must be acknowledged by sign-in password confirming such said information and data was read, or screen switches to a screenwide logo, resulting in a screen block and a report to the head office. There is also a communication function tab 2045 that allows the manager to furnish and communicate, using a plurality of auto-numbered communication templates addressed to a plurality of authorised and designated parties 2046 that are organized under a plurality of relevant select function tabs 1985 in field F-5. The display 1998 in field F-9 serves are text field with virtual keyboard function. Actions can be taken through the use of a plurality of action tabs 2011 in field F-6. These main menu function tabs are customizable and extendable to add and include additional main function tabs 2047. Any access to the communication function 2045, must be acknowledged by sign-in password confirming such said information and data was read, or screen switches to a screenwide logo, resulting in a screen block and a report to the head office. There is also a report function tab 2048 that allows the manager to furnish and communicate a single or plurality of auto-numbered reports to pre-set designated parties, using a plurality of report templates and designated parties 2049 organized under a plurality of relevant select function tabs 1986 in field F-5. The display 1999 in field F-9 serves are text field with virtual keyboard function. Actions can be taken through the use of a plurality of action tabs 2012 in field F-6. These main menu function tabs are customizable and extendable to add and include additional main function tabs 2050. Any access to the report function 2048, must be acknowledged by sign-in password confirming such said information and data was read, or screen switches to a screenwide logo, resulting in a screen block and a report to the head office. There is also a purchase order function tab 2051 that allows the manager to furnish and forward a plurality of auto-numbered e-purchase orders, illustrated exemplarily as standing purchase order, followup purchase orders, and one-off purchase orders 2052 through the pre-set approval stages, whereby active operational supplier designated blank e-purchase orders are loaded into the system by the head office, and are organized alphabetically by suppliers under the relevant plurality of relevant select function tabs 1987 in field F-5. The display 2000 in field F-9 serves are e-purchase order text field, allowing for virtual keyboard. A plurality of actions can be taken through the use of a plurality of action tabs 2013 in field F-6. These main menu function tabs are customizable and extendable to add and include additional main function tabs 2053. Any access to the purchase order function 2051, must be acknowledged by sign-in password confirming such said information and data was read, or screen switches to a screenwide logo, resulting in a screen block and a report to the head office. There is also a service order function tab 2054 that allows the manager to furnish and forward a plurality of auto-numbered and e-service orders, illustrated exemplarily as standing service order, followup service orders, and one-off service orders 2055 through the pre-set approval stages, whereby active operational service provider designated but blank e-service orders are loaded into the system by the head office, and are organized alphabetically by service provider under the relevant plurality of relevant select function tabs 1988 in field F-5. The display 2001 in field F-9 serves are e-service order text field, allowing for virtual keyboard. A plurality of actions can be taken through the use of a plurality of action tabs 2014 in field F-6. These main menu function tabs are customizable and extendable to add and include additional main function tabs 2056. Any access to the purchase order function 2051, must be acknowledged by sign-in password confirming such said information and data was read, or screen switches to a screenwide logo, resulting in a screen block and a report to the head office. There is also a supply and a service schedule function tab 2057 and 2058 that allows the manager to review, amend, and forward a plurality of auto-numbered and e-schedules, illustrated exemplarily as weekly and monthly PO schedules 2059 and weekly and monthly SO schedules 2060, that include, but are not limited to a plurality of financial and other related data and information. Using the plurality of relevant select function tabs 1989 and 1990 in field F-5, the manager can transform the display 2002 and 2003 in field F-9, add comment text using a virtual keyboard, and execute action through a plurality of action tabs 2015 and 2016 in field F-6. These main menu function tabs are customizable and extendable to add and include additional main function tabs 2061 and 20162. Any access to the supply and a service schedule function 2057 and 2058, must be acknowledged by sign-in password confirming such said information and data was read, or screen switches to a screenwide logo, resulting in a screen block and a report to the head office. There is also a scan function tab 2063 that allows the manager to scan, file, and forward a plurality of scanned documents to a plurality of recipient, and auto-attach said scanned documents to existing processes, action, and activities. Using the plurality of relevant select function tabs 1991 in field F-5, the manager can transform the display 2004 in field F-9, add comment text using a virtual keyboard, and execute a plurality of action through the use of a plurality of action tabs 2008 in field F-6. Any access to the scan function 2063 must be acknowledged by sign-in password confirming such said information and data was read, or screen switches to a screenwide logo, resulting in a screen block and a report to the head office. There is also a loyalty program function tab 2064 that allows the manager to review and act upon for verification, on any membership and loyalty program matters. Using the plurality of relevant select function tabs 1991 in field F-5, the manager can transform the display 2004 in field F-9, add comment text using a virtual keyboard, and execute a plurality of action through the use of a plurality of action tabs 2008 in field F-6. Any access to the loyalty program function 2064 must be acknowledged by sign-in password confirming such said information and data was read, or screen switches to a screenwide logo, resulting in a screen block and a report to the head office. More main menu function tabs can be added during customization, illustrated exemplarily as 2065.

FIG. 34

Referring now to FIG. 33 illustrating exemplarily a typical SUDI landing screen 2066 for the chefs SUDI, illustrated exemplarily under FIG. 03/Ref: 158. The upper segment 2067, is comparable to the illustrated exemplary typical landing screen of the managers SUDI, illustrated exemplarily under FIG. 32. Within the vertical scrollable segment 2068 are a plurality of main function tabs 2069 that are comparable to the screen display for the manager, illustrated under FIG. 33 and FIG. 35 that are linked to a plurality of customizable function, illustrated exemplarily as 2070. Illustrated exemplarily for this screen display the main function tabs are the same as for the manager, except for the menu engineering function tab 2071. The menu engineering function tab 2071 is selected, resulting in the display of a plurality of relevant corresponding menu function tabs 2072. The menu item lunch function tab 2073, and its related recipe sheet function tab 2074 is selected, that is displays in field F-9 a recipe sheet. Within the horizontal scrollable segment 2075 is the space for a plurality of action specific function tabs referred to under FIG. 32, with addition to show nutrition loss guide and GI/GL and diabetic exchange guide 2076, whereby the fixed segment 2077 is designated to display a plurality of incoming alerts and notifications 2078 that arrive in from a plurality of other SUDI stations. A menu item lunch 2073 recipe sheet 2074 is illustrated exemplarily in field F-9. An auto ID 2079 and an auto date and time 2080 is given to allow cataloguing and tracing. Within the vertical scrollable field, a recipe name is given 2081 using the virtual keyboard. A mealtime category is selected 2082, allowing for multiple choices, that correspond to the mealtime function tab illustrated under menu screen for customers, illustrated under FIG. 09/Ref 499. A dish category is selected 2083 that corresponds to the dish category function tab illustrated under menu screen for customers, illustrated under FIG. 09/Ref 500. A selection YES/NO 2084 is made to establish if the recipe for this menu item is suitable for diabetic. If YES is selected, additional columns are automatically added 2085 after measurements 2086 and the glycemic index and the glycemic load data, and diabetic exchanges are shown for each ingredient. A selection YES/NO 2087 is made to establish if the recipe for this menu item is gluten free or not. Ingredients 2088 for this menu items are selected from the plurality of dropdown menu lists, illustrated exemplarily as 2089. Measurements are selected from a plurality of dropdown lists of established measurements that correspond with all measurements applied for menu item including but not limited to customizations and creations, illustrated exemplarily for portioning under FIG. 18 and diabetic FIG. 19. If calories are being considered, the maximum calories 2090 are selected from the dropdown menu, whereby the dropdown menu displays numerical as well as a color code 2091, illustrated exemplarily for good range 2092, mid range 2093, and review range 2094 that are in line with an applied active PAL and other relevant data, illustrated exemplarily under FIG. 16. If a calorie level is selected, and the recipe exceeds the set calorie level, the alert display 2078 informs the chef to review the recipe or adjust the calorie setting. The same, including a plurality of various ranges of color codes 2091 are being applied, when selected, for nutritions, illustrated exemplarily for protein 2095, good fat 2096, saturated fatty acids 2097, carbohydrates 2098, sugars 2099, sodium 2100, and dietary fibre 2101, corresponding also to the data used under FIG. 16. Additional nutritions including vitamins and minerals can be added during customization, illustrated exemplarily as non-specified 2102. The recipe sheet also reflects the ingredient purchase cost 2103 for every ingredient, drawn from the raw and/or unprocessed ingredient data established during receipt, illustrated exemplarily under FIG. 42, and verified at relevant processing and portioning stations, illustrated under FIG. 40. The edible ingredient portion cost 2104 and the portion yield 2105 is drawn from the results or processed and ready portioned ingredients from the relevant processing and portioning stations, illustrated under FIG. 40. The recipe cost 2106 for each ingredient is also reflected. When composing a recipe, the cost per portion 2107, allowing for selection of the number of portions from a dropdown menu, the cost per recipe 2108, and the applied margin for portion 2109 are automatically established, allowing for an automatic or manual setting of margin 2110. The relevant menu price 2111, budget cost 2112, actual cost 2113, and break even selling price 2114 are also reflected. The recipes composed can be cooked and prepared, illustrated exemplarily at a plurality of pre-cooking stations 2115, frontline cooking stations 2116, teppanyaki frontline stations 2117. The same recipe sheet concept can be applied, with minor customization to the bakery 2118 and coffee roasting 2119. The chef can also load the recipe sheet on the chef station 2120, or on any other cooking station 2115, 2116, 2117 when composing and cooking the recipe. The chef can also use the auto picture function of the ISMs, illustrated under FIG. 03 and save a plurality of menu item pictures with the recipe 2121.

FIG. 35

Figure 35:
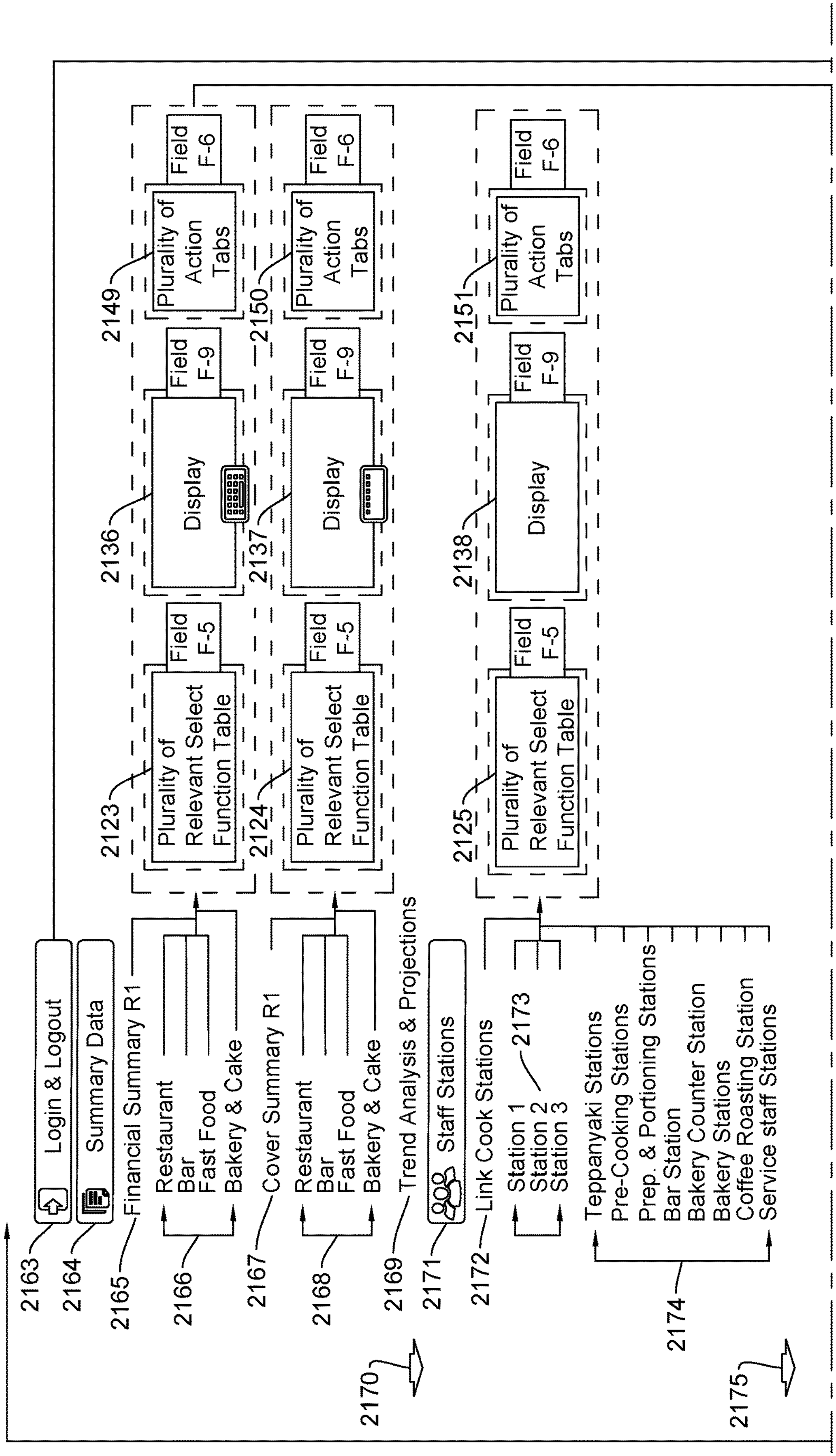
FIG. 35 illustrates exemplarily the chefs SUDI landing screen plurality of customizable main menu function tabs of the present invention of the CCOS 1.

Referring now to FIG. 35 illustrating the exemplary SUDI landing screen for the chef, illustrated exemplarily under FIG. 32/Ref: 2066 and its plurality of customizable main menu function tabs, jointly referred to as 2122 and their individual corresponding plurality of customizable select function tabs 2123, 2124, 2125, 2126, 2127, 2128, 2129, 2130, 2131, 2132, 2133, 2134, 2135 in field F-5 that allow the user to transform, based on the distinctive designated function, a single or plurality of displays in field F-9, illustrated exemplarily as 2136, 2137, 2138, 2139, 2140, 2141, 2142, 2143, 2144, 2145, 2146, 2147, 2148, that can be further influenced by a plurality of customizable corresponding action function tabs, illustrated exemplarily as 2149, 2150, 2151, 2152, 2153, 2154, 2155, 2156, 2157, 2158, 2159, 2160, 2161 in field F-4. Functions and processes interact and communicate wirelessly through the internet with a plurality of independent interlinked modules within the CCOS 1 through a RMNS 2162. In operation, there is a login/logout function tab 2163 that allows a plurality of authorized staff users, illustrated exemplarily under FIG. 32, to access and use the plurality of functions for this landing screen 2066. There is a summary data function tab 2164 with a sub-function tab for financial summary 2165 that provides for comprehensive realtime financial summary gathered from a single or plurality of participating restaurants, illustrated exemplarily as an auto-numbered financial summary for R1, deriving from a plurality of data, illustrated exemplarily under FIG. 49, 50, 51, 52, 53, which can, using the plurality of relevant select function tabs 2123 in field F-5, transform the display 2136 in field F-9, comment text added using a virtual keyboard, and allow action to be taken through the use of a plurality of action tabs 2149 in field F-6. A plurality of realtime financial data, and historic data, can also be retrieved and displayed from a plurality of individual segments, illustrated exemplarily as 2066 within a participating restaurant. The same concept applies to cover summary 2167 and individual segments 2168 under the cover summary 2167, involving also a plurality of relevant select function tabs 2124 in field F-5, the display 2137 in field F-9, add comment text using a virtual keyboard, and execute action through a plurality of action tabs 2150 in field F-6. There is also a trend analysis and projections function tab 2169 that allows drill-down into a plurality of financial data, and related covers, and customize all said data and covers for hypothetical exercises and projections, also involving a plurality of relevant select function tabs 2124 in field F-5, the display 2137 in field F-9, add comment text using a virtual keyboard, and execute action through a plurality of action tabs 2150 in field F-6. These main menu function tabs are customizable and extendable to add and include additional main function tabs 2170. Any retrieved summary data 2164, must be acknowledged by sign-in password confirming such said information and data was read, or screen switches to a screenwide logo, resulting in a screen block and a report to the head office. There is also a staff station function tab 2171 that allows the chef to see, in realtime, activities of other screen displays, illustrated exemplarily for line cook stations 2172, and particularly station 2 2173. Using the plurality of relevant select function tabs 2125 in field F-5, the manager can transform the display 2138 in field F-9, add comment text using a virtual keyboard, and execute action through a plurality of action tabs 2151 in field F-6. The same concept applies for the plurality of other individual segments, illustrated exemplarily as 2174. These main menu function tabs are customizable and extendable to add and include additional main function tabs 2175. Any access to staff stations 2171, must be acknowledged by sign-in password confirming such said information and data was read, or screen switches to a screenwide logo, resulting in a screen block and a report to the head office. There is also a storage inventory function tab 2176 that allows the chef to see a realtime inventory data report 2177 including but not limited to a total and plurality of usages, reserves, and requirements. Using the plurality of relevant select function tabs 2126 in field F-5, the chef can transform the display 2139 in field F-9 and execute action to be taken through the use of a plurality of action tabs 2152 in field F-6, including the displaying and furnishing of brake down reports for a plurality of storages, illustrated exemplarily as 2178. The general inventory 2179 refers to the entire fixed and movable inventory Fixtures, Furniture, and Equipment, and a plurality of other items like tableware and alike, including their original and residual value, and their projected replacements. Using the plurality of relevant select function tabs 2126 in field F-5, the manager can transform the display 2139 in field F-9, add comment text using a virtual keyboard, and execute action through the use of a plurality of action tabs 2152 in field F-6. These main menu function tabs are customizable and extendable to add and include additional main function tabs 2180. Any access and review of storage & Inventory 2176, must be acknowledged by sign-in password confirming such said information and data was read, or screen switches to a screenwide logo, resulting in a screen block and a report to the head office. There is also a staff performance function tab 2181 that allows the chef to see, in realtime, activities and performances of a plurality of staff, illustrated exemplarily for front of house staff 2182, and particularly for staff 3 2183. Performances are monitored, exemplarily illustrated under FIG. 05 and FIG. 36. Using the plurality of relevant select function tabs 2127 in field F-5, the manager can transform the display 2140 in field F-9, add comment text using a virtual keyboard, and execute action through the use of a plurality of action tabs

2153 in field F-6. The same concept applies for the plurality of other individual segments, illustrated exemplarily as 2184. These main menu function tabs are customizable and extendable to add and include additional main function tabs 2185. Any access and review of staff performance 2181, must be acknowledged by sign-in password confirming such said information and data was read, or screen switches to a screenwide logo, resulting in a screen block and a report to the head office. There is also an economic function tab 2186 that allows the chef to see, in realtime, economical data, illustrated exemplarily for a plurality of facility and utility related data, staff cost related, and ingredient inventory related 2187. Using the plurality of relevant select function tabs 2128 in field F-5, the manager can transform the display 2141 in field F-9, add comment text using a virtual keyboard, and execute action through the use of a plurality of action tabs 2154 in field F-6. These main menu function tabs are customizable and extendable to add and include additional main function tabs 2188. Any access to economics 2186, must be acknowledged by sign-in password confirming such said information and data was read, or screen switches to a screenwide logo, resulting in a screen block and a report to the head office. There is also a communication function tab 2189 that allows the chef to furnish and communicate, using a plurality of auto-numbered communication templates addressed to a plurality of authorised and designated parties 2190 that are organized under a plurality of relevant select function tabs 2129 in field F-5. The display 2142 in field F-9 serves are text field with virtual keyboard function. Actions can be taken through the use of a plurality of action tabs 2155 in field F-6. These main menu function tabs are customizable and extendable to add and include additional main function tabs 2191. Any access to the communication function 2189, must be acknowledged by sign-in password confirming such said information and data was read, or screen switches to a screenwide logo, resulting in a screen block and a report to the head office. There is also a report function tab 2192 that allows the chef to furnish and communicate a single or plurality of auto-numbered reports to pre-set designated parties, using a plurality of report templates and designated parties 2193 organized under a plurality of relevant select function tabs 2130 in field F-5. The display 2143 in field F-9 serves are text field with virtual keyboard function. Actions can be taken through the use of a plurality of action tabs 2156 in field F-6. These main menu function tabs are customizable and extendable to add and include additional main function tabs 2194. Any access to the report function 2192, must be acknowledged by sign-in password confirming such said information and data was read, or screen switches to a screenwide logo, resulting in a screen block and a report to the head office. There is also a purchase order function tab 2195 that allows the chef to furnish and forward a plurality of auto-numbered e-purchase orders, illustrated exemplarily as standing purchase order, followup purchase orders, and one-off purchase orders 2196 through the pre-set approval stages, whereby active operational supplier designated blank e-purchase orders are loaded into the system by the head office, and are organized alphabetically by suppliers under the relevant plurality of relevant select function tabs 2131 in field F-5. The display 2144 in field F-9 serves are e-purchase order text field, allowing for virtual keyboard. A plurality of actions can be taken through the use of a plurality of action tabs 2157 in field F-6. These main menu function tabs are customizable and extendable to add and include additional main function tabs 2197. Any access to the purchase order function 2195, must be acknowledged by sign-in password confirming such said information and data was read, or screen switches to a screenwide logo, resulting in a screen block and a report to the head office. There is also a service order function tab 2198 that allows the chef to furnish and forward a plurality of auto-numbered e-service orders, illustrated exemplarily as standing service order, followup service orders, and one-off service orders 2199 through the pre-set approval stages, whereby active operational service provider designated but blank e-service orders are loaded into the system by the head office, and are organized alphabetically by service provider under the relevant plurality of relevant select function tabs 2132 in field F-5. The display 2145 in field F-9 serves are e-service order text field, allowing for virtual keyboard. A plurality of actions can be taken through the use of a plurality of action tabs 2158 in field F-6. These main menu function tabs are customizable and extendable to add and include additional main function tabs 2200. Any access to the purchase order function 2198, must be acknowledged by sign-in password confirming such said information and data was read, or screen switches to a screenwide logo, resulting in a screen block and a report to the head office. There is also a supply and a service schedule function tab 2201 and 2202 that allows the chef to review, amend, and forward a plurality of auto-numbered e-schedules, illustrated exemplarily as weekly and monthly PO schedules 2203 and weekly and monthly SO schedules 2204, that include, but are not limited to a plurality of financial and other related data and information. Using the plurality of relevant select function tabs 2133 and 2134 in field F-5, the chef can transform the display 2146 and 2147 in field F-9, add comment text using a virtual keyboard, and execute action through a plurality of action tabs 2159 and 2160 in field F-6. These main menu function tabs are customizable and extendable to add and include additional main function tabs 2205 and 2106. Any access to the supply and a service schedule function 2201 and 2202, must be acknowledged by sign-in password confirming such said information and data was read, or screen switches to a screenwide logo, resulting in a screen block and a report to the head office. There is also a scan function tab 2207 that allows the chef to scan, file, and forward a plurality of scanned documents to a plurality of recipient, and auto-attach said scanned documents to existing processes, action, and activities. Using the plurality of relevant select function tabs 2135 in field F-5, the manager can transform the display 2148 in field F-9, add comment text using a virtual keyboard, and execute a plurality of action through the use of a plurality of action tabs 2161 in field F-6. Any access to the scan function 2207 must be acknowledged by sign-in password confirming such said information and data was read, or screen switches to a screenwide logo, resulting in a screen block and a report to the head office. There is also a menu engineering function tab 2208 that allows the chef to review and compose recipes, illustrated exemplarily under FIG. 34. Using the plurality of relevant select function tabs 2135 in field F-5, the manager can transform the display 2148 in field F-9, add comment text using a virtual keyboard, and execute a plurality of action through the use of a plurality of action tabs 2161 in field F-6. Any access to the menu engineering function 2208 must be acknowledged by sign-in password confirming such said information and data was read, or screen switches to a screenwide logo, resulting in a screen block and a report to the head office. More main menu function tabs can be added during customization, illustrated exemplarily as 2209.

FIG. 36

Figure 36:
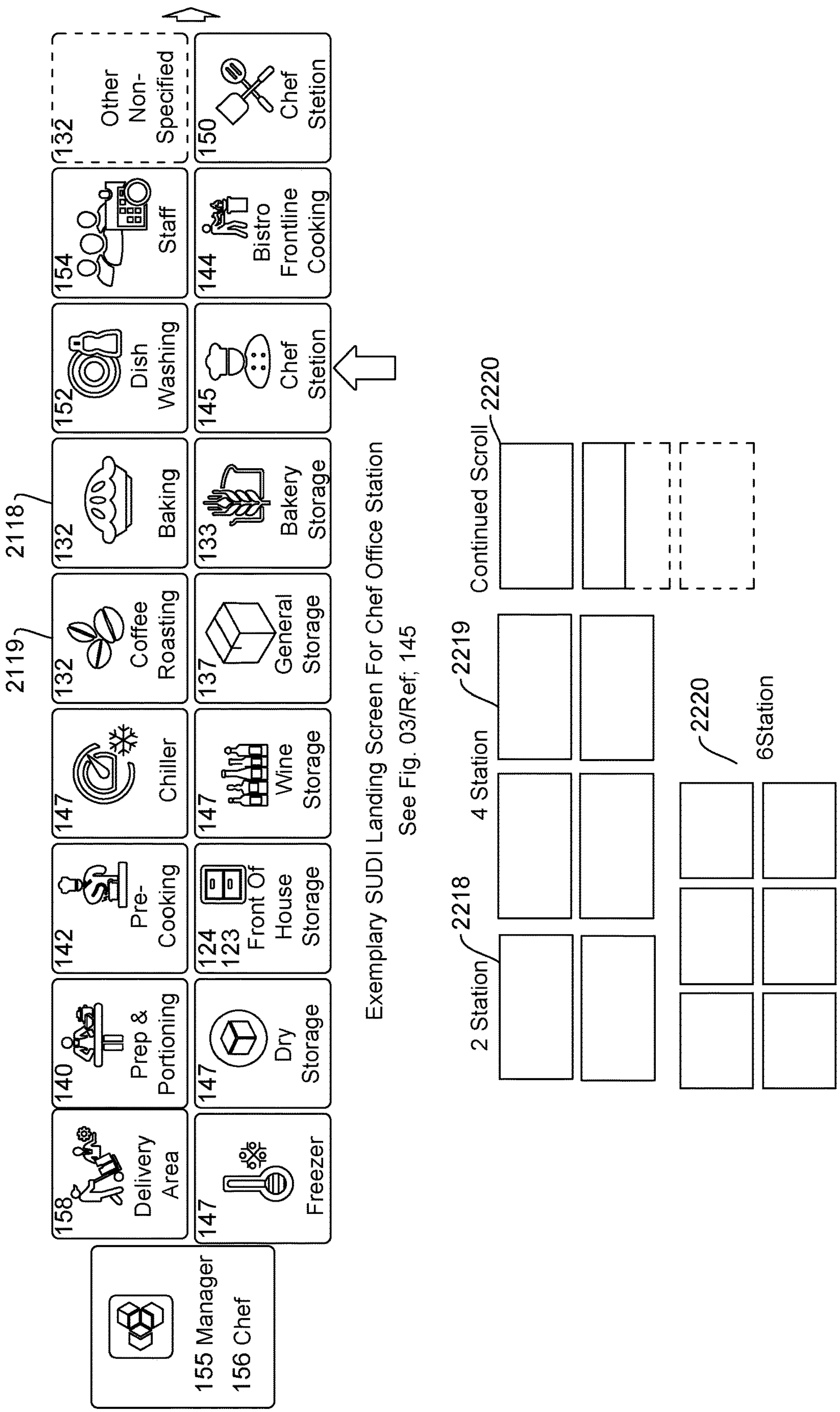
FIG. 36 illustrates exemplarily a typical SUDI cooking line screen display of the present invention of the CCOS 1 for the chefs station.

Referring now to FIG. 36 illustrating exemplarily a typical SUDI cooking line screen 2210 for the chefs station, illustrated exemplarily under FIG. 03/Ref: 145. The upper segment 2211, is comparable to the illustrated exemplary typical chef landing screen SUDI, illustrated exemplarily under FIG. 34. Within the vertical scrollable field 2212 is a main menu, illustrated exemplarily under FIG. 35. Selected is the staff station function tab 2213, in particular under the line cook stations 2214 the station 1 2215, and under the teppanyaki stations the station 2 2216. The relevant corresponding screen displays from the said stations 2215 and 2216 are displayed in field F-9, allowing the chef to follow each stations cooking process. Within the multi segment vertical scrollable fields 2217 in field F-5 are a plurality of select function tabs that allow the chef to change the center display in field F-9 between 2 stations 2218, 4 stations 2219, and 6 station 2120, or continues scroll display 2221. Corresponding sub-menu functions 2222 under each function tab, illustrated exemplarily for the continues screen 2221, that allows the chef to view the details of an order (electronic chit) 2223, and track an order 2224, illustrated exemplarily under FIG. 05. A cooking process at any cooking station can be paused 2225 and released 2226, including preparation and portioning stations, and pre-cooking stations, and a plurality of other back of house and front of house stations, included in the main menu under the vertical scrollable segment 2212, and illustrated exemplarily under FIG. 35. For the continuous scroll display 2221, the chef can freeze individual station displays 2227 without affecting the scrollability of the other station displays. The chef can also include a realtime camera feed in field F-5 from a plurality of stations, illustrated exemplarily for line station 1 2228, causing field F-5 to divide in two parts. The lower part 2229 displaying the realtime video feed of line station 1 2228, and the upper part the select menu 2230. Within the horizontal scrollable segment 2231 is the space for a plurality of action specific function tabs 2232, whereby the fixed segment 2233 is designated to display a plurality of incoming alerts and notifications 2234 from a plurality of other SUDI stations, allowing for the customization of said function tabs 2232.

FIG. 37

Figure 37:
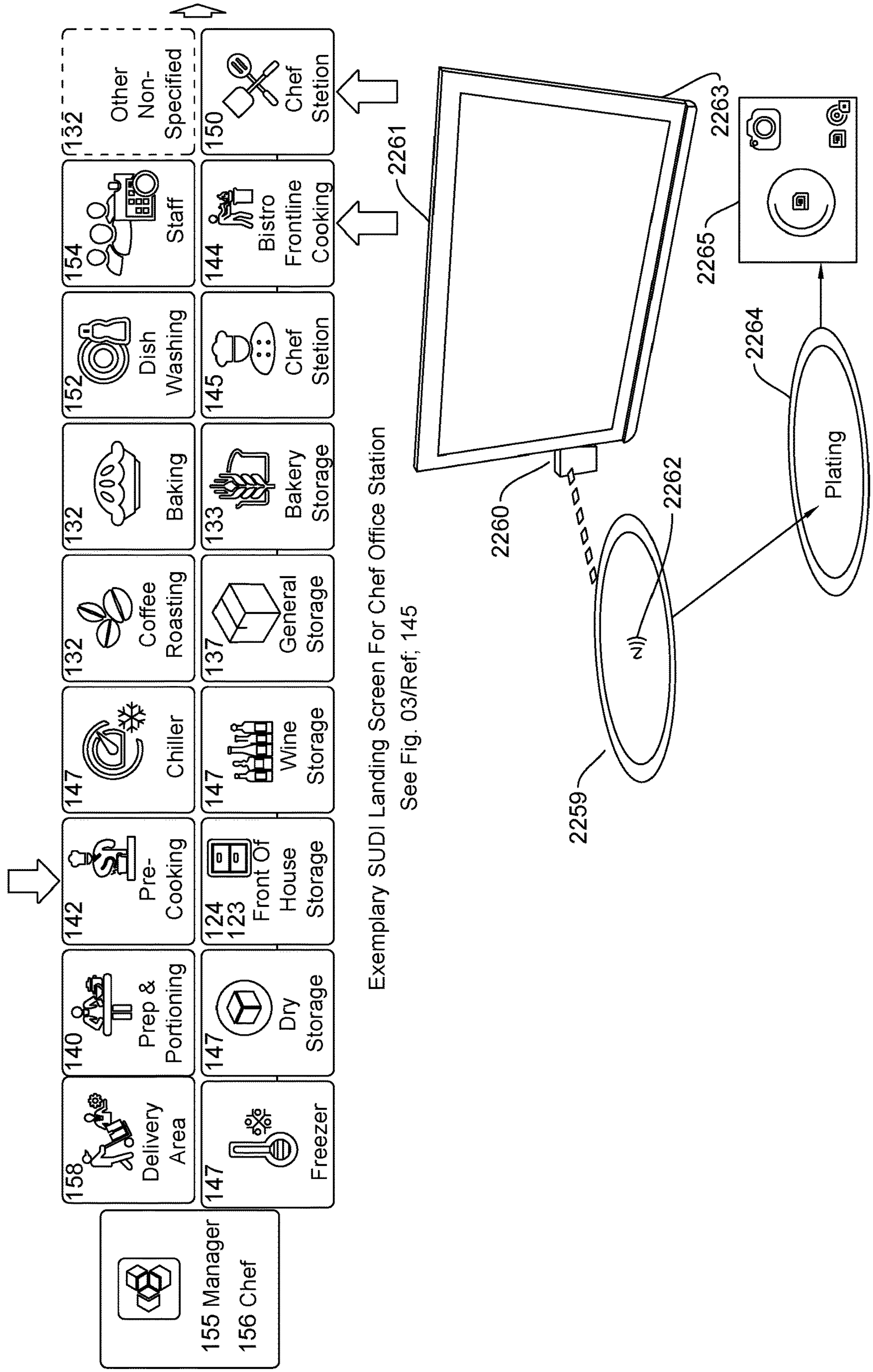
FIG. 37 illustrates exemplarily a typical SUDI cooking screen display of the present invention of the CCOS 1 for a plurality of cooking station.
Figure 38:
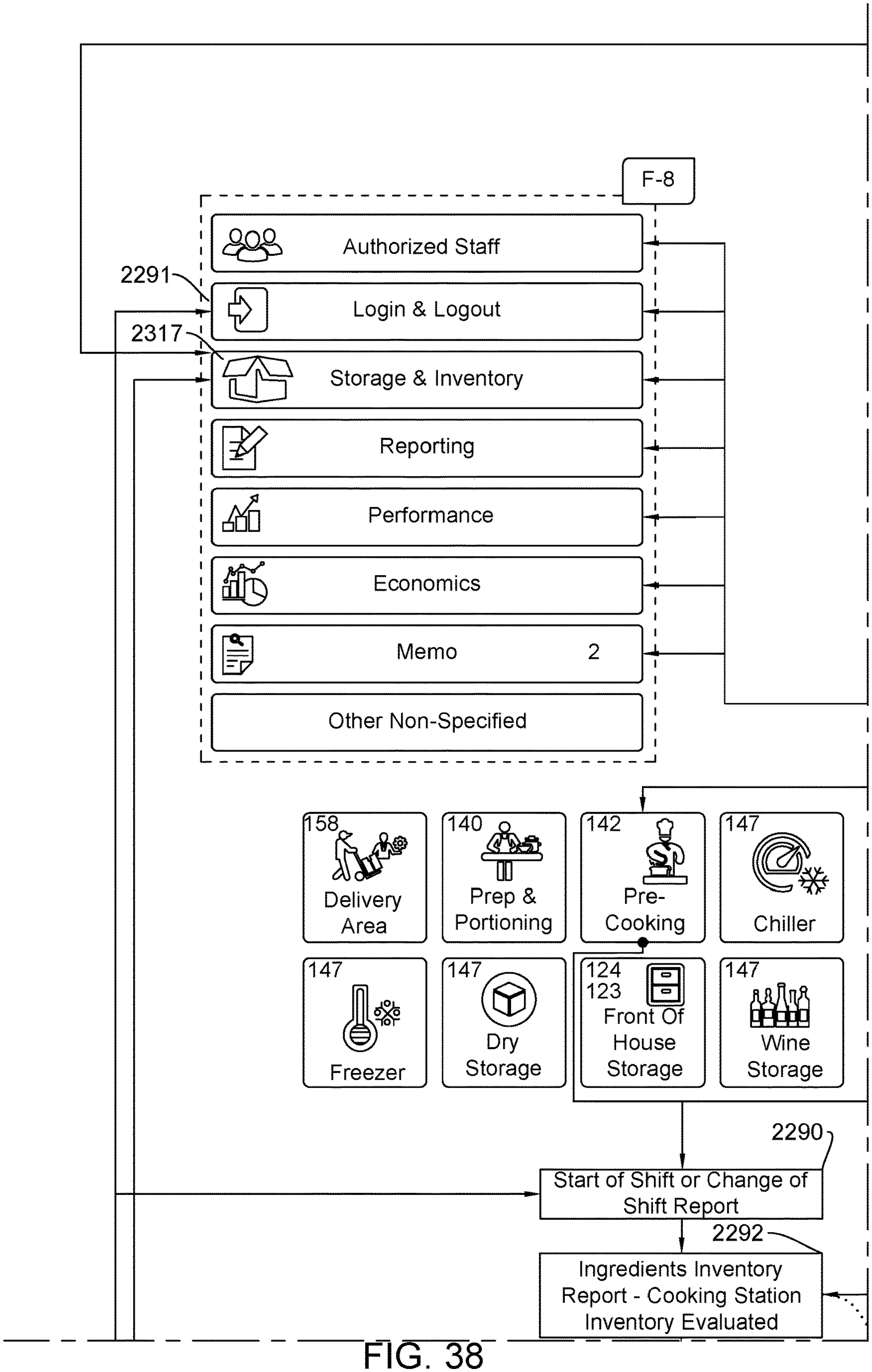
FIG. 38 illustrates exemplarily a typical SUDI cooking line flowchart of the present invention of the COOS 1 relating to a typical cooking station.

Referring now to FIG. 37 illustrating exemplarily a typical screen display for a plurality of cooking station SUDIs, illustrated exemplarily under FIG. 03/Ref: 142, 144, and 150. The shown screen display 2233 comprises of the same upper segments 2234, illustrated exemplarily under FIG. 36. Field F-8 and F-9 are merged, and display a menu item order inclusive of detailed cooking instructions that comprise of the list of ingredients 2235 and cooking instruction 2236 for each ingredient in order of cooking. It can include the recipe instruction of a standard menu item, or a customized standard menu item, or a from scratch created menu item. The sequential order of cooking for a plurality of standard menu items derives from the recipe sheet, illustrated exemplarily under FIG. 34, and for customized menu items in part from the recipe sheet, illustrated exemplarily under FIG. 34 and from the ingredient database, illustrated exemplarily under FIG. 55; and for created menu items from the ingredient database, illustrated exemplarily under FIG. 55. The cooking instructions include alphabetic measurement instruction 2237 that identify the particular type and size of measuring unit for every ingredient, illustrated exemplarily for ingredient MI 1 2238. There are also a plurality of a cooking time instruction 2239, informing of the total time columns 2240 with a minute column 2241 that corresponds with the target time 2252 and a plurality of individual cooking time columns for each ingredient that give the cooking time instruction by minute, each box representing a single minute, illustrated exemplarily as MI1, MI 2 and MI 3 2242, whereby the smaller number identifies the cooking sequence. The reference MI 1, MI 2 and MI 3 corresponds with the ingredient identification number of the listed ingredients under the ID column 2243. Each time column 2242, illustrated exemplarily as MI 1, MI 2, and MI 3 2242 comprises of a plurality of individual minute fields, reflecting the recipe cooking time allocated for an individual ingredient. For example, ingredient MI 1 2244 has a allocated recipe cooking time of eight (8) minutes, and the color of the minute field changes as the cooking progresses indicating in the illustrated example that seven (7) minutes have been used up; for ingredient MI 1 2244. Exemplarily for ingredient MI 2, the cooking time only started at minute four (4) and is scheduled for six (6) minutes. For ingredients that await cooking, the color in the minute field is different 2245. The time filed 2246 is movable in horizontal and vertical direction as the cooking process progresses, eliminating completed cooking processes for ingredients to make room for incomplete cooking time processes. The time field 2246 can also be moved manually by the cook. There is also a hob and hob dial recipe cooking instruction column 2247 that reflects the allocated recipe hob position (2) 2248 and the hop dial position (4) 2249. During the cooking progress a hop and dial position can change, reflecting the cooking instructions of a recipe, or established in the ingredient database as illustrated exemplarily under FIG. 55. There is also a cookware type column 2250 that provides the cook with the instruction which cookware or cooking method to use. Further visual assistance is given in field F-4. The relation between ingredient and cookware type, including method of cooking is also indicated way of color indicators, illustrated exemplarily as 2251. In field F-4 is also a time indication. It reflects in numerical and graphical format the target cooking time 2252, allocated in the recipe and/or computed in the ingredient database when ingredients for cooking are computed, the time used up 1971. The time used up 2253 and the time left to the target time 2254 is also indicated. The total number of servings, the order number, and seat positions are also reflected 2255. Plating instructions are also given 2256 for a menu item displayed as picture 2257 complete with embedded text information 2258 informing the cook of the type of dish used for plating. When a menu item is ready for plating, the cook holds the designated tableware 2259 in close proximity to the NFC/RFIDs device 2260 connected to the SUDI 2261, and the NFC/RFID device 2260 automatically communicates with the full duplex RFID 2262 of the tableware. If authentication is successful, the order field 2263 (screen field 2255) changes color and the order data is automatically transferred, ready for plating 2264. If the order data cannot be transferred because of a faulty full duples RFID, the cook changes plates and repeats the process. Upon completion of plating 2264, the tableware is placed, ready for service and/or collection, on an ISM 2265, illustrated exemplarily under FIG. 5. There are also a plurality of function tabs within the horizontal scrollable customizable segment 2266, comprising of a set of up 2267 and down 2268 function tabs that move the entire block, illustrated exemplarily as 2269, 2270, 2271, 2272 up and down. Selecting the start function tab 2273 starts the timing of the cooking process, selecting the close and next function tab 2274 closes one cooking instruction, and opens the next cooking instruction. There is a pause and start function tab 2275 that allows for pausing of and between cooking session. There are also a plurality of non-assigned function tabs, illustrated exemplarily as 2276 and 2277 that can be assigned during customization. The number of outstanding orders designated for a particular cooking station are also reflected 2278, allowing for additional information to be added during customization, like order ID, seat identification and the time the order was placed. When allergy concerns are involved in a particular order a blinking allergy notification 2279 is automatically activated in the fixed field segment 2280. The background color of a particular ingredient of allergy concern, illustrated exemplarily as 2281 also blinks, alerting the cook so preventative action can be taken.

FIG. 38

Referring now to FIG. 36 illustrating exemplarily a typical SUDI cooking line flowchart a typical cooking station, illustrated exemplarily for an authorized staff 2282 user 2283 at a SUDI 2284. A staff 2282 user 2283 completes on the starting screen 2285, illustrated exemplarily under FIG. 30 a login 2286 process to reach the landing screen 2287, illustrated exemplarily under FIG. 37. The chef is notified 2288 of the login 2286 on its SUDIs 2289. The landing screen displays a main menu in field F-8. A startup and/or shift change report is generated 2290, whereby, when changing shift, the login/logout 2291 can be executed through the main menu in F-8. A shift change report is generated and the chef is notified 2288 of the shift change. Simultaneously, a change of shift ingredient inventory report is generated and the inventory is evaluated 2292. When more ingredient inventory is required, either from the preparation and portioning stations 2293 or storages 2294. The movement of ingredients is communicated and recorded through the use of sets of NFCs/RFIDs devices affixed to trays 2295 and vessels 2296, and the cooking station inventory is updated through a plurality of automated communications between independent interlined modules with the COOS 1 through a local RMNS 2297, with option to execute manual scanning devices of provided NFCs/RFIDs scanner 2298 that are connected to SUDIs 2284, 2293, 2294. The current cooking station inventory is detected and its location established 2299, and a cooking station report is updated 2300. The cooking station is now ready for service 2301. When orders from customers 2302 come in and are displayed on the cooking station SUDI 2303, illustrated exemplarily under FIG. 37, ingredient portions are selected from the cooking station storage 2304, and passed by a NFC/RFID communicator 2305 that records the ingredient portions removed, with option to executed manual scanning devices of provided NFCs/RFIDs scanner 2206 that are connected to SUDIs 2284. Used ingredient portions are used 2307, and in the event of spoilage, recorded as waste, illustrated exemplarily under FIG. 54 in collaboration with the relevant analytics, illustrated exemplarily under FIG. 49, 50, 51, 52, 53. The menu item is cooked and plated 2308 and is ready for service 2009, illustrated exemplarily under FIG. 37, and is placed on a ISM 2310, and service commences as illustrated exemplarily under FIG. 05. An end of shift inventory is established 2311, and end of shift report established 2312, with option to return end of day inventory back to storage 2313. Returned inventory is updated through a plurality of automated communications between storage SUDI 2314 and independent interlined modules with the CCOS 1 through a local RMNS 2315, with option to executed manual scanning devices of provided NFCs/RFIDs scanner 2316 that are connected to SUDIs 2314. Any discrepancies are reported and displayed under the storage functions 2317 with notification to the manager's and chef's SUDI 2289.

FIG. 39

Figure 39:
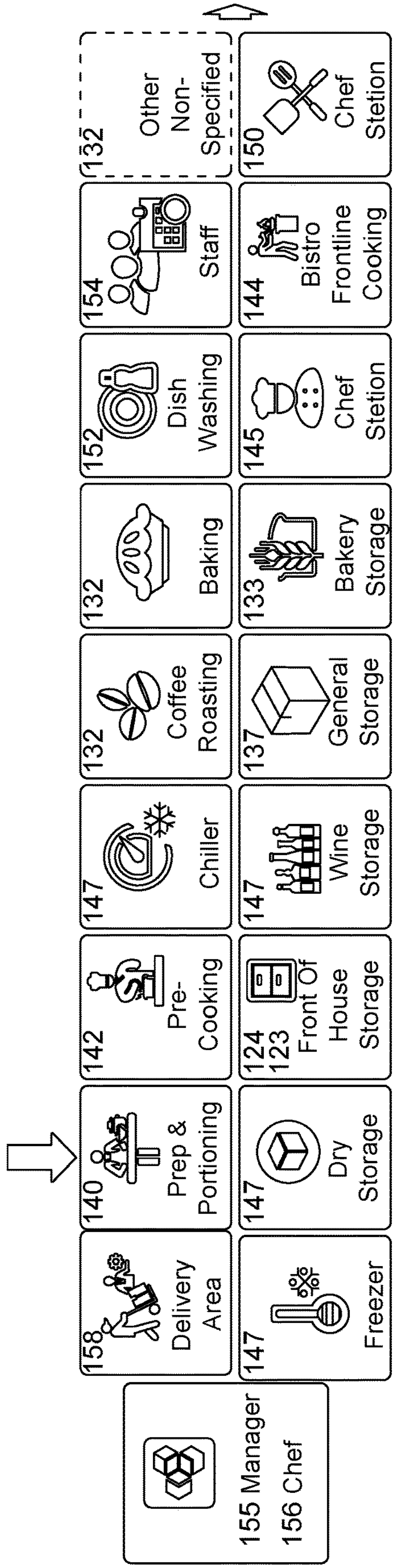
FIG. 39 illustrates exemplarily a typical SUDI screen display of the present invention of the CCOS 1 for a plurality of preparation and portioning station.

Referring now to FIG. 39 illustrating exemplarily a typical screen display for a plurality of preparation and portioning station SUDIs, illustrated exemplarily under FIG. 03/Ref: 140. The shown screen display 2318 comprises of the same upper segments 2319, illustrated exemplarily under FIG. 37. Field F-8 and F-9 are merged, and displays the ingredient processing and portioning detailed instructions that comprise of the list of ingredients 2320, preparation and portioning instructions 2321 for each ingredient. The process identifies the alphanumerical ID where the container or tray is currently located 2322, the net weight of the ingredients 2323, the time allocated for processing and portioning 2324, the portion weight and size of vessel 2325, the total number of portion units 2326, the portion vessels to be used 2327, the type of crate or tray 2328 to use for storage, and the new storage location, and a plurality of other detail instruction that can only be seen when scrolled the indicated screen segment horizontal as indicated 2329 and 2330. Shown are also the projected ingredient result 2330, comprising of the net weight received 2331, the projected weight yield 2332, and the number of portion units 2333. The target data is established by the chef on the chef's SUDI, illustrated exemplarily under FIG. 35 under function 2171 and 2174, using the same screen display but with data entry features. The projected waste and waste percentages 2334 is calculated automatically. The actual outgoing ingredient result 2335 is also shown, reflected in net weight yield 2336 and number of portion units 2337. Visual instruction are also given in form of video or picture sequence 2338, including written guidelines, exemplarily for the portioning of broccoli in 2× centimetre dimension 2339. The time target, used up time and time to target are also displayed 2340. More relevant corresponding detailed processing information are also displayed 2341 when an ingredient is selected for processing and portioning, illustrated exemplarily as 2342. Within the horizontal scrollable segment 2343 are a plurality of function tabs, comprising of a set of up 2344 and down 2345 function tabs that move the entire block, illustrated exemplarily as 2346 and 2347. Selecting the start function tab 2348 starts the timing of the preparation and portioning process, selecting the close and next function tab 2349 closes one session, and opens the next session. There is a pause and start function tab 2350 that allows for pausing of and between sessions. There are also a scan function tab 2351 with a handheld scanner connected to the SUDI that allows for manual scanning plurality of non-assigned function tabs, illustrated exemplarily as 2351, and there is a weight function tab 2352 that allows the use of an electronic weight scale connected to this SUDI for the weighing of ingredients, either for received net weight 2331, actual waste 2353, the net weight yield, and if required the individual portion weight 2325. When urgent supply for the cooking stations is needed, the display 2354 under the fixed segment 2355 identifies said station.

FIG. 40

Figure 40:
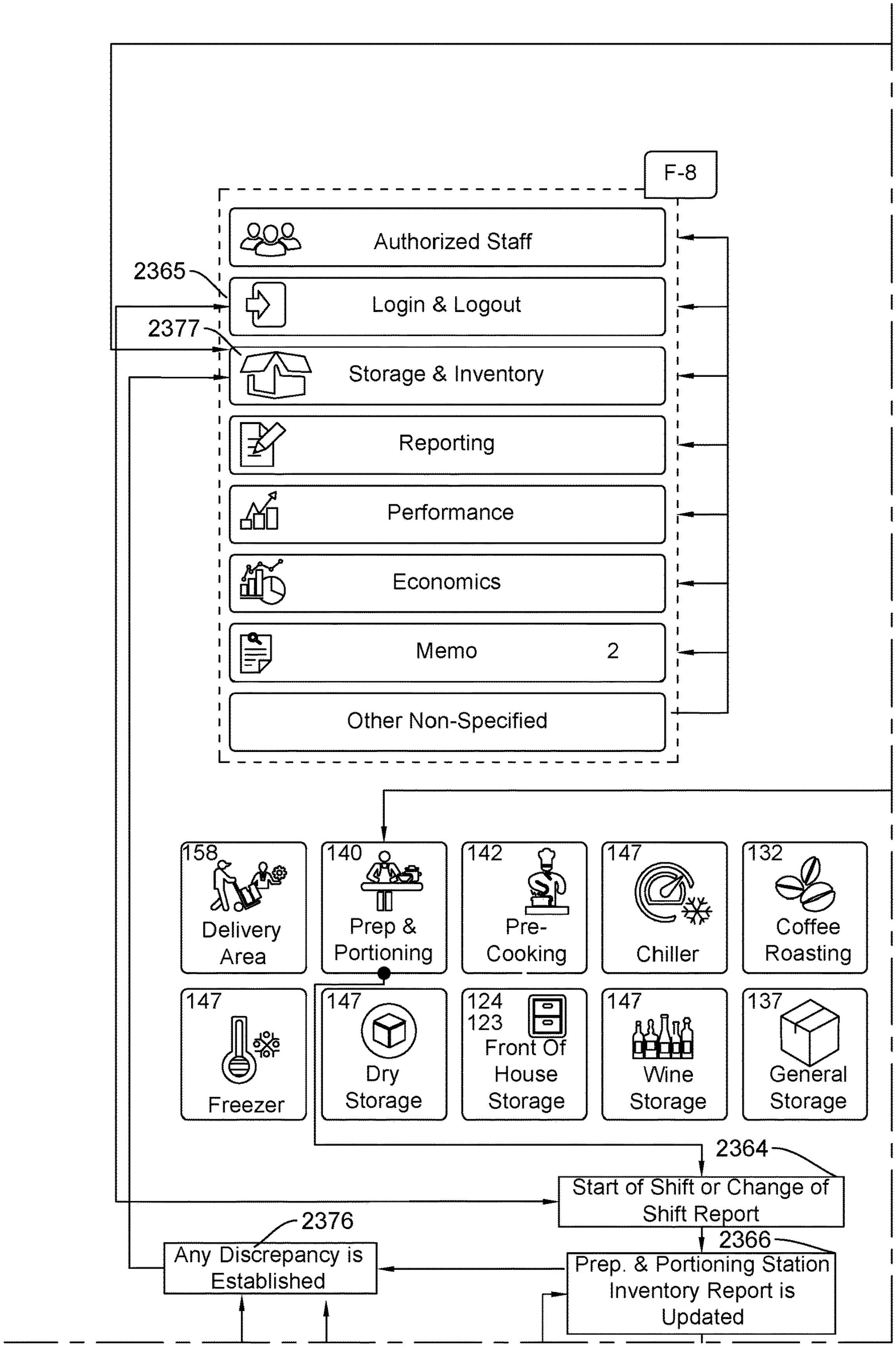
FIG. 40 illustrates exemplarily a typical SUDI preparation and portioning station flowchart of the present invention of the CCOS 1.

Referring now to FIG. 40 illustrating exemplarily a typical SUDI preparation and portioning station flow diagram, illustrated exemplarily for an authorized staff 2356 user 2357 at a SUDI 2358. A staff 2356 user 2357 completes on the starting screen 2359, illustrated exemplarily under FIG.

Figure 49:
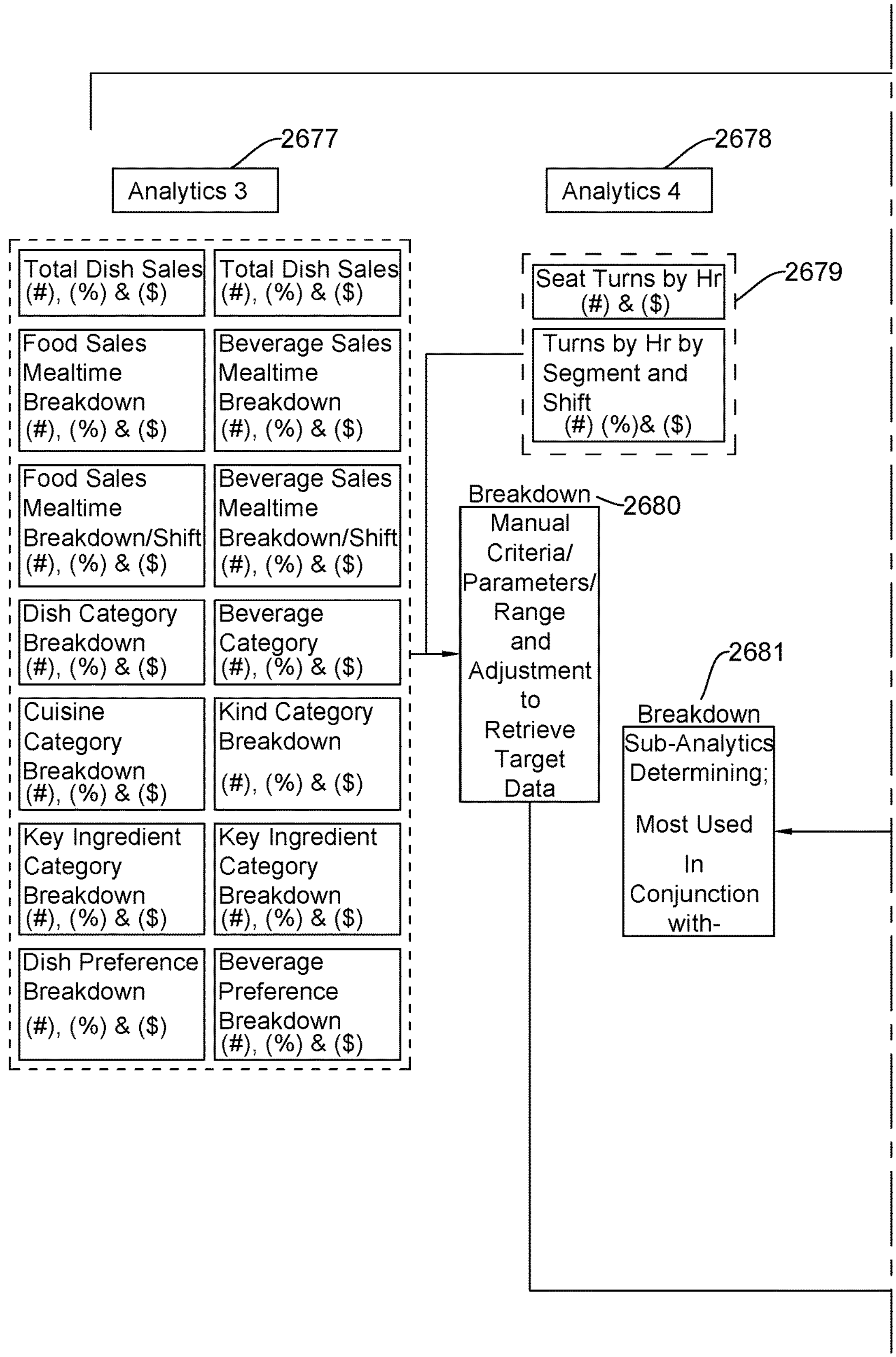
FIG. 49 illustrates exemplarily a plurality of restaurant performances data related utilized in relation to a plurality of analytics by the present invention of the CCOS 1.

30 a login 2360 process to reach the landing screen 2361, illustrated exemplarily under FIG. 39. The chef is notified 2362 of the login 2286 on its SUDIs 2363. The landing screen displays main menu is displayed within field F-8. A startup and/or shift change report is generated 2364, whereby, when changing shift and login/logout 2365 can be executed through the main menu within F-8. A shift change report is generated and the chef is notified 2362 of the shift change. Simultaneously, a change of shift ingredient inventory report is generated and the inventory, if any, is evaluated 2366. The preparation and portioning station is now ready for service 2367. Ingredient preparation and portioning orders are prepared and ordered 2368 from the chef's SUDIs 2363, or automatically issued from a plurality of cooking station 2369 if their customizable pre-set ingredient inventory levels run low. Upon receipt of ingredient orders 2370, ingredients are collected 2371 from a single or plurality of storage stations, illustrated exemplarily as the chiller 2372. Ingredients are selected from storage and passed by a NFC/RFID communicator 2373 that records the ingredient being removed, with option to execute manual scanning using provided NFCs/RFIDs scanner 2374 that is connected to SUDIs 2284. Ingredients are prepared used 2374 and weight reconfirmed 2375. Any discrepancies are automatically established under the storage inventory 2377 and reported on the managers and chefs SUI 2363. Spoilage and waste, illustrated exemplarily under FIG. 54 in collaboration with the relevant analytics, illustrated exemplarily under FIG. 49, 50, 51, 52, 53 are also reported. Ingredients are being portioned 2378, and weight, if required 2375, and passed by a NFC/RFID communicator 2373 that records the portioned ingredient, with option to executed manual scanning using a provided NFCs/RFIDs scanner 2374 that are connected to the stations SUDIs 2358. Ingredients are prepared for movement 2379, and distributed 2380, either back into storage 2381 or to a plurality of cooking stations 2382. An end of shift inventory is established 2383, and end of shift report established 2384, with the end of day inventory returned back into storage 2385. Returned inventory is updated through a plurality of automated communications between storage SUDI 2386 and independent interlinked modules with the COOS 1 through a local RMNS 2387, with option to executed manual scanning devices of provided NFCs/RFIDs scanner 2388 that are connected to SUDIs 2386. Any discrepancies are reported and displayed under the storage functions 2377 with notification to the manager's and chef's SUDI 2363.

FIG. 41

Referring now to FIG. 40 illustrating exemplarily a typical SUDI landing screen 2389 for a delivery and dispatch station, illustrated exemplarily under FIG. 03 as 158. The shown screen display 2389 comprises of the same upper segments 2390, illustrated exemplarily under FIG. 39. Under the vertical scrollable segment 2391 is a customized main manual for the delivery and dispatch station. Illustrated are a plurality of exemplary vertical scrollable screen displays, comprising of a e-purchase order 2392, addressed under FIG. 02/Ref:54, FIG. 33/Ref: 2051 and FIG. 35/2195, and the corresponding e-delivery invoice 2393, and the prevailing discrepancy detection 2394. A field that can display scanned hard copies 2395 of documents in relation to 2392 and 2393 is also available. Provided e-delivery invoices 2393 are available for linked TPUDIs, provided as online e-document services for suppliers and service providers for to expedient execution of the receiving and verification process. A e-delivery invoice is retrieved at the delivery stations SUDI, illustrated exemplarily under FIG. 03/Ref: 158 in conjunction with the e-purchase order involving a plurality of independent interlinked modules within the CCOS 1, illustrated exemplarily under FIG. 42. There are also a plurality of function tabs within the horizontal scrollable customizable segment 2396, comprising of an enlarge function tab 2397 that enlarges any screen when selected, a back function tab that reverses the enlarge action 2398, a photo function tab 2399 that allows, as part of evidence, to take pictures with a digital camera linked to this SUDI. Pictures are automatically attached to the set of documents displayed on this screen 2389. There is also an adjust display function tab 2400 that adjusts the screen display, illustrated exemplarily as 2401, 2402, 2403. There is also an accept function tab 2404, that allows to accept a discrepancy in line with other procedures, which automatically creates notes to the displayed documents, and a reject function tab 2405 that allows rejections of discrepancies in line with other procedures, which automatically creates notes to the displayed documents. The signature function tab 2406 is a confirmative action allowing for up to three signature of authorized person, illustrated exemplarily as the manager 2407, the chef 2408, and the person 2409 that delivers supplies or services. Signatures are also transposed on the relevant displayed documents. The delivery report function tab 2410 executes the first phase of the receiving process and prepares and the display changes to a single screen format for the second phase. The schedule follow up delivery function tab 2411 attaches to the delivery report 2410 a request for a follow up delivery in the event of rejected discrepancies 2394 and sends a request notification to the managers and the chefs SUDI for further action. The same applies for the request follow up order 2412 in the event an entire or a large portion of a delivery was rejected. The proceed function tab 2413 closes this session and starts the physical inspection process. A plurality of additional function tabs can be added during customization, illustrated exemplarily as 2414. Within the customizable multipurpose segment 2415 is a field providing suppliers and services provider details, with one touch telephone contact functions to a plurality of telephone numbers, illustrated exemplarily as 2416, 2417, 2418. With recording function 2419, and a plurality of video call functions, illustrated exemplarily as 2419, 2420, 2421, 2422.

FIG. 42

Figure 41:
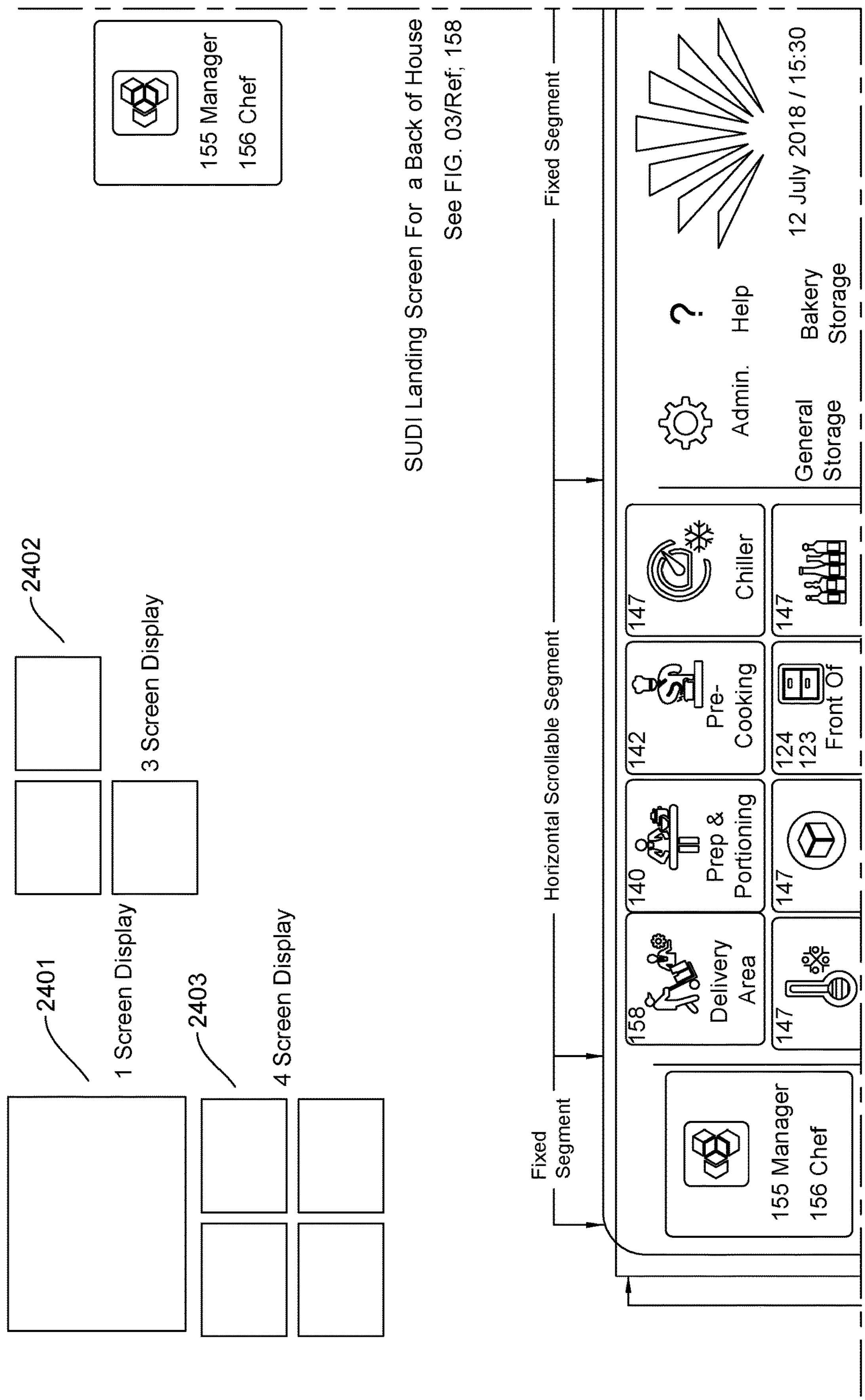
FIG. 41 illustrates exemplarily a typical SUDI screen display of the present invention of the CCOS 1 for a delivery and dispatch station, FIG. 42 illustrating exemplarily a typical delivery/receiving station flow diagram of the present invention of the CCOS 1.
Figure 42:
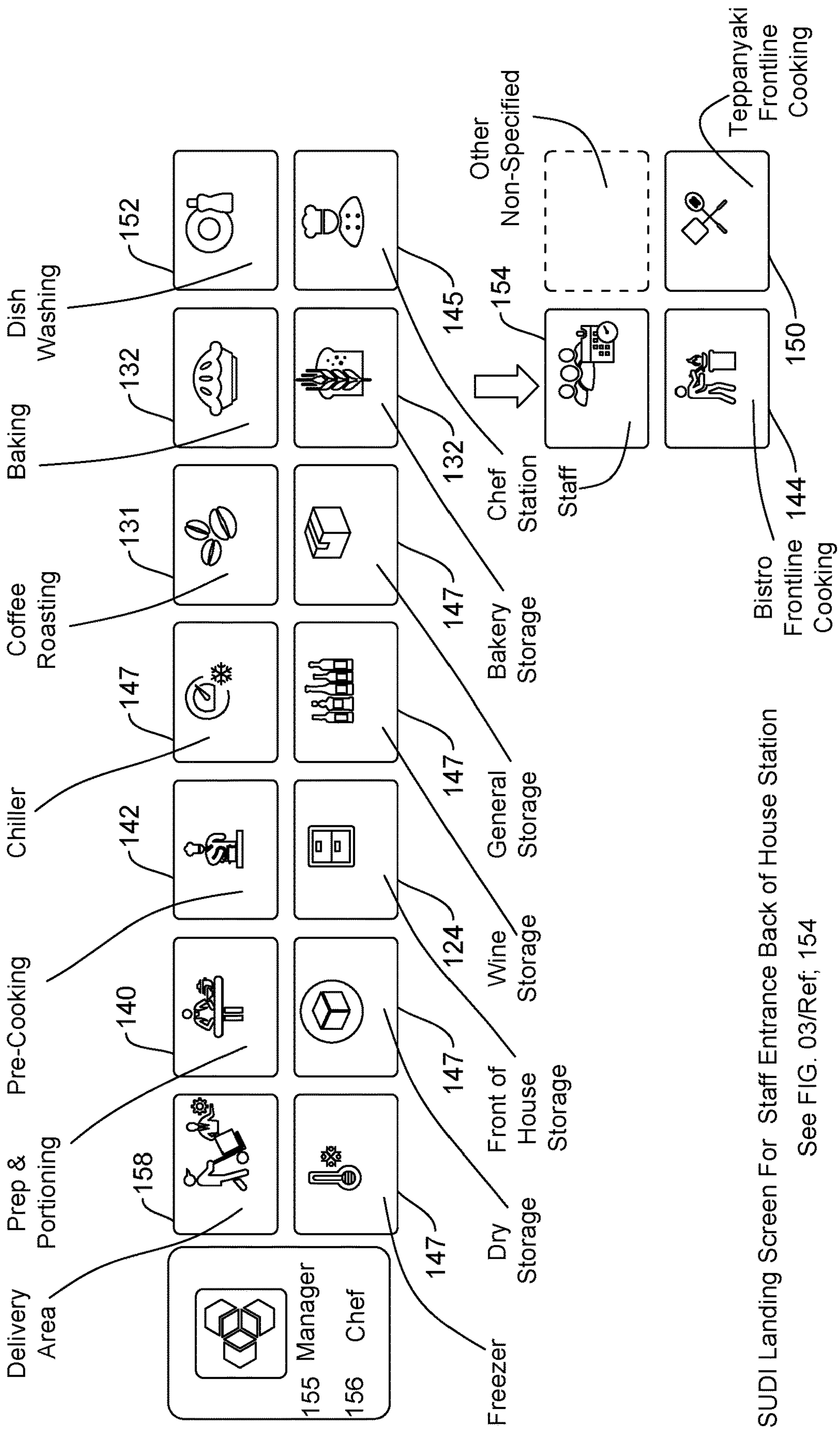

Referring now to FIG. 42 illustrating exemplarily a typical delivery/receiving station flow diagram, illustrated exemplarily for an authorized staff 2423 user 2424 at a delivery and receiving station SUDI 2425. A staff 2423 user 2424 completes on the starting screen 2426, illustrated exemplarily under FIG. 30 a login 2427 process to reach the landing screen 2428, illustrated exemplarily under FIG. 41. The manager and chef is notified 2429 of the login 2427 on their respective SUDIs 2430. If there is a handover during an ongoing operation, a shift change can be executed through the login and logout function tab 2431. Suppliers and service providers can use their own handheld SUDIs that allow for e-document identification and scanning to identify a delivery or service 2432. Delivery e-document verification is initiated 2433 by selecting the document search function tab 2434. The scan can be executed 2435 from the delivery e-document 2433, a corresponding hard copy document, or the suppliers/service providers handheld SUDIs 2432, using a handheld or fixed scanner device 2436 connected to the delivery and receiving station SUDI 2425, that communicates with the third party service module within the CCOS 1 through a local RMNS 2437, illustrated exemplarily under FIG. 46 for identification and verification of the relevant delivery and/or service documentation. Upon successful verification 2438, the plurality of e-documents, illustrated exemplarily under FIG. 41, are displayed 2439, comprising of the relevant e-purchase order 2440, the relevant e-delivery invoice 2441, and the e-discrepancy document 2442. A manual process 2443 can also be applied when a scan verification is unsuccessful, or when a supplier and/or service provider uses its own hard copy documentation and/or SUDI 2432 display documentation. In such case, a supplier and/or service related search 2444 and/or e-documentation search 2445 can be executed. A supplier and/or service providers name 2446 or the relevant ID 2447 can be entered into the provided fields using a virtual keyboard 2448. Alternatively, the prevailing e-purchase order code 2449, that assigned when a purchase order is placed, or the prevailing delivery order code 2450, when completed online but could not be verified for whatever reason, can be entered in the provided fields using a virtual keyboard 2448. When a supplier and/or service provider related 2444 search is executed, the result is shown in an interactive popup window 2451, displaying all outstanding deliveries and/or services. A selection is made 2452 and the relevant set of e-documents are displayed 2439, comprising minimum of the relevant e-purchase order 2440. When a hard copy document or a handheld supplier SUDI 2432 is involved, said document can be scanned 2453 and/or transferred, and the respective document data 2454 is then displayed in the relevant field, illustrated exemplarily under FIG. 41, whereby an automated e-delivery invoice 2441 is generated drawing all relevant data from the e-purchase order 2440, and the e-discrepancy document 2442 is completed manually by comparing the scanned and/or transferred hard copy document 2454 with the e-purchase order 2440, using the virtual keyboard 2448 for data entry. In the event neither the service provider related 2444, nor an e-document related search 2445 is successful 2455, contact 2456 to the supplier and/or service provider can be established within field F-5, illustrated exemplarily under FIG. 41. This can also be done when a verification scan 2435 is unsuccessful 2457. Field F-5 allows for a plurality of direct telephone 2458 links, illustrated exemplarily as 2459, 2460, or visual option 2461 through video conferencing, illustrated exemplarily as 2462, 2463 with recording 2464. In the event a delivery and/or a service is rejected at any stage during the receiving process, photo evidence can be established 2465 and linked to the relevant e-documents, 2454, 2440, 2441, 2442. When a matter cannot be resolved and further action need to be taken 2466, including rejection of the delivery 2467, relevant automated notification to the parties concerned is executed, illustrated exemplarily to the head office 2468, its representative office, subsidiary, and branch 2469, the relevant participating restaurant 2470, and the relevant supplier and/or service provider 2471. When a matter can be resolved, follow up action can be scheduled 2472, including but not limited to scheduling an e-purchase order for follow up or new delivery 2473, using an interactive calendar tool 2474, that involves the execution of automated distribution of relevant action for the relevant parties 2475, with relevant automated notification to the parties concerned, illustrated exemplarily as the head office 2468, its representative office, subsidiary, and branch 2469, the relevant participating restaurant 2470, and the relevant supplier and/or service provider 2471. It also allows action while in communication 2456 with the relevant parties concerned and repeating the manual process 2443. Upon completion of verification and establishing discrepancies (if any), temperature checks 2476 are conducted for all received ingredients, using a temperature measuring device 2477 that is connected to this SUDI 2425. All temperature measurements are reflected on the relevant e-document delivery invoice and discrepancies 2441 and 2442 in a special column that reflect acceptable temperatures ranges, and in a special column that reflects the actual measurements taken. When temperatures taken from received ingredients are outside the acceptable range said ingredients are identified with a color bar, and subject to rejection 2467. A net weight check 2478 for ingredients is also conducted using an electronic scale 2479 that is connected to this SUDI 2525. Upon completion of temperature check 2476 and net weight check 2478, including quality control, whereby each ingredient is processed separately using the accept or reject function tabs, illustrated under FIG. 41, the results are reflected in the e-delivery invoice 2441, and the e-discrepancy document 2442 to which a plurality of signatures 2479, illustrated under FIG. 41, and comments can be added using the virtual keyboard 2480. An automated delivery report 2481 is created and communicated to the third party service module within the CCOS 1 through a local RMNS, using the delivery report function tab, illustrated under FIG. 41. The proceed function tab, illustrated under FIG. 41 allows for the subsequent process to assign NFCs/RFIDs 2482 to a plurality of ingredient trays and crates, and ingredients are moved into storage 2483, and entered into the storage inventory on the relevant storage SUDI, illustrated exemplarily under FIGS. 03/147 and 133, and for front of house inventory, exemplarily at FIGS. 03/123 and 124.

FIG. 43

Figure 43:
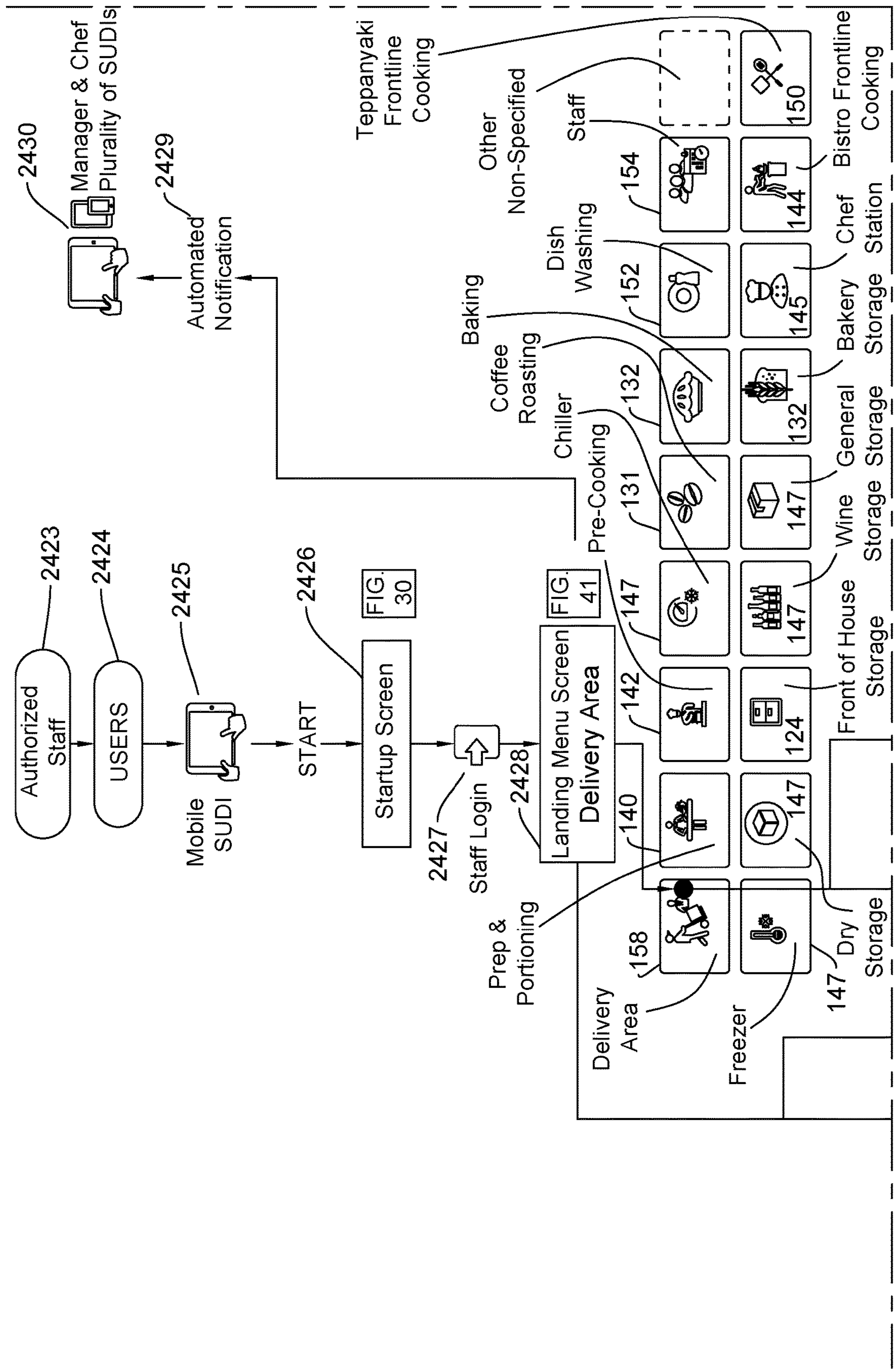
FIG. 43 illustrates exemplarily a typical SUDI screen display of the present invention of the CCOS 1 for a staff station.

Referring now to FIG. 43 illustrating exemplarily a typical landing screen 2484 for a staff station SUDI, illustrated exemplarily under FIG. 03 as 154. The shown screen display 2484 comprises of the same upper segments 2485, illustrated exemplarily under FIG. 41. Under the vertical scrollable segment 2486 is a customizable main manual 2487 comprising of an authorized staff function tab 2488 under which all members of the staff are listed, organized by front and back of house segments, and their respective stations, illustrated exemplarily for the front of house 2489 service station 1 2490, whereby staff member number 3 has a pending message 2491. The login and logout function tab 2492 allows for customization to execute verification by fingerprint identification 2493 or personal SUDI identification 2494, and a plurality of non-specified identification methods. Login and lockout activities are communicated involving the staff module within the CCOS 1 through a local RMNS to the manager's and chef's SUDSs, illustrated exemplarily under the main menus FIG. 33/Ref 2027 and FIG. 35/Ref 2171. There is also a message white board function tab 2495 that also show the number of not acknowledged messages 2496. Individual white board messages 2497 can be selected that are displayed within the multi segment vertical scrollable filed 2498 in field F-5, whereby urgent notification 2499 like health screening compliance requirements for individual members of the staff are displayed within a sub-field of field F-8. Alerts 2500 are displayed in field F-7. There is also a working schedule function tab 2501 with a plurality of specific working schedules 2502 that display the selected working schedule within the vertical scrollable filed F-9, illustrated exemplarily for a weekday working schedule 2503 that is organized by staff stations, illustrated exemplarily for the teppanyaki station 1 2504, showing a plurality of staff working schedules and working hours 2505 by prevailing shifts that can be expanded to reflect a plurality of shifts, working hours and total working hours, illustrated exemplarily for shift 1 2506 and shift 2 2507. Reflected are also potential overtimes 2508, sick reporting 2509, and holiday duty 2510. Further categories can be added during customization. Within the horizontal scrollable segment 2511 are a plurality of customizable function tabs 2512, 2513, 2514, 2515, creating and adding a plurality of function and interfaces, including the uploading of working schedules to the staffs PUDIs.

FIG. 44

Figure 44:
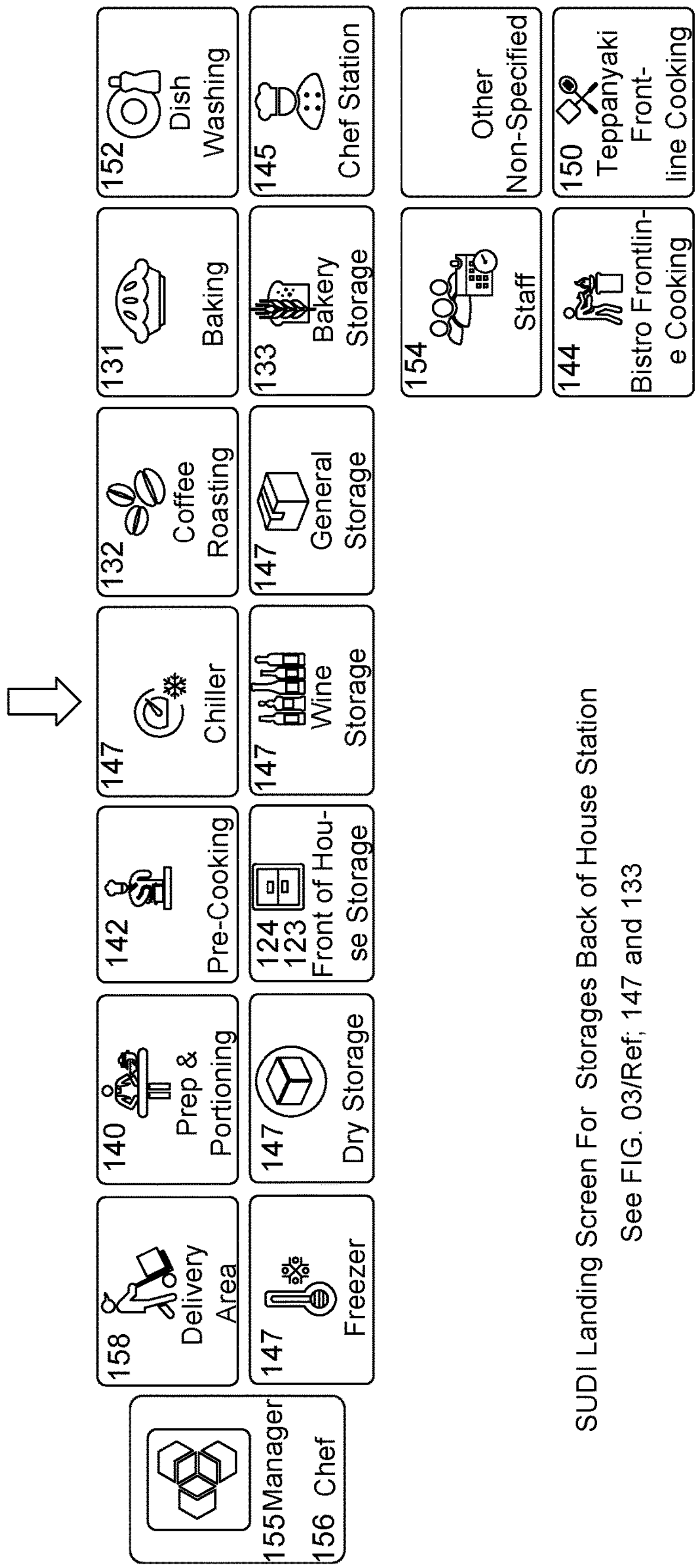
FIG. 44 illustrates exemplarily a typical SUDI screen display of the present invention of the CCOS 1 for a plurality of storage stations.

Referring now to FIG. 44 illustrating exemplarily a typical landing screen 2516 for a plurality of storage station SUDIs, illustrated exemplarily under FIG. 03 as 147, 133. The shown screen display 2516 comprises of the same upper segments 2517, illustrated exemplarily under FIG. 41. Under the vertical scrollable segment 2518 is a customized main manual 2519 comprising of a plurality of function tabs, customized for storage operations. Specific Ingredients can be searched 2520, and the display in field F-9 can be organized by ingredient groups 2521 in line with the ingredient inventory structure, illustrated exemplarily under FIG. 56. The display in field F-9 can also be displayed by ingredients running low 2522, most used up 2523, and most un-used 2524. The standard display is shown all A-Z 2525. There is also an inspection time card 2526 displaying dates and times a particular storage was inspected, cleaning, and/or audited, with automated reporting and notification communication with the storage module within the COOS 1 through a local RMNS that displays notifications 2527, and send more comprehensive messages to the whiteboard function 2528. The relevant temperature and environmental reading data 2529 is displayed in field F-7, that has an alarm function when the data exceeds the allowed preset setting. Within field F-9 is the inventory display, illustrated exemplarily the ingredient inventory for a chiller storage. Displayed are the list of ingredients 2530 and the relevant inventory status 2531. A number guide heading is shown 2532, including the total actual used up inventory 2533, reflecting the inventory that was removed on the displayed current day 2534, the total projected inventory 2535, that was forecast and placed in the storage for the current day 2534, and the total variance 2536 between actual and projected. The darker colored fields 2537 reflect the number used up for each ingredient, showing also the total number in the last darker colored field 2538. The lighter colored field 2539 reflect the still available inventory, also showing the total number 2540 in the lighter colored field. There is also a red colored bar indicator 2541 showing that this ingredient runs low, whereby the variance data 2536 reflects the remaining inventory. Low indication send an auto-notification to the chefs station SUDI screens 2542, illustrated exemplarily under FIG. 34, FIG. 35/Ref: 2176 and FIG. 36. The same inventory display is available for the plurality of cooking station SUDIs, illustrated exemplarily under FIG. 37 and FIG. 38, which when running low at the frontline inventories, send also an auto-notification to the preparation and portioning station SUDIs screen 2543, illustrated exemplarily under FIG. 39 and FIG. 40 to replenish the cooking station inventory, with auto-notification to the chef station SUDI FIG. 34, FIG. 35/Ref: 2176 and FIG. 36. Under the multi segment vertical scrollable fields 2544 are a plurality of inventory assessment tools, also accessible from the managers and chefs station SUDI FIG. 34, FIG. 356 and FIG. 36. Assessments for largest or least used ingredient quantity by week 2545 or month 2546 is executed by selecting first the relevant main function tab 2545 or 2546, followed by selecting the relevant sub-functions. The same process applies for average week 2547 and average month 2548, and time and/or shift based assessments for week 2549 and months 2550. There are also report function tabs 2551 and 2552, when selected, allow for the automated compiling of a plurality of reports that will be displayed in field F-9. Additional function tabs can be added and customized, illustrated exemplarily as 2553. There is also a standard display legend 2554 in relation to the current shown display in field F-9. It allows for a plurality of additional icons that can be linked to a plurality of customized function tabs 2553. Under the horizontal scrollable segment 2554 there is a print function tab 2555 that allows for the printout of a plurality of displayed data and information to a connected printer. A plurality of displayed data and information can also be saved to a designated folder 2556, and a plurality of reports, available under 2551 and 2552 can be merged and printed 2555 and or saved 2556. A plurality of additional function tabs can be added and customized during customization. This ingredient inventory display mirrors the front-line inventory display for a plurality of other SUDIs that allow the display of inventory.

FIG. 45

Figure 45:
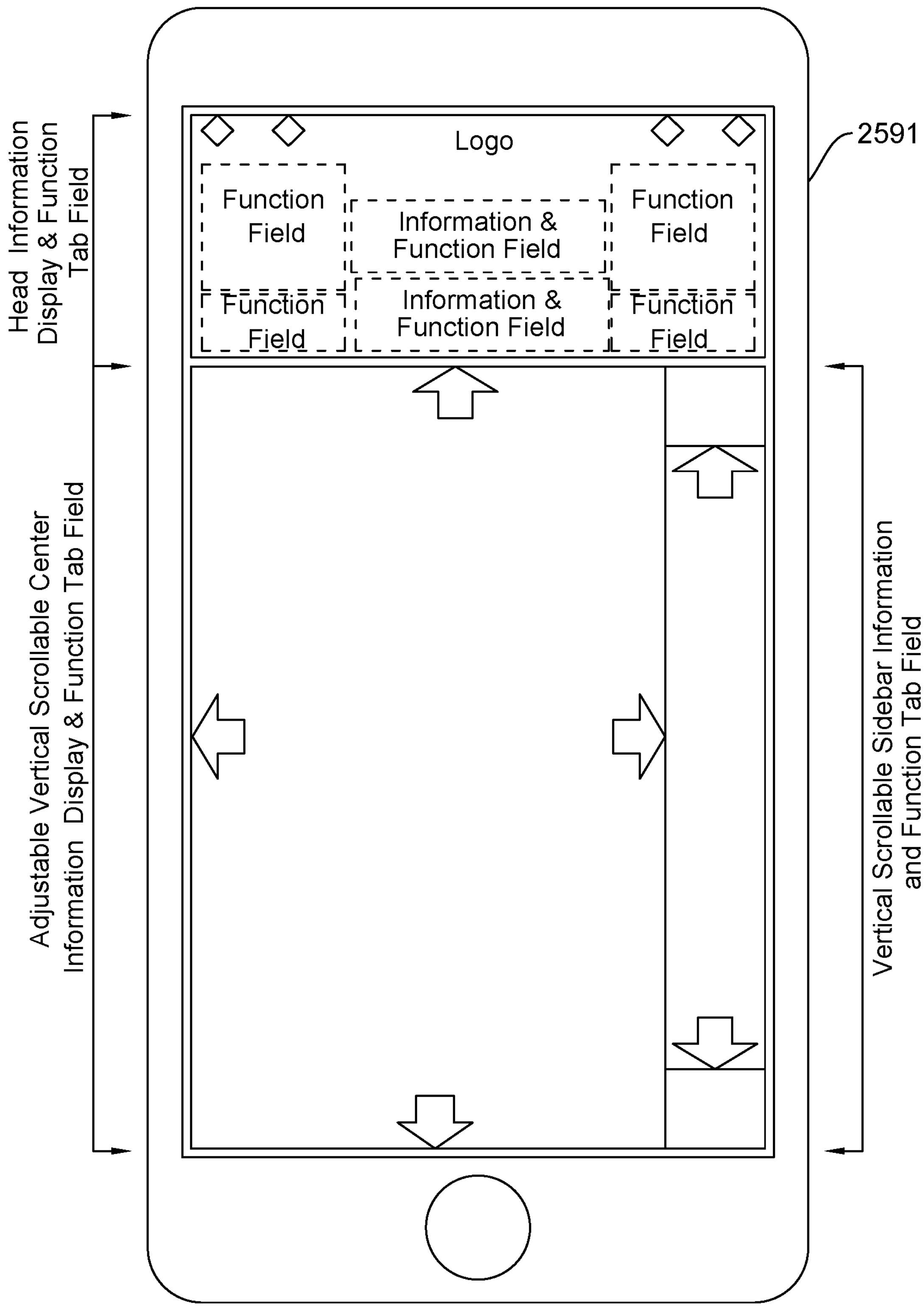
FIG. 45 illustrates exemplarily a typical SUDI screen display of the present invention of the CCOS 1 for a plurality of service stations including mobile SUDIs.

Referring now to FIG. 45 illustrating exemplarily a typical landing screen 2557 for a staff station SUDI, illustrated exemplarily under FIG. 03 as 121, 122, 123, 124, 135. The shown screen display 2557 comprises of the same upper segments 2558, illustrated exemplarily under FIG. 41. Under the vertical scrollable segment 2559 is a customized main manual 2560 comprising of a plurality of function tabs, customized for front of house operations. Illustrated are an authorized staff function tab 2561, a login and logout function tab 2562, a shift change function tab 2563, a seating display 2564, illustrated exemplarily within field F-9, a reservation function tab 2565, exemplarily addressed under FIG. 45, a performance data function tab 2566, also illustrated exemplarily under the manager screen FIG. 33/Ref: 2037 and the chef screen FIG. 35/Ref: 2181. There is also a cashier function tab 2567, illustrated exemplarily under FIG. 46, and a memo function tab 2568 with indication of unread memos 2569. When the seating function tab 2564 is selected the current seating situation, including future reservations are displayed in field F-9, differentiating seats that are occupied by members 2570 and non-members 2571, and member reservations 2572 and non-member reservations 2573. For effective floor management, there are further information displayed on the screen in field F-9, illustrated exemplarily the members arrival time 2574 and estimated dining duration 2575. There are also scheduled reservation tags for seats that are currently occupied 2576 and 2577, alerting the staff user that for said seats 2576 and 2577 is already a follow up reservation 2578 and 2579 including time information. When a particular member tag is selected, the relevant available member data is displayed 2580 within field F-5 under the multi segment vertical scrollable field 2581, providing the service staff with a plurality of information and dining history, including ingredient preferences 2582 and non-preferences 2583 that allows for the introduction on new and/or promotional menu items that may meet the members taste. Within the horizontal scrollable segment 2584, are a plurality of function tabs, comprising of a member reservation function tab 2585, that results in a member specific reservation, and a non-member reservation function tab 2586 popup window, exemplarily illustrated under FIG. 46. Selecting and de-selecting the show advance reservation function tab 2587 allows for the showing and hiding of the relevant corresponding reservation information in field F-9, and Selecting and de-selecting the show arrival and duration function tab 2588 allows for the showing and hiding of the relevant corresponding time information in field F-9. Further functions can be added and customized during customization, illustrated exemplarily as 2589 and 2590. Illustrated exemplarily are also two typical service staff and management handheld SDUIs 2591 and 2592, illustrating exemplarily different possible screen layouts in which the same information, shown in the illustrated SUDI screen 2557 can be displayed and used. A north direction is also shown 2593, and window seating is also identified 2594 and 2595. Member and non-member users see the same screen in field F-9 when making a reservation, allowing for online selection of seats, using symbol identification. Within the fixed segment 2596 within field F-7, help notifications are displayed from customers who require assistance (Ref FIG. 09/Ref: 411).

FIG. 46

Referring now to FIG. 46 illustrating exemplarily a typical landing screen 2597 for a staff station SUDI, illustrated exemplarily under FIG. 03 as 121, 122, 123, 124, 135. The shown screen display 2597 comprises of the same upper segments 2598, illustrated exemplarily under FIG. 45. Under the vertical scrollable segment 2599 is a customized main manual, illustrated under FIG. 41 for front of house and counter operations. The main menu also embraces a plurality of non-illustrated function tabs, including inventory, and operational front of house related data and information. When selecting the reservation function tab 2600 the interactive reservation display 2601 emerges in field F-9. A plurality of searches can be executed, including name 2602, member ID 2603, reservation ID 2604. Additional functions can be added and customized during customization, illustrated exemplarily as 2605 and 2606. For reservation, a date can be selected 2607 on the interactive calendar display 2601. A reservation start time can be selected 2608 using a time-turn wheel 2609. A reservation end time 2610 (duration) can be selected 2532 using a second time-turn wheel 2611. A holding reservation time 2612 can be selected using a third time-turn wheel 2613. A single or plurality of seats can be selected, illustrated under FIG. 45. The respective reservation times 2608 and 2609 are displayed on the SUDI screen, illustrated exemplarily under FIG. 45. An automated notification can be activated that sends a specific message at a pre-determined time 2614 to the contact numbers entered into the contact fields 2615 using the emerging popup window number pad 2616. Response notifications are displayed under the vertical scrollable segment 2617 in field F-7, with the corresponding member details displayed within the multi segment vertical scrollable fields 2618 within field F-5. There is also a cashier's function tab 2619 display, when selected, displays and activate a cashier function 2620 within field F-9. Within the horizontal scrollable segment 2621, are a plurality of function tabs that resemble the function tabs illustrated under FIG. 45. The front of house operation also uses wrist SUDIs 2622 that display, and allow, for a plurality of communions and notification relevant to the service provided within the front of house operation, illustrated exemplarily under FOF 05/Ref: 220 and 251.

FIG. 47

Referring now to FIG. 47 illustrating exemplarily the independent interlinked and interexchangable plurality of a higher and lower level modem including compartmentalized database modules arrangement of the present invention of the CCOS 1. Every module and compartmentalized database contains every programming required to execute a plurality of delegated tasks, processes, and functions, applying including specific defined interfaces with a plurality of interlinked modules that allows for the rapid expansion of the system of the COOS 1.

Illustrated is a central operation and finance management library module 2623. The head office 2624 is in control of every aspect and access to the central operation and finance management and library module 2623, whereby certain tasks, processes, and functions may be assigned to its branches, representation, and subsidiaries 2625 and/or any of the plurality of participating restaurants 2626. A plurality of third party TPDUIs 2627 and personal user device interfaces PUDIs 2628 can, upon authorization from the head office 2624, also logon to the central operation and finance management and library module 2623, and links to a plurality of other third parties, illustrated exemplarily as social media service providers 2629, credit card service providers 2630, and banking facilities 2631 can also be established.

The head office 2624, through the central operation and finance management and library module 2623, manages; every use and operational aspect and access in relation to the central high-level modules, comprising of the central SUDI, MSUDI, SRUDI, TPUDI, and PUDI module 2632, whereby observing certain limitations involving PUDIs set by governing regulations; every use and operational aspect and access in relation to the central membership module 2633 and the central loyalty program module 2634; every use and operational aspect and access in relation to the central marketing and service module 2635; every use and operational aspect and access in relation to the centralized health and wellness module 2636: every use and operational aspect and access in relation to the central ingredient module 2637; every use and operational aspect and access in relation to the central storage and inventory management module 2638; every use and operational aspect and access in relation to the central entertainment module 2639; every use and operational aspect and access in relation to the central diabetic and related module 2640; and every use and operational aspect and access in relation to the plurality of additional high-level modules that can be added during customization, illustrated exemplarily as 2641. All said high-level modems, inclusive of compartmentalized databases 2632, 2633, 2634, 2635, 2636, 2637, 2638, 2639, 2640, 2641 are linked and communicate and interface with a plurality of participating high-level restaurant modules with compartmentalized databases, illustrated exemplarily as participating restaurant 1 2642, including a plurality of additional participating restaurants that can be added during the expansion of operation, illustrated exemplarily as 2643. Under each participating restaurant high-level modem, illustrated exemplarily as participating restaurant 1 2642 are a plurality of department and/or function based low-level modules including compartmentalized databases that are linked and communicate and interface with the participating restaurant 1 2642 high-level module. The low-level modules are illustrated exemplarily as a local management module 2644 including its own compartmentalized database, a front of house module 2645 including its own compartmentalized database, a back of house module 2646 including its own compartmentalized database, a café and bakery module 2647 including its own compartmentalized database, a fast food module 2648, a restaurant and bar module 2649 including its own compartmentalized database, a local storage and inventory management module 2650 including its own compartmentalized database, a local staff management module 2651 including its own compartmentalized database, a local waste management module 2652 including its own compartmentalized database, a local cooking station module 2653 including its own compartmentalized database, a local preparation and portioning module 2654 including its own compartmentalized database, and a local receiving station module 2655. Additional modems can be added during customization, illustrated exemplarily as 2656. Additional sub-modules are structured under each of the said modules, illustrated exemplarily as 2657. Each of the aforesaid modules 2644, 2645, 2646, 2647, 2648, 2649, 2650, 2651, 2652, 2653, 2654, 2655, 2656, 2657 communicate and interface with and/or through each other and/or through the high level module, illustrated exemplarily as 2642 and 2643 with the plurality of high level modules 2632, 2633, 2634, 2635, 2636, 2637, 2638, 2639, 2640, 2641. There is also a central analytical high-level module 2658 including a compartmentalized databases, and its plurality of low-level sub-modules 2659 that collect, process, and analyze a plurality of data derived from a plurality of modules including but not limited to 2625, 2625, 2626, 2627, 2628, 2629, 2630, 2631, 2632, 2633, 2634, 2635, 2636, 2637, 2638, 2639, 2640, 2641, 2642, 2643, 2644, 2645, 2646, 2647, 2648, 2649, 2650, 2651, 2652, 2653, 2654, 2655, 2656, 2657, and allow the head office 2624 to apply said data to make a plurality of projections.

There are also a plurality of third party low-level service modules structured under a third party high level service module 2660 including a compartmentalized database. Said third party low-level modules include but are not limited to a legal services module 2661 including its own compartmentalized database; an accounting and audit service module 2662 including its own compartmentalized database; a consulting service module 2663 including its own compartmentalized database; a third party IT, CRM, hosting and data warehousing modem 2664 including its own compartmentalized database; a supply and service provider modem 2665 including its own compartmentalized database; and a call center service modem 2666 including its own compartmentalized database. Additional modems can be added during customization, illustrated exemplarily as 2667. There is also a high level central branch, representative office, and subsidiary modem 2668 including its own compartmentalized database, allowing for a plurality of low-level branch and representative office modules 2669 and subsidiary modems 2670.

FIG. 48

Figure 48:
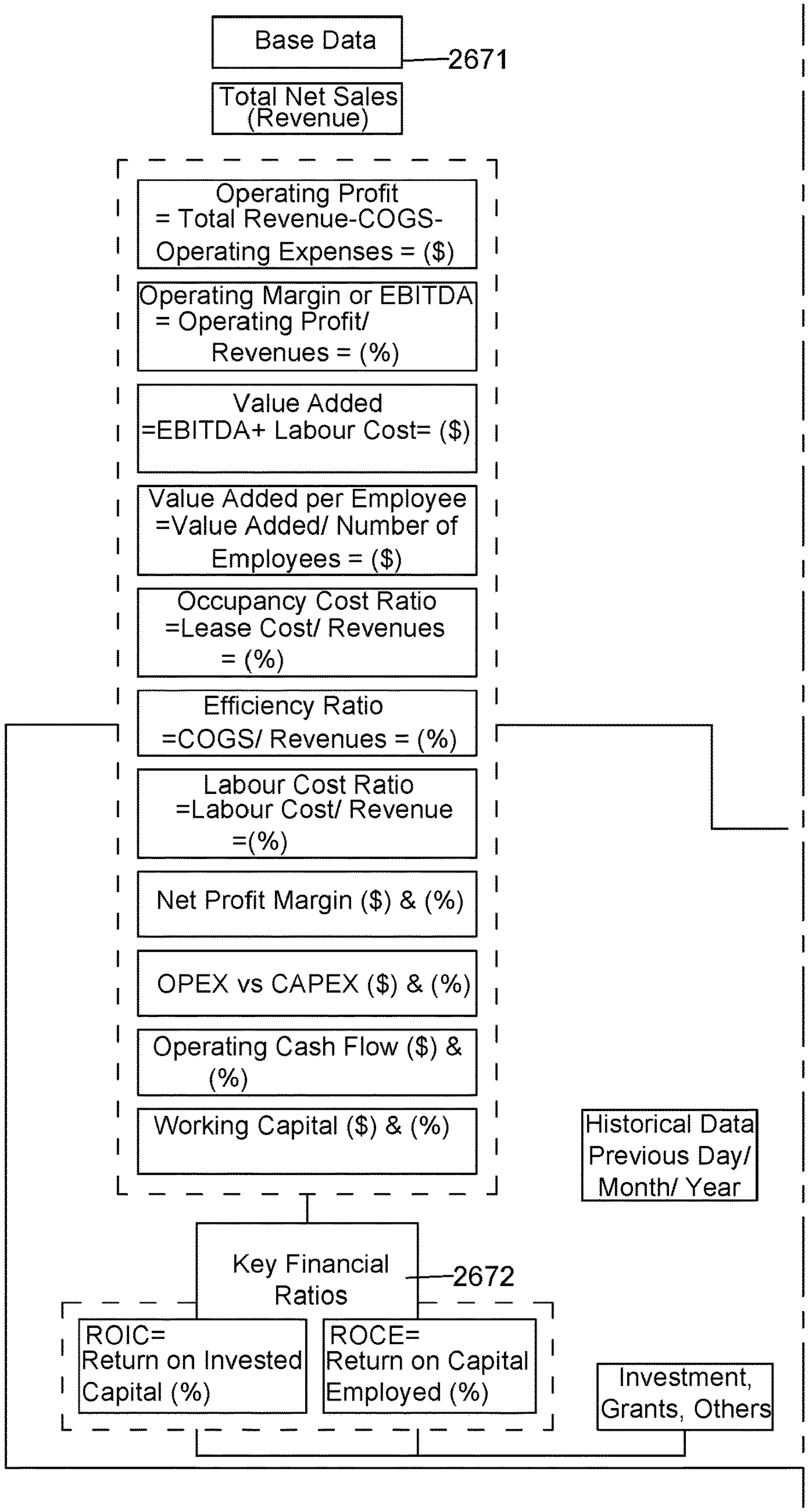
FIG. 48 illustrates exemplarily the plurality of base data and the relevant corresponding financial ratios utilized in relation to a plurality of analytics by the present invention of the CCOS 1.

Referring now to FIG. 48 illustrating exemplarily the plurality of base data 2671 and the relevant corresponding financial ratios 2672 utilized in relation to analytics 1 2673 and analytics 2 2674 embracing also individual segments 2675, and a plurality of other analytics, illustrated under FIG. 49, 50, 51, 52, including a plurality of investment consideration.

FIG. 49

Referring now to FIG. 49 illustrating exemplarily a plurality of restaurant performance 2676 analysations, illustrated exemplarily as analysis 3 2677, analysis 4 2678 and their relevant corresponding breakdowns 2679, 2680, and 2681; analysis 5 2682, comprising of a plurality of utilization analytics 2683, and relevant corresponding breakdowns 2684 and 2685, analysis 6 2686, comprising of customer breakdown and loyalty program, and their relevant corresponding breakdowns 2687, allowing for a plurality of analytical projections 2688.

FIG. 50

Figure 50:
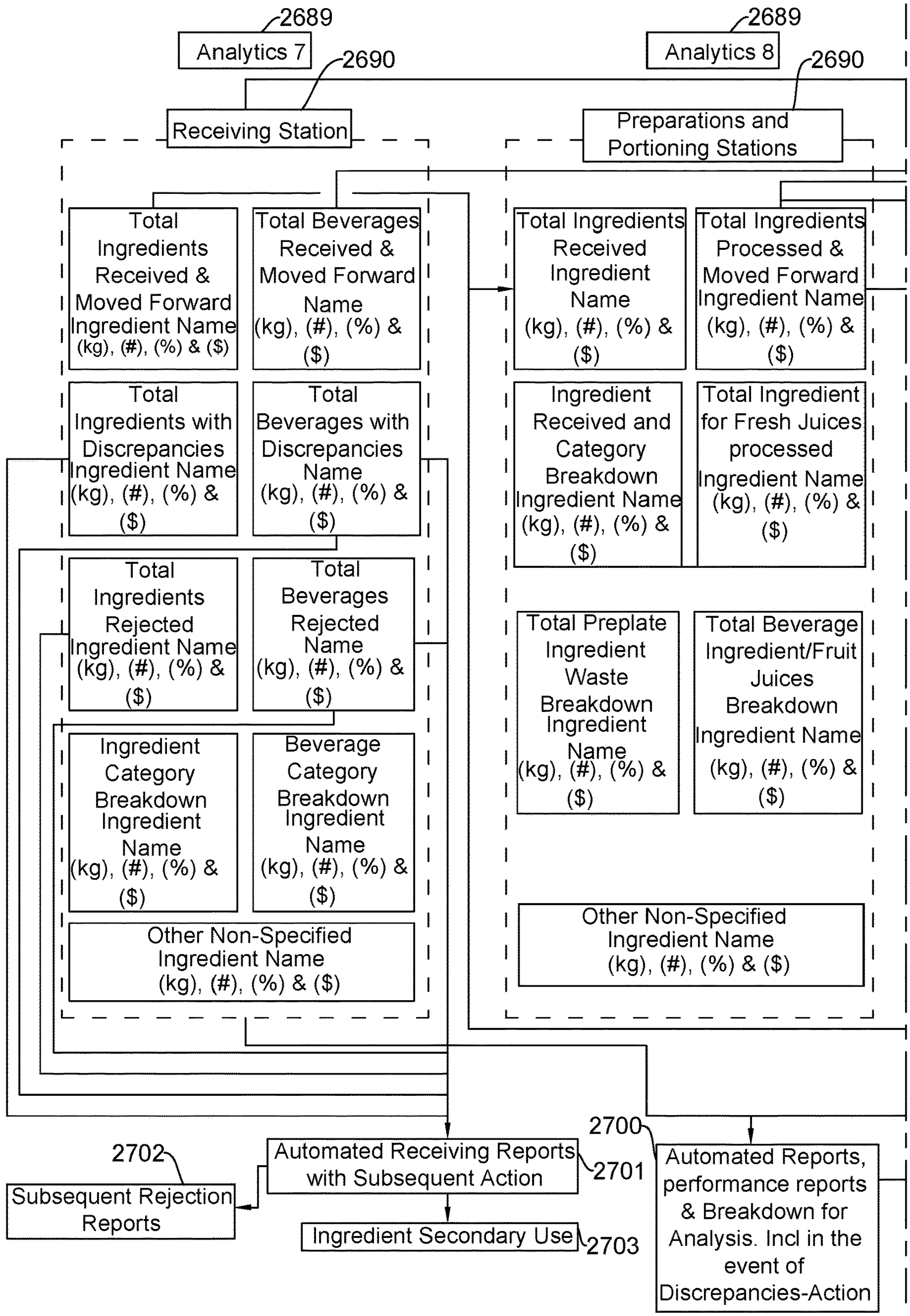
FIG. 50 illustrates exemplarily a plurality of individual station performances and data utilized in relation to a plurality of analytics by the present invention of the CCOS 1.

Referring now to FIG. 50 illustrating exemplarily a plurality of individual station performances, comprising of analytics 7 2689 the receiving station 2690, analytics 8 2691 the plurality of preparation and portioning stations 2692, analytics 9 2693 the plurality of pre-cooking stations 2694, analytics 10 2695 the plurality of storage areas and units 2696. It allows for comprehensive infrastructure, use and cost analysis 2697 and reporting. It also allows for food waste analytics, assessment of discrepancies analysis and action taken, and reporting 2698. It also allows for manual interaction by criteria, parameters, and data comparison of target and actual data 2699. It also allows for the setting and customization of auto performance reporting and breakdown analysis including in the event of discrepancies 2700, automated receiving report with subsequent action 2701, rejection reports 2702, including ingredient allocation for secondary use 2703.

FIG. 51

Figure 51:
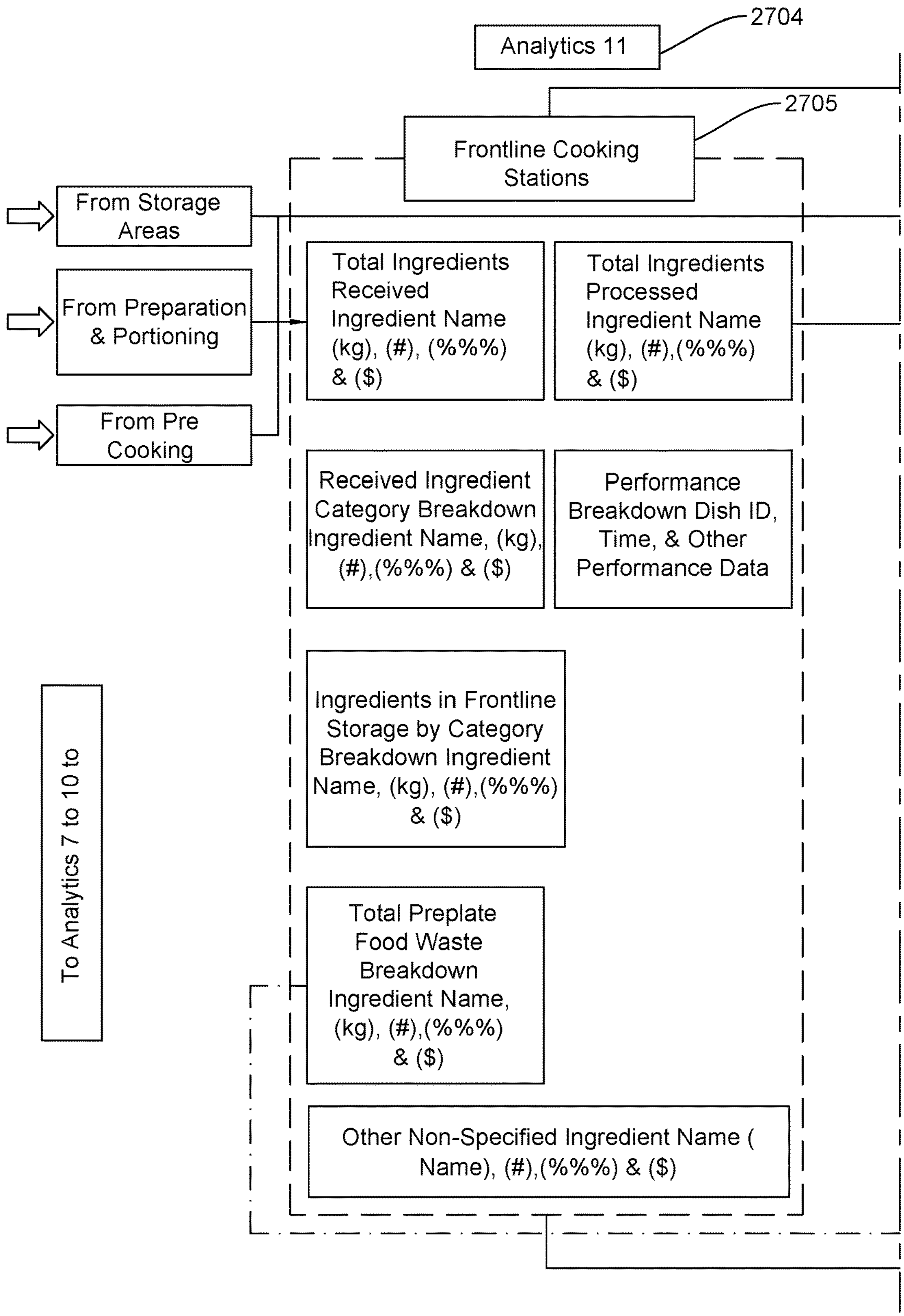
FIG. 51 illustrates exemplarily further a plurality of individual station performances and data utilized in relation to a plurality of analytics by the present invention of the CCOS 1.

Referring now to FIG. 51 illustrating exemplarily a plurality of individual station performances, comprising of analytics 11 2704 the plurality of frontline cooking stations 2705, analytics 12 2706 the pot and dishwashing station 2707, analytics 13 2708 the coffee roasting station 2709, analytics 14 2710 the waste management analytics 2711. It allows for comprehensive infrastructure, use and cost analysis 2712 and reporting. It also allows for food waste analytics, assessment of discrepancies analysis and action taken, and reporting 2713. It also allows for manual interaction by criteria, parameters, and data comparison of target and actual data 2714. It also allows for the setting and customization of auto performance reporting and breakdown analysis including in the event of discrepancies 2715.

FIG. 52

Figure 52:
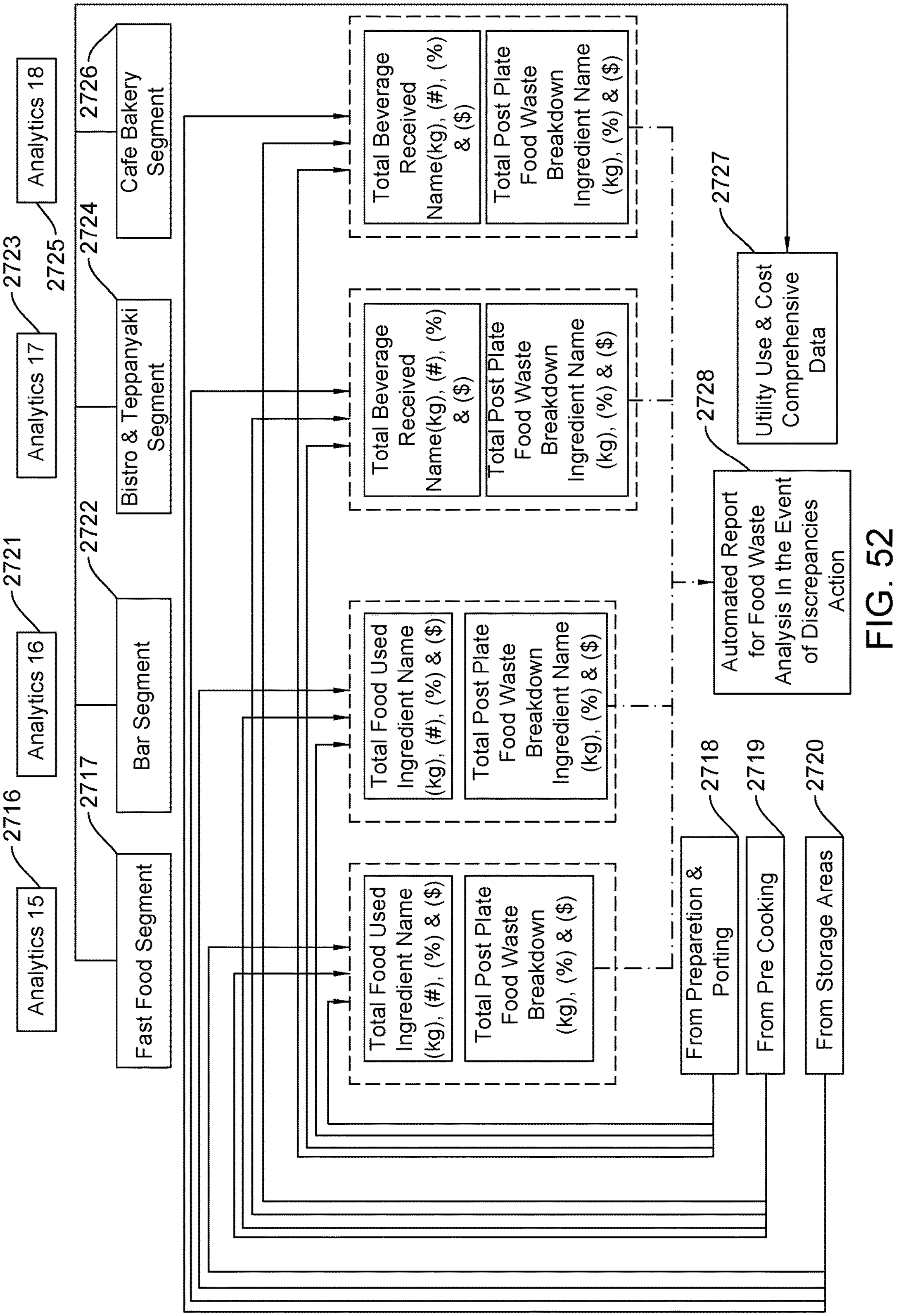
FIG. 52 illustrates exemplarily a plurality of individual segment and data utilized in relation to a plurality of analytics by the present invention of the CCOS 1.

Referring now to FIG. 52 illustrating exemplarily a plurality of individual segment performances, comprising of analytics 15 2716 the fast food segment 2717, receiving ingredients and/or food products from the preparation and portioning stations 2718, the pre-cooking stations 2719 and/or from storage 2720, analytics 16 2721 the bar segment 2722, receiving ingredients and/or food products from the preparation and portioning stations 2718, the pre-cooking stations 2719 and/or from storage 2720, analytics 17 2723 the bistro and teppanyaki segment 2724, receiving ingredients and/or food products from the preparation and portioning stations 2718, the pre-cooking stations 2719 and/or from storage 2720, analytics 18 2725 the café and bakery segment 2726, receiving ingredients and/or food products from the preparation and portioning stations 2718, the pre-cooking stations 2719 and/or from storage 2720. It allows for comprehensive infrastructure, use and cost analysis 2727. It also allows for food waste analytics, assessment of discrepancies analysis and action taken, and reporting 2728.

FIG. 53

Figure 53:
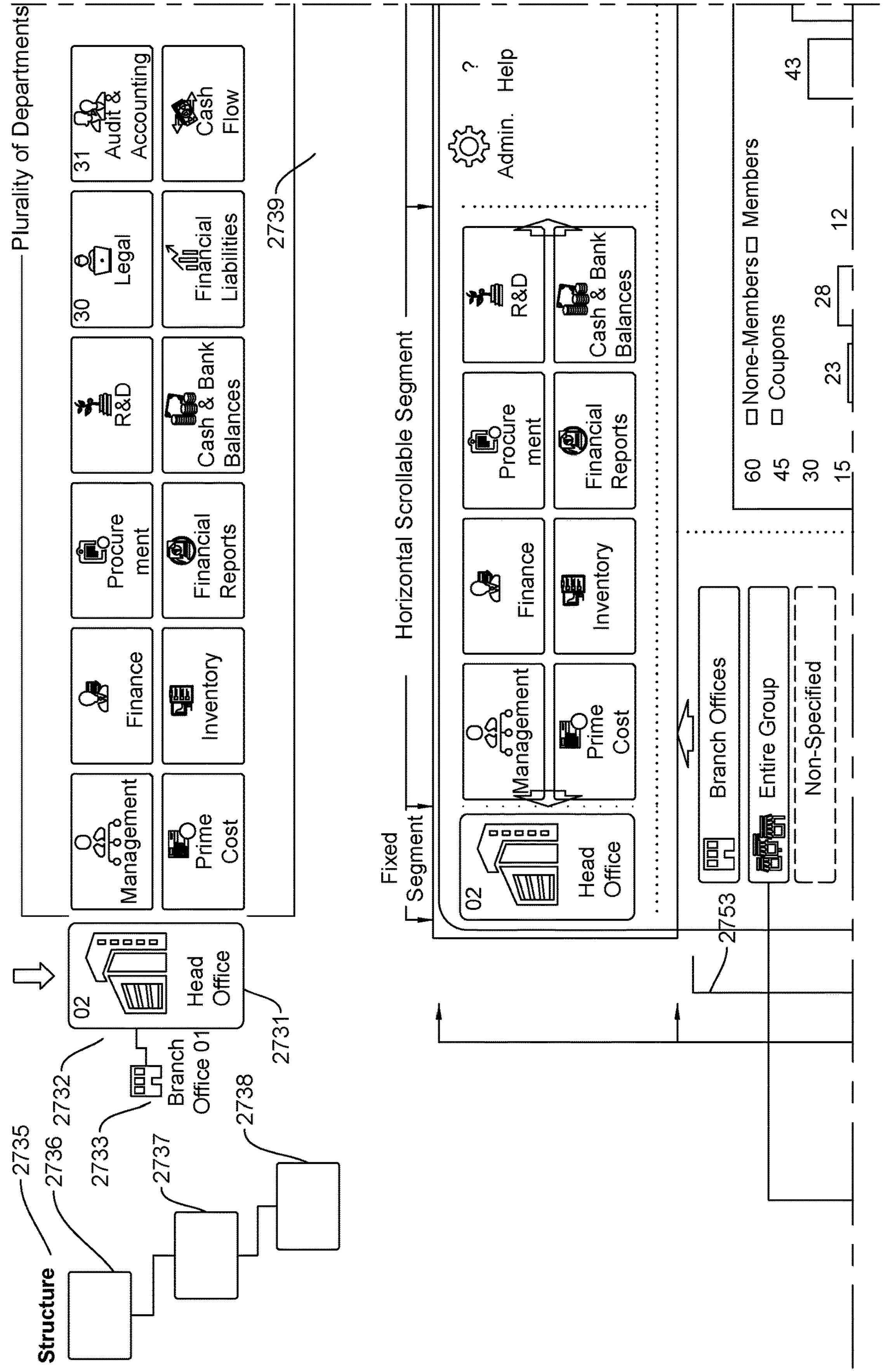
FIG. 53 illustrates exemplarily a typical SUDI screen display of the present invention of the CCOS 1 for a head office SUDI, and a plurality of representation, branch, or subsidiary offices SUDIs.

Referring now to FIG. 53 illustrating exemplarily a typical landing screen 2729 for a head office SUDI, and a plurality of representation, branch, or subsidiary offices SUDIs, illustrated exemplarily under FIG. 01/Ref: 02 and 03. The shown screen display 2729 comprises in its arrangement of the same upper segments 2730, illustrated exemplarily under FIG. 41, whereby SUDIs situated within the head office will identify a symbol function tabs 2731 related to head office within the main function tab 2732. SUDIs situated within representation, branch, or subsidiary offices, illustrated exemplarily a branch office 2733, identify the relevant branch office 2733. Under the upper segment of a plurality of function tabs are department function tabs and links the third party segments including links 2734 that can be extended to allow for additional function tabs. It allows for a three tier structure 2735, allowing for the selection of a department 2736, a sub-section of a department 2737 and a particular positions and/or SUDI stations 2738. All three levels can be customized. In the lower function tab segment are a plurality of operational function tabs 2739 that allow for separate and joint selection to customize and/or transform a single or plurality of realtime screen displays in field F-9, illustrated exemplarily as two vertical and horizontal movable displays 2740 and 2741. In the shown example, the display of information in field F-9 is relevant and corresponding to information derived from a plurality of selected participating restaurants, illustrated exemplarily as 2742 and 2743 in the lower portion of the vertical scrollable segment 2744. A selection made within a particular district 2745, illustrated exemplarily as district B 2746. Realtime information can also be shown in field F-9 relevant to the entire group 2747, by country 2748, by region 2749, by county 2750, and/or by city 2751. Additional function tabs can be added under the vertical scrollable segment 2752 within the upper segment 2753, illustrated exemplarily as 2754, and in the lower part 2744, illustrated exemplarily as 2755 and 2756. The notification field 2757 in the fixed segment 2758 displays realtime incoming notification that can come from any party throughout the organization.

Within field F-5 under the multi segment vertical scrollable fields 2759 in the upper vertical scrollable segment 2760 are a plurality of customizable function specific function tabs. In the shown example, it allows authorized staff to drill down further into a selected restaurants, exemplarily restaurant 1 2761, viewing the managers screen 2762 illustrated exemplarily under FIG. 32 in realtime. This segment allows further customization to include any other screen within a participating restaurant as illustrated with 2741. Under the multi segment vertical scrollable fields 2759, within filed F-5, the lower vertical scrollable segment 2763 are a plurality of customizable function tabs that can be assigned during customization to suit a particular office and/or SUDI station. Under the horizontal scrollable segment 2764 are a plurality of horizontal scrollable function tabs, comprising of a print function tab 2765, a print to folder function tab 2766 that allows for a popup window function to select a single or plurality of designated folders. There is also a merged report function tab 2767. It allows the merging of reviewed and displayed data and information in report format when a select icon, illustrated exemplarily as 2768 and 2769 was selected. There is also a compile monthly report function tab 2770 that, when selected, automatically compiles a monthly report that can be customized, printed 2765 and/or saved. Customization is executed by selecting first the customize by selecting individual report components that have been previously established using the customizable functions under 2763, allowing for a plurality of options and variations. The same applies for the compile annual report 2771 and the compile interim report 2772, whereby the said plurality of reports can be tailored to include and/or merge the entire group 2747, a single or plurality of countries 2748, a single or plurality of regions 2749, a single or plurality of counties 2750, a single or plurality of cities 2751, a single or plurality of city districts 2745 or a single or plurality of participating restaurants 2742 and 2743. Within the horizontal scrollable segment 2773 is a variance to other screen displays. There are authorization ID levels for each authorized member of the staff. All authorization levels throughout the COOS 1 can be set under the authority setting function tab 2774. There is also the display when a member of the staff has signed in and signed out 2775, providing other members of the staff, who might be within a different area or room relevant information. The customization function 2776, when activated allows for the customization of the plurality of customizable function tabs 2763 within a popup window that allows a plurality of functions and processes to be linked.

FIG. 54

Figure 54:
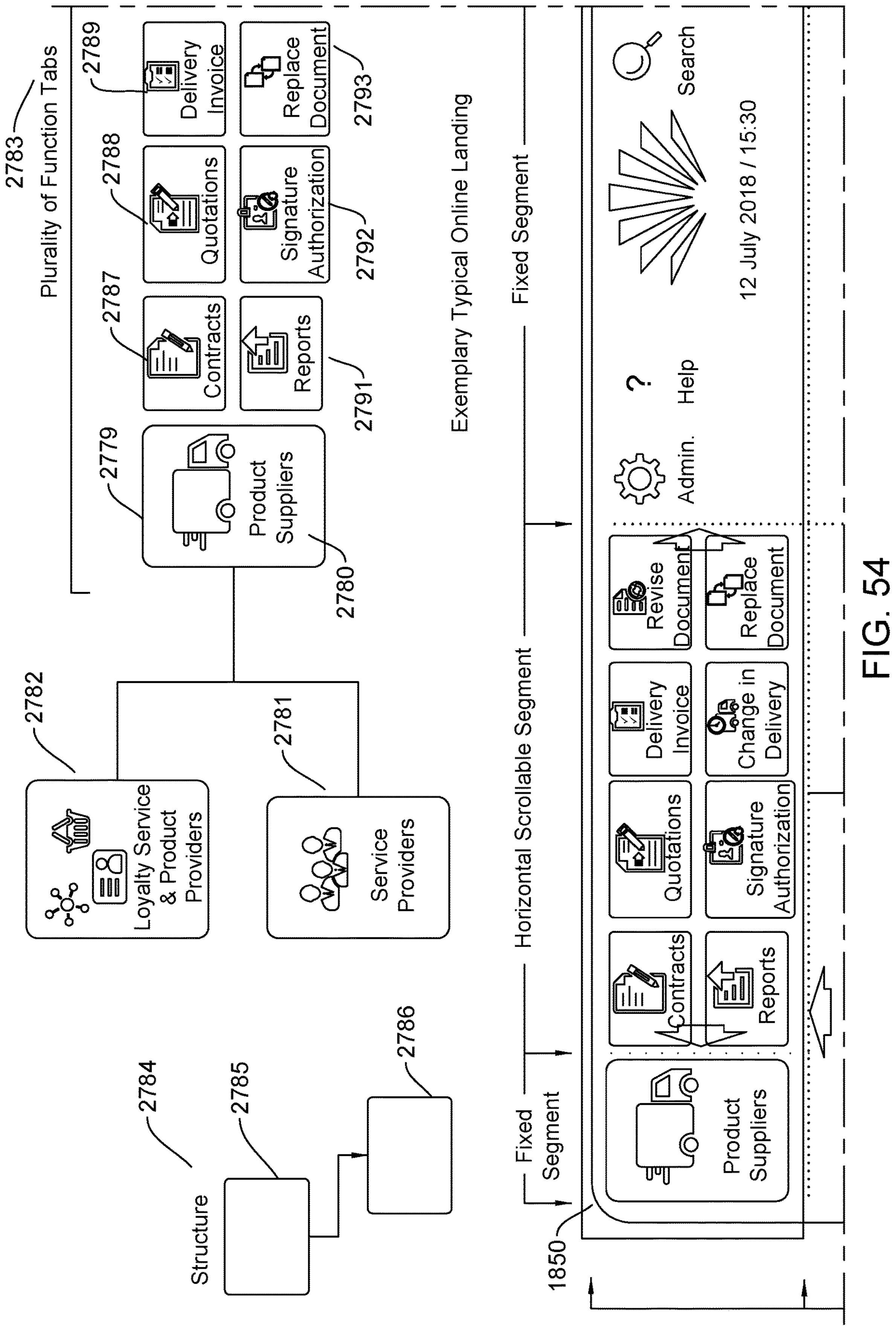
FIG. 54 illustrates exemplarily a typical online screen display of the present invention of the CCOS 1 for a plurality of third party product and service providers and a plurality of loyalty product and service providers (TPUDIs).
Figure 55:
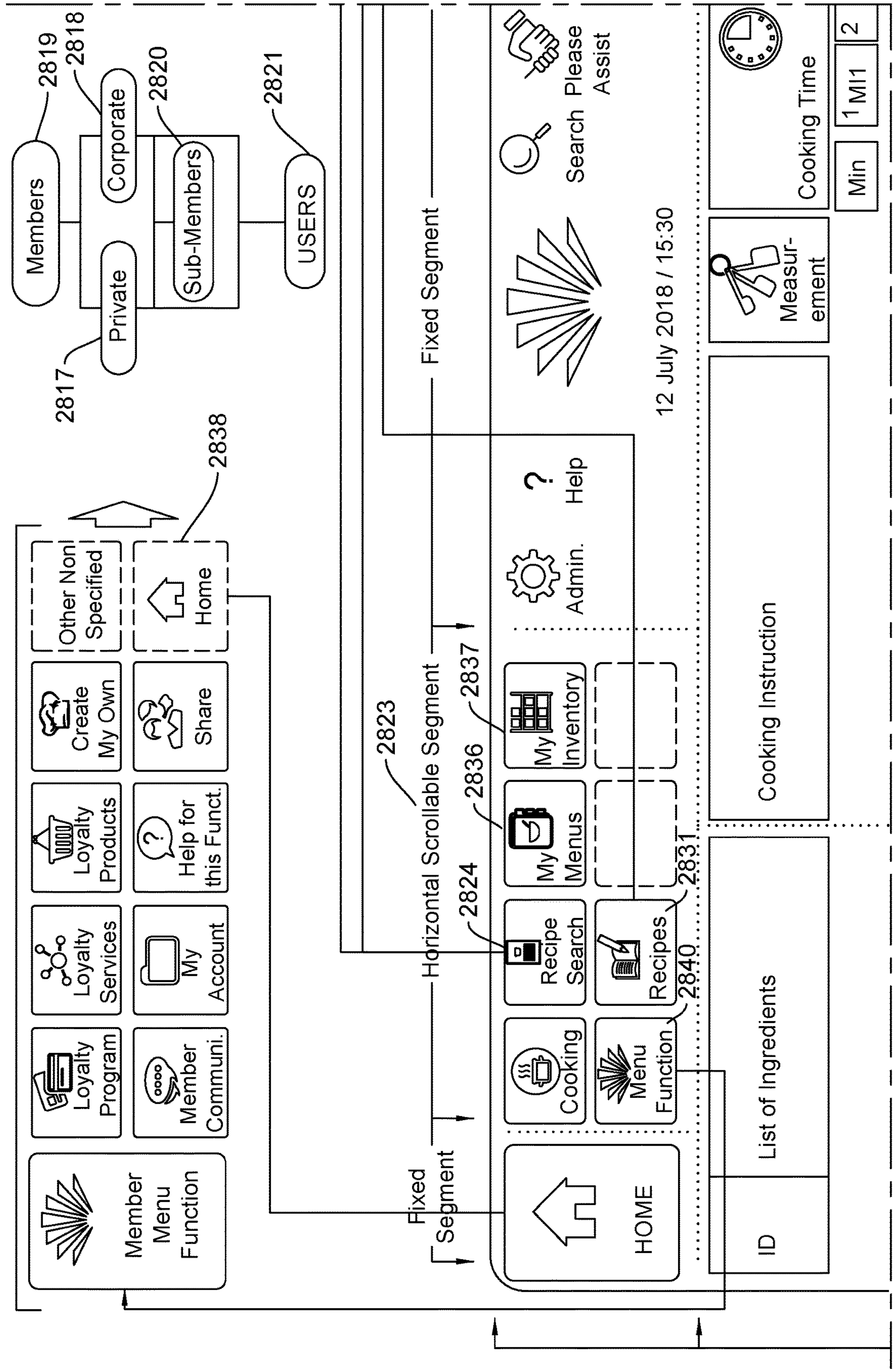
FIG. 55 illustrates exemplarily a typical PUDI screen display of the present invention of the CCOS 1 accessible to member 2819 users 2821 as part of the home online service of the present invention of the CCOS 1.

Referring now to FIG. 54 illustrating exemplarily a typical online landing screen 2777 for a plurality of third party product and service providers and a plurality of loyalty product and service providers TPUDIs, illustrated exemplarily under FIGS. 01, 11, and 12. The shown screen display 2777 comprises in its arrangement of the same upper segments 2778, illustrated exemplarily under FIG. 41, whereby the identification display 2779 will change depending on the respective third party that is logged in, illustrated exemplarily under FIG. 02/Ref: 55, 56 and 57, and Illustrated exemplarily for this screen 2777 as a product supplier identification 2780, a service provider identification 2781, a loyalty product and/or service provider identification 2782. There are a plurality of horizontal scrollable function tabs 2783, that allow for a two tier structure 2784, allowing for the selection of a main function group 2785 and a sub-group 2786 that comprise of a plurality of relevant documents, forms, and functions. Illustrated exemplarily for a product supplier 2780 there is a main group for contracts 2787, comprising of a plurality of standard online contracts and agreements that a product supplier 2780 can review, comment, and execute online. A product supplier can select from a plurality of online quotation formats under the quotation function tab 2788, and complete and submit a quotation online. Under said sub-function, a product supplier can also scan quotation documents and upload and submit such quotations. A product supplier can also complete a plurality of online delivery invoices 2789 corresponding to received e-purchase orders. It allows for an expedient delivery process, illustrated exemplarily under FIG. 42. A product supplier can also revise existing submitted online documents 2790 to correct errors and/or update said documents. A plurality of reports 2791 can also be furnished and submitted. A product supplier can also establish and amend signature authority 2792 for delivery staff and/or management staff with signature and/or decision authority, illustrated exemplarily under FIG. 42/Ref: 2749, and replace existing submitted documents 2793 in the event said documents need to be exchanged. A product supplier can also select the communication function tab 2794, that displays the point of contact and other relevant contact information, similar as illustrated exemplarily under FIG. 41/Ref: 2145 in field F-4. A product supplier can execute an ad-hoc urgent delivery 2795 inclusive of relevant corresponding documents, schedule and enter delivery times 2796 into an online delivery schedule to avoid waiting time and congestions at the point of delivery; and when required due to unforeseen circumstances change delivery time 2797, or cancel delivery 2798. The main panel under the vertical scrollable segment 2799 allows activation of the execution 2800 of a displayed e-document after an e-document was selected, illustrated exemplarily a delivery invoice 2801 under the function tab 2789. Upon completion of the e-form of a delivery invoice 2801 in field F-9 it can be converted into a hard copy document, using the convert into document function tab 2802, resulting in the display of the hardcopy document 2803 in field F-9. If changes become necessary, it allows a toggle switch on the respective document allows for switching between the hardcopy and the e-form until completion. A product supplier can also upload an own company logo 2804 onto a hardcopy document. A product supplier can also review past delivery and relevant corresponding performances 2805. Additional function tabs can be added during customization, illustrated exemplarily as 2806. Loyalty service and product providers 2782 can also execute online documents covered by the plurality of function tabs 2783, and submit online coupons 2807 and/or barcode discount coupons 2808, and/or a plurality of non-specified coupons 2809. Under the horizontal scrollable segment 2810 is the display that identifies the respective authorized members of the staff who are authorized to execute transactions, whereby authorization levels can be set also under signature authorization function tab 2792. Field F-5 under the multi segment vertical scrollable fields 2811 and the horizontal scrollable segment 2812 in field F-6 is reserved for customization of a plurality of interfaces 2813 to allow product suppliers 2780, service providers 2781, the plurality of loyalty service and product providers 2782 to establish corporate accounts that allow for interface integration with said providers own online operations. Under the fixed segment 2814 is the information and notification display 2815 that displays specific messages and/or notifications designated for a logged in third party.

FIG. 55

Referring now to FIG. 54 illustrating exemplarily a typical landing screen 2816 accessible to private 2817, corporate 2818 member 2819 users 2821 and their respective sub-member 2820 users 2821 as home online service screen that allows member 2819 users 2821 to cook ordered ready portioned dishes, delivered and/or collected from a participating restaurant at home, illustrated exemplarily under FIG. 10/Ref: 564, 565 and FIG. 13/Ref: 731, 733, 734. Member 2819 users 2821 have the same screen 2816 available to them on their PUDI as a line cook has on a SUDI when cooking a ordered menu item, illustrated exemplarily under FIG. 37. When an order is delivered and/or collected 2822, member 2819 users 2821 select within the horizontal segment 2823 the recipe search function tab 2824. An interactive popup window emerges and a member 2819 users 2821 enters the barcode number 2825 in a field. When the member 2819 users 2821 has a barcode reading device, the barcode on the menu item package 2825 can be read. When the search is activated, the CCOS 1 system searches, resulting in the display of the relevant cooking instructions 2826, that mirror in its application and functions the cooking instruction for a line cook of a participating restaurant, illustrated exemplarily under FIG. 37, whereby the name of the dish 2827 is displayed in the fixed segment 2828, and the other details are displayed within the vertical scrollable field 2829. The cooking process is activated when the cooking function tab 2830 is activated. A cooked dish recipe can be customized and saved into a personal menu, that is the same personal menus illustrated exemplarily under FIG. 10, allowing for original or customized replication within a participating restaurant. To customize a ordered dish can be executed by keeping the cooking instruction open (displayed on screen) and selecting the recipe function tab 2831, resulting in the display of the recipe screen 2832, illustrated exemplarily under FIG. 34, whereby a determination can be made to assign the recipe to a single or plurality of member 2819 users 2821, illustrated exemplarily the father 2833, the mother 2834, and the son 2835. Own personal private menus can be established 2836 for competition purposes, illustrated exemplarily under FIG. 14. A Food Inventory can also be created 2837, that follows the same ingredient inventory structure illustrated under FIG. 56 for own household use. Member 2819 users 2821 can access the home menu 2838 on the member menu 2839 and return to the member menu 2839 when selecting the menu function tab 2840. Authorised members are identified under the horizontal scrollable segment 2841. The function tabs 2842 and 2843 are reserved to accommodate customizable interface functions involving other third party menu and/or recipe platforms and services used by member 2819 users 2821. The main menu 2844 of the recipe screen display 2832 allows has a recipe and menu economics function tab 2845 that summarises the costs of ingredients applying customizable ratios and margins, illustrated exemplarily under FIG. 34, and allows application for weeks, month and annual data, which allows member 2819 users 2821 to work with customizable home meal budgets. Using the shopping list function tab 2846 a plurality of shopping lists can also be created, that can be converted into a plurality of menu item ingredients order. There is also a place order function 2847 that can be forwarded to home delivery services of a participating restaurant for ready portioned sets of menu item ingredients, illustrated exemplarily as restaurant 2 2848. Or, an order list or parts thereof can be send 2849 to other Member 2819 users 2821, illustrated exemplarily as mom 2850. Within the horizontal scrollable segment of screen 2751, there is a function tab for printing 2852 a recipe, or filing it into a designated personal menu folder 2853. A recipe can also be submitted for competitions 2854, illustrated exemplarily under FIG. 14, and FIG. 09/Ref: 457, or share it with others 2855, illustrated exemplarily under FIG. 14. Member 2819 users 2821 can, when selecting the dishes 2856 and/or beverages 2857 function tabs, retrieve previous cooked and/or prepared dishes 2856 and beverages 2857 in a list format displayed within field F-5 under the multi segment vertical scrollable fields 2858. Other function tabs can be added during customization, illustrated exemplarily as 2859.

FIG. 56

Referring now to FIG. 55 illustrating exemplarily the typical ingredient inventory identification and organization structure 2860 that applies to a plurality of relevant processes throughout the entire CCOS 1 involving the entire ingredient inventory. Illustrated exemplarily is the ingredient structure reflected under FIG. 09 and FIG. 27 for a plurality of exemplarily ingredients comprising of vegetables 2861, fruits 2862, meats 2861, fish and seafood 2862, and a plurality of others 2863. Under vegetables 2861, the main ingredient category, illustrated exemplarily under FIG. 27/Ref 1706. The first sub-level ingredient subcategories 1-2, illustrated exemplarily under FIG. 27/Ref:1710 distinguishes between starchy vegetable 2864, non-starchy vegetables 2865, vegetables high in vitamins 2866, vegetables with high nutrition 2867, vegetables listed as superfood 2868, and a plurality of other non-specified categories 2869. The subsequent sub-level of ingredient sub-categories 2-1, illustrated exemplarily under FIG. 27/Ref:1712 distinguishes by color, between green vegetables 2870, read vegetables 2871, orange/yellow vegetables 2872 and a plurality of other non-specified colors 2873. The following level of exchangeable ingredients, illustrated exemplarily under FIG. 27/Ref:1713 identifies the vegetable by name, illustrated exemplarily as 2874, 2875, 2875, 2876, 2877, 2878, and a plurality of non-specified 2879. This exchangeable ingredient level identifies and shows the plurality and range of health, wellness, and diabetic information illustrated exemplarily under FIG. 27/Ref: 1687, 1688, 1689 including the relevant vitamin, GI/GL, gluten, and diabetic exchanges 2880. Within the ingredient inventory organization structure is also a customizable function were the loss and or gain of nutrition values during a cooking process for a plurality of ingredients can be established and applied for a plurality of cooking processes 2881. Said values are set in percent based on raw ingredient data, and can also be displayed on the recipe screen 2882, illustrated exemplarily under FIG. 34. It also allows for customized nutrition intake, portioning, and diabetic settings illustrated exemplarily under FIG. 17, 18, 19. Under fruits 2862, the main ingredient category, illustrated exemplarily under FIG. 27/Ref 1706 identifies the ingredient group being fruits 2862, with the first sub-level of main ingredient subcategories 1-2, illustrated exemplarily under FIG. 27/Ref:1710 distinguishing between starchy fruits 2883, non-starchy fruits 2884, fruits high in vitamins 2885, fruits with high nutrition 2886, fruits listed as superfood 2887, and a plurality of other non-specified categories 2888. The subsequent sub-level of ingredient sub-categories 2-1, illustrated exemplarily under FIG. 27/Ref:1712 distinguishes colors between green fruits 2889, read fruits 2890, orange/yellow fruits 2891 and a plurality of other non-specified 2892. The following level of exchangeable ingredients, illustrated exemplarily under FIG. 27/Ref:1713 identifies the fruits by name, illustrated exemplarily as 2893, 2894, 2895, 2896, 2897, and a plurality of non-specified 2898. This exchangeable ingredient level identifies and shows the plurality and range of health, wellness, and diabetic information illustrated exemplarily under FIG. 27/Ref: 1687, 1688, 1689 including the relevant vitamin, GI/GL, gluten, and diabetic exchanges 2899. Within the ingredient inventory organization structure is also a customizable function were the loss and or gain of nutrition values during a cooking process for a plurality of ingredients can be established and applied for a plurality of cooking processes 2900. Said values are set in percent based on raw ingredient data, and can also be displayed on the recipe screen 2901, illustrated exemplarily under FIG. 34. It also allows for customized nutrition intake, portioning, and diabetic settings illustrated exemplarily under FIG. 17, 18, 19. Under meats 2861, the main ingredient category, illustrated exemplarily under FIG. 27/Ref 1706 identifies the ingredient group being meats 2861, with the first sub-level of main ingredient subcategories 1-2, illustrated exemplarily under FIG. 27/Ref:1710 distinguishing between pork 2902, lamb 2903, beef and veal 2904, chicken 2905, other meats 2906, and a plurality of other non-specified categories 2907. The subsequent sub-level of ingredient sub-categories 2-1, illustrated exemplarily under FIG. 27/Ref:1712 distinguishes between lean 2908, medium lean 2909, medium fat 2910 and a plurality of other non-specified 2911. The following level of exchangeable ingredients, illustrated exemplarily under FIG. 27/Ref:1713 identifies the meat by cut type, illustrated exemplarily as flank steak 2912, eye of ramp 2913, brisket 2914, topside 2915, short ribs 2916, and a plurality of non-specified 2917. This exchangeable ingredient level identifies and shows the plurality and range of health, wellness, and diabetic information illustrated exemplarily under FIG. 27/Ref: 1687, 1688, 1689 including the relevant vitamin, GI/GL, gluten, and diabetic exchanges 2918. Within the ingredient inventory organization structure is also a customizable function were the loss and or gain of nutrition values during a cooking process for a plurality of ingredients can be established and applied for a plurality of cooking processes 2919. Said values are set in percent based on raw ingredient data, and can also be displayed on the recipe screen 2920, illustrated exemplarily under FIG. 34. It also allows for customized nutrition intake, portioning, and diabetic settings illustrated exemplarily under FIG. 17, 18, 19. Under fish and seafood 2762, the main ingredient category, illustrated exemplarily under FIG. 27/Ref 1706 identifies the ingredient group being fish and seafoods 2762, with the first sub-level of ingredient subcategories 1-2, illustrated exemplarily under FIG. 27/Ref:1710 distinguishing between low carb high nutrition 2921, high protein 2922, low calories 2923, high calories 2924, super food fish 2925, and a plurality of other non-specified categories 2926. The subsequent sub-level of ingredient sub-categories 2-1, illustrated exemplarily under FIG. 27/Ref:1712 distinguishes between fish groups 2927, seafood groups 2928, shellfish groups 2929 and a plurality of other non-specified 2930. The following level of exchangeable ingredients, illustrated exemplarily under FIG. 27/Ref:1713 identifies the fish and seafood by name, illustrated exemplarily as 2931, 2932, 2933, 2934, 2935, and a plurality of non-specified 2936. This exchangeable ingredient level identifies and shows the plurality and range of health, wellness, and diabetic information illustrated exemplarily under FIG. 27/Ref: 1687, 1688, 1689 including the relevant vitamin, GI/GL, gluten, and diabetic exchanges 2937. Within the ingredient inventory organization structure is also a customizable function were the loss and or gain of nutrition values during a cooking process for a plurality of ingredients can be established and applied for a plurality of cooking processes 2938. Said values are set in percent based on raw ingredient data, and can also be displayed on the recipe screen 2939, illustrated exemplarily under FIG. 34. It also allows for customized nutrition intake, portioning, and diabetic settings illustrated exemplarily under FIG. 17, 18, 19. Other food groups include but are not limited to carbohydrates, cereals and grains 2940, milk and dairy products 2941, proteins general 2942, fatty foods 2943, sauces and pastes 2944, herbs and spices 2945, and a plurality of other non-specified 2946 follow the similar three tier level approach. The ingredient structure allows for individual ingredient pricing that is used for customized and created menu items.

FIG. 57

Figure 57:
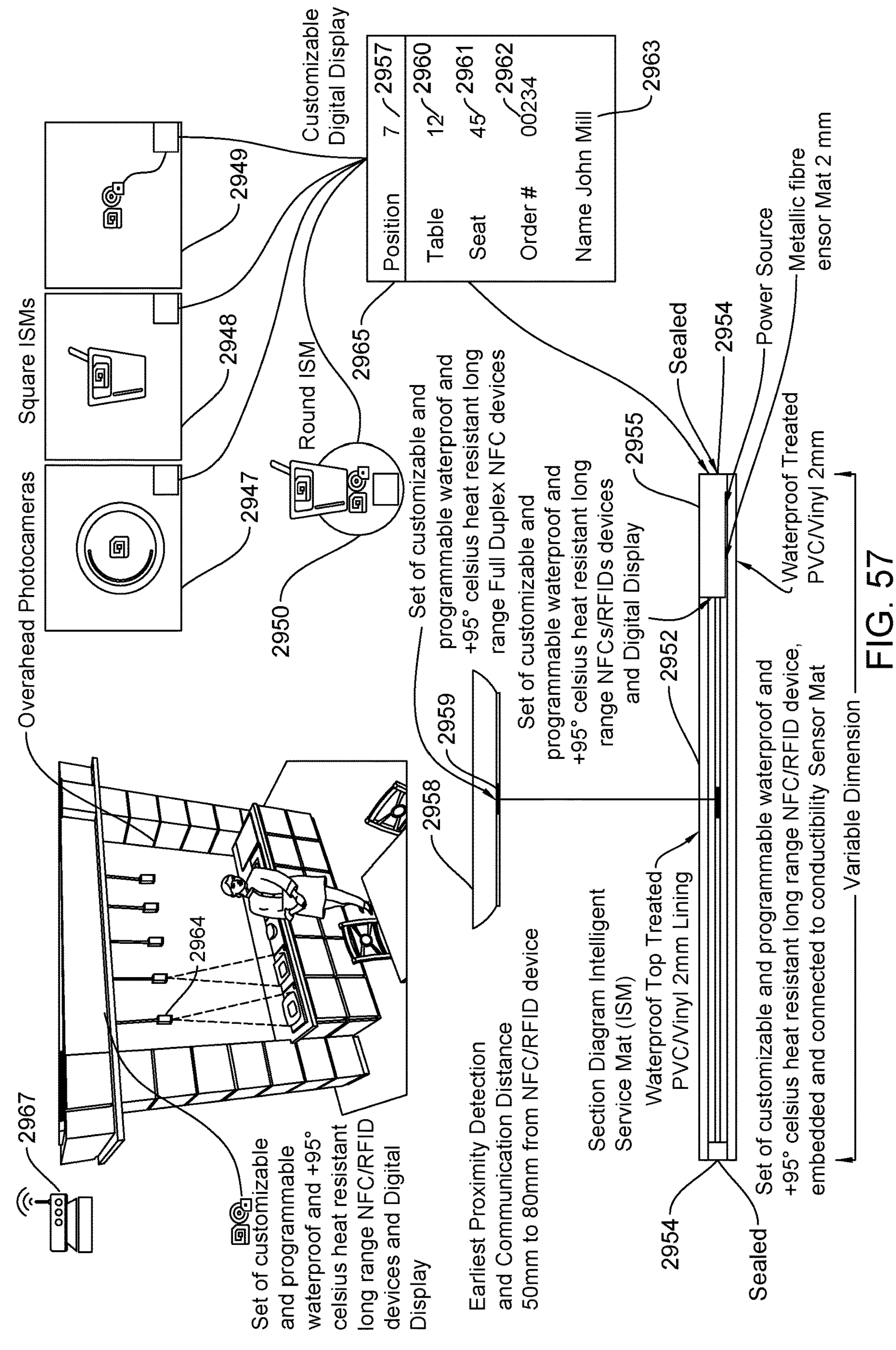
FIG. 57 illustrates exemplarily the typical intelligent service mat (ISM) of the present invention of the COOS 1.

Referring now to FIG. 57 illustrating exemplarily the typical intelligent service mat (ISM), referred to under FIG.

05. A complete set of an ISM consists of a customized manufactured mat of three layers that can be of different sizes, shapes and dimension, illustrated exemplarily as a square ISM that can be grouped, illustrated exemplarily as ISM 2947, 2948, 2949, or of round shape, illustrated exemplarily as ISM 2950 or another shape and size. The lower 2951 and top 2952 layer of the ISM is made from waterproof treated PVC/Vinyl with a thickness of 2 mm on which decorations can be printed and/or affixed. The two layers 2951 and 2952 embracing a conducting fibre sensor mat in which a set of customizable and programmable waterproof and +95° Celsius heat resistant long range NFC/RFID device are embedded 2953 and connected to the conducting fibre sensor mat. The plurality of fringes around the two layers 2951 and 2952 of the ISM are sealed 2954. At one position, which can be varied, a set of customizable and programmable waterproof and +95° Celsius heat resistant long range NFC/RFID device connected to a customizable digital display is embedded 2955. An exemplarily enlargement of the digital display is shown 2956. The customizable digital display allows for the display of the ISMs position 2957, identifying the position within a restaurant envelope. When a tableware, illustrated exemplarily as a plate 2958 on which a Set of customizable and programmable waterproof and +95° Celsius heat resistant long range Full Duplex NFC devices is affixed 2959 comes in close proximity to a ISMs with the embedded set of customizable and programmable waterproof and +95° Celsius heat resistant long range customizable and programmable waterproof and +95° Celsius heat resistant long range NFC/RFID device 2953, the said NFC/RFID interrogates, communicates, and identifies the customizable and programmable waterproof and +95° Celsius heat resistant long range Full Duplex NFC device. A successful communication between the set of customizable and programmable waterproof and +95° Celsius heat resistant long range customizable and programmable waterproof and +95° Celsius heat resistant long range NFC/RFID device and the customizable and programmable waterproof and +95° Celsius heat resistant long range Full Duplex NFC device results in the transfer of the plurality of data from the said Full Duplex NFC to the set of customizable and programmable waterproof and +95° Celsius heat resistant long range customizable and programmable waterproof and +95° Celsius heat resistant long range NFC/RFID device, and the display of said data on the customizable digital display, illustrated exemplarily the table number 2960, the seat number 2961 and the order number 2962; and if available the name of the recipient 2963 of the order. ISMs are placed on service counters, illustrated exemplarily at the cooking stations, the café service counter, the fast food counter, and/or the bar service counter. At said service counters are overhead photocameras with sensor 2964 that take pictures of the dishes and/or beverages that are placed on the ISM 2965. This is a service offered to member customers who customized and/or created dishes and beverages and wish to have a picture for their personal menus. The transfer of pictures is executed through the set of customizable and programmable waterproof and +95° Celsius heat resistant long range NFC/RFID devices 2966 capturing and sending the pictures to the CCOS 1 through a local RMNS 2967 to the member customers account that can be accessed through the restaurant provided MRUDIs or SUDIs, or the members own PUDI. There is also a manual action safeguard. In the event the overhead photocamera with sensor 2964 fails to take a picture, the position identification 2957 can serve as manual action trigger.

In one exemplary implementation, there is provided a system for implementing a centralized customizable operating solution, comprising: a central server module that is in communication with a plurality of input modules and a plurality of execution modules, wherein each input module is configured to accept inputs from a user relating to customized operations associated with the user; wherein the central server module is configured to: generate corresponding outputs based on the accepted inputs; and transmit each output to a relevant execution module for execution of the output.

The aforementioned customized operations associated with the user include, but are not limited to: tasks, processes, functions and requirements that are specifically selected or chosen by the user. In this manner, each generated output is related to at least one task, process, function and/or requirement that is specifically selected or chosen by the user.

The aforementioned system for implementing a customizable operating solution further includes one or more data sources. For example, a data source may be a database.

The aforementioned step of generating corresponding outputs based on the accepted inputs includes, but is not limited to the sub-step of: accessing the one or more data sources to retrieve relevant customizable auto calculations, algorithms and/or rules to facilitate generation of the corresponding outputs.

The acceptance of the inputs from the user depends on an attribute of the user. In this context, the user includes, but is not limited to: a customer, a staff member or a third party. In this context, an attribute includes, but is not limited to: membership status and customer privilege/priority level. For example, a member or a customer with a higher privilege/priority level has access to more customized operations compared to a nonmember or a customer with a relatively lower privilege/priority level. As another example, a staff member with a specific or higher access/privilege/priority level has access to more customized operations compared to staff members with a relatively restricted access or lower privilege/priority level.

The aforementioned outputs include, but are not limited to: computer executable instructions, output signals and notifications.

The aforementioned execution module may be an intelligent cooking station or a service counter placemat. The intelligent cooking station and the service counter placemat can execute instructions received from the central server module.

The intelligent cooking station and/or the service counter placemat can utilize tableware identification and tracking (e.g. via RFID) to facilitate execution of the instructions.

The aforementioned execution module may be also be an inventory management module that utilizes product and product container identification and tracking (e.g. via RFID) for inventory management.

One or more of the aforementioned input modules may be connected to a data acquisition module. The data acquisition module is configured to generate an input based on its application data. For example, a data acquisition module may be a temperature sensor or barcode scanner. The temperature sensor can provide inputs (in the form of temperature readings) to an associated input module.

In one exemplary implementation, to facilitate directing and tracking of communications (e.g. accepted inputs and corresponding outputs) between the central server module and the plurality of input and execution modules, each of the plurality of input and execution modules are configured to identify themselves to each other using unique identification codes when communicating with each other. For example, each MSUDI, SRUDI, SUDI, TPUDI, and PUDI has its own unique identification code, and each user (e.g. Staff, Member, or Third Parties etc.) has his/her own unique login identification code. This enables the central server module to identify, direct, and execute communications within the COOS environment that is described above. Furthermore, the central server module and each of the plurality of input and execution modules can be configured to establish and record: (i) commencement of execution of a corresponding output by a particular execution module and (ii) subsequent progress stages of communications between the central server module and each of the plurality of input and execution modules.

Moreover, the communications between the central server module and the plurality of input and execution modules may also include a plurality of unique process codes and action identification codes to identify, guide, and execute the corresponding outputs (which may be customizable and programmed actions and processes). In particular, there may be provided a list of customizable and expandable action and process codes that allow the central server module to guide and execute actions and processes throughout the COOS environment.

The COOS may be configured for automated action. In particular, the central service module and the plurality of input and execution modules can be configured to recognize, and automatically act upon, when a plurality of customizable and pre-set parameters are met, exceeded or breached, and automatically commence action, processes, and communications between the central server module and the plurality of input and execution modules. For example, if a frontline inventory runs low, the COOS automatically notifies the relevant preparation/portioning stations and other SUDIs (inventory service staff) to re-fill inventory, and to update required ingredient orders etc. As another example, with reference to the Central High Level Analytical Module (Ref: FIG. 47/2658), the COOS can automatically verify, generate, and communicate in real time with the relevant SUDIs if pre-set parameters (e.g. Analytics 1 to 18 described above) exceed pre-set parameters for action to be taken.

A method for implementing a centralized customizable operating solution, comprising: providing a central server module that is in communication with a plurality of input modules and a plurality of execution modules, configuring each input module to accept inputs from a user relating to customized operations associated with the user; configuring the central server module to: generate corresponding outputs based on the accepted inputs; and transmit each output to a relevant execution module for execution of the output.

The invention claimed is:

1. A system for implementing a centralized customizable operating solution used by a business, a customer and a third party, comprising:

a central server module that is in communication with a staff input module, a customer input module, a third party input module and a plurality of execution modules, the plurality of execution modules in communication with one or more mobile and stationary electronic devices accessible to staff and customers of a business, wherein:

the staff input module is configured to accept inputs from a staff member relating to products and services associated with the business;

the customer input module is configured to accept inputs from the customer relating to customized operations associated with the customer, the customized operations associated with the customer comprising at least one of: tasks, processes, functions and requirements that are selected or input by the customer; and the third party input module is configured to accept inputs from a third-party member relating to products and services associated with the third party; and at least one data source module that is in communication with the central server module, the at least one data source module having stored therein one or more data sources, wherein the central server module is configured to:

access the one or more data sources to retrieve a relevant calculation, algorithm and/or rule;

generate at least one corresponding personalized output based on the accepted inputs from the staff input module, the customer input module and the third party input module, wherein the at least one corresponding personalized output is based on:

(i) the tasks, processes, functions and/or requirements that are selected or input by the customer;

(ii) the inputs from the staff member relating to the products and services associated with the business;

(iii) the inputs from the third-party member relating to the products and services associated with the third party and (iv) the retrieved relevant calculation, algorithm and/or rule; and transmit the at least one corresponding personalized output to a selected one of the plurality of execution modules for execution of the at least one corresponding personalized output; and wherein:

the central server module is further configured to:

receive, from data sources associated with the business, business information including an inventory of ingredients, ingredient storage, preparation devices, and preparation processes for products and services;

customize the products and services to the customer by the business member, wherein the customizing of products and services comprises:

presenting to the customer on the one or more mobile and stationary electronic devices, a menu of options based on an inventory of ingredients, ingredient storage, preparation devices, and preparation processes associated with the business;

presenting to the customer, the menu of options for interactive customization, the presenting including the display of ingredient nutritional value adjusted for the inventory of ingredients, ingredient storage, preparation devices, and preparation processes for products and services associated with the business; and customizing the customer menu of options based on the interactive customization of ingredients for one or more selected menu options; and receive from the customer selections of one or more customized menu options for preparation by the business; and transmit to the business, the one or more customized menu options with instructions for customizing the business's preparation processes.

2. The system as claimed in claim 1, wherein the customer input module is further configured to determine an attribute of the customer such that acceptance of the inputs from the customer is based on the determined attribute of the customer.

3. The system as claimed in claim 2, wherein the attribute of the customer comprises a membership status or a customer priority level.

4. The system as claimed in claim 1, wherein the at least one corresponding personalized output comprises at least one of: computer executable instructions, output signals and notifications.

5. The system as claimed in claim 4, wherein each of the plurality of execution modules comprises either an intelligent preparation and processing station, an intelligent cooking station or a service counter placemat or customer table, that is configured to execute the computer executable instructions received from the central server module.

6. The system as claimed in claim 5, wherein the intelligent preparation and processing station, the intelligent cooking station, or the service counter placemat or customer table comprises tableware identification and tracking devices to facilitate execution of the computer executable instructions.

7. The system as claimed in claim 4, wherein each of the plurality of execution modules comprises an inventory management module that is configured to track inventory using product identification and tracking devices.

8. The system as claimed in claim 1, wherein at least one of the staff input module, the customer input module, and the third party input module is in communication with a data acquisition module that is configured to generate input data for at least one of the staff input module, the customer input module, and the third party input module based on acquired data.

9. A method for implementing a centralized customizable operating solution used by a business, a customer and a third party, comprising:

providing a central server module that is in communication with a staff input module, a customer input module, a third party input module, and a plurality of execution modules, the plurality of execution modules in communication with one or more mobile and stationary electronic devices accessible to staff and customers in operations of a business;

providing at least one data source module that is in communication with the central server module, the at least one data source module having stored therein one or more data sources;

configuring: (i) the staff input module to accept inputs from a staff member relating to products and services associated with the business, (ii) the customer input module to accept inputs from the customer relating to customized operations associated with the customer, the customized operations associated with the customer comprising at least one of: tasks, processes, functions and requirements that are selected or input by the customer, and (iii) the third party input module to accept inputs from a third-party member relating to products and services associated with the third party, and configuring the central server module to:

access the one or more data sources to retrieve a relevant calculation, algorithm and/or rule;

generate at least one corresponding personalized output based on the accepted inputs from the staff input module, the customer input module and the third party input module, wherein the at least one corresponding personalized output is based on: (i) the tasks, processes, functions and/or requirements that are selected or input by the customer; (ii) the inputs from the staff member relating to the products and services associated with the business; (iii) the inputs from the third-party member relating to the products and services associated with the third party and (iv) the retrieved relevant calculation, algorithm and/or rule; and transmit the at least one corresponding personalized output to a selected one of the plurality of execution modules for execution of the at least one corresponding personalized output;

wherein:

the central server module is further configured to:

receive, from data sources associated with the business, business information including an inventory of ingredients, ingredient storage, preparation devices, and preparation processes for products and services;

customize the products and services to the customer by the business member, wherein the customizing of products and services comprises:

presenting to the customer on the one or more mobile and stationary electronic devices, a menu of options based on one or more of the customer preferences, dietary restrictions, nutritional budget, and an inventory of ingredients, ingredient storage, preparation devices, and preparation associated with the business;

presenting to the customer, the menu of options for interactive customization, the presenting including the display of ingredient nutritional value adjusted for the inventory of ingredients, ingredient storage, preparation devices, and preparation processes for products and services associated with the business; and customizing the customer menu of options based on the interactive customization of ingredients for one or more selected menu options; and receive from the customer selections of one or more customized menu options for preparation by the business; and transmit to the business, the one or more customized menu options with instructions for customizing the business's preparation processes.

10. The method as claimed in claim 9, further comprising:

configuring the customer input module to determine an attribute of the customer such that acceptance of the inputs from the customer is based on the determined attribute of the customer.

11. The method as claimed in claim 10, wherein the attribute of the customer comprises a membership status or a customer priority level.

12. The method as claimed in claim 9, wherein the at least one corresponding personalized output comprises at least one of: computer executable instructions, output signals and notifications.

13. The method as claimed in claim 12, wherein each of the plurality of execution modules comprises either an intelligent preparation and processing station, an intelligent cooking station, or a service counter placemat or customer table, wherein the method further comprises configuring the intelligent preparation and processing station, the intelligent cooking station, or the service counter placemat or customer table to execute the computer executable instructions received from the central server module.

14. The method as claimed in claim 13, wherein the intelligent preparation and processing station, the intelligent cooking station, or the service counter placemat or customer table comprises tableware identification and tracking devices to facilitate execution of the computer executable instructions.

15. The method as claimed in claim 12, wherein each of the plurality of execution modules comprises an inventory management module, wherein the method further comprises configuring the inventory management module to track inventory using product identification and tracking devices.

16. The method as claimed in claim 9, wherein at least one of the staff input module, the customer input module, and the third party input module is in communication with a data acquisition module, wherein the method further comprises configuring the data acquisition module to generate input data for at least one of the staff input module, the customer input module, and the third party input module based on acquired data.

* * * * *